US012619303B2

(12) United States Patent
Dryer et al.

(10) Patent No.: US 12,619,303 B2
(45) Date of Patent: May 5, 2026

(54) GAZE BASED INTERACTIONS WITH THREE-DIMENSIONAL ENVIRONMENTS

(71) Applicant: Apple Inc., Cupertino, CA (US)

(72) Inventors: Allison W. Dryer, Tiburon, CA (US); Giovanni M. Agnoli, San Mateo, CA (US); Yiqiang Nie, San Francisco, CA (US); Michael B. Tucker, Marina Del Rey, CA (US); Giancarlo Yerkes, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/441,971

(22) Filed: Feb. 14, 2024

(65) Prior Publication Data

US 2024/0220009 A1     Jul. 4, 2024

Related U.S. Application Data

(63) Continuation of application No. PCT/US2022/044236, filed on Sep. 21, 2022.

(60) Provisional application No. 63/314,228, filed on Feb. 25, 2022, provisional application No. 63/248,471, filed on Sep. 25, 2021.

(51) Int. Cl.
*G06F 3/01*        (2006.01)
*G06F 3/04815*     (2022.01)

(52) U.S. Cl.
CPC .......... *G06F 3/013* (2013.01); *G06F 3/04815* (2013.01)

(58) Field of Classification Search
CPC .............................. G06F 3/013; G06F 3/04815
See application file for complete search history.

(56) References Cited

U.S. PATENT DOCUMENTS

| 4,803,487 A | 2/1989 | Willard et al. |
| 5,617,031 A | 4/1997 | Tuttle |
| 5,793,366 A | 8/1998 | Mano et al. |

(Continued)

FOREIGN PATENT DOCUMENTS

| AU | 2015101019 A4 | 9/2015 |
| CN | 1556955 A | 12/2004 |

(Continued)

OTHER PUBLICATIONS

International Preliminary Report on Patentability received for PCT Patent Application No. PCT/US2023/014177, mailed on Sep. 19, 2024, 15 pages.

(Continued)

*Primary Examiner* — Robert J Michaud
(74) *Attorney, Agent, or Firm* — YHE Law LLP

(57)        ABSTRACT

The present disclosure generally relates to techniques and user interfaces for performing one or more wake operations, displaying content associated with an external device, performing one or more operations based on an input scheme, displaying virtual objects for controlling a camera setting, providing navigation guidance, displaying virtual objects associated with an external device, navigating a user interface, displaying virtual objects for performing a physical activity, displaying virtual objects for controlling one or more external devices, providing guidance for a physical activity, displaying virtual objects to perform one or more operations, and/or controlling the orientation of virtual objects.

51 Claims, 76 Drawing Sheets

(56) References Cited

U.S. PATENT DOCUMENTS

| | | |
|---|---|---|
| 5,825,353 A | 10/1998 | Will |
| 5,853,327 A | 12/1998 | Gilboa |
| 6,008,807 A | 12/1999 | Bretschneider et al. |
| 6,016,248 A | 1/2000 | Anzai et al. |
| 6,167,353 A | 12/2000 | Piernot et al. |
| 6,190,174 B1 | 2/2001 | Lam et al. |
| 6,232,972 B1 | 5/2001 | Arcuri et al. |
| 6,359,837 B1 | 3/2002 | Tsukamoto |
| 6,429,896 B1 | 8/2002 | Aruga et al. |
| 6,522,347 B1 | 2/2003 | Sakai et al. |
| 6,650,894 B1 | 11/2003 | Berstis et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,889,138 B1 | 5/2005 | Krull et al. |
| 7,463,304 B2 | 12/2008 | Murray |
| 7,537,162 B1 | 5/2009 | Siu |
| 7,542,971 B2 | 6/2009 | Thione et al. |
| 7,571,014 B1 | 8/2009 | Lambourne et al. |
| 7,575,171 B2 | 8/2009 | Lev |
| 7,653,883 B2 | 1/2010 | Hotelling et al. |
| 7,656,393 B2 | 2/2010 | King et al. |
| 7,843,471 B2 | 11/2010 | Doan et al. |
| 7,905,815 B2 | 3/2011 | Ellis et al. |
| 7,908,564 B2 | 3/2011 | Hara et al. |
| 8,189,087 B2 | 5/2012 | Misawa et al. |
| 8,196,043 B2 | 6/2012 | Crow et al. |
| 8,286,102 B1 | 10/2012 | Wilensky |
| 8,290,603 B1 | 10/2012 | Lambourne |
| 8,391,697 B2 | 3/2013 | Cho et al. |
| 8,624,836 B1 | 1/2014 | Miller et al. |
| 8,675,084 B2 | 3/2014 | Bolton et al. |
| 8,742,890 B2 | 6/2014 | Gocho et al. |
| 8,762,047 B2 | 6/2014 | Sterkel et al. |
| 8,762,895 B2 | 6/2014 | Mehta et al. |
| 8,894,462 B2 | 11/2014 | Huang et al. |
| 8,924,894 B1 | 12/2014 | Yaksick et al. |
| 8,983,539 B1 | 3/2015 | Kim et al. |
| 9,071,945 B1 | 6/2015 | Rubin et al. |
| 9,075,520 B2 | 7/2015 | Park et al. |
| 9,112,849 B1 | 8/2015 | Werkelin Ahlin et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,223,296 B2 | 12/2015 | Yang et al. |
| 9,329,831 B1 | 5/2016 | Fullerton et al. |
| 9,332,182 B2 | 5/2016 | Nonaka et al. |
| 9,350,924 B2 | 5/2016 | Posa |
| 9,369,537 B1 | 6/2016 | Mathew et al. |
| D765,118 S | 8/2016 | Bachman et al. |
| 9,405,766 B2 | 8/2016 | Robbin et al. |
| 9,423,868 B2 | 8/2016 | Iwasaki |
| 9,451,144 B2 | 9/2016 | Dye |
| 9,462,340 B1 | 10/2016 | Mathurin |
| 9,495,575 B2 | 11/2016 | Kim et al. |
| D773,510 S | 12/2016 | Foss et al. |
| 9,541,407 B1 | 1/2017 | Mohler |
| 9,544,563 B1 | 1/2017 | Cheng et al. |
| 9,547,419 B2 | 1/2017 | Yang et al. |
| 9,560,629 B2 | 1/2017 | Migicovsky et al. |
| 9,574,896 B2 | 2/2017 | McGavran et al. |
| 9,594,354 B1 | 3/2017 | Kahn et al. |
| 9,600,153 B2 | 3/2017 | Roh |
| 9,628,950 B1 | 4/2017 | Noeth et al. |
| 9,652,741 B2 | 5/2017 | Goldberg et al. |
| D789,381 S | 6/2017 | Okumura et al. |
| 9,704,386 B2 | 7/2017 | Yoon et al. |
| 9,753,543 B2 | 9/2017 | Jeon et al. |
| 9,820,323 B1 | 11/2017 | Young et al. |
| 9,832,697 B2 | 11/2017 | Kotecha et al. |
| 9,892,715 B2 | 2/2018 | Komulainen et al. |
| 9,900,515 B2 | 2/2018 | Kim et al. |
| 9,927,957 B1 | 3/2018 | Sagar et al. |
| 9,942,463 B2 | 4/2018 | Kuo et al. |
| 9,973,674 B2 | 5/2018 | Dye et al. |
| 9,996,976 B2 | 6/2018 | Zhou et al. |
| 10,019,599 B1 | 7/2018 | Moran et al. |
| 10,135,905 B2 | 11/2018 | Chaudhri et al. |
| 10,182,138 B2 | 1/2019 | Motika et al. |
| 10,216,392 B2 | 2/2019 | Zhao |
| 10,299,300 B1 | 5/2019 | Young |
| 10,310,697 B2 | 6/2019 | Roberts et al. |
| 10,324,590 B2 | 6/2019 | Yang et al. |
| 10,356,070 B2 | 7/2019 | Cha et al. |
| 10,444,975 B2 | 10/2019 | Murphy et al. |
| 10,466,881 B2 | 11/2019 | Sasaki et al. |
| 10,488,218 B2 | 11/2019 | Kim et al. |
| 10,503,820 B2 | 12/2019 | Duggan et al. |
| 10,524,300 B2 | 12/2019 | Ueda et al. |
| 10,534,475 B2 | 1/2020 | Yoo et al. |
| 10,572,215 B1 | 2/2020 | Cooper et al. |
| 10,627,914 B2 | 4/2020 | Ang et al. |
| 10,643,246 B1 | 5/2020 | Suprasadachandran Pillai |
| 10,656,823 B2 | 5/2020 | Mukherjee et al. |
| 10,671,174 B2 | 6/2020 | Ang et al. |
| 10,671,834 B2 | 6/2020 | Adato et al. |
| 10,674,072 B1 | 6/2020 | Manzari et al. |
| 10,684,693 B2 | 6/2020 | Kletsov et al. |
| 10,691,332 B2 | 6/2020 | Offenberg et al. |
| 10,721,711 B2 | 7/2020 | Kirov et al. |
| 10,748,345 B2 | 8/2020 | Zhou |
| 10,762,716 B1 | 9/2020 | Paul et al. |
| 10,802,598 B2 | 10/2020 | Ang et al. |
| 10,882,613 B2 | 1/2021 | Sharma et al. |
| 10,891,800 B1 | 1/2021 | Stoyles et al. |
| 10,902,277 B2 | 1/2021 | Agarwal et al. |
| 10,929,443 B2 | 2/2021 | Grochocki et al. |
| 10,943,382 B2 | 3/2021 | Shapiro et al. |
| 10,955,956 B2 | 3/2021 | Gleeson et al. |
| 10,966,149 B2 | 3/2021 | Yoon et al. |
| 11,048,334 B2 | 6/2021 | Rothberg et al. |
| 11,050,873 B2 | 6/2021 | Kim et al. |
| 11,087,558 B1 | 8/2021 | Kuhn et al. |
| 11,087,559 B1 | 8/2021 | Kuhn et al. |
| 11,099,647 B2 | 8/2021 | Ang et al. |
| 11,107,219 B2 | 8/2021 | Cohen et al. |
| 11,112,963 B2 | 9/2021 | Chaudhri et al. |
| 11,223,728 B2 | 1/2022 | Kim et al. |
| 11,227,494 B1 | 1/2022 | Stoyles et al. |
| 11,231,832 B2 | 1/2022 | Yang et al. |
| 11,361,473 B1 | 6/2022 | Abdollahian et al. |
| 11,543,887 B2 | 1/2023 | Ang et al. |
| 11,670,023 B2 | 6/2023 | Xu et al. |
| 11,868,531 B1 | 1/2024 | Tasci |
| 12,001,642 B2 | 6/2024 | Paul et al. |
| 2001/0030597 A1 | 10/2001 | Inoue et al. |
| 2001/0031622 A1 | 10/2001 | Kivela et al. |
| 2002/0068600 A1 | 6/2002 | Chihara et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0025802 A1 | 2/2003 | Mayer, Jr. et al. |
| 2003/0128237 A1 | 7/2003 | Sakai |
| 2003/0151982 A1 | 8/2003 | Brewer et al. |
| 2003/0158927 A1 | 8/2003 | Sagey et al. |
| 2003/0171984 A1 | 9/2003 | Wodka et al. |
| 2004/0044953 A1 | 3/2004 | Watkins et al. |
| 2004/0100389 A1 | 5/2004 | Naito et al. |
| 2004/0201720 A1 | 10/2004 | Robins et al. |
| 2004/0264916 A1 | 12/2004 | Van et al. |
| 2005/0117601 A1 | 6/2005 | Anderson et al. |
| 2005/0134695 A1 | 6/2005 | Deshpande et al. |
| 2005/0171926 A1 | 8/2005 | Thione et al. |
| 2005/0198319 A1 | 9/2005 | Chan et al. |
| 2005/0237194 A1 | 10/2005 | Voba et al. |
| 2005/0246642 A1 | 11/2005 | Valderas et al. |
| 2006/0079973 A1 | 4/2006 | Bacharach et al. |
| 2006/0135064 A1 | 6/2006 | Cho et al. |
| 2006/0217104 A1 | 9/2006 | Cho |
| 2007/0021153 A1 | 1/2007 | Novak |
| 2007/0025711 A1 | 2/2007 | Marcus et al. |
| 2007/0040810 A1 | 2/2007 | Dowe et al. |
| 2007/0074133 A1 | 3/2007 | Hara et al. |

(56) References Cited

U.S. PATENT DOCUMENTS

| | | |
|---|---|---|
| 2007/0096283 A1 | 5/2007 | Ljung et al. |
| 2007/0109417 A1 | 5/2007 | Hyttfors et al. |
| 2007/0143495 A1 | 6/2007 | Porat |
| 2007/0165103 A1 | 7/2007 | Arima et al. |
| 2007/0175998 A1 | 8/2007 | Lev |
| 2007/0180392 A1 | 8/2007 | Russo |
| 2007/0191008 A1 | 8/2007 | Bucher et al. |
| 2007/0254640 A1 | 11/2007 | Bliss |
| 2007/0259654 A1 | 11/2007 | Oijer |
| 2008/0004113 A1 | 1/2008 | Avery et al. |
| 2008/0052643 A1 | 2/2008 | Ike et al. |
| 2008/0077673 A1 | 3/2008 | Thomas et al. |
| 2008/0120029 A1 | 5/2008 | Zelek et al. |
| 2008/0122796 A1 | 5/2008 | Jobs et al. |
| 2008/0165136 A1 | 7/2008 | Christie et al. |
| 2008/0214191 A1 | 9/2008 | Yach et al. |
| 2008/0219151 A1 | 9/2008 | Ma et al. |
| 2008/0253656 A1 | 10/2008 | Schwartzberg et al. |
| 2008/0259829 A1 | 10/2008 | Rosenblatt |
| 2008/0284855 A1 | 11/2008 | Umeyama et al. |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0102933 A1 | 4/2009 | Harris et al. |
| 2009/0143114 A1 | 6/2009 | Vargas et al. |
| 2009/0144391 A1 | 6/2009 | Jung et al. |
| 2009/0195402 A1 | 8/2009 | Izadi et al. |
| 2009/0195497 A1 | 8/2009 | Fitzgerald et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0284476 A1 | 11/2009 | Bull et al. |
| 2009/0311993 A1 | 12/2009 | Horodezky |
| 2009/0313584 A1 | 12/2009 | Kerr et al. |
| 2009/0315671 A1 | 12/2009 | Gocho et al. |
| 2009/0325630 A1 | 12/2009 | Tiitola et al. |
| 2010/0026640 A1 | 2/2010 | Kim et al. |
| 2010/0054497 A1 | 3/2010 | Bull et al. |
| 2010/0110108 A1 | 5/2010 | Alexandersson et al. |
| 2010/0125785 A1 | 5/2010 | Moore et al. |
| 2010/0138764 A1 | 6/2010 | Hatambeiki et al. |
| 2010/0149090 A1 | 6/2010 | Morris et al. |
| 2010/0162160 A1 | 6/2010 | Stallings et al. |
| 2010/0169790 A1 | 7/2010 | Vaughan et al. |
| 2010/0178873 A1 | 7/2010 | Lee et al. |
| 2010/0208999 A1 | 8/2010 | Oh et al. |
| 2010/0228836 A1 | 9/2010 | Lehtovirta et al. |
| 2010/0284389 A1 | 11/2010 | Ramsay et al. |
| 2010/0287513 A1 | 11/2010 | Singh et al. |
| 2010/0289740 A1 | 11/2010 | Kim et al. |
| 2010/0289910 A1 | 11/2010 | Kamshilin et al. |
| 2010/0321201 A1 | 12/2010 | Huang et al. |
| 2011/0012772 A1 | 1/2011 | Chuang et al. |
| 2011/0016425 A1 | 1/2011 | Homburg et al. |
| 2011/0029750 A1 | 2/2011 | Jang et al. |
| 2011/0037712 A1 | 2/2011 | Kim et al. |
| 2011/0058052 A1 | 3/2011 | Bolton et al. |
| 2011/0059769 A1 | 3/2011 | Brunolli |
| 2011/0076003 A1 | 3/2011 | Cho et al. |
| 2011/0081860 A1 | 4/2011 | Brown et al. |
| 2011/0106921 A1 | 5/2011 | Brown et al. |
| 2011/0111735 A1 | 5/2011 | Pietrow |
| 2011/0115932 A1 | 5/2011 | Shin et al. |
| 2011/0130168 A1 | 6/2011 | Vendrow et al. |
| 2011/0138284 A1 | 6/2011 | Wigdor et al. |
| 2011/0153628 A1 | 6/2011 | Basu et al. |
| 2011/0157055 A1 | 6/2011 | Tilley et al. |
| 2011/0159469 A1 | 6/2011 | Hwang et al. |
| 2011/0159927 A1 | 6/2011 | Choi |
| 2011/0181520 A1 | 7/2011 | Boda et al. |
| 2011/0183613 A1 | 7/2011 | Nocera |
| 2011/0225492 A1 | 9/2011 | Boettcher et al. |
| 2011/0237221 A1 | 9/2011 | Prakash et al. |
| 2011/0252318 A1 | 10/2011 | Helms |
| 2011/0257958 A1 | 10/2011 | Kildevaeld |
| 2011/0258049 A1 | 10/2011 | Ramer et al. |
| 2011/0316884 A1 | 12/2011 | Giambalvo et al. |
| 2012/0019400 A1 | 1/2012 | Patel et al. |
| 2012/0044062 A1 | 2/2012 | Jersa et al. |
| 2012/0051560 A1 | 3/2012 | Sanders |
| 2012/0069206 A1 | 3/2012 | Hsieh |
| 2012/0071146 A1 | 3/2012 | Shrivastava et al. |
| 2012/0089300 A1 | 4/2012 | Wolterman et al. |
| 2012/0115608 A1 | 5/2012 | Pfeifer et al. |
| 2012/0120277 A1 | 5/2012 | Tsai et al. |
| 2012/0146899 A1 | 6/2012 | Teng |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0236037 A1 | 9/2012 | Lessing et al. |
| 2012/0266093 A1 | 10/2012 | Park et al. |
| 2012/0287290 A1 | 11/2012 | Jain et al. |
| 2012/0316777 A1 | 12/2012 | Kitta et al. |
| 2012/0320141 A1 | 12/2012 | Bowen et al. |
| 2013/0016042 A1 | 1/2013 | Makinen et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0027341 A1 | 1/2013 | Mastandrea |
| 2013/0027429 A1 | 1/2013 | Hogg et al. |
| 2013/0038771 A1 | 2/2013 | Brunner et al. |
| 2013/0057472 A1 | 3/2013 | Dizac et al. |
| 2013/0065482 A1 | 3/2013 | Trickett et al. |
| 2013/0076591 A1 | 3/2013 | Sirpal et al. |
| 2013/0085931 A1 | 4/2013 | Runyan |
| 2013/0093833 A1 | 4/2013 | Al-Asaaed et al. |
| 2013/0093904 A1 | 4/2013 | Wagner et al. |
| 2013/0106603 A1 | 5/2013 | Weast et al. |
| 2013/0111550 A1 | 5/2013 | Naveh et al. |
| 2013/0117025 A1 | 5/2013 | Park et al. |
| 2013/0117693 A1 | 5/2013 | Anderson et al. |
| 2013/0125016 A1 | 5/2013 | Pallakoff et al. |
| 2013/0134212 A1 | 5/2013 | Chang et al. |
| 2013/0138272 A1 | 5/2013 | Louise-Babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0143512 A1 | 6/2013 | Hernandez et al. |
| 2013/0145316 A1 | 6/2013 | Heo |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0194254 A1 | 8/2013 | Miyoshi et al. |
| 2013/0201098 A1 | 8/2013 | Schilit et al. |
| 2013/0201214 A1 | 8/2013 | Piippo et al. |
| 2013/0212470 A1 | 8/2013 | Karunamuni et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0244633 A1 | 9/2013 | Jacobs et al. |
| 2013/0286251 A1 | 10/2013 | Wood et al. |
| 2013/0314204 A1 | 11/2013 | Ho et al. |
| 2013/0325524 A1 | 12/2013 | Boudville |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0028546 A1 | 1/2014 | Jeon et al. |
| 2014/0033100 A1 | 1/2014 | Noda et al. |
| 2014/0037107 A1 | 2/2014 | Marino et al. |
| 2014/0040831 A1 | 2/2014 | Akasaka et al. |
| 2014/0056475 A1 | 2/2014 | Jang et al. |
| 2014/0057569 A1 | 2/2014 | Toivanen et al. |

(56) References Cited

U.S. PATENT DOCUMENTS

| | | |
|---|---|---|
| 2014/0062962 A1 | 3/2014 | Jang et al. |
| 2014/0068526 A1 | 3/2014 | Figelman et al. |
| 2014/0068755 A1 | 3/2014 | King et al. |
| 2014/0073252 A1 | 3/2014 | Lee et al. |
| 2014/0075003 A1 | 3/2014 | Tanaka et al. |
| 2014/0075311 A1 | 3/2014 | Boettcher et al. |
| 2014/0078371 A1 | 3/2014 | Kinoshita |
| 2014/0084857 A1 | 3/2014 | Liu et al. |
| 2014/0095225 A1 | 4/2014 | Williams et al. |
| 2014/0104449 A1 | 4/2014 | Masarik et al. |
| 2014/0109004 A1 | 4/2014 | Sadhvani et al. |
| 2014/0117076 A1 | 5/2014 | Eberlein |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0149859 A1 | 5/2014 | Van Dyken et al. |
| 2014/0156412 A1 | 6/2014 | Tse |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0167986 A1 | 6/2014 | Parada et al. |
| 2014/0168056 A1* | 6/2014 | Swaminathan ...... G06V 30/142 |
| | | 345/156 |
| 2014/0173455 A1 | 6/2014 | Shimizu et al. |
| 2014/0176298 A1 | 6/2014 | Kumar et al. |
| 2014/0180582 A1 | 6/2014 | Pontarelli et al. |
| 2014/0181654 A1 | 6/2014 | Kumar et al. |
| 2014/0184524 A1 | 7/2014 | Schiefer et al. |
| 2014/0191715 A1 | 7/2014 | Wechlin et al. |
| 2014/0195943 A1 | 7/2014 | Zheng et al. |
| 2014/0201023 A1 | 7/2014 | Tang |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0267796 A1 | 9/2014 | Jang et al. |
| 2014/0269614 A1 | 9/2014 | Maguire et al. |
| 2014/0273975 A1 | 9/2014 | Barat et al. |
| 2014/0282068 A1 | 9/2014 | Levkovitz et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0365113 A1 | 12/2014 | Yue et al. |
| 2014/0368719 A1 | 12/2014 | Kaneko et al. |
| 2014/0370807 A1 | 12/2014 | Pierce et al. |
| 2014/0380187 A1 | 12/2014 | Gardenfors et al. |
| 2015/0011199 A1 | 1/2015 | Lee et al. |
| 2015/0017956 A1 | 1/2015 | Jeong |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1 | 2/2015 | Solum et al. |
| 2015/0040074 A1 | 2/2015 | Hofmann et al. |
| 2015/0049033 A1 | 2/2015 | Kim et al. |
| 2015/0049233 A1 | 2/2015 | Choi |
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0067513 A1 | 3/2015 | Zambetti et al. |
| 2015/0067580 A1 | 3/2015 | Um et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1 | 4/2015 | Pan |
| 2015/0106221 A1 | 4/2015 | Tapley et al. |
| 2015/0121231 A1 | 4/2015 | Edwardson et al. |
| 2015/0131121 A1 | 5/2015 | Kang |
| 2015/0146925 A1 | 5/2015 | Son et al. |
| 2015/0149967 A1 | 5/2015 | Bernstein et al. |
| 2015/0163788 A1 | 6/2015 | Karunakaran |
| 2015/0189162 A1 | 7/2015 | Kuo et al. |
| 2015/0193130 A1 | 7/2015 | Cho et al. |
| 2015/0193138 A1 | 7/2015 | Relyea et al. |
| 2015/0194050 A1 | 7/2015 | Lee |
| 2015/0205511 A1 | 7/2015 | Vinna et al. |
| 2015/0242065 A1 | 8/2015 | Ko et al. |
| 2015/0243246 A1 | 8/2015 | Mun et al. |
| 2015/0248235 A1 | 9/2015 | Offenberg et al. |
| 2015/0261410 A1 | 9/2015 | Kumar et al. |
| 2015/0261493 A1 | 9/2015 | Lemmon et al. |
| 2015/0264202 A1 | 9/2015 | Pawlowski |
| 2015/0268928 A1 | 9/2015 | Park et al. |
| 2015/0287403 A1 | 10/2015 | Holzer Zaslansky et al. |
| 2015/0297185 A1 | 10/2015 | Mccormack et al. |
| 2015/0312617 A1 | 10/2015 | Chen et al. |
| 2015/0339261 A1 | 11/2015 | Jha et al. |
| 2015/0346834 A1 | 12/2015 | Fernandez et al. |
| 2015/0350029 A1 | 12/2015 | Skrobotov |
| 2015/0358043 A1 | 12/2015 | Jeong et al. |
| 2015/0373172 A1 | 12/2015 | Boesen |
| 2016/0005189 A1 | 1/2016 | Gray et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0034742 A1 | 2/2016 | Kim et al. |
| 2016/0043905 A1 | 2/2016 | Fiedler |
| 2016/0048287 A1 | 2/2016 | Lee et al. |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1 | 2/2016 | Jo et al. |
| 2016/0057363 A1 | 2/2016 | Posa |
| 2016/0061613 A1 | 3/2016 | Jung et al. |
| 2016/0062567 A1 | 3/2016 | Yang et al. |
| 2016/0062572 A1 | 3/2016 | Yang et al. |
| 2016/0062606 A1 | 3/2016 | Vega et al. |
| 2016/0062719 A1 | 3/2016 | Romano et al. |
| 2016/0063339 A1 | 3/2016 | Kwon et al. |
| 2016/0092053 A1 | 3/2016 | Loganathan et al. |
| 2016/0116941 A1 | 4/2016 | Kuwabara et al. |
| 2016/0134737 A1 | 5/2016 | Pulletikurty |
| 2016/0142497 A1 | 5/2016 | Ullrich |
| 2016/0142763 A1 | 5/2016 | Kim et al. |
| 2016/0156597 A1 | 6/2016 | Meng et al. |
| 2016/0156957 A1 | 6/2016 | Yun |
| 2016/0165037 A1 | 6/2016 | Youn et al. |
| 2016/0188181 A1 | 6/2016 | Smith |
| 2016/0191511 A1 | 6/2016 | Tijerina et al. |
| 2016/0195864 A1 | 7/2016 | Kim |
| 2016/0202866 A1 | 7/2016 | Zambetti |
| 2016/0209939 A1 | 7/2016 | Zambetti et al. |
| 2016/0210602 A1 | 7/2016 | Siddique et al. |
| 2016/0246566 A1 | 8/2016 | Fullerton et al. |
| 2016/0259489 A1 | 9/2016 | Yang |
| 2016/0260414 A1 | 9/2016 | Yang |

(56) References Cited

U.S. PATENT DOCUMENTS

| | | |
|---|---|---|
| 2016/0269176 A1 | 9/2016 | Pang et al. |
| 2016/0283194 A1 | 9/2016 | Patil et al. |
| 2016/0284125 A1 | 9/2016 | Bostick et al. |
| 2016/0301813 A1 | 10/2016 | Swire et al. |
| 2016/0313875 A1 | 10/2016 | Williams et al. |
| 2016/0316147 A1 | 10/2016 | Bernstein et al. |
| 2016/0321551 A1 | 11/2016 | Priness et al. |
| 2016/0327911 A1 | 11/2016 | Eim et al. |
| 2016/0337206 A1 | 11/2016 | Bugenhagen et al. |
| 2016/0345039 A1 | 11/2016 | Billmeyer |
| 2016/0350596 A1 | 12/2016 | Bataller et al. |
| 2016/0357507 A1 | 12/2016 | Decker et al. |
| 2016/0378277 A1 | 12/2016 | Cho |
| 2016/0378311 A1 | 12/2016 | Kim et al. |
| 2016/0379409 A1 | 12/2016 | Gavriliuc et al. |
| 2017/0006210 A1 | 1/2017 | Dye et al. |
| 2017/0011210 A1 | 1/2017 | Cheong et al. |
| 2017/0031648 A1 | 2/2017 | So et al. |
| 2017/0034253 A1 | 2/2017 | Jiang et al. |
| 2017/0039765 A1 | 2/2017 | Zhou et al. |
| 2017/0046025 A1 | 2/2017 | Dascola et al. |
| 2017/0052939 A1 | 2/2017 | Seol et al. |
| 2017/0053542 A1 | 2/2017 | Wilson et al. |
| 2017/0083188 A1 | 3/2017 | Yang et al. |
| 2017/0090693 A1 | 3/2017 | Ku et al. |
| 2017/0134553 A1 | 5/2017 | Jeon et al. |
| 2017/0134605 A1 | 5/2017 | Ju et al. |
| 2017/0134872 A1 | 5/2017 | Silva et al. |
| 2017/0149795 A1 | 5/2017 | Day, II |
| 2017/0156110 A1 | 6/2017 | Ueno et al. |
| 2017/0160098 A1 | 6/2017 | Mcgavran et al. |
| 2017/0160819 A1 | 6/2017 | Yi et al. |
| 2017/0180843 A1 | 6/2017 | Perianu et al. |
| 2017/0185373 A1 | 6/2017 | Kim et al. |
| 2017/0192743 A1 | 7/2017 | Chun et al. |
| 2017/0195772 A1 | 7/2017 | Han et al. |
| 2017/0205854 A1 | 7/2017 | Zenoff |
| 2017/0212590 A1 | 7/2017 | Vanblon et al. |
| 2017/0230236 A1 | 8/2017 | Kim et al. |
| 2017/0262154 A1 | 9/2017 | Black et al. |
| 2017/0308292 A1 | 10/2017 | Choi |
| 2017/0309073 A1 | 10/2017 | Sangiovanni et al. |
| 2017/0316611 A1 | 11/2017 | Sangiovanni et al. |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0336926 A1 | 11/2017 | Chaudhri et al. |
| 2017/0336960 A1 | 11/2017 | Chaudhri et al. |
| 2017/0352183 A1 | 12/2017 | Katz et al. |
| 2017/0357426 A1 | 12/2017 | Wilson et al. |
| 2017/0357477 A1 | 12/2017 | Im et al. |
| 2017/0365097 A1 | 12/2017 | Lim et al. |
| 2018/0013815 A1 | 1/2018 | Gold |
| 2018/0066956 A1 | 3/2018 | Kim et al. |
| 2018/0067622 A1 | 3/2018 | Chaudhri et al. |
| 2018/0067712 A1 | 3/2018 | Behzadi et al. |
| 2018/0069957 A1 | 3/2018 | Mushikabe et al. |
| 2018/0080774 A1 | 3/2018 | Sink et al. |
| 2018/0101987 A1 | 4/2018 | Grundhöfer et al. |
| 2018/0109936 A1 | 4/2018 | Ting et al. |
| 2018/0137266 A1 | 5/2018 | Kim et al. |
| 2018/0189554 A1 | 7/2018 | Sutton et al. |
| 2018/0197343 A1 | 7/2018 | Hare et al. |
| 2018/0199137 A1 | 7/2018 | Mate et al. |
| 2018/0218636 A1 | 8/2018 | Alaouf et al. |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0276882 A1 | 9/2018 | Harviainen et al. |
| 2018/0284892 A1 | 10/2018 | Kwon et al. |
| 2018/0288560 A1 | 10/2018 | Naik et al. |
| 2018/0302568 A1 | 10/2018 | Kim et al. |
| 2018/0307303 A1 | 10/2018 | Powderly et al. |
| 2018/0321842 A1 | 11/2018 | Lee et al. |
| 2018/0322076 A1 | 11/2018 | Prasad et al. |
| 2018/0322674 A1 | 11/2018 | Du |
| 2018/0328751 A1 | 11/2018 | Bejot et al. |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0341448 A1 | 11/2018 | Behzadi et al. |
| 2018/0349008 A1 | 12/2018 | Manzari et al. |
| 2018/0350144 A1 | 12/2018 | Rathod |
| 2018/0352435 A1 | 12/2018 | Donley et al. |
| 2019/0025999 A1 | 1/2019 | Murphy et al. |
| 2019/0028865 A1 | 1/2019 | Raleigh et al. |
| 2019/0037004 A1 | 1/2019 | Chaudhri et al. |
| 2019/0080498 A1 | 3/2019 | Horie et al. |
| 2019/0084670 A1 | 3/2019 | Sharma et al. |
| 2019/0107990 A1 | 4/2019 | Spivack et al. |
| 2019/0121300 A1 | 4/2019 | Peterson et al. |
| 2019/0121522 A1 | 4/2019 | Davis et al. |
| 2019/0129661 A1 | 5/2019 | Hirota et al. |
| 2019/0138696 A1 | 5/2019 | Carpenter et al. |
| 2019/0146422 A1 | 5/2019 | Meyer et al. |
| 2019/0166462 A1 | 5/2019 | Roberts |
| 2019/0179423 A1* | 6/2019 | Rose .................. G02B 27/0172 |
| 2019/0182749 A1 | 6/2019 | Breaux et al. |
| 2019/0187861 A1 | 6/2019 | Yang |
| 2019/0196600 A1 | 6/2019 | Rothberg et al. |
| 2019/0212155 A1 | 7/2019 | Gordon et al. |
| 2019/0213212 A1 | 7/2019 | Adato et al. |
| 2019/0238675 A1 | 8/2019 | Soni et al. |
| 2019/0265849 A1 | 8/2019 | Yang et al. |
| 2019/0281547 A1 | 9/2019 | Yoon et al. |
| 2019/0297439 A1 | 9/2019 | Maeda |
| 2019/0306607 A1 | 10/2019 | Clayton et al. |
| 2019/0324546 A1 | 10/2019 | Lee et al. |
| 2019/0339804 A1 | 11/2019 | Gleeson et al. |
| 2019/0340348 A1 | 11/2019 | Yu et al. |
| 2019/0347144 A1 | 11/2019 | Chen et al. |
| 2019/0347181 A1 | 11/2019 | Cranfill et al. |
| 2019/0349469 A1 | 11/2019 | Skogen et al. |
| 2019/0370094 A1 | 12/2019 | Louch et al. |
| 2019/0372862 A1 | 12/2019 | Carrigan et al. |
| 2020/0042087 A1 | 2/2020 | Ang et al. |
| 2020/0042088 A1 | 2/2020 | Ang et al. |
| 2020/0042089 A1 | 2/2020 | Ang et al. |
| 2020/0042094 A1 | 2/2020 | Ang et al. |
| 2020/0042145 A1 | 2/2020 | Williams et al. |
| 2020/0042311 A1 | 2/2020 | Shin |
| 2020/0050906 A1 | 2/2020 | Mathai |
| 2020/0051336 A1 | 2/2020 | Ichikawa et al. |
| 2020/0067245 A1 | 2/2020 | Maley |
| 2020/0106965 A1 | 4/2020 | Malia et al. |
| 2020/0159374 A1 | 5/2020 | Yang et al. |
| 2020/0174734 A1 | 6/2020 | Gomes et al. |
| 2020/0175975 A1 | 6/2020 | Kong et al. |
| 2020/0184478 A1 | 6/2020 | Peled et al. |
| 2020/0213437 A1 | 7/2020 | Bhatt |
| 2020/0228646 A1 | 7/2020 | Hotes et al. |
| 2020/0264764 A1 | 8/2020 | Seymour et al. |
| 2020/0267267 A1 | 8/2020 | Kim et al. |
| 2020/0285379 A1 | 9/2020 | George-Svahn |
| 2020/0302135 A1 | 9/2020 | Nirmala |
| 2020/0304917 A1 | 9/2020 | Ryu |
| 2020/0341610 A1 | 10/2020 | Quintana et al. |
| 2020/0342144 A1 | 10/2020 | Alameh et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2021/0027471 A1 | 1/2021 | Cohen et al. |
| 2021/0103338 A1 | 4/2021 | Ang et al. |
| 2021/0193187 A1 | 6/2021 | Phillips et al. |
| 2021/0208741 A1 | 7/2021 | Yang et al. |
| 2021/0216654 A1 | 7/2021 | Ko et al. |
| 2021/0227145 A1 | 7/2021 | Kasugai |
| 2021/0255750 A1 | 8/2021 | Al Majid et al. |
| 2021/0263702 A1 | 8/2021 | Carrigan |
| 2021/0263962 A1 | 8/2021 | Chang et al. |

(56) References Cited

U.S. PATENT DOCUMENTS

| | | |
|---|---|---|
| 2021/0272253 A1 | 9/2021 | Lin et al. |
| 2021/0279409 A1 | 9/2021 | Karunamuni et al. |
| 2021/0327156 A1 | 10/2021 | Bramwell et al. |
| 2021/0373718 A1 | 12/2021 | Yang et al. |
| 2021/0389868 A1 | 12/2021 | Crowder |
| 2021/0407507 A1 | 12/2021 | Zhou et al. |
| 2022/0043626 A1 | 2/2022 | Carrigan |
| 2022/0070385 A1 | 3/2022 | Van Os et al. |
| 2022/0078294 A1 | 3/2022 | Kim et al. |
| 2022/0083183 A1 | 3/2022 | Patton |
| 2022/0101719 A1 | 3/2022 | Bojic et al. |
| 2022/0138913 A1 | 5/2022 | Huang et al. |
| 2022/0179497 A1 | 6/2022 | Jung et al. |
| 2022/0179665 A1 | 6/2022 | Rathod |
| 2022/0240408 A1* | 7/2022 | Faulkner .............. H05K 7/1492 |
| 2022/0244782 A1 | 8/2022 | Robert et al. |
| 2022/0269887 A1 | 8/2022 | Chee et al. |
| 2022/0276780 A1 | 9/2022 | Ko et al. |
| 2022/0319493 A1 | 10/2022 | Ohishi et al. |
| 2022/0334683 A1 | 10/2022 | Paul et al. |
| 2022/0334693 A1 | 10/2022 | De Vries et al. |
| 2022/0337741 A1 | 10/2022 | Paul et al. |
| 2022/0374085 A1 | 11/2022 | Nguyen et al. |
| 2022/0377248 A1 | 11/2022 | Minifie et al. |
| 2022/0391603 A1 | 12/2022 | Pham et al. |
| 2023/0052490 A1 | 2/2023 | Chaudhri et al. |
| 2023/0082876 A1 | 3/2023 | Guzman et al. |
| 2023/0131489 A1 | 4/2023 | Marzorati et al. |
| 2023/0136913 A1 | 5/2023 | Zhao et al. |
| 2023/0179700 A1 | 6/2023 | Bhatt |
| 2023/0214089 A1 | 7/2023 | Yang et al. |
| 2023/0229279 A1 | 7/2023 | Paul et al. |
| 2023/0252737 A1 | 8/2023 | Dreyer et al. |
| 2023/0319224 A1 | 10/2023 | Manzari et al. |
| 2023/0335139 A1 | 10/2023 | Breton et al. |
| 2023/0353862 A1 | 11/2023 | et al. |
| 2023/0376193 A1 | 11/2023 | Han et al. |
| 2023/0376268 A1 | 11/2023 | Carrigan et al. |
| 2023/0379427 A1 | 11/2023 | Manzari et al. |
| 2023/0393865 A1 | 12/2023 | Fleizach et al. |
| 2024/0078375 A1 | 3/2024 | Karunamuni et al. |
| 2024/0256100 A1 | 8/2024 | Paul et al. |
| 2024/0310982 A1 | 9/2024 | Chaudhri et al. |
| 2024/0385691 A1 | 11/2024 | Nie et al. |
| 2024/0404217 A1 | 12/2024 | Depaola et al. |
| 2024/0406304 A1 | 12/2024 | Foss et al. |
| 2025/0047777 A1 | 2/2025 | Bhatt |
| 2025/0093947 A1 | 3/2025 | Bedard et al. |
| 2025/0094021 A1 | 3/2025 | Yang et al. |
| 2025/0113095 A1 | 4/2025 | Alonso et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |
| 2025/0341936 A1 | 11/2025 | Paul et al. |

FOREIGN PATENT DOCUMENTS

| | | |
|---|---|---|
| CN | 1705346 A | 12/2005 |
| CN | 101243383 A | 8/2008 |
| CN | 101427574 A | 5/2009 |
| CN | 101433034 A | 5/2009 |
| CN | 101609505 A | 12/2009 |
| CN | 202309894 U | 7/2012 |
| CN | 102830795 A | 12/2012 |
| CN | 102833345 A | 12/2012 |
| CN | 103415084 A | 11/2013 |
| CN | 103677618 A | 3/2014 |
| CN | 103778082 A | 5/2014 |
| CN | 103839023 A | 6/2014 |
| CN | 103914238 A | 7/2014 |
| CN | 103970208 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104956182 A | 9/2015 |
| CN | 105208511 A | 12/2015 |
| CN | 105388998 A | 3/2016 |
| CN | 105574378 A | 5/2016 |
| CN | 105654532 A | 6/2016 |
| CN | 105657465 A | 6/2016 |
| CN | 105959906 A | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107797657 A | 3/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 111860479 A | 10/2020 |
| CN | 109584879 B | 7/2021 |
| CN | 108958608 B | 7/2022 |
| EP | 0836074 A2 | 4/1998 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1953663 A1 | 8/2008 |
| EP | 2096413 A1 | 9/2009 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2629483 A1 | 8/2013 |
| EP | 2632131 A1 | 8/2013 |
| EP | 1614992 B1 | 10/2013 |
| EP | 2703972 A1 | 3/2014 |
| EP | 2720442 A1 | 4/2014 |
| EP | 1826724 B1 | 3/2015 |
| EP | 2892240 A1 | 7/2015 |
| EP | 2980715 A1 | 2/2016 |
| EP | 3001282 A1 | 3/2016 |
| EP | 3032537 A2 | 6/2016 |
| EP | 3057342 A1 | 8/2016 |
| EP | 3073703 A1 | 9/2016 |
| EP | 3276905 A1 | 1/2018 |
| EP | 3379853 A1 | 9/2018 |
| EP | 3833002 A1 | 6/2021 |
| EP | 3958101 A1 | 2/2022 |
| GB | 0412212 | 7/2004 |
| GB | 2402105 A | 12/2004 |
| JP | 11-183183 A | 7/1999 |
| JP | 2001-309455 A | 11/2001 |
| JP | 2009-502048 A | 1/2009 |
| JP | 2011-217000 A | 10/2011 |
| JP | 2013-146557 A | 10/2013 |
| JP | 2013-541107 A | 11/2013 |
| JP | 2014-53692 A | 3/2014 |
| JP | 2014-123169 A | 7/2014 |
| JP | 2014-128032 A | 7/2014 |
| JP | 2014-143575 A | 8/2014 |
| JP | 2015-61318 A | 3/2015 |
| JP | 2015-228009 A | 12/2015 |
| JP | 2016-13151 A | 1/2016 |
| JP | 2016-519377 A | 6/2016 |
| JP | 2017-34563 A | 2/2017 |
| JP | 2017-513143 A | 5/2017 |
| JP | 2017-143357 A | 8/2017 |
| JP | 2018-113544 A | 7/2018 |

(56) References Cited

FOREIGN PATENT DOCUMENTS

| JP | 2018-128955 A | 8/2018 |
|----|----|----|
| JP | 2018-147265 A | 9/2018 |
| JP | 2020-57204 A | 4/2020 |
| JP | 2022-73877 A | 5/2022 |
| KR | 10-2015-0135844 A | 12/2015 |
| KR | 10-2016-0000330 A | 1/2016 |
| KR | 10-2016-0019760 A | 2/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-20190022883 A | 3/2019 |
| KR | 10-2020-0127928 A | 11/2020 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2009/137419 A2 | 11/2009 |
| WO | 2009/140095 A2 | 11/2009 |
| WO | 2011/063516 A1 | 6/2011 |
| WO | 2012/172970 A1 | 12/2012 |
| WO | 2013/169849 A2 | 11/2013 |
| WO | 2013/169875 A2 | 11/2013 |
| WO | 2014/113987 A1 | 7/2014 |
| WO | 2014/159998 A1 | 10/2014 |
| WO | 2014/171734 A2 | 10/2014 |
| WO | 2015/061831 A1 | 5/2015 |
| WO | 2015/065402 A1 | 5/2015 |
| WO | 2015/105649 A1 | 7/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036541 A2 | 3/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2019/054999 A1 | 3/2019 |
| WO | 2019/173136 A1 | 9/2019 |
| WO | 2019/200350 A1 | 10/2019 |
| WO | 2019/217086 A2 | 11/2019 |
| WO | 2020/063762 A1 | 4/2020 |
| WO | 2024/186519 A1 | 9/2024 |

OTHER PUBLICATIONS

Non-Final Office Action received for U.S. Appl. No. 17/410,169, mailed on Sep. 10, 2024, 53 pages.
Notice of Allowance received for U.S. Appl. No. 18/122,625, mailed on Sep. 20, 2024, 5 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Extended European Search Report received for European Patent Application No. 24211972.5, mailed on Jan. 2, 2025, 7 pages.
Final Office Action received for U.S. Appl. No. 18/228,597, mailed on Jan. 8, 2025, 19 pages.
Non-Final Office Action received for U.S. Appl. No. 18/102,036, mailed on Dec. 20, 2024, 16 pages.
Applicant-Initiated Interview Summary received for U.S. Appl. No. 18/228,597, mailed on Jan. 29, 2025, 4 pages.

Casey, Jonathan, "Galaxy S21 Ultra Tips For Editing Photos and Videos", Online available at: https://www.youtube.com/watch?v=CuymTnn0ias, Feb. 12, 2021, 10 pages.
Non-Final Office Action received for U.S. Appl. No. 18/167,625, mailed on Feb. 12, 2025, 15 pages.
Notice of Allowance received for Chinese Patent Application No. 202311577936.6, mailed on Jan. 22, 2025, 4 pages (1 page of English Translation and 3 pages of Official Copy).
Advisory Action received for U.S. Appl. No. 18/197,681, mailed on Aug. 21, 2024, 5 pages.
Applicant-Initiated Interview Summary received for U.S. Appl. No. 18/088,309, mailed on Aug. 27, 2024, 2 pages.
International Preliminary Report on Patentability received for PCT Patent Application No. PCT/US2023/012260, mailed on Aug. 22, 2024, 15 pages.
3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages.
GT-I9500 (Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500UM_Open_Taiwan_Jellybean_Chi_Rev.1.1_130520.pdf., May 2013, 14 pages.
Notice of Allowance received for Taiwanese Patent Application No. 104107328, mailed on Jun. 12, 2017, 3 pages.
Notice of Allowance received for Taiwanese Patent Application No. 104128700, mailed on Mar. 27, 2017, 3 pages.
Notice of Allowance received for Taiwanese Patent Application No. 104133757, mailed on Jan. 18, 2017, 3 pages.
Nozawa Naoki et al., "iPad Perfect Manual for iOS 4", JPN, Sotec Ltd., Yanagisawa Junichi, Dec. 31, 2010, pp. 189-190.
Office Action received for Chinese Patent Application No. 201620119869.2, mailed on Nov. 22, 2016, 2 pages.
Supplemental Notice of Allowance received for U.S. Appl. No. 17/975,141, mailed on Aug. 12, 2024, 2 pages.
Extended European Search Report received for European Patent Application No. 24194531.0, mailed on Nov. 12, 2024, 8 pages.
Intention to Grant received for European Patent Application No. 22720880.8, mailed on Nov. 20, 2024, 11 pages.
International Search Report and Written Opinion received for PCT Patent Application No. PCT/US2024/023602, mailed on Nov. 26, 2024, 17 pages.
3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages. (Official Copy Only) {(See Communication Under Rule 37 CFR § 1.98(a) (3)}.
Advisory Action received for U.S. Appl. No. 14/863,099, mailed on Sep. 8, 2016, 3 pages.
Apple Previews Powerful Software Updates Designed for People With Disabilities, Available online at: https://www.apple.com/newsroom/2021/05/apple-previews-powerful-software-updates-designed-for-people-with-disabilities/, May 19, 2021, 10 pages.
Interview Summary received for U.S. Appl. No. 16/583,994, mailed on Apr. 3, 2020, 5 pages.
Interview Summary received for U.S. Appl. No. 16/984,862, mailed on Jan. 25, 2022, 4 pages.
Interview Summary received for U.S. Appl. No. 17/188,228, mailed on Jun. 14, 2022, 9 pages.
Interview Summary received for U.S. Appl. No. 17/746,807, mailed on Jun. 9, 2023, 2 pages.
Interview Summary received for U.S. Appl. No. 17/746,807, mailed on Mar. 31, 2023, 2 pages.
Interview Summary received for U.S. Appl. No. 16/140,211, mailed on Feb. 13, 2020, 3 pages.
Interview Summary received for U.S. Appl. No. 16/140,211, mailed on Sep. 3, 2020, 4 pages.
Interview Summary received for U.S. Appl. No. 16/140,268, mailed on Jun. 16, 2020, 5 pages.

(56)                References Cited

OTHER PUBLICATIONS

Interview Summary received for U.S. Appl. No. 16/140,286, mailed on Feb. 20, 2020, 5 pages.
Interview Summary received for U.S. Appl. No. 16/144,264, mailed on Jul. 22, 2020, 5 pages.
Interview Summary received for U.S. Appl. No. 16/147,523, mailed on Apr. 27, 2020, 3 pages.
Interview Summary received for U.S. Appl. No. 16/147,523, mailed on Dec. 10, 2021, 4 pages.
Interview Summary received for U.S. Appl. No. 16/147,523, mailed on Jun. 13, 2022, 4 pages.
Interview Summary received for U.S. Appl. No. 16/147,523, mailed on Oct. 26, 2020, 3 pages.
Interview Summary received for U.S. Appl. No. 16/147,523, mailed on Sep. 14, 2021, 3 pages.
Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583.981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/188,228, mailed on Sep. 23, 2022, 2 pages.
Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/410,169, mailed on Jan. 26, 2024, 5 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/484,714, mailed on Apr. 28, 2022, 2 pages.
Applicant-Initiated Interview Summary received for U.S. Appl. No. 17/484,714, mailed on Nov. 10, 2022, 2 pages.
Applicant-Initiated Interview Summary received for U.S. Appl. No. 17/484,856, mailed on Apr. 24, 2023, 4 pages.
Applicant-Initiated Interview Summary received for U.S. Appl. No. 17/484,856, mailed on Jul. 27, 2022, 7 pages.
Applicant-Initiated Interview Summary received for U.S. Appl. No. 17/484,856, mailed on Mar. 10, 2022, 3 pages.
Applicant-Initiated Interview Summary received for U.S. Appl. No. 17/484,856, mailed on Oct. 25, 2023, 5 pages.
Applicant-Initiated Interview Summary received for U.S. Appl. No. 17/509,356, mailed on Feb. 3, 2023, 3 pages.
Applicant-Initiated Interview Summary received for U.S. Appl. No. 17/746,807, mailed on Nov. 3, 2023, 2 pages.
Applicant-Initiated Interview Summary received for U.S. Appl. No. 17/975,141, mailed on Aug. 30, 2023, 4 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/122,625, mailed on Jan. 19, 2024, 2 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages. (Official Copy Only) {(See Communication Under Rule 37 CFR § 1.98(a) (3)}.
Baar Marius, "Fitbit Ace—Unboxing, Setup and 24-Hour Test", YouTube [online] [video], Retrieved from: <https://youtu.be/ekvkfqOyrls>.See especially 4:44., Oct. 24, 2018, 3 pages.
Brief Communication Regarding Oral Proceedings received for European Patent Application No. 16708003.5, mailed on May 8, 2023, 1 page.
Brief Communication Regarding Oral Proceedings received for European Patent Application No. 17184710.6, mailed on Feb. 19, 2020, 2 pages.
Brief Communication Regarding Oral Proceedings received for European Patent Application No. 17184710.6, mailed on Mar. 9, 2020, 2 pages.
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Chenzai, "Apple, please don't screw up notifications on the Apple Watch", Available online at: https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Corrected Notice of Allowance received for U.S. Appl. No. 14/641,251, mailed on Jun. 17, 2016, 2 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 16/140,268, mailed on Aug. 26, 2020, 2 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/484,714, mailed on Dec. 5, 2023, 3 pages.
Corrected Notice of Allowance received for U.S. Appl. No. 17/509,356, mailed on Jun. 13, 2023, 2 pages.
Corrected Notice of Allowance received for U.S. Appl. No. 17/509,356, mailed on May 24, 2023, 2 pages.
Corrected Notice of Allowance received for U.S. Appl. No. 17/547,065, mailed on May 1, 2023, 9 pages.
Decision on Appeal received for U.S. Appl. No. 14/774,664, mailed on Sep. 12, 2019, 8 pages.

(56) References Cited

OTHER PUBLICATIONS

Decision on Appeal received for U.S. Appl. No. 14/863,099, mailed on Aug. 22, 2019, 9 pages.
Decision on Appeal received for U.S. Appl. No. 16/140,211, mailed on Jul. 1, 2021, 8 pages.
Decision to Grant received for Danish Patent Application No. PA201570664, mailed on Feb. 20, 2017, 2 pages.
Decision to Grant received for Danish Patent Application No. PA201570788, mailed on Jul. 10, 2017, 2 pages.
To Grant received for Danish Patent Application No. PA201570791, mailed on Jun. 7, 2017, 2 pages.
To Grant received for Danish Patent Application No. PA202070609, mailed on May 3, 2021, 2 pages.
To Grant received for European Patent Application No. 15712218.5, mailed on Jun. 7, 2018, 2 pages.
Decision to Grant received for European Patent Application No. 15787091.6, mailed on Dec. 3, 2020, 2 pages.
Decision to Grant received for European Patent Application No. 16708003.5, mailed on Oct. 19, 2023, 2 pages.
Decision to Grant received for European Patent Application No. 19722280.5, mailed on Feb. 1, 2024, 2 pages.
Decision to Grant received for European Patent Application No. 20729346.5, mailed on Nov. 16, 2023, 2 pages.
Decision to Refuse received for European Patent Application No. 17184710.6, mailed on Jun. 16, 2020, 9 pages.
Decision to Refuse received for European Patent Application No. 20192404.0, mailed on Jun. 14, 2022, 15 pages.
Dharmasena Anusha, "iMessage-send as text message Option", YouTube, Available online at: https://www.youtube.com/watch?v=hXG-MdIW6FA>, Feb. 18, 2013, 1 page.
European Search Report received for European Patent Application No. 20192404.0, mailed on Nov. 20, 2020, 4 pages.
Ex-Parte Quayle Action received for U.S. Appl. No. 17/484,844, mailed on Sep. 8, 2022, 8 pages.
Examiner-Initiated Interview Summary received for U.S. Appl. No. 17/484,856, mailed on Sep. 6, 2023, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Examiner's Answer to Appeal Brief received for U.S. Appl. No. 16/140,211, mailed on Mar. 25, 2021, 21 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 14/774,664, mailed on Aug. 25, 2017, 23 pages.
Final Office Action received for U.S. Appl. No. 14/839,897, mailed on Jan. 10, 2018, 16 pages.
Final Office Action received for U.S. Appl. No. 14/863,099, mailed on Apr. 21, 2016, 20 pages.
Final Office Action received for U.S. Appl. No. 15/268,115, mailed on Oct. 11, 2017, 48 pages.
Final Office Action received for U.S. Appl. No. 16/140,211, mailed on May 26, 2020, 22 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/723,583, mailed on Feb. 5, 2021, 15 pages.

Final Office Action received for U.S. Appl. No. 17/041,350, mailed on Sep. 17, 2021, 25 pages.
Final Office Action received for U.S. Appl. No. 17/188,228, mailed on Jul. 6, 2022, 13 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/410,169, mailed on Feb. 23, 2024, 49 pages.
Final Office Action received for U.S. Appl. No. 17/484,714, mailed on May 23, 2022, 22 pages.
Final Office Action received for U.S. Appl. No. 17/484,856, mailed on Jun. 1, 2023, 31 pages.
Final Office Action received for U.S. Appl. No. 17/484,856, mailed on Mar. 30, 2022, 26 pages.
Final Office Action received for U.S. Appl. No. 17/484,856, mailed on Nov. 16, 2023, 29 pages.
Final Office Action received for U.S. Appl. No. 17/746,807, mailed on Apr. 26, 2023, 16 pages.
Final Office Action received for U.S. Appl. No. 17/746,807, mailed on Feb. 20, 2024, 24 pages.
Final Office Action received for U.S. Appl. No. 18/088,309, mailed on Jan. 9, 2024, 13 pages.
Final Office Action received for U.S. Appl. No. 14/839,903, mailed on Sep. 18, 2018, 11 pages.
Final Office Action received for U.S. Appl. No. 15/135,328 mailed on Nov. 9, 2018, 55 pages.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
GT-19500 (Galaxy S4) User Manual, Samsung, Rev.1.1, http://org.downloadcenter.samsung.com/downloadfile/ContentsFile.aspx?CDSite=UNI_TW &CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages. (Official Copy Only) {(See Communication Under Rule 37 CFR § 1.98(a) (3)}.
Han Sangwoo, "AR Glasses interaction prototype", Available Online at: https://sangwoohan.cargo.site/AR-Glasses-interaction-prototype, Oct. 2020, 4 pages.
Hobbyistsoftwareltd,"VLC Remote", Online available at: https://watchaware.com/watch-apps/297244048, 2016, 7 pages.
Intention to Grant received for Danish Patent Application No. PA201570773, mailed on Mar. 9, 2018, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA202070609, mailed on Jan. 14, 2021, 2 pages.
Intention to Grant received for European Patent Application No. 15712218.5, mailed on Jan. 24, 2018, 7 pages.
Intention to Grant received for European Patent Application No. 15753796.0, mailed on Jan. 12, 2024, 9 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 16708003.5, mailed on Jun. 14, 2023, 9 pages.
Intention to Grant received for European Patent Application No. 19722280.5, mailed on Sep. 26, 2023, 9 pages.
Intention to Grant received for European Patent Application No. 20729346.5, mailed on Jul. 10, 2023, 9 pages.

(56)                    References Cited

OTHER PUBLICATIONS

International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Preliminary Report on Patentability received for PCT Patent Application No. PCT/US2022/025096, mailed on Nov. 2, 2023, 14 pages.
International Search Report and Written Opinion received for PCT Application No. PCT/US2015/047507, mailed on Feb. 22, 2016, 22 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2016/016621, mailed on May 9, 2016, 12 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
International Search Report and Written Opinion received for PCT Patent Application No. PCT/US2022/025096, mailed on Sep. 26, 2022, 19 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/012260, mailed on Aug. 2, 2023, 22 pages.
International Search Report and Written Opinion received for PCT Patent Application No. PCT/US2023/014177, mailed on Sep. 1, 2023, 21 pages.
International Search Report and Written Opinion received for PCT Patent Application No. PCT/US2023/022410, mailed on Aug. 31, 2023, 21 pages.
Invitation to Pay Additional Fees and Partial International Search Report received for PCT Patent Application No. PCT/US2023/012260, mailed on Jun. 7, 2023, 11 pages.
Invitation to Pay Additional Fees and Partial International Search Report received for PCT Patent Application No. PCT/US2023/014177, mailed on Jul. 11, 2023, 13 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Additional Fees received for PCT Patent Application No. PCT/US2022/025096, mailed on Aug. 1, 2022, 11 pages.
Invitation to Pay Search Fees received for European Patent Application No. 15753796.0, mailed on Mar. 24, 2020, 3 pages.
Itjungles, "iPhone 6: How to Pair with Another Bluetooth Device", Available Online at: https://www.youtube.com/watch?v=9setanYtHAk, Aug. 5, 2015, 3 pages.
Jean, "Our Pact Parental Control Review", Available online at: https://www.bewebsmart.com/parental-controls/our-pact-parental-control-review/, Jun. 25, 2016, 25 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Minutes of the Oral Proceedings received for European Patent Application No. 20729346.5, mailed on Jul. 4, 2023, 6 pages.
My Mate Vince, "Setting up the Fitbit Alta HR Activity Tracker on Apple IOS", Online available at: <https://youtu.be/FdwRF4IfvFc>, Jun. 18, 2017, 3 pages.
Nikolov Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Non-Final Office Action received for U.S. Appl. No. 16/679,967, mailed on Sep. 2, 2021, 12 pages.
Non-Final Office Action received for U.S. Appl. No. 14/805,403, mailed on Nov. 16, 2017, 21 pages.
Non-Final Office Action received for U.S. Appl. No. 14/774,664, mailed on Mar. 7, 2017, 23 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul. 28, 2016, 12 pages.

(56) References Cited

OTHER PUBLICATIONS

Non-Final Office Action received for U.S. Appl. No. 14/863,099, mailed on Dec. 2, 2015, 12 pages.
Non-final Office Action received for U.S. Appl. No. 14/864,011, mailed on Jun. 10, 2016, 10 pages.
Non-Final Office Action received for U.S. Appl. No. 15/135,328 mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/433,238, mailed on Nov. 3, 2017, 6 pages.
Non-Final Office Action received for U.S. Appl. No. 16/140,211, mailed on Oct. 3, 2019, 15 pages.
Non-Final Office Action received for U.S. Appl. No. 16/140,268, mailed on Jan. 17, 2020, 15 pages.
Non-Final Office Action received for U.S. Appl. No. 16/140,286, mailed on Oct. 3, 2019, 14 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 16/897,551, mailed on Jun. 25, 2020, 12 pages.
Non-Final Office Action received for U.S. Appl. No. 16/984,862, mailed on Nov. 24, 2021, 15 pages.
Non-Final Office Action received for U.S. Appl. No. 17/041,350, mailed on Jun. 10, 2021, 24 pages.
Non-Final Office Action received for U.S. Appl. No. 17/142,134, mailed on Jul. 22, 2021, 11 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.
Non-Final Office Action received for U.S. Appl. No. 17/410,169, mailed on Dec. 5, 2023, 48 pages.
Non-Final Office Action received for U.S. Appl. No. 17/410,169, mailed on Sep. 16, 2022, 42 pages.
Non-Final Office Action received for U.S. Appl. No. 17/484,714, mailed on Dec. 1, 2021, 19 pages.
Non-Final Office Action received for U.S. Appl. No. 17/484,714, mailed on Mar. 30, 2023, 19 pages.
Non-Final Office Action received for U.S. Appl. No. 17/484,856, mailed on Dec. 8, 2021, 24 pages.
Non-Final Office Action received for U.S. Appl. No. 17/484,856, mailed on Feb. 22, 2023, 26 pages.

Non-Final Office Action received for U.S. Appl. No. 17/484,856, mailed on Sep. 21, 2023, 32 pages.
Non-Final Office Action received for U.S. Appl. No. 17/509,356, mailed on Dec. 22, 2022, 16 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/975,141, mailed on Jul. 6, 2023, 22 pages.
Non-Final Office Action received for U.S. Appl. No. 18/088,309, mailed on Sep. 21, 2023, 11 pages.
Non-Final Office Action received for U.S. Appl. No. 18/122,625, mailed on Nov. 15, 2023, 14 pages.
Non-Final Office Action received for U.S. Appl. No. 18/125,070, mailed on Sep. 14, 2023, 13 pages.
Non-Final Office Action received for U.S. Appl. No. 18/197,681, mailed on Jan. 30, 2024, 32 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2018247345, mailed on May 15, 2019, 3 pages.
Notice of Acceptance received for Australian Patent Application No. 2020239670, mailed on Jul. 2, 2021, 3 pages.
Notice of Acceptance received for Australian Patent Application No. 2020285524, mailed on Dec. 17, 2021, 3 pages.
Notice of Acceptance received for Australian Patent Application No. 2021250863, mailed on Jan. 13, 2023, 3 pages.
Notice of Acceptance received for Australian Patent Application No. 202201369, mailed on Mar. 17, 2022, 3 pages.
Notice of Acceptance received for Australian Patent Application No. 2022204555, mailed on May 11, 2023, 3 pages.
Notice of Acceptance received for Australian Patent Application No. 2022261717, mailed on Dec. 20, 2023, 4 pages.
Notice of Acceptance received for Australian Patent Application No. 2023201920, mailed on Feb. 9, 2024, 3 pages.
Notice of Allowance received for Chinese Patent Application No. 201580046237.6, mailed on Aug. 29, 2018, 4 pages (1 page of English Translation and 3 pages of Official Copy).
Notice of Allowance received for Chinese Patent Application No. 201580077218.X, mailed on Nov. 13, 2020, 2 pages (1 page of English Translation and 1 page of Official Copy).
Notice of Allowance received for Chinese Patent Application No. 201610084974.1, mailed on Aug. 5, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201810321928.8, mailed on Sep. 11, 2019, 2 pages (1 page of English Translation and 1 page of Official Copy).
Notice of Allowance received for Chinese Patent Application No. 201910990432.4, mailed on Apr. 27, 2021, 2 pages (1 page of English Translation and 1 page of Official Copy).
Notice of Allowance received for Chinese Patent Application No. 201980036737.X, mailed on Apr. 20, 2021, 10 pages (5 pages of English Translation and 5 pages of Official Copy).
Notice of Allowance received for Chinese Patent Application No. 202080039642.6, mailed on Apr. 17, 2023, 6 pages (2 pages of English Translation and 4 pages of Official Copy).
Notice of Allowance received for Chinese Patent Application No. 202110011509.6, mailed on Mar. 2, 2022, 2 pages (1 page of English Translation and 1 page of Official Copy).
Notice of Allowance received for Chinese Patent Application No. 202111612841.4, mailed on Jan. 5, 2023, 3 pages (2 pages of English Translation & 1 page of Official Copy).
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.

(56) References Cited

OTHER PUBLICATIONS

Notice of Allowance received for Japanese Patent Application No. 2017-545733, mailed on Jun. 1, 2018, 4 pages (1 page of English Translation and 3 pages of Official Copy).

Notice of Allowance received for Japanese Patent Application No. 2018-126311, mailed on Feb. 1, 2019, 4 pages (1 page of English Translation and 3 pages of Official Copy).

Notice of Allowance received for Japanese Patent Application No. 2020-551465, mailed on Jun. 28, 2021, 4 pages (1 page of English Translation and 3 pages of Official Copy).

Notice of Allowance received for Japanese Patent Application No. 2021-122610, mailed on Aug. 5, 2022, 4 pages (1 page of English Translation and 3 pages of Official Copy).

Notice of Allowance received for Japanese Patent Application No. 2021-571464, mailed on May 30, 2022, 4 pages (1 page of English Translation and 3 pages of Official Copy).

Notice of Allowance received for Japanese Patent Application No. 2022-102840, mailed on Aug. 19, 2022, 4 pages (1 page of English Translation and 3 pages of Official Copy).

Notice of Allowance received for Japanese Patent Application No. 2022-139320, mailed on Jan. 6, 2023, 4 pages (1 page of English Translation and 3 pages of Official Copy).

Notice of Allowance received for Korean Patent Application No. 10-2020-7028759, mailed on Oct. 19, 2021, 4 pages (1 page of English Translation and 3 pages of Official Copy).

Notice of Allowance received for Korean Patent Application No. 10-2021-7039234, mailed on Dec. 20, 2021, 4 pages (1 page of English Translation and 3 pages of Official Copy).

Notice of Allowance received for Korean Patent Application No. 10-2022-7001721, mailed on Feb. 28, 2022, 5 pages (1 page of English Translation and 4 pages of Official Copy).

Notice of Allowance received for Korean Patent Application No. 10-2022-7008567, mailed on Jul. 4, 2022, 9 pages (2 pages of English Translation and 7 pages of Official Copy).

Notice of Allowance received for Korean Patent Application No. 10-2023-7033711, mailed on Nov. 29, 2023, 9 pages (2 pages of English Translation and 7 pages of Official Copy).

Notice of Allowance received for Taiwanese Patent Application No. 104107328, mailed on Jun. 12, 2017, 3 pages (Official Copy Only) {(See Communication Under Rule 37 CFR § 1.98(a) (3)}.

Notice of Allowance received for Taiwanese Patent Application No. 104123593, mailed on Oct. 1, 2018, 4 pages (1 pages of English Translation and 3 pages Official Copy).

Notice of Allowance received for Taiwanese Patent Application No. 104128700, mailed on Mar. 27, 2017, 3 pages (Official Copy only) {(See Communication Under Rule 37 CFR § 1.98(a) (3)}.

Notice of Allowance received for Taiwanese Patent Application No. 104133756, mailed on Nov. 30, 2017, 5 pages (2 pages of English Translation and 3 pages of Official Copy).

Notice of Allowance received for Taiwanese Patent Application No. 104133757, mailed on Jan. 18, 2017, 3 pages (Official Copy only) {(See Communication Under Rule 37 CFR § 1.98(a) (3)}.

Notice of Allowance received for U.S. Appl. No. 14/641,251, mailed on May 18, 2016, 13 pages.

Notice of Allowance received for U.S. Appl. No. 14/805,403, mailed on Jul. 11, 2018, 15 pages.

Notice of Allowance received for U.S. Appl. No. 14/839,897, mailed on Jun. 8, 2018, 11 pages.

Notice of Allowance received for U.S. Appl. No. 14/839,903, mailed on Jan. 3, 2019, 7 pages.

Notice of Allowance received for U.S. Appl. No. 14/839,913, mailed on Aug. 11, 2016, 5 pages.

Notice of Allowance received for U.S. Appl. No. 14/864,011, mailed on Apr. 28, 2016, 5 pages.

Notice of Allowance received for U.S. Appl. No. 14/864,011, mailed on Oct. 5, 2016, 5 pages.

Notice of Allowance received for U.S. Appl. No. 15/135,328, mailed on Jul. 1, 2019, 25 pages.

Notice of Allowance received for U.S. Appl. No. 15/268,115, mailed on Mar. 7, 2018, 15 pages.

Notice of Allowance received for U.S. Appl. No. 15/366,607, mailed on Apr. 2, 2019, 2 pages.

Notice of Allowance received for U.S. Appl. No. 15/366,607, mailed on Feb. 21, 2019, 9 pages.

Notice of Allowance received for U.S. Appl. No. 15/433,238, mailed on May 17, 2018, 7 pages.

Notice of Allowance received for U.S. Appl. No. 15/975,581, mailed on Oct. 3, 2018, 25 pages.

Notice of Allowance received for U.S. Appl. No. 16/140,211, mailed on Sep. 10, 2021, 10 pages.

Notice of Allowance received for U.S. Appl. No. 16/140,268, mailed on Jul. 15, 2020, 10 pages.

Notice of Allowance received for U.S. Appl. No. 16/140,286, mailed on Mar. 12, 2020, 5 pages.

Notice of Allowance received for U.S. Appl. No. 16/144,264, mailed on Nov. 16, 2020, 10 pages.

Notice of Allowance received for U.S. Appl. No. 16/147,523, mailed on Aug. 4, 2022, 9 pages.

Notice of Allowance received for U.S. Appl. No. 16/147,523, mailed on Nov. 28, 2022, 8 pages.

Notice of Allowance received for U.S. Appl. No. 16/147,523, mailed on Oct. 4, 2022, 8 pages.

Notice of Allowance received for U.S. Appl. No. 16/281,838, mailed on Aug. 26, 2020, 9 pages.

Notice of Allowance received for U.S. Appl. No. 16/281,838, mailed on May 20, 2021, 9 pages.

Notice of Allowance received for U.S. Appl. No. 16/407,584, mailed on Oct. 28, 2019, 5 pages.

Notice of Allowance received for U.S. Appl. No. 16/583,981, mailed on Mar. 26, 2021, 10 pages.

Notice of Allowance received for U.S. Appl. No. 16/583,994, mailed on Jun. 24, 2021, 10 pages.

Notice of Allowance received for U.S. Appl. No. 16/653,857, mailed on Feb. 16, 2022, 34 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 16/749,929, mailed on Dec. 16, 2020, 2 pages.

Notice of Allowance received for U.S. Appl. No. 16/749,929, mailed on Nov. 4, 2020, 5 pages.

Notice of Allowance received for U.S. Appl. No. 16/867,002, mailed on Aug. 20, 2021, 12 pages.

Notice of Allowance received for U.S. Appl. No. 16/867,002, mailed on Mar. 1, 2022, 7 pages.

Notice of Allowance received for U.S. Appl. No. 16/897,551, mailed on Oct. 16, 2020, 5 pages.

Notice of Allowance received for U.S. Appl. No. 16/984,862, mailed on Apr. 18, 2022, 9 pages.

Notice of Allowance received for U.S. Appl. No. 17/026,855, mailed on Apr. 23, 2021, 10 pages.

Notice of Allowance received for U.S. Appl. No. 17/041,350, mailed on Feb. 24, 2022, 6 pages.

Notice of Allowance received for U.S. Appl. No. 17/088,265, mailed on Jun. 11, 2021, 10 pages.

Notice of Allowance received for U.S. Appl. No. 17/142,134, mailed on Jan. 4, 2022, 5 pages.

Notice of Allowance received for U.S. Appl. No. 17/188,228, mailed on Feb. 1, 2023, 5 pages.

Notice of Allowance received for U.S. Appl. No. 17/188,228, mailed on Oct. 19, 2022, 6 pages.

Notice of Allowance received for U.S. Appl. No. 17/484,714, mailed on May 30, 2023, 6 pages.

Notice of Allowance received for U.S. Appl. No. 17/484,714, mailed on Oct. 31, 2023, 7 pages.

Notice of Allowance received for U.S. Appl. No. 17/484,844, mailed on Jan. 17, 2023, 10 pages.

Notice of Allowance received for U.S. Appl. No. 17/509,356, mailed on Apr. 7, 2023, 11 pages.

Notice of Allowance received for U.S. Appl. No. 17/547,065, mailed on Feb. 16, 2023, 16 pages.

(56)    References Cited

OTHER PUBLICATIONS

Notice of Allowance received for U.S. Patent Application No. 17/975, 141, mailed on Dec. 7, 2023, 10 pages.
Notice of Allowance received for U.S. Appl. No. 18/125,070, mailed on Feb. 6, 2024, 7 pages.
Nozawa Naoki et al., "iPad Perfect Manual for iOS 4", JPN, Sotec Ltd., Yanagisawa Junichi, Dec. 31, 2010, pp. 189-190 (Official Copy Only) {(See Communication Under Rule 37 CFR § 1.98(a) (3)}.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2018247345, mailed on May 6, 2019, 2 pages.
Office Action received for Australian Patent Application No. 2020239670, mailed on Mar. 3, 2021, 4 pages.
Office Action received for Australian Patent Application No. 2021250863, mailed on Oct. 6, 2022, 6 pages.
Office Action received for Australian Patent Application No. 2022204555, mailed on Feb. 17, 2023, 5 pages.
Office Action received for Australian Patent Application No. 2022261717, mailed on Nov. 6, 2023, 3 pages.
Office Action received for Australian Patent Application No. 2023201920, mailed on Nov. 10, 2023, 2 pages.
Office Action received for Chinese Patent Application No. 201580046237.6, mailed on Feb. 6, 2018, 10 pages (5 pages of English Translation and 5 pages of Official Copy).
Office Action received for Chinese Patent Application No. 201580077218.X, mailed on Feb. 3, 2020, 23 pages (8 pages of English Translation and 15 pages of Official Copy).
Office Action received for Chinese Patent Application No. 201610084974.1, mailed on Dec. 5, 2018, 6 pages (3 pages of English Translation and 3 pages of Official Copy).
Office Action received for Chinese Patent Application No. 201610084974.1, mailed on May 3, 2018, 12 pages (5 pages of English Translation and 7 pages of Official Copy).
Office Action received for Chinese Patent Application No. 201620119869.2, mailed on Jun. 3, 2016, 2 pages (1 page of English Translation and 1 page of Official Copy).
Office Action received for Chinese Patent Application No. 201620119869.2, mailed on Nov. 22, 2016, 2 pages (Official Copy only) {(See Communication Under Rule 37 CFR § 1.98(a) (3)}.
Office Action received for Chinese Patent Application No. 201710657424.9, mailed on Sep. 17, 2019, 23 pages (11 pages of English Translation and 12 pages of Official Copy).
Office Action received for Chinese Patent Application No. 201810321928.8, mailed on Jul. 2, 2019, 10 pages (5 pages of English Translation and 5 pages of Official Copy).
Office Action received for Chinese Patent Application No. 201910990432.4, mailed on Dec. 28, 2020, 6 pages (3 pages of English Translation and 3 pages of Official Copy).
Office Action received for Chinese Patent Application No. 201910990432.4, mailed on May 18, 2020, 15 pages (9 pages of English Translation and 6 pages of Official Copy).
Office Action received for Chinese Patent Application No. 202080039642.6, mailed on Sep. 5, 2022, 12 pages (6 pages of English Translation and 6 pages of Official Copy).
Office Action received for Chinese Patent Application No. 202110011509.6, mailed on Oct. 11, 2021, 10 pages (5 pages of English Translation and 5 pages of Official Copy).
Office Action received for Chinese Patent Application No. 202111612841.4, mailed on Jul. 22, 2022, 13 pages (7 pages of English Translation and 6 pages of Official Copy).
Office Action received for Chinese Patent Application No. 202211558100.7, mailed on Jan. 8, 2024, 12 pages (6 pages of English Translation and 6 pages of Official Copy).

Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for European Patent Application No. 15712218.5, mailed on Aug. 3, 2017, 4 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 19722280.5, mailed on Oct. 4, 2021, 7 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Apr. 11, 2023, 8 pages.
Office Action received for European Patent Application No. 20720310.0, mailed on Jul. 25, 2023, 11 pages.
Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.

(56) References Cited

OTHER PUBLICATIONS

Office Action received for European Patent Application No. 20746429.8, mailed on Sep. 20, 2023, 10 pages.

Office Action received for Indian Patent Application No. 202017041557, mailed on Dec. 8, 2021, 8 pages.

Office Action received for Japanese Patent Application No. 2018-126311, mailed on Nov. 2, 2018, 4 pages (2 pages of English Translation and 2 pages of official Copy).

Office Action received for Japanese Patent Application No. 2017-545733, mailed on Feb. 13, 2018, 7 pages (3 pages of English Translation and 4 pages of Official Copy).

Office Action received for Japanese Patent Application No. 2022-149476, mailed on Nov. 2, 2023, 9 pages (4 pages of English Translation and 5 pages of Official Copy).

Office Action received for Korean Patent Application No. 10-2020-7028759, mailed on Jun. 29, 2021, 12 pages (5 pages of English Translation and 7 pages of Official Copy).

Office Action received for Korean Patent Application No. 10-2022-7008567, mailed on Mar. 28, 2022, 5 pages (2 pages of English Translation and 3 pages of Official Copy).

Office Action received for Taiwanese Patent Application No. 104123593, mailed on May 24, 2016, 57 pages (26 pages of English Translation and 31 pages of Official Copy).

Office Action received for Taiwanese Patent Application No. 104123593, mailed on Sep. 13, 2016, 8 pages (3 pages of English Translation and 5 pages of Official Copy).

Office Action received for Taiwanese Patent Application No. 104128700, mailed on Aug. 31, 2016, 13 pages (6 pages of English Translation and 7 pages of Official Copy).

Office Action received for Taiwanese Patent Application No. 104133756, issued on May 17, 2017, 13 pages (6 pages of English Translation and 7 pages of Official Copy).

Office Action received for Taiwanese Patent Application No. 104133757, issued on Jul. 6, 2016, 22 pages (9 pages of English Translation and 13 pages of Official Copy).

Office Action received for Taiwanese Patent Application No. 104107328, mailed on Dec. 28, 2016, 4 pages (1 page of English Translation and 3 pages of Official Copy).

Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.

Pairing Your Apple Watch With Your AppleTV, Available online at: https://www.youtube.com/watch?v=C418YFSJ-UY, Apr. 27, 2015, 3 pages.

PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.

Remote Shot for SmartWatch 2, Available online at: https://play.google.com/store/apps/details?id=net.watea.sw2.rshot&hl=en, Nov. 21, 2017, 3 pages.

Result of Consultation received for European Patent Application No. 16708003.5, mailed on Apr. 18, 2023, 9 pages.

Result of Consultation received for European Patent Application No. 17184710.6, mailed on Feb. 21, 2020, 6 pages.

Result of Consultation received for European Patent Application No. 17184710.6, mailed on Feb. 28, 2020, 3 pages.

Result of Consultation received for European Patent Application No. 20729346.5, mailed on Jun. 21, 2023, 3 pages.

Search Report and Opinion received for Danish Patent Application No. PA201970533, mailed on Oct. 25, 2019, 9 pages.

Search Report and Opinion received for Danish Patent Application No. PA202070610, mailed on Jan. 8, 2021, 9 pages.

Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.

Stone Zeda, "Could AR Be the Unlikely Savior of Print?", Online available at: https://adage.com/article/digitalnext/ar-savior-print/308923, May 11, 2017, 4 pages.

Summons to Attend Oral Proceedings received for European Patent Application No. 16708003.5, mailed on Dec. 13, 2022, 11 pages.

Summons to Attend Oral Proceedings received for European Patent Application No. 17184710.6, mailed on Sep. 17, 2019, 7 pages.

Summons to Attend Oral Proceedings received for European Patent Application No. 20192404.0, mailed on Feb. 2, 2022, 11 pages.

Summons to Attend Oral Proceedings received for European Patent Application No. 20720310.0, mailed on Jan. 3, 2024, 12 pages.

Summons to Attend Oral Proceedings received for European Patent Application No. 20729346.5, mailed on Jan. 23, 2023, 11 pages.

Summons to Attend Oral Proceedings received for European Patent Application No. 17184710.6, mailed on May 10, 2023, 3 pages.

Supplemental Notice of Allowance received for U.S. Appl. No. 14/805,403, mailed on Oct. 4, 2018, 3 pages.

Supplemental Notice of Allowance received for U.S. Appl. No. 15/433,238, mailed on Jun. 20, 2018, 2 pages.

Supplemental Notice of Allowance received for U.S. Appl. No. 16/147,523, mailed on Aug. 23, 2022, 2 pages.

Supplemental Notice of Allowance received for U.S. Appl. No. 16/867,002, mailed on Mar. 16, 2022, 2 pages.

Supplemental Notice of Allowance received for U.S. Appl. No. 16/867,002, mailed on Sep. 9, 2021, 2 pages.

Supplemental Notice of Allowance received for U.S. Appl. No. 17/142,134, mailed on Jan. 12, 2022, 2 pages.

Supplemental Notice of Allowance received for U.S. Appl. No. 17/975,141, mailed on Feb. 26, 2024, 2 pages.

Techsmith, "Snagit ® 11 Snagit 11.4 Help", available at <http://assets.techsmith.com/Downloads/ua-tutorials-snagit-11/Snagit_11.pdf>, Jan. 2014, 146 pages.

Text of 2nd CD Mixed and Augmented Reality (MAR) Reference Model, International Organisation for Standardisation Organisation Internationale De Normalisation, ISO/IEC JTC 1/SC 29/WG 11, Coding of Moving Pictures and Audio, Feb. 2016, 67 pages.

Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.

Wearablezone, "How To Set Up Your Fitbit Profile", Online available at: <https://youtu.be/jsWPtcDWiJM>, Jun. 6, 2016, 3 pages.

Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.

Xdream, "TickTalk Video User Manual", YouTube [online] [video], Online available at: <https://youtu.be/jYhq3DwmVzo>, Mar. 17, 2017, 3 pages.

Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.

Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.

Decision to Grant received for European Patent Application No. 15753796.0, mailed on Sep. 26, 2024, 3 pages.

Intention to Grant received for European Patent Application No. 20720310.0, mailed on Oct. 7, 2024, 13 pages.

Intention to Grant received for European Patent Application No. 22720880.8, mailed on Sep. 30, 2024, 10 pages.

Non-Final Office Action received for U.S. Appl. No. 18/102,036, mailed on Sep. 29, 2024, 16 pages.

Applicant-Initiated Interview Summary received for U.S. Appl. No. 17/410,169, mailed on May 8, 2024, 6 pages.

Applicant-Initiated Interview Summary received for U.S. Appl. No. 17/746,807, mailed on May 21, 2024, 2 pages.

Applicant-Initiated Interview Summary received for U.S. Appl. No. 18/088,309, mailed on Jun. 7, 2024, 2 pages.

(56)                References Cited

OTHER PUBLICATIONS

Applicant-Initiated Interview Summary received for U.S. Appl. No. 18/122,625, mailed on May 22, 2024, 2 pages.
Aprio Editorial Department, "[Line] Useful ways to use the OCR feature, and how to easily copy and translate text within images", Available online at: <https://appllio.com/line-how-to-use-ocr>, May 15, 2019, 14 pages(Official Copy Only). {See Communication Under Rule 37 CFR § 1.98(a)(3)}.
Notice of Allowance received for U.S. Appl. No. 18/125,070, mailed on Apr. 29, 2024, 2 pages.
Final Office Action received for U.S. Appl. No. 18/197,681, mailed on Jun. 27, 2024, 30 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Minutes of the Oral Proceedings received for European Patent Application No. 17184710.6, mailed on May 22, 2024, 4 pages.
Minutes of the Oral Proceedings received for European Patent Application No. 20720310.0, mailed on Jun. 7, 2024, 7 pages.
Non-Final Office Action received for U.S. Appl. No. 18/228,597, mailed on Jul. 8, 2024, 17 pages.
Notice of Allowance received for Japanese Patent Application No. 2023-560220, mailed on Mar. 1, 2024, 4 pages (1 page of English Translation and 3 pages of Official Copy).
Notice of Allowance received for U.S. Appl. No. 17/746,807, mailed on Jul. 3, 2024, 23 pages.
Notice of Allowance received for U.S. Appl. No. 17/975,141, mailed on Apr. 29, 2024, 9 pages.
Notice of Allowance received for U.S. Appl. No. 18/122,625, mailed on Jun. 21, 2024, 7 pages.
Office Action receieved for Australian Patent Application No. 2023204647, mailed on Jul. 5, 2024, 3 pages.
Office Action receieved for Chinese Patent Application No. 202080039832.8, mailed on Mar. 23, 2024, 22 pages (12 pages of English Translation and 10 pages of Official Copy).
Office Action receieved for Chinese Patent Application No. 202311577936.6, mailed on May 23, 2024, 20 pages (10 pages of English Translation and 10 pages of Official Copy).
Office Action receieved for Indian Patent Application No. 202218027229, mailed on Jun. 13, 2024, 8 pages.
Office Action receieved for Japanese Patent Application No. 2022-149476, mailed on Apr. 22, 2024, 8 pages (4 pages of English Translation and 4 pages of Official Copy).
Result of Consultation received for European Patent Application No. 20720310.0, mailed on Jun. 4, 2024, 3 pages.
Smahoto.jp, "An application for capturing unreadable characters in books and signboards with a camera!", Available Online at: <https://www.kitamura.jp/smahoto/photolife/app/items/205.html>, Oct. 15, 2015, 8 pages(Official Copy Only). {See Communication Under Rule 37 CFR § 1.98(a)(3)}.
Takafumi, Yamazoe, "Development of character recognition technology that acheives highly accurate recognition", Technology Reports, NTT Docomo Technical Journal vol. 20 No. 1, Telecommunications Association, Apr. 1, 2012, pp. 40-43 (Official Copy Only). {See Communication Under Rule 37 CFR § 1.98(a)(3)}.
Applicant-Initiated Interview Summary received for U.S. Appl. No. 17/410,169, mailed on Nov. 6, 2024, 5 pages.
Applicant-Initiated Interview Summary received for U.S. Appl. No. 18/102,036, mailed on Nov. 8, 2024, 4 pages.
Corrected Notice of Allowance received for U.S. Appl. No. 17/484,856, mailed on Nov. 6, 2024, 2 pages.
Invitation to Pay Additional Fees and Partial International Search Report received for PCT Patent Application No. PCT/US2024/023602, mailed on Aug. 26, 2024, 11 pages.
Notice of Acceptance received for Australian Patent Application No. 2023204647, mailed on Oct. 28, 2024, 3 pages.
Notice of Allowance received for U.S. Appl. No. 17/484,856, mailed on Oct. 30, 2024, 9 pages.

Notice of Allowance received for U.S. Appl. No. 17/746,807, mailed on Nov. 14, 2024, 6 pages.
Decision to Grant received for European Patent Application No. 20720310.0, mailed on Dec. 5, 2024, 2 pages.
Final Office Action received for U.S. Appl. No. 17/410,169, mailed on Dec. 3, 2024, 56 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/031391, mailed on Sep. 24, 2024, 12 pages.
Notice of Allowance received for Korean Patent Application No. 10-2022-7032414, mailed on Nov. 27, 2024, 7 pages (2 pages of English Translation and 5 pages of Official Copy).
Office Action received for Australian Patent Application No. 2024201515, mailed on Dec. 11, 2024, 3 pages.
Office Action received for Chinese Patent Application No. 202310794146.7, mailed on Nov. 13, 2024, 17 pages (11 pages of English Translation and 6 pages of Official Copy).
amazon.com, "Visual ID on Echo Show", Online Available at: <https://www.amazon.com/b?ie=UTF8&node=23615589011>, retrieved on Aug. 16, 2023, 3 pages.
Applicant-Initiated Interview Summary received for U.S. Appl. No. 18/197,681, mailed on Mar. 18, 2024, 4 pages.
Communication for Board of Appeal received for European Patent Application No. 17184710.6, mailed on Feb. 29, 2024, 13 pages.
Advisory Action received for U.S. Appl. No. 18/228,597, mailed on Jul. 7, 2025, 3 pages.
Applicant-Initiated Interview Summary received for U.S. Appl. No. 18/102,036, mailed on Jun. 27, 2025, 3 pages.
Applicant-Initiated Interview Summary received for U.S. Appl. No. 18/167,625, mailed on May 2, 2025, 3 pages.
Applicant-Initiated Interview Summary received for U.S. Appl. No. 18/197,681, mailed on Apr. 21, 2025, 4 pages.
Applicant-Initiated Interview Summary received for U.S. Appl. No. 18/228,597, mailed on Apr. 1, 2025, 5 pages.
Applicant-Initiated Interview Summary received for U.S. Appl. No. 18/228,597, mailed on Jun. 23, 2025, 4 pages.
Corrected Notice of Allowance received for U.S. Appl. No. 18/611,216, mailed on Jun. 24, 2025, 2 pages.
Decision to Grant received for European Patent Application No. 22720880.8, mailed on Mar. 27, 2025, 4 pages.
Final Office Action received for U.S. Appl. No. 18/102,036, mailed on Apr. 21, 2025, 19 pages.
Final Office Action received for U.S. Appl. No. 18/167,625, mailed on Jun. 13, 2025, 16 pages.
Final Office Action received for U.S. Appl. No. 18/228,597, mailed on May 9, 2025, 22 pages.
Intention to Grant received for European Patent Application No. 24211972.5, mailed on Apr. 10, 2025, 9 pages.
Intention to Grant received for European Patent Application No. 24211972.5, mailed on Jun. 16, 2025, 9 pages.
International Search Report and Written Opinion received for PCT Patent Application No. PCT/US2024/043090, mailed on Jan. 28, 2025, 21 pages.
Invitation to Pay Additional Fees and Partial International Search Report received for PCT Patent Application No. PCT/US2024/043090, mailed on Dec. 4, 2024, 12 pages.
Non-Final Office Action received for U.S. Appl. No. 18/197,681, mailed on Apr. 3, 2025, 30 pages.
Notice of Allowance received for Japanese Patent Application No. 2024-049961, mailed on Apr. 7, 2025, 4 pages (1 page of English Translation and 3 pages of Official Copy).
Notice of Allowance received for U.S. Appl. No. 18/197,681, mailed on May 20, 2025, 18 pages.
Notice of Allowance received for U.S. Appl. No. 18/611,216, mailed on May 12, 2025, 8 pages.
Office Action received for Australian Patent Application No. 2024201515, mailed on May 28, 2025, 3 pages.
Office Action received for Chinese Patent Application No. 202110481400.9, mailed on Apr. 23, 2025, 24 pages (14 pages of English Translation and 10 pages of Official Copy).

(56) References Cited

OTHER PUBLICATIONS

Office Action received for Chinese Patent Application No. 202310794146.7, mailed on Apr. 10, 2025, 11 pages (6 pages of English Translation and 5 pages of Official Copy).

Applicant-Initiated Interview Summary received for U.S. Appl. No. 18/102,036, mailed on Mar. 10, 2025, 3 pages.

Corrected Notice of Allowance received for U.S. Appl. No. 17/746,807, mailed on Feb. 26, 2025, 3 pages.

Non-Final Office Action received for U.S. Appl. No. 18/228,597, mailed on Mar. 6, 2025, 20 pages.

Office Action received for Japanese Patent Application No. 2024-049961, mailed on Feb. 28, 2025, 8 pages (4 pages of English Translation and 4 pages of Official Copy).

Extended European Search Report received for European Patent Application No. 25164608.9, mailed on Jul. 4, 2025, 9 pages.

International Search Report and Written Opinion received for PCT Patent Application No. PCT/US2025/010440, mailed on Jul. 4, 2025, 20 pages.

Invitation to Pay Additional Fees and Partial International Search Report received for PCT Patent Application No. PCT/US2025/010440, mailed on May 13, 2025, 15 pages.

Non-Final Office Action received for U.S. Appl. No. 18/892,251, mailed on Jul. 11, 2025, 28 pages.

Notice of Allowance received for U.S. Appl. No. 17/410,169, mailed on Jul. 17, 2025, 8 pages.

Final Office Action received for U.S. Appl. No. 18/122,625, mailed on Apr. 5, 2024, 12 pages.

International Preliminary Report on Patentability received for PCT Patent Application No. PCT/US2022/044236, mailed on Apr. 4, 2024, 12 pages.

Non-Final Office Action received for U.S. Appl. No. 18/088,309, mailed on Apr. 9, 2024, 14 pages.

Notice of Allowance received for Chinese Patent Application No. 202211558100.7, mailed on Mar. 29, 2024, 3 pages (2 pages of English Translation and 1 page of Official Copy).

Notice of Allowance received for U.S. Appl. No. 18/125,070, mailed on Apr. 23, 2024, 6 pages.

Office Action received for Korean Patent Application No. 10-2022-7032414, mailed on Mar. 26, 2024, 11 pages (5 pages of English Translation and 6 pages of Official Copy).

Result of Consultation received for European Patent Application No. 20720310.0, mailed on Apr. 17, 2024, 9 pages.

Applicant-Initiated Interview Summary received for U.S. Appl. No. 18/228,597, mailed on Aug. 8, 2024, 4 pages.

Final Office Action received for U.S. Appl. No. 18/088,309, mailed on Aug. 1, 2024, 16 pages.

Notice of Allowance received for Japanese Patent Application No. 2022-149476, mailed on Aug. 2, 2024, 4 pages (1 page of English Translation and 3 pages of Official Copy).

Supplemental Notice of Allowance received for U.S. Patent Application No. 17/975, 141, mailed on Aug. 12, 2024, 2 pages.

Applicant-Initiated Interview Summary received for U.S. Appl. No. 18/102,036, mailed on Nov. 4, 2025, 4 pages.

Corrected Notice of Allowance received for U.S. Appl. No. 18/167,625, mailed on Nov. 24, 2025, 7 pages.

Corrected Notice of Allowance received for U.S. Appl. No. 18/228,597, mailed on Nov. 5, 2025, 2 pages.

Corrected Notice of Allowance received for U.S. Appl. No. 18/892,251, mailed on Nov. 4, 2025, 2 pages.

Extended European Search Report received for European Patent Application No. 25186269.4, mailed on Nov. 17, 2025, 12 pages.

International Preliminary Report on Patentability received for PCT Patent Application No. PCT/US2024/023602, mailed on Nov. 20, 2025, 18 pages.

Non-Final Office Action received for U.S. Appl. No. 18/892,230, mailed on Nov. 19, 2025, 25 pages.

Notice of Allowance received for U.S. Patent Application No. 17/410, 169, mailed on Nov. 21, 2025, 8 pages.

Office Action received for Japanese Patent Application No. 2024-147808, mailed on Nov. 10, 2025, 6 pages (3 pages of English Translation and 3 pages of Official Copy).

Applicant-Initiated Interview Summary received for U.S. Appl. No. 18/167,625, mailed on Aug. 1, 2025, 5 pages.

Applicant-Initiated Interview Summary received for U.S. Appl. No. 18/674,435, mailed on Sep. 29, 2025, 4 pages.

Applicant-Initiated Interview Summary received for U.S. Appl. No. 18/892,251, mailed on Sep. 17, 2025, 4 pages.

Corrected Notice of Allowance received for U.S. Appl. No. 18/167,625, mailed on Sep. 15, 2025, 4 pages.

Corrected Notice of Allowance received for U.S. Appl. No. 18/228,597, mailed on Sep. 17, 2025, 2 pages.

Corrected Notice of Allowance received for U.S. Appl. No. 18/611,216, mailed on Aug. 11, 2025, 2 pages.

Corrected Notice of Allowance received for U.S. Appl. No. 18/611,216, mailed on Jul. 31, 2025, 5 pages.

Decision to Grant received for European Patent Application No. 24211972.5, mailed on Jul. 31, 2025, 2 pages.

Non-Final Office Action received for U.S. Appl. No. 18/102,036, mailed on Aug. 25, 2025, 22 pages.

Non-Final Office Action received for U.S. Appl. No. 18/674,435, mailed on Sep. 10, 2025, 29 pages.

Notice of Acceptance received for Australian Patent Application No. 2024201515, mailed on Oct. 16, 2025, 4 pages.

Notice of Allowance received for Chinese Patent Application No. 202310794146.7, mailed on Sep. 29, 2025, 4 pages (1 page of English Translation and 3 pages of Official Copy).

Notice of Allowance received for U.S. Appl. No. 18/167,625, mailed on Sep. 3, 2025, 10 pages.

Notice of Allowance received for U.S. Appl. No. 18/228,597, mailed on Sep. 10, 2025, 10 pages.

Notice of Allowance received for U.S. Appl. No. 18/892,251, mailed on Oct. 22, 2025, 8 pages.

Office Action received for Japanese Patent Application No. 2024-147808, mailed on Aug. 1, 2025, 10 pages (5 pages of English Translation and 5 pages of Official Copy).

Office Action received for Korean Patent Application No. 10-2024-7003524, mailed on Sep. 26, 2025, 17 pages (7 pages of English Translation and 10 pages of Official Copy).

* cited by examiner

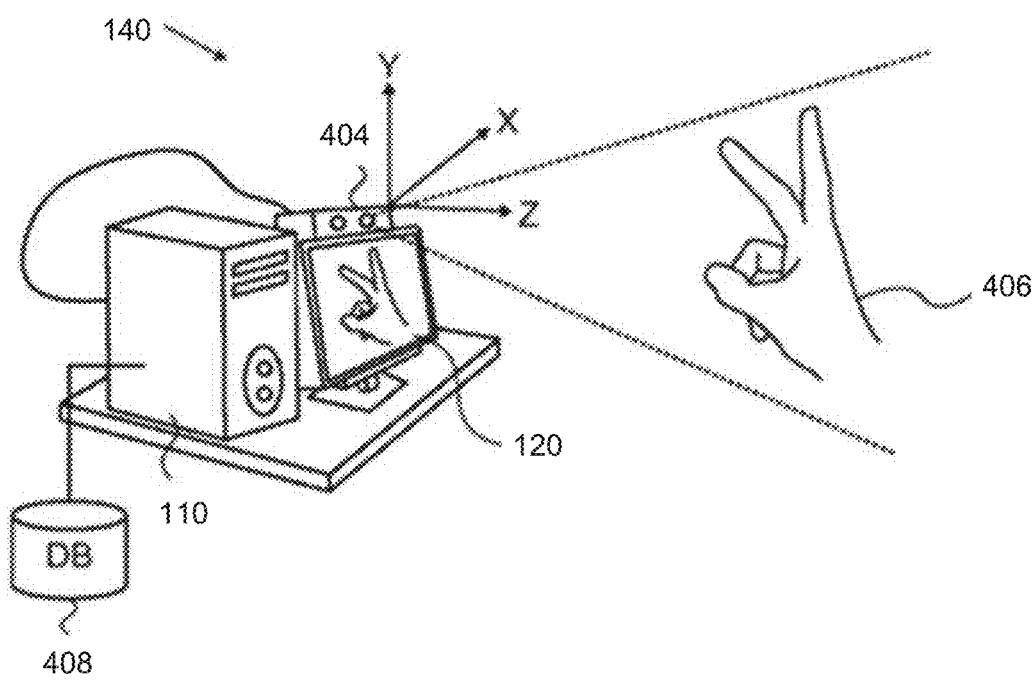
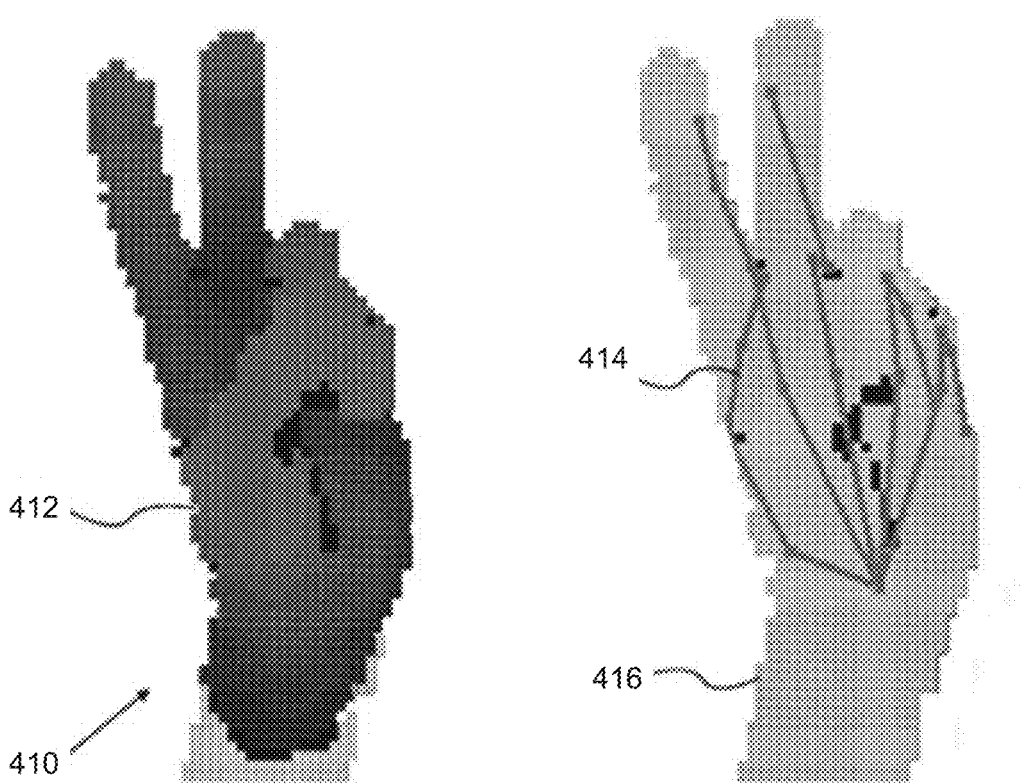
*FIG. 4*

FIG. 5

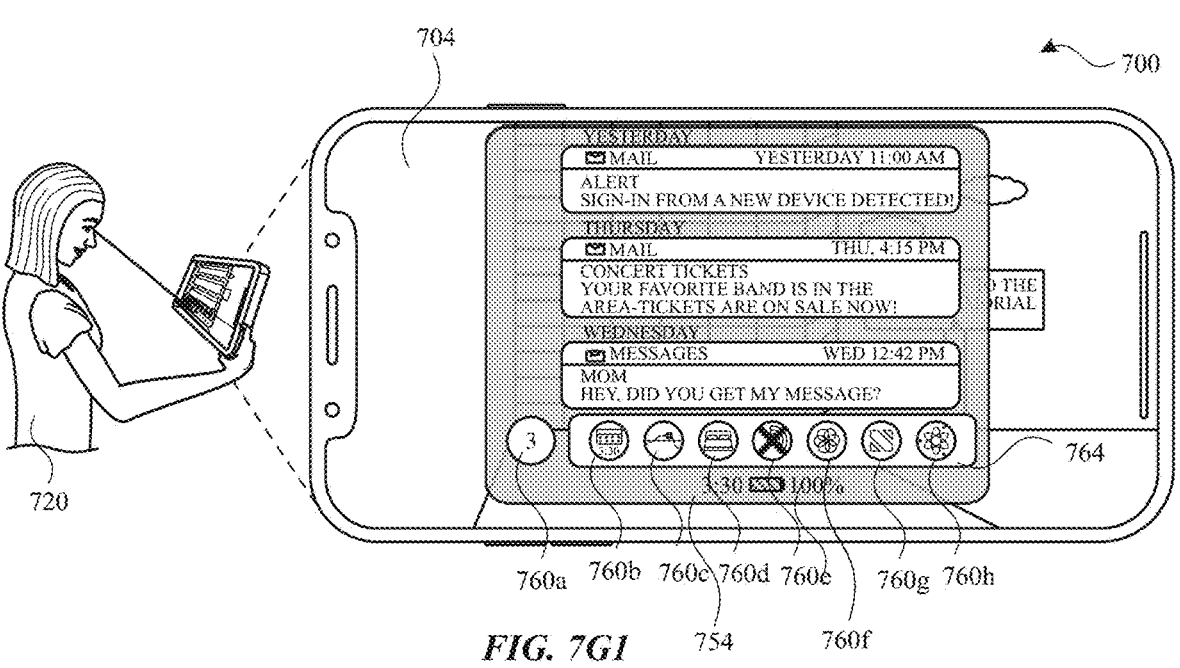
FIG. 7G1
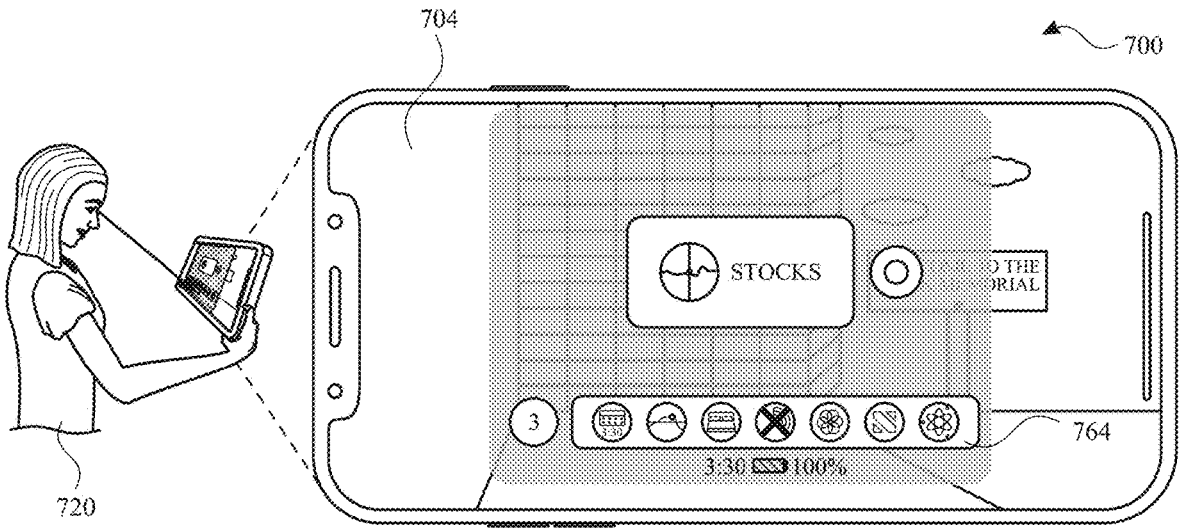
FIG. 7G2

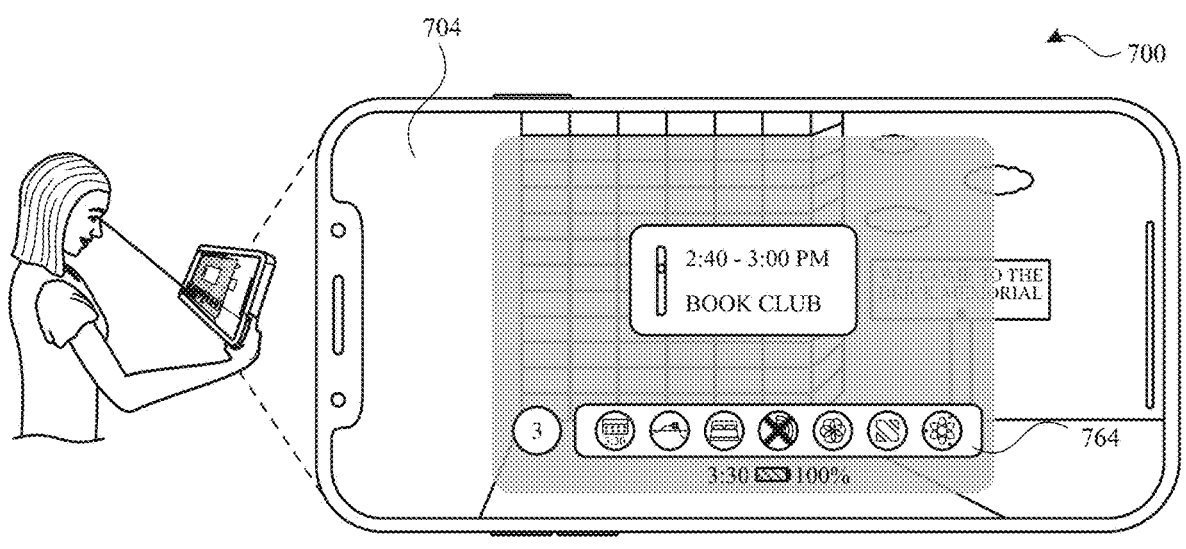
FIG. 7G3
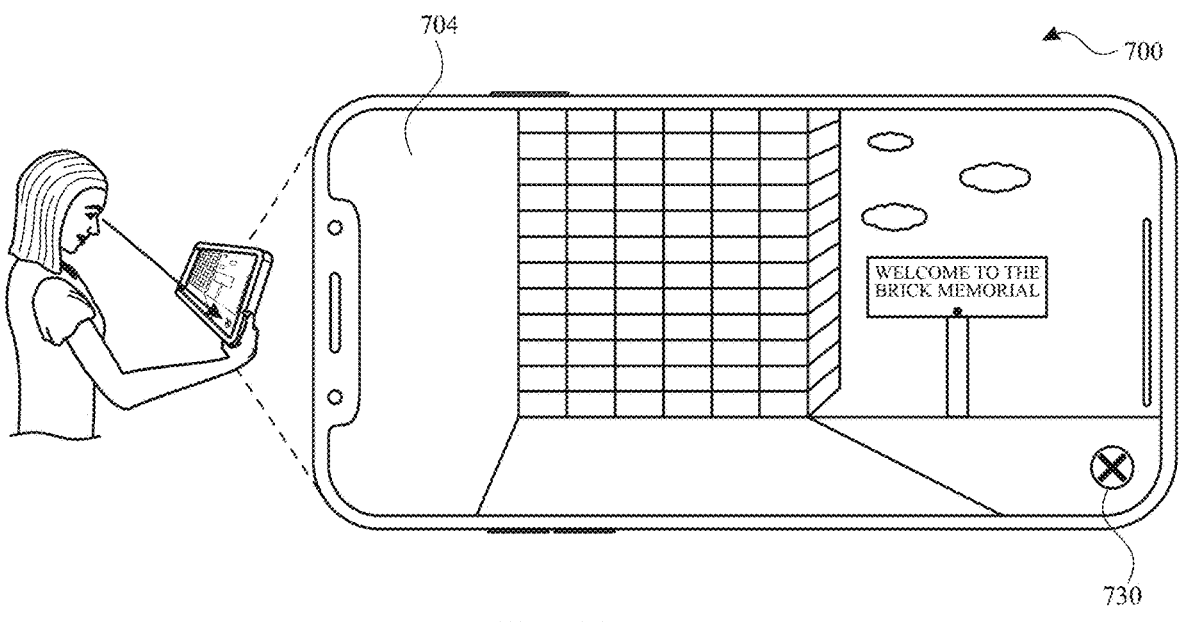
FIG. 7G4

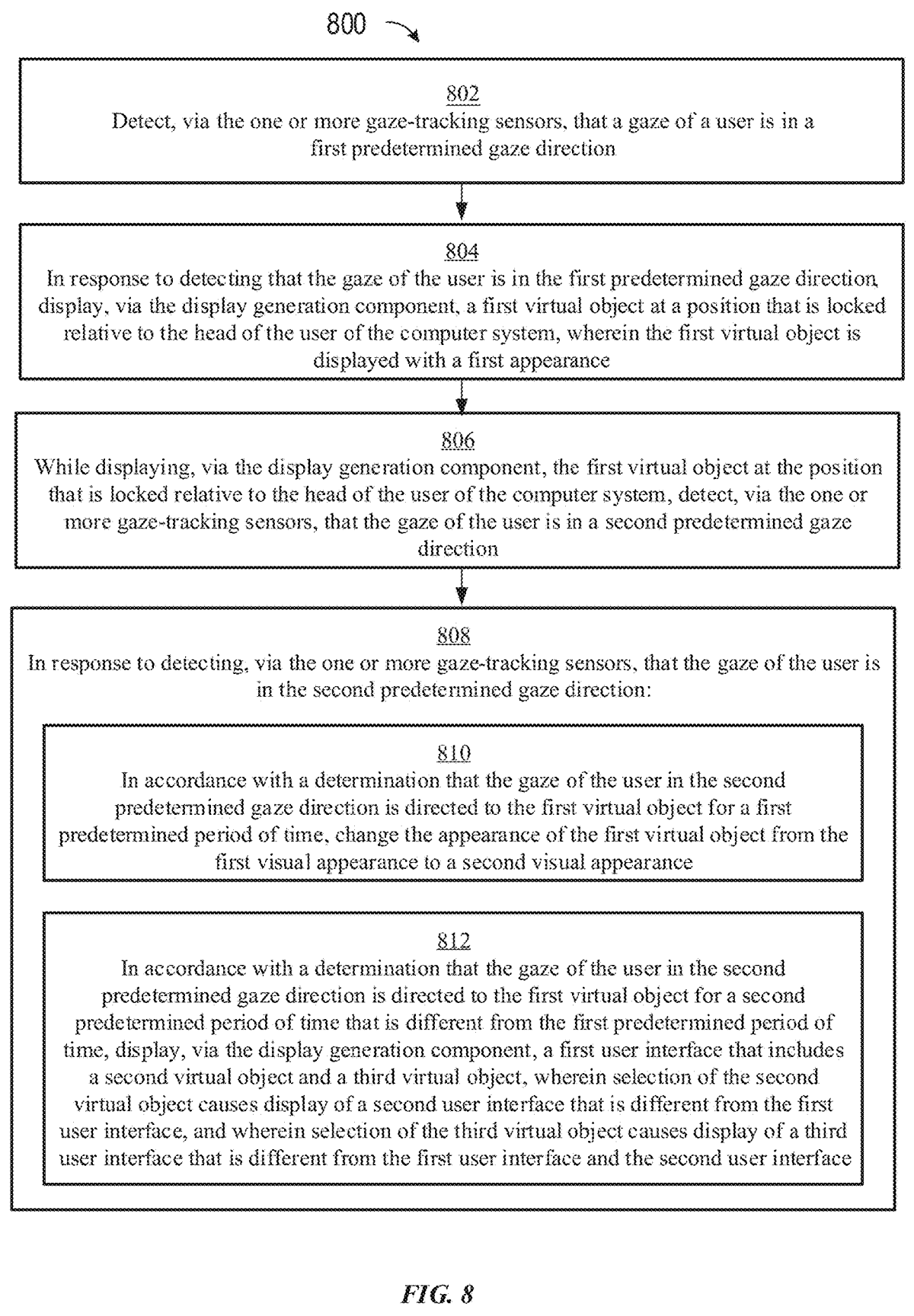

800

802
Detect, via the one or more gaze-tracking sensors, that a gaze of a user is in a first predetermined gaze direction

804
In response to detecting that the gaze of the user is in the first predetermined gaze direction, display, via the display generation component, a first virtual object at a position that is locked relative to the head of the user of the computer system, wherein the first virtual object is displayed with a first appearance

806
While displaying, via the display generation component, the first virtual object at the position that is locked relative to the head of the user of the computer system, detect, via the one or more gaze-tracking sensors, that the gaze of the user is in a second predetermined gaze direction

808
In response to detecting, via the one or more gaze-tracking sensors, that the gaze of the user is in the second predetermined gaze direction:

810
In accordance with a determination that the gaze of the user in the second predetermined gaze direction is directed to the first virtual object for a first predetermined period of time, change the appearance of the first virtual object from the first visual appearance to a second visual appearance

812
In accordance with a determination that the gaze of the user in the second predetermined gaze direction is directed to the first virtual object for a second predetermined period of time that is different from the first predetermined period of time, display, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface

*FIG. 8*

1000

---

1002
While detecting that the computer system has a predetermined location relative to a portion of a body of the user, receive an indication that an external device is displaying a user interface

---

1004
In response to receiving the indication that the external device is displaying the user interface:

---

1006
In accordance with a determination that a respective set of criteria is satisfied, wherein the respective set of criteria includes a criterion that is satisfied when a determination is made that the user interface includes content of a first type, display, via the display generation component, a virtual object that is associated with the content of the first type in a three-dimensional environment

---

1008
In accordance with a determination that a respective set of criteria is not satisfied, forgoing display of the virtual object that is associated with the content of the first type

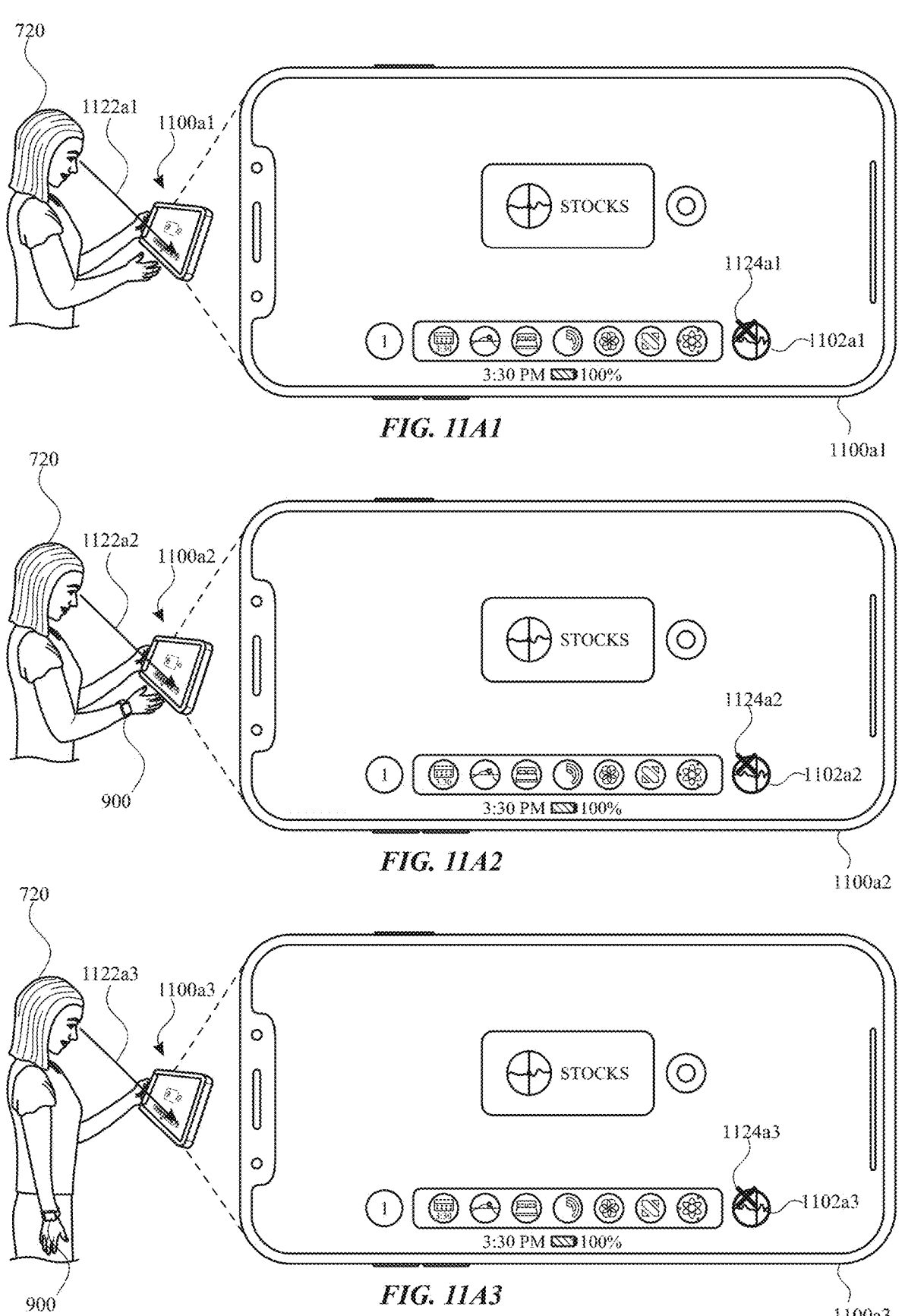
FIG. 11A1
FIG. 11A2
FIG. 11A3

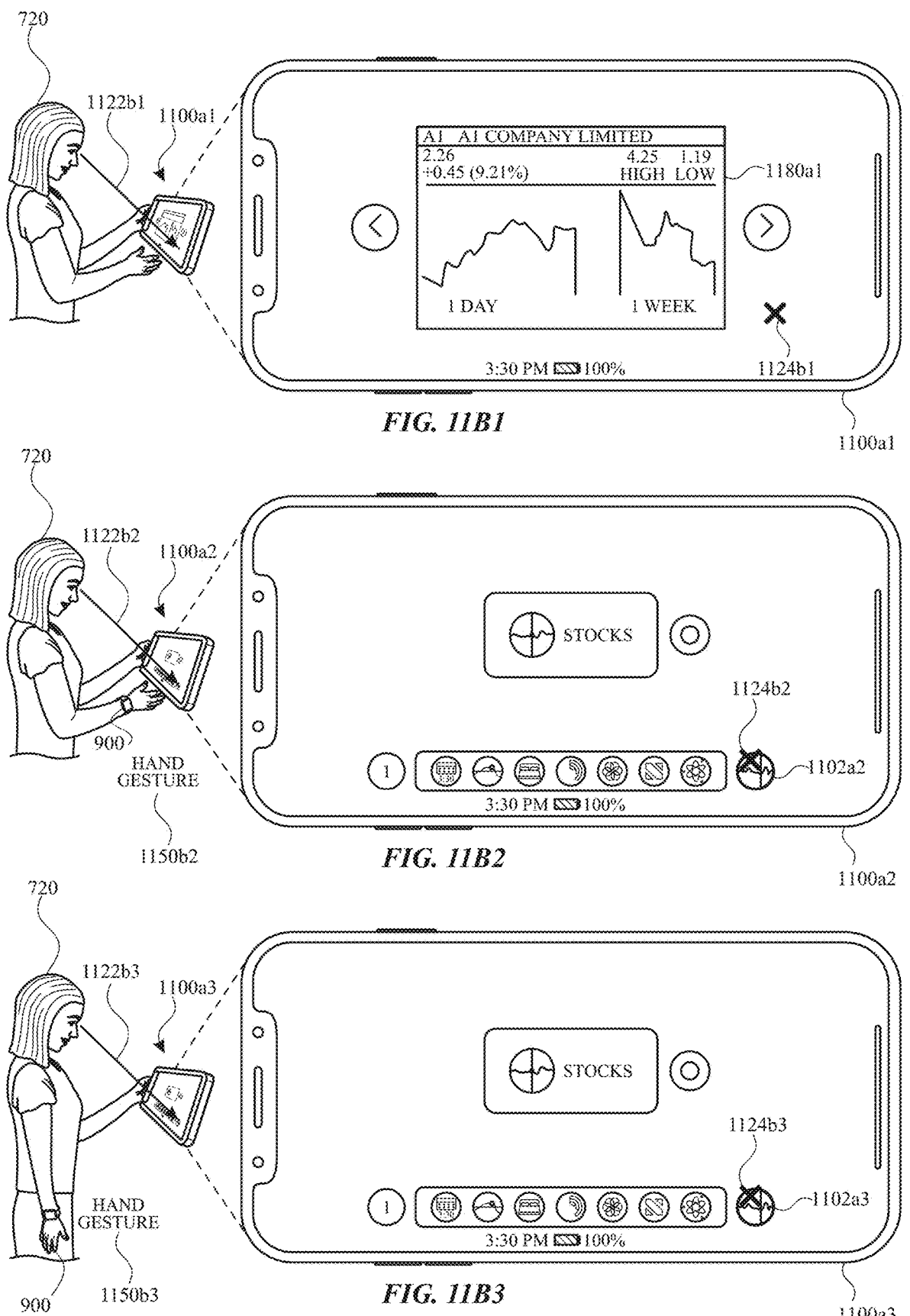
FIG. 11B1
FIG. 11B2
FIG. 11B3

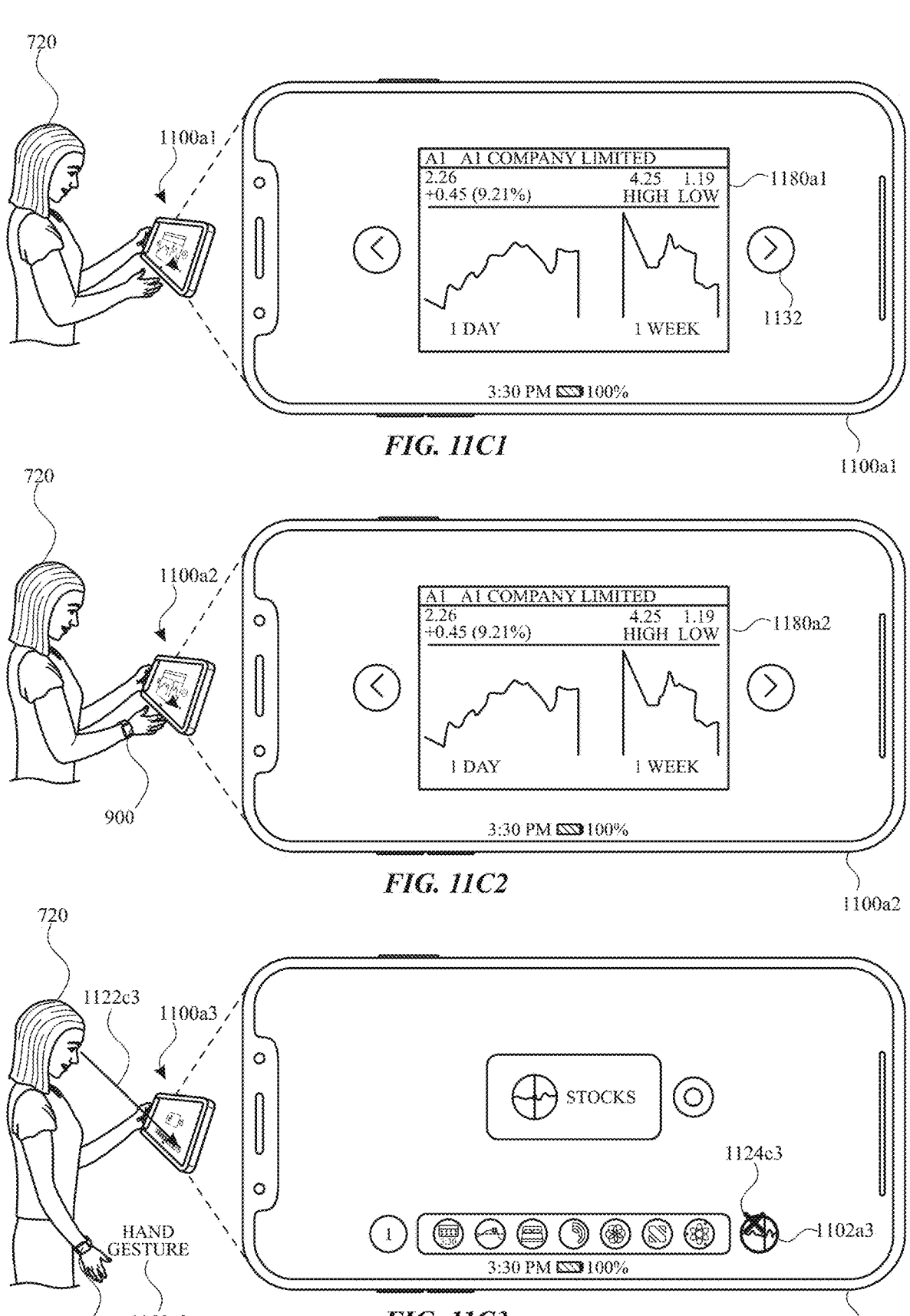
FIG. 11C1
FIG. 11C2
FIG. 11C3

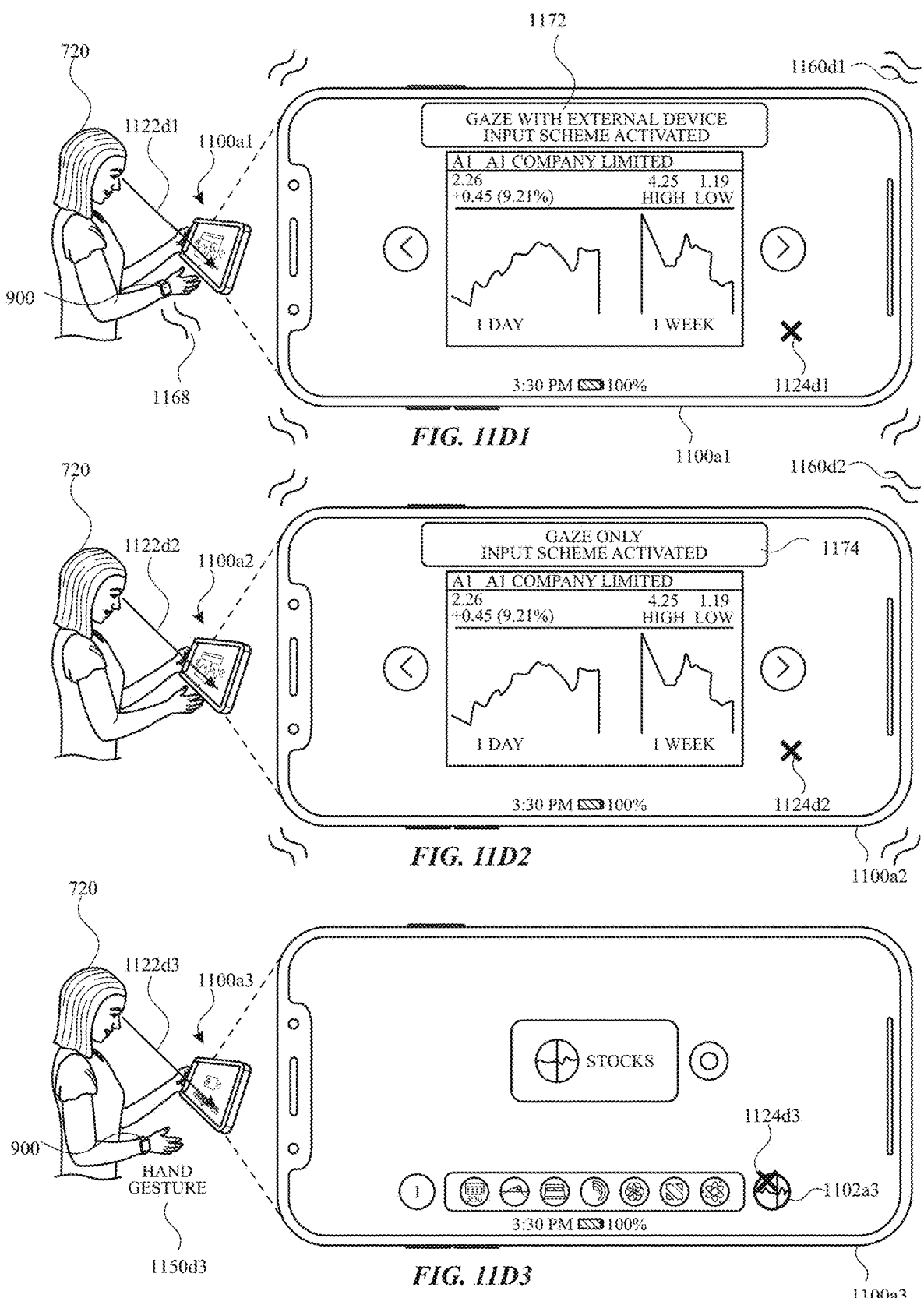
FIG. 11D1
FIG. 11D2
FIG. 11D3

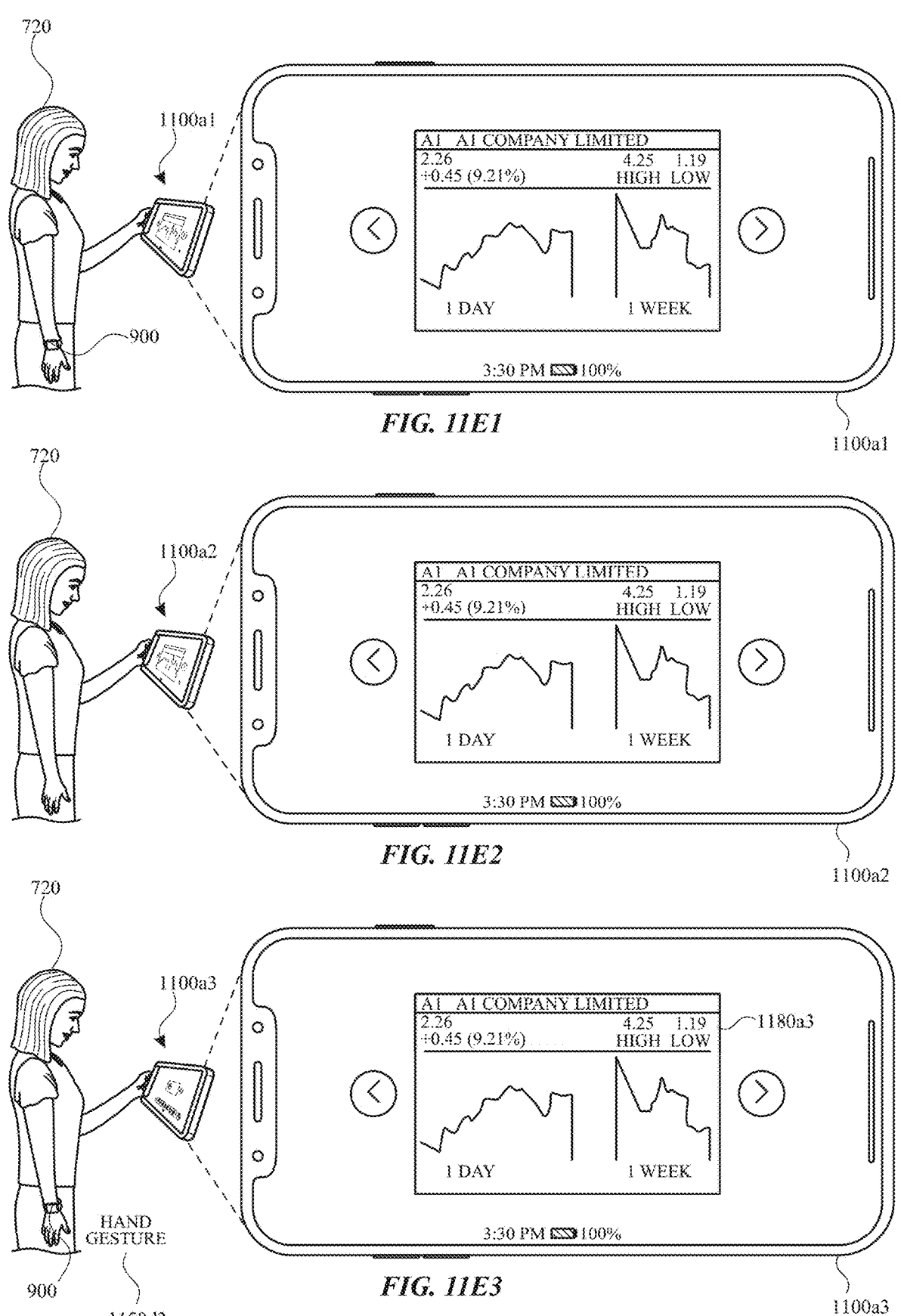
*FIG. 11E1*
*FIG. 11E2*
*FIG. 11E3*

Figure 12:
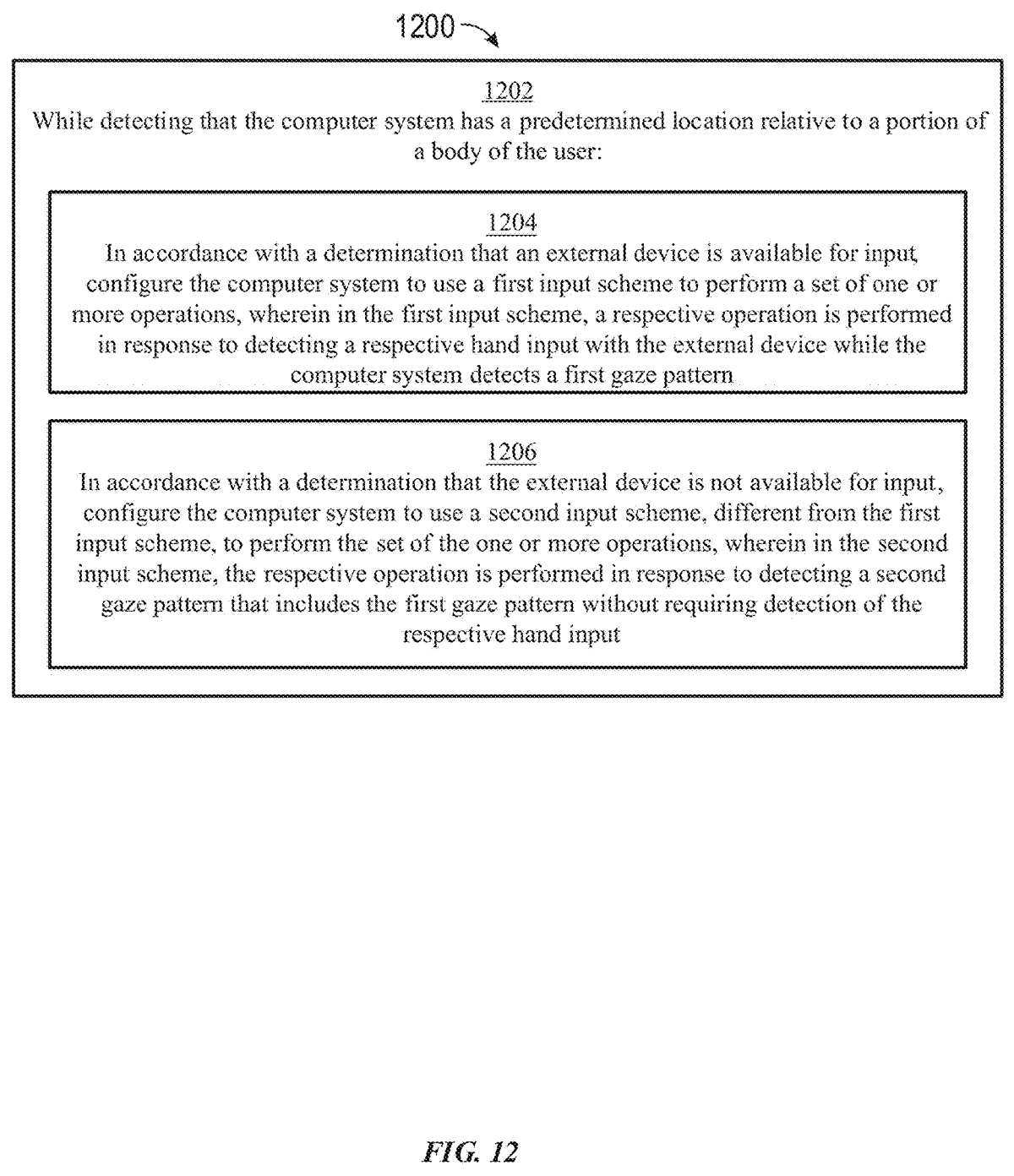

1200 ⟍

1202
While detecting that the computer system has a predetermined location relative to a portion of a body of the user:

1204
In accordance with a determination that an external device is available for input, configure the computer system to use a first input scheme to perform a set of one or more operations, wherein in the first input scheme, a respective operation is performed in response to detecting a respective hand input with the external device while the computer system detects a first gaze pattern

1206
In accordance with a determination that the external device is not available for input, configure the computer system to use a second input scheme, different from the first input scheme, to perform the set of the one or more operations, wherein in the second input scheme, the respective operation is performed in response to detecting a second gaze pattern that includes the first gaze pattern without requiring detection of the respective hand input

Figure 14:
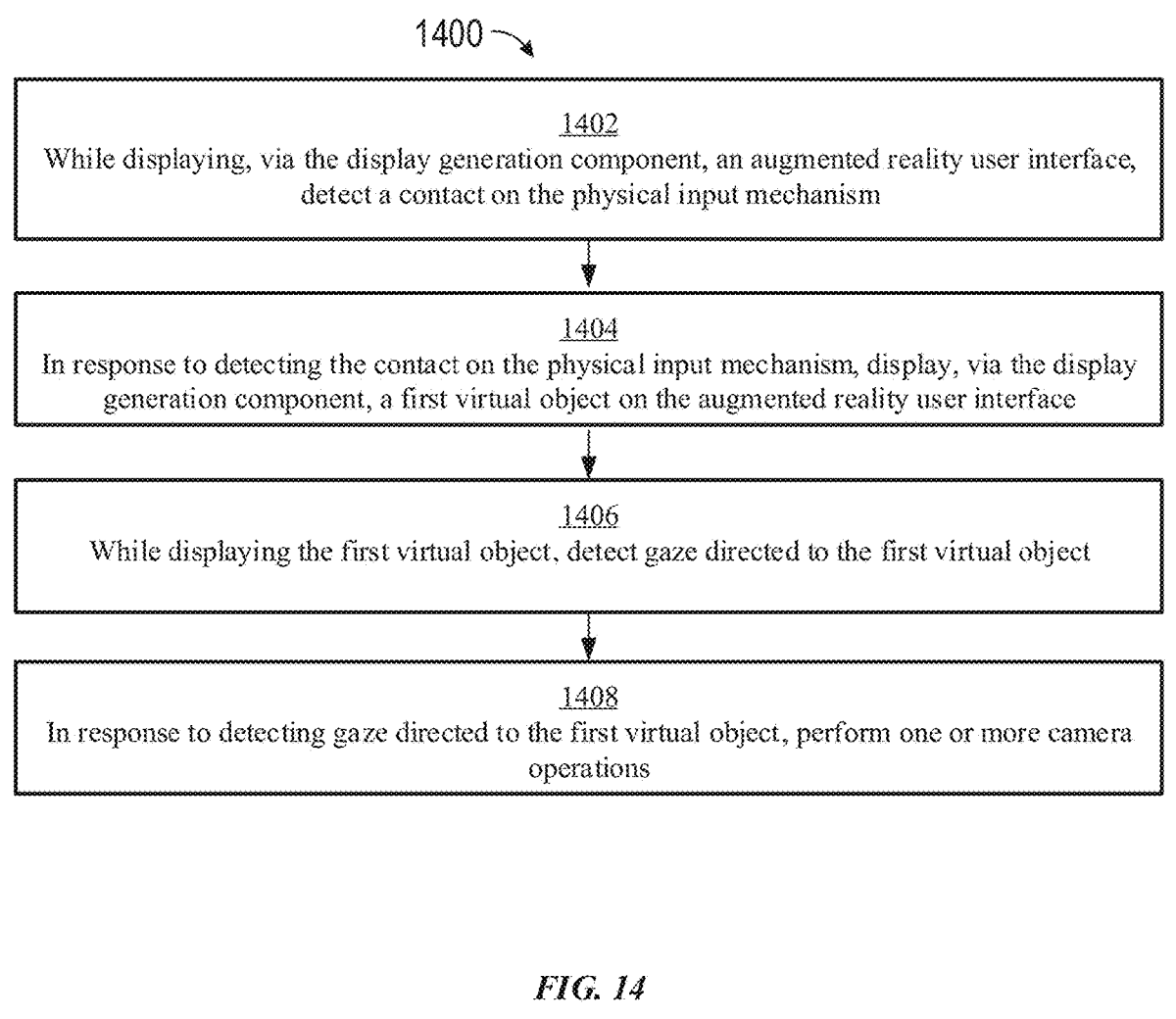

```
1402
While displaying, via the display generation component, an augmented reality user interface,
detect a contact on the physical input mechanism
```

```
1404
In response to detecting the contact on the physical input mechanism, display, via the display
generation component, a first virtual object on the augmented reality user interface
```

```
1406
While displaying the first virtual object, detect gaze directed to the first virtual object
```

```
1408
In response to detecting gaze directed to the first virtual object, perform one or more camera
operations
```

Figure 16:
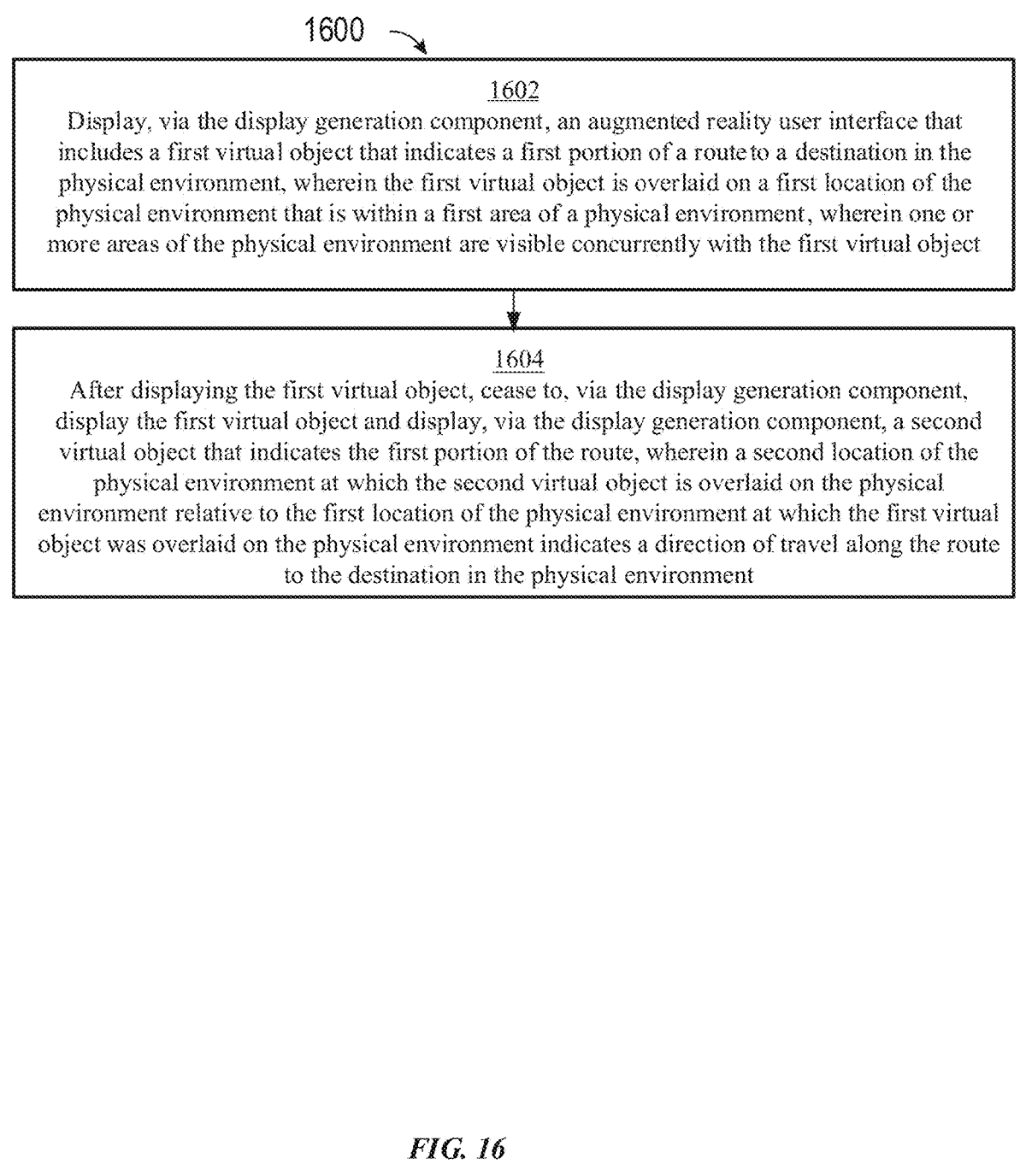

1602
Display, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object

1604
After displaying the first virtual object, cease to, via the display generation component, display the first virtual object and display, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment

Figure 18:
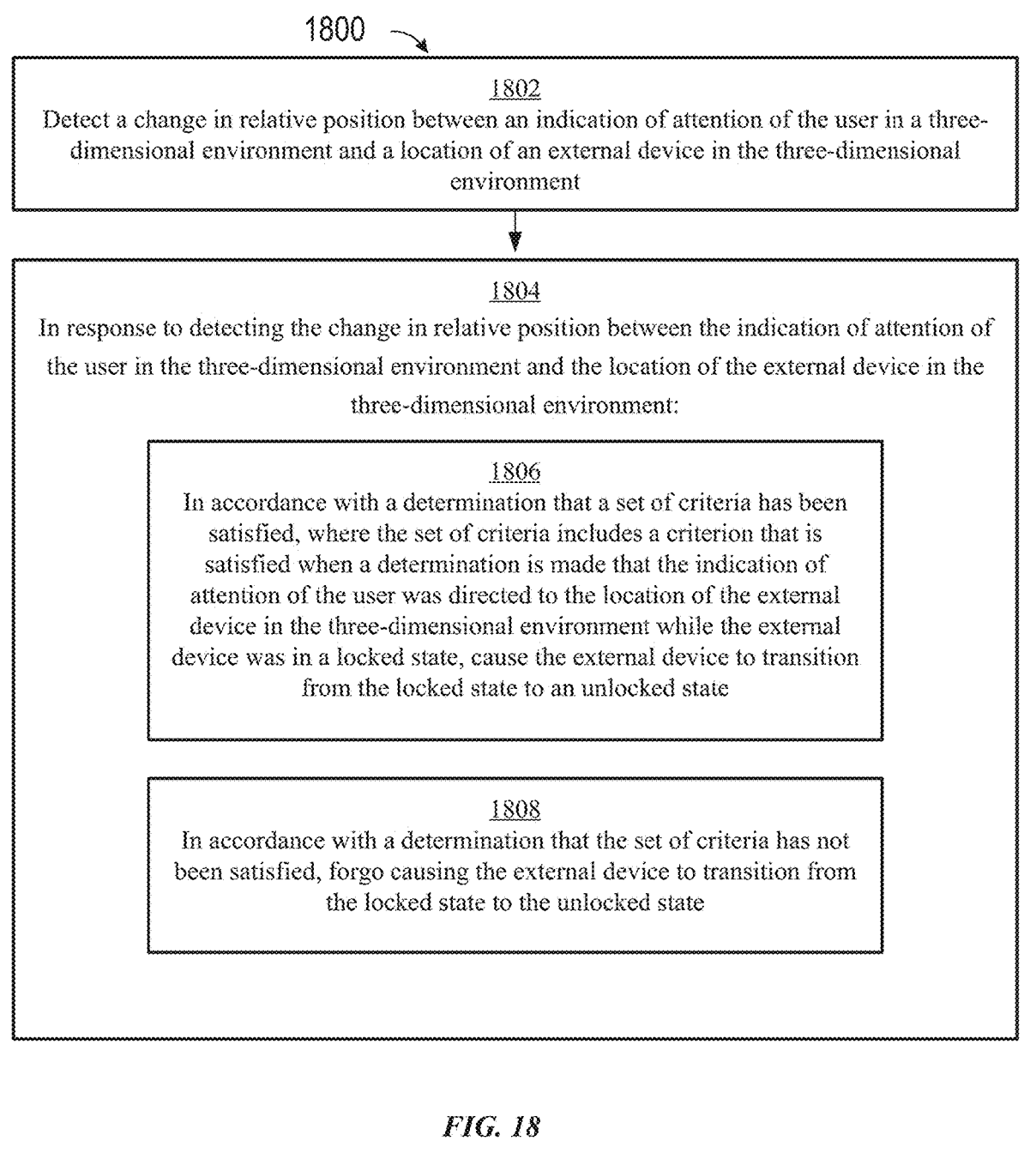

1802
Detect a change in relative position between an indication of attention of the user in a three-dimensional environment and a location of an external device in the three-dimensional environment

---

1804
In response to detecting the change in relative position between the indication of attention of the user in the three-dimensional environment and the location of the external device in the three-dimensional environment:

---

1806
In accordance with a determination that a set of criteria has been satisfied, where the set of criteria includes a criterion that is satisfied when a determination is made that the indication of attention of the user was directed to the location of the external device in the three-dimensional environment while the external device was in a locked state, cause the external device to transition from the locked state to an unlocked state

---

1808
In accordance with a determination that the set of criteria has not been satisfied, forgo causing the external device to transition from the locked state to the unlocked state

2002
Concurrently display, via a display generation component:

2004
A representation of first preview content from a first application

2006
A plurality of virtual objects that represent corresponding applications, including a virtual object that represents a second application

2008
An application launch virtual object

2010
While concurrently displaying, via the display generation component, the plurality of virtual objects, the representation of the first preview content, and the application launch virtual object, detect, via the one or more gaze-tracking sensors, that the attention of the user is directed to a respective location

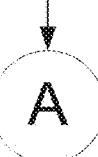

*FIG. 20A*

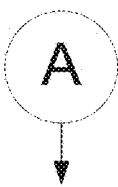

2012
In response to detecting that the attention of the user is directed to the respective location:

2014
In accordance with a determination that a set of application launch criteria has been satisfied, where the set of application launch criteria includes a criterion that is satisfied when the attention of the user is directed to the application launch virtual object for at least a threshold amount of time, display an application user interface that corresponds to the first preview content, where the application user interface is different from the first preview content 2016
In accordance with a determination that the respective location corresponds to a location of the virtual object that represents a second application, cease to display the representation of the first preview content and display, via the display generation component, a representation of second preview content from the second application

2202
While the computer system is being used in a physical environment, detect a request to initiate an activity in the physical environment

2204
After detecting the request to initiate the activity in the physical environment, display, via the display generation component, a first user interface, where displaying the first user interface includes:

2206
Displaying, via the display generation component, a set of one or more viewpoint-locked virtual objects in a three-dimensional environment that have a respective orientation relative to the physical environment, the set of one or more viewpoint-locked virtual objects representing one or more activity metrics, where the set of one or more viewpoint-locked virtual objects is displayed with a first viewpoint position relative to a viewpoint of the user and a first environment position relative to the three-dimensional environment

2208
Displaying, via the display generation component, a set of one or more environment-locked virtual objects in the three-dimensional environment representing one or more activity progress indicators, where the set of one or more environment-locked virtual objects is displayed with a second viewpoint position relative to the viewpoint of the user and a second environment position relative to the three-dimensional environment

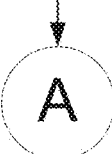

*FIG. 22A*

2210
While displaying, via the display generation component, the first user interface, detect a change in the viewpoint of the user relative to the three-dimensional environment

2212
In response to detecting the change in the viewpoint of the user relative to the three-dimensional environment, update the user interface, including:

2214
Displaying, via the display generation component, the set of one or more viewpoint-locked virtual objects with the first viewpoint position relative to the viewpoint of the user and a third environment position relative to the three-dimensional environment, wherein the third environment position is different from the first environment position

2216
Displaying, via the display generation component, the set of one or more environment-locked virtual objects with a third viewpoint position relative to the viewpoint of the user and the second environment position relative to the three-dimensional environment, wherein the third viewpoint position is different from the second viewpoint position

Figure 24:
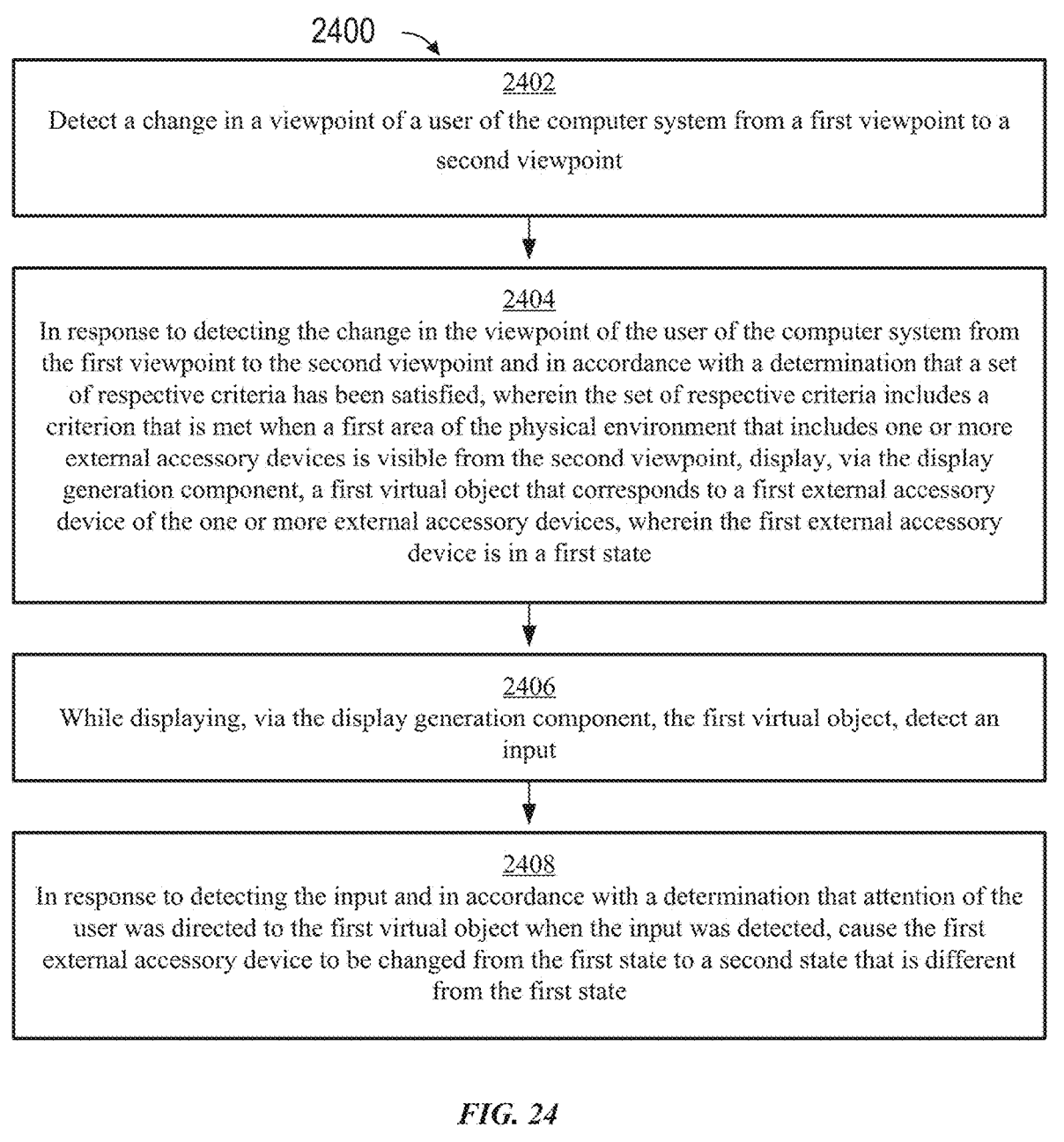

2402
Detect a change in a viewpoint of a user of the computer system from a first viewpoint to a second viewpoint 2404
In response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, display, via the display generation component, a first virtual object that corresponds to a first external accessory device of the one or more external accessory devices, wherein the first external accessory device is in a first state 2406
While displaying, via the display generation component, the first virtual object, detect an input 2408
In response to detecting the input and in accordance with a determination that attention of the user was directed to the first virtual object when the input was detected, cause the first external accessory device to be changed from the first state to a second state that is different from the first state

Figure 26:
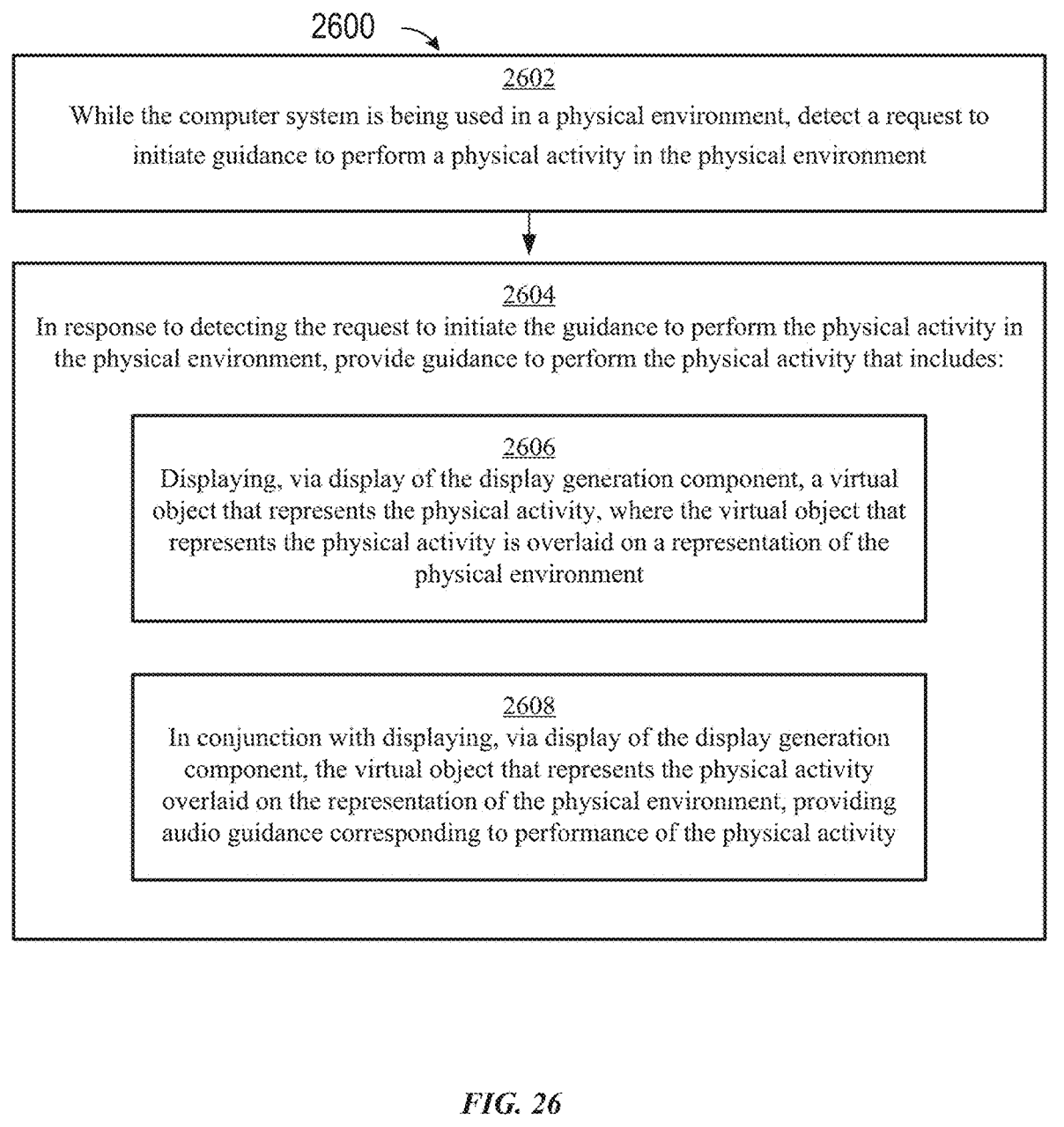

2602
While the computer system is being used in a physical environment, detect a request to initiate guidance to perform a physical activity in the physical environment 2604
In response to detecting the request to initiate the guidance to perform the physical activity in the physical environment, provide guidance to perform the physical activity that includes:

2606
Displaying, via display of the display generation component, a virtual object that represents the physical activity, where the virtual object that represents the physical activity is overlaid on a representation of the physical environment 2608
In conjunction with displaying, via display of the display generation component, the virtual object that represents the physical activity overlaid on the representation of the physical environment, providing audio guidance corresponding to performance of the physical activity

Figure 28:
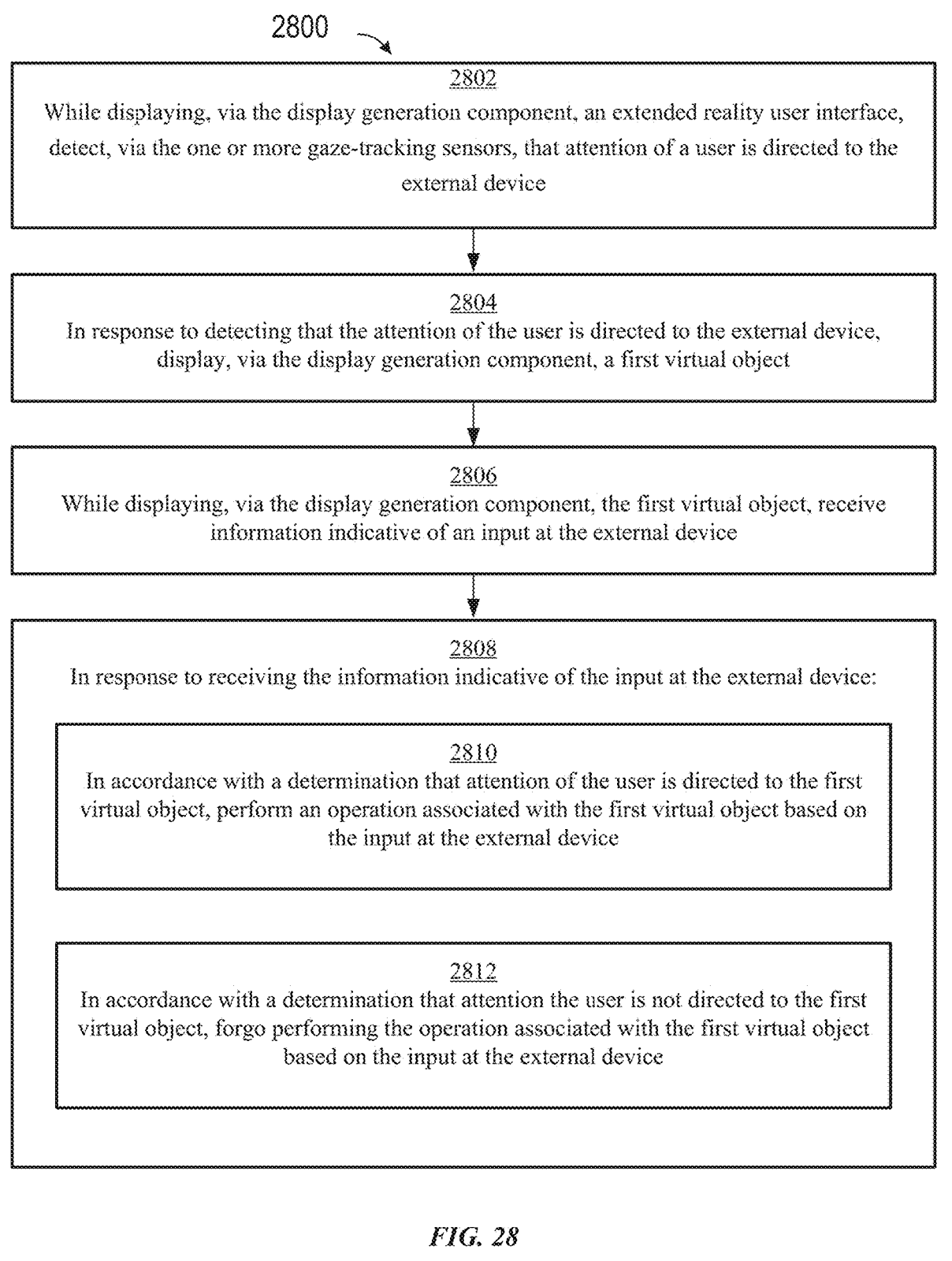

2802
While displaying, via the display generation component, an extended reality user interface, detect, via the one or more gaze-tracking sensors, that attention of a user is directed to the external device

2804
In response to detecting that the attention of the user is directed to the external device, display, via the display generation component, a first virtual object

2806
While displaying, via the display generation component, the first virtual object, receive information indicative of an input at the external device

2808
In response to receiving the information indicative of the input at the external device:

2810
In accordance with a determination that attention of the user is directed to the first virtual object, perform an operation associated with the first virtual object based on the input at the external device

2812
In accordance with a determination that attention the user is not directed to the first virtual object, forgo performing the operation associated with the first virtual object based on the input at the external device

Figure 30:
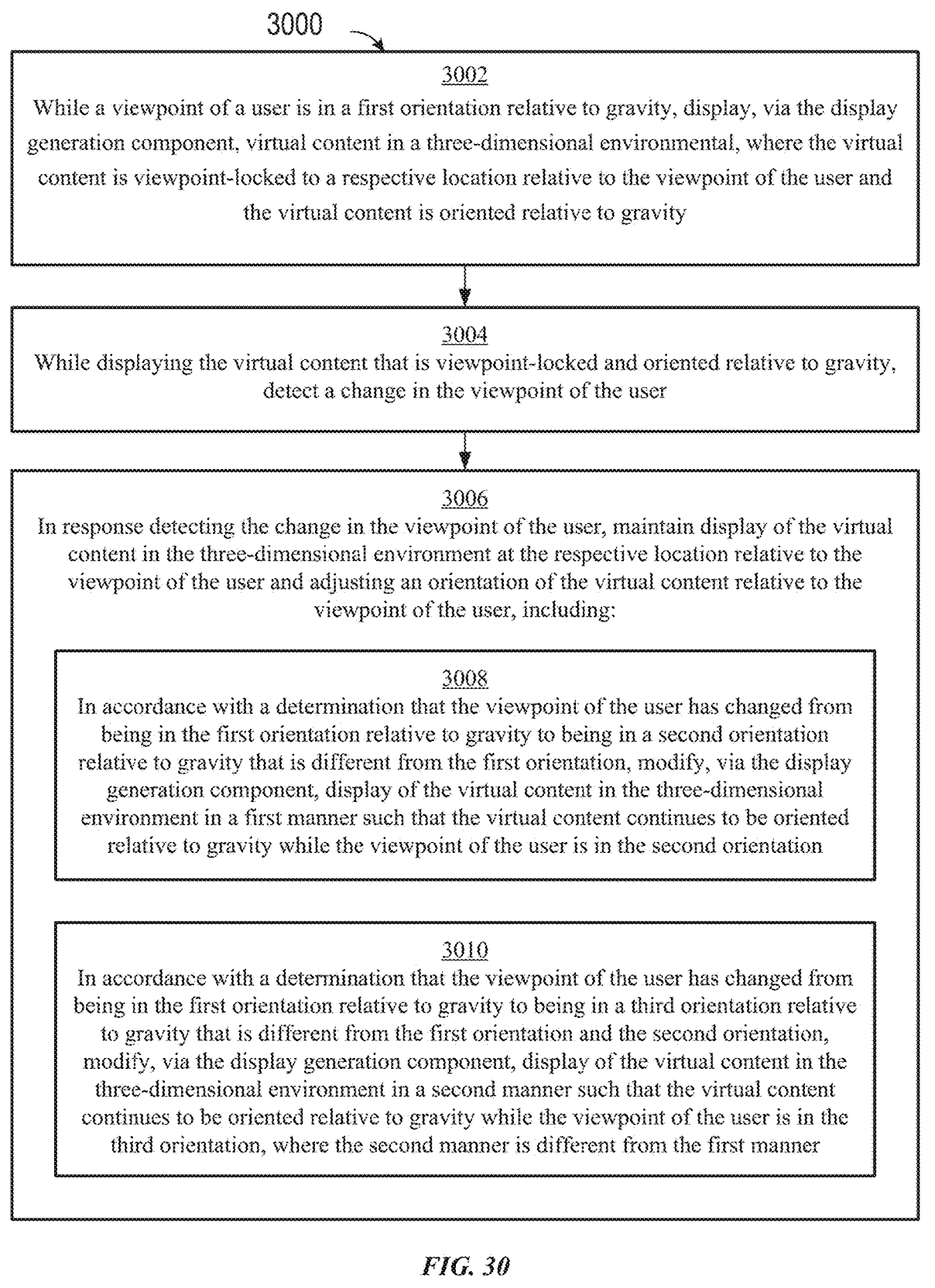

3002
While a viewpoint of a user is in a first orientation relative to gravity, display, via the display generation component, virtual content in a three-dimensional environmental, where the virtual content is viewpoint-locked to a respective location relative to the viewpoint of the user and the virtual content is oriented relative to gravity

3004
While displaying the virtual content that is viewpoint-locked and oriented relative to gravity, detect a change in the viewpoint of the user

3006
In response detecting the change in the viewpoint of the user, maintain display of the virtual content in the three-dimensional environment at the respective location relative to the viewpoint of the user and adjusting an orientation of the virtual content relative to the viewpoint of the user, including:

3008
In accordance with a determination that the viewpoint of the user has changed from being in the first orientation relative to gravity to being in a second orientation relative to gravity that is different from the first orientation, modify, via the display generation component, display of the virtual content in the three-dimensional environment in a first manner such that the virtual content continues to be oriented relative to gravity while the viewpoint of the user is in the second orientation

3010
In accordance with a determination that the viewpoint of the user has changed from being in the first orientation relative to gravity to being in a third orientation relative to gravity that is different from the first orientation and the second orientation, modify, via the display generation component, display of the virtual content in the three-dimensional environment in a second manner such that the virtual content continues to be oriented relative to gravity while the viewpoint of the user is in the third orientation, where the second manner is different from the first manner

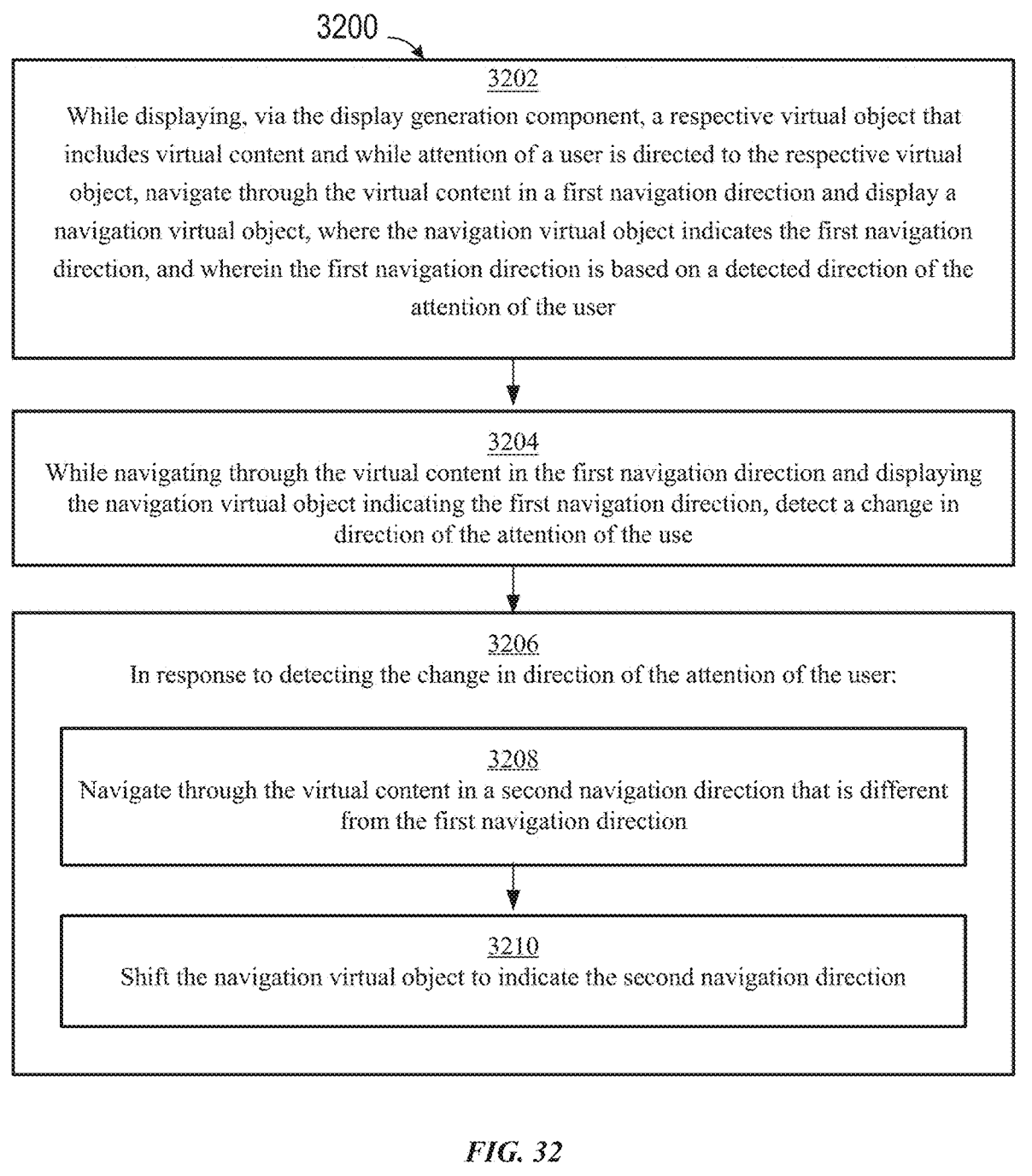

3202
While displaying, via the display generation component, a respective virtual object that includes virtual content and while attention of a user is directed to the respective virtual object, navigate through the virtual content in a first navigation direction and display a navigation virtual object, where the navigation virtual object indicates the first navigation direction, and wherein the first navigation direction is based on a detected direction of the attention of the user

3204
While navigating through the virtual content in the first navigation direction and displaying the navigation virtual object indicating the first navigation direction, detect a change in direction of the attention of the use

3206
In response to detecting the change in direction of the attention of the user:

3208
Navigate through the virtual content in a second navigation direction that is different from the first navigation direction

3210
Shift the navigation virtual object to indicate the second navigation direction

*FIG. 32*

GAZE BASED INTERACTIONS WITH THREE-DIMENSIONAL ENVIRONMENTS

CROSS-REFERENCE TO RELATED APPLICATIONS

This application is a continuation of PCT Patent Application Serial No. PCT/US2022/044236, entitled "GAZED BASED INTERACTIONS WITH THREE-DIMENSIONAL ENVIRONMENTS," filed on Sep. 21, 2022, which claims priority to U.S. Patent Application Ser. No. 63/314,228, entitled "GAZED BASED INTERACTIONS WITH THREE-DIMENSIONAL ENVIRONMENTS," filed on Feb. 25, 2022, and to U.S. Patent Application Ser. No. 63/248,471, entitled "GAZED BASED INTERACTIONS WITH THREE-DIMENSIONAL ENVIRONMENTS," filed on Sep. 25, 2021. The contents of each of these applications are hereby incorporated by reference in their entireties.

TECHNICAL FIELD

The present disclosure relates generally to computer systems that are in communication with a display generation component. The computer systems are optionally in communication with one or more external devices, one or more gaze tracking sensors, one or more physical input mechanisms, such as one or more routable input mechanisms, one or more inputs devices, one or more cameras, one or more display projectors, one or more audio output devices, one or more touch-sensitive surfaces, and/or that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide inefficient input schemes for interacting with and/or managing virtual objects, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is a portable device (e.g., a notebook computer, tablet computer, or handheld device). In some embodiments, the computer system is a personal electronic device (e.g., a wearable electronic device, such as a watch or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note-taking, and/or digital video playing. Executable instructions for performing these functions are, optionally, included in a transitory and/or non-transitory computer-readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power, increase the time between battery charges, reduce battery usage (e.g., by managing one or more areas of the display that are used to display virtual objects), and reduce the number of unnecessary, extraneous, and/or repetitive inputs.

In accordance with some embodiments, a method is described. The method is performed at a computer system that is in communication with one or more gaze-tracking sensors and a display generation component. The method comprises: detecting, via the one or more gaze-tracking sensors, that attention of a user is in a first predetermined direction; in response to detecting that the attention of the user is in the first predetermined direction, displaying, via the display generation component, a first virtual object at a position that is locked relative to the head of the user of the computer system, wherein the first virtual object is displayed with a first appearance; while displaying, via the display generation component, the first virtual object at the position that is locked relative to the head of the user of the computer system, detecting, via the one or more gaze-tracking sensors, that the attention of the user is in a second predetermined direction; and in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a non-transitory computer-readable storage medium is described. The non-transitory computer-readable storage medium stores one or more programs configured to be executed by one or more processors of a computer system that is in communication with one or more gaze-tracking sensors and a display generation component, the one or more programs including instructions for: detecting, via the one or more gaze-tracking sensors, that attention of a user is in a first predetermined direction; in response to detecting that the attention of the user is in the first predetermined direction, displaying, via the display generation component, a first virtual object at a position that is locked relative to the head of the user of the computer system, wherein the first virtual object is displayed with a first appearance; while displaying, via the display generation component, the first virtual object at the position that is locked relative to the head of the user of the computer system, detecting, via the one or more gaze-tracking sensors, that the attention of the user is in a second predetermined direction; and in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a transitory computer-readable storage medium is described. The transitory computer-readable storage medium stores one or more programs configured to be executed by one or more processors of a computer system that is in communication with one or more gaze-tracking sensors and a display generation component, the one or more programs including instructions for: detecting, via the one or more gaze-tracking sensors, that attention of a user is in a first predetermined direction; in response to detecting that the attention of the user is in the first predetermined direction, displaying, via the display generation component, a first virtual object at a position that is locked relative to the head of the user of the computer system, wherein the first virtual object is displayed with a first appearance; while displaying, via the display generation component, the first virtual object at the position that is locked relative to the head of the user of the computer system, detecting, via the one or more gaze-tracking sensors, that the attention of the user is in a second predetermined direction; and in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a computer system is described. The computer system comprises: one or more gaze-tracking sensors; a display generation component; one or more processors; and memory storing one or more programs configured to be executed by the one or more processors, the one or more programs including instructions for: detecting, via the one or more gaze-tracking sensors, that attention of a user is in a first predetermined direction; in response to detecting that the attention of the user is in the first predetermined direction, displaying, via the display generation component, a first virtual object at a position that is locked relative to the head of the user of the computer system, wherein the first virtual object is displayed with a first appearance; while displaying, via the display generation component, the first virtual object at the position that is locked relative to the head of the user of the computer system, detecting, via the one or more gaze-tracking sensors, that the attention of the user is in a second predetermined direction; and in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a computer system is described. The computer system comprises: one or more gaze-tracking sensors; a display generation component; means for detecting, via the one or more gaze-tracking sensors, that attention of a user is in a first predetermined direction; means for, in response to detecting that the attention of the user is in the first predetermined direction, displaying, via the display generation component, a first virtual object at a position that is locked relative to the head of the user of the computer system, wherein the first virtual object is displayed with a first appearance; means for, while displaying, via the display generation component, the first virtual object at the position that is locked relative to the head of the user of the computer system, detecting, via the one or more gaze-tracking sensors, that the attention of the user is in a second predetermined direction; and means for, in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and means for, in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a computer program product is described. The computer program product comprises one or more programs configured to be executed by one or more processors of a computer system that is in communication with one or more gaze-tracking sensors and a display generation component, the one or more programs including instructions for: detecting, via the one or more gaze-tracking sensors, that attention of a user is in a first predetermined direction; in response to detecting that the attention of the user is in the first predetermined direction, displaying, via the display generation component, a first virtual object at a position that is locked relative to the head of the user of the computer system, wherein the first virtual object is displayed with a first appearance; while displaying, via the display generation component, the first virtual object at the position that is locked relative to the head of the user of the computer system, detecting, via the one or more gaze-tracking sensors, that the attention of the user is in a second predetermined direction; and in response to detecting, via the one or more gaze-tracking sensors, that the attention of the user is in the second predetermined direction: in accordance with a determination that the attention of the user in the second predetermined direction is directed to the first virtual object for a first predetermined period of time, changing the appearance of the first virtual object from the first visual appearance to a second visual appearance; and in accordance with a determination that the attention of the user in the second predetermined direction is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

In accordance with some embodiments, a method is described. The method is performed at a computer system that is in communication with a display generation component. The method comprises: while detecting that the computer system has a predetermined location relative to a portion of a body of the user, receiving an indication that an external device is displaying a user interface; and in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while detecting that the computer system has a predetermined location relative to a portion of a body of the user, receiving an indication that an external device is displaying a user interface; and in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while detecting that the computer system has a predetermined location relative to a portion of a body of the user, receiving an indication that an external device is displaying a user interface; and in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a computer system is described. The computer system comprises: a display generation component; one or more processors; and memory storing one or more programs configured to be executed by the one or more processors, the one or more programs including instructions for: while detecting that the computer system has a predetermined location relative to a portion of a body of the user, receiving an indication that an external device is displaying a user interface; and in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a computer system is described. The computer system comprises: a display generation component; means for, while detecting that the computer system has a predetermined location relative to a portion of a body of the user, receiving an indication that an external device is displaying a user interface; and means for, in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a computer program product is described. The computer program product comprises: one or more programs configured to be executed by one or more processors of a computer system that is in communication with a display generation component, the one or more programs including instructions for: while detecting that the computer system has a predetermined location relative to a portion of a body of the user, receiving an indication that an external device is displaying a user interface; and in response to receiving the indication that the external device is displaying the user interface: in accordance with a determination that a respective set of criteria is satisfied, wherein the respective set of criteria includes a criterion that is satisfied when a determination is made that the user interface includes content of a first type, displaying, via the display generation component, a virtual object that is associated with the content of the first type in a three-dimensional environment; and in accordance with a determination that a respective set of criteria is not satisfied, forgoing displaying the virtual object that is associated with the content of the first type.

In accordance with some embodiments, a method is described. The method is performed at a computer system. The method comprises: while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a non-transitory computer-readable storage medium is described. The non-transitory computer-readable storage medium stores one or more programs configured to be executed by one or more processors of a computer system, the one or more programs including instructions for: while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a transitory computer-readable storage medium is described. The transitory computer-readable storage medium stores one or more programs configured to be executed by one or more processors of a computer system, the one or more programs including instructions for: while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a computer system is described. The computer system comprises: one or more processors; memory storing one or more programs configured to be executed by the one or more processors, the one or more programs including instructions for: while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a computer system is described. The computer system comprises: means for, while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a computer program product is described. The computer program product comprises one or more programs configured to be executed by one or more processors of a computer system, the one or more programs including instructions for: while detecting that the computer system has a predetermined location relative to a portion of a body of the user: in accordance with a determination that an external device is available for input, configuring the computer system to use a first input scheme to perform a set of one or more operations, wherein in the first input scheme, a respective operation is performed in response to detecting a respective hand input with the external device while the computer system detects a first attention pattern; and in accordance with a determination that the external device is not available for input, configuring the computer system to use a second input scheme, different from the first input scheme, to perform the set of the one or more operations, wherein in the second input scheme, the respective operation is performed in response to detecting a second attention pattern that includes the first attention pattern without requiring detection of the respective hand input.

In accordance with some embodiments, a method is described. The method is performed at a computer system that is in communication with a display generation component and a physical input mechanism. The method comprises: while displaying, via the display generation component, an augmented reality user interface, detecting a contact on the physical input mechanism; in response to detecting the contact on the physical input mechanism, displaying, via the display generation component, a first virtual object on the augmented reality user interface; while displaying the first virtual object, detecting attention of the user that is directed to the first virtual object; and in response to detecting the attention of the user that is directed to the first virtual object, performing one or more camera operations.

In accordance with some embodiments, a non-transitory computer-readable storage medium is described. The non-transitory computer-readable storage medium stores one or more programs configured to be executed by one or more processors of a computer system that is in communication with a display generation component and a physical input mechanism, the one or more programs including instructions for: while displaying, via the display generation component, an augmented reality user interface, detecting a contact on the physical input mechanism; in response to detecting the contact on the physical input mechanism, displaying, via the display generation component, a first virtual object on the augmented reality user interface; while displaying the first virtual object, detecting attention of the user that is directed to the first virtual object; and in response to detecting the attention of the user that is directed to the first virtual object, performing one or more camera operations.

In accordance with some embodiments, a transitory computer-readable storage medium is described. The transitory computer-readable storage medium stores one or more programs configured to be executed by one or more processors of a computer system that is in communication with a display generation component and a physical input mechanism, the one or more programs including instructions for: while displaying, via the display generation component, an augmented reality user interface, detecting a contact on the physical input mechanism; in response to detecting the contact on the physical input mechanism, displaying, via the display generation component, a first virtual object on the augmented reality user interface; while displaying the first virtual object, detecting attention of the user that is directed to the first virtual object; and in response to detecting the attention of the user that is directed to the first virtual object, performing one or more camera operations.

In accordance with some embodiments, a computer system is described. The computer system comprises: a display generation component; a physical input mechanism; one or more processors; and memory storing one or more programs configured to be executed by the one or more processors, the one or more programs including instructions for: while displaying, via the display generation component, an augmented reality user interface, detecting a contact on the physical input mechanism; in response to detecting the contact on the physical input mechanism, displaying, via the display generation component, a first virtual object on the augmented reality user interface; while displaying the first virtual object, detecting attention of the user that is directed to the first virtual object; and in response to detecting the attention of the user that is directed to the first virtual object, performing one or more camera operations.

In accordance with some embodiments, a computer system is described. The computer system comprises: a display generation component; a physical input mechanism; means for, while displaying, via the display generation component, an augmented reality user interface, detecting a contact on the physical input mechanism; means for, in response to detecting the contact on the physical input mechanism, displaying, via the display generation component, a first virtual object on the augmented reality user interface; means for, while displaying the first virtual object, detecting attention of the user that is directed to the first virtual object; and means for, in response to detecting the attention of the user that is directed to the first virtual object, performing one or more camera operations.

In accordance with some embodiments, a computer program product is described. The computer program product comprises one or more programs configured to be executed by one or more processors of a computer system that is in communication with a display generation component and a physical input mechanism, the one or more programs including instructions for: while displaying, via the display generation component, an augmented reality user interface, detecting a contact on the physical input mechanism; in response to detecting the contact on the physical input mechanism, displaying, via the display generation component, a first virtual object on the augmented reality user interface; while displaying the first virtual object, detecting attention of the user that is directed to the first virtual object; and in response to detecting the attention of the user that is directed to the first virtual object, performing one or more camera operations.

In accordance with some embodiments, a method is described. The method is performed at a computer system that is in communication with a display generation component. The method comprises: displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a computer system is described. The computer system comprises: a display generation component; one or more processors; and memory storing one or more programs configured to be executed by the one or more processors, the one or more programs including instructions for: displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a computer system is described. The computer system comprises: a display generation component; means for displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and means for, after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a computer program product is described. The computer program product comprises one or more programs configured to be executed by one or more processors of a computer system that is in communication with a display generation component, the one or more programs including instructions for: displaying, via the display generation component, an augmented reality user interface that includes a first virtual object that indicates a first portion of a route to a destination in the physical environment, wherein the first virtual object is overlaid on a first location of the physical environment that is within a first area of a physical environment, wherein one or more areas of the physical environment are visible concurrently with the first virtual object; and after displaying the first virtual object, ceasing to, via the display generation component, display the first virtual object and displaying, via the display generation component, a second virtual object that indicates the first portion of the route, wherein a second location of the physical environment at which the second virtual object is overlaid on the physical environment relative to the first location of the physical environment at which the first virtual object was overlaid on the physical environment indicates a direction of travel along the route to the destination in the physical environment.

In accordance with some embodiments, a method performed at a computer system that is in communication with a display generation component is described. The method comprises detecting a change in relative position between an indication of attention of the user in a three-dimensional environment and a location of an external device in the three-dimensional environment; and in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a change in relative position between an indication of attention of the user in a three-dimensional environment and a location of an external device in the three-dimensional environment; and in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a change in relative position between an indication of attention of the user in a three-dimensional environment and a location of an external device in the three-dimensional environment; and in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a computer system configured to communicate with a display generation component is described. The computer system comprises: one or more processors; and memory storing one or more programs configured to be executed by the one or more processors, the one or more programs including instructions for: detecting a change in relative position between an indication of attention of the user in a three-dimensional environment and a location of an external device in the three-dimensional environment; and in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a computer system configured to communicate with a display generation component is described. The computer system comprises:

means for detecting a change in relative position between an indication of attention of the user in a three-dimensional environment and a location of an external device in the three-dimensional environment; and means for, in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a computer program product is described. The computer program product comprises one or more programs configured to be executed by one or more processors of a computer system that is in communication with a display generation component, the one or more programs including instructions for: detecting a change in relative position between an indication of attention of the user in a three-dimensional environment and a location of an external device in the three-dimensional environment; and in response to detecting the change in relative position between the indication of attention of the user in the three-dimensional environment and the location of the external device in the three-dimensional environment: in accordance with a determination that a set of criteria has been satisfied, wherein the set of criteria includes a criterion that is satisfied when a determination is made that the indication of attention of the user was directed to the location of the external device in the three-dimensional environment while the external device was in a locked state, causing the external device to transition from the locked state to an unlocked state; and in accordance with a determination that the set of criteria has not been satisfied, forgoing causing the external device to transition from the locked state to the unlocked state.

In accordance with some embodiments, a method performed at a computer system that is in communication with one or more gaze-tracking sensors and a display generation component is described. The method comprises: concurrently displaying, via the display generation component: a representation of first preview content from a first application; a plurality of virtual objects that represent corresponding applications, including a virtual object that represents a second application; and an application launch virtual object; while concurrently displaying, via the display generation component, the plurality of virtual objects, the representation of the first preview content, and the application launch virtual object, detecting, via the one or more gaze-tracking sensors, that the attention of the user is directed to a respective location; and in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a non-transitory computer-readable storage medium is described. The non-transitory computer-readable storage medium stores one or more programs configured to be executed by one or more processors of a computer system that is in communication with one or more gaze-tracking sensors and a display generation component, the one or more programs including instructions for: concurrently displaying, via the display generation component: a representation of first preview content from a first application; a plurality of virtual objects that represent corresponding applications, including a virtual object that represents a second application; and an application launch virtual object; while concurrently displaying, via the display generation component, the plurality of virtual objects, the representation of the first preview content, and the application launch virtual object, detecting, via the one or more gaze-tracking sensors, that the attention of the user is directed to a respective location; and in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a transitory computer-readable storage medium is described. The transitory computer-readable storage medium stores one or more programs configured to be executed by one or more processors of a computer system that is in communication with one or more gaze-tracking sensors and a display generation component, the one or more programs including instructions for: concurrently displaying, via the display generation component: a representation of first preview content from a first application; a plurality of virtual objects that represent corresponding applications, including a virtual object that represents a second application; and an application launch virtual object; while concurrently displaying, via the display generation component, the plurality of virtual objects, the representation of the first preview content, and the application launch virtual object, detecting, via the one or more gaze-tracking sensors, that the attention of the user is directed to a respective location; and in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a computer system configured to communicate with one or more gaze-tracking sensors and a display generation component is described. The computer system comprises: one or more processors; and memory storing one or more programs configured to be executed by the one or more processors, the one or more programs including instructions for: concurrently displaying, via the display generation component: a representation of first preview content from a first application; a plurality of virtual objects that represent corresponding applications, including a virtual object that represents a second application; and an application launch virtual object; while concurrently displaying, via the display generation component, the plurality of virtual objects, the representation of the first preview content, and the application launch virtual object, detecting, via the one or more gaze-tracking sensors, that the attention of the user is directed to a respective location; and in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a computer system configured to communicate with one or more gaze-tracking sensors and a display generation component is described. The computer system comprises: means for concurrently displaying, via the display generation component: a representation of first preview content from a first application; a plurality of virtual objects that represent corresponding applications, including a virtual object that represents a second application; and an application launch virtual object; means for, while concurrently displaying, via the display generation component, the plurality of virtual objects, the representation of the first preview content, and the application launch virtual object, detecting, via the one or more gaze-tracking sensors, that the attention of the user is directed to a respective location; and means for, in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a computer program product is described. The computer program product comprises one or more programs configured to be executed by one or more processors of a computer system that is in communication with one or more gaze-tracking sensors and a display generation component, the one or more programs including instructions for: concurrently displaying, via the display generation component: a representation of first preview content from a first application; a plurality of virtual objects that represent corresponding applications, including a virtual object that represents a second application; and an application launch virtual object; while concurrently displaying, via the display generation component, the plurality of virtual objects, the representation of the first preview content, and the application launch virtual object, detecting, via the one or more gaze-tracking sensors, that the attention of the user is directed to a respective location; and in response to detecting that the attention of the user is directed to the respective location: in accordance with a determination that a set of application launch criteria has been satisfied, wherein the set of application launch criteria includes a criterion that is satisfied when the attention of the user is directed to the application launch virtual object for at least a threshold amount of time, displaying an application user interface that corresponds to the first preview content, wherein the application user interface is different from the first preview content; and in accordance with a determination that the respective location corresponds to a location of the virtual object that represents a second application, ceasing to display the representation of the first preview content and displaying, via the display generation component, a representation of second preview content from the second application.

In accordance with some embodiments, a method performed at a computer system that is in communication with a display generation component is described. The method comprises: while the computer system is being used in a physical environment, detecting a request to initiate an activity in the physical environment; after detecting the request to initiate the activity in the physical environment, displaying, via the display generation component, a first user interface, wherein displaying the first user interface includes: displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; while displaying, via the display generation component, the first user interface, detecting a change in the viewpoint of the user relative to the three-dimensional environment; and in response to detecting the change in the viewpoint of the user relative to the three-dimensional environment, updating the user interface, including: displaying, via the display generation component, the set of one or more viewpoint-locked virtual objects with the first viewpoint position relative to the viewpoint of the user and a third environment position relative to the three-dimensional environment, wherein the third environment position is different from the first environment position; and displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while the computer system is being used in a physical environment, detecting a request to initiate an activity in the physical environment; after detecting the request to initiate the activity in the physical environment, displaying, via the display generation component, a first user interface, wherein displaying the first user interface includes: displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; while displaying, via the display generation component, the first user interface, detecting a change in the viewpoint of the user relative to the three-dimensional environment; and in response to detecting the change in the viewpoint of the user relative to the three-dimensional environment, updating the user interface, including: displaying, via the display generation component, the set of one or more viewpoint-locked virtual objects with the first viewpoint position relative to the viewpoint of the user and a third environment position relative to the three-dimensional environment, wherein the third environment position is different from the first environment position; and displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a transitory computer-readable storage medium is described. The transitory computer-readable storage medium stores one or more programs configured to be executed by one or more processors of a computer system that is in communication with a display generation component, the one or more programs including instructions for; while the computer system is being used in a physical environment, detecting a request to initiate an activity in the physical environment; after detecting the request to initiate the activity in the physical environment, displaying, via the display generation component, a first user interface, wherein displaying the first user interface includes: displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; while displaying, via the display generation component, the first user interface, detecting a change in the viewpoint of the user relative to the three-dimensional environment; and in response to detecting the change in the viewpoint of the user relative to the three-dimensional environment, updating the user interface, including: displaying, via the display generation component, the set of one or more viewpoint-locked virtual objects with the first viewpoint position relative to the viewpoint of the user and a third environment position relative to the three-dimensional environment, wherein the third environment position is different from the first environment position; and displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a computer system configured to communicate with a display generation component is described. The computer system comprises: one or more processors; and memory storing one or more programs configured to be executed by the one or more processors, the one or more programs including instructions for: while the computer system is being used in a physical environment, detecting a request to initiate an activity in the physical environment; after detecting the request to initiate the activity in the physical environment, displaying, via the display generation component, a first user interface, wherein displaying the first user interface includes: displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; while displaying, via the display generation component, the first user interface, detecting a change in the viewpoint of the user relative to the three-dimensional environment; and in response to detecting the change in the viewpoint of the user relative to the three-dimensional environment, updating the user interface, including: displaying, via the display generation component, the set of one or more viewpoint-locked virtual objects with the first viewpoint position relative to the viewpoint of the user and a third environment position relative to the three-dimensional environment, wherein the third environment position is different from the first environment position; and displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a computer system configured to communicate with a display generation component is described. The computer system comprises: means for, while the computer system is being used in a physical environment, detecting a request to initiate an activity in the physical environment; means for, after detecting the request to initiate the activity in the physical environment, displaying, via the display generation component, a first user interface, wherein displaying the first user interface includes: means for displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and means for displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; means for, while displaying, via the display generation component, the first user interface, detecting a change in the viewpoint of the user relative to the three-dimensional environment; and means for, in response to detecting the change in the viewpoint of the user relative to the three-dimensional environment, updating the user interface, including: means for displaying, via the display generation component, the set of one or more viewpoint-locked virtual objects with the first viewpoint position relative to the viewpoint of the user and a third environment position relative to the three-dimensional environment, wherein the third environment position is different from the first environment position; and means for displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a computer program product is described. The computer program product comprises one or more programs configured to be executed by one or more processors of a computer system that is in communication with a display generation component, the one or more programs including instructions for: while the computer system is being used in a physical environment, detecting a request to initiate an activity in the physical environment; after detecting the request to initiate the activity in the physical environment, displaying, via the display generation component, a first user interface, wherein displaying the first user interface includes: displaying, via the display generation component, a set of one or more viewpoint-locked virtual objects in a three-dimensional environment that have a respective orientation relative to the physical environment, the set of one or more viewpoint-locked virtual objects representing one or more activity metrics, wherein the set of one or more viewpoint-locked virtual objects is displayed with a first viewpoint position relative to a viewpoint of the user and a first environment position relative to the three-dimensional environment; and displaying, via the display generation component, a set of one or more environment-locked virtual objects in the three-dimensional environment representing one or more activity progress indicators, wherein the set of one or more environment-locked virtual objects is displayed with a second viewpoint position relative to the viewpoint of the user and a second environment position relative to the three-dimensional environment; while displaying, via the display generation component, the first user interface, detecting a change in the viewpoint of the user relative to the three-dimensional environment; and in response to detecting the change in the viewpoint of the user relative to the three-dimensional environment, updating the user interface, including: displaying, via the display generation component, the set of one or more viewpoint-locked virtual objects with the first viewpoint position relative to the viewpoint of the user and a third environment position relative to the three-dimensional environment, wherein the third environment position is different from the first environment position; and displaying, via the display generation component, the set of one or more environment-locked virtual objects with a third viewpoint position relative to the viewpoint of the user and the second environment position relative to the three-dimensional environment, wherein the third viewpoint position is different from the second viewpoint position.

In accordance with some embodiments, a method performed at a computer system that is in communication with a display generation component is described. The method comprises: detecting a change in a viewpoint of a user of the computer system from a first viewpoint to a second viewpoint; in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; while displaying, via the display generation component, the first virtual object, detecting an input; and in response to detecting the input and in accordance with a determination that attention of the user was directed to the first virtual object when the input was detected, causing the first external accessory device to be changed from the first state to a second state that is different from the first state.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a change in a viewpoint of a user of the computer system from a first viewpoint to a second viewpoint; in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; while displaying, via the display generation component, the first virtual object detecting an input; and in response to detecting the input and in accordance with a determination that attention of the user was directed to the first virtual object when the input was detected, causing the first external accessory device to be changed from the first state to a second state that is different from the first state.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a change in a viewpoint of a user of the computer system from a first viewpoint to a second viewpoint; in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; while displaying, via the display generation component, the first virtual object detecting an input; and in response to detecting the input and in accordance with a determination that attention of the user was directed to the first virtual object when the input was detected, causing the first external accessory device to be changed from the first state to a second state that is different from the first state.

In accordance with some embodiments, a computer system configured to communicate with a display generation component is described. The computer system comprises: one or more processors; and memory storing one or more programs configured to be executed by the one or more processors, the one or more programs including instructions for: detecting a change in a viewpoint of a user of the computer system from a first viewpoint to a second viewpoint; in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; while displaying, via the display generation component, the first virtual object detecting an input; and in response to detecting the input and in accordance with a determination that attention of the user was directed to the first virtual object when the input was detected, causing the first external accessory device to be changed from the first state to a second state that is different from the first state.

In accordance with some embodiments, a computer system configured to communicate with a display generation component is described. The computer system comprises: means for detecting a change in a viewpoint of a user of the computer system from a first viewpoint to a second viewpoint; and means for, in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; means for, while displaying, via the display generation component, the first virtual object, detecting an input; and means for, in response to detecting the input and in accordance with a determination that attention of the user was directed to the first virtual object when the input was detected, causing the first external accessory device to be changed from the first state to a second state that is different from the first state.

In accordance with some embodiments, a computer program product is described. The computer program product comprises one or more programs configured to be executed by one or more processors of a computer system that is in communication with a display generation component, the one or more programs including instructions for: detecting a change in a viewpoint of a user of the computer system from a first viewpoint to a second viewpoint; in response to detecting the change in the viewpoint of the user of the computer system from the first viewpoint to the second viewpoint and in accordance with a determination that a set of respective criteria has been satisfied, wherein the set of respective criteria includes a criterion that is met when a first area of the physical environment that includes one or more external accessory devices is visible from the second viewpoint, displaying, via the display generation component, a first virtual object that corresponds to a first external accessory device of the one or more external accessory devices, wherein the first external accessory device is in a first state; while displaying, via the display generation component, the first virtual object detecting an input; and in response to detecting the input and in accordance with a determination that attention of the user was directed to the first virtual object when the input was detected, causing the first external accessory device to be changed from the first state to a second state that is different from the first state.

In accordance with some embodiments, a method performed at a computer system that is in communication with a display generation component is described. The method comprises: while the computer system is being used in a physical environment, detecting a request to initiate guidance to perform a physical activity in the physical environment; and in response to detecting the request to initiate the guidance to perform the physical activity in the physical environment, providing guidance to perform the physical activity that includes: displaying, via display of the display generation component, a virtual object that represents the physical activity, wherein the virtual object that represents the physical activity is overlaid on a representation of the physical environment; and in conjunction with displaying, via display of the display generation component, the virtual object that represents the physical activity overlaid on the representation of the physical environment, providing audio guidance corresponding to performance of the physical activity.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while the computer system is being used in a physical environment, detecting a request to initiate guidance to perform a physical activity in the physical environment; and in response to detecting the request to initiate the guidance to perform the physical activity in the physical environment, providing guidance to perform the physical activity that includes: displaying, via display of the display generation component, a virtual object that represents the physical activity, wherein the virtual object that represents the physical activity is overlaid on a representation of the physical environment; and in conjunction with displaying, via display of the display generation component, the virtual object that represents the physical activity overlaid on the representation of the physical environment, providing audio guidance corresponding to performance of the physical activity.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while the computer system is being used in a physical environment, detecting a request to initiate guidance to perform a physical activity in the physical environment; and in response to detecting the request to initiate the guidance to perform the physical activity in the physical environment, providing guidance to perform the physical activity that includes: displaying, via display of the display generation component, a virtual object that represents the physical activity, wherein the virtual object that represents the physical activity is overlaid on a representation of the physical environment; and in conjunction with displaying, via display of the display generation component, the virtual object that represents the physical activity overlaid on the representation of the physical environment, providing audio guidance corresponding to performance of the physical activity.

In accordance with some embodiments, a computer system configured to communicate with a display generation component is described. The computer system comprises: one or more processors; and memory storing one or more programs configured to be executed by the one or more processors, the one or more programs including instructions for: while the computer system is being used in a physical environment, detecting a request to initiate guidance to perform a physical activity in the physical environment; and in response to detecting the request to initiate the guidance to perform the physical activity in the physical environment, providing guidance to perform the physical activity that includes: displaying, via display of the display generation component, a virtual object that represents the physical activity, wherein the virtual object that represents the physical activity is overlaid on a representation of the physical environment; and in conjunction with displaying, via display of the display generation component, the virtual object that represents the physical activity overlaid on the representation of the physical environment, providing audio guidance corresponding to performance of the physical activity.

In accordance with some embodiments, a computer system configured to communicate with a display generation component is described. The computer system comprises: means for, while the computer system is being used in a physical environment, detecting a request to initiate guidance to perform a physical activity in the physical environment; and means for, in response to detecting the request to initiate the guidance to perform the physical activity in the physical environment, providing guidance to perform the physical activity that includes: means for displaying, via display of the display generation component, a virtual object that represents the physical activity, wherein the virtual object that represents the physical activity is overlaid on a representation of the physical environment; and means for, in conjunction with displaying, via display of the display generation component, the virtual object that represents the physical activity overlaid on the representation of the physical environment, providing audio guidance corresponding to performance of the physical activity.

In accordance with some embodiments, a computer program product is described. The computer program product comprises one or more programs configured to be executed by one or more processors of a computer system that is in communication with a display generation component, the one or more programs including instructions for: while the computer system is being used in a physical environment, detecting a request to initiate guidance to perform a physical activity in the physical environment; and in response to detecting the request to initiate the guidance to perform the physical activity in the physical environment, providing guidance to perform the physical activity that includes: displaying, via display of the display generation component, a virtual object that represents the physical activity, wherein the virtual object that represents the physical activity is overlaid on a representation of the physical environment; and in conjunction with displaying, via display of the display generation component, the virtual object that represents the physical activity overlaid on the representation of the physical environment, providing audio guidance corresponding to performance of the physical activity.

In accordance with some embodiments, a method performed at a computer system that is in communication with one or more gaze-tracking sensors, a display generation component, and an external device is described. The method comprises: while displaying, via the display generation component, an extended reality user interface, detecting, via the one or more gaze-tracking sensors, that attention of a user is directed to the external device; in response to detecting that the attention of the user is directed to the external device, displaying, via the display generation component, a first virtual object; while displaying, via the display generation component, the first virtual object, receiving information indicative of an input at the external device; and in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments, a non-transitory computer-readable storage medium is described. The non-transitory computer-readable storage medium stores one or more programs configured to be executed by one or more processors of a computer system that is in communication with one or more gaze-tracking sensors, a display generation component, and an external device, the one or more programs including instructions for: while displaying, via the display generation component, an extended reality user interface, detecting, via the one or more gaze-tracking sensors, that attention of a user is directed to the external device; in response to detecting that the attention of the user is directed to the external device, displaying, via the display generation component, a first virtual object; while displaying, via the display generation component, the first virtual object, receiving information indicative of an input at the external device; and in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments, a transitory computer-readable storage medium is described. The transitory computer-readable storage medium stores one or more programs configured to be executed by one or more processors of a computer system that is in communication with one or more gaze-tracking sensors, a display generation component, and an external device, the one or more programs including instructions for: while displaying, via the display generation component, an extended reality user interface, detecting, via the one or more gaze-tracking sensors, that attention of a user is directed to the external device; in response to detecting that the attention of the user is directed to the external device, displaying, via the display generation component, a first virtual object; while displaying, via the display generation component, the first virtual object, receiving information indicative of an input at the external device; and in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments, a computer system configured to communicate with one or more gaze-tracking sensors, a display generation component, and an external device is described. The computer system comprises: one or more processors; and memory storing one or more programs configured to be executed by the one or more processors, the one or more programs including instructions for: while displaying, via the display generation component, an extended reality user interface, detecting, via the one or more gaze-tracking sensors, that attention of a user is directed to the external device; in response to detecting that the attention of the user is directed to the external device, displaying, via the display generation component, a first virtual object; while displaying, via the display generation component, the first virtual object, receiving information indicative of an input at the external device; and in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments, a computer system configured to communicate with one or more gaze-tracking sensors, a display generation component, and an external device is described. The computer system comprises: means for, while displaying, via the display generation component, an extended reality user interface, detecting, via the one or more gaze-tracking sensors, that attention of a user is directed to the external device; means for, in response to detecting that the attention of the user is directed to the external device, displaying, via the display generation component, a first virtual object; means for, while displaying, via the display generation component, the first virtual object, receiving information indicative of an input at the external device; and means for, in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments computer program product is described. The computer program product comprises one or more programs configured to be executed by one or more processors of a computer system that is in communication with one or more gaze-tracking sensors, a display generation component, and an external device, the one or more programs including instructions for: while displaying, via the display generation component, an extended reality user interface, detecting, via the one or more gaze-tracking sensors, that attention of a user is directed to the external device; in response to detecting that the attention of the user is directed to the external device, displaying, via the display generation component, a first virtual object; while displaying, via the display generation component, the first virtual object, receiving information indicative of an input at the external device; and in response to receiving the information indicative of the input at the external device: in accordance with a determination that attention of the user is directed to the first virtual object, performing an operation associated with the first virtual object based on the input at the external device; and in accordance with a determination that attention the user is not directed to the first virtual object, forgoing performing the operation associated with the first virtual object based on the input at the external device.

In accordance with some embodiments, a method performed at a computer system that is in communication with a display generation component is described. The method comprises: while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; while displaying the virtual content that is viewpoint-locked and oriented relative to gravity, detecting a change in the viewpoint of the user; and in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; while displaying the virtual content that is viewpoint-locked and oriented relative to gravity, detecting a change in the viewpoint of the user; and in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; while displaying the virtual content that is viewpoint-locked and oriented relative to gravity, detecting a change in the viewpoint of the user; and in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a computer system configured to communicate with a display generation component is described. The computer system comprises: one or more processors; and memory storing one or more programs configured to be executed by the one or more processors, the one or more programs including instructions for: while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; while displaying the virtual content that is viewpoint-locked and oriented relative to gravity, detecting a change in the viewpoint of the user; and in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a computer system configured to communicate with a display generation component is described. The computer system comprises: means for, while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; means for, while displaying the virtual content that is viewpoint-locked and oriented relative to gravity, detecting a change in the viewpoint of the user; and means for, in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a computer program product is described. The computer program product comprises one or more programs configured to be executed by one or more processors of a computer system that is in communication with a display generation component, the one or more programs including instructions for: while a viewpoint of a user is in a first orientation relative to gravity, displaying, via the display generation component, virtual content in a three-dimensional environmental, wherein the virtual content is viewpoint-locked to a respective location relative to the viewpoint of the user and the virtual content is oriented relative to gravity; while displaying the virtual content that is viewpoint-locked and oriented relative to gravity, detecting a change in the viewpoint of the user; and in response to detecting the change in the viewpoint of the user, maintaining display of the virtual content in the three-dimensional environment at the respective location relative to the viewpoint of the user and adjusting an orientation of the virtual content relative to the viewpoint of the user, including: in accordance with a determination that the viewpoint of the user has changed from being in the first orientation relative to gravity to being in a second orientation relative to gravity that is different from the first orientation, modifying, via the display generation component, display of the virtual content in the three-dimensional environment in a first manner such that the virtual content continues to be oriented relative to gravity while the viewpoint of the user is in the second orientation; and in accordance with a determination that the viewpoint of the user has changed from being in the first orientation relative to gravity to being in a third orientation relative to gravity that is different from the first orientation and the second orientation, modifying, via the display generation component, display of the virtual content in the three-dimensional environment in a second manner such that the virtual content continues to be oriented relative to gravity while the viewpoint of the user is in the third orientation, wherein the second manner is different from the first manner.

In accordance with some embodiments, a method performed at a computer system that is in communication with a display generation component is described. The method comprises: while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; while navigating through the virtual content in the first navigation direction and displaying the navigation virtual object indicating the first navigation direction, detecting a change in direction of the attention of the user; and in response to detecting the change in direction of the attention of the user: navigating through the virtual content in a second navigation direction that is different from the first navigation direction; and shifting the navigation virtual object to indicate the second navigation direction.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; while navigating through the virtual content in the first navigation direction and displaying the navigation virtual object indicating the first navigation direction, detecting a change in direction of the attention of the user; and in response to detecting the change in direction of the attention of the user: navigating through the virtual content in a second navigation direction that is different from the first navigation direction; and shifting the navigation virtual object to indicate the second navigation direction.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; while navigating through the virtual content in the first navigation direction and displaying the navigation virtual object indicating the first navigation direction, detecting a change in direction of the attention of the user; and in response to detecting the change in direction of the attention of the user: navigating through the virtual content in a second navigation direction that is different from the first navigation direction; and shifting the navigation virtual object to indicate the second navigation direction.

In accordance with some embodiments, a computer system configured to communicate with a display generation component is described. The computer system comprises: one or more processors; and memory storing one or more programs configured to be executed by the one or more processors, the one or more programs including instructions for: while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; while navigating through the virtual content in the first navigation direction and displaying the navigation virtual object indicating the first navigation direction, detecting a change in direction of the attention of the user; and in response to detecting the change in direction of the attention of the user: navigating through the virtual content in a second navigation direction that is different from the first navigation direction; and shifting the navigation virtual object to indicate the second navigation direction.

In accordance with some embodiments, a computer system configured to communicate with a display generation component is described. The computer system comprises: means for, while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; means for, while navigating through the virtual content in the first navigation direction and displaying the navigation virtual object indicating the first navigation direction, detecting a change in direction of the attention of the user; and means for, in response to detecting the change in direction of the attention of the user:

navigating through the virtual content in a second navigation direction that is different from the first navigation direction; and shifting the navigation virtual object to indicate the second navigation direction.

In accordance with some embodiments, a computer program product is described. The computer program product comprises one or more programs configured to be executed by one or more processors of a computer system that is in communication with a display generation component, the one or more programs including instructions for: while displaying, via the display generation component, a respective virtual object that includes virtual content and while attention of a user is directed to the respective virtual object, navigating through the virtual content in a first navigation direction and displaying a navigation virtual object, wherein the navigation virtual object indicates the first navigation direction, and wherein the first navigation direction is based on a detected direction of the attention of the user; while navigating through the virtual content in the first navigation direction and displaying the navigation virtual object indicating the first navigation direction, detecting a change in direction of the attention of the user; and in response to detecting the change in direction of the attention of the user: navigating through the virtual content in a second navigation direction that is different from the first navigation direction; and shifting the navigation virtual object to indicate the second navigation direction.

Note that the various embodiments described above can be combined with any other embodiments described herein. The features and advantages described in the specification are not all inclusive, and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 5 is a block diagram illustrating an eye tracking unit of a computer system that is configured to capture gaze inputs of the user in accordance with some embodiments.

FIGS. 7A-7G4 illustrate example techniques for performing one or more wake operations, in accordance with some embodiments.

FIG. 8 is a flow diagram of methods for performing one or more wake operations, in accordance with some embodiments.

FIG. 10 is a flow diagram of methods for displaying content associated with an external device, in accordance with some embodiments.

FIGS. 11A1-11E3 illustrate example techniques for performing one or more operations based on an input scheme, in accordance with some embodiments.

FIG. 12 is a flow diagram of methods for performing one or more operations based on an input scheme, in accordance with some embodiments.

FIG. 14 is a flow diagram of methods for displaying virtual objects for controlling a camera setting, in accordance with some embodiments.

FIG. 16 is a flow diagram of methods for providing navigation guidance, in accordance with some embodiments.

FIG. 18 is a flow diagram of methods for displaying virtual objects associated with an external device, in accordance with some embodiments.

FIGS. 20A-20B are a flow diagram of methods for navigating a user interface, in accordance with some embodiments.

FIGS. 22A-22B are a flow diagram of methods for displaying virtual objects for performing a physical activity, in accordance with some embodiments.

FIG. 24 is a flow diagram of methods for displaying virtual objects for controlling one or more external devices, in accordance with some embodiments.

FIG. 26 is a flow diagram of methods for providing guidance for a physical activity, in accordance with some embodiments.

FIG. 28 is a flow diagram of methods for displaying virtual objects to perform one or more operations associated with an external device, in accordance with some embodiments.

FIG. 30 is a flow diagram of methods for controlling the orientation of virtual objects, in accordance with some embodiments.

FIG. 32 is a flow diagram of methods for navigating a user interface based on the attention of a user, in accordance with some embodiments.

DESCRIPTION OF EMBODIMENTS

The present disclosure relates to user interfaces for providing an extended reality (XR) experience to a user, in accordance with some embodiments. The systems, methods, and GUIs described herein improve user interface interactions with virtual/augmented reality environments in multiple ways.

FIGS. 1-6 provide a description of example computer systems for providing XR experiences to users. FIGS. 7A-7G4 illustrate example techniques for performing one or more wake operations, in accordance with some embodiments. FIG. 8 is a flow diagram of methods for performing one or more wake operations, in accordance with some embodiments. The user interfaces in FIGS. 7A-7G4 are used to illustrate the method in FIG. 8. FIGS. 9A-9G illustrate example techniques for displaying content associated with an external device, in accordance with some embodiments. FIG. 10 is a flow diagram of methods for displaying content associated with an external device, in accordance with some embodiments. The user interfaces in FIGS. 9A-9G are used to illustrate the method in FIG. 10. FIGS. 11A1-11E3 illustrate example techniques for performing one or more operations based on an input scheme, in accordance with some embodiments. FIG. 12 is a flow diagram of methods for performing one or more operations based on an input scheme, in accordance with some embodiments. The user interfaces in FIGS. 11A1-11E3 are used to illustrate the method in FIG. 12. FIGS. 13A-13G illustrate example techniques for displaying virtual objects for controlling a camera setting, in accordance with some embodiments. FIG. 14 is a flow diagram of methods for displaying virtual objects for controlling a camera setting, in accordance with some embodiments. The user interfaces in FIGS. 13A-13G are used to illustrate the method in FIG. 14. FIGS. 15A-15H illustrate example techniques for providing navigation guidance, in accordance with some embodiments. FIG. 16 is a flow diagram of methods for providing navigation guidance, in accordance with some embodiments. The user interfaces in FIGS. 15A-15H are used to illustrate the method in FIG. 16. FIGS. 17A-17F illustrate example techniques for displaying virtual objects associated with an external device, in accordance with some embodiments. FIG. 18 is a flow diagram of methods for displaying virtual objects associated with an external device, in accordance with some embodiments. The user interfaces in FIGS. 17A-17F are used to illustrate the method in FIG. 18. FIGS. 19A-19E illustrate example techniques for navigating a user interface, in accordance with some embodiments. FIGS. 20A-20B are a flow diagram of methods for navigating a user interface, in

US 12,619,303 B2

Figure 29A:
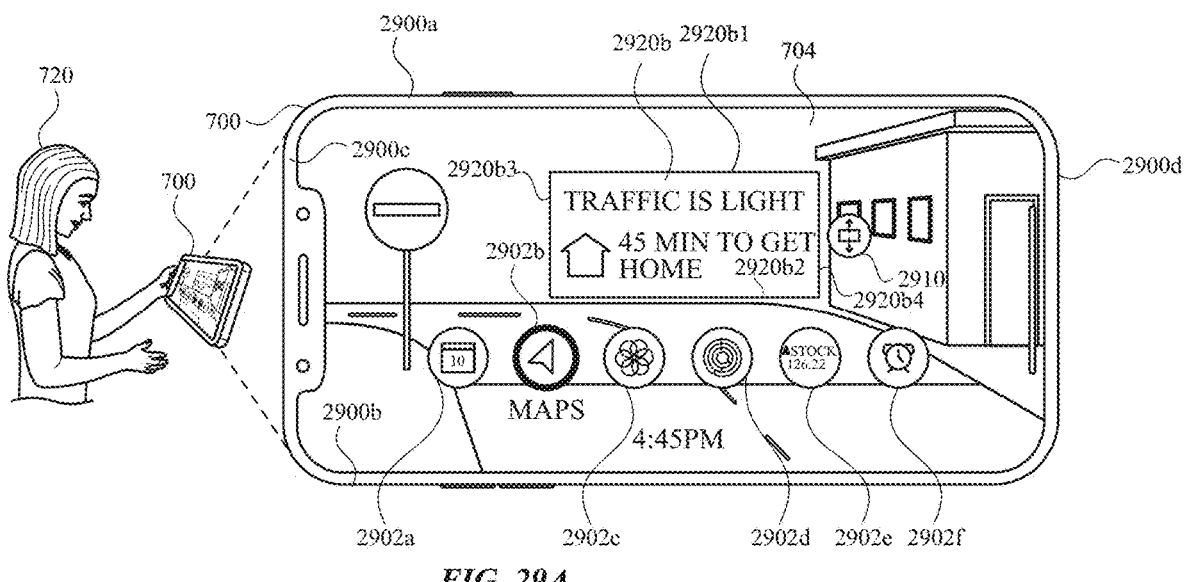
FIGS. 29A-29B illustrate example techniques for controlling the orientation of virtual objects, in accordance with some embodiments.
Figure 29B:
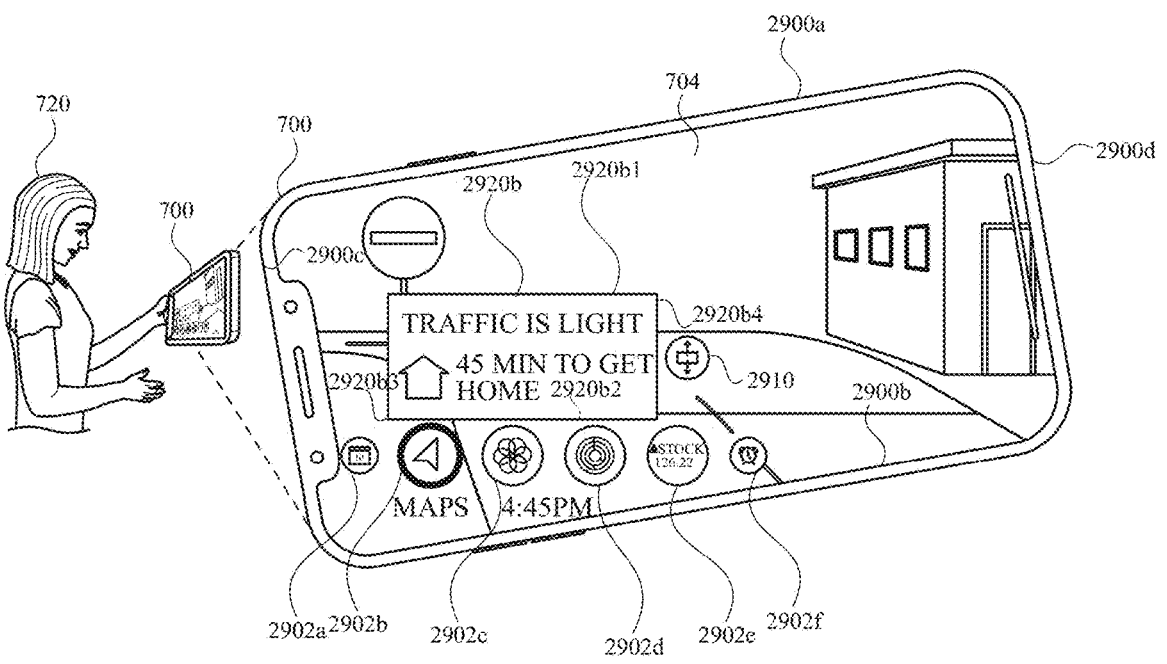

37
38 accordance with some embodiments. The user interfaces in FIGS. 19A-19E are used to illustrate the method in FIGS. 20A-20B. FIGS. 21A-21F illustrate example techniques for displaying virtual objects for performing a physical activity, in accordance with some embodiments. FIGS. 22A-22B are a flow diagram of methods for displaying virtual objects for performing a physical activity, in accordance with some embodiments. The user interfaces in FIGS. 21A-21F are used to illustrate the method in FIGS. 22A-22B. FIGS. 23A-23F illustrate example techniques for displaying virtual objects for controlling one or more external devices, in accordance with some embodiments. FIG. 24 is a flow diagram of methods for displaying virtual objects for controlling one or more external devices, in accordance with some embodiments. The user interfaces in FIGS. 23A-23F are used to illustrate the method in FIG. 24. FIGS. 25A-25E illustrate example techniques for providing guidance for a physical activity, in accordance with some embodiments. FIG. 26 is a flow diagram of methods for providing guidance for a physical activity. The user interfaces in FIGS. 25A-25E are used to illustrate the method in FIG. 26, in accordance with some embodiments. FIGS. 27A-27D illustrate example techniques for displaying virtual objects to perform one or more operations associated with an external device, in accordance with some embodiments. FIG. 28 is a flow diagram of methods for displaying virtual objects to perform one or more operations associated with an external device, in accordance with some embodiments. The user interfaces in FIGS. 27A-27D are used to illustrate the method in FIG. 28. FIGS. 29A-29B illustrate example techniques for controlling the orientation of virtual objects, in accordance with some embodiments. FIG. 30 is a flow diagram of methods for controlling the orientation of virtual objects, in accordance with some embodiments. The user interfaces in FIGS. 29A-29B are used to illustrate the method in FIG. 30. FIGS. 31A-31H illustrate example techniques for navigating a user interface based on the attention of a user, in accordance with some embodiments. FIG. 32 is a flow diagram of methods for navigating a user interface based on the attention of a user, in accordance with some embodiments. The user interfaces in FIGS. 31A-31H are used to illustrate the method in FIG. 32.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
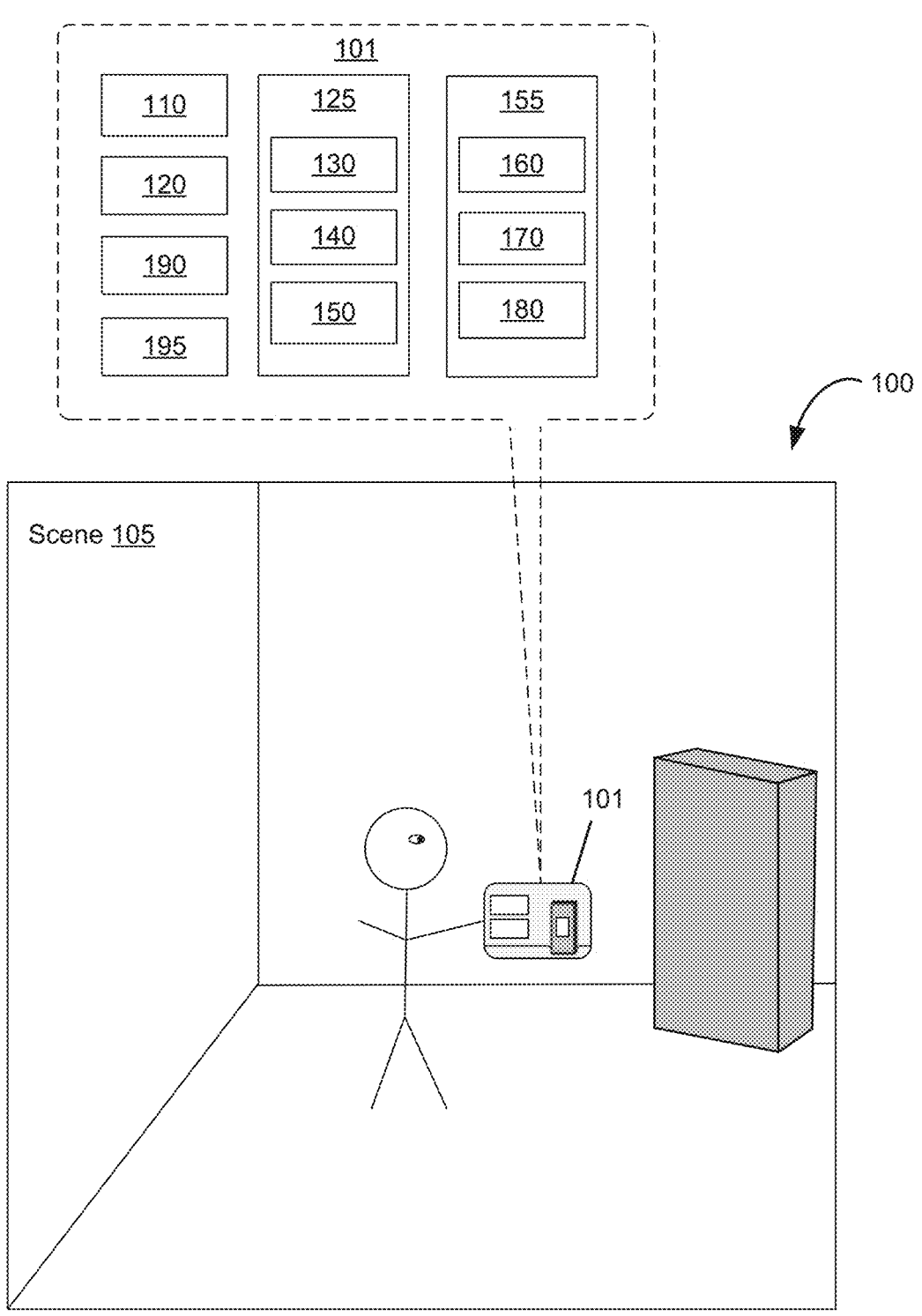
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment.

In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
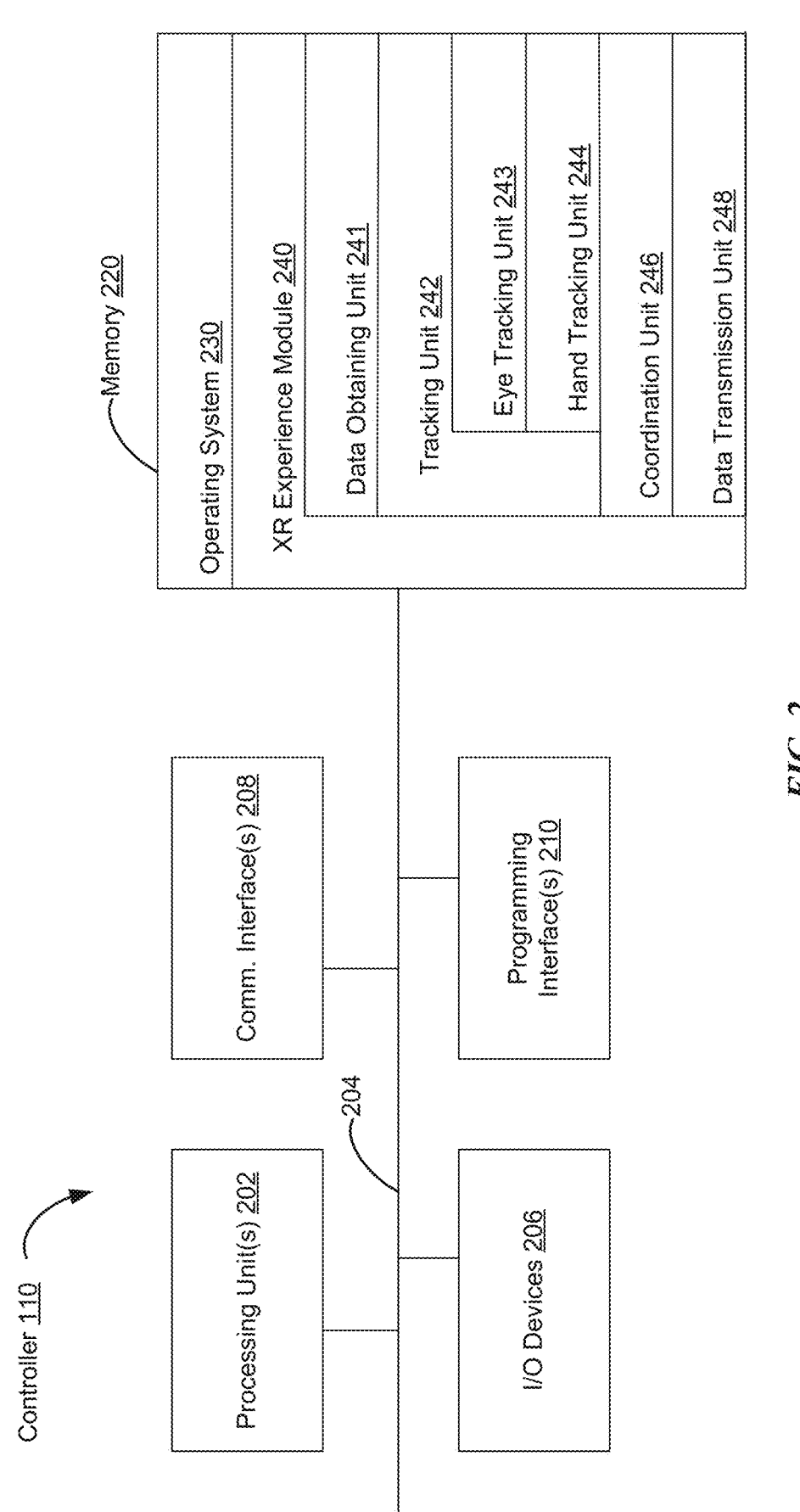
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
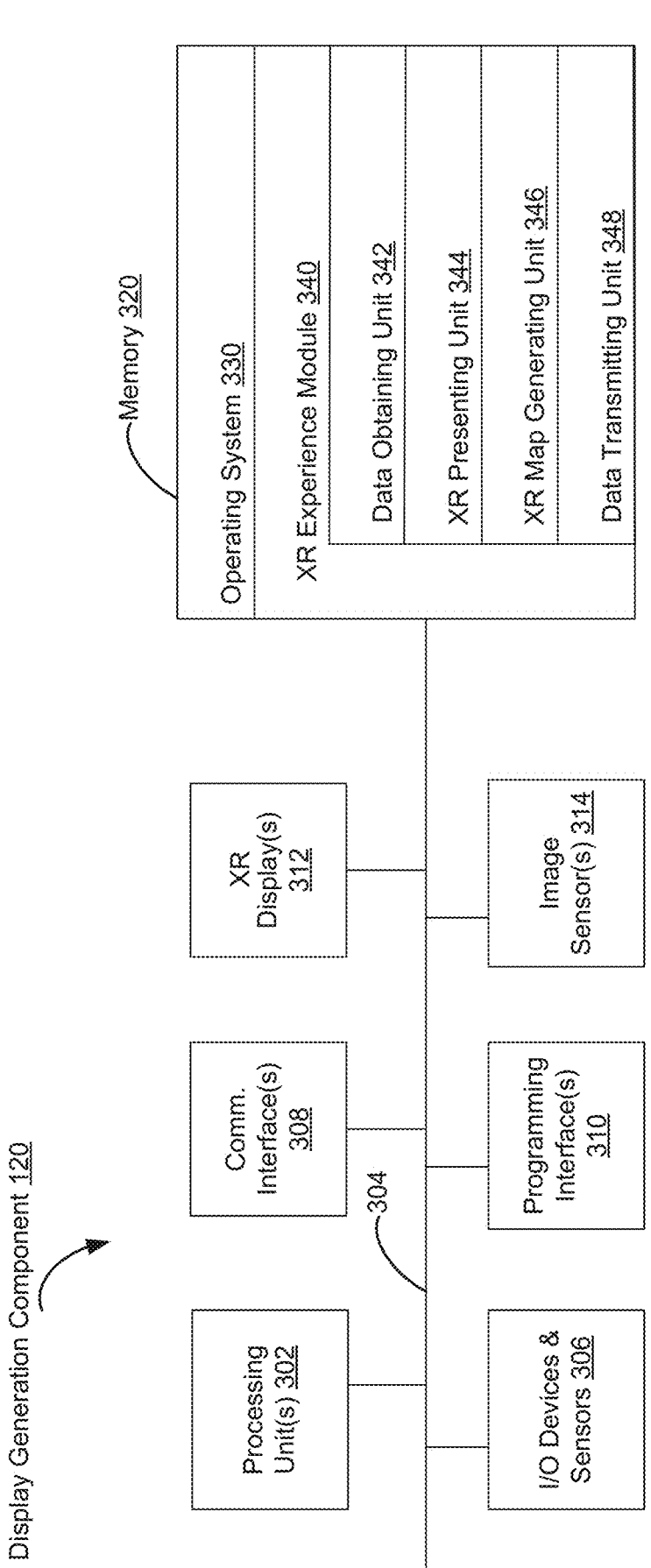
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand that makes the two or more fingers contact each other, that is, optionally, followed by an immediate (e.g., within 0-1 seconds) break in contact from each other. A long pinch gesture that is an air gesture includes movement of two or more fingers of a hand that makes the two or more fingers contact each other for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers, such that the two or more fingers contact each other, and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch, and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape, and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, the location(s) and movements of these key feature points over multiple image frames are used by the controller 110 to determine the hand gestures performed by the hand or the current state of the hand, in accordance with some embodiments.

Figure 5:
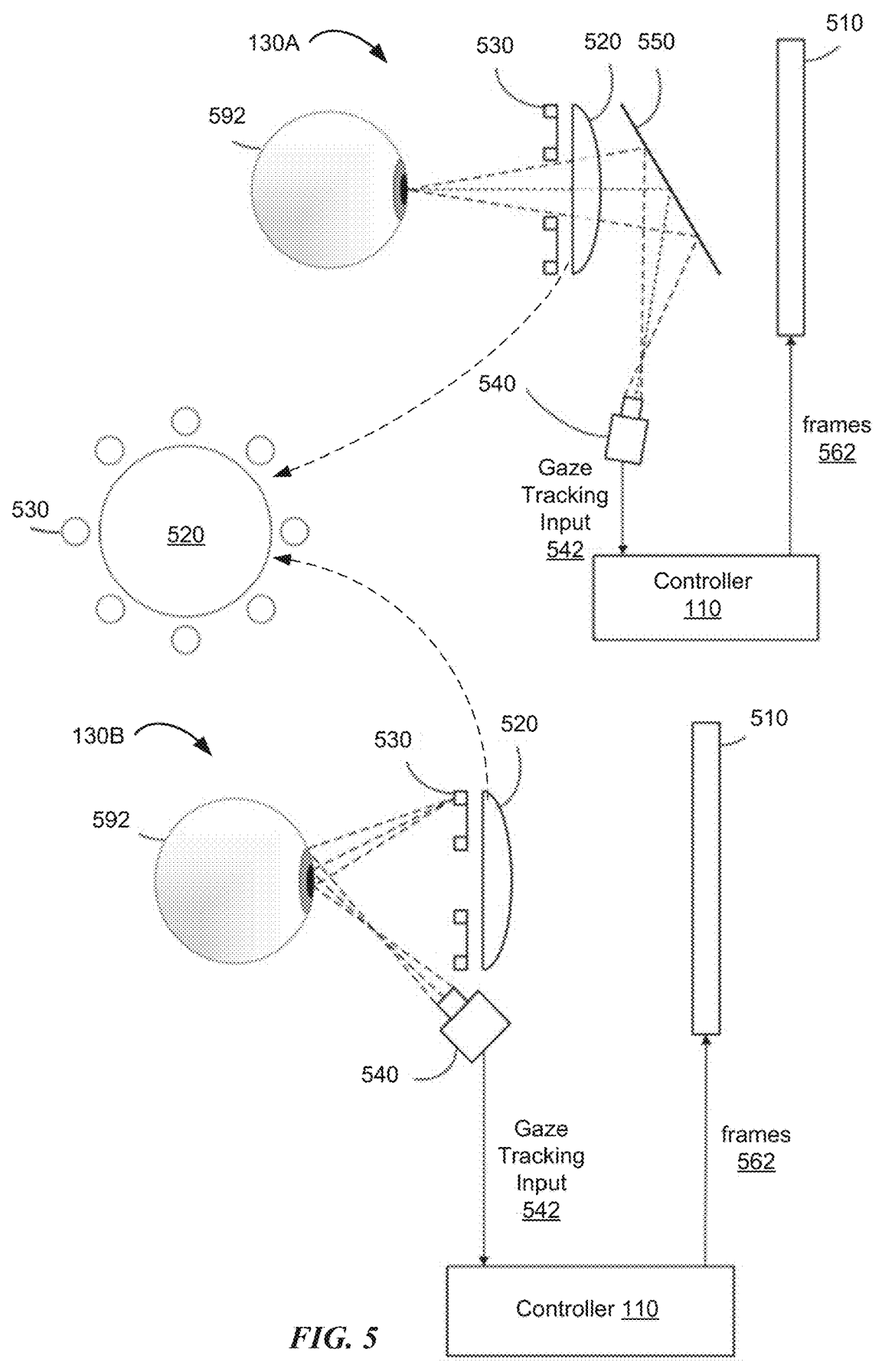

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
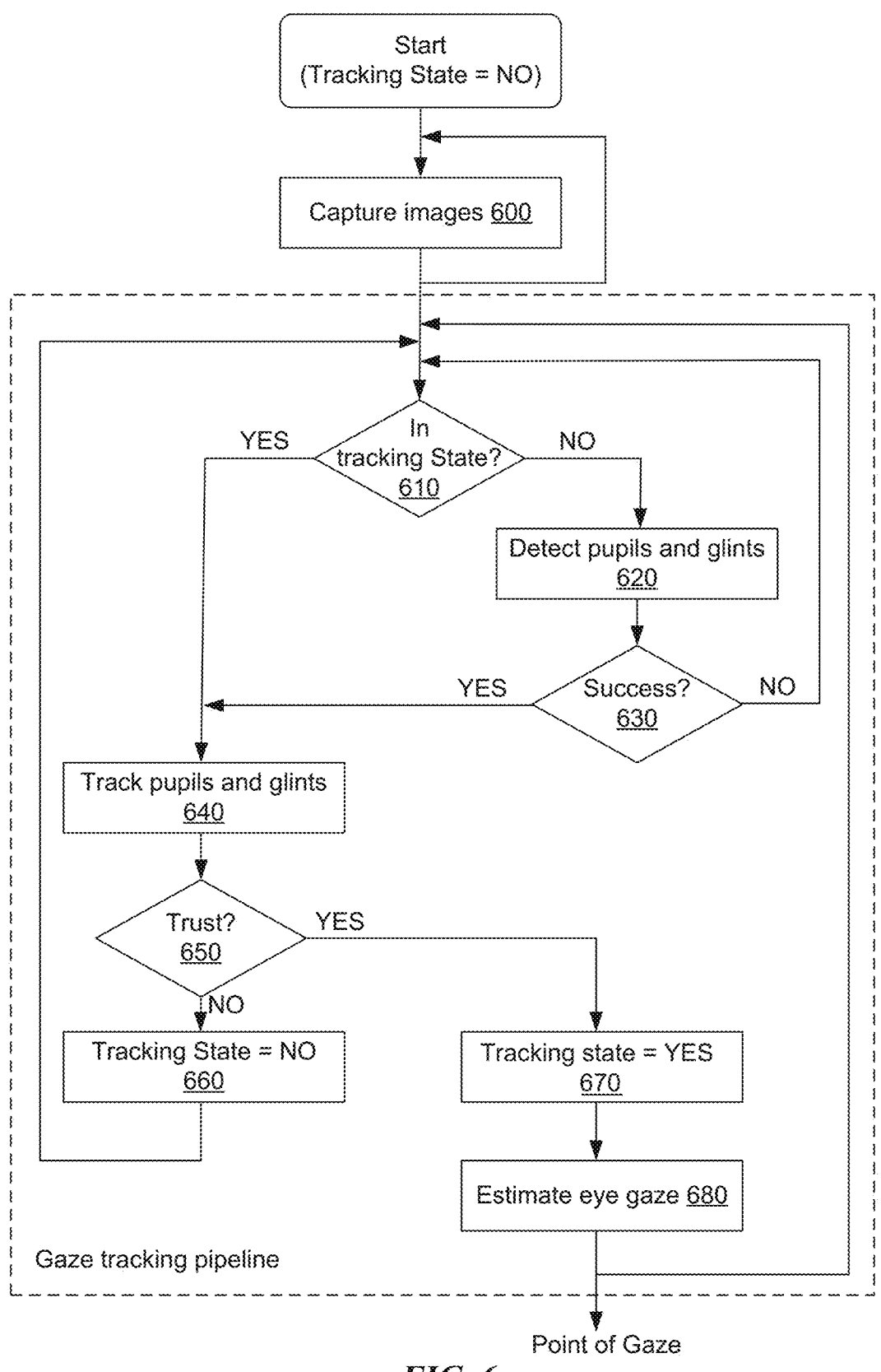
FIG. 6 is a flow diagram illustrating a glint-assisted gaze tracking pipeline in accordance with some embodiments.
Figure 7A:
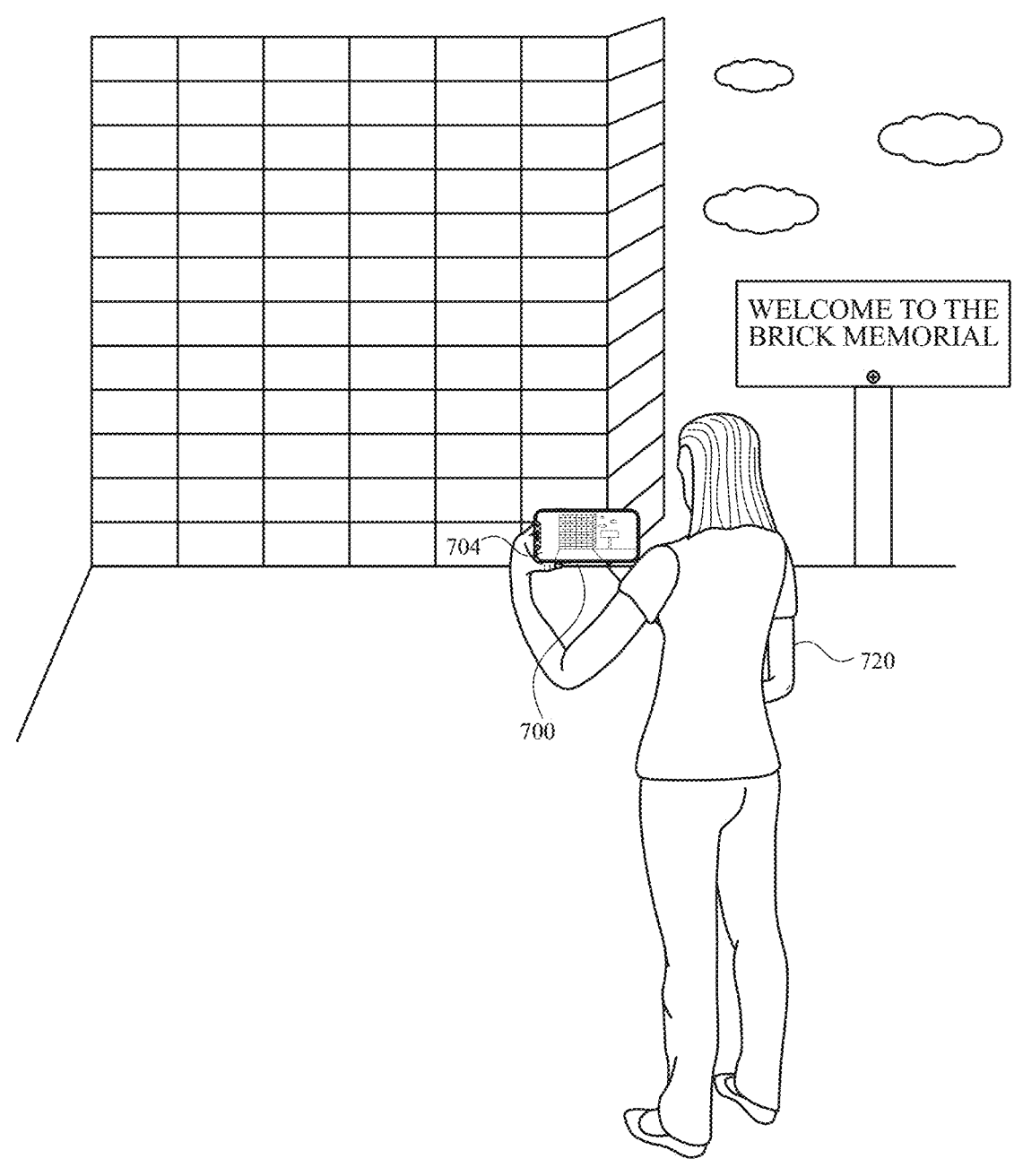

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component. In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras.

FIGS. 7A-7G4 illustrate example techniques for performing one or more wake operations, in accordance with some embodiments. FIG. 8 is a flow diagram of methods for performing one or more wake operations, in accordance with some embodiments. The user interfaces in FIGS. 7A-7G4 are used to illustrate the method in FIG. 8.

Figure 7B:
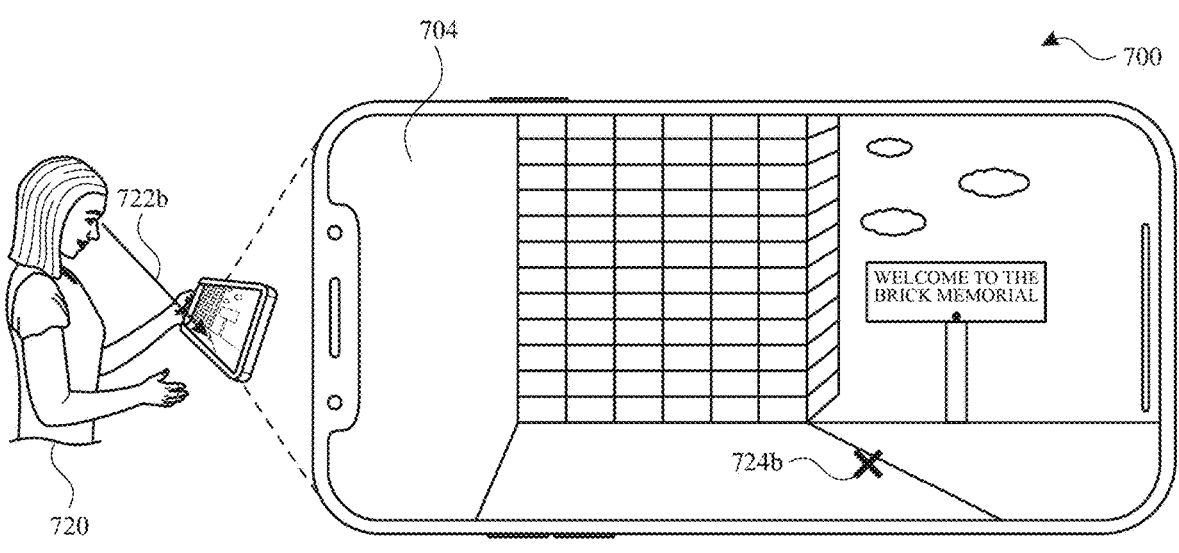

FIG. 7A illustrates user 720 holding computer system 700 that includes display 704 in a physical environment. The physical environment includes a brick memorial and a sign (e.g., "WELCOME TO THE BRICK MEMORIAL"). User 720 is holding computer system 700 such that the brick memorial and the sign are presented via display 704. Display 704 is the viewpoint of user 720. That is, when user 720 looks at display 704, user 720 can see the physical environment along with one or more virtual objects that computer system 700 can display (e.g., as shown in FIGS. 7B-7G3). Thus, computer system 700 presents an augmented reality environment through display 704, the viewpoint of user 720. While computer system 700 is a phone in FIG. 7A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "passthrough video" as described above). In some embodiments, computer system 700, via display 704, displays a representation of a virtual environment (e.g., instead of the physical environment at FIG. 7A). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). In such embodiments, virtual objects can be displayed in an area of display 704 that is illuminated by a set of projectors that are turned on; however, virtual objects cannot be displayed in an area of display 704 that is illuminated by the set of projectors that are turned off. In some embodiments, computer system 700 is configured to use more energy when more projectors are on than when fewer projectors are on during a period of time. Thus, in some embodiments, efficient management of when the projectors are turned on can reduce power consumption and preserve the battery life of computer system 700. In some embodiments, the same logic that applies to a display that includes projectors can also apply to display systems that include multiple displays, display panels, and/or one or more sets of LEDs. In some embodiments, computer system 700 is configured to use more energy when more displays, display panels, and/or LEDs are on (or off) than when fewer displays, display panels, and/or LEDs are on during a period of time. Thus, in some embodiments, efficient management of when the displays, display panels, and/or LEDs are turned on (or off) can reduce power consumption and preserve the battery life of computer system 700. For ease of discussion, the description below describes FIGS. 7A-7G4 with respect to computer system 700 having a transparent display (e.g., 704), which includes one or more projectors that cause virtual objects to be superimposed on the physical environment (e.g., as presented on display 704).

At FIG. 7B, computer system 700 is operating in a "lower power mode" and is not displaying any virtual objects via display 704. While operating in the "lower power mode," most (or all) of the set of projectors of display 704 are turned off and/or are inactive. Thus, while operating in the "lower power mode," computer system 700 is not configured to display virtual objects on most (or) all of display 704. Moreover, because most (or all) projectors of display 704 are turned off, computer system 700 is using less energy (e.g., battery power) while operating in FIG. 7B than computer system 700 would use if one or more sets of projectors of display 704 were turned on at FIG. 7B. While the term "lower power mode" is being used herein, it should be understood that computer system 700 does not necessarily use minimal power in the "lower power mode" and/or the minimum amount of power that computer system 700 can use. The term "lower power mode" is only used to serve as a comparison to other power modes, such as "low power mode" and "high power" that are discussed below. As used herein, computer system 700 is configured to use less power while operating in "lower power mode" than when operating in "low power mode" and is further configured to use less power while operating in "low power mode" than when operating in "high power mode." In some embodiments, while operating in the "lower power mode," the computer system 700 and/or display 704 are in a sleep mode, hibernate mode, a battery saver mode, and/or a standby mode. In some embodiments, display 704 is off (e.g., the projectors of display 704 are not turned on) while computer system 700 and/or display 704 are operating in the "lower power mode." In some embodiments, while operating in the "low power mode," computer system 700 and/or display 704 are in a reduced power mode, a partially awaken power mode, and/or a battery saver mode. In some embodiments, one or more portions of display 704 are off and one or more portions of display 704 are on (e.g., a subset of the projectors are on and/or a subset of the projectors are off) while computer system 700 and/or display 704 are operating in the "low power mode." In some embodiments, while operating in the "high power mode," computer system 700 and/or display 704 are in a full power mode, a fully awaken power mode, and/or a high-performance mode (and is not in a hibernate mode, a battery saver mode, and/or a standby mode). In some embodiments, most (or all) projectors of display 704 are on while computer system 700 and/or display 704 are operating in the "high power mode." In some embodiments, more projectors of display 704 are on while computer system 700 and/or display 704 are operating in the "high power mode" than when computer system 700 and/or display 704 are operating in the "low power mode." In some embodiments, while operating in any of the power modes, one or more sensors (e.g., gaze tracking sensors (e.g., eye tracking device 130) of computer system 700 are on. In some embodiments, some of the sensors that are on in one power mode are off in another power mode, and some of the sensors that are off in one power mode are on in another power mode. In some embodiments, some of the sensors are on (or off) in all three power modes (e.g., the "lower power mode," "low power mode," and "high power mode").

At FIG. 7B, while operating in the lower power mode, computer system 700 detects the gaze of user 720 (e.g., via eye tracking device 130) in gaze direction 722b and at gaze location 724b on display 704 (e.g., for a respective predetermined period of time (e.g., 0.2-5 seconds). At FIG. 7B, a determination is made that gaze location 724b (or gaze direction 722b) is not within a predetermined distance (e.g., 0.1-100 mm) from a predefined location for changing the power mode of computer system 700 (e.g., and/or a predetermined location for waking computer system 700). At FIG. 7B, because of this determination, computer system 700 remains in the "lower power mode." In some embodiments, the determination is made that gaze direction 722b is not within a set of predetermined directions for changing the power mode of computer system 700, and computer system 700 remains in the "lower power mode" due to this determination. It should be understood through the description presented herein, at least with respect to the figures and methods 800, 1000, 1200, 1400, 1600, 1800, 2000, 2200, 2400, 2600, 2800, 3000, 3200, and so forth, that detection of the gaze of a user and/or a determination based on the gaze of the user can be made by computer system 700 based on the direction of the gaze and/or the gaze location that computer system 700 has determined. In some embodiments, the detection of the gaze of a user and/or a determination based on the gaze of the user can be made by computer system 700 based on the detected direction of the gaze and/or the detected gaze location, where the direction of the gaze and/or the gaze location can be used interchangeably to make a particular determination. In some embodiments, computer system 700 displays a virtual object (e.g., "X" that is labeled 724b in FIG. 7B) that corresponds to the gaze location (e.g., such as gaze location 724b, 724c, and so forth), which can provide the user with feedback as to the detected location of the gaze. However, in alternative embodiments, computer system 700 docs not display a virtual object (or any user interface element) that corresponds to the gaze location.

Figure 7C:
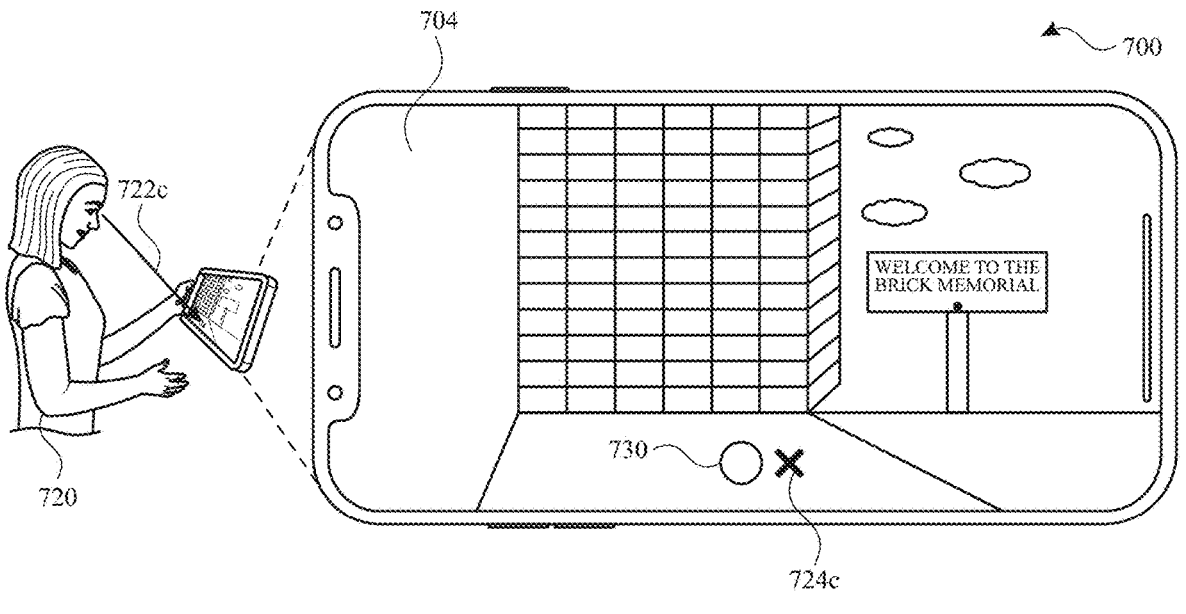

At FIG. 7C, computer system 700 detects the gaze of the user in a different direction and at a different location on display 704. In particular, computer system 700 detects that the gaze of user 720 is in gaze direction 722c and at gaze location 724c on display 704 for the respective predetermined period of time. In response to detecting that the gaze of user 720 is in gaze direction 722c and/or at gaze location 724c, computer system 700 displays gaze target 730 because a determination is made that gaze location 724c is within the predetermined distance (e.g., 0.1-100 mm) from a predefined location (e.g., an area) for changing the power mode of computer system 700. Gaze target 730 indicates that computer system 700 can be transitioned to a new power mode (e.g., the "high power mode"), if certain conditions are met. At FIG. 7C, because the determination was made that gaze location 724c is within the predetermined distance from a predefined location for changing the power mode of computer system 700, computer system 700 and/or display 704 is configured to operate in the "low power mode." Thus, at FIG. 7C, computer system 700 has turned on a subset of projectors of display 704 to display gaze target 730. However, computer system 700 has not turned on most of the projectors of display 704. For example, computer system 700 has not turned on the projectors that project virtual objects in the area of display 704 that are overlaid on the brick wall and sign in the physical sign. In some embodiments, computer system 700 does not turn on these projectors because gaze target 730 and/or one or more virtual objects would not be presented in this area as the computer system operates in the "low power mode." In some embodiments, while display gaze target 730, computer system 700 detects that the gaze of user 720 has moved from gaze location 724c to gaze location 724b and, in response to detecting that the gaze of user 720 has moved from gaze location 724c to gaze location 724b (e.g., for the respective predetermined period of time), computer system 700 ceases to display gaze target 730 (e.g., because gaze location 724b is not within the predetermined distance from a predefined location for changing the power mode of computer system 700). In some embodiments, as a part of ceasing to display gaze target 730, computer system 700 gradually fades out gaze target 730 and turns off the one or more projectors that illuminate an area that gaze target 730 occupied. In some embodiments, after ceasing to display gaze target 730, computer system 700 is transitioned back to operating in the "lower power mode" and is no longer operating in the "low power mode."

Figure 7D:
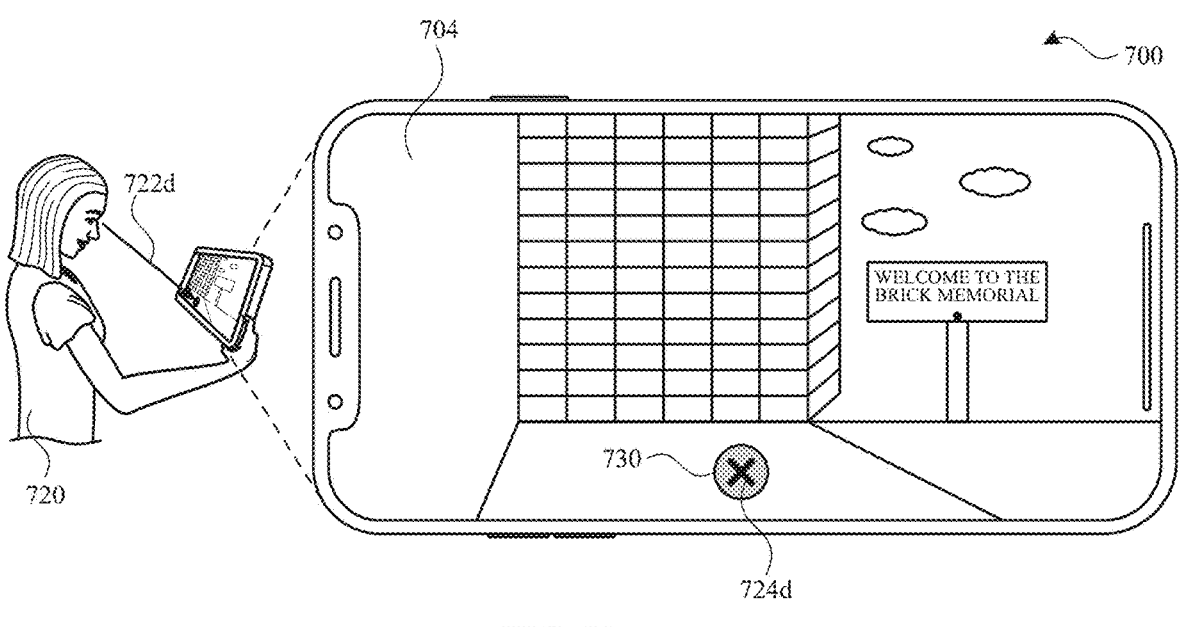

At FIG. 7D, computer system 700 detects the gaze of user 720 in a different direction and at a different location on display 704. In particular, computer system 700 detects that the gaze of user 720 is in gaze direction 722d and at gaze location 724d on display 704 for a respective predetermined period of time. Because gaze location 724d is within a predetermined distance (e.g., 0.1-50 mm) from, or directly on, gaze target 730 while gaze target 730 is displayed (e.g., inside of gaze target 730 (and, in some embodiments, near and outside of the border of gaze target 730)), computer system 700 emphasizes gaze target 730 by enlarging gaze target 730 and changing the color of gaze target 730. In some embodiments, computer system 700 gradually enlarges and/or changes the color of gaze target 730 as the computer system continues to detect that the user is gazing at a location on display 704 that is within a predetermined distance (e.g., 0.1-50 mm) from gaze target 730. In some embodiments, computer system 700 emphasizes gaze target 730 by displaying an animation of color filling up gaze target 730. In some embodiments, computer system 700 enlarges the gaze target before changing the color of the gaze target, or vice-versa.

Figure 7E:
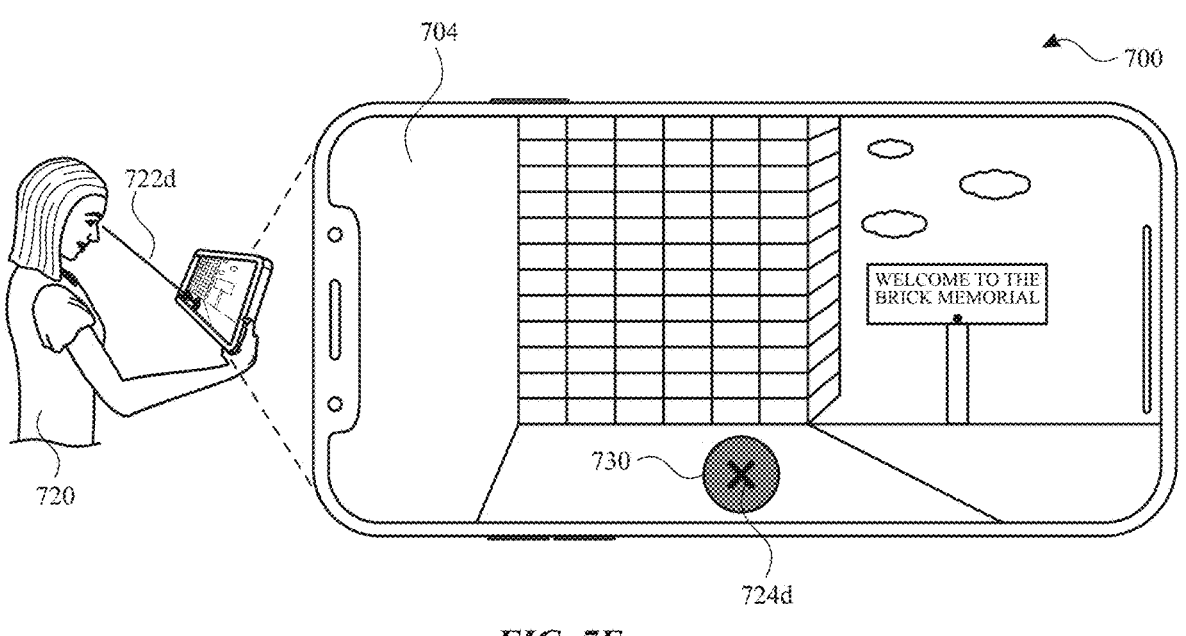

At FIG. 7E, computer system 700 continues to detect the gaze of user 720 in gaze direction 722d and at gaze location

724d. Because computer system 700 has continued to detect the gaze target at a location on display 704 that is within the predetermined distance from gaze target 730, computer system 700 continues to emphasize gaze target 730 over a period of time (e.g., while the gaze of the user is being detected at a location that is within the predetermined distance from gaze target 730). Looking at FIGS. 7C-7D, computer system 730 has darkened and increased the size of gaze target 730 while detecting the gaze of user 720 at gaze location 724d. In some embodiments, upon detecting that the gaze is not at a location that is within the predetermined distance from the gaze target, computer system 700 ceases to display the gaze target and transitions back to operating in the "lower power mode" (e.g., as described above in relation to FIG. 7D). In addition, at FIGS. 7C-7E, computer system 700 has continued to operate in the "low power mode" while transitioning gaze target 730.

FIGS. 7E and 7G1-7G3 illustrate an exemplary embodiment for configuring the computer system to operate in the "high power mode." At FIG. 7E, computer system 700 continues to detect the gaze of user 720 in gaze direction 722d and at gaze location 724d. Because computer system 700 has continued to detect the user's gaze at the location on display 704 that is within the predetermined distance from gaze target 730 for longer than a predetermined period of time (e.g., 0.2-5 seconds), computer system 700 is configured to operate in the "high power mode," and one or more of the user interfaces displayed in FIG. 7G1-G3 are displayed. The user interfaces of FIG. 7G1-G3 represent different exemplary user interfaces that can be displayed when computer system 700 is initially transitioned to the "high power mode."

As illustrated in FIGS. 7G1-7G3, computer system 700 turns on more of the projectors of display 704 (e.g., than the number of projectors that were turned on while computer system 700 operated in the "low power mode"). Thus, as illustrated in FIGS. 7G1-G3, more areas of display 704 are used to display virtual objects, such as the virtual objects of menu 764, status information 754, and application virtual objects 760a-760h as shown in FIG. 7G1 (e.g., and also included in FIGS. 7G2-7G3). In some embodiments, menu 764 is a menu that is used to launch an application and/or transition between running applications (e.g., a dock (e.g., a system dock) and/or a system bar (e.g., an application bar)). In some embodiments, one or more virtual objects other than application virtual objects 760a-760h are included in menu 764. In some embodiments, when a respective application virtual object is selected (e.g., using one or more techniques discussed below in relation to FIGS. 11A1-11E3), computer system 700 launches an application that corresponds to the respective application virtual object and display a user interface that corresponds to the respective application virtual object (e.g., the user interface of FIG. 7G1 (or 7G2-7G3). In some embodiments, status information 754 includes status information such as a time (e.g., 3:30) and a battery level (e.g., 100%). In some embodiments, status information 754 includes one or more other types of status information (e.g., an indication of whether or not computer system 700 is using a particular input scheme (e.g., as described below in relation to FIGS. 11A1-11E3)).

The user interface of FIG. 7G1 is a notifications user interface and/or a wake screen user interface that computer system 700 can display after initially being transitioned to the "high power mode" (and/or because computer system 700 has continued to detect the user's gaze at the location on display 704 that is within the predetermined distance from gaze target 730 for longer than the predetermined period of time). As illustrated in FIG. 7G1, when the computer system is transitioned to operate in the "high power mode," gaze target 730 ceases to be displayed. In some embodiments, one or more virtual objects on the user interface of FIG. 7G1 (e.g., such as virtual object 760e) are displayed in the location at which the gaze target was previously displayed.

The user interface of FIG. 7G2 is a stocks application user interface (e.g., such as the stocks application discussed in FIG. 9G below), which is being displayed because a determination was made that a stocks application (e.g., that corresponds to the stocks application user interface) is a last used application. Thus, in some embodiments, computer system 700 displays the user interface for a last used application after initially being transitioned to the "high power mode" (and/or because computer system 700 has continued to detect the gaze target at the location on display 704 that is within the predetermined distance from gaze target 730 for longer than the predetermined period of time). The user interface of FIG. 7G3 is a home screen user interface that shows a calendar event (e.g., "BOOK CLUB" event) that computer system 700 can display after initially being transitioned to the "high power mode" (and/or because computer system 700 has continued to detect the gaze target at the location on display 704 that is within the predetermined distance from gaze target 730 for longer than the predetermined period of time).

Figure 7F:
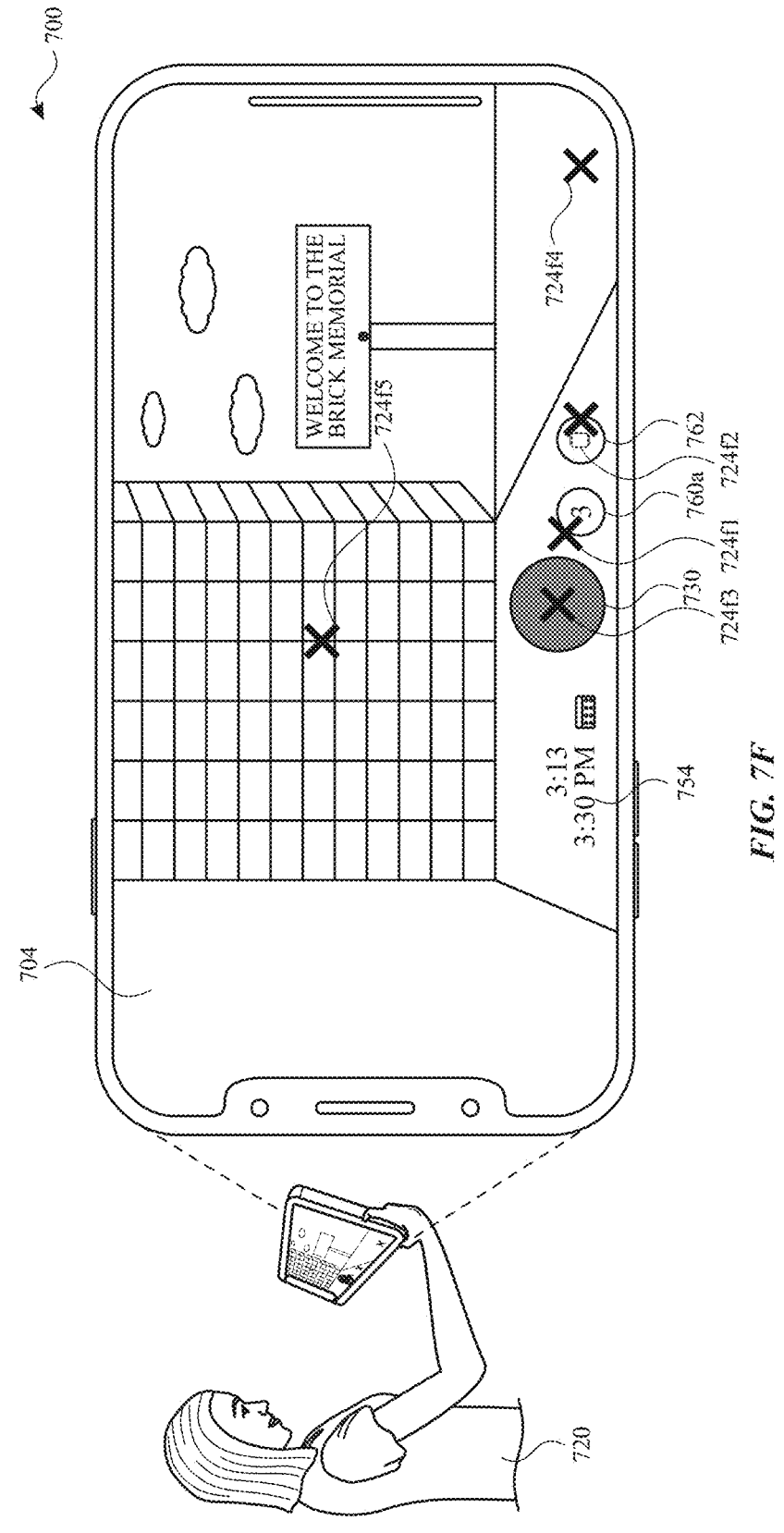

FIGS. 7E-7G3 illustrate an exemplary alternate embodiment for configuring the computer system to operate in the "high power mode." At FIG. 7E (e.g., in some embodiments), computer system 700 continues to detect the gaze of user 720 in gaze direction 722d and at gaze location 724d. As illustrated in FIG. 7F, because computer system 700 has continued to detect the gaze target at the location on display 704 that is within the predetermined distance from gaze target 730 for longer than a predetermined period of time (e.g., 0.2-5 seconds), computer system 700 displays additional virtual objects, such as status information 754 (e.g., which includes of the same status information that is included in status information 754 of FIG. 7G1 and/or while the computer system is operating in the "high power" mode), notifications virtual object 760a (e.g., which is also included on the user interfaces of FIGS. 7G1-7G2 and/or while the computer system is operating in the "high power" mode), and/or handoff virtual object 762 (e.g., which can also be included on the user interfaces of FIGS. 7G1-7G2 and/or while the computer system is operating in the "high power" mode). At FIG. 7F, computer system 700 continues to operate in the "low power mode" and has not powered on any additional projectors of display 704 than were on at FIG. 7E. In some embodiments, computer system 700 is configured to operate in a power mode that is between the "low power mode" and the "high power mode," and one or more additional projectors are turned on (e.g., but not as many projectors that are turned on while the computer system is operating in the "high power mode"). In some embodiments, computer system 700 displays the user interface of FIG. 7F in response to detecting that the gaze of user 720 is within a predetermined distance of an area that is outside of the perimeter of gaze target (e.g., at gaze location 724c of FIG. 7C while computer system 700 displays gaze target 730 of FIG. 7E) (e.g., and not at a location that is within gaze target 730). In some of these embodiments, at FIG. 7F, computer system 700 displays one or more of the user interfaces of FIGS. 7G1-7G3 in response to detecting that the gaze of the user is directed to a location within the gaze target. Thus, in some embodiments, staring at the gaze target causes the computer system to operate in the "high power mode" and display one or more of the user interfaces of FIGS. 7G1-7G3, and staring at an area around the gaze target (e.g., after the gaze target has been emphasized, as shown in FIGS. 7D-7E) causes the computer system to continue to operate in the "low power mode" and display additional virtual objects (e.g., such as the additional virtual objects shown in FIG. 7F1) near gaze target 730 (e.g., using the projectors that were on when only gaze target 730 was displayed).

In some embodiments that correspond to FIG. 7F, computer system 700 detects the gaze of user 720 at gaze location 724f/1 (e.g., in an area around predetermined gaze target 730), which is the location at which notifications virtual object 760a is displayed. In some embodiments, computer system 700 displays the notifications user interface of FIG. 7G1 and is configured to operate in the "high power mode" in response to detecting that the gaze of user 720 at gaze location 724f/1. In some embodiments, computer system 700 detects the gaze of user 720 at gaze location 724f/2 (e.g., in an area around predetermined gaze target 730), which is the location at which handoff virtual object 762 is displayed. In some embodiments, computer system 700 displays the stocks application user interface using one or more techniques described with reference to FIG. 9G below (e.g., where the stocks application user interface is displayed because an external device has and/or is currently display content that corresponds to the stocks application, as further discussed below in relation to FIGS. 9A-9G) and is configured to operate in the "high power mode," in response to detecting that the gaze of user 720 at gaze location 724f/2. In some embodiments, computer system 700 detects the gaze of user 720 at gaze location 724f/3, which is the location at which gaze target 730 is displayed. In some embodiments, in response to detecting the gaze of user 720 at gaze location 724f/3, computer system 700 displays one or more of the user interfaces of FIGS. 7G1-7G3, as described above and is configured to operate in the "high power mode."

In some embodiments corresponding to FIG. 7F, computer system 700 detects the gaze of user 720 at gaze location 724f. In some embodiments, a determination is made that computer system 700 is within a predetermined distance of a second predefined region (e.g., for a predetermined period of time (e.g., 0.2-5 seconds)). As illustrated in FIG. 7G4, in response to detecting the gaze of user 720 at gaze location 724f, computer system 700 displays gaze target 730 in the second predefined region (e.g., corner of the display in FIG. 7G4 vs. the bottom of the display in FIG. 7C). In some embodiments, computer system 700 responds to the gaze target displayed in the gaze target region using one or more techniques as described above. In some of these embodiments, after the gaze of the user has been detected on gaze target 730 for a predetermined period of time, additional virtual objects are displayed around gaze target 730 (e.g., and/or in the corner of display 704). In some embodiments, after the gaze of the user has been detected on gaze target 730 for a predetermined period of time, a menu that corresponds to menu 734 of FIG. 7G1 is displayed at a different position than menu 734 of FIG. 7G1 (e.g., and/or in the corner of display 704). Thus, in some embodiments, computer system 700 can display gaze targets in multiple regions of display 704 and only turns on a set of projectors for the particular region of the display at which the gaze target is displayed in response to detecting a gaze and/or attention of the user that is directed to (e.g., within a predetermined distance of) the particular region. In some embodiments, a user can enable and/or disable one or more regions, such that only predefined regions that are enabled to display gaze targets (and/or transition the computer system to operate in the "low power mode") in response to a detection of the gaze of a user in the predefined region. In some embodiments, computer system 700 detects the gaze of user 720 at gaze location 724/5, which is a location in the middle of display 704. In some embodiments, computer system 700 ceases to display a gaze target and/or one or more additional virtual objects (e.g., as displayed in FIG. 7F) and is configured to operate in the "lower power mode" in response to the gaze of the user being detected at gaze location 724/5 (e.g., because gaze location 724/5 is not within a predetermined distance from one or more predefined region for changing the power mode of computer system 700).

Additional descriptions regarding FIGS. 7A-7G4 are provided below in reference to method 800 described with respect to FIGS. 7A-7G4.

FIG. 8 is a flow diagram of methods for performing one or more wake operations, in accordance with some embodiments. In some embodiments, method 800 is performed at a computer system (e.g., computer system 101 in FIG. 1 and/or computer system 700) including a display generation component (e.g., display generation component 120 in FIGS. 1, 3, and 4) (e.g., a heads-up display, a display, a touchscreen, a projector, etc.) and one or more gaze tracking sensors. In some embodiments, the computer system is optionally in communication with one or more external devices, one or more physical input mechanisms, such as one or more routable input mechanisms, one or more cameras, one or more display projectors, one or more audio output devices, one or more touch-sensitive surfaces, and/or one or more gaze tracking sensors, one or more physical input mechanism, one or more microphones, and/or one or more cameras. In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 800 are, optionally, combined and/or the order of some operations is, optionally, changed.

The computer system (e.g., 700) detects (802) (e.g., while the computer system is a first state (e.g., a suspended state; a display inactive state; a low power state), via the one or more gaze-tracking sensors, that a gaze and/or attention of a user (e.g., of the computer system) is in a first predetermined gaze direction (e.g., 722c) (e.g., a gaze and/or attention direction relative to a base gaze direction (e.g., relative to looking straight ahead)). In some embodiments, as a part of detecting that the gaze of the user is directed to the first predetermined gaze direction, the computer system detects that the gaze is directed to the position that is within the predefined region of the display generation component.

In response to (804) detecting that the gaze of the user is in the first predetermined gaze direction (e.g., 722c) (e.g., a gaze direction within a range of predetermined gaze directions (e.g., a gaze direction that is in a predetermined sub-region of the potential regions/directions of gaze that can be achieved from the user's current head position (e.g., looking downwards or in a lower-left corner))), the computer system displays (806), via the display generation component, a first virtual object (e.g., 730) (e.g., a viewpoint-locked virtual object) (e.g., a gaze target) (e.g., a virtual object that was not previously displayed) at a position (e.g., a first position) (e.g., a location that stays in a particular position relative to a body part (e.g., head) of the user) that is locked (e.g., fixed relative to the user's head so that it moves as the user's head moves so as to maintain an approximately fixed location relative to the user's head; and/or fixed so that the first virtual object does not vary as the direction of gaze varies) relative to the head of the user (e.g., 720) of the computer system (e.g., 700), where the first virtual object (e.g., 730) is displayed with a first appearance (e.g., size, color, shape, bolding, tint, and/or one or more characteristics of color). In some embodiments, the first virtual object appears at a fixed point relative to the head of the user (e.g., relative to looking straight ahead), even as the direction of gaze of the user changes.

While displaying, via the display generation component, the first virtual object (e.g., 730) at the position that is locked relative to the head of the user of the computer system, the computer system detects (808), via the one or more gaze-tracking sensors, that the gaze of the user is in a second predetermined gaze direction (e.g., 722d). In some embodiments, the second predetermined gaze direction is the same as the first predetermined gaze direction. In some embodiments, the second predetermined gaze direction is different from the first predetermined gaze direction.

In response to (810) detecting, via the one or more gaze-tracking sensors, that the gaze of the user is in the second predetermined gaze direction (e.g., 722d) (e.g., and while the gaze of the user is directed in the second predetermined gaze direction) and in accordance with a determination that the gaze of the user in the second predetermined gaze direction (e.g., 722d) is directed to (e.g., at the virtual object and/or around a region that surrounds the first virtual object) the first virtual object (e.g., 730) for a first predetermined period of time (e.g., 0.2-5 seconds), the computer system changes (812) the appearance (e.g., the size (e.g., enlarging), the color, and/or the shape) (and/or changes the appearance) (e.g., while continuing to display the first virtual object at the respective location (e.g., while continuing display a centroid and/or center position of the first virtual object at the respective location)) of the first virtual object from the first visual appearance to a second visual appearance (e.g., as described above in relation to FIGS. 7D-7E) (e.g., while the gaze of the user in the second predetermined gaze direction is directed to the first virtual object). In some embodiments, as a part of changing the appearance of the first visual object, the computer system emphasizes the first virtual object. In some embodiments, the computer system can change the appearance of the virtual object before the gaze of the user is determined to be directed to the first virtual object. In some embodiments, the change in the appearance of the virtual object occurs, in part, to prompt a user to look at the region around the first virtual object.

In response to (810) detecting, via the one or more gaze-tracking sensors, that the gaze of the user is in the second predetermined gaze direction (e.g., 722d) (e.g., and while the gaze of the user is directed in the second predetermined gaze direction) and in accordance with a determination that the gaze of the user in the second predetermined gaze direction (e.g., 722d) is directed to the first virtual object for a second predetermined period of time (e.g., 1-10 seconds) that is different from (e.g., longer than) the first predetermined period of time (and after changing the appearance of the first virtual object from the first visual appearance to the second visual appearance), displaying (814), via the display generation component, a first user interface that includes a second virtual object and a third virtual object (e.g., as described above in relation to FIGS. 7D and 7G1-7G3), where selection of the second virtual object (e.g., 760a-760h) (e.g., detection of the gaze of the user being in a first respective predetermined gaze direction (e.g., same or different direction than the second predetermined gaze direction) that is directed to the third virtual object) causes display (e.g., the computer system to display) of a second user interface that is different from the first user interface (e.g., the second user interface does not include the first virtual object and/or the third user interface object) (e.g., and does not display the third user interface), and where selection of the third virtual object (e.g., 760a-760h) (e.g., detection of the gaze of the user being in a second respective predetermined gaze direction (e.g., that is different from the first respective predetermined gaze direction) (e.g., same or different direction than the second predetermined gaze direction) directed to the third virtual object) causes display (e.g., the computer system to display) of a third user interface that is different from the first user interface and the second user interface (e.g., the third user interface does not include the first virtual object and/or the second user interface object) (e.g., and does not cause display of the second user interface). In some embodiments, as a part of displaying the second user interface or the third user interface, a portion of the first user interface continues to be displayed. In some embodiments, selection of the second virtual object, the third virtual object, and/or another virtual object occurs in response to detecting one or more gaze-based inputs, an air input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by one or more sensors that are in communication with the computer system and/or one or more body worn sensors (e.g., sensors on a watch (e.g., a heart rate sensor and/or a gyroscope)) monitoring the movement of a body part (e.g., hand)). In some embodiments, the second virtual object and/or the third virtual object are viewpoint-locked virtual objects. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body). Displaying, via the display generation component, a first virtual object in response to detecting that the gaze of the user is in the first predetermined gaze direction provides additional controls options to the user (e.g., displaying the first virtual object when it is needed) without cluttering the user interface and provides visual feedback that a wake operation and/or one or more other operations can be performed based on an input (gaze input) that is detected at or around the location of the first virtual object, which provides additional control over the computer system and improved visual feedback. Changing the appearance of the first virtual object from the first visual appearance to a second visual appearance in accordance with a determination that the gaze of the user in the second predetermined gaze direction is directed to the first virtual object for a first predetermined period of time provides visual feedback that a wake operation is being performed and/or that one or more inputs being detected by the computer system is leading to performance of the wake operation, which provides improved visual feedback. Displaying, via the display generation component, a first user interface in accordance with a determination that the gaze of the user in the second predetermined gaze direction is directed to the first virtual object for the second predetermined period of time provides additional controls options to the user to wake the device and display the first user interface without cluttering the user interface when the computer system is not awake, which provides additional control over the computer system.

In some embodiments, the first user interface that includes the second virtual object (e.g., 760a-760h) and the third virtual object (e.g., 760a-760h) does not include the first virtual object (e.g., 730). Displaying, via the display generation component, a first user interface that does not include the first virtual object provides visual feedback that the wake operation has been performed, which provides improved visual feedback.

In some embodiments, in response to detecting, via the one or more gaze-tracking sensors, that the gaze of the user is in the second predetermined gaze direction (e.g., 722d) and in accordance with the determination that the gaze of the user in the second predetermined gaze direction is directed to the first virtual object for the second predetermined period of time (e.g., 1-10 seconds) (and after changing the appearance of the first virtual object from the first visual appearance to the second visual appearance), the computer system ceases, via the display generation component, to display the first virtual object (e.g., 730) (e.g., as described above in relation to 7G1-7G3) (e.g., displayed with the second visual appearance and/or with the first visual appearance). In some embodiments, the first virtual object is not displayed while the first user interface, the second user interface, and/or the third user interface are displayed. In some embodiments, in response to detecting, via the one or more gaze-tracking sensors, that the gaze of the user is in the second predetermined gaze direction and in accordance with the determination that the gaze of the user in the second predetermined gaze direction is directed to the first virtual object for a period of time that is shorter than the second predetermined period of time, continuing to display the first virtual object. Ceasing to display, via the display generation component, the first virtual object (e.g., in response to detecting, via the one or more gaze-tracking sensors, that the gaze of the user is in the second predetermined gaze direction and in accordance with the determination that the gaze of the user in the second predetermined gaze direction is directed to the first virtual object for the second predetermined period of time) provides visual feedback that the wake operation has been performed, which provides improved visual feedback.

In some embodiments, before detecting, via the one or more gaze-tracking sensors, that the gaze of the user is in the second predetermined gaze direction (e.g., 722d), the first virtual object (e.g., 730) is displayed at a first location (and/or at the position that is locked relative to the head of the user). In some embodiments, displaying, via the display generation component, the first user interface (e.g., in accordance with a determination that the gaze of the user in the second predetermined gaze direction is directed to the first virtual object for a second predetermined period of time that is different from the first predetermined period of time) includes: displaying, via the display generation component, the second virtual object (e.g., 760a-760h) (or the third virtual object) at the first location (and/or at the position that is locked relative to the head of the user of the computer system) (e.g., the location at which the first virtual object was previously displayed). In some embodiments, the second virtual object and/or the third virtual object is displayed at a position (and/or location) that is locked relative to the head of the user of the computer system. Displaying, via the display generation component, the second virtual object at the first location (e.g., a location at which the first virtual object was displayed) provides visual feedback, at and/or a particular location to which the gaze of the user is likely to be directed, that the wake operation has been performed, which provides improved visual feedback.

In some embodiments, while displaying, via the display generation component, the first virtual object (e.g., 730) at the position that is locked relative to the head of the user of the computer system, detects, via the one or more gaze tracking sensors, that the gaze of the user is in a third predetermined gaze direction that is different from the second predetermined gaze direction (and, in some embodiments, that is different from the first predetermined gaze direction) (e.g., as described above in relation to 724/5). In some embodiments, in response to detecting, via the one or more gaze tracking sensors, that the gaze of the user is in the third predetermined gaze direction, the computer system ceases to display, via the display generation component, the first virtual object (e.g., 730) (that is displayed with the first appearance and/or the second appearance) (e.g., to gradually cease) (e.g., displaying an animation of the gaze target fading out)) (e.g., as described above in relation to 724/5). Ceasing to display, via the display generation component, the first virtual object in response to detecting, via the one or more gaze tracking sensors, that the gaze of the user is in the third predetermined gaze direction provides visual feedback that a wake operation is no longer being performed and/or that one or more inputs (e.g., gaze input) being detected by the computer system is not leading to performance of the wake operation, which provides improved visual feedback.

In some embodiments, changing the appearance of the first virtual object (e.g., 730) from the first visual appearance to the second visual appearance includes displaying, via the display generation component, an animation that indicates progress towards completion (e.g., progress towards completion of the first predetermined period of time) of a wake operation while the gaze of the user is in the second predetermined gaze direction and is directed to (e.g., at a location associated with) the first virtual object (e.g., as described above in relation to FIGS. 7C-7F). In some embodiments, in accordance with a determination that the gaze of the user in the second predetermined gaze direction is not directed to the first virtual object for a first predetermined period of time, the computer system does not display the animation that indicates progress towards completion of a wake operation while the gaze of the user in the second predetermined gaze direction is directed to the first virtual object. Displaying an animation that indicates progress towards completion of a wake operation while the gaze of the user is in the second predetermined gaze direction and is directed to the first virtual object as a part of changing the appearance of the first virtual object from the first visual appearance to the second visual appearance provides visual feedback that a wake operation is being performed and/or will be performed, which provides improved visual feedback.

In some embodiments, displaying the animation includes changing (e.g., increasing and/or decreasing) (e.g., gradually changing) a first size of the first virtual object (e.g., 730) over a first period of time while (e.g., while detecting that) the gaze of the user is in the second predetermined gaze direction (e.g., 722d) and is directed to the first virtual object (e.g., as described above in relation to FIGS. 7C-7F). Changing the first size of the virtual object over the first period of time while the gaze of the user is in the second predetermined gaze direction as a part of displaying the animation provides visual feedback that a wake operation is being performed and/or will be performed, which provides improved visual feedback.

In some embodiments, displaying the animation includes changing (e.g., increasing and/or decreasing) (e.g., gradually changing) a first amount of color that fills up (the amount an area of and/or a portion of that the color occupies) the first virtual object (e.g., 710) (and/or changing an amount of color of the first virtual object) over a second period of time while (e.g., while detecting that) the gaze of the user is in the second predetermined gaze direction and is directed to the first virtual object (e.g., as described above in relation to FIGS. 7C-7F). Changing a first amount of color that fills up the first virtual object over a second period of time while the gaze of the user is in the second predetermined gaze direction as a part of displaying the animation provides visual feedback that a wake operation is being performed and/or will be performed, which provides improved visual feedback.

In some embodiments, displaying the animation includes: changing a second amount of color that fills up the first virtual object (e.g., 730) over a third period of time while the gaze of the user is in the second predetermined gaze direction (e.g., 722d) and is directed to the first virtual object (e.g., as described above in relation to FIGS. 7C-7F). In some embodiments, after changing the second amount of color that fills up the first virtual object over the third period of time, the computer system increases (e.g., gradually increasing) a second size of the first virtual object over a fourth period of time while (e.g., while detecting that) the gaze of the user is in the second predetermined gaze direction and is directed to the first virtual object (e.g., as described above in relation to FIGS. 7C-7F). In some embodiments, the first virtual object is, initially, a hollow circle of a first size that transitions to a filled circle of a second size that is greater than the first size. Changing a second amount of color that fills up the first virtual object over a third period of time while the gaze of the user is in the second predetermined gaze direction and is directed to the first virtual object and, after changing the second amount of color that fills up the first virtual object over the third period of time, increasing a second size of the first virtual object over a fourth period of time while the gaze of the user is in the second predetermined gaze direction and is directed to the first virtual object as a part of displaying the animation provides visual feedback that a wake operation is being performed and/or will be performed, which provides improved visual feedback.

In some embodiments, in accordance with a determination that the gaze of the user in the first predetermined gaze direction is directed to a first predetermined (and/or predefined) portion (e.g., an area (e.g., a corner and/or a section); a region and/or portion within the expected/predicted potential field-of-gaze that the user's gaze can traverse without movement of the user's head (e.g., the field-of-gaze available via eye motion, alone) of a first user interface region (e.g., the display generation component, a display screen, and/or a lens) (e.g., a surface) (e.g., a physical surface that the display generation component (e.g., projectors) projects one or more virtual objects onto), the position that is locked relative to the head of the user of the computer system is associated with (e.g., is in and/or corresponds to) the first predetermined portion of the first user interface region (e.g., region of 704) (and not in the second predetermined portion of the first user interface region) (e.g., as described in relation to FIG. 7F). In some embodiments, in accordance with a determination that the gaze of the user in the first predetermined gaze direction is directed to a second predetermined portion of the first user interface region that is different from the first predetermined portion of the first user interface region, the position that is locked relative to the head of the user of the computer system is associated with (e.g., is in and/or corresponds to) the second predetermined portion of the first user interface region (e.g., region of 704) (and not in the first predetermined portion of the first user interface region) (e.g., as described in relation to FIG. 7F). In some embodiments, the first virtual object and/or the first user interface is displayed in a respective predetermined portion of a respective user interface region based on where the gaze of the user is detected. In some embodiments, the second predetermined portion does not overlap with the first predetermined portion. The position that is locked relative to the head of the user of the computer system being associated with a different predetermined portion of a first user interface region (e.g., first predetermined portion and/or second predetermined portion) based on one or more conditions allows the computer system to provide a control option for waking the device at a particular region that is associated with a predetermined region at which a gaze input is detected, which provides additional control options without cluttering the user interface.

In some embodiments, the first predetermined portion of the first user interface region (e.g., region of 704) is on a first side (e.g., top, bottom, left, and/or right side) of the first user interface region (e.g., as described in relation to FIG. 7F). In some embodiments, the second predetermined portion of the first user interface region is on a second side (e.g., top, bottom, left, and/or right side) of the first user interface region that is different from the first side of the first user interface region (e.g., as described in relation to FIG. 7F). In some embodiments, the first side of the first user interface region is opposite (e.g., left side vs. right side, top side vs. bottom side) of the second side of the first user interface region.

In some embodiments, the first predetermined portion of the first user interface region (e.g., region of 704) is on a third side (e.g., top, bottom, left, and/or right side) of the first user interface region (e.g., as described in relation to FIG. 7F). In some embodiments, the second predetermined portion of the first user interface region is in a corner of the first user interface region (e.g., as described in relation to FIG. 7F). In some embodiments, the first predetermined portion of the first user interface region is in a first corner of the first user interface region, and the second predetermined portion is in a second corner of the first user interface region, where the second corner is different from the first corner.

In some embodiments, in accordance with the determination that the gaze of the user in the second predetermined gaze direction is directed to the first virtual object for the second predetermined period of time and in accordance with a determination that gaze of the user in the second predetermined gaze direction (or the first predetermined gaze direction) is directed to the first predetermined portion of the first user interface region (e.g., region of 704), the first user interface is displayed at a location (e.g., on the augmented reality user interface) in the first predetermined portion of the first user interface region (e.g., as described in relation FIG. 7F) and in accordance with a determination that gaze of the user in the second predetermined gaze direction (or the first predetermined gaze direction) is directed to the second predetermined portion of the first user interface region (e.g., region of 704), the first user interface is displayed at a location (e.g., on the augmented reality user interface) in the second predetermined portion of the first user interface region (e.g., as described in relation to FIG. 7F). In some embodiments, the location in the first predetermined portion of the first user interface region is different from the location in the second predetermined portion of the first user interface region. In some embodiments, the first predetermined portion of the first user interface region and the second predetermined portion of the first user interface region do not overlap. Displaying the first user interface at a location that is based on a location of the gaze provides the user with additional control over the user interface by allowing the user to control where the first virtual object is displayed and provides the user with visual feedback that one or more virtual objects (e.g., the first user interface) will be displayed at or near the location of the gaze in the second predetermined gaze direction, which provides improved visual feedback.

In some embodiments, before detecting, via the one or more gaze tracking sensors, that the gaze of the user is in the first predetermined gaze direction (e.g., 722c) and before displaying the first virtual object at the position that is locked relative to the head of the user of the computer system, the computer system detects, via the one or more gaze tracking sensors, that the gaze of the user is directed to a third predetermined portion of a second user interface region (e.g., region of 704) (e.g., using one or more techniques as described above in relation to the first user interface region) and in a fourth predetermined gaze direction (e.g., indicated by 724f) that is different from the first predetermined gaze direction region (e.g., region of 704) (e.g., as described in relation to FIG. 7F). In some embodiments, in response to detecting that the gaze of the user is directed to the third predetermined portion of the second user interface region and in the fourth predetermined gaze direction (e.g., the display generation component, a display screen, and/or a lens) (e.g., a physical surface that the display generation component (e.g., projects) projects one or more virtual objects onto) and in accordance with a determination that a respective setting is enabled (and/or not disabled) (e.g., by a user of the computer system) for performing a wake operation based on a detected gaze of the user being directed to the third predetermined portion of the second user interface region, the computer system displays, via the display generation component, the first virtual object (e.g., at a location in the third predetermined portion of the second user interface region and/or a portion that corresponds to the third predetermined portion of the second user interface region) region (e.g., as described in relation to FIG. 7F) and in accordance with a determination that the respective setting is disabled (and/or not enabled) for performing the wake operation based on a detected gaze of the user being directed to the third predetermined portion of the second user interface region, the computer system forgoes displaying, via the display generation component, the first virtual object (e.g., at a location in the third predetermined portion of the second user interface region and/or a region that corresponds to the third predetermined portion of the second user interface region) region (e.g., as described in relation to FIG. 7F). Choosing whether or not to display the first virtual object based on the state of a setting allows a user of the computer system to control whether a detected gaze at a predetermined portion of a user interface region will or will not display the first virtual object, which provides additional control options without cluttering the user interface.

In some embodiments, the second virtual object (e.g., 762a) (or the third virtual object) includes first status information (e.g., 752) (e.g., the status of one or more notifications, battery life, a date, and/or a time). Displaying a second virtual object that includes status information in accordance with a determination that the gaze of the user in the second predetermined gaze direction is directed to the first virtual object for a second predetermined period of time provides visual feedback to the user concerning the status information and allows the user to control when the status information is displayed, which provides improved visual feedback and additional control over the user interface without cluttering the user interface.

In some embodiments, the second virtual object (e.g., 760a-760h) and the third virtual object (e.g., 760a-760h) are included in a first menu (e.g., 764) (e.g., a menu that is used to launch an application and/or transition between running applications) (e.g., a dock (e.g., a system dock) and/or a system bar (e.g., an application bar)). In some embodiments, the second and third virtual objects are application launch icons arranged in a system dock. Displaying a second virtual object and the third virtual object in a menu in accordance with a determination that the gaze of the user in the second predetermined gaze direction is directed to the first virtual object for a second predetermined period of time provides visual feedback to the user concerning the menu and allows the user to control when the menu is displayed, which provides improved visual feedback and additional control over the user interface without cluttering the user interface.

In some embodiments, the first user interface is a user interface of a last used application (e.g., as described above in relation to FIGS. 7G1-7G3) (e.g., the application that was being used before the computer system was transitioned to a lower power state than the state in which the computer system is in while displaying the first user interface). In some embodiments, in accordance with a determination that the last used application is a first application (e.g., a stocks application, a news application, a fitness application, an email application, a social media application, a media capture application, a media viewer application, an event application, and/or a calendar application), the first user interface is the first application; and in accordance with a determination that the last used application is a second application (e.g., a stocks application, a news application, a fitness application, an email application, a social media application, a media capture application, a media viewer application, an event application, and/or a calendar application) that is different from the first application, the last used application is the second application. Displaying a user interface of a last used application in accordance with a determination that the gaze of the user in the second predetermined gaze direction is directed to the first virtual object for a second predetermined period of time provides visual feedback to the user concerning the last used application and allows the user to control when the user interface of the last used application is displayed, which provides improved visual feedback and additional control over the user interface without cluttering the user interface.

In some embodiments, the first user interface is a wake screen user interface (e.g., a user interface that is displayed upon transitioning the computer system from a low power mode to a high power mode and/or full power mode and/or a user interface that is displayed while the computer system is in a higher power mode than the low power mode and while the computer system is locked) (e.g., as described above in relation to FIGS. 7G1-7G3). Displaying a wake screen user interface in accordance with a determination that the gaze of the user in the second predetermined gaze direction is directed to the first virtual object for a second predetermined period of time provides visual feedback that the wake operation has been performed and/or completed, which provides improved visual feedback.

In some embodiments, the first user interface is a home screen user interface (e.g., a user interface that includes one or more virtual objects for launching various applications and/or a main screen that includes one or more navigation elements) (e.g., as described above in relation to FIGS. 7G1-7G3). Displaying a home screen user interface in accordance with a determination that the gaze of the user in the second predetermined gaze direction is directed to the first virtual object for a second predetermined period of time provides visual feedback to the user concerning the last used application and allows the user to control when the home screen user interface is displayed, which provides improved visual feedback and additional control over the user interface without cluttering the user interface.

In some embodiments, the computer system is operating in a first power mode (e.g., as described above in relation to the lower power mode in FIG. 7A) (e.g., a sleep mode and/or a hibernation mode) before detecting that the gaze of the user is in the first predetermined gaze direction (e.g., 722c). In some embodiments, in response to detecting that the gaze of the user is in the first predetermined gaze direction, the computer system transitions from operating in the first power mode to operating in a second power mode (e.g., a low power mode) that is different from the first power mode (e.g., as described above in relation to FIG. 7E-7F). In some embodiments, while operating in the second power mode and in response to detecting, via the one or more gaze-tracking sensors, that the gaze of the user is in the second predetermined gaze direction and in accordance with a determination that the gaze of the user in the second predetermined gaze direction is directed to the first virtual object for the second predetermined period of time, the computer system transitions from operating in the second power mode to operating in a third power mode (e.g., a high power mode and/or a full power mode) that is different from the first power mode and the second power mode (e.g., as described above in relation to FIGS. 7F and 7G1-7G3). In some embodiments, the computer system is configured to use more power while operating in the second power mode than when operating in the first power mode. In some embodiments, the computer system is configured to use more power while operating in the third power mode than when operating in the second power mode. In some embodiments, while operating in the second power mode and in response to detecting, via the one or more gaze-tracking sensors, that the gaze of the user is in the second predetermined gaze direction, in accordance with a determination that the gaze of the user in the second predetermined gaze direction is directed to the first virtual object for a first predetermined period of time and not for the second predetermined period of time, the computer system continues to operate in the second power mode. Transitioning from operating in the first power mode to operating in a second power mode (e.g., a low power mode) that is different from the first power mode in response to detecting that the gaze of the user is in the first predetermined gaze direction in response to detecting that the gaze of the user is in the first predetermined gaze direction allows a user to control whether or not the computer system is transitioned to a mode where the computer system is configured to use more power, which provides additional control options without cluttering the user interface. Transitioning from operating in the second power mode to operating a third power mode (e.g., a high power mode) that is different from the first power mode and the second power mode in accordance with a determination that the gaze of the user in the second predetermined gaze direction is directed to the first virtual object for the second predetermined period of time allows a user to control whether or not the computer system is transitioned to a mode where the computer system is configured to use more power, which provides additional control options without cluttering the user interface.

In some embodiments, the computer system is in communication with a plurality of display projectors. In some embodiments, while operating in the second power mode (e.g., a low power mode), a first subset of the plurality of display projectors for a first portion of a display area is activated while a second subset of the plurality of display projectors for a second portion of a display area (e.g., area of a surface and/or user interface region) is not activated (e.g., as described above in relation to FIG. 7F). In some embodiments, as a part of transitioning from operating in the first power mode to operating in the second power mode (e.g., a low power mode) that is different from the first power mode, the computer system activates the first subset of the display projects without activating the second set of the display projectors. In some embodiments, as a part of transitioning from operating in the second power mode (e.g., lower power mode) to operating in the third power mode (e.g., a full power mode and/or high power mode), the computer system activates the second subset of the display projectors while the first subset of the display projectors is activated. In some embodiments, more of the display area is activated while the computer system is operating in the third power mode than when the computer system is operating in the second power mode and more of the display area is activated while the computer system is operating in the second power mode than when the computer system is operating in the first power mode. Having a second power mode where first subset of the plurality of display projectors for a first portion of a display area being activated while a second subset of the plurality of display projectors for a second portion of a display area is not activated and having a third power mode where the first subset and the second subset of the plurality are activated reduces the power consumptions of the computer system while the computer system is operating in the second power mode and gives the ability to automatically control how much power is being used based gaze inputs provided by the user to wake the computer system.

In some embodiments, while operating in the third power mode, the computer system displays, via the display generation component, a second menu (e.g., as described above in relation to FIG. 7G3). In some embodiments, the first virtual object and the second virtual object are included in a second menu (e.g., a menu that is used to launch an application and/or transition between running applications) (e.g., a dock (e.g., a system dock) and/or a system bar (e.g., an application bar)). In some embodiments, while operating in the third power mode, a menu (e.g., the second menu or another menu) is not displayed. In some embodiments, while operating in the first power mode, the computer system does not display the second menu. Displaying, via the display generation component, the second menu while operating in the third power mode provides visual feedback that the computer system is operating in the third power mode (e.g., a high power mode), which provides improved visual feedback.

In some embodiments, while operating in the second power mode, the computer system displays, via the display generation component, a fourth virtual object (e.g., 762). In some embodiments, selection (e.g., using one or more techniques as described above in relation to selection of the first virtual object and/or the second virtual object that are included in the first user interface) of the fourth virtual object causes an application to be initiated on an external device (e.g., a watch) and/or causes an application that is running on the external device (e.g., 900) to be initiated on the computer system. In some embodiments, while operating in the third power mode, the computer system displays, via the display generation component, the fourth virtual object. In some embodiments, the second virtual object or the third virtual object is the fourth virtual object. In some embodiments, while operating in the first power mode, the computer system does not display the fourth virtual object. Displaying the fourth virtual object, where selection of the fourth virtual object causes an application to be initiated on an external device and/or causes an application that is running on the external device to be initiated on the computer system while the computer system is operating in the second power mode and while the computer system is operating in the third power mode provides visual feedback to the user that performing an operation to cause an application to be initiated on the external device, which provides improved visual feedback.

In some embodiments, while operating in the second power mode, the computer system displays, via the display generation component, a type of status information (e.g., 752) (e.g., the status of one or more notifications, battery life, a date, and/or a time). In some embodiments, while operating in the third power mode, the computer system displays, via the display generation component, the type of status information. In some embodiments, both low power and full mode include the same type of status information. In some embodiments, while operating in the first power mode, the computer system does not display the type of status information. Displaying, via the display generation component, the type of status information while operating in the second power mode and while operating in the third power mode provides the user with visual feedback regarding a type of status information, irrespective of whether the computer system is operating in the second power mode or the third power mode, which provides improved visual feedback.

In some embodiments, in accordance with the determination that the gaze of the user in the second predetermined gaze direction (e.g., 722d and/or 724/3) is directed to the first virtual object for the second predetermined period of time and in accordance with a determination that a first time has not passed from a time at which the computer system (e.g., 700) previously operated in the third power mode (e.g., before the computer was and/or is transitioned from operating in the second power mode to operating in the third power mode), the first user interface is a user interface of a last used application (e.g., as described above in relation to FIGS. 7F and 7G1-7G3) and in accordance with a determination that the first time has passed from the time at which the computer system previously operated in the third power mode, the first user interface is a user interface (e.g., a home screen user interface and/or a wake screen user interface)

that is different from the user interface of the last used application (e.g., as described above in relation to FIGS. 7F and 7G1-7G3). Displaying a different user interface in accordance with a determination that a first time has or has not passed from a time at which the computer system previously operated in the third power mode allows the computer system to display a user interface that can be more relevant to a user, which performs an operation when a set of conditions has been met without requiring further user input.

In some embodiments, in response to detecting, via the one or more gaze-tracking sensors, that the gaze of the user is in the second predetermined gaze direction (e.g., 710) and in accordance with a determination that the gaze of the user in the second predetermined gaze direction is directed to a fourth predetermined (and/or predefined) region around the first virtual object (e.g., 724/1, 724/2, and 724/3), the computer system displays, via the display generation component, a fifth virtual object (e.g., 752, 760a-760e and/or 762) (e.g., at a second position that is locked relative to the head of the user of the computer system) (e.g., a virtual object for displaying notifications, a wake screen, a home screen, an application from an external device, and/or one or more other applications) (e.g., a viewpoint-locked virtual object) that is different from the first virtual object (e.g., 730) while continuing to display the first virtual object. In some embodiments, selection (e.g., using similar techniques as described above in relation to selection of the first virtual object and/or selection of the second virtual object that are included in the first user interface) of the fifth virtual object causes display of first virtual content (virtual content that is associated with an application that the fifth virtual object represents) (and/or a first respective user interface) (and, in some embodiments, while maintaining and/or continuing display of the first virtual object with the first appearance or while ceasing display of the first virtual object). In some embodiments, as a part of displaying the fifth virtual object, the computer system displays a user interface that includes the fifth virtual object (e.g., and does not include the second virtual object and/or the third virtual object). In some embodiments, while displaying the first virtual object, the computer system detects, via the one or more gaze-tracking sensors, that a direction of the gaze (e.g., of a user) of the user of the computer system has changed; in response to detecting that the direction of the gaze of the user of the computer system has changed. In some embodiments, in accordance with a determination that the gaze of the user of the computer system is directed in a second predetermined gaze direction (e.g., a direction that corresponds (e.g., that is directed to the first position) to the first virtual object), the computer system changes the appearance of the first virtual object from the first appearance to a second appearance. In some embodiments, in accordance with a determination that the gaze of the user of the computer system is directed in a third predetermined gaze direction, different from the second predetermined gaze direction, the computer displaying, via the display generation component, an eighth virtual object (e.g., a viewpoint-locked virtual object) (e.g., at a second position that is locked relative to the head of the user of the computer system). In some embodiments, while maintaining display of the first virtual object with the first appearance). In some embodiments, the predefined and/or predetermined region around the first virtual object includes a tenth virtual object and, in accordance with a determination that the gaze of the user in the second predetermined gaze position is directed to the tenth virtual object, the computer system displays the fifth virtual object. In some embodiments, while displaying the fifth virtual object and the first virtual object, the computer system detects that the gaze of the user is in a respective predetermined gaze direction. In some embodiments, in response to detecting that the gaze of the user is in the respective predetermined gaze direction and in accordance with a determination that the gaze of the user in the respective predetermined gaze direction is directed to the first virtual object, the computer system changes the appearance of the first virtual object from the first visual appearance to a second visual appearance (after the first predetermined period of time) and/or displaying, via the display generation component, the first user interface that includes the second virtual object and the third virtual object. In some embodiments, in response to detecting that the gaze of the user is in the respective predetermined gaze direction and in accordance with a determination that the gaze of the user in the second predetermined gaze direction is directed to a first predetermined (and/or predefined) region around the first virtual object, the computer system forgoes changing. Displaying, via the display generation component, a fifth virtual object that is different from the first virtual object while continuing to display the first virtual object when prescribed conditions are met (e.g., in response to detecting, via the one or more gaze-tracking sensors, that the gaze of the user is in the second predetermined gaze direction and in accordance with a determination that the gaze of the user in the second predetermined gaze direction is directed to a fourth predetermined region around the first virtual object) allows the computer to display a limited number of virtual objects to conserve resources (instead of providing more virtual objects and/or making the computer system operate in a high power mode), which performs an operation when a set of conditions has been met without requiring further user input.

In some embodiments, the fourth predetermined region around the first virtual object does not correspond to (e.g., consist of and/or include) an area occupied by the first virtual object (e.g., as described above in relation to FIGS. 7E and 7F). Having a fourth predetermined region around the first virtual object that does not correspond to the area occupied by the first virtual object reduces the number of accidental inputs for waking the computer system and allows the computer system to determine whether the computer system should wake in the third power mode (e.g., high power mode) via detecting a gaze on the gaze target and/or whether a user should wake the computer system in the second power mode (e.g., low power mode and/or a reduced power mode) that uses less energy than the third power mode, which reduces the number of accidental inputs and the number of inputs needed to perform a set of operations, and which reduces the power consumption of the computer system (e.g., by reducing the number of unintended operations to wake the computer system in the third power mode instead of the second power mode).

In some embodiments, in response to detecting, via the one or more gaze-tracking sensors, that the gaze of the user is in the second predetermined gaze direction and in accordance with a determination that the gaze of the user in the second predetermined gaze direction is directed to the fourth predetermined region around the first virtual object (e.g., 730), the computer system displays a sixth virtual object (e.g., 760a-760h and 762). In some embodiments, the sixth virtual object is concurrently displayed with the fifth virtual object (e.g., as described above in relation to FIGS. 7E-7G1-7G3). In some embodiments, selection (e.g., using one or more techniques as described above in relation to selection of the first virtual object and/or the second virtual object that are included in the first user interface) of the sixth virtual object causes the computer system to display (e.g., via the display generation component)) second virtual content (and/ or a second respective user interface that is different from the first respective user interface) that is different from the first virtual content (e.g., as described above in relation to FIGS. 7E-7G1-7G3). In some embodiments, the fifth virtual object and the sixth virtual object are displayed concurrently with the first virtual object. In some embodiments, the fifth virtual object and the sixth virtual object were not displayed before detecting that the gaze of the user is in the second prede- termined gaze direction. In some embodiments, before wak- ing to low power mode (from the first power mode to the second power mode, as described above) and/or gaze of the user is detected (e.g., initially) in the first predetermined gaze direction, the projectors are off and/or nothing is displayed via the projectors. Displaying a sixth virtual object, where the sixth virtual object is concurrently dis- played with the fifth virtual object (e.g., in response to detecting, via the one or more gaze-tracking sensors, that the gaze of the user is in the second predetermined gaze direc- tion and in accordance with a determination that the gaze of the user in the second predetermined gaze direction is directed to a fourth predetermined region around the first virtual object) allows the computer to display a limited number of virtual objects to conserve resources (instead of providing more virtual objects and/or making the computer system operate in a high power mode), which performs an operation when a set of conditions has been met without requiring further user input.

In some embodiments, while displaying, via the display generation component, the fifth virtual object, the computer system detects, via the one or more gaze-tracking sensors, that the gaze of the user is directed to the fifth virtual object (e.g., as described above in relation to 724/1). In some embodiments, in response to detecting, via the one or more gaze-tracking sensors, that the gaze of the user is directed to the fifth virtual object, the computer system transitions from a fourth power mode (e.g., using one or more techniques as described above in relation to the second power mode and/or low power mode) to a fifth power mode (e.g., using one or more techniques as described above in relation to the third power mode, high power mode, and/or full power mode) (e.g., as described above in relation to 724/1) and the computer system displays, via the display generation com- ponent, a plurality of notifications while the computer sys- tem is in the fifth power mode (e.g., as described above in relation to 724/1). In some embodiments, the computer system is configured to consume more power while operat- ing in the fifth power mode than while operating in the fourth power mode. Displaying, via the display generation component, a plurality of notifications while the computer system is transitioned in the fifth power mode in response to detecting, via the one or more gaze-tracking sensors, that the gaze of the user is directed to the fifth virtual object provides additional control to the user so that the user can choose which information is displayed to the user upon the com- puter system being transitioned to the high power mode, which provides additional control without cluttering the user interface.

In some embodiments, while displaying, via the display generation component, the fifth virtual object, the computer system detects, via the one or more gaze-tracking sensors, that the gaze of the user is directed to the fifth virtual object (e.g., as described above in relation to 724/2). In some embodiments, in response to detecting, via the one or more gaze-tracking sensors, that the gaze of the user is directed to the fifth virtual object (e.g., as described above in relation to 724/2), the computer system transitions from a sixth power mode (e.g., using one or more techniques as described above in relation to the second power mode and/or low power mode) to a seventh power mode (e.g., using one or more techniques as described above in relation to the third power mode, high power mode, and/or full power mode) (e.g., as described above in relation to 724/2) and the computer system displays via the display generation component, a user interface for an application that is running on an external device while the computer system is in the seventh power mode (e.g., as described above in relation to 724/2). In some embodiments, the computer system is configured to consume more power while operating in the seventh power mode than while operating in the sixth power mode. Dis- playing, via the display generation component, a user inter- face for an application that is running on an external device while the computer system is transitioned in the seventh power mode in response to detecting, via the one or more gaze-tracking sensors, that the gaze of the user is directed to the fifth virtual object provides additional control to the user so that the user can choose which information is displayed to the user upon the computer system being transitioned to the high power mode, which provides additional control without cluttering the user interface.

In some embodiments, while displaying, via the display generation component, the fifth virtual object (e.g., 760a and/or 762) and the first virtual object (e.g., 730), the computer system detects, via the one or more gaze-tracking sensors, that the gaze of the user is not directed to the fifth virtual object and/or the first virtual object (e.g., as described above in relation to 724/5). In some embodiments, in response to detecting, via the one or more gaze-tracking sensors, that the gaze of the user is not directed to the fifth virtual object and/or the first virtual object, the computer system ceases to display, via the display generation compo- nent, the first virtual object (e.g., 710) and the fifth virtual object (e.g., 760a and/or 762) (e.g., as described above in relation to 724/5) (e.g., by fading out the first virtual object and/or the fifth virtual object). In some embodiments, in response to detecting, via the one or more gaze-tracking sensors, that the gaze of the user is not directed to the fifth virtual object or the first virtual object, transitioning the computer system from operating in an eight power mode (e.g., using one or more techniques as described above in relation to the third power mode, high power mode, and/or full power mode) to operating in a ninth power mode, where the computer system is configured to consume less energy while operating in the ninth power mode (e.g., using one or more techniques as described above in relation to the second power mode and/or lower power mode) than while operating in the eighth power mode. Ceasing to display, via the display generation component, the first virtual object and the fifth virtual object in response to detecting, via the one or more gaze-tracking sensors, that the gaze of the user is not directed to the fifth virtual object and/or the first virtual object provides feedback to the user that the computer system will not be transitioned in a power mode that is configured to consume more energy, which provides improves visual feedback.

In some embodiments, in response to detecting, via the one or more gaze-tracking sensors, that the gaze of the user is in the second predetermined gaze direction and in accor- dance with a determination that the gaze of the user in the second predetermined gaze direction is directed to the first virtual object for the first predetermined period of time (and/or directed to the first predetermined (and/or predefined) region around the virtual object), the computer system displays, via the display generation component, a first set of virtual objects (e.g., 730, 760*a*, and/or 762) (e.g., without displaying the second set of virtual objects) (e.g., an object that indicates the time, an object that indicates a battery status, an object for displaying one or more notifications, an object that indicates a number of notifications (e.g., unread and/or not viewed notifications) (e.g., while the computer system is operating in the second power mode (e.g., using one or more techniques as described above)) (e.g., as described above in relation to FIGS. 7E-7F) and in accordance with a determination that the gaze of the user in the second predetermined gaze direction is directed to the first virtual object for the second predetermined period of time, the computer system displays, via the display generation component, a second set of virtual objects that includes the first set of virtual objects (e.g., 760*a*-760*h*) (e.g., while the computer system is operating in the third power mode (e.g., using one or more techniques as described above)))) (e.g., as described above in relation to FIGS. 7E and 7G1-G3). Displaying a second set of virtual objects that includes the first set of virtual objects in accordance with a determination that the gaze of the user in the second predetermined gaze direction is directed to the first virtual object for the second predetermined period of time provides visual feedback that operations related to the first set of virtual objects are available after the computer system has been transitioned into a different power mode, which provides improves visual feedback.

In some embodiments, while displaying, via the display generation component, the first set of virtual objects, the computer system detects, via the one or more gaze-tracking sensors, that the gaze of the user is in a fifth predetermined gaze direction (e.g., as described above in relation to 724*f*4). In some embodiments, in response to detecting that the gaze of the user is in the fifth predetermined gaze direction and in accordance with a determination that the fifth predetermined gaze direction is a first direction, the computer system displays, via the display generation component, a fourth user interface (e.g., a user interface that have a sixth set of icons organized in a first manner and/or displayed at a first set of locations (e.g., displayed in a horizontal line on one side (e.g., top and/or bottom) of a surface, a user interface region, and/or display) (e.g., as described above in relation to 724*f*4) and in accordance with a determination that the fifth predetermined gaze direction is a second direction that is different from the first direction, the computer system displays, via the display generation component, a fifth user interface (e.g., a user interface that have the sixth set of icons organized in a second manner that is different from the first manner and/or displayed at a second set of locations (e.g., displayed in a virtual line on one side (e.g., left side and/or right side) of a surface, a user interface region, and/or a display)) that is different from the fourth user interface (e.g., as described above in relation to 724*f*4). Displaying a different user interface in accordance with a determination that the fifth predetermined gaze direction is a first direction or a second direction allows the user to control the user interface that is displayed based on a particular gaze input, which provides additional control options without cluttering the user interface.

In some embodiments, aspects/operations of methods 1000, 1200, 1400, 1600, 1800, 2000, 2200, 2400, 2600, 2800, 3000, and 3200 may be interchanged, substituted, and/or added with the steps of method 800. For example, method 800 can be used to wake a computer system that performs one or more of methods 1000, 1200, 1400, 1800,

2000, 2200, 2400, 2600, 2800, 3000, and and/or 3200; and/or methods 1000, 1400, 1600, 1800, 2000, 2200, 2400, 2600, 2800, 3000, and/or 3200 can be used to display one or more user interfaces, which can be the last used application that is displayed when the computer system is awaken using method 800. For brevity, these details are not repeated here.

FIGS. 9A-9G illustrate example techniques for displaying content associated with an external device, in accordance with some embodiments. FIG. 10 is a flow diagram of methods for displaying content associated with an external device, in accordance with some embodiments. The user interfaces in FIGS. 9A-9G are used to illustrate the method in FIG. 10.

Figure 9A:
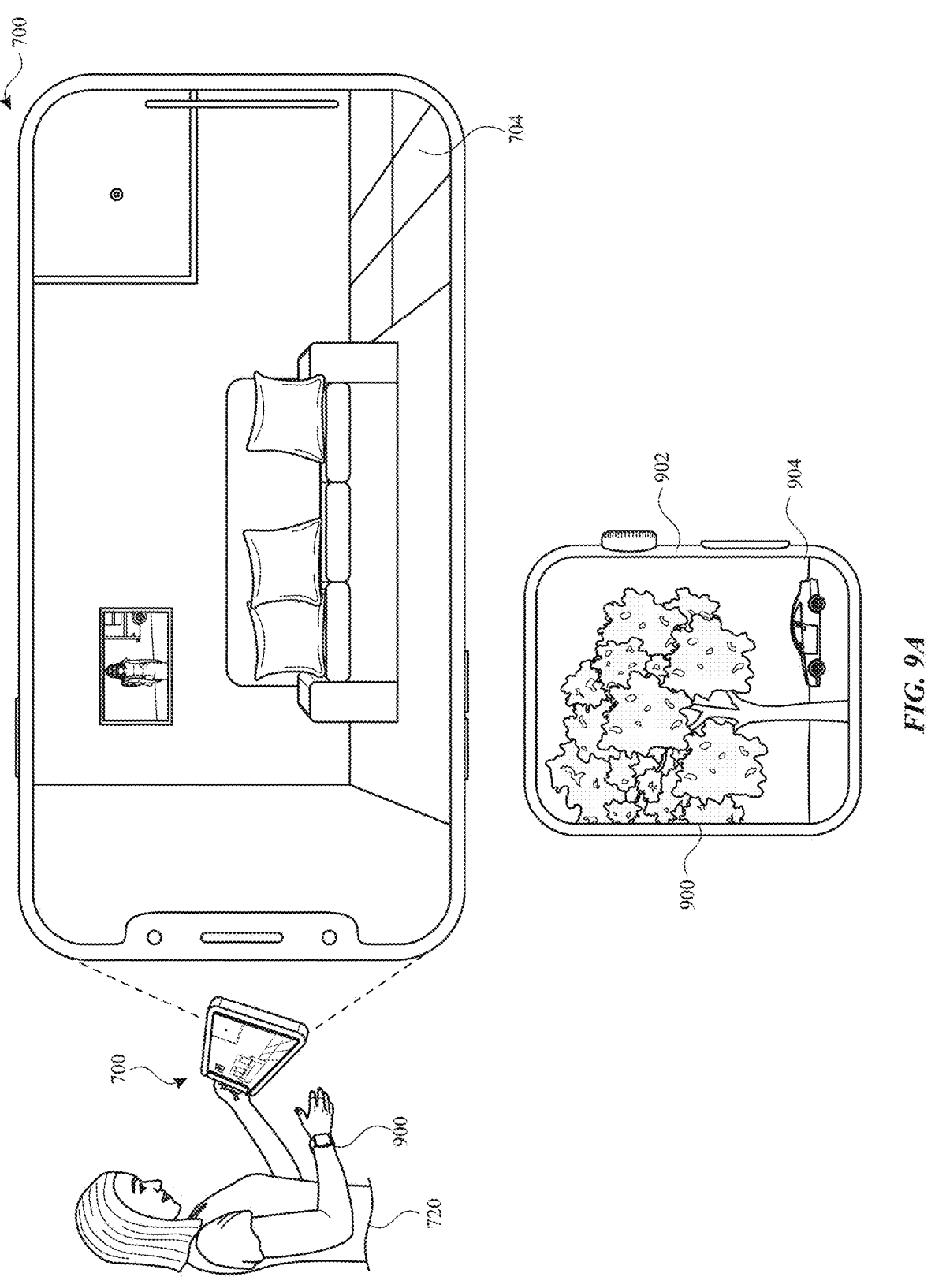
FIGS. 9A-9G illustrate example techniques for displaying content associated with an external device, in accordance with some embodiments.

FIG. 9A illustrates user 720 holding computer system 700 and wearing external device 900 (e.g., a smartwatch). In some embodiments, external device 900 includes one or more features of computer system 101. Computer system 700 and external device 900 are positioned in a physical environment (e.g., a room of a house). Computer system 700 includes display 704, and external device 900 includes display 902. As illustrated in FIG. 9A, external device 900 is displaying, via display 902, a photo 904 that is associated with or being displayed in a media application (e.g., photos application and/or a media gallery application). Computer system 700 is showing a representation of the physical environment via display 704, which is the viewpoint of user 720. That is, when user 720 looks at display 704, user 720 can see a representation of the physical environment that can include one or more virtual objects that are displayed via display 704. Thus, computer system 700 presents an augmented reality environment via display 704 (i.e., the viewpoint of user 720 when using computer system 700). While computer system 700 is a phone in FIG. 9A, computer system 700 can be one or more other devices, such as a tablet and/or a head-mounted device. In some embodiments, display 704 is a transparent display where one or more portions of the physical environment are visible because light can "pass through" the transparent display (e.g., like a pair of glasses). Thus, in these embodiments, computer system 700 does not display the physical environment that is visible on display 704. Rather the physical environment is visible through display 704. In some embodiments, display 704 displays a representation of the physical environment via one or more cameras in communication with computer system 700 (e.g., using "pass-through video" as described above). In some embodiments, computer system 700 displays a representation of a virtual environment instead of a physical environment in FIGS. 9A-9G. For ease of discussion, the following description below will describe FIGS. 9A-9G with respect to computer system 700 having a transparent display and displaying one or more virtual objects overlaid on the physical environment that "passes through" the transparent display of computer system 700. At FIG. 9B, external device 900 is transitioned from not being visible in display 704 (e.g., as shown by display 704 in FIG. 9A) to being visible in display 704 (e.g., as shown in FIG. 9B) and determines that a respective set of criteria is satisfied (e.g., based on the external device being visible to the user and displaying a particular type of content).

Figure 9B:
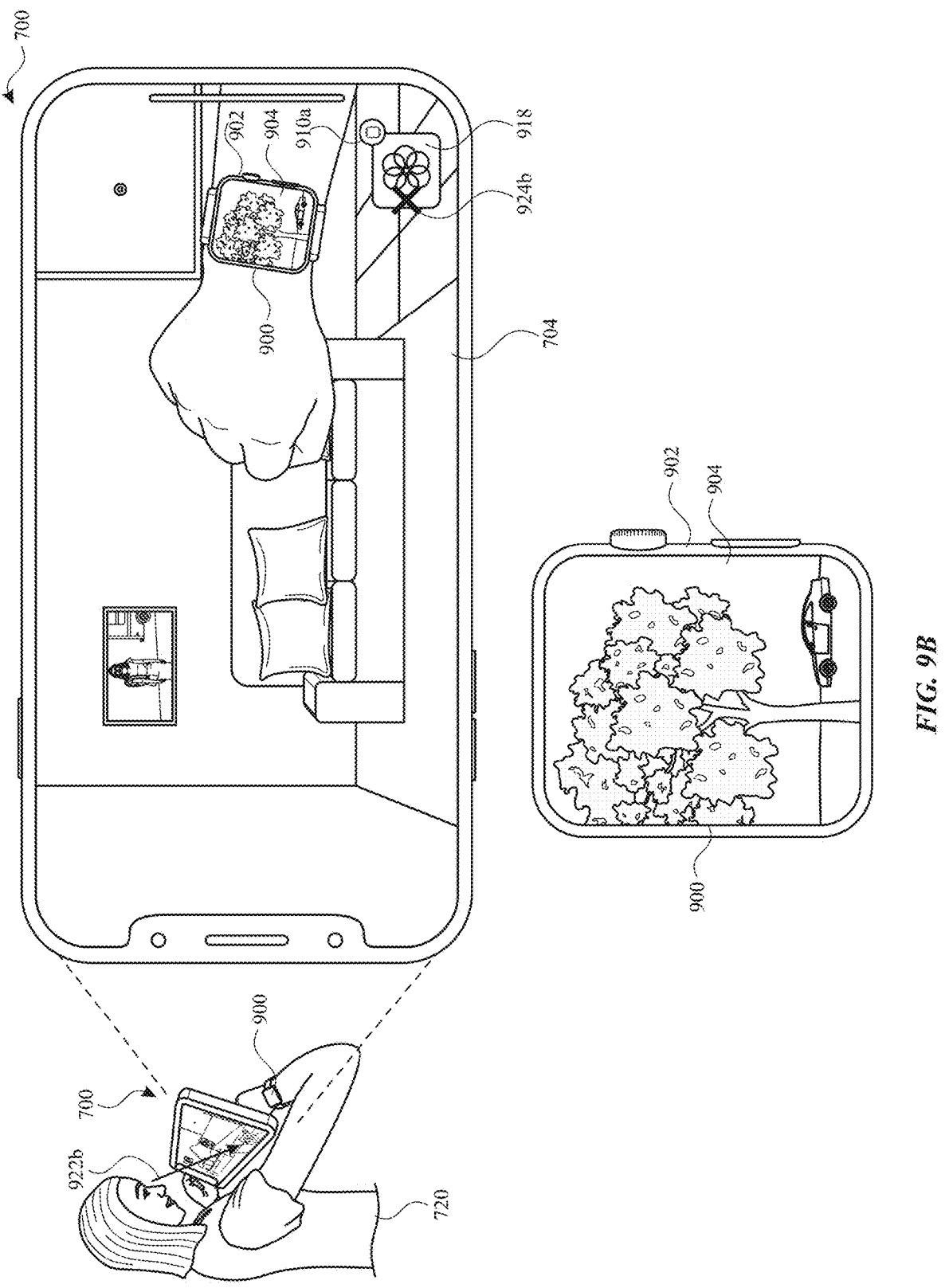

As illustrated in FIG. 9B, in response to the determination that the respective set of criteria is satisfied, computer system 700 displays handoff virtual object 918. Handoff virtual object 918 includes handoff icon 910*a* (e.g., which includes a small representation of the external device) to indicate that selection of the handoff virtual object 918 will cause computer system 700 to display one or more virtual objects from an application that is installed (and/or running)

on external device 900. Moreover, handoff virtual object 918 includes a representation of the media application (e.g., icon of the media application that is made up of multiple circles in FIG. 9B). At FIG. 9B, the respective set of criteria includes a criterion that is satisfied as a result of a determination being made that external device 900 is visible to user 720 (e.g., and/or within the viewpoint of the user and/or is represented on display 902). In addition, the respective set of criteria includes an additional criterion that is satisfied as a result of a determination being made that external device 900 is displaying a particular type of content (e.g., content from a particular application (e.g., a media application, a productivity application, and/or a stocks application) and/or a particular set of media application, audio content, video content, image content, and/or any combination thereof). Thus, in FIGS. 9A-9B, the respective set of criteria is satisfied at FIG. 9B because external device 900 is in the viewpoint of the user at FIG. 9B (e.g., so handoff virtual object 918 is displayed in FIG. 9B) and is displaying a particular type of content. Accordingly, the respective set of criteria was not satisfied at FIG. 9A because external device 900 was not in the viewpoint of the user at FIG. 9A. In some embodiments, the respective set of criteria does not include the criterion that is satisfied as a result of a determination being made that external device 900 is visible to user 720. Thus, as alternative embodiments to that shown in FIG. 9A, computer system 700 displays handoff virtual object 918 because the respective set of criteria is satisfied because external device 900 is displaying a particular type of media.

In some embodiments, the respective set of criteria includes a criterion that is satisfied as a result of a determination that display 902 of external device 900 is visible. Thus, in embodiments where computer system 700 has not detected display 902 in the viewpoint of the user but some portion of the external device is in the viewpoint of the user (e.g., when external device 900 is rotated such that display 902 is not facing computer system 700), the respective set of criteria are not satisfied and handoff virtual object 918 is not displayed. In some embodiments, the respective set of criteria includes a criterion that is satisfied as a result of a determination being made that external device 900 is being worn by user 720 (e.g., around the wrist of user 720). Thus, in some embodiments where external device 900 is not being worn, the respective set of criteria are not satisfied, and handoff virtual object 918 is not displayed. In some embodiments, the respective set of criteria includes a criterion that is satisfied as a result of a determination that a gaze of user 720 has been directed to display 902 for a predetermined period of time (e.g., 0.2-5 seconds) (and, in some embodiments, while external device 900 is visible in the viewpoint (e.g., visible in display 704) of user 720). Thus, in embodiments where user 720 has not been looking at external device 900 for a predetermined period of time, the respective set of criteria are not satisfied, and handoff virtual object 918 is not displayed. At FIG. 9B, computer system 700 detects the gaze of user 720 in gaze direction 922b and at gaze location 924b on display 704.

Figure 9C:
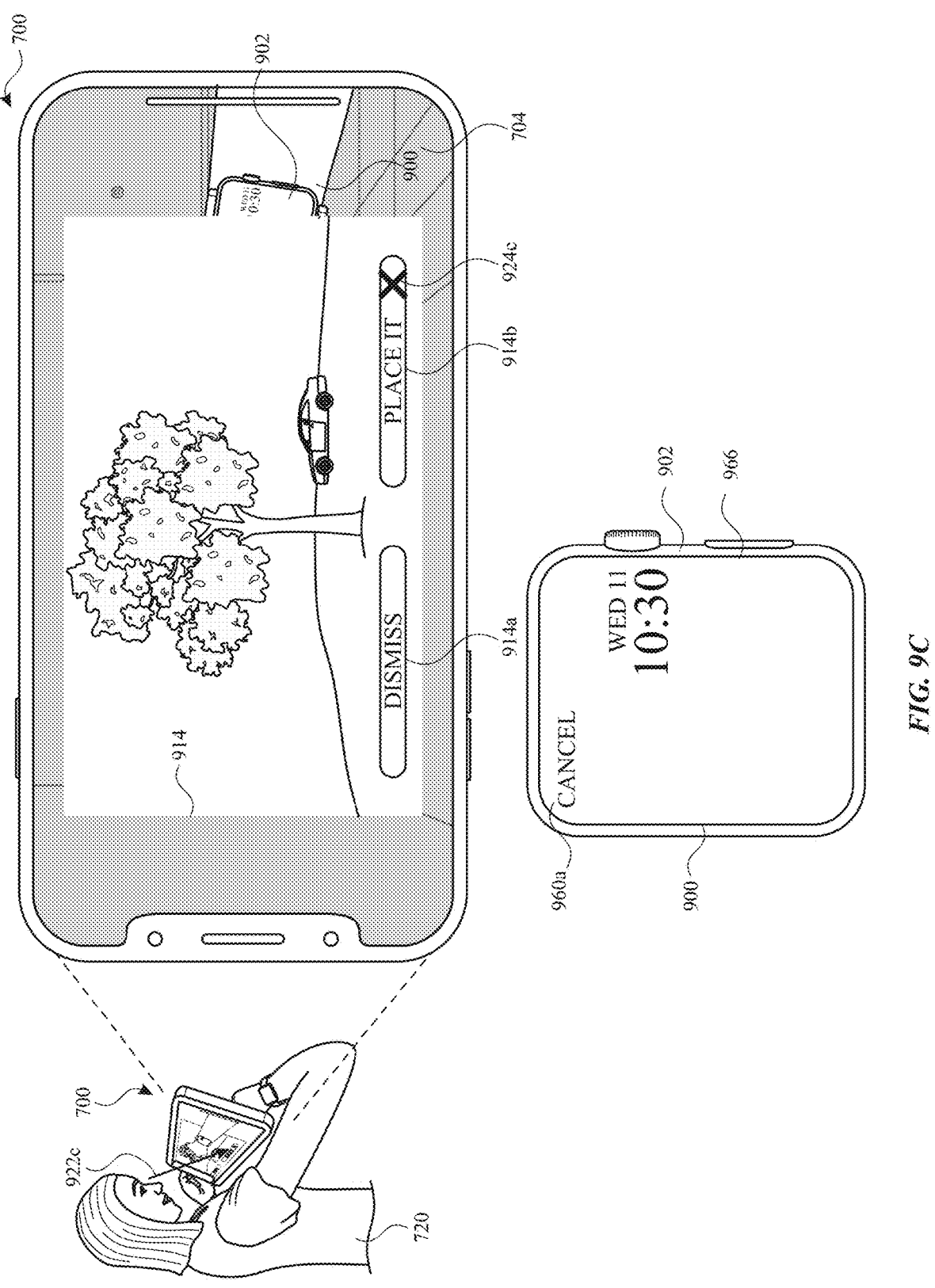

As illustrated in FIG. 9C, in response to detecting the gaze of user 720 in gaze direction 922b and/or at gaze location 924b (e.g., the location of handoff virtual object 918) for a predetermined period of time (e.g., 0.2-5 seconds), computer system 700 displays virtual object 914, which is a representation of photo 904 that was displayed by external device 900 in FIG. 9B and causes external device 900 to cease to display photo 904. In other words, in response to detecting the gaze of user 720 in gaze direction 922b and/or at gaze location 924b for the predetermined period of time, content from the media application running on external device 900 is displayed on computer system 700. In some embodiments, in response to detecting the gaze of user 720 in gaze direction 922b and/or at gaze location 924b for a predetermined period of time, computer system 700 displays virtual object 914 while causing external device 900 to cease to display photo 904. In some embodiments, computer system 700 causes external device 900 to cease to display photo 904 and/or display user interface 966 to indicate that content associated with the media application running on external device 900 is being displayed on display 704 (e.g., and/or computer system 700). In some embodiments, in response to detecting a tap input on cancel user interface object 960, external device 900 causes computer system 700 to ceases displaying virtual object 914 (and/or revert display 704 back to the state shown in FIG. 9A). Thus, in some embodiments, an input detected on external device 900 can cause computer system 700 to stop displaying content that is associated with an application on external device 900.

As illustrated in FIG. 9C, in response to detecting the gaze of user 720 in gaze direction 922b and/or at gaze location 924b for the predetermined period of time, computer system 700 displays dismiss virtual object 914a and place-it virtual object 914b. In some embodiments, in response to detecting selection (e.g., a gaze directed to dismiss virtual object 914a), computer system 700 ceases displaying virtual object 914 (and/or reverts display 704 back to state shown in FIG. 9A). At FIG. 9C, computer system 700 detects the gaze of user 720 in gaze direction 922c and/or at gaze location 924c (e.g., the location of place-it virtual object 914b) for a predetermined period of time.

Figure 9D:
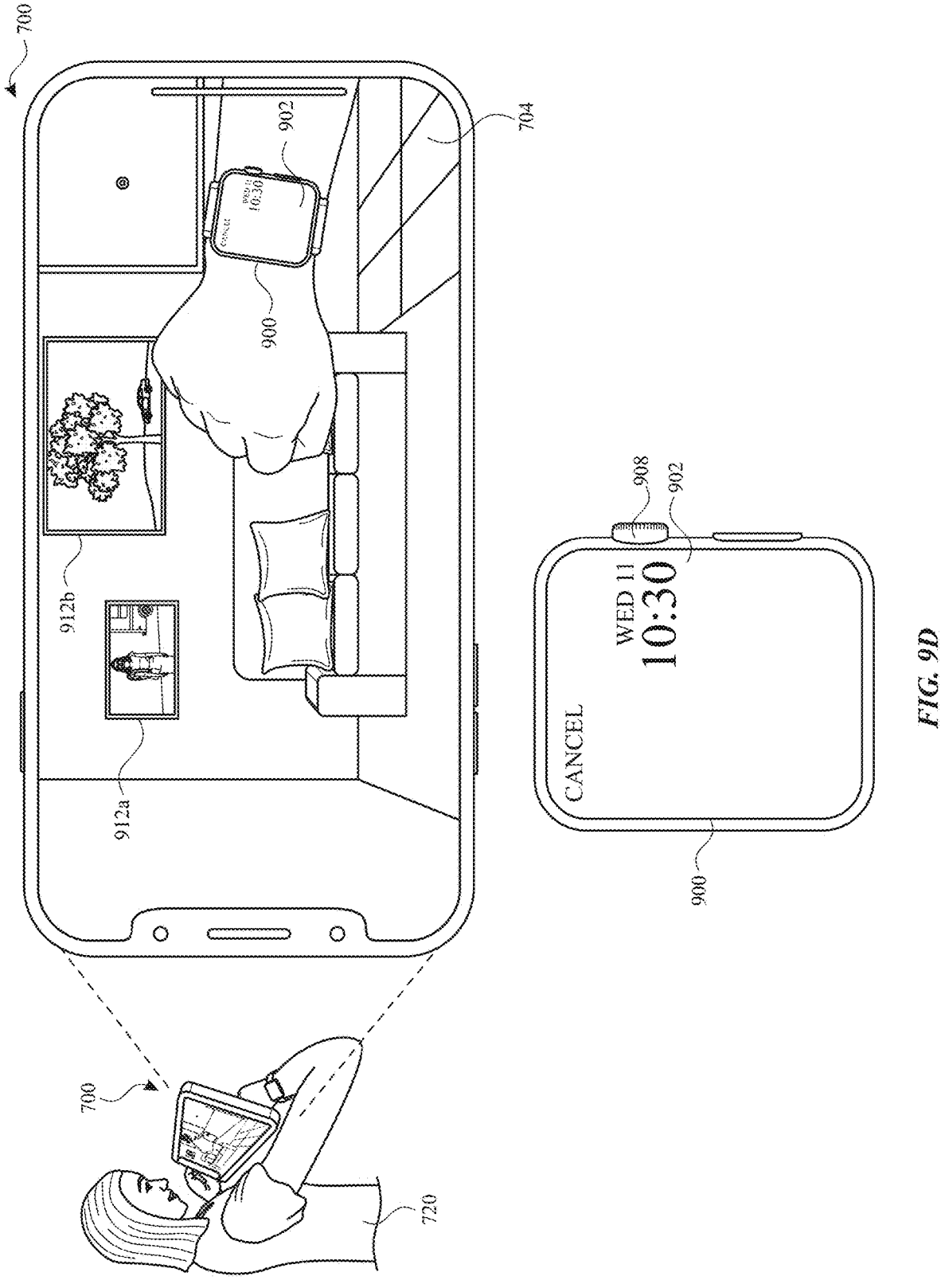

As illustrated in FIG. 9D, in response to detecting the gaze of user 720 at gaze location 924c (e.g., the location of place-it virtual object 914b), computer system 700 displays virtual object 912b (e.g., a representation of photo 904) overlaid on a respective location in the physical environment. At FIG. 9D, virtual object 912b is environment-locked to the respective location in the physical environment and is displayed concurrently with virtual object 912a (e.g., which is a virtual object that has been previously placed and/or environment-locked using one or more techniques as described above in relation to virtual object 912b of FIGS. 9A-9D). In some embodiments, in response to detecting the gaze of the user 720 at gaze location 924c, computer system 700 displays virtual object 912b overlaid on a location of the physical environment, without virtual object 912b being environment-locked. In some embodiments, computer system 700 changes the location of the physical environment on which virtual object 912b is overlaid based on the gaze of user 720 (e.g., without changing the location of virtual object 912a). For example, in some embodiments, computer system 700 shifts virtual object 912b in a respective direction (e.g., left, right, up, down, and/or any combination thereof) (e.g., without shifting virtual object 912a) in response to detecting the gaze of the user 720 moving in the respective direction. In some of these embodiments, computer system 700 does not environment-lock virtual object 912b at a respective location on the physical environment until the gaze of the user is detected at a location for a predetermined period of time (e.g., where virtual object 912b is environment-lock to the location in the physical environment that corresponds to the location at which the gaze of the user is detected for the predetermined period of time). In some of these embodiments, computer system 700 does not environment-lock virtual object 912b at a respective location on the physical environment until an input is detected on external device 900 (e.g., a button is pressed on external device 900). In some embodiments (e.g., before and/or after virtual object 912*b* is environment-locked), computer system 700 receives an indication that rotatable input mechanism 908 of external device 900 has been rotated, and in response to receiving the indication that rotatable input mechanism 908 of external device 900 has been rotated, computer system 700 increases and/or decreases the size of virtual object 912*b* without changing the size of virtual object 912*a*. In some embodiments (e.g., before and/or after virtual object 912*b* is environment-locked), computer system 700 receives an indication that rotatable input mechanism 908 of external device 900 has been rotated, and in response to receiving the indication that rotatable input mechanism 908 of external device 900 has been rotated, computer system 700 increases and/or decreases the sizes of virtual object 912*a* and virtual object 912*b*.

Figure 9E:
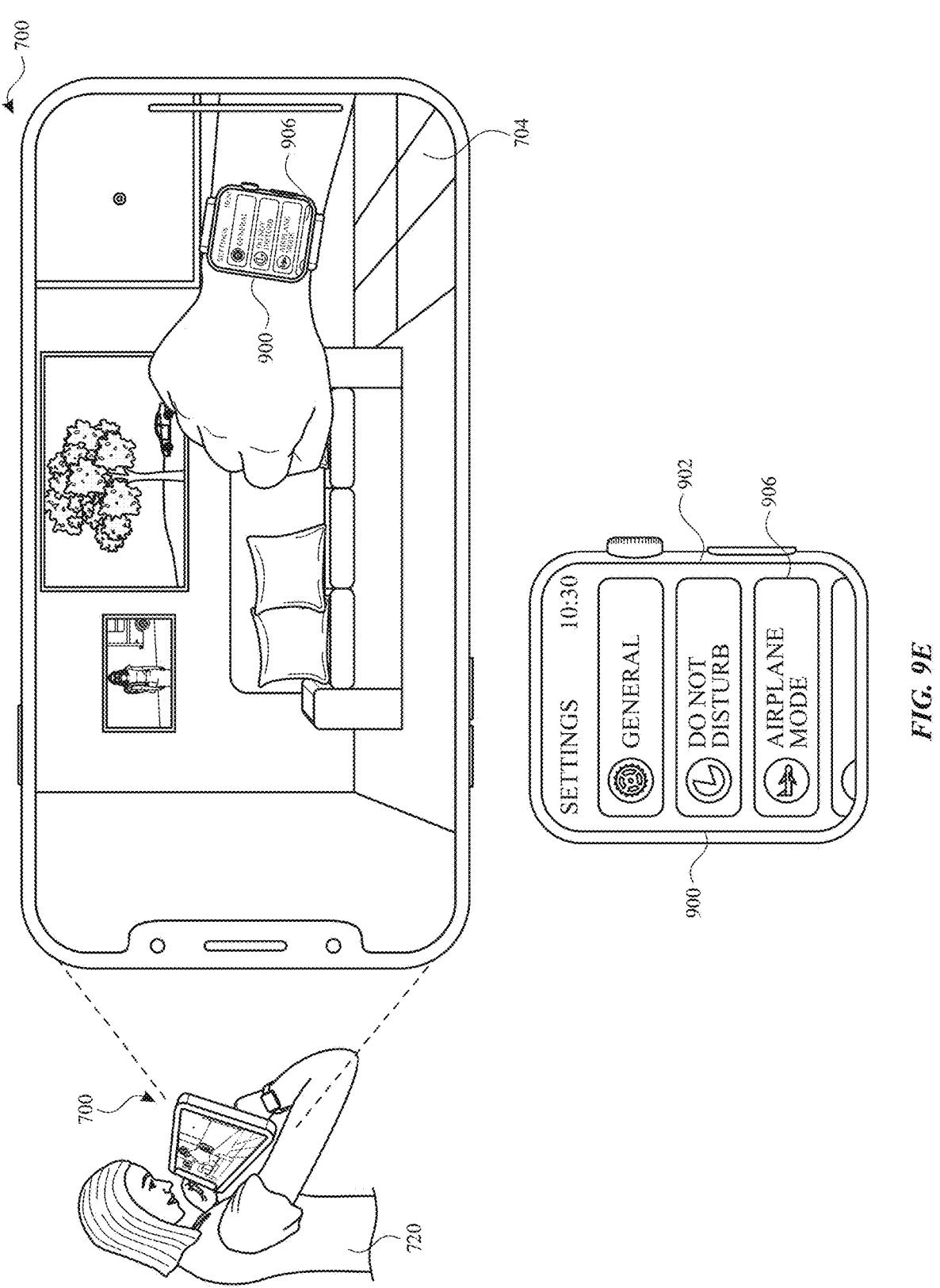

At FIG. 9E, external device 900 is displaying settings user interface 906 that corresponds to a settings application while being visible in display 704. However, at FIG. 9E, computer system 700 is not displaying a virtual object (e.g., a handoff virtual object) that corresponds to settings user interface 960 because a determination has been made that the set of respective criteria is not satisfied. Here, a determination is made that the set of respective criteria is not satisfied because a determination is made that computer system 700 is not displaying content of a particular type (e.g., content for the settings application is not eligible to be displayed by computer system 700 using one or more of the methods described above in relation to FIGS. 9A-9B), irrespective of the fact that computer system 700 is visible in display 704.

Figure 9F:
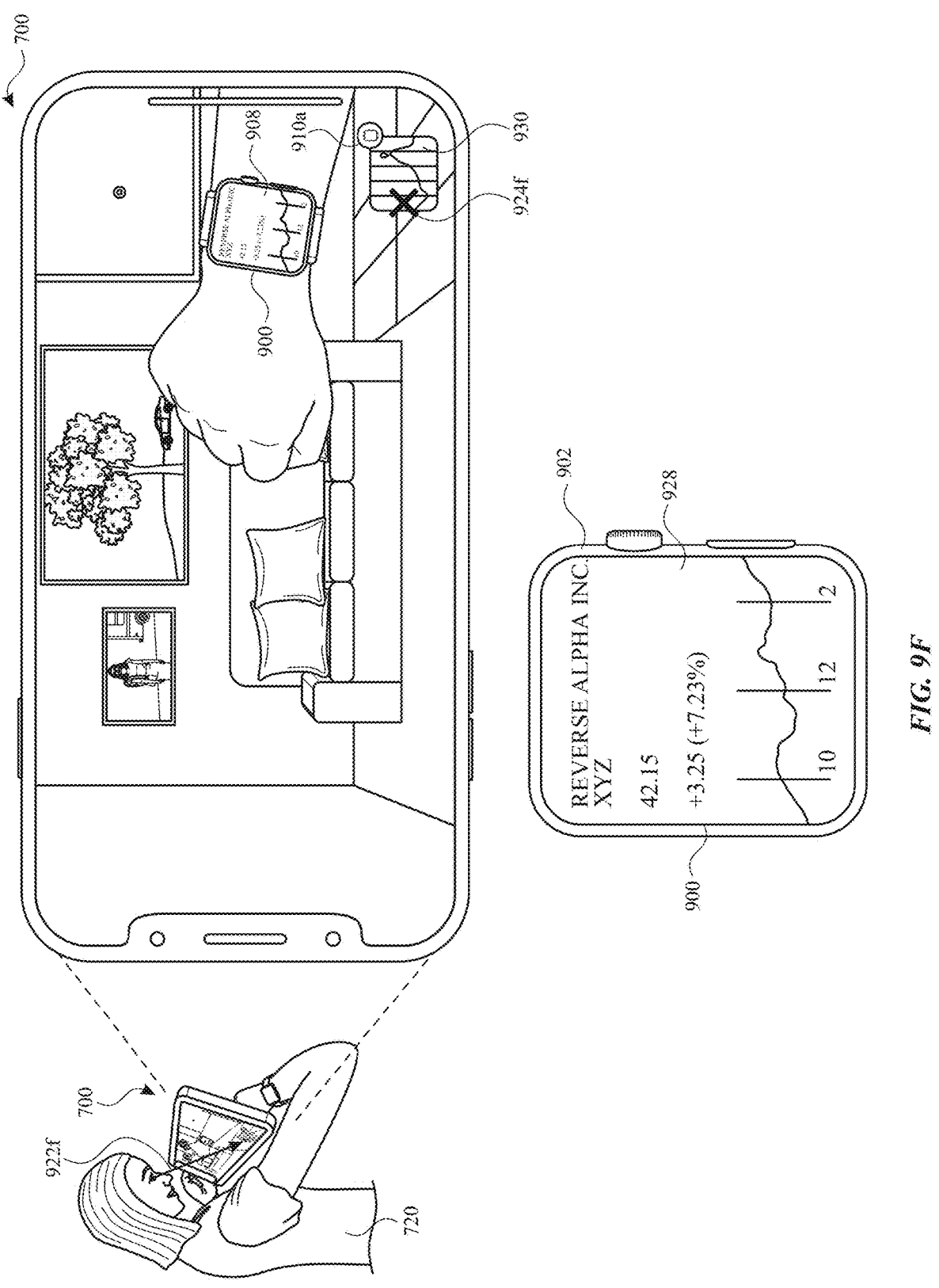

At FIG. 9F, external device 900 is displaying stocks user interface 928 that corresponds to a stocks application while being visible in display 704. While external device 900 is displaying stocks user interface 928 while being visible in display 704, a determination is made that the respective set of criteria is satisfied because external device 900 is visible in display 704 and the content displayed on stocks user interface 928 corresponds to a particular type (e.g., an eligible type) of content. As illustrated in FIG. 9F, because the determination is made that the respective set of criteria is satisfied, computer system 700 displays handoff virtual object 930 that includes handoff icon 910*a*. Handoff virtual object 930 includes a representation of the stock application (e.g., icon of the stock application includes a representation of a stock chart in FIG. 9F). Looking back at FIGS. 9B and 9F, handoff virtual object 930 of FIG. 9F is visually different from handoff virtual object 918 of FIG. 9B because each virtual object includes a representation of each of their different respective applications (stocks application vs. media application). In addition, handoff virtual object 930 of FIG. 9F and handoff virtual object 918 of FIG. 9B are displayed at the same location in display 704. In some embodiments, handoff virtual object 918 and handoff virtual object 930 are viewpoint-locked virtual objects. At FIG. 9F, computer system 700 detects the gaze of user 720 in gaze direction 922*f* and at gaze location 924*f* on display 704.

Figure 9G:
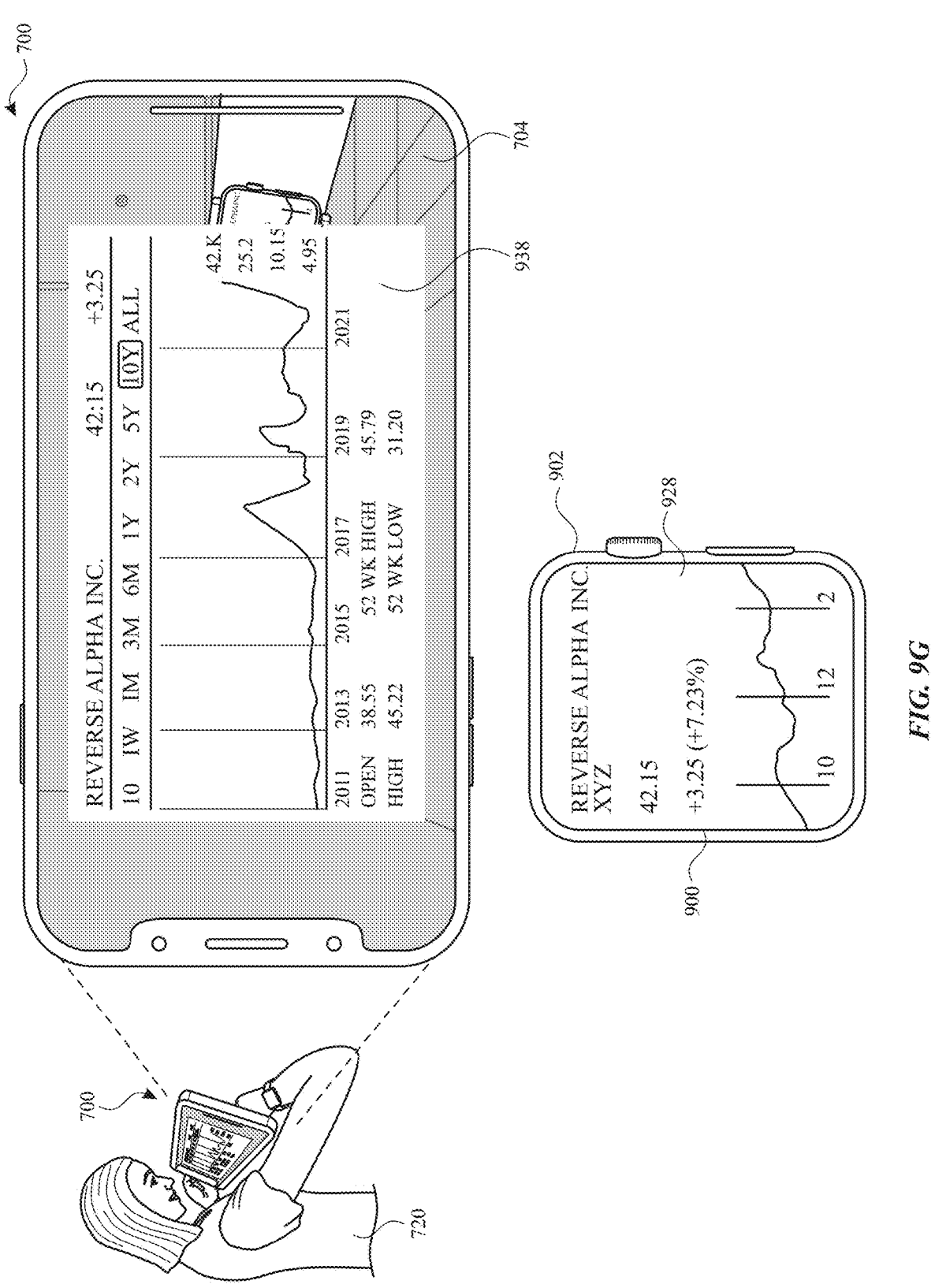

As illustrated in FIG. 9G, in response to detecting the gaze of user 720 in gaze direction 922*f* and at gaze location 924*f* (e.g., the location of handoff virtual object 930) for a predetermined period of time (e.g., 0.2-5 seconds), computer system 700 displays virtual object 938 overlaid on a respective location in the physical environment. Virtual object 938 includes content that corresponds to stocks user interface 928 (e.g., and/or the stocks application). As illustrated in FIG. 9G, virtual object 938 is an extended version of the stock chart for "XYZ" company that is being displayed by external device 900. Virtual object 938 includes more information concerning the stock price for "XYZ" company than stocks user interface 928. Thus, in some embodiments, computer system 700 displays more information (e.g., or the same information or less information) in response to detecting the gaze of a user that is directed to handoff virtual object 930 than is displayed by external device 900 (e.g., because the display of computer system 700 is bigger than the display of external device 900). In some embodiments, computer system 700 continues to display virtual object 938 after external device 900 ceases to be visible in display 704.

Additional descriptions regarding FIGS. 9A-9G are provided below in reference to method 1000 described with respect to FIGS. 9A-9G.

FIG. 10 is a flow diagram of an exemplary method 1000 for displaying content associated with an external device, in accordance with some embodiments. In some embodiments, method 1000 is performed at a computer system (e.g., computer system 101 in FIG. 1 and/or computer system 700) including a display generation component (e.g., display generation component 120 in FIGS. 1, 3, and 4) (e.g., a heads-up display, a display, a touchscreen, a projector, etc.)). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 1000 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1000 are, optionally, combined and/or the order of some operations is, optionally, changed.

While detecting that the computer system (e.g., 700) (and/or the display generation component) has a predetermined location relative to a portion of a body of the user (e.g., is being worn or held in a hand of the user) (e.g., by a user) (e.g., being used by a user and/or being position on a body part (e.g., head, eyes, wrist, hand, and/or palm of hand) of a user) (e.g., as described above in relation to FIGS. 9A-9B), the computer system receives (1002) an indication that an external device (e.g., 900) (e.g., an external device) (e.g., a smartphone, a desktop computer, a laptop, a tablet, and/or a smart watch) (e.g., a device that is different from the computer system) is displaying a user interface (e.g., 904). In some embodiments, as a part of receiving the indication that an external device is displaying a user interface, the computer system detects that a user interface is within the field-of-view of the camera system (e.g., the field-of-view of one or more cameras of the computer system and/or one or more cameras that are in communication with the computer system and/or the field-of-view of the display generation component (e.g., one or more display areas (e.g., lens) of the display generation component)), (e.g., visual content) (e.g., one or more virtual objects) and/or that the computer system is visible. In some embodiments, as a part of receiving an indication that an external device is displaying the user interface, the computer system detects that the external device is in an active state (e.g., an on state), where one or more user interface objects are displayed. In some embodiments, the external device is in communication with the computer system. In some embodiments, as a part of receiving an indication that an external device is displaying a user interface, the computer system detects content of the user interface of the external device and/or detects a change in content on the user interface of the external device and/or detects another user interface on the external device.

In response to (1004) receiving the indication that the external device (e.g., 900) is displaying the user interface (e.g., as described above in relation to FIG. 9B): in accordance with a determination that a respective set of criteria is satisfied, where the respective set of criteria includes a criterion that is satisfied when a determination is made that the user interface (e.g., 904) includes content of a first type (e.g., media content (e.g., photo media, video media, and/or audio media), word processing content, internet content, social media content, text content, and/or content that is associated with and/or viewed with a particular application (e.g., a photo application, a word processing application, a financial application, and/or a social media application), the computer system displays (1006), via the display generation component, a virtual object (e.g., 918 and/or 930) that is associated with (e.g., corresponds to, representative of, and/or assigned to) the content of the first type in a three-dimensional environment (e.g., in a virtual reality environment or an augmented reality environment) (e.g., as described above in relation to FIG. 9B) (e.g., that corresponds to the content of the first type) (e.g., a virtual object that was not previously displayed before the user interface of the external device includes content was detected and/or before the determination that the content of the first type was displayed). In some embodiments, in response to detecting a selection (e.g., selection via one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand)) of the virtual object, the computer system displays content that is/was displayed on the external device (e.g., before the virtual object was displayed) and/or is displayed content that is/was not displayed on the external device (e.g., before the virtual object was displayed). In some embodiments, the affordance is superimposed over a representation of the user interface of the external device that is viewed through the display generation component. In some embodiments, the affordance is not superimposed over a representation of the user interface of the external device that is viewed through the display generation component. In some embodiments, the affordance is displayed in a particular portion (e.g., top, bottom, left, and/or right) of the display generation component and/or towards an edge and/or corner of the display generation component. In some embodiments, the virtual object is displayed, via the display generation component, concurrently with one or more other virtual objects that were displayed before the user interface of the external device was detected within the field-of-view of the computer system and/or before the external device included content (e.g., content of the first type). In some embodiments, the virtual object is displayed with and/or includes an indication (e.g., visual representation) of the external device. In some embodiments, the indication is displayed on top of a portion of the virtual object. In some embodiments, virtual object is and/or represents an application icon. In some embodiments, in response to detecting that the user interface of the external device includes content and in accordance with a determination that the content is content of the first type, the computer system displays the virtual object associated with the content without further user input (e.g., air gestures, touch input, gaze input, speech input, and/or movement input).

In response to (1004) receiving the indication that the external device (e.g., 900) is displaying the user interface (e.g., as described above in relation to FIG. 9B): in accordance with a determination that a respective set of criteria is not satisfied, the computer system forgoes displaying (1008) the virtual object (e.g., 918 and/or 930) that is associated with (e.g., corresponds to, representative of, and/or assigned to) the content of the first type (e.g., as described above in relation to FIG. 9E). Displaying, via the display generation component, a virtual object that is associated with the content of the first type in a three-dimensional environment based on a prescribed set of conditions allows the computer system to automatically provide the virtual object based on whether the external device is displaying a user interface that includes content of the first type that is associated with the content and provides improved visual feedback concerning the state of external device (e.g., external device displays the relevant content) and/or one or more operations than can be performed when the set of prescribed conditions are met, which performs an operation when a set of conditions has been met without requiring further user input and provides improved visual feedback.

In some embodiments, the computer system is in communication with one or more gaze tracking sensors. In some embodiments, the method includes: while displaying the virtual object (e.g., 918 and/or 930) that is associated with the content of the first type in the three-dimensional environment, the computer system detects, via the one or more gaze tracking sensors, that a gaze and/or attention of the user is directed to the virtual object that is associated with content of the first type (e.g., as indicated by 922b and 924b). In some embodiments, in response to detecting that the gaze of the user is directed to the virtual object that is associated with content of the first type, the computer system performs an operation that is associated with the content of the first type (e.g., as described in relation to FIGS. 9B-9C). Performing an operation that is associated with the content of the first type in response to detecting that the gaze of the user is directed to the virtual object provides the user with control over the user interface to perform an operation based on detecting a gaze and/or attention of the user, which provides additional control options without cluttering the user interface.

In some embodiments, performing the operation that is associated with the content of the first type includes the computer system displays, via the display generation component, information (e.g., 914) (e.g., photo, a stock quote, text, symbols, and/or a graph) about the content of the first type (e.g., a portion of content that was and/or is displayed at the external device and/or content that is related to one or more portions of content that is displayed at the external device). Performing an operation that is associated with the content of the first type includes displaying, via the display generation component, information about the content of the first type includes in response to detecting that the gaze of the user is directed to the virtual object provides the user with control over the user interface to perform an operation based on detecting a gaze and/or attention of the user and provides the user with feedback at the computer system based on content that is displayed on the external device, which provides additional control options without cluttering the user interface and provides improved visual feedback.

In some embodiments, the external device (e.g., 900) is a smartwatch (e.g., a multifunction computer system that has a form factor that makes the multifunction computer system wearable on a wrist of a user).

In some embodiments, in response to receiving the indication that the external device (e.g., 900) is displaying the user interface (e.g., 906) and in accordance with a determination that the user interface does not include (e.g., is not currently displaying and/or is not concurrently running an application (e.g., in the foreground and/or in the background) that corresponds to) content of the first type, the computer system forgoes displaying the virtual object (e.g., 918 and/or 930) that is associated with the content of the first type (and/or another virtual object associated with user interface) (e.g., as described in relation to FIG. 9E). Forgoing displaying the virtual object that is associated with the content of the first type when a set of prescribed conditions are met allows the computer system to automatically forgo displaying the virtual object when the computer system detects the wearable device does not include content of the first type, which enables the computer system to automatically avoid outputting information when that information is not relevant, saving energy and drawing emphasis to relevant content for which the virtual object is displayed.

In some embodiments, in response to receiving the indication that the external device (e.g., 700) is displaying the user interface (e.g., 928) and in accordance with a determination that the user interface includes content of a second type that is different from the content of the first type (and the user interface does not include the first content of the first type), the computer system displays, via the display generation component, a virtual object (e.g., 930) that is associated with content of the second type (and not associated with content of the first type) (e.g., without displaying the virtual object that is associated with the first content). In some embodiments, the virtual object (e.g., 930) that is associated with content of the second type is different from the virtual object (e.g., 918) that is associated with content of the first type. In some embodiments, the user interface that includes content of the first type is associated with and/or corresponds to a first application (and does not correspond to a second application) and the user interface that includes content of the second type is associated with and/or corresponds to the second application (and does not correspond to the first application) that is different from the first application. In some embodiments, in response to receiving the indication that the external device is displaying the user interface and in accordance with a determination that the user interface does not include content of the second type and does not include content of the first type, forgoing displaying the virtual object that is associated with content of the second type and the virtual object that is associated with content of the first type. In some embodiments, in response to receiving the indication that the external device is displaying the user interface and in accordance with a determination that the user interface includes content of the second type and content of the first type, displaying the virtual object that is associated with content of the second type and the virtual object that is associated with content of the first type. In some embodiments, the virtual object that is associated with content of the second type is concurrently displayed with the virtual object that is associated with content of the first type. Displaying a virtual object that is associated with content of the second type when prescribed conditions are met allows the computer system to automatically display a different virtual object and/or a virtual object that is more relevant to current conditions (e.g., the user interface displayed by the external device), which performs an operation when a set of conditions has been met without requiring further user input.

In some embodiments, in response to receiving the indication that the external device (e.g., 900) is displaying the user interface and in accordance with a determination that the external device (e.g., 900) is not within a first portion of a first viewpoint of the user (e.g., display 704) (e.g., a field-of-view the one or more cameras of the computer system and/or a determined portion of a viewpoint of a user), the computer system forgoes displaying the virtual object that is associated with the content of the first type (and/or another virtual object associated with user interface). In some embodiments, in accordance with a determination that the external device is not within the first portion of the viewpoint of the user and in accordance with a determination that the user interface does not include content of the first type, the computer system forgoes displaying the virtual object that is associated with the content of the first type. Forgoing displaying the virtual object that is associated with the content of the first type when a set of prescribed conditions are met allows the computer system to automatically forgo displaying the virtual object when the wearable device is not visible, which enables the computer system to automatically avoid outputting information when in situations where the information is not likely to be relevant to a user at a particular point in time, saving energy and drawing emphasis to relevant content for which the virtual object is displayed.

In some embodiments, in response to receiving the indication that the external device (e.g., 900) is displaying the user interface: in accordance with a determination that the external device is within a second portion of a second viewpoint (e.g., 704) of the user (e.g., a field-of-view the one or more cameras of the computer system and/or a determined portion of a viewpoint of a user) and in accordance with a determination that the user interface does not include content of the first type (or any other relevant type), the computer system forgoes displaying the virtual object (e.g., 918 and/or 930) that is associated with the content of the first type (and/or another virtual object associated with user interface) (e.g., as described above in relation to FIG. 9E). Forgoing displaying the virtual object that is associated with the content of the first type when a set of prescribed conditions are met allows the computer system to automatically forgo displaying the virtual object when the computer system detects the wearable device does not include content of the first type, which enables the computer system to automatically avoid outputting information when that information is not relevant, saving energy and drawing emphasis to relevant content for which the virtual object is displayed.

In some embodiments, in response to receiving the indication that the external device (e.g., 900) is displaying the user interface and in accordance with a determination that the external device is not in a predetermined location relative to a portion of a body of the user (e.g., is being worn or held in a hand of the user) (e.g., being worn by a user and/or being position on a body part (e.g., head, eyes, wrist, hand, and/or palm of hand) of a user) (e.g., as described above in relation to FIGS. 9A-9B), the computer system forgoes displaying the virtual object (e.g., 918 and/or 930) that is associated with the content of the first type (and/or another virtual object associated with user interface). In some embodiments, the respective set of criteria includes a criterion that is satisfied when a determination is made that the external device is in the predetermined location relative to a portion of a body of the user. Forgoing displaying the virtual object that is associated with the content of the first type when a set of prescribed conditions are met allows the computer system to automatically forgo displaying the virtual object when the computer system detects that the wearable device is not being worn, which enables the computer system to automatically avoid outputting information when that information is not relevant, saving energy and drawing emphasis to relevant content for which the virtual object is displayed and enhances security by limiting the number of displays of unauthorized content, which performs an operation when a set of conditions has been met without requiring further user input and enhances the security of the computer system.

In some embodiments, the computer system is in communication with a second set of one or more cameras, and the respective set of criteria includes a criterion that is satisfied when a determination is made that the external device is within a portion of a field-of-view of the second set of one or more cameras (e.g., a field-of-view the one or more cameras of the computer system and/or a determined portion of a field-of-view of a user) (e.g., as described above in relation to FIGS. 9A-9B). Displaying the virtual object that is associated with the content of the first type when a set of prescribed conditions are met allows the computer system to automatically display the virtual object when relevant conditions exist (e.g., when the wearable device is visible), which performs an operation when a set of conditions has been met without requiring further user input.

In some embodiments, while displaying the virtual object (918 and/or 930) that is associated with the content of the first type in the three-dimensional environment, the computer system detects selection (e.g., selection via one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by a camera that is in communication with the computer system and/or one or more body worn sensors (e.g., sensors on a watch (e.g., a heart rate sensor and/or a gyroscope) monitoring the movement of a body part (e.g., hand)) of the virtual object that is associated with the content of the first type (e.g., as described above in relation to FIGS. 9B-9C and 9F-9G). In some embodiments, detecting selection of the virtual object includes detecting a gaze and/or attention of the user that is directed to the virtual object (e.g., for a predetermined period of time) (and, in some embodiments, detecting a gaze and/or attention of the user that is directed to the virtual object while detecting a hand input (and/or an air gesture, as described below in relation to method 1200)). In some embodiments, in response to detecting selection of the virtual object that is associated with the content of the first type (e.g., as described in relation to 922b, 924b, 922f, and 924f), the computer system displays second content (e.g., 914 and/or 938) (e.g., photo media and/or a stock chart) that corresponds to the content of the first type. Displaying second content that corresponds to the content of the first type in response to detecting selection of the virtual object that is associated with the content of the first type provides control over the user interface to display second content that corresponds to the content of the first type in response to select of the virtual object that is associated with content of the first type, which provides additional control options without cluttering the user interface.

In some embodiments, in response to detecting the selection of the virtual object that is associated with the content of the first type, the computer system displays, via the display generation component, a second virtual object (e.g., 914a) concurrently with the second content (e.g., 914) that corresponds to the content of the first type (e.g., as described above in relation to FIG. 9C). In some embodiments, while displaying the second virtual object concurrently with the second content that corresponds to the content of the first type, the computer system detects selection (e.g., using one or more techniques as described above in relation to selection of the virtual object that is associated with content of the first type) of the second virtual object (e.g., as described above in relation to FIG. 9C). In some embodiments, detecting selection of the second virtual object includes detecting a gaze and/or attention of the user that is directed to the second virtual object (e.g., for a predetermined period of time) (and, in some embodiments, detecting a gaze and/or attention of the user that is directed to the second virtual object while detecting a hand input and/or an air gesture, as described below in relation to method 1200) (e.g., as described above in relation to FIG. 9C). In some embodiments, in response to detecting selection of the second virtual object, the computer system ceases, via the display generation component, to display the second content that corresponds to the content of the first type (e.g., as described above in relation to FIG. 9C). Ceasing to display the second content that corresponds to the content of the first type in response to detecting selection of the second virtual object allows the user to dismiss and/or close out content that was previously displayed via selection of the virtual object that is associated with the content of the first type, which provides additional control options without cluttering the user interface.

In some embodiments, in response to detecting the selection of the virtual object that is associated with the content of the first type, the computer system displays a third virtual object (e.g., 914b) (e.g., "place it") concurrently with the second content that corresponds to the content of the first type (e.g., as described above in relation to FIGS. 9C-9D). In some embodiments, while displaying the third virtual object, detecting selection (e.g., 922c and 924c) (e.g., using one or more techniques as described above in relation to selection of the virtual object that is associated with content of the first type) of the third virtual object (e.g., as described above in relation to FIGS. 9C-9D) and (and, in some embodiments, detecting selection of the third virtual object includes detecting a gaze and/or attention of the user that is directed to the third virtual object (e.g., for a predetermined period of time) (and, in some embodiments, detecting a gaze that is directed to the third virtual object while detecting a hand input (e.g., an air gesture, as described below in relation to method 1200)) in response to detecting the selection of the third virtual object: emphasizing (selecting, focusing, and/or emphasizing (e.g., causing the virtual object to be highlighted and/or placed in visual focus (and, in some embodiments, highlighted/emphasized with respect to one or more other virtual objects), one or more borders that surround the virtual objects and/or one or more borders and/or text of the virtual object to be emphasized (e.g., bolded, increase in sized, and/or displayed with a changed color)) (e.g., programmatically tracking) a first portion (e.g., at least a first portion) of the second content (e.g., as described above in relation to FIGS. 9C-9D); and displaying the first portion (e.g., 912b) of the second content at a first location that is associated with the three-dimensional environment (e.g., after emphasizing the first portion of the second content) (and, in some embodiments, the portion of the second content was not previously displayed in the three-dimensional environment before detecting selection of the third virtual object) (e.g., as described above in relation to FIGS. 9C-9D). Emphasizing a first portion of the second content and displaying the first portion of the second content at a first location that is associated with the three-dimensional environment in response to detecting selection of the third virtual object provides conditional control to the user by allowing the user to place content in the three-dimensional environment, which provides additional control options without cluttering the user interface.

In some embodiments, the computer system is in communication with a set of gaze tracking sensors. In some embodiments, the method further includes: while the first portion (e.g., 912*b*) of the second content is displayed at the first location and while the first portion of the second content is emphasized, the computer system detects, via the first set of gaze tracking sensors, that a gaze and/or attention of a user has changed from being in a first predetermined direction to being in a second predetermined direction that is different from the first predetermined direction (e.g., as described above in relation to FIGS. 9C-9D). In some embodiments, in response to detecting that the gaze of the user has changed from being in the first predetermined direction to being in the second predetermined direction (e.g., and while the first portion of the second content is emphasized), moving the first portion (e.g., 912*b*) of the second content from the first location to a second location that is in the second predetermined direction of the gaze of the user and that is associated with the three-dimensional environment. In some embodiments, the second location is different from the first location (e.g., as described above in relation to FIGS. 9C-9D). Moving the first portion of the second content from the first location to a second location that is in the second predetermined direction of the gaze of the user and that is associated with the three-dimensional environment in response to detecting that the gaze of the user has changed from being in the first predetermined direction to being in the second predetermined direction that is different from the first predetermined direction provides the user with more control over the computer system by allowing a user to place content at a particular location based on the user's gaze and/or intention, which provides additional control options without cluttering the user interface.

In some embodiments, the computer system is in communication with a set of gaze tracking sensors. In some embodiments, the method includes: while the first portion (e.g., 912*b*) of the content is displayed at the first location (and not environment-locked to the first location) and while the first portion of the second content is emphasized, the computer system detects, via the second set of gaze tracking sensors, a gaze of the user (e.g., as described above in relation to FIGS. 9C-9D). In some embodiments, in response to detecting, via the second set of gaze tracking sensors, the gaze of the user and in accordance with a determination that the gaze of the user has been detected for a predetermined period of time, the computer system causes the first portion (e.g., 912*b*) of the second content to transition being an environment-locked virtual object (e.g., from being a virtual object that moves in the viewpoint of the user based on the direction of the user's gaze) (e.g., as described above in relation to FIGS. 9C-9D). In some embodiments, the first portion of the second content is locked at the first location of the physical environment. In some embodiments, in response to detecting, via the second set of gaze tracking sensors, the gaze of the user and in accordance with a determination that the gaze of the user has been detected for a predetermined period of time, the computer system de-emphasizes the first portion of the second content locked at the first location such that a subsequent change in gaze and/or movement of a viewpoint would not cause the computer system to move the first portion of the content from being overlaid the first location of the three-dimensional environment (e.g., without requiring additional user input to re-emphasizes the first portion of content)). Causing the first portion of the second content to transition to being an environment-locked virtual object in response to detecting, via the second set of gaze tracking sensors, the gaze of the user and in accordance with a determination that the gaze of the user has been detected for a predetermined period of time allows a user to display content at a particular position in the three-dimensional environment by providing a gaze input that dwells at a location for a period of time, which provides additional control options without cluttering the user interface.

In some embodiments, the external device (e.g., 900) includes (and/or includes) a physical input mechanism (e.g., 702*a*-702*c*) (e.g., a hardware button) (e.g., a hardware input device/mechanism) (e.g., a physical input device). In some embodiments, the method includes: while the first portion of the content is displayed at the first location and while the first portion of the second content is emphasized, the computer system receives an indication that a first physical input (e.g., a pressing input, a sliding input, a rotating input, a long touching input (e.g., without pressing) and/or a press-and-hold input) has activated the physical input mechanism of the external device (e.g., as described in relation to FIGS. 9C-9D). In some embodiments, in response to receiving the indication that the first physical input has activated the physical input mechanism (e.g., while detecting the gaze of the user at the first location), the computer system displays the first portion (e.g., 912*b*) of the second content as being environment-locked at the first location (e.g., as described in relation to FIGS. 9C-9D) (e.g., locked such that a subsequent change in gaze would not cause the computer system to move the first portion of the content from the first location (e.g., without requiring additional user input to re-emphasize the first portion of content)). In some embodiments, while displaying the first portion of the second content locked at the first location associated with the three-dimensional environment, the computer detects movement of a viewpoint of the user. In some embodiments, in response to detecting movement of the viewpoint of the user, the computer shifts (e.g., via the display generation component) a location of the portion of the second content to continue to display the first portion of the second content at the first location. Displaying the first portion of the second content as being environment-locked at the first location in response to receiving the indication that the first physical input has activated the physical input mechanism of the external device provides the user with an additional control option to display content at a particular position in the three-dimensional environment by providing an input on an input mechanism, which provides additional control options without cluttering the user interface.

In some embodiments, after displaying the first portion (e.g., 912*a*-912*b*) of the second content locked at the first location, the computer system displays a second portion (e.g., 912*a*-912*b*) of the second content that is currently emphasized at a third location that is associated with the three-dimensional environment (e.g., as described in relation to FIGS. 9C-9D). In some embodiments, while displaying the second portion of the second content that is currently emphasized, the computer system detects a request to lock the second content that is currently emphasized at the third location (using one or more techniques as described above in relation to placing content in space) (e.g., as described in relation to FIGS. 9C-9D). In some embodiments, in response to detecting the request to lock the second content that is currently emphasized at the third location, the computer system displays the second portion (e.g., 912a-912b) of the second content as being environment-locked to the third location while concurrently displaying the first portion of the second content as being environment-locked to the first location. In some embodiments, the third location is different from the first location (e.g., as described in relation to FIGS. 9C-9D). In some embodiments, the computer system gives the user the ability to place multiple portions of content that are locked to a position in the three-dimensional environment. In some embodiments, after ceasing to display the virtual object (and/or after restarting the computer system), the portions of content that were placed are still displayed at their respective locations in the three-dimensional environment. In some embodiments, while displaying the first portion of the second content locked at the first location associated with the three-dimensional environment and the second portion of the second content locked at the third location associated with the three-dimensional environment, the computer detects movement of a viewpoint of the user. In some embodiments, in response to detecting movement of the viewpoint of the user, the computer shifts (e.g., via the display generation component) a location of the first portion of the second content to continue to display the first portion of the second content at the first location and shifts (e.g., via the display generation component) a location of the first portion of the second content to continue to display the first portion of the second content at the third location. Displaying the second portion of the second content locked at the first location while concurrently displaying the first portion of the second content locked at the first location, where the third location is different from the first location in response to detecting the request to lock the second content that is currently emphasized at the third location provides the user additional control options to concurrently display and place different portions of the content at different locations in the three-dimensional environment, which provides additional control options without cluttering the user interface.

In some embodiments, the external device includes a rotatable input mechanism (e.g., 908). In some embodiments, the method further includes: while the first portion (e.g., 912a or 912b) of the content is displayed at the first location and while the first portion of the second content is emphasized, the computer system receives an indication that a second physical input has activated (e.g., turned) the routable input mechanism (e.g., a crown of a watch) of the external device (e.g., as described in relation to FIGS. 9C-9D). In some embodiments, the rotatable input mechanism is a depressible and rotatable input device. In some embodiments, the rotatable input mechanism is physically connected to the housing of the electronic device. In some embodiments, the rotatable input mechanism is rotated in a direction that is perpendicular to a display generation component (e.g., display screen) of the external device. In some embodiments, in response to receiving the indication that the second physical input has activated the rotatable input mechanism, the computer system displays the first portion of the second content to change size based on movement of the rotatable input mechanism (e.g., as described in relation to FIGS. 9C-9D) (and/or the movement of the second physical input). In some embodiments, the magnitude and/or speed of the movement of the rotatable mechanism influences the amount that the first portion of the second content changes in size, where a greater magnitude of the movement and/or a higher speed of movement causes the computer system to increase and/or decrease the size of the first portion of the second content faster and a lesser magnitude of the movement and/or a lower speed of movement causes the computer system to increase and/or decrease the size of the first portion of the second content slower. In some embodiments, movement of the rotatable input mechanism in one direction causes the computer to increase the size of the first portion of the second content, and movement of the rotatable input mechanism in the opposite direction causes the computer system to decrease the size of the first portion of the second content. Displaying the first portion of the second content to change size based on movement of the first physical input provides additional control over the user interface by allowing a user to provide a physical input on a rotatable input mechanism to change the size of portions of content, which provides additional control options without cluttering the user interface.

In some embodiments, displaying the first portion (e.g., 912a or 912b) of the second content to change size based on movement of the rotatable input mechanism includes the computer system forgoes changing a size of a third portion (e.g., 912a or 912b) of the second content (e.g., that is different from the first portion of the second content and, in some embodiments, the second portion of the second content) based on the movement of the rotatable input mechanism (e.g., 908) (e.g., continuing to display the third portion of the second content at a size, irrespective of the movement of the second input) (e.g., as described in relation to FIGS. 9C-9D). Displaying the first portion of the second content to change size based on movement of the first physical input includes forgoing to change a size of a third portion of the second content based on the movement of the first physical input to change the size of a particular portion of content without changing the size of another portion of the content, which provides additional control options without cluttering the user interface.

In some embodiments, while displaying the virtual object that is associated with the content of the first type in the three-dimensional environment and while external device is displaying the user interface (e.g., 904) that includes the content of the first type, the computer system detects a second selection (e.g., 922b and/or 924b) (e.g., using one or more techniques as described above in relation to selection of the virtual object that is associated with content of the first type) of the virtual object that is associated with the content of the first type (e.g., as described in relation to FIGS. 9B-9C). In some embodiments, in response to detecting the second selection of the virtual object that is associated with the content of the first type, the computer system ceases display of (e.g., causing the external device to cease display of) at least a portion of the content of the first type (and/or ceasing to display at least a portion of the content of the first type) (e.g., as described in relation to FIGS. 9B-9C).

Causing the external device to cease display of at least a portion of the content of the first type in response to detecting the second selection of the virtual object that is associated with the content of the first type provides visual feedback to a person that the computer system is displaying content of the first type, which provides improved visual feedback.

In some embodiments, aspects/operations of methods 800, 1200, 1400, 1600, 1800, 2000, 2200, 2400, 2600, 2800, 3000, and 3200 may be interchanged, substituted, and/or added between steps of method 1000. For example, method 1000 can be performed at a computer system that is awaken using method 800. For brevity, these details are not repeated here.

FIGS. 11A1-11E3 illustrate example techniques for performing one or more operations based on an input scheme, in accordance with some embodiments. FIG. 12 is a flow diagram of methods for performing one or more operations based on an input scheme, in accordance with some embodiments. The user interfaces in FIGS. 11A1-11E3 are used to illustrate the process in FIG. 12.

In particular, FIGS. 11A1-11E3 illustrate exemplary scenarios where a computer system is configured to use different input schemes, such as a "Gaze-Only" input scheme and a "Gaze-With-Gesture" (and/or Gaze-With-External Device) input scheme. A "Gaze-Only" input scheme is an input scheme where the computer system performs a set of one or more operations based on detecting a first gaze pattern and a second gaze pattern. In some embodiments, to detect the first gaze pattern, the computer system detects that the gaze of a user is directed to a location (or the user's gaze is in a direction) for a first predetermined period of time (e.g., 0.1-2 seconds). In some embodiments, to detect the second gaze pattern, the computer system detects that the user is dwelling on a location (and/or a virtual object and/or a user interface element), where the computer system detects that a user's gaze is directed to a location for longer than a second determined period of time (e.g., 0.5-10 seconds) that is greater than the first predetermined period of time. Thus, in some embodiments, detecting the second gaze pattern includes detecting the first gaze pattern, where the gaze of a user is detected a particular location for longer than the second predetermined period of time (e.g., that includes the first predetermined period of time). A "Gaze-With-Gesture" input scheme is an input scheme where the computer system performs the set of one or more operations based on the detection of a gesture (e.g., an air gesture) while the gaze of the user is directed to a virtual object and/or a user interface element (and/or while detecting the gaze of the user in the first gaze pattern, the second gaze pattern, and/or another gaze pattern). In some embodiments, the "Gaze-With-Gesture" input scheme is referred to as a "Gaze-With-Electronic Device" input scheme when the air gesture is detected at the external device. For case of discussion, FIGS. 11A1-11E3 are described with respect to the "Gaze-With-Electronic Device" input scheme (e.g., which is a type of "Gaze-With-Gesture" input scheme), but a different type of Gaze-With-Gesture" input scheme (e.g., one which does not require an external device) could be substituted for the "Gaze-With-Electronic Device" input scheme. In some embodiments, while configured to use the "Gaze-Only" input scheme, the computer system does not perform the set of one or more operations in response to detecting a gesture (e.g., an air gesture). Rather, in some embodiments, the computer system only performs the set of one or more operations based on the gaze of the user being detected in the second gaze pattern while the computer system is configured to use the "Gaze-Only" input scheme. In some embodiments, while configured to use the "Gaze-With-External Device" input scheme, the computer system does not perform the set of one or more operations when the gaze of the user is in the first gaze pattern without an air gesture being detected at an external device.

In some embodiments, an air gesture is a hand gesture. In some embodiments, the air gesture is detected by a camera that is in communication with a computer system and/or one or more body-worn sensors (e.g., sensors (e.g., a heart rate sensor and/or a gyroscope) on an external device, such as external device 900 (e.g., a watch) described below in FIGS. 9A-9G)) monitoring the movement of a hand (and, in some embodiments, including the fingers of the hand). In some embodiments, an air gesture is a gesture that is detected without the user touching an input element that is part of the computer system and/or the external device (or independently of an input element that is a part of the computer system and/or the external device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body). One or more types of air gestures and/or hand gestures will be described throughout FIGS. 11A1-11E3 below.

FIG. 11A1 illustrates computer system 1100a1, which is configured to use a "Gaze-Only" input scheme. In some embodiments, computer system 1100a1 includes one or more features of computer system 101 and/or computer system 700. FIGS. 11A1, 11B1, 11C1, 11D1, and 11E1 correspond to each other, where one or more inputs (e.g., gaze-based inputs and/or air gestures) detected in any of these FIGs. can impact one or more operations that are performed by computer system 1100a1. In some embodiments, computer system 1100a1 is configured to use the "Gaze-Only" input scheme because a determination has been made that an external is not available for input. In some embodiments, this determination is made because computer system 1100a1 detects that user 720 is not wearing an external device in FIG. 11A1.

FIG. 11A2 illustrates computer system 1100a2, which is configured to use the "Gaze-With-External Device" input scheme. In some embodiments, computer system 1100a2 includes one or more features of computer system 101 and/or computer system 700. FIGS. 11A2, 11B2, 11C2, 11D2, and 11E2 correspond to each other, where one or more inputs (e.g., gaze-based inputs and/or air gestures) that are detected in any of these FIGs. can impact one or more operations that are performed by computer system 1100a2. In some embodiments, computer system 1100a2 is configured to use the "Gaze-With-External Device" input scheme because a determination has been made that external device 900 is available for input. In some embodiments, the determination is made that external device 900 is available for input because user 720 is wearing external device 900 in FIG. 11A2. In some embodiments, the determination is made that external device 900 is available for input because computer system 1100a2 detects that user 720 is wearing external device 900 in a raised position (e.g., above a threshold angle relative to the ground and/or the hip of user 720) (e.g., above a 90-degree angle (and/or 60 degrees and/or 40 degrees and/or 30 degrees) relative to the ground at FIG. 11A2 and/or the arm of user 720 is bent above a 90-degree angle).

FIG. 11A3 illustrates computer system 1100*a*3, which is configured to use the "Gaze-With-External Device" input scheme. In some embodiments, computer system 1100*a*3 includes one or more features of computer system 101 and/or computer system 700. FIGS. 11A3, 11B3, 11C3, 11D3, and 11E3 correspond to each other, where one or more inputs (e.g., gaze-based inputs and/or air gestures) that are detected in any of these FIGs. can impact one or more operations that are performed by computer system 1100*a*3. In some embodiments, computer system 1100*a*3 is configured to use the "Gaze-With-External Device" input scheme because a determination has been made that external device 900 is available for input. In some embodiments, the determination is made that external device 900 is available for input because computer system 1100*a*3 detects that user 720 is wearing external device 900 in FIG. 11A3. In some embodiments, the determination is made that external device 900 was in a raised position (e.g., above a threshold angle (90 degrees and/or 70 degrees and/or 60 degrees and/or 45 degrees and/or 30 degrees) relative to the ground and/or the hip of user 720) at a period of time before (e.g., a threshold period of time before (e.g., 1-60 minutes) being in the non-raised position (e.g., below a threshold angle (90 degrees and/or 70 degrees and/or 60 degrees and/or 45 degree and/or 30 degrees) relative to the ground and/or the hip of user 720) at FIG. 11A3. In embodiments where external device 900 was not detected in the raised position and/or external device 900 was always in the non-raised position at FIG. 11A3 (e.g., watch raised less than 90-degrees (and/or 60 degrees and/or 50 degrees and/or 30 degrees) relative to the ground), a determination is made that external device 900 of FIG. 11A3 is not available for input, and computer system 1100*a*3 is configured to use the "Gaze-Only" input scheme. Thus, in some embodiments, after a computer system is initially configured to use the "Gaze-With-External Device," the computer system continues to be configured (e.g., for a predetermined period of time or while the computer system remains in a certain state (e.g., an unlocked state) to "Gaze-With-External Device" input scheme even if external device 900 is detected as being in a non-raised position for shorter than the predetermined period of time (e.g., and/or irrespective the predetermined period of time). In some embodiments, computer systems 1100*a*1-1100*a*3 include one or more components of computer system 700 as described herein. In some embodiments, computer systems 1100*a*1-1100*a*3 are the same computer system, and the user is using the computer system at different points in time. In some embodiments, computer systems 1100*a*1-1100*a*3 are different computer systems.

While computer systems 1100*a*1-1100*a*3 are phones in FIGS. 11A1-11A3, computer systems 1100*a*1-1100*a*3 can be one or more other devices, such as a tablet and/or a head-mounted device. In some embodiments, computer systems 1100*a*1-1100*a*3 include one or more components of computer system 101 and/or have respective displays that include components of display generation component 120. In some embodiments, the respective displays present a representation of the physical environment via one or more cameras in communication with computer system 700 (e.g., using "pass-through video" as described above). In some embodiments, the respective displays include a transparent or semi-transparent display through which a user can view the physical environment directly, and the respective displays can present virtual objects on the transparent or semi-transparent display. In some embodiments, the respective displays project (e.g., via one or more display projectors) virtual objects into and/or onto the physical environment. In some embodiments, virtual objects may be projected, for example, on a physical surface or as a holograph, so that one or more users, using computer systems 1100*a*1-110*a*3, observe the virtual objects superimposed over the physical environment. In some embodiments, the respective displays include arrays of projectors (e.g., and/or multiple projectors), where a set of the projectors of the respective displays can be turned on (e.g., active) (e.g., via computer systems 1100*a*1-1100*a*3) while another set of the projectors are turned off (e.g., inactive) (e.g., via computer systems 1100*a*1-1100*a*3).

At FIG. 11A1, computer system 1100*a*1 detects that the gaze of user 720 is directed to stocks application virtual object 1102*a*1 (e.g., as indicated by gaze direction 1122*a*1 and gaze location 1124*a*1). In response to detecting that the gaze of user 720 is directed to stocks application virtual object 1102*a*1, a determination is made that the gaze of user 720 is in the second gaze pattern. As illustrated in FIG. 11B1, as a result of the determination that the gaze of user 720 is in the second gaze pattern, computer system 1100*a*1 launches a stocks application (e.g., that corresponds to stocks application virtual object 1102*a*1) and displays stock application user interface virtual object 1180*a*1. As a result of the determination that the gaze of user 720 is in the second gaze pattern, computer system 1100*a*1 launches the stocks application and displays stock application user interface virtual object 1180*a*1 because computer system 1100*a*1 is configured to use the "Gaze-Only" input scheme. In some embodiments, as a result of the determination that the gaze of user 720 is in the second gaze pattern, computer system 1100*a*1 displays a confirmation virtual object and, in response to detecting the gaze of user 720 directed to the confirmation virtual object and determining that the user's gaze is in the second gaze pattern (or the first gaze pattern), computer system 1100*a*1 launches the stocks application and displays stock application user interface virtual object 1180*a*1. In some embodiments, the confirmation virtual object is displayed before a computer system (computer system 1100*a*1, computer system 1100*a*2, or computer system 1100*a*3) performs an operation that corresponds to the location (and/or on a particular virtual object) at which a gaze of the user is detected while the computer system is configured to use the "Gaze-Only" input scheme. In some embodiments, the confirmation virtual object is not displayed before the computer system performs an operation that corresponds to the location (and/or on a particular virtual object) at which a gaze of the user is detected while the computer system is configured to use the "Gaze-With-External Device" input scheme.

As shown in FIGS. 11A2-11B2, computer system 1100*a*2 does not launch the stocks application in response to detecting the gaze of the user in the second gaze pattern. At FIG. 11A2, computer system 1100*a*2 detects that the gaze of user 720 is directed to stock application virtual object 1102*a*2. In response to detecting that the gaze (e.g., as indicated by gaze direction 1122*a*1 and gaze location 1124*a*1) of user 720 is directed to stocks application virtual object 1102*a*2, a determination is made that the gaze of user 720 is in the second gaze pattern (or at the first gaze pattern). As illustrated in FIG. 11B2, a result of the determination that the gaze of user 720 is in the second gaze pattern (or the first gaze pattern), computer system 1100*a*2 does not launch the stocks application that corresponds to stocks application virtual object 1102*a*2 because computer system 1100*a*2 is configured to use the "Gaze-With-External Device" input scheme. In FIGS. 11A3-11B3, computer system 1100a3 also does not launch the stock application that corresponds to stocks application virtual object 1102a3 in response to detecting the gaze of the user (e.g., as indicated by gaze direction 1122a3 and gaze location 1124a3) in the second gaze pattern because computer system 1100a3 is configured to use the "Gaze-With-External Device" input scheme (e.g., using one or more similar techniques as described in relation to FIGS. 11A2-11B2).

At FIG. 11B1, computer system 1100a1 detects that the gaze (e.g., as indicated by 1122b1 and gaze location 1124b1) of the user 720 is directed to a location that does not include a virtual object. In response to detecting that the gaze of user 720 at FIG. 11B1 is directed to the location (e.g., as indicated by gaze direction 1122b1 and gaze location 1124b1), a determination is made that the gaze of user 720 is in the second gaze pattern. As a result of the determination that the gaze of user 720 at FIG. 11B1 is in the second gaze pattern, computer system 1100a1 does not perform an operation because gaze location 1124b1 does not correspond to a location at which an operation is performed, as illustrated in FIG. 11C1. At FIG. 11C1, in some embodiments, in response to detecting that the gaze of user 720 at FIG. 11B1 is in the second gaze pattern, a computer system (computer system 1100a1, computer system 1100a2, or computer system 1100a3) performs an operation that includes displaying a menu of operations that can be performed at the detected gaze location. In some embodiments, the menu of operations is only displayed when the computer system is configured to use the "Gaze-Only" input scheme. In some embodiments, the computer system detects that a gaze of the user is in the first gaze pattern and is directed to a respective virtual object, such as virtual arrow 1132. In some embodiments, in response to detecting that the gaze of the user is in the first gaze pattern and is directed to the respective virtual object, the computer system emphasizes (e.g., highlights, enlarges, and/or bolds the virtual object like stock application virtual object 1102a1 is bolded in FIG. 11A1) the respective virtual object (e.g., virtual arrow 1132). In some embodiments, while the respective virtual object is emphasized, the computer system detects movement of the gaze of the user, such that the gaze of the user is no longer directed to the respective virtual object and, in response to detecting movement of the gaze of the user such that the gaze of the user is no longer directed to the virtual object (e.g., for a predetermined period of time (e.g., 0.2-5 seconds)), the computer system ceases to emphasize the respective virtual object. Thus, in some embodiments, in response to detecting a gaze in the first gaze pattern, the computer system emphasizes a virtual object to which the gaze is directed, irrespective of whether the computer system is configured to use the "Gaze-Only" input scheme or "Gaze-With-External Device" input scheme. In some embodiments, in response to detecting a gaze in the second gaze pattern, the computer system performs an operation that corresponds to the virtual object (and/or location) while the computer system is configured to use the "Gaze-Only" input scheme but does not perform the operation that corresponds to the virtual object and/or location) while the computer system is configured to use the "Gaze-With-External Device" input scheme.

At FIG. 11B2, computer system 1100a2 detects that the gaze (e.g., as indicated by gaze direction 1122b2 and gaze location 1124b2) of user 720 is directed to stocks application virtual object 1102a2 (e.g., where the gaze of the user is in the first gaze pattern and/or the second gaze pattern) while detecting hand gesture 1150b2. In some embodiments, hand gesture 1150b2 (and/or hand gesture 1150b3 of FIG. 11B3) is a pinch hand gesture that includes movement of a hand in a predetermined pose (e.g., two or more fingers touching) and at a predetermined speed and/or with a predetermined amount of force and/or amount of contact. In some embodiments, hand gesture 1150b2 (and/or hand gesture 1150b3 of FIG. 11B3) is another gesture as further described below. In response to detecting that the gaze of user 720 is directed to stocks application virtual object 1102a2 while detecting hand gesture 1150b2, a determination is made concerning whether hand gesture 1150b2 is an eligible hand gesture. At FIG. 11B2, the determination is made that hand gesture 1150b2 is an eligible hand gesture, the determination includes determining that hand gesture 1150b2 was initially detected while external device 900 is in a raised position. As illustrated in FIG. 11C2, because the gaze of user 720 is directed to stocks application virtual object 1102a2 while detecting hand gesture 1150b2 and a determination was made that hand gesture 1150b2 is an eligible hand gesture (and because computer system 1100a2 is configured to use the "Gaze-With-External Device" input scheme), computer system 1102a2, computer system 1100a2 launches a stocks application (e.g., that corresponds to stocks application virtual object 1102a2) and displays stock application user interface virtual object 1180a2.

At FIG. 11B3, computer system 1100a3 detects that the gaze (e.g., as indicated by gaze direction 1122b3 and gaze location 1124b3) of user 720 is directed to stock application virtual object 1102a3 (e.g., where the gaze of the user is in the first gaze pattern and/or the second gaze pattern) while detecting hand gesture 1150b3. In response to detecting that the gaze of user 720 is directed to stocks application virtual object 1102a3 while detecting hand gesture 1150b3, a determination is made that hand gesture 1150b3 is not an eligible hand gesture because hand gesture 1150b3 was not initially detected while external device 900 was in the raised position (or that hand gesture 1150b3 was initially detected while external device 900 was in the non-raised position, as illustrated in FIG. 11B3). As illustrated in FIG. 11C3, because the determination was made that hand gesture 1150b3 is not an eligible hand gesture (and because computer system 1100a3 is configured to use the "Gaze-With-External Device" input scheme), computer system 1100a3 does not perform an operation in response to detecting that the gaze of user 720 is directed to stocks application virtual object 1102a3 while detecting hand gesture 1150b3.

At FIG. 11C3, computer system 1100a3 detects that the gaze (e.g., as indicated by gaze direction 1122c3 and gaze location 1124c3) of user 720 is directed to stock application virtual object 1102a3 (e.g., where the gaze of the user is in the first gaze pattern and/or the second gaze pattern) while detecting hand gesture 1150c3. In response to detecting that the gaze of user 720 is directed to stocks application virtual object 1102a3 while detecting hand gesture 1150c3, a determination is made that hand gesture 1150c3 is not an eligible hand gesture because hand gesture 1150c3 was not initially detected while external device 900 was in the raised position (or that hand gesture 1150c3 was initially detected while external device 900 was in the non-raised position, as illustrated in FIG. 11C3). While external device 900 is raised more in FIG. 11C3 (e.g., when hand gesture 1150c3 was detected) than external device 900 was raised in FIG. 11B3 (e.g., when hand gesture 1150b3 was detected), hand gesture 1150c3 is not an eligible hand gesture because external device 900 was not raised enough while hand gesture 1150c3 was detected. Thus, as illustrated in FIG. 11D3, computer system 1100a3 does not perform an operation in response to detecting that the gaze of user 720 is directed to stocks application virtual object 1102*a*3 while detecting hand gesture 1150*c*3 because hand gesture 1150*c*3 was determined to be an ineligible hand gesture.

Looking back at FIG. 11D1, user 720 of FIG. 11D1 is now wearing external device 900 while holding computer system 1100*a*1. As a result of user 720 of FIG. 11D1 wearing external device 900, a determination is made that external device 900 is available for input. At FIG. 11D1, because the determination is made that external device 900 is available for input, computer system 1100*a*1 is configured to use the "Gaze-With-External Device" input scheme (e.g., instead of the "Gaze-Only" input scheme). In addition, because the determination is made that external device 900 is available for input, computer system 1100*a*1 displays virtual indication 1172 to indicate that the "Gaze-With-External Device" input scheme is active and outputs haptic response 1160*d*1. Further, because the determination is made that external device 900 is available for input, computer system 1100*a*1 causes external device 900 of FIG. 11D1 to output a haptic response 1168. In some embodiments, computer system 1100*a*1 displays a virtual icon (e.g., a hand icon in the status bar) to indicate that the computer system is configured to use the "Gaze-With-External Device" input scheme.

Turning to FIG. 11D2, user 720 of FIG. 11D2 is no longer wearing external device 900 while holding computer system 1100*a*2. As a result of user 720 of FIG. 11D2 not wearing external device 900, a determination is made that external device 900 is not available for input. At FIG. 11D2, because the determination is made that external device 900 is not available for input, computer system 1100*a*2 is configured to use the "Gaze-Only" input scheme (e.g., instead of the "Gaze-With-External Device" input scheme). In addition, because the determination is made that external device 900 is not available for input, computer system 1100*a*2 displays virtual indication 1174 (e.g., different from virtual indication 1172 of FIG. 11D1) to indicate that the "Gaze-Only" input scheme is active and outputs haptic response 1160*d*2. In some embodiments, haptic response 1160*d*2 is different from (e.g., has a different vibration pattern) than haptic response 1160*d*1 of FIG. 11D1. In some embodiments, because the determination is made that external device 900 is not available for input, computer system 1100*a*2 causes an external device to output a haptic response (and, in some embodiments, a different haptic response than haptic response 1168). In some embodiments, computer system 1100*a*2 does not display a virtual icon (e.g., a hand icon in the status bar) to indicate that the computer system is not configured to use the "Gaze-With-External Device" input scheme. In some embodiments, computer system 1100*a*2 displays a confirmation button (e.g., as described above) to indicate that the computer is configured to use the "Gaze-Only" input scheme.

Turning back to FIG. 11D3, computer system 1100*a*3 detects that the gaze (e.g., as indicated by gaze direction 1122*d*3 and gaze location 1124*d*3) of user 720 is directed to stock application virtual object 1102*a*3 (e.g., where the gaze of the user is in the first gaze pattern and/or the second gaze pattern) while detecting an initial portion of hand gesture 1150*d*3. In response to detecting that the gaze of user 720 is directed to stocks application virtual object 1102*a*3 while detecting the initial portion of hand gesture 1150*d*3, a determination is made that hand gesture 1150*d*3 is an eligible hand gesture because it was initially detected while external device 900 was in the raised position. At FIG. 11E3, a second portion of hand gesture 1150*d*3 is detected while hand gesture 1150*d*3 is a non-raised position. However, because hand gesture 1150*d*3 was initially detected while external device 900 was in the raised position, computer system 1100*a*3 performs an operation in response to detecting the gaze of user 720 while detecting hand gesture 1150*d*3. In particular, computer system 1100*a*3 performs the operation by launching a stocks application (e.g., that corresponds to stocks application virtual object 1102*a*3) and displays stock application user interface virtual object 1180*a*3.

While FIGS. 11A1-11E3 discusses performing a hand gesture generically, it should be understood that a variety of hand gestures can be used (e.g., in combination with gaze) to cause a computer system to perform a variety of operations while the computer system is configured to use the "Gaze-With-External Device." In some embodiments, the hand gesture is a pinch hand gesture (and/or input). In some embodiments, a pinch hand gesture is formed by touching two or more fingers together (e.g., touching the thumb with one or more other fingers). In some embodiments, in response to detecting the pinch hand gesture while detected the gaze of a user that is directed to a respective virtual object, the computer system performs an operation, such as selecting the virtual object. In some embodiments, the hand gesture is a multi-pinch hand gesture. In some embodiments, a multi-pinch hand gesture is formed by touching two or more fingers together (e.g., touching the thumb with one or more other fingers) for more than a predetermined number of times (e.g., 1-2) (e.g., a number of times that is greater than the number of times that two or more fingers need to touch to form a pinch input). In some embodiments, in response to detecting the multi-pinch hand gesture while detected the gaze of a user, the computer system performs an operation, such as toggling between being configured to use the "Gaze-With-External Device" input scheme, "Gaze-Only" input scheme, and/or another input scheme. In some embodiments, the hand gesture is a pinch and hold hand gesture. In some embodiments, the pinch and hold hand gesture is by touching two or more fingers together (e.g., touching the thumb with one or more others fingers for longer than a predetermined period of time (e.g., 1-3 seconds) (e.g., a period of time that is longer than the period of time that is needed to detect the pinch gesture). In some embodiments, in response to detecting the pinch and hold hand gesture while detected the gaze of a user that is directed to a respective virtual object, the computer system performs an operation such as displaying a menu that is related to the virtual object and/or an operation that is performed when a long-press is detected on a user interface object (and/or the respective virtual object). In some embodiments, the hand gesture is a pinch and rotate hand gesture. In some embodiments, a pinch and rotate hand gesture is formed by touching two or more fingers together and rotating the hand (and/or rotating the hand in a direction above a threshold speed (e.g., 1-5 meters per second)) while the two or more finger are touching). In some embodiments, the pinch portion of the gesture is formed before and within a predetermined period of time of the rotation portion of the gesture. In some embodiment, if the rotation portion of the gesture is not performed in a predetermined period of time (e.g., 1-2 seconds) before the pinch portion of the gesture, the pinch and rotate hand gesture is not detected. In some embodiments, in response to detecting the pinch and rotate hand gesture while detecting the gaze of the user, the computer system increases and/or decrease a zoom level. In some embodiments, the hand gesture is a pinch and twist hand gesture. In some embodiments, the pinch and twist hand gesture is formed like the pinch and rotate gesture; however, the user's arm is also rotated. In some embodiments, in response to detecting the pinch and twist hand gesture while detecting the gaze of the user, the computer system performs an operation, such as increase and/or decreasing the volume of the computer system. In some embodiments, the hand gesture is a joystick hand gesture. In some embodiments, the joystick hand gesture is formed by making a first (e.g., a closed, partially closed, and/or loosely closed first) and moving the hand laterally in a direction while the first is formed). In some embodiments, the first portion of the gesture is formed before and within a predetermined period of time of the movement portion of the gesture. In some embodiments, if the movement portion of the gesture is not performed in a predetermined period of time (e.g., 1-2 seconds) before the first portion of the gesture, the joystick hand gesture is not detected. In some embodiments, in response to detecting the joystick hand gesture while detecting the gaze of the user, the computer system performs an operation, such as navigating to a user interface in one or more directions (e.g., left, right, up, down, and/or any combination thereof) and/or changing the zoom level of one or more virtual objects. In some embodiments, the hand gesture is a pinch and toss hand gesture. In some embodiments, the pinch and toss hand gesture is formed by touching two or more fingers together while flicking and/or tossing (e.g., like one is tossing a paper airplane) the hand) the hand while the two or more fingers are touching) and/or moving the hand in a direction above a threshold speed (e.g., 1-5 meters per second) (and, in some embodiments, the pinch portion of the gesture is formed before and within a predetermined period of time of the toss portion of the gesture; and, in some embodiments, if the toss portion of the gesture is not performed in a predetermined of time (e.g., 1-2 seconds) before the pinch portion of the gesture, the pinch and rotate hand gesture is not detected). In some embodiments, in response to detecting the pinch and toss hand gesture while detecting the gaze of the user, the computer system performs an operation, such as moving a list of items and/or swiping through a list of items. In some embodiments, the hand gesture is a thumb backward hand gesture. In some embodiments, a thumb backward hand gesture is formed when the thumb is flicked backward. In some embodiments, in response to detecting the thumb backward hand gesture while detecting the gaze of the user, the computer system performs an operation, such as an operation that is performed when a back button is selected. In some embodiments, the hand gesture is an air tap hand gesture. In some embodiments, the air tap gesture is formed when one or more fingers are moved in a direction over a short period of time (e.g., as if the user is tapping on air). In some embodiments, in response to detecting the air tap hand gesture while detecting the gaze of the user, the computer system performs an operation, such as selecting the virtual object and/or an operation that is performed when a tap input is detected on a user interface element (e.g., and/or a respective virtual object). In some embodiments, the hand gesture is a movement hand gesture that is performed by one or more fingers of the hand (e.g., a thumb backward gesture) (e.g., flicking and/or tossing one or more fingers and/or moving one or more fingers in a direction above a threshold speed (e.g., 1-5 meters per second)). In some embodiments, the hand gesture is a thumb to index finger hand gesture. In some embodiments, the thumb to index hand gesture is formed by touching a thumb and index finger together for a predetermined period of time. In some embodiments, the computer system performs an operation, such as an operation that is performed when a button action is perfumed (e.g., moving a virtual object, deleting a virtual object, and/or selecting a virtual object).

Additional descriptions regarding FIGS. 11A1-11E3 are provided below in reference to method 1200 described with respect to FIGS. 11A1-11E3.

FIG. 12 is a flow diagram of an exemplary method 1200 for performing one or more operations based on an input scheme, in accordance with some embodiments. In some embodiments, method 1200 is performed at a computer system (e.g., computer system 101 in FIG. 1, computer system 700, computer system 1100a1, computer system 1100a2, and/or computer system 1100a3) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, optionally) one or more gaze tracking sensors, one or more physical input mechanism, one or more microphones, and/or one or more cameras.

In some embodiments, method 1200 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1200 are, optionally, combined and/or the order of some operations is, optionally, changed.

While the computer system (e.g., 1100a1, 1100a2, and/or 1100a3) detects (1202) that the computer system (e.g., 1100a1-1100a3) (and/or the display generation component) has a predetermined location relative to a portion of a body of the user (e.g., is being worn or held in a hand of the user) (e.g., being worn by a user and/or being position on a body part (e.g., head, eyes, wrist, hand, and/or palm of hand) of a user) (e.g., as described in relation to FIGS. 11A1-11C3): in accordance with a determination that an external device (e.g., 900) (e.g., an external device) (e.g., a smartphone, a desktop computer, a laptop, a tablet, and/or a smart watch) (e.g., a device that is different from the computer system) is available for input (e.g., as described above in relation to FIGS. 11A1-11A3, 11C1-11C3, and 11D1-11D3) (e.g., as described in relation to FIGS. 11A1-11C3) (e.g., one or more inputs on a surface (e.g., touch-sensitive display) of the external device and/or one or more hand gestures (e.g., one or more touching, flicking, clenching, pinching, rotating, tossing, and/or holding gestures made with fingers and/or wrist) (e.g., one or more moving gestures, such as moving a finger (e.g., a thumb) in a direction (e.g., backwards)) (in some embodiments, the one or more hand gestures are detecting using a heart rate sensor, optical sensor, and/or other systems that are included in and/or in communication with the external device)), the computer system configures (1204) (e.g., changing a setting of) the computer system (e.g., 1100a1-1100a3) to use a first input scheme (e.g., as described above in relation to FIGS. 11A1 and 11B1) (e.g., using one or more inputs (e.g., one or more inputs (e.g., gaze of a user) initially detected via the computer system combined with one or more inputs (e.g., one or more inputs on a surface (e.g., touch-sensitive display) of the external device and/or one or more hand gestures (e.g., finger touch gesture, clench gesture, flicking, pinching, rotating, tossing, and/or holding gestures made with fingers and/or wrist) initially detected via the external device) to perform an operation) (e.g., without the computer being configured to use the second input scheme) to perform a set of one or more operations, where in the first input scheme, a respective operation (e.g., highlight, select, moving, rotate, and/or change the size of one or more virtual objects) and/or navigate between one or more user interfaces) is performed in response to detecting a respective hand input (e.g., 1150b2, 1150b3, 1150c2, and/or 1150c3) with the external device while the computer system detects a first gaze pattern (e.g., detecting that a gaze of the user is directed to a currently displayed virtual object) (e.g., as described in relation to FIGS. 11A1-11C3). In some embodiments, the external device is determined to be available input is determined based on one or more of the external devices being worn by a user, the external device being on, the external device being configured to detect one or more inputs, and/or transmit that one or more inputs have been detected to the computer system. In some embodiments, the respective hand input is detected by the external device using one or more sensors (e.g., heart rate sensor). In some embodiments, the respective hand input is detected by one or more sensors (e.g., a heart rate sensor) on the wrist of the user. In some embodiments, the respective hand input is not detected by one or more cameras.

While the computer system detects (1202) that the computer system has a predetermined location relative to a portion of a body of the user: in accordance with a determination that the external device (e.g., 900) is not available for input, the computer system configures (1206) the computer system (e.g., 1100a1-1100a3) to use a second input scheme (e.g., as described above in relation to FIGS. 11A2-11A3 and 11B2-11B3) (e.g., using one or more inputs to perform an operation) (e.g., one or more inputs initially detected via the computer system that are not combined with one or more inputs initially detected via the external device), different from (e.g., using one or more different inputs) the first input scheme, to perform the set of the one or more operations, where in the second input scheme, the respective operation is performed in response to detecting a second gaze pattern (e.g., detecting that the gaze of the user is directed to a currently displayed virtual object for more than a predetermined period of time) that includes the first gaze pattern (e.g., detecting that the gaze of the user is directed to a currently displayed virtual object for less than the predetermined period of time) without requiring detection of the respective hand input (e.g., 1150b2, 1150b3, 1150c2, and/or 1150c3) (e.g., without the computer system being configured to use the first input scheme) (e.g., as described in relation to FIGS. 11A1-11C3). In some embodiments, the set of one or more operations include a plurality of operation. Configuring the computer system to use a first input scheme or the second input scheme when prescribed conditions are met allows the computer system to automatically be configured to use an input scheme based on whether the external device is available for input, which performs an operation when a set of conditions has been met without requiring further user input.

In some embodiments, the external device (e.g., 900) is a wearable device (e.g., a smartwatch). In some embodiments, while displaying a first virtual object (e.g., 1124a1-1124a3 and/or 1132) (e.g., via a display generation component that is communication with the computer system) (e.g., content (e.g., text and/or symbols) and/or one or more selectable objects), the computer system detects a gaze (e.g., 1122a1-1122a3) that is directed to the first virtual object and that corresponds to the first gaze pattern (e.g., as described in relation to FIGS. 11A1-11B3 and/or in relation to 1132 of FIG. 11C1). In some embodiments, in response to detecting the gaze (e.g., 1122a1-1122a3) that is directed to the first virtual object and that corresponds to the first gaze pattern, the computer system visually emphasizes (e.g., via the display generation component) the first virtual object (e.g., as described in relation to FIGS. 11A1-11B3 and/or in relation to 1132 of FIG. 11C1) (e.g., causing the virtual object to be highlighted and/or placed in visual focus (and, in some embodiments, highlighted/emphasized with respect to one or more other virtual objects), one or more borders that surround the virtual objects and/or one or more borders and/or text of the virtual object to be emphasized (e.g., bolded, increase in sized, and/or displayed with a changed color). In some embodiments, a further input performs an operation on whichever object is currently in focus and/or emphasized. In some embodiments, as a part of detecting a gaze that corresponds to the first gaze pattern, the computer system detects a gaze at the location (and/or within a threshold distance (e.g., 0-1000 mm) from the location) for a first period of time (e.g., a non-zero threshold period of time). In some embodiments, as a part of detecting a gaze that corresponds to the second gaze pattern, the computer system detects the gaze at the location (and/or within a threshold distance (e.g., 0-1000 mm) from the location) for a second period of time (e.g., a non-zero threshold period of time) that is longer than the first period of time. In some embodiments, in accordance with a determination that a respective gaze has not been detected for longer than the first period of time, the computer system does not detect that the respective gaze corresponds to the first gaze pattern and the second gaze pattern, time. In some embodiments, in accordance with a determination that a respective gaze has been detected for longer than the first period of time but has not been detected for longer than the second period of time, the computer system detects that the respective gaze corresponds to the first gaze pattern but does not correspond to the second gaze pattern. Displaying an indication that the first virtual object is in focus in response to detecting the gaze provides visual feedback that the virtual object is in focus and that one or more operations that correspond to the virtual object can be performed and provides an additional control to the user for controlling the user interface, which provides improved visual feedback and provides additional controls options without cluttering user interface.

In some embodiments, while visually emphasizing (e.g., via a display generation component that is communication with the computer system) the first virtual object (e.g., 1124a1-1124a3) (and displaying the indication that the first virtual object is selected and/or visually emphasizing the first virtual object) (and after detecting the first gaze pattern) and while the computer system is configured to use the first input scheme, the computer system receives an indication that corresponds to a performance of a pinch hand input (e.g., 1150b2, 1150b3, 1150c2, and/or 1150c3) at the external device. In some embodiments, in response to detecting the indication corresponding to performance of the pinch hand input (e.g., while displaying, via the display generation component, the first virtual object (and displaying the indication that the first virtual object is selected) (and after detecting the first gaze pattern) and while the computer system is configured to use the first input scheme, detecting a pinch hand input), the computer system performs a first operation associated with the first virtual object (e.g., as described above in relation to FIGS. 11A1-11E3) (e.g., launching an application associated with the virtual object, moving the virtual object, displaying a menu for operational task involving the virtual object (e.g., deleting the virtual object, moving virtual object, and/or renaming the virtual object). In some embodiments, while displaying, via the display generation component, the first virtual object and while the computer system is configured to use the second input scheme, the computer system receives an indication that corresponds to the performance of a second pinch input at the external device. In some embodiments, in response to receiving the indication that corresponds to the performance of the second pinch input, the computer system does not select the first virtual object. In some embodiments, the pinch hand input is detected based on muscle contractions detected at a wrist of the user and/or movement of the wrist of the user detected by one or more motion sensors (e.g., one or more sensors, such as a heart rate sensor and/or a gyroscope, of an external device) on the wrist. Performing a first operation associated with the first virtual object in response to detecting the indication corresponding to performance of the pinch hand input and while the computer system is configured to use the first input scheme provides an additional control to the user for selecting a virtual object while the computer system is configured to use the first input scheme, which provides improved visual feedback and provides additional controls options without cluttering user interface.

In some embodiments, while visually emphasizing (e.g., via a display generation component that is communication with the computer system) the first virtual object (e.g., 1124a1-1124a3) (and displaying the indication that the first virtual object is selected and/or visually c the first virtual object) (and after detecting the first gaze pattern) and while the computer system is configured to use the first input scheme, the computer system receives an indication that corresponds to a performance of a pinch-and-drag hand input (e.g., 1150b2, 1150b3, 1150c2, and/or 1150c3). In some embodiments, in response to receiving the indication that corresponds to the performance of the pinch-and-drag hand input (e.g., while displaying, via the display generation component, the first virtual object (and displaying the indication that the first virtual object is selected) (and after detecting the first gaze pattern) and while the computer system is configured to use the first input scheme, detecting a pinch-and-drag hand input), the computer system performs a second operation (e.g., that is the same as the first operation or that is different from the first operation) associated with the first virtual object (e.g., as described above in relation to FIGS. 11A1-11E3) (and/or selection a portion of the first virtual object that corresponds to the movement of the pinch-and-drag hand input (and/or the dragging portion of the pinch-and-drag hand input)). In some embodiments, while displaying, via the display generation component, the first virtual object and while the computer system is configured to use the second input scheme, the computer system receives an indication that corresponds to a performance of a second pinch-and-drag hand input. In some embodiments, in response to receiving the indication that corresponds to the performance of the second pinch-and-drag hand input, the computer system does not select the first virtual object and/or a portion of the first virtual object. In some embodiments, the pinch-and-drag hand input is detected based on muscle contractions detected at a wrist of the user and/or movement of the wrist of the user detected by one or more motion sensors (e.g., one or more sensors, such as a heart rate sensor and/or a gyroscope, of an external device) on the wrist. Performing a second operation associated with the first virtual object in response to receiving the indication that corresponds to the performance of the pinch-and-drag hand input and while the computer system is configured to use the first input scheme provides an additional control to the user for selecting a virtual object while the computer system is configured to use the first input scheme, which provides improved visual feedback and provides additional controls options without cluttering user interface.

In some embodiments, while emphasizing (e.g., via a display generation component that is communication with the computer system) the first virtual object (e.g., 1124a1-1124a3) (and displaying the indication that the first virtual object is selected and/or emphasizing the first virtual object) and while the computer system is configured to use the first input scheme, the computer system receives an indication that corresponds to a performance of a pinch-and-rotate hand input (e.g., 1150b2, 1150b3, 1150c2, and/or 1150c3). In some embodiments, in response to receiving the indication that corresponds to the performance of the pinch-and-rotate hand input, the computer system performs a third operation (e.g., that is the same as the first operation or that is different from the first operation) associated with the first virtual object (e.g., as described above in relation to FIGS. 11A1-11E3) (selection a portion of the first virtual object that corresponds to the movement of the pinch-and-rotate input (and/or the rotating portion of the pinch-and-rotate input)). In some embodiments, while displaying, via the display generation component, the first virtual object and while the computer system is configured to use the second input scheme, the computer system receives an indication that corresponds to a performance of a second pinch-and-rotate hand input. In some embodiments, in response to receiving the indication that corresponds to the performance of the second pinch-and-rotate hand input, the computer system does not select the first virtual object and/or a portion of the first virtual object. In some embodiments, the pinch-and-rotate hand input is detected based on muscle contractions detected at a wrist of the user and/or movement of the wrist of the user detected by one or more motion sensors (e.g., one or more sensors, such as a heart rate sensor and/or a gyroscope, of an external device) on the wrist. Performing a third operation associated with the first virtual object in response to receiving the indication that corresponds to the performance of the pinch-and-rotate hand input and while the computer system is configured to use the first input scheme provides an additional control to the user for selecting a virtual object while the computer system is configured to use the first input scheme, which provides improved visual feedback and provides additional controls options without cluttering user interface.

In some embodiments, while displaying (e.g., via a display generation component that is communication with the computer system) a second virtual object (e.g., 1124a1-1124a3) (e.g., content (e.g., text and/or symbols) and/or one or more selectable objects), the computer system detects a gaze (e.g., indicated by 1122a2, 1124a2, 1122a3, and/or 1124a3) that is directed to the second virtual object and that corresponds to the first gaze pattern (e.g., as described above in relation to FIGS. 11A2-11B2 and FIGS. 11A3-11B3). In some embodiments, after detecting the gaze that is directed to the second virtual object and that corresponds to the first gaze pattern, the computer system detects a gaze (e.g., indicated by 1122a2, 1124a2, 1122a3, and/or 1124a3) that is directed to the second virtual object and that corresponds to the second gaze pattern (e.g., as described above in relation to FIGS. 11A2-11B2 and FIGS. 11A3-11B3). In some embodiments, in response to detecting the gaze that is directed to the second virtual object and that corresponds to the second gaze pattern and in accordance with a determination that the computer system is configured to use the first input scheme, the computer system forgoes performing an operation that is associated with the second virtual object (e.g., as described above in relation to FIGS. 11A2-11B2 and FIGS. 11A3-11B3) (e.g., an operation that can be performed by selecting the first virtual object while the computer system is configured to use the first input scheme) (e.g., an operation that would have been performed if a determination was made that the computer system was configured to use the first input scheme after/when/while detecting the gaze that is directed to the second virtual object and that corresponds to the second gaze pattern). In some embodiments, the gaze that is directed to the second virtual object and that corresponds to the second gaze pattern is a continuation of the gaze that is directed to the second virtual object and that corresponds to the first gaze pattern and/or detecting the gaze that is directed to the second virtual object and that corresponds to the second gaze pattern does not involve detecting a new gaze of the user, rather it involves continuous detection of the gaze that is directed to the second virtual object and that corresponds to the first gaze pattern. In some embodiments, in response to detecting the gaze that is directed to the second virtual object and that corresponds to the second gaze pattern and in accordance with a determination that the computer system is configured to use the second input scheme, the computer system performs an operation that is associated with the second virtual object.

In some embodiments, while displaying (e.g., via a display generation component that is communication with the computer system) a third virtual object (e.g., 1124a1-1124a3) (e.g., content (e.g., text and/or symbols) and/or one or more selectable objects), the computer system detects a gaze (e.g., 1122a1) (e.g., of a user) that is directed to the third virtual object and that corresponds to the first gaze pattern virtual object (e.g., as described above in relation to FIGS. 11A1-11B1). In some embodiments, after detecting the gaze that is directed to the third virtual object and that corresponds to the first gaze pattern, the computer system detects a gaze (e.g., 1122a1) that is directed to the third virtual object and that corresponds to the second gaze pattern (e.g., as described above in relation to FIGS. 11A1-11B1). In some embodiments, in response to detecting the gaze that is directed to the third virtual object and that corresponds to the second gaze pattern and in accordance with a determination that the computer system is configured to use the second input scheme, the computer system performs an operation that is associated with the third virtual object (e.g., as described above in relation to FIGS. 11A1-11B1). In some embodiments, in response to detecting the gaze that is directed to the third virtual object and that corresponds to the second gaze pattern and in accordance with a determination that the computer system is configured to use the first input scheme, the computer system forgoes performing an operation directed to the third virtual object (e.g., unless a hand input was provided while detecting the gaze that is directed to the third virtual object). In some embodiments, in response to detecting the gaze is directed to the third virtual object and that corresponds to the second gaze pattern and in accordance with a determination that the computer system is not configured to use the second input scheme, performing an operation that is associated with the third virtual object, the computer system forgoes performing the operation that is associated with the third virtual object.

In some embodiments, after detecting the gaze that is directed to the third virtual object and that corresponds to the first gaze pattern, the computer system detects a respective hand input. In some embodiments, in response to detecting the respective hand input and in accordance with a determination that the computer system is configured to use the first input scheme, the computer system performs an operation (e.g., directed to a respective virtual object); and in response to detecting the respective hand input and in accordance with a determination that the computer system is configured to use the second input scheme, the computer system does not perform (or forgoes performing) the operation (e.g., directed to a respective virtual object). In some embodiments, the gaze that corresponds to the second gaze pattern is a continuation of the that corresponds to the first gaze pattern and/or detecting gaze that corresponds to the second gaze pattern does not involve detecting a new gaze of the user, rather it involves continuous detection of gaze that corresponds to the first gaze pattern. Performing an operation that is associated with the third virtual object in response to detecting the gaze that is directed to the third virtual object and that corresponds to the second gaze pattern and in accordance with a determination that the computer system is configured to use the second input scheme provides an additional control to the user for selecting a virtual object while the computer system is configured to use the first input scheme, which provides improved visual feedback and provides additional controls options without cluttering user interface.

In some embodiments, in response to detecting the gaze (e.g., indicated by 1122a1, 1124a1, 1122a2, 1124a2, 1122a3, and/or 1124a3) of the user that is directed to the third object and corresponds to the first gaze pattern, the computer system emphasizes the third virtual object (e.g., causing the virtual object to be highlighted and/or placed in visual focus (and, in some embodiments, highlighted/emphasized with respect to one or more other virtual objects) (e.g., as described above in relation to FIGS. 11A1-11B1).

In some embodiments, the external device (e.g., 900) is determined to be available for input (e.g., as described above in relation to FIGS. 11A1-11A3, 11C1-11C3, and 11D1-11D3) in accordance with a determination that the external device (e.g., 900) has a second predetermined location relative to a second portion of a body of the user (e.g., as described above in relation to FIGS. 11A1-11A3, 11C1-11C3, and 11D1-11D3) (e.g., is being worn or held in a hand of the user) (e.g., by a user) (e.g., being used by a user and/or being position on a body part (e.g., head, eyes, wrist, hand, and/or palm of hand) of a user). In some embodiments, the external device is determined to be available for input accordance with a determination that the external device is unlocked, is on, and/or within a predetermined distance from the computer system. Configuring the computer system to use a first input scheme or the second input scheme when prescribed conditions are met (e.g., based on whether the external device has a second predetermined location relative to a second portion of a body of the user) allows the computer system to automatically be configured to use an input scheme based on whether the external device is available for input and enhances security by limited the amount of unauthorized control of the computer system using the external devices, which performs an operation when a set of conditions has been met without requiring further user input and provides improved security.

In some embodiments, the external device (e.g., 900) is determined to be available for input in accordance with a determination that the external device is in a raised position (e.g., as described above in relation to FIGS. 11A1-11A3, 11B2, 11B3, 11C1-11C3, and 11D1-11D3) (e.g., at a position that is above a threshold level (e.g., angle and/or distance relative to a starting position and/or a position whether the user's had is down and/or at the user's side (e.g., by the user's leg and/or hip) (e.g., when the user is in a standing or sitting position)). Configuring the computer system to use a first input scheme or the second input scheme when prescribed conditions are met (e.g., based on whether the external device is in a raised position) allows the computer system to automatically be configured to use an input scheme based on whether the external device is available for input and enhances security by limited the amount of unauthorized control of the computer system using the external devices, which performs an operation when a set of conditions has been met without requiring further user input and provides improved security.

In some embodiments, in accordance with a determination that the external device is raised above a predetermined range of angles (e.g., an angle that is above 30 degrees, 40 degrees, 50 degrees, and/or 60 degrees (e.g., from the lower body of the user)), the electronic device is determined to be in the raised position (e.g., as described above in relation to FIGS. 11A1-11A3, 11B2, 11B3, 11C1-11C3, and 11D1-11D3). In some embodiments, in accordance with a determination that the external device is not raised above a predetermined range of angles, the electronic device is not determined to be raised.

In some embodiments, while the computer system (e.g., 700) is configured to use the first input scheme, the computer system detects that the external device (e.g., 900) has moved from being in a first raised position (e.g., above a predetermined range of angles) to being in a first non-raised position (e.g., below the predetermined range of angles) (e.g., as described above in relation to FIGS. 11A-11A3 and 11D1-11E1). In some embodiments, in response to detecting that external device has moved from being in the first raised position to being in the first non-raised position, the computer system continues to be configured to use the first input scheme to perform the set of one or more operations (and/or forgoing configuring the computer system to use the second input scheme). Continuing to be configured to use the first input scheme to perform the set of one or more operations in response to detecting that external device has moved from being in the first raised position to being in the first non-raised position reduces the number of inputs needed to perform an operation by allowing the computer system to limit the unnecessary changing of input schemes that the computer system is configured to use, which reduces the number of inputs needed to perform an operation.

In some embodiments, while the computer system (e.g., 1100a3) is configured to use the first input scheme and while detecting a respective gaze (e.g., 1122b3, 1124b3, 1122c3, 1124c3, 1122d3, and/or 1124d3) that corresponds to the first gaze pattern, the computer system receives an indication that corresponds to a performance of the respective hand input (e.g., 1150c) (e.g., as described above in relation to FIGS. 11B3-11C3 and 11D3-11E3). In some embodiments, in response to receiving the indication that corresponds to the performance of the respective hand input (e.g., while the respective gaze that corresponds to the first gaze pattern): in accordance with a determination that at least an initial portion (e.g., the beginning of the hand input) (or an ending portion (e.g., the end of the hand input) of the respective hand input was performed in a second raised position, the computer system performs the respective operation (e.g., irrespective of whether another portion of the respective hand input was performed in a non-raised position) (e.g., as described above in relation to FIGS. 11D3-11E3). In some embodiments, in response to receiving the indication that corresponds to the performance of the respective hand input: in accordance with a determination that at least the initial portion of the respective hand input was not performed in a second raised position, the computer system forgoes performing the respective operation (e.g., irrespective of whether another portion of the respective hand input was performed in a non-raised position) (e.g., as described above in relation to FIGS. 11B3-11C3). In some embodiments, in accordance with a determination that at least a portion (e.g., any portion and/or a portion that is different from the initial portion) of the respective hand input was performed in a second raised position, the computer system performs the respective operation. In some embodiments, in accordance with a determination that at least the portion (e.g., any portion and/or a portion that is different from the initial portion) of the respective hand input was not performed in a second raised position, the computer system forgoes performing the respective operation.

In some embodiments, the computer system displays, via the display generation component, an indication (e.g., 1172 or 1174) as to whether the computer system is configured to use the first input scheme or the second input scheme.

In some embodiments, displaying the indication as to whether the computer system is configured to use the first input scheme or the second input scheme includes: in accordance with a determination that the external device is available for input, the computer system provides a first indication (e.g., a visual, haptic, and/or audio indication). In some embodiments, the first indication (e.g., 1172) indicates that the computer system is configured to use the first input scheme. In some embodiments, displaying the indication as to whether the computer system is configured to use the first input scheme or the second input scheme includes: in accordance with a determination that the external device is not available for input, the computer system provides a second indication (e.g., 1174) (e.g., a visual, haptic, and/or audio indication). In some embodiments, the second indication indicates that the computer system is configured to use the second input scheme. In some embodiments, the first indication is different from (e.g., visually different from, tactually, audibly different) the second indication. Providing a different indication based on whether or not the external device is available for input provides a user with visual feedback concerning the underlying state of the computer system and/or which input scheme that the computer system is configured to use, which provides improved visual feedback and reduces the number of inputs needed to perform an operation.

In some embodiments, displaying the indication as to whether the computer system is configured to use the first input scheme or the second input scheme includes displaying, (e.g., via a display generation component that is communication with the computer system) a virtual object (e.g., hand icon in status bar) that indicates the computer system is configured to use the first input scheme (e.g., as described in relation to FIG. 11D1). Displaying a virtual object that indicates the computer system is configured to use the first input scheme provides a user with visual feedback concerning the underlying state of the computer system and/or which input scheme that the computer system is configured to use, which provides improved visual feedback and reduces the number of inputs needed to perform an operation.

In some embodiments, displaying the indication as to whether the computer system is configured to use the first input scheme or the second input scheme includes displaying (e.g., via a display generation component that is communication with the computer system) a virtual object that indicates the computer system is configured to use the second input scheme (e.g., as described in relation to FIG. 11D2) (e.g., as described above in relation to FIGS. 11A1-11B1) (e.g., a separate gaze dwell selects virtual object that is not displayed when hand control is engaged). In some embodiments, the virtual object that indicates the computer system is configured to use the second input scheme is different from the virtual object that indicates the computer system is configured to use the first input scheme. In some embodiments, in response to detecting a gaze that is directed to the virtual object, the computer system performs an operation that is associated with another (e.g., previously selected) virtual object. Displaying a virtual object that indicates the computer system is configured to use the second input scheme provides a user with visual feedback concerning the underlying state of the computer system and/or which input scheme that the computer system is configured to use, which provides improved visual feedback and reduces the number of inputs needed to perform an operation.

In some embodiments, after a period of time where the external device was not available for input, the computer system detects that the external device is available for input. In some embodiments, in response to detecting that the external device is available for input, the computer system causes the generation of a first haptic output at the external device (e.g., 1168).

In some embodiments, after a period of time where the external device was available for input, the computer system detects that the external device is no longer available for input. In some embodiments, in response to detecting that the external device is no longer available for input, the computer system causes generation of a second haptic output at the external device (e.g., as described above in relation to FIG. 11D2 and FIG. 11E1). In some embodiments, the first haptic output is the same as the second output (e.g., is the same type of haptic output as the second output). In some embodiments, the first haptic output is different from the second output (e.g., is a different type of haptic out than the second haptic output). Issuing the first haptic output or the second haptic output provides a user with visual feedback concerning the underlying state of the computer system and/or which input scheme that the computer system is configured to use, which provides improved visual feedback and reduces the number of inputs needed to perform an operation.

In some embodiments, the respective hand input is selected from a group consisting of a pinch input that is performed by a hand input (e.g., as described above in relation to FIGS. 11A1-11E3) (e.g., an input that formed by touching two or more fingers together (e.g., touching the thumb with one or more other fingers)), a multi-pinch input (e.g., an input that formed by touching two or more fingers together (e.g., touching the thumb with one or more other fingers) for more than a predetermined number of times (e.g., 1-2) (e.g., a number of times that is greater than the number of times that a two or more fingers need to touch to form a pinch input)) that is performed by the hand, a pinch and hold input (e.g., as described above in relation to FIGS. 11A1-11E3). (e.g., an input that formed by touching two or more fingers together (e.g., touching the thumb with one or more others fingers for longer than a predetermined period of time (e.g., 1-3 seconds)) that is performed by the hand, a pinch and rotate input (e.g., as described above in relation to FIGS. 11A1-11E3) (e.g., an input that is formed by touching two or more fingers together and rotating the hand (and/or rotating the hand in a direction above a threshold speed (e.g., 1-5 meters per second)) while the two or more finger are touching) (and, in some embodiments, the pinch portion of the input is formed before and within a predetermined period of time of the rotation portion of the input; and, in some embodiments, if the rotation portion of the input is not performed in a predetermined of time (e.g., 1-2 seconds) before the pinch portion of the input, the pinch and rotate input is not detected) that is performed by the hand, a joystick input (e.g., as described above in relation to FIGS. 11A1-11E3). (e.g., an input that is formed by forming a first (e.g., a closed, partially closed, and/or loosely closed first) and moving the hand laterally in a direction while the first is formed) (and, in some embodiments, the first portion of the input is formed before and within a predetermined period of time of the movement portion of the input; and, in some embodiments, if the movement portion of the input is not performed in a predetermined of time (e.g., 1-2 seconds) before the first portion of the input, the joystick input is not detected) that is performed by the hand, a pinch and toss input (e.g., as described above in relation to FIGS. 11A1-11E3) (e.g., an input that is formed by touching two or more fingers together while flicking and/or tossing (e.g., like one is tossing a paper airplane) the hand) the hand while the two or more finger are touching) and/or moving the hand in a direction above a threshold speed (e.g., 1-5 meters per second) (and, in some embodiments, the pinch portion of the input is formed before and within a predetermined period of time of the toss portion of the input; and, in some embodiments, if the toss portion of the input is not performed in a predetermined of time (e.g., 1-2 seconds) before the pinch portion of the input, the pinch and rotate input is not detected) that is performed by the hand, a movement input that is performed by one or more fingers of the hand (e.g., a thumb backwards input) (e.g., flicking and/or tossing one or more fingers and/or moving one or more fingers in a direction above a threshold speed (e.g., 1-5 meters per second)), and a combination thereof (e.g., as described above in relation to FIGS. 11A1-11E3). In some embodiments, the respective hand input is an air gesture input and/or an air gesture. In some embodiments, the air gestures are detected by a camera that is in communication with the computer system and/or one or more body worn sensors (e.g., sensors on a watch (e.g., a heart rate sensor and/or a gyroscope)) monitoring the movement of a hand (and, in some embodiments, including the fingers of the hand).

In some embodiments, aspects/operations of 800, 1000, 1400, 1600, 1800, 2000, 2200, 2400, 2600, 2800, 3000, and 3200 may be interchanged, substituted, and/or added with the steps of method 1200. For example, method 1200 can be used to navigate a computer system that has been awaken using method 800. For brevity, these details are not repeated here.

FIGS. 13A-13G illustrate example techniques for displaying virtual objects for controlling a camera setting, in accordance with some embodiments. FIG. 14 is a flow diagram of methods for displaying virtual objects for controlling a camera setting, in accordance with some embodiments. The user interfaces in FIGS. 13A-13G are used to illustrate the process in FIG. 14.

Figure 13A:
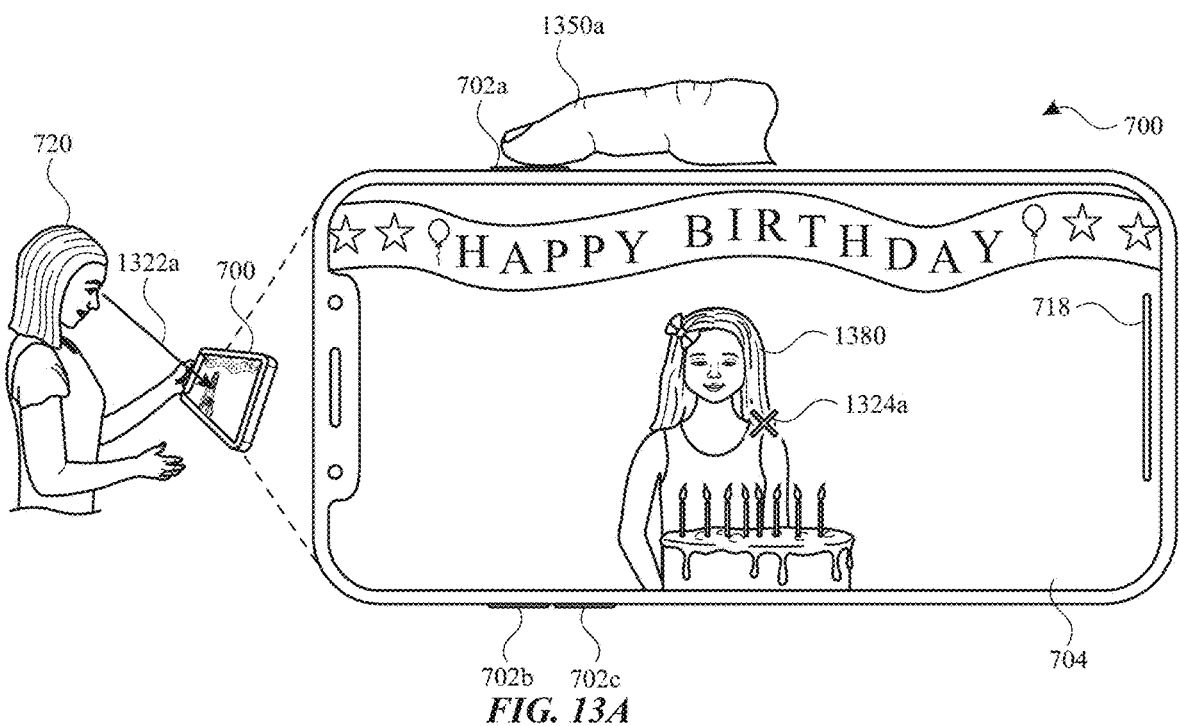
FIGS. 13A-13G illustrate example techniques for displaying virtual objects for controlling a camera setting, in accordance with some embodiments.

FIG. 13A illustrates computer system 700 (e.g., an electronic device) having hardware button 702a, hardware button 702b, hardware button 702c, and display 704 (e.g., a display generation component). At FIG. 13A, hardware button 702*a*, hardware button 702*b*, and hardware button 702*c* are capable of being pressed. In some embodiments, one or more of hardware buttons 702*a*-702*c* are capable of being rotated, slid, and/or detecting a touch contact. In some embodiments, computer system 700 can detect pressing, rotating, sliding, and/or touch inputs on one or more of hardware buttons 702*a*-702*c*.

As illustrated in FIG. 13A, display 704 includes a representation of a physical environment that is within a viewpoint of user 720, which is represented by the area of display 704. As illustrated in FIG. 13A, the physical environment represented on display 704 includes subject 1380, who is standing behind a cake. Above the head of subject 1380 is a happy birthday sign that is horizontally shown across display 704. As illustrated in FIG. 13A, user 720 is holding computer system 700 with one hand while looking towards display 704 in gaze direction 1322*a*. Computer system 700 is between user 720 and the physical environment that is represented on display 704. In some embodiments (as described above in relation to FIGS. 9A-9B), computer system 700 captures content representative of the physical environment. In some embodiments, computer system 700 captures the content using one or more cameras, where the content is in the field-of-view of the one or more cameras. In some embodiments, computer system 700 displays a representation of the content using one or more techniques as described above in relation to "pass-through video". While computer system 700 is a phone in FIG. 13A, computer system 700 can be one or more other devices, such as a tablet and/or a head-mounted device. In some embodiments, display 704 is a transparent display and the physical environment is visual through display 704 (e.g., the viewpoint of the user). In other words, user 720 can look through display 704 at the physical environment. Thus, in some embodiments, computer system 700 does not actively display content representative of the physical environment and, instead, provides a display that a user can look through to see the physical environment.

At FIG. 13A, computer system 700 displays virtual object 718 over the representation of the physical environment on display 704. In FIG. 13A, computer system 700 displays virtual object 718, and virtual object 718 is not included in the content (e.g., pass-through and/or captured content) representative of the physical environment. In addition, it should be understood that gaze location 1324*a* is merely representative of the location of the gaze of user 720 and, in some embodiments, gaze location 1324*a* is not displayed by computer system 700 (e.g., as described above). At FIG. 13A, computer system 700 detects pressing input 1350*a* (e.g., pressure applied by a finger) on hardware button 702*a*.

Figure 13B:
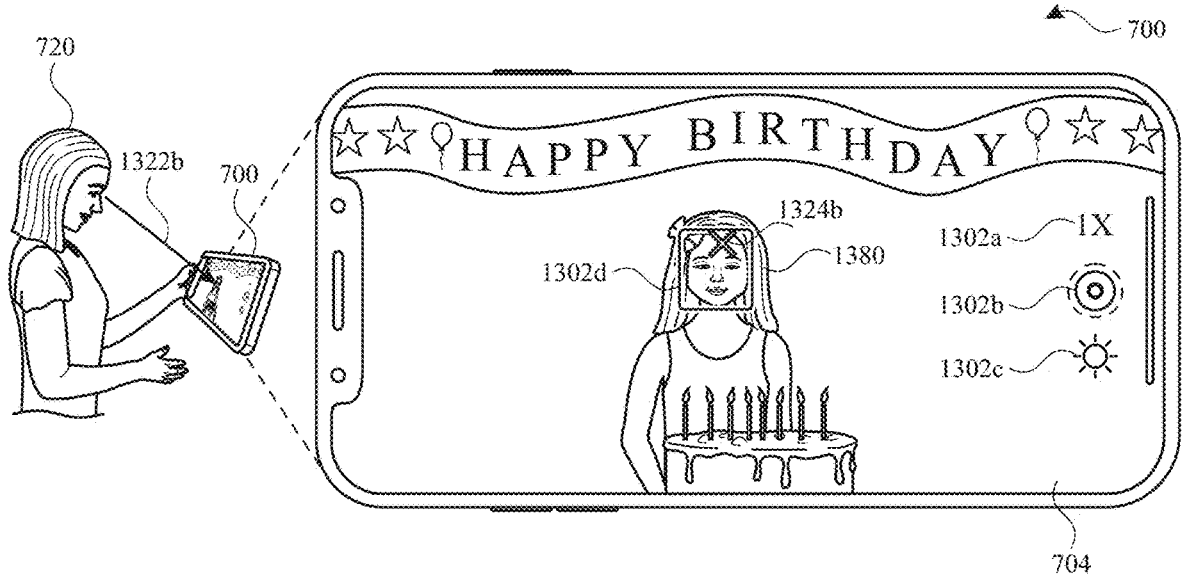

As illustrated in FIG. 13B, in response to detecting pressing input 1350*a*, computer system 700 displays multiple camera setting virtual objects that were not previously displayed. At FIG. 13B, the camera setting virtual objects include zoom setting virtual object 1302*a*, animated-image-capture setting virtual object 1302*b*, brightness setting virtual object 1302*c*, and autofocus setting virtual object 1302*d*. In some embodiments, in response to detecting pressing input 1350*a*, computer system 700 initiates a media capture application that includes instructions for causing display of one or more of the camera setting virtual objects. In some embodiments, display of the camera setting virtual objects indicates that the media capture application has been initiated (e.g., in response to detecting pressing input 1350*a*). In some embodiments, computer system 700 displays multiple camera setting virtual objects that were not previously displayed in response to a determination that an input was detected (e.g., pressing input 1350*a*) while the gaze (e.g., as indicated by gaze direction 1322*a* and gaze location 1324*a*) of the user is directed to display 704 (e.g., and/or on a particular location of display 704).

As illustrated in FIG. 13B, zoom setting virtual object 1302*a*, animated-image-capture setting virtual object 1302*b*, and brightness setting virtual object 1302*c* are displayed on the right side of display 704 near virtual object 718. Zoom setting virtual object 1302*a* (e.g., that, when selected, causes computer system 700 to change a zoom level for capturing media and/or display other virtual objects for changing the zoom level for capturing media), animated-image-capture setting virtual object 1302*b* (e.g., that, when selected, causes computer system 700 to be configured to capture animated-image media and/or not be configured to capture animated-image media), and brightness setting virtual object 1302*c* (e.g., that, when selected, causes computer system 700 to change a brightness level for capturing media and/or to display other virtual objects for changing the brightness level for capturing media) are displayed on the right side of display 704, such that the majority of the representation of the physical environment is not obstructed by these camera setting virtual objects. In some embodiments, animated-image media is media that includes a plurality of frames that are captured (and, in some embodiments, some of the frames are captured before the computer system detected a request to initiate capture of the media item).

Autofocus setting virtual object 1302*d* is displayed around the face of subject 1380 that is represented on display 704 (and is not displayed near the right side of display 704). Autofocus setting virtual object 1302*d* indicates that one or more cameras of computer system 700 are focusing on and/or tracking subject 1380 in the physical environment while capturing content representative of the physical environment. Notably, in FIG. 13B, autofocus setting virtual object 1302*d* is displayed around the face of subject 1380 standing in the physical environment because user 720 (e.g., looking in gaze direction 1322*b*) is determined to be looking at gaze location 1324*b* on display 704. Because gaze location 1324*b* corresponds to a location of subject 1380, computer system 700 displays autofocus setting virtual object 1302*d* overlaid around the face of subject 1380, and the one or more cameras are configured to focus on subject 1380 in the physical environment. In some embodiments, in response to detecting that the gaze of user 720 is directed to another subject (e.g., person, animal, and/or object) in the physical environment, computer system 700 displays autofocus setting virtual object 1302*d* around the other subject and/or ceases to display of autofocus setting virtual object 1302*d* around subject 1380. In some embodiments, in response to detecting that the gaze of user 720 is directed to another subject (e.g., person, animal, and/or object) in the physical environment, one or more cameras of computer system 700 are configured to focus on the other subject. Thus, in some embodiments, the focal point of one or more cameras (e.g., represented by autofocus setting virtual object 1302*d*) is determined based on the gaze of user 720.

Figure 13C:
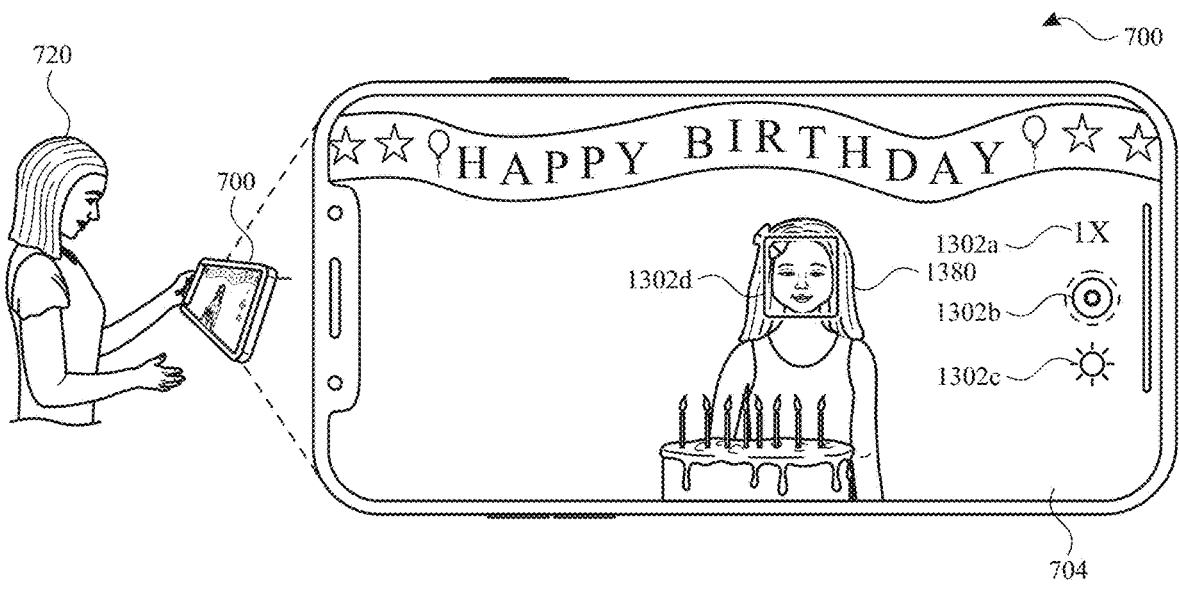

As illustrated in FIG. 13C, subject 1380 has moved in the physical environment, such that subject 1380 is now positioned to the right of the cake (e.g., as opposed to the left of the cake, as illustrated in FIG. 13B). As illustrated in FIG. 13C, autofocus setting virtual object 1302*d* has changed locations with respect to display 704, such that autofocus setting virtual object 1302*d* continues to surround subject 1302 even though subject 1302 has moved in the physical environment. In contrast, zoom setting virtual object 1302*a*, animated-image-capture setting virtual object 1302*b*, and brightness setting virtual object 1302*c* are displayed at the same locations with respect to display 704 in FIG. 13C, at which each was displayed in FIG. 13B. Thus, the locations of zoom setting virtual object 1302*a*, animated-image-capture setting virtual object 1302*b*, and brightness setting virtual object 1302*c* do not change in response to the physical environment and/or subjects in the physical environment changing and are viewpoint-locked virtual objects. In some embodiments, in response to detecting movement of computer system 700 (e.g., away from the scene with subject 1380), computer system 700 ceases to display autofocus setting virtual object 1302*d* and/or shifts the location of autofocus setting virtual object 1302*d* with respect to display 704 while continuing to display zoom setting virtual object 1302*a*, animated-image-capture setting virtual object 1302*b*, and brightness setting virtual object 1302*c* at their respective locations on display 704. Thus, in some embodiments, autofocus setting virtual object 1302*d* is an environment-locked virtual object while zoom setting virtual object 1302*a*, animated-image-capture setting virtual object 1302*b*, and brightness setting virtual object 1302*c* are viewpoint-locked virtual objects. In some embodiments, an environment-locked virtual object will be shown at a particular location in the physical environment and will cease to be displayed when the particular location is not represented in display 704. In some embodiment, a viewpoint-locked object will be shown at a particular location on display 704 and will not cease to be displayed when a particular location of the physical environment is not represented on display 704.

Figure 13D:
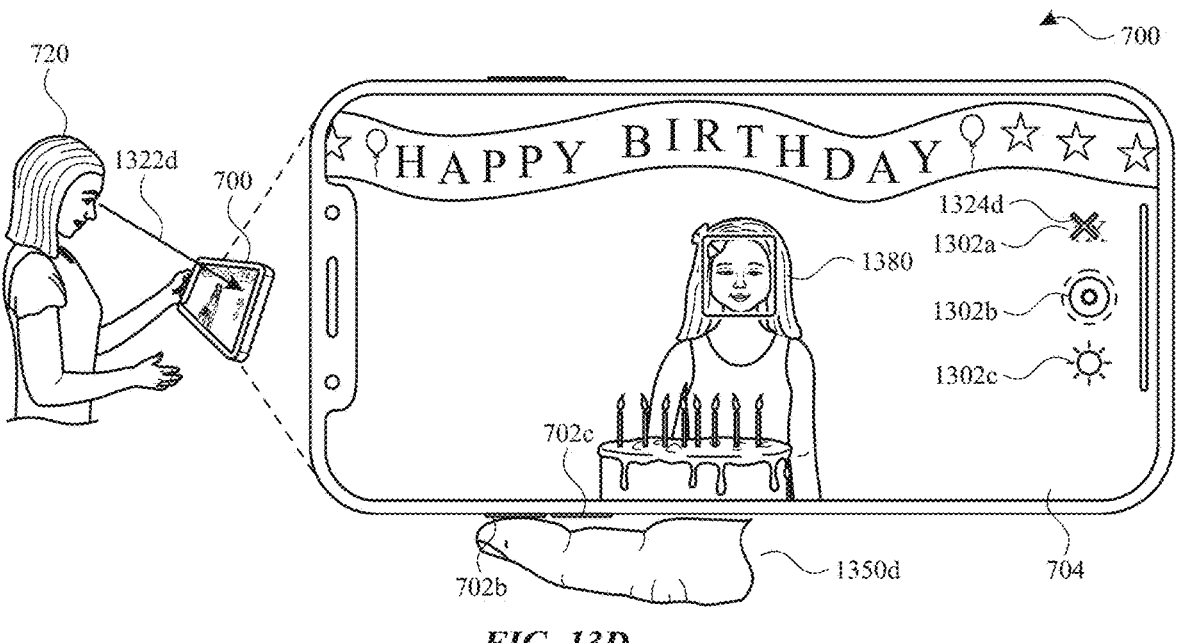

At FIG. 13D, computer system 700 detects user 720 looking in gaze direction 1322*d*. While user 720 is looking in gaze direction 1322*d*, computer system 700 detects that the gaze of the user is directed to gaze location 1324*d*, which corresponds to a location of zoom setting virtual object 1302*a*. In some embodiments, computer system 700 emphasizes (e.g., increases the size of, highlights, and/or changes the color of) a camera setting virtual object based on a determination that the gaze of the user is directed to a location that corresponds to the location of the camera setting virtual object. In some embodiments, computer system 700 deemphasizes an emphasized camera setting virtual object based on a determination that the gaze of the user changed from being directed to a location that corresponds to the location of the camera setting virtual object to a location that does not correspond to the location of the camera setting virtual object. In some embodiments, computer system 700 increases the emphasis of a camera setting virtual object as the gaze of the user gets closer to a location that corresponds to the location of the camera setting virtual object. At FIG. 13D, while detecting that the gaze of the user is directed to zoom setting virtual object 1302*a*, computer system 700 detects pressing input 1350*d* on hardware button 702*b*.

Figure 13E:
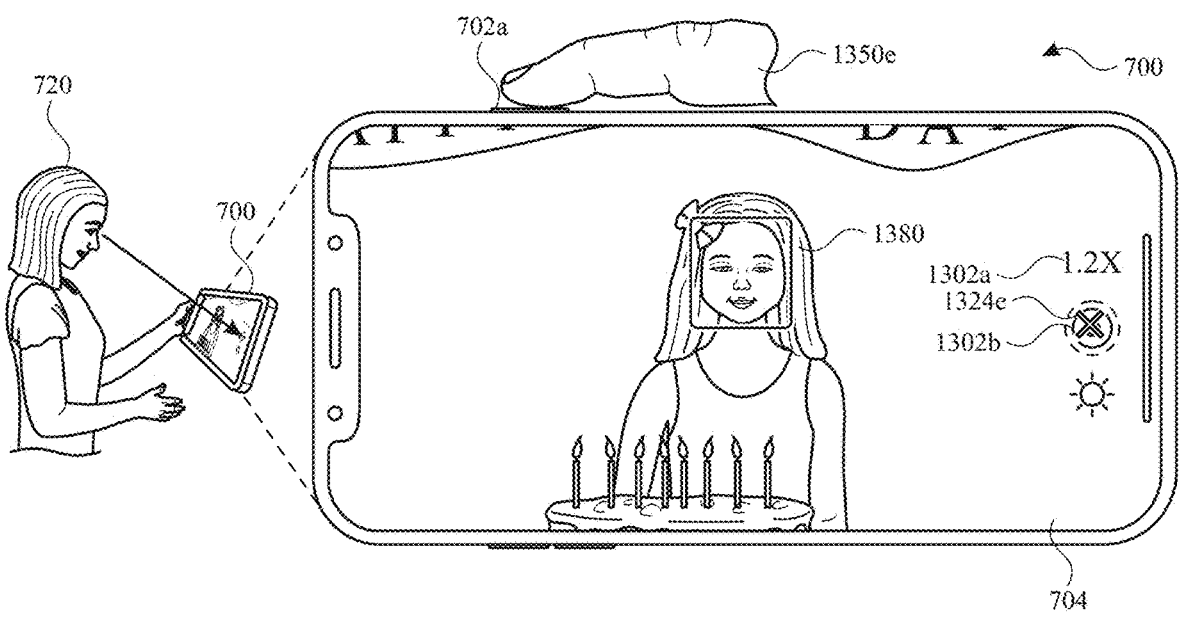
Figure 13F:
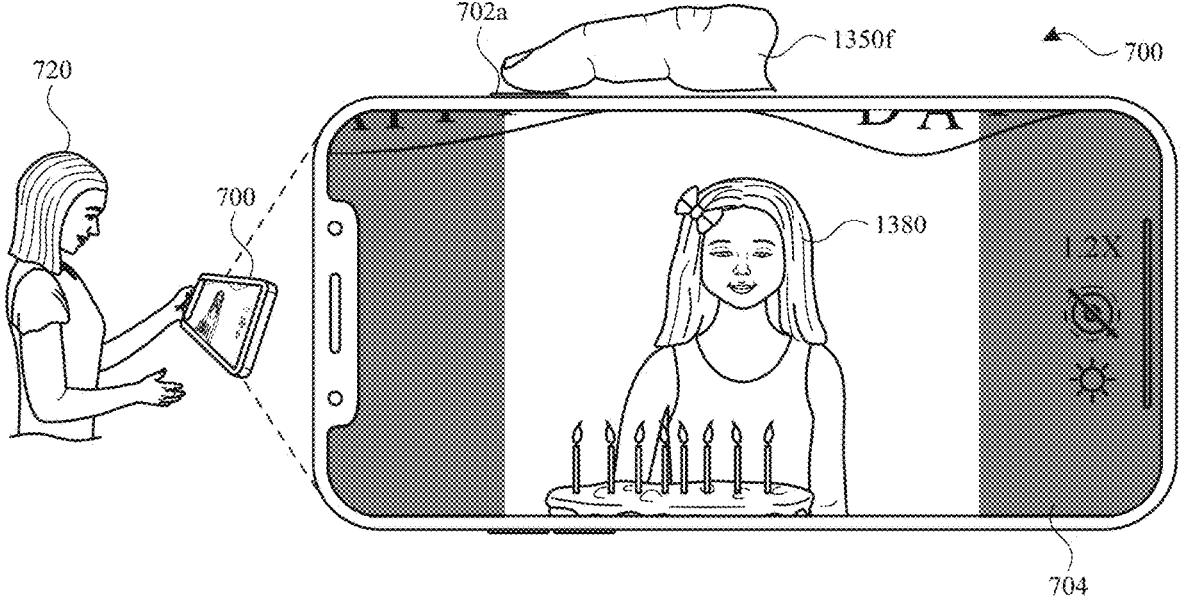

As illustrated in FIG. 13E, in response to detecting pressing input on hardware button 702*b* while detecting that the gaze of the user is directed to zoom setting virtual object 1302*a*, computer system 700 changes the zoom level of the representation of the physical environment shown on display 704 from a "1×" zoom level (e.g., as indicated by zoom setting virtual object 1302*a* of FIG. 13F) to a "1.2×" zoom level (e.g., which is indicated by updated zoom setting virtual object 1302*a* of FIG. 13E). Here, computer system 700 changes the zoom level of the representation of the physical environment based on the magnitude (e.g., speed, distance of movement, and/or pressure) of pressing input

1350*d*. Thus, as shown in FIG. 13D-13E, computer system 700 can change a camera setting (e.g., zoom level) in response to detecting an input (e.g., on a hardware component) while detecting a gaze of user 720 at a location of a camera setting virtual object. In some embodiments, computer system 700 detects pressing input 1350*d* on hardware button 702*c* at FIG. 13D and, in response to detecting pressing input 1350*d* on hardware button 702*c*, computer system decreases the zoom level of the representation of the physical environment. In some embodiments, at FIG. 13D, computer system 700 detects an input (e.g., such a movement input (e.g., swipe input, a dragging input, and/or a sliding input)) on a touch-sensitive surface while detecting that the gaze of the user is directed to gaze location 1324*d* that corresponds to a location of zoom setting virtual object 1302*a*. In some embodiments, the touch-sensitive surface is on an edge of a display and/or the edge of a surface surrounding the display, such as a rim that surrounds the lens of glasses. In some embodiments, in response to detecting a movement input on the touch-sensitive surface while detecting that the gaze of the user is directed to gaze location 1324*d* that corresponds to a location of zoom setting virtual object 1302*a*, computer system 700 changes the zoom level of the representation of the physical environment at FIG. 13E. In some embodiments, one or more other camera settings can be changed based on detecting an input while also detecting a gaze of user 720 at a location that corresponds to the location of a respective camera setting, such as a brightness level of an image that will be captured and/or a representation of the physical environment that is displayed via display 704 (e.g., brightness setting virtual object 1302*c*). In some embodiments, computer system 700 changes the zoom level of the representation of the physical environment based on the magnitude on pressing input 1350*d* because zoom setting virtual object 1302*a* represents a particular type of camera setting (e.g., a camera setting that controls more than two states (e.g., on and/or off states) of camera setting and/or a non-toggle camera setting). In some embodiments, in response to detecting that the gaze of the user is directed to gaze location 1324*d* that corresponds to a location of zoom setting virtual object 1302*a* for a period of time in FIG. 13D, computer system 700 changes the value of the zoom setting in FIG. 13E, irrespective of whether an input (e.g., a physical input on a hardware button) is detected. Thus, in some embodiments, computer system 700 changes the value of a respective camera setting based on an amount of time that user 720 has dwelled on a respective camera setting virtual object that is associated with the respective camera setting. In some embodiments, computer system 700 does not update the representation of the physical environment represented in display 704 when changing the zoom level (e.g., when display 704 is a pass-through display) but applies the changed zoom level to the media that is captured while the zoom level has been changed (e.g., a representation of captured media would be displayed at the 1.2× zoom level if the representation of the captured media was captured while the zoom level was set to the 1.2× zoom level).

At FIG. 13E, computer system 700 detects that the gaze (e.g., as indicated by gaze direction 1322*e* and gaze location 1324*e*) of the user has been directed to animated-image-capture setting virtual object 1302*b* for longer than a predetermined period of time (e.g., 0.2-5 seconds). As illustrated in FIG. 13F, in response to detecting that the gaze of the user has been directed to animated-image-capture setting virtual object 1302*b* for longer than the predetermined period of time, computer system 700 turns off the animated-image capture setting that corresponds to animated-image-capture setting virtual object 1302*b*. In addition, computer system 700 changes the appearance of animated-image-capture setting virtual object 1302*b* to indicate that an animated-image capture setting has been changed to the off state (e.g., animated-image-capture setting virtual object 1302*b* having no slash in FIG. 13E when the animated-image capture setting was in the on state versus animated-image-capture setting virtual object 1302*b* having the slash in FIG. 13F when the animated-image capture setting is in the off state). In some embodiments, computer system 700 toggles the animated-image capture setting on and re-displays animated-image-capture setting virtual object 1302*b* of FIG. 13D in response to detecting that the gaze of the user has been directed to animated-image-capture setting virtual object 1302*b* for longer than a predetermined period of time while the animated-image capture setting is in the off state. In some embodiments, computer system 700 has to detect a physical input on a hardware button while detecting the gaze of the user being directed to animated-image-capture setting virtual object 1302*b* in order to toggle the animated-image capture setting on or off.

Looking back at FIG. 13E, computer system 700 detects input 1350*e* on hardware button 702*a* (as an alternative to or after or before detecting that the gaze of the user has been directed to animated-image-capture setting virtual object 1302*b*). As illustrated in FIG. 13F, in response to detecting input 1350*c*, computer system 700 deemphasizes and/or darkens portions (e.g., the left side and/or the right side) of display 704 and initiates the capture of media. At FIG. 13F, computer system 700 displays representation of the captured media (non-deemphasized and/or non-darkened portions of display 704). In some embodiments, computer system 700 displays an animation of the representation of the captured media shrinking and moving into the position of photo well virtual object 1302*e* of FIG. 13G (e.g., discussed below). In some embodiments, in response to detecting input 1350*c*, computer system 700 deemphasizes and/or darkens portions (e.g., the left side and/or the right side) of display 704 without initiating the capture of media. In some of these embodiments, the non-deemphasized portions of display 704 represent a live preview, where the darkened portions of display 704 indicate portions of display 704 that will not be included in a representation of media that is captured and stored in response to detecting an input to initiate the capture of media. In some embodiments, while the portions of display 704 that are darkened are not included in a representation of media, image data corresponding to those portions are still captured (e.g., for one or more uses such as image process and/or image editing). In some embodiments, the one or more portions of display 704 that are deemphasized in FIG. 13F are deemphasized by using active tinting (and/or electronic window tinting), where actual portions of the screen of display 704 are tinted (and the color of the portions of the UI are not merely changed to gray).

Figure 13G:
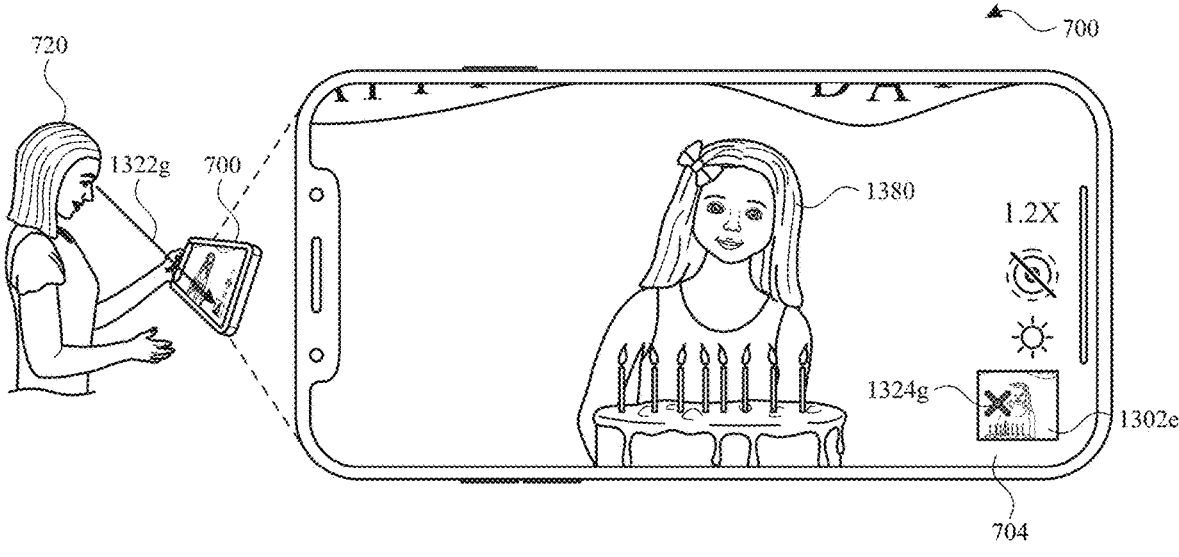

In embodiments where computer system 700 initiates the capture of media in response to detecting input 1350*e*, computer system 700 displays photo well virtual object 1302*e* of FIG. 13G in response to detecting input 1350*c*. Notably, the representation of media that was captured in response to detecting input 1350*e* only includes the portions of the representation of the physical environment that were not deemphasized in FIG. 13F. As described above, in some embodiments, computer system 700 displays an animation of the representation of captured media of FIG. 13F (e.g., non-deemphasized portions) shrinking and moving into the position of photo well virtual object 1302*e* of FIG. 13G. In some embodiments, the photo well is displayed with a previous representation of captured media before input 1350*e* was detected, and in response to detecting input 1350*e*, the representation of media that was captured in response to detecting input 1350*e* replaces the previous representation of captured media in photo well virtual object 1302*e*. In some embodiments, in response to detecting input 1350*e*, photo well virtual object 1302*e* changes size (e.g., increases and/or decreases in size over a period of time) to indicate that the capture of media has been initiated.

In embodiments where computer system 700 does not initiate the capture of media in response to detecting input 1350*c*, computer system 700 detects pressing input 1350*f* on hardware button 702*a* in FIG. 13F. As illustrated in FIG. 13G, in response to detecting pressing input 1350*f*, computer system 700 initiates capture of media. At FIG. 13G, after capturing the media, computer system 700 displays photo well virtual object 1302*e*, which includes a representation of the media that was captured in response to detecting pressing input 1350*f*. Notably, the representation of media that was captured in response to detecting pressing input 1350*f* only includes the portions of the representation of the physical environment that were not deemphasized in FIG. 13F (e.g., the live preview and/or only includes the non-gray portions of FIG. 13F). In some embodiments, computer system 700 displays an animation of the live preview of FIG. 13F shrinking and moving into the position of photo well virtual object 1302*c*. In some embodiments, the photo well is displayed with a previous representation of captured media before detecting pressing input 1350*f*, and in response to detecting pressing input 1350*f*, the representation of media that was captured in response to detecting pressing input 1350*f* replaces the previous representation of captured media in photo well virtual object 1302*e*.

In some embodiments, in response to detecting pressing input 1350*f* (or input 1350*c*), photo well virtual object 1302*e* changes size (e.g., increases and/or decreases in size over a period of time) to indicate that the capture of media has been initiated. In some embodiments, input 1350*e* is a pressing input and/or another input, such as a press-and-hold input, a touch input, a rotatable input and/or a sliding input. In some embodiments, pressing input 1350*f* is another type of input. In some embodiments, input 1350*e* is a different type of input than pressing input 1350*f* of FIG. 13F. In some embodiments, computer system 700 detects that the gaze of the user is directed to photo well virtual object 1302*e* of FIG. 13G (e.g., as indicated by gaze direction 1322*g* and gaze location 1324*g*), and in response to detecting the that the gaze of the user is directed to photo well virtual object 1302*e*, computer system 700 displays a representation of the capture media (e.g., re-displays a user interface like the one in FIG. 13F with the representation of the captured media displayed in a portion of display 704 while other portion(s) of display 704 are deemphasized).

Additional descriptions regarding FIGS. 13A-13F are provided below in reference to method 1000 described with respect to FIGS. 13A-13F.

FIG. 14 is a flow diagram of an exemplary method 1400 flow diagram of methods for displaying virtual objects for controlling a camera setting, in accordance with some embodiments. In some embodiments, method 1400 is performed at a computer system (e.g., computer system 101 in FIG. 1 and/or computer system 700) including a display generation component (e.g., display generation component 120 in FIGS. 1, 3, and 4) (e.g., a heads-up display, a display, a touchscreen, a projector, etc.) a physical input mechanism (e.g., 702*a*-702*c*) (e.g., a hardware button) (e.g., a hardware input device/mechanism) (e.g., a physical input device). In some embodiments, the physical input mechanism is physically connected to the computer system and/or the display generation component. In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 1400 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1400 are, optionally, combined and/or the order of some operations is, optionally, changed.

While displaying, via the display generation component, (e.g., the presentation of) an augmented reality user interface (e.g., a user interface that is simper imposed on a physical environment), the computer system detects (1402) a contact (e.g., 1350*a*) (e.g., an input (e.g., a input that is detected on the surface of the physical input mechanism for a predetermined period of time) and/or, in some embodiments, a sliding input, a pressing input (e.g., a short pressing input and/or a long pressing input), a tapping input, and/or a rotating input) on the physical input mechanism (e.g., 702*a*). In some embodiments, the input is a non-pressing input (e.g., a rotating input and/or a flicking input).

In response to detecting the contact (e.g., 1350*a*) on the physical input mechanism (e.g., 702*a*), the computer system displays (1404), via the display generation component, (e.g., the presentation of) a first virtual object (e.g., 1302*a*-1302*e*) (e.g., one or more camera user interface controls and/or a selectable virtual objects) (e.g., of a set of virtual objects) on the augmented reality user interface.

While displaying the first virtual object, the computer system detects (1406) gaze (e.g., the gaze of a user of the computer system (e.g., detected using one or more gaze tracking sensors)) directed to the first virtual object (e.g., 1302*a*-1302*e*) (e.g., directed to a location/position of the first virtual object) (e.g., while continuing to display the augmented reality user interface).

In response to detecting gaze directed to the first virtual object (and in accordance with a determination that the gaze direction to the first virtual object has not been detected for longer than the first period of time), the computer system performs (1408) one or more camera operations (e.g., as described above in relation to FIGS. 13B-13G). In some embodiments, in response to detecting the contact on the physical input device, the computer system displays, via the display generation component, a second virtual object, where the second virtual object is concurrently displayed with the first virtual object and is different from the first virtual object. In some embodiments, in accordance with a determination that a gaze of a user is directed to a first virtual object, the computer system selects the first virtual object and/or performs a first camera operation. In some embodiments, in accordance with a determination that a gaze of the user is directed to a second virtual object (e.g., that is different from the virtual object), the computer system selects the second virtual object and/or perform a second camera operation that is different from the first camera operation. In some embodiments, a set of virtual objects (e.g., including the first virtual object and the second virtual objects) are displayed on a first portion of the augmented reality user interface (e.g., a left/right/top/bottom portion) of the camera user interface. In some embodiments, the set of virtual objects are superimposed on a physical environment. In some embodiments, in accordance with a determination that the gaze directed to the first virtual object has been detected for a first predetermined period of time, the computer system adjusts a second camera setting. In some embodiments, as a part of performing the one or more camera operations and in accordance with a determination that the gaze directed to the first virtual object has been detected for a second predetermined period of time that is shorter than the first predetermined period of time, the computer system changes the size of the first virtual object (while maintaining the size of another virtual object that corresponds to a different camera setting). In some embodiments, in accordance with a determination that the gaze directed to the first virtual object has not been detected for the first predetermined period of time, the computer system forgoes adjusting the camera setting and/or performing the one or more camera operations. In some embodiments, in response to detecting gaze directed to the first virtual object and in accordance with a determination that the gaze direction to the first virtual object has not been detected for longer than the first period of time, the computer system forgoes changing the visual appearance of the first virtual object. Displaying the first virtual object in response to detecting the contact on the physical input mechanism provides the user with a control option to display the first virtual object in order to perform one or more camera operations, which provides additional control options without cluttering the user interface. Performing one or more camera operations in response to detecting gaze directed to the first virtual object provides the user with control to cause the performance one or more camera operations based on the gaze of the user, which provides additional control options without cluttering the user interface.

In some embodiments, in response to detecting the contact (e.g., 1350*a*) on the physical input mechanism (e.g., 702*a*), the computer system initiates a first media capture application (e.g., an application for capturing media (e.g., photo media and/or video media) (e.g., different types of media)) that corresponds to (e.g., that includes display of and/or data (e.g., computer instructions) for displaying) the first virtual object (e.g., 1302*a*-1302*e*) (e.g., as described in relation to FIG. 13B). In some embodiments, as a part of initiating the media capture application the computer displaying the one or more camera user interface elements indicates that a media capture application has been initiated in response to detecting the contact on the physical input mechanism. Initiating a first media capture application that corresponds to the first virtual object in response to detecting the contact on the physical input mechanism provides the user with control over whether the first media capture application will be initiated, which provides additional control options without cluttering the user interface.

In some embodiments, the computer system displays the first virtual object (e.g., 1302*a*-1302*e*) in response to detecting the contact (e.g., 1350*a*) on the physical input mechanism (e.g., 702*a*) indicates that a second media capture application (e.g., using one or more techniques as described above in relation to the first media capture application) has been initiated (e.g., as described in relation to FIG. 13B). Displaying the first virtual object provides visual feedback that indicates that a second media capture application has been initiated and enhances security of the computer system by making the user aware that the media application has been initiated, which provides additional control options without cluttering the user interface and enhances the security of the computer system.

In some embodiments, the computer system is in communication with a first set of one or more cameras, and the first virtual object (e.g., 1302*d*) is a first autofocus indicator that indicates a current location (e.g., that is in the field-of-view of the one or more cameras) at which the first set of one or more cameras is focused (e.g., as described above in relation to FIGS. 13B-13C). Displaying a virtual object that is an autofocus indicator provides visual feedback concerning a focus point for one or more cameras that are in communication with the computer system, which provides improved visual feedback.

In some embodiments, the first virtual object (e.g., 1302*a*-1302*d*) controls a first camera setting of the computer system. In some embodiments, performing the one or more camera operations in response to detecting gaze directed to the first virtual object includes initiating (and, in some embodiments, completing) a process to adjust the first camera setting (e.g., as described in relation to FIGS. 13D-13F) (and/or adjusting the first camera setting). In some embodiments, the setting is a timer setting and adjusting the camera setting includes setting a timer before capture of media is initiated. In some embodiments, the setting is a zoom setting and adjusting the camera setting includes changing the zoom level (e.g., 0.3-10× zoom) of one or more cameras of the computer system. In some embodiments, the setting is a brightness setting and adjusting the camera setting includes adjusting a brightness level of a display and/or captured media. In some embodiments, the setting is an aspect ratio setting and adjusting the camera setting includes configuring the computer system captured media with a different aspect ratio (e.g., square, 4:3, etc.). In some embodiments, the setting is a depth setting (e.g., an f-stop setting) and adjusting the camera setting includes adjusting the value of the depth setting (e.g., f-stop setting). In some embodiments, the setting is a filter setting (e.g., a filter that changes the appearance of captured media) and adjusting the camera setting includes configuring the computer system to apply a different filter to captured media. In some embodiments, the setting is a flash setting and adjusting the camera setting includes configuring the computer system to change a flash setting (e.g., turn flash on, off, and/or to be adjusted automatically based on the environment in the field-of-view of the one or more cameras). In some embodiments, the setting is a lighting effect setting (e.g., a portrait lighting effect control (e.g., a studio lighting, contour lighting, and/or stage lighting)) and adjusting the camera setting includes adjusting the lighting effect operation (e.g., changing the state (e.g., amount of lighting (e.g., levels of light for each setting)) of the lighting effect and/or displaying a user interface to change the state of the lighting effect operation). In some embodiments, camera modes allow user to capture different types of media (e.g., photos or video) and the settings for each mode can be optimized to capture a particular type of media corresponding to a particular mode (e.g., via post processing) that has specific properties (e.g., shape (e.g., square, rectangle), speed (e.g., slow motion, time elapse), audio, and/or video). For example, when the computer system is configured to operate in a still photo mode, the one or more cameras of the computer system, when activated, captures media of a first type (e.g., rectangular photos) with particular settings (e.g., flash setting, one or more filter settings); when the computer system is configured to operate in a square mode, the one or more cameras of the computer system, when activated, captures media of a second type (e.g., square photos) with particular settings (e.g., flash setting and one or more filters); when the computer system is configured to operate in a slow motion mode, the one or more cameras of the computer system, when activated, captures media that media of a third type (e.g., slow motion videos) with particular settings (e.g., flash setting, frames per second capture speed); when the computer system is configured to operate in a portrait mode, the one or more cameras of the computer system captures media of a fifth type (e.g., portrait photos (e.g., photos with blurred backgrounds) with particular settings (e.g., amount of a particular type of light (e.g., stage light, studio light, contour light), f-stop, blur); when the computer system is configured to operate in a panoramic mode, the one or more cameras of the computer system captures media of a fourth type (e.g., panoramic photos (e.g., wide photos) with particular settings (e.g., zoom, amount of field to view to capture with movement). In some embodiments, when switching between modes, the display of the representation of the field-of-view changes to correspond to the type of media that will be captured by the mode (e.g., the representation is rectangular mode while the computer system is operating in a still photo mode and the representation is square while the computer system is operating in a square mode). In some embodiments, after the camera setting is adjusted, a representation of the adjusted value is displayed. Adjusting the first camera setting as a part of performing the one or more camera operations in response to detecting gaze directed to the first virtual object provides additional control over the computer system by allow a user to change a camera setting using gaze, which provides additional control options without cluttering the user interface and enhances the security of the computer system.

In some embodiments, in response to detecting gaze directed to the first virtual object (e.g., 1302*a*-1302*e*) (and in accordance with a determination that the gaze direction to the first virtual object has been detected for a first period of time (e.g., 0.2-5 seconds), the computer system changes a visual appearance (e.g., a size, a shape, and/or an animation that corresponds to) of the first virtual object (while maintaining the visual appearance of another virtual object that corresponds to a different camera setting) (e.g., as described above in relation to FIGS. 13B-13C). In some embodiments, as a part of performing the one or more camera operations includes, the computer system changes the size of the virtual object. In some embodiments, after detecting gaze directed to the first virtual object, the computer system detects that the gaze is no longer directed to the first virtual object and, in response to detecting that the gaze is no longer directed to the first virtual object, the computer system displays the first virtual object with the same visual appearance in which the first virtual object was displayed before the gaze directed to the first virtual object was detected. In some embodiments, in response to detecting gaze directed to the first virtual object and in accordance with a determination that the gaze direction to the first virtual object has not been detected for a first period of time, the computer system forgoes changing the visual appearance of the first virtual object. Changing the visual appearance of the first virtual object in response to detecting gaze directed to the first virtual object provides visual feedback the first virtual object is in focus, where one or more user inputs can cause an operation that corresponds to the first virtual object to be performed, which provides improved visual feedback.

In some embodiments, performing the one or more camera operations includes transitioning a third camera setting (e.g., represented by 1302*b*) from a first state (e.g., on (e.g., active state) or off state (e.g., an inactive state) to a second state (e.g., off or on state) (e.g., as described in relation to FIGS. 13E-13F). In some embodiments, as a part of transitioning the third camera setting from the first state to the second state, the computer system toggles the third camera setting on/off. Performing one or more camera operations that includes transitioning a third camera setting from a first state to a second state in response to detecting gaze directed to the first virtual object provides the user with control to cause the performance one or more camera operations based on the gaze of the user, which provides additional control options without cluttering the user interface.

In some embodiments, the computer system is in communication with a touch sensitive surface (e.g., as described above in relation to FIGS. 13D-13E) (at a location that is on the edge (e.g., rim) of the computer system). In some embodiments, performing the one or more camera operations includes emphasizing (and/or selecting) (e.g., visually emphasizing (e.g., highlighting, changing an appearance of, and/or bolding) the first virtual object relative to one or more other virtual objects) (e.g., emphasized programmatically and/or tracked programmatically) the first virtual object (e.g., as described above in relation to FIGS. 13B-13E). In some embodiments, the method further includes: while the first virtual object is emphasized (and/or selected) (e.g., after the one or more camera operations are performed), the computer system detects a contact (e.g., 1350*d*) (e.g., a physical contact) (e.g., a sliding contact and/or, in some embodiments, a rotating contact and/or a pressing contact) on the touch-sensitive surface (e.g., 702*b* and/or 702*c*) (e.g., as described above in relation to FIGS. 13D-13E); and in response to detecting the contact on the touch-sensitive surface, the computer system adjusts a fourth camera setting based on movement of the contact on the touch-sensitive surface, where the fourth camera setting is adjusted from having a first value to having a second value that is different from the first value (e.g., as described above in relation to FIGS. 13D-13E). In some embodiments, the speed at which the fourth camera setting is adjusted and/or the magnitude of different between the first value and the second value is based on the movement of the contact on the touch-sensitive surface. Adjusting a fourth camera setting based on movement of the contact on the touch-sensitive surface in response to detecting the contact on the touch-sensitive surface provides the user with control to cause a value to be adjusted based on movement of the contact on the touch-sensitive surface, which provides additional control options without cluttering the user interface.

In some embodiments, the first virtual object (e.g., 1324*a*-1324*e*) is overlaid on (e.g., over and/or at) a first location associated with (e.g., of and/or in) the three-dimensional environment (e.g., as described above in relation to FIG. 13B) (e.g., a physical environment, a virtual environment, and/or a mixed-reality environment). In some embodiments, the method includes: in response to detecting the contact (e.g., 750*a*) on the physical input mechanism (e.g., 702*a*), the computer system displays, via the display generation component, a second virtual object (e.g., 1324*a*-1324*c*) that is overlaid on a second location that is associated with the three-dimensional environment. In some embodiments, the second location is different from the first location. In some embodiments, the first virtual object is associated with a first camera setting and second virtual object is associated with a second camera setting that is different from the first camera setting. In some embodiments, the method includes: while the first virtual object (e.g., a focus indicator) (e.g., an environment-locked virtual object) is overlaid on the first location and the second virtual object (e.g., a viewpoint-locked virtual object) (e.g., a camera setting) is overlaid on the second location (e.g., the first virtual object and the second virtual object is displayed at each of their respective locations), the computer system detects movement of a viewpoint of a user (e.g., and/or movement of the computer system) (e.g., from a third location (e.g., location that the computer system was in when the contact on the physical input mechanism was detected) in the three-dimensional environment to a fourth location in the three-dimensional embodiment). In some embodiments, the fourth location is different from the third location. In some embodiments, the method includes: in response to detecting movement of the viewpoint of the user, the computer system displays, via the display generation component, the first virtual object (e.g., 1324*a*-1324*c*) (or second virtual object) overlaid on a third location associated with the three-dimensional environment while shifting a location of the second virtual object (e.g., 1324*d*) to continue to display the second virtual object overlaid on the second location associated with the three-dimensional environment, where the third location is different from the first location (e.g., as described in relation to FIGS. 13C-13D) (e.g., without overlaying the first virtual object on the first location and/or the second location and/or without overlaying the second virtual object on the first location and/or the third location). In some embodiments, the first virtual object changes locations in the viewpoint of the user based on the movement of one or more subjects and/or the position of one or more subjects in the field-of-view of a respective set of cameras, and the second virtual object does not change locations in the viewpoint of the user (e.g., displayed in the same location irrespective of a position of a subject in the field-of-view of one or more cameras). Displaying, via the display generation component, the first virtual object overlaid on a third location associated with the three-dimensional environment while continuing to display the second virtual object overlaid on the second location associated with the three-dimensional environment, where the third location is different from the first location in response to detecting movement of the computer system in the three-dimensional environment allows the computer system to continue displaying certain virtual objects at the same location in the physical environment while other UI objects are overlaid on to a different location, allowing a user to determine whether or not the virtual object is environment-locked or viewpoint-locked, which provides improved visual feedback.

In some embodiments, the computer system is in communication with a second set of one or more cameras. In some embodiments, the method includes: while displaying the first virtual object (e.g., 1324*a*-1324*f*), the computer system detects a third contact (e.g., 1350*c* or 1350*f*) (e.g., a physical contact) (e.g., a pressing contact and/or, in some embodiments, a rotating contact and/or a sliding contact) on a second physical input mechanism (e.g., 702*a*) (e.g., the physical input mechanism or a different physical input mechanism) (e.g., and, in some embodiments, one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand). In some embodiments, in response to detecting the third contact (e.g., 1350e or 1350f) on the second physical input mechanism (e.g., 702a) (e.g., while displaying the first virtual object), initiating, via the second set of one or more cameras, capture of media (e.g., media in the field-of-view of the one or more cameras) (e.g., as described above in relation to FIGS. 13E-13G). Initiating, via the one or more cameras, capture of media in response to detecting the second contact on the second physical input mechanism provides the user with control over the computer system by allowing the user a way to initiate capture of media, which provides additional control options without cluttering the user interface.

In some embodiments, after capturing the media, the computer system displays, via the display generation component, a virtual object (e.g., 1302c) (e.g., a photo well) that includes a first representation of the captured media (e.g., concurrently with the first virtual object) (e.g., a representation of media that is smaller than the live preview and/or the representation of the physical environment that is displayed via the display generation component). Displaying a virtual object that includes a first representation of the captured media after capturing the media provides visual feedback that the computer system has caused media to be captured, which provides improved visual feedback.

In some embodiments, the computer system is in communication with a second set of one or more cameras. In some embodiments, the method includes: after capturing the media and while continuing to display the first virtual object (e.g., 1324a-1324d) (and/or one or more other user interface elements that are concurrently displayed with the first visual object), the computer system displays, via the display generation component, an animation of a representation of the field-of-view of the second of one or cameras shrinking (e.g., getting smaller) (and moving to a predetermined location on the augmented reality user interface) into a second representation of captured media (e.g., as described in relation to FIGS. 13E-13G in response to detecting input 1350c).

In some embodiments, after capturing the media, the computer system detects a request to view the captured media (e.g., as described in relation to FIGS. 13F-13G in response to detecting the gaze of the user in gaze direction 1322g and in gaze location 1324g). In some embodiments, detecting the request to capture media includes detecting one or more gaze-based inputs, air gestures (e.g., a hand input (e.g., as described in relation to method 1100), physical inputs (e.g., a tap input, a swipe input, a rotation input, a dragging input, and/or a flicking input) on the computer system and/or on one or more external devices and/or peripheral devices, and/or any combination thereof. In some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand). In some embodiments, the method includes: in response to detecting the request to view the captured media (and/or another other captured media) (e.g., as described in relation to FIGS. 13F-13G in response to detecting the gaze of the user in gaze direction 1322g and in gaze location 1324g), the computer system displays, via the display generation component, a second representation of the captured media while visually deemphasizing one or more portions of the augmented reality user interface (e.g., in a new user interface (e.g., without the first virtual object) (e.g., one or more portions that do not include the second representation of the captured media and/or one or more portions that are outside of the second representation of the captured media) (e.g., darken portions of the augmented reality user interface that would not be included in the media that will be captured) (e.g., as described in relation to FIGS. 13F-13G in response to detecting the gaze of the user in gaze direction 1322g and in gaze location 1324g). In some embodiments, detecting the request to view the captured media includes detecting a gaze that is directed to the virtual object that includes the first representation of the media. In some embodiments, the third representation of the media is larger than the first representation of the media. In some embodiments, the first representation of the media ceases to be displayed while the third representation of the captured media is displayed. In some embodiments, displaying, via the display generation component, a third representation of the captured media while deemphasizing one or more portions of the augmented reality user interface includes expanding a first representation of the captured media (e.g., from the photo well). Displaying a third representation of the captured media while deemphasizing one or more portions of the augmented reality user interface visually deemphasized provides feedback to the user on which portions of the augmented reality user interface correspond the second representation of the captured media and reduces visual distractions, which provides improved visual feedback.

In some embodiments, deemphasizing one or more portions of the augmented reality user interface includes the computer system causes a tint to be applied to a surface (e.g., display 704) (e.g., a surface having a mixture of transparent metals within glass that can conduct electricity and/or a surface that is capable of active tinting) (e.g., as described in relation to FIG. 13F).

In some embodiments, before initiating the capture of media, the computer system detects a request to display a live preview of media that will be captured (e.g., as described above in relation to FIGS. 13E-13F and displaying the live preview). In some embodiments, in response to detecting the request to display a live preview of media that will be captured, the computer system visually deemphasizes one or more portions of the augmented reality user interface (e.g., as described above in relation to FIGS. 13E-13F and displaying the live preview) (e.g., portions that do not overlay and/or do not correspond to portions of the physical environment that would be included in the captured media) (e.g., darken portions of the augmented reality user interface that would not be included in the media that will be captured). In some embodiments, the computer system darkens portion of the augmented reality user interface by causing a tint to be applied to a surface (display generation component and/or display screen) (e.g., a display surface). Visually deemphasizing one or more portions of the augmented reality user interface in response to detecting the request to display a live preview of media that will be captured provides feedback to the user on which portions of the augmented reality user interface will be or will not be a part of the display of the captured media corresponding to the live preview and reduces the number of operations needed to capture desired media, which provides improved visual feedback and reduces the number of inputs needed to perform an operation.

In some embodiments, the computer system is in communication with a fourth set of one or more cameras. In some embodiments, the first virtual object (e.g., 1324d) is a second autofocus indicator that indicates a current location (e.g., that is in the field-of-view of the one or more cameras) at which the fourth set of one or more cameras is focused.

In some embodiments, the first virtual object is displayed at a location that corresponds to a fourth location. In some embodiments, the method includes: while displaying the first virtual object (e.g., 1324d), the computer system detects movement of the gaze from the fourth location to a fifth location (e.g., as described above in relation to FIGS. 13B-13D); and in response to detecting movement of the gaze from the fourth location to the fifth location, the computer system moves, via the display generation component, the first virtual object to a location that corresponds to the fifth location (e.g., as described above in relation to FIGS. 13B-13D). In some embodiments, the location that corresponds to the fifth location is different from a location that corresponds to the fourth location (e.g., as described above in relation to FIGS. 13B-13D). In some embodiments, in response to detecting movement of the gaze from the fourth location to the fifth location, the computer system selects a new focal point, where the new focal point is selected based on the fifth location and not the fourth location. Moving, via the display generation component, the first virtual object to a location that corresponds to the fifth location in response to detecting movement of the gaze from the fourth location to the fifth location allow control over the user interface by allowing a user to control a focal point of the one or more cameras, which provides additional control options without cluttering the user interface.

In some embodiments, aspects/operations of methods 800, 1000, 1200, 1600, 1800, 2000, 2200, 2400, 2600, 2800, 3000, and 3200 may be interchanged, substituted, and/or with the steps of method 1400. For example, method 1400 to perform one or more camera operations at a computer system that has been awaken using method 800. For brevity, these details are not repeated here.

FIGS. 15A-15H illustrate example techniques for providing navigation guidance, in accordance with some embodiments. FIG. 16 is a flow diagram of methods for providing navigation guidance, in accordance with some embodiments. The user interfaces in FIGS. 15A-15H are used to illustrate the process in FIG. 16.

In particular, FIGS. 15A-15H illustrate an exemplary scenario where a user navigates through a physical environment using a computer system that provides guidance for traveling to a destination in the physical environment. To guide the user, the computer system 700 displays one or more virtual objects on a representation of the physical environment. As described below, some of the virtual objects displayed by the computer system are environment-locked virtual objects while some of the virtual objects displayed by the computer system are viewpoint-locked virtual objects.

Figure 15A:
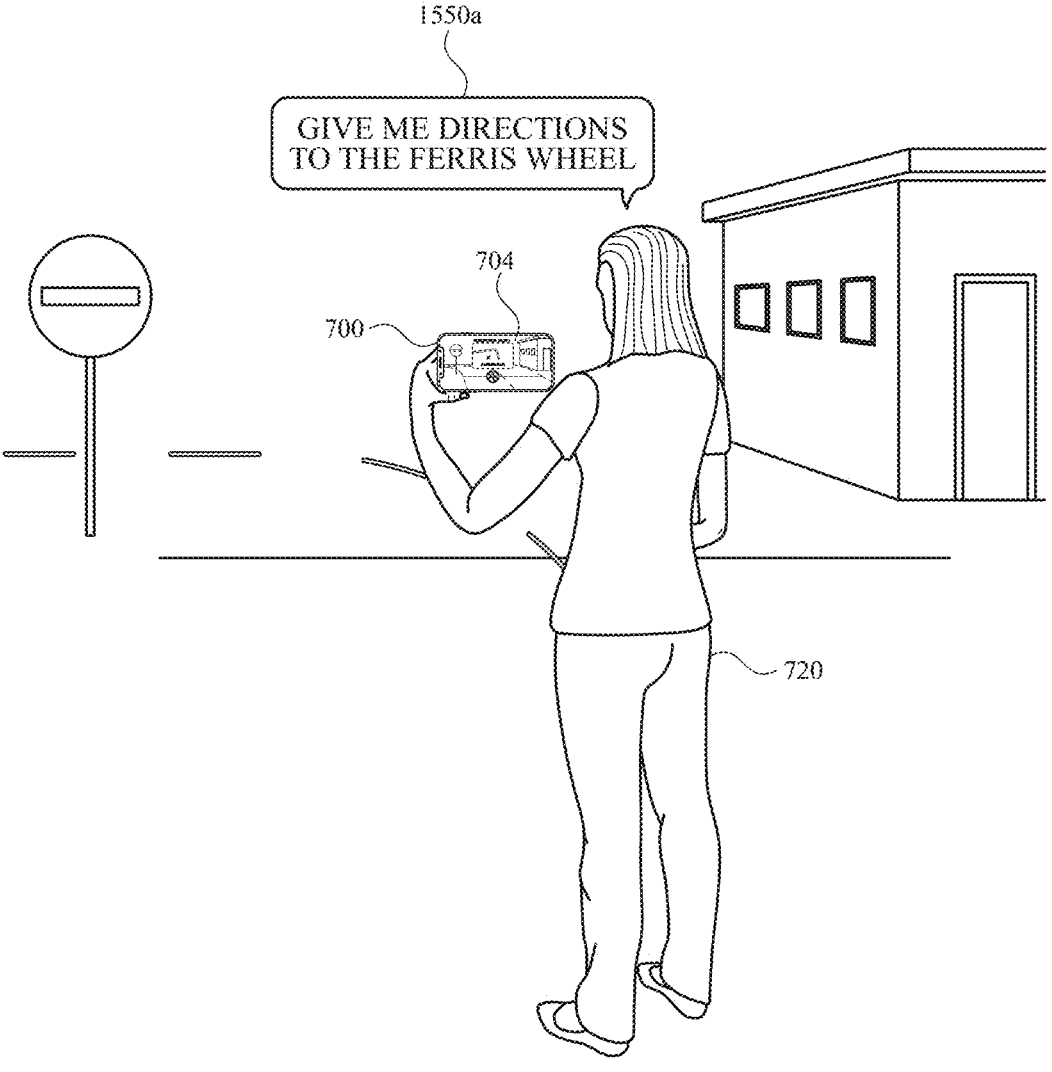
FIGS. 15A-15H illustrate example techniques for providing navigation guidance, in accordance with some embodiments.

FIG. 15A illustrates user 720 holding computer system 700 in a physical environment. The physical environment includes user 720, a stop sign, a road, and a building. Computer system 700 includes display 704, which is the viewpoint of user 720. That is, when user 720 looks at display 704, user 720 can see the physical environment along with one or more virtual objects that are displayed on display 704. Thus, computer system 700 presents an AR environment though display 704, the viewpoint of user 720. While computer system 700 is a phone in FIG. 15A, computer system 700 can be one or more other devices, such as a tablet and/or a head-mounted device. In some embodiments, display 704 is a transparent display where one or more portions of the physical environment are visible because light can "pass-through" the transparent display (e.g., a lens). Thus, in these embodiments, computer system 700 does not display the physical environment that is shown on display 704. Rather, the physical environment is visible through display 704. In some embodiments, display 704 displays a representation of the physical environment via one or more cameras in communication with computer system 700 (e.g., using "pass-through video" as described above). In some embodiments, computer system 700 displays a representation of a virtual environment instead of a physical environment in FIGS. 15A-15H. For case of discussion, the description below will describe FIGS. 15A-5H with respect to computer system 700 having a transparent display and displaying one or more virtual objects overlaid of the physical environment that "passes through" the transparent display of computer system 700. At FIG. 15A, computer system 700 detects voice command 1550a (e.g., "GIVE ME DIRECTIONS TO THE FERRIS WHEEL"). At FIG. 15A, a determination is made that voice command 1550a corresponds to a request to initiate a navigation guidance process that provides a route of travel to a destination. At FIG. 15A, computer system 700 initiates the navigation guidance process in response to this determination. In some embodiments, computer system 700 can initiate a navigation process by detecting one or more other inputs (e.g., air inputs, gaze-based inputs, and/or physical inputs (e.g., on a hardware button)). Computer system 700 detecting a voice command to initiate the navigation guidance process is merely exemplary.

Figures 15B, 15C:
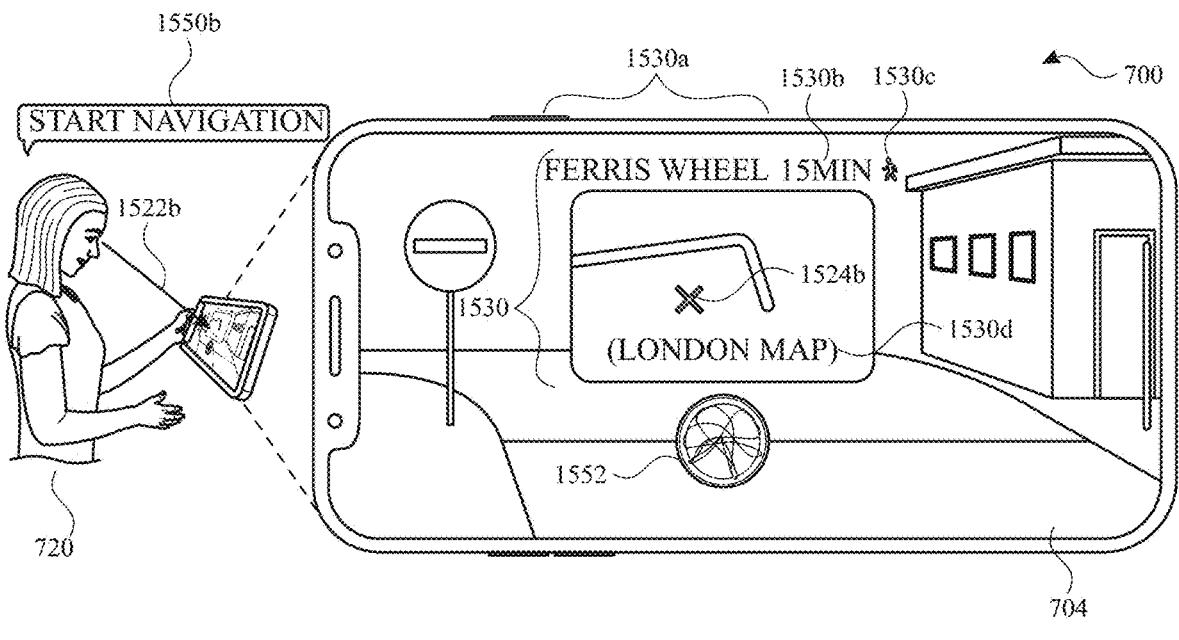

As illustrated in FIG. 15B, as a part of initiating the navigation guidance process and/or in response to detecting voice command 1550a, computer system 700 displays introductory navigation information 1530. Introductory navigation information 1530 includes detected destination virtual object 1530a, estimated time of arrival (ETA) virtual object 1530b, mode of travel virtual object 1530c, and route preview 1530d. Destination virtual 1530a indicates the determined destination ("FERRIS WHEEL"). At FIGS. 15A-15B, computer system 700 determined the destination ("FERRIS WHEEL") from voice command 1550a (e.g., "GIVE ME DIRECTIONS TO THE FERRIS WHEEL"). In some embodiments, computer system 700 determines the destination from detecting one or more other voice inputs and/or through one or more other means, such as detecting one or more keyboard inputs.

ETA virtual object 1530b indicates the estimated time of arrival that computer system 700 has determined that it will take user 720 to reach the destination from a starting location (e.g., current location of computer system 700). Mode of travel virtual object 1530c indicates a chosen and/or determined mode of travel for which user 720 can use to arrive at the destination. Here, mode of travel virtual object 1530c indicates that the computer system 700 has configured the navigation guidance based on a user walking to the destination and/or to provide walking directions to user 720. Thus, at FIG. 15B, the time ("15 MIN") indicated by ETA virtual object 1530b is based on computer system 700 providing walking directions. Route preview 1530d shows a preview of the route that user 720 has to take to arrive at the destination (e.g., "FERRIS WHEEL"). Here, route preview 1530d is only a subset of the route provided by computer system 700 to arrive at the destination. In some embodiments, route preview 1530d includes the entire route (e.g., provided by computer system 700) to arrive at the destination. In some embodiments, in response to one or more inputs, route preview 1530d can be scrolled and/or panned to display more portions of the route provided by computer system 700 to arrive at the destination. However, in some embodiments, other mode of travel virtual objects can be displayed, such as a representation of a car to indicate that the computer system is configured to provide driving directions, a representation of a bike to indicate that the computer system is configured to provide biking direction, and/or a representation of a train and/or bus to indicate that the computer system is configured to provide public transportation travel directions. In some embodiments, one or more portions of introductory navigation information 1530 is environment-locked and one or more portions of introductory information is viewpoint-locked. At FIG. 15B, computer system 700 detects voice command 1550b (e.g., as indicated by voice command indicator 1552) and/or a gaze of user 720 in gaze direction 1522b and at gaze location 1524b for longer than a predetermined period of time (e.g., 0.2-5 seconds) on display 704.

At in FIG. 15C, in response to detecting voice command 1550b ("START NAVIGATION") and/or the gaze of user 720 at gaze location 1524b (and/or in gaze direction 1522b) for longer than the predetermined period of time, computer system 700 initiates navigation guidance to the detected destination ("FERRIS WHEEL"). As illustrated in FIG.

Figure 15D:
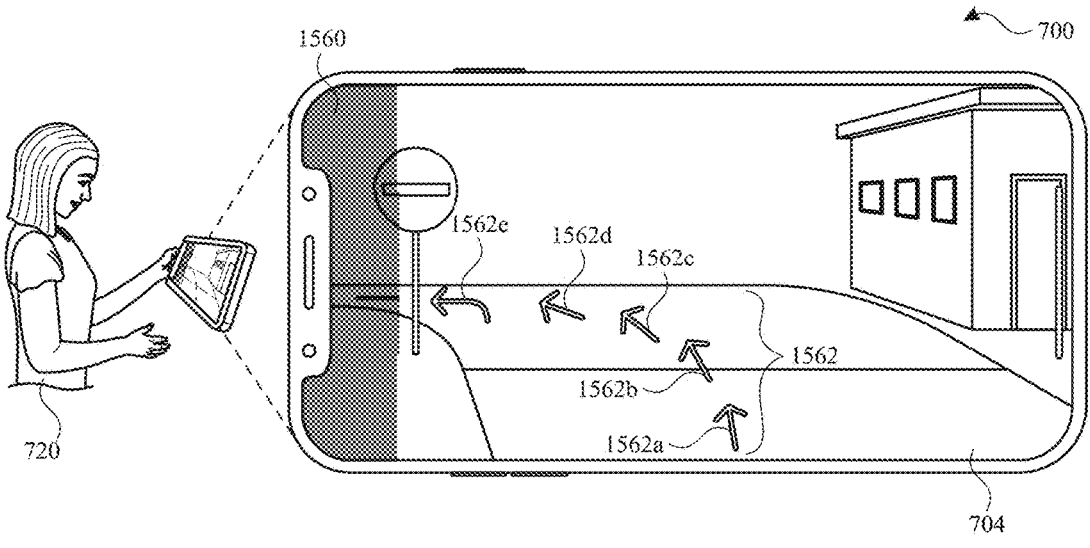

1562a-1562e indicate the direction of travel that computer system 700 has determined that user 720 should take to reach the destination ("FERRIS WHEEL") for a portion of the route (e.g., as shown by route preview 1530d of FIG. 15B). As illustrated in FIG. 15D, route portion 1562 indicates that user 720 should walk straight before turning left by the stop sign in the physical environment. Route portion virtual objects 1562a-1562e are environment-locked. While route portion virtual objects 1562a-1562e are illustrated as static in FIG. 15D, computer system 700 animates the route portion virtual objects to indicate the direction of travel. In some embodiments, computer system 700 indicates direction of travel by displaying the route portion virtual objects that are closer to the user (e.g., route portion virtual objects 1562a-1562b) before displaying route portion virtual objects that are further away from the user (e.g., route portion virtual objects 1562c-1562e). For example, in some embodiments, computer system 700 animates the route portion virtual objects using one or more of the exemplary sequences in Table 1 below and/or any combination thereof.

TABLE 1

| Exemplary Animation Sequences for Route Portion 1562 | | | | | | |
|---|---|---|---|---|---|---|
| | | Period of Time | | | | |
| | | Time 1 | Time 2 | Time 3 | Time 4 | Time 5 |
| Sequence | Sequence 1 | 1562a | 1562b | 1562c | 1562b | 1562e |
| | Sequence 2 | 1562a, 1562b | 1562b, 1562c | 1562c, 1562d | 1562d, 1562e | 1562e |
| | Sequence 3 | 1562a, 1562b, 1562c | 1562c, 1562d, 1562e | 1562a, 1562b, 1562c | 1562c, 1562d, 1562e | 1562a, 1562b, 1562c |
| | Sequence 4 | 1562a, 1562b, 1562c, 1562d | 1562b, 1562c, 1562d, 1562e | 1562c, 1562d, 1562e | 1562e | |
| | Sequence 5 | 1562a, 1562b, 1562c, 1562d, 1562e | 1562a, 1562b, 1562c | 1562d, 1562e | 1562e | 1562a, 1562b, 1562c, 1562d, 1562e |

15C, in response to detecting voice command 1550b, computer system 700 displays ETA virtual object 1510a and distance virtual object 1510b. ETA virtual object 1510a indicates an estimated time of arrival that computer system 700 has determined that it will take user 720 to reach the destination from a starting location (e.g., current location of computer system 700). Distance virtual object 1510b indicates an estimated distance that computer system 700 (and/or user 720) has traveled in the physical environment (e.g., towards the destination). In some embodiments, ETA virtual object 1510a and distance virtual object 1510b are viewpoint-locked virtual objects. Looking back at FIG. 15B, in some embodiments, computer system 700 displays a virtual object for initiating navigation guidance to a detected destination (e.g., in response to detecting voice command 1550a) and, in response to detecting the gaze of user 720 being directed to the virtual object for initiating navigation guidance, computer system 700 initiates navigation guidance to the detected destination (e.g., user interface of FIG. 15C is displayed).

As illustrated in FIG. 15D, after initiating navigation guidance to the detected destination, computer system 700 displays route portion 1562, which includes route portion virtual objects 1562a-1562c. Route portion virtual objects Table 1 above shows five exemplary sequences in which computer system 700 can animate route portion virtual objects 1562a-1562e to indicate the direction of travel along route portion 1562. For each sequence (e.g., Sequence 1, Sequence 2, Sequence 3, Sequence 4, and Sequence 5 in a sequence row of Table 1), the indicator numbers that corresponds to route portion virtual objects 1562a-1562e are listed under a particular period of time (e.g., Time 1, Time 2, Time 3, Time 4, and Time 5). For exemplary purposes, it is assumed that the period of times represented by the time columns are consecutive periods of time (e.g., Time 1=0.1-0.5 seconds, Time 2=0.5-1 seconds, Time 3=1-1.5 seconds, Time 4=1.5-2 seconds, Time 5=2-2.5 seconds) during the animation of the sequence. In addition, the indicator numbers that are listed under a particular time column for a particular sequence indicate that route portion virtual objects corresponding to the respective indicator numbers are displayed and the route portion virtual objects that correspond to the indicator numbers that are not listed under a particular time are not displayed. For Sequence 1, Table 1 indicates that computer system 700 can indicate a direction of travel along route portion 1562 by displaying an animation where route portion virtual object 1562a is displayed at Time 1, which is followed by route portion virtual object 1562b being displayed at Time 2 (e.g., after route portion virtual object 1562*a* has ceased to be displayed), which is followed by route portion virtual object 1562*c* being displayed at Time 3 (e.g., after route portion virtual object 1562*b* has ceased to be displayed), which is followed by route portion virtual object 1562*d* being displayed at Time 4 (e.g., after route portion virtual object 1562*c* has ceased to be displayed), and which is followed by route portion virtual object 1562*e* being displayed at Time 5 (e.g., after route portion virtual object 1562*d* has ceased to be displayed).

The other sequences in Table 1 use the same logic. As an example, for Sequence 2, Table 1 indicates that computer system 700 can indicate a direction of travel along route portion 1562 by displaying an animation where route portion virtual objects 1562*a*-1562*b* are concurrently displayed at Time 1, which is followed by route portion virtual objects 1562*b*-1562*c* being concurrently displayed at Time 2 (e.g., after route portion virtual object 1562*a* has ceased to be displayed), which is followed by route portion virtual objects 1562*c*-1562*d* being concurrently displayed at Time 3 (e.g., after route portion virtual object 1562*b* has ceased to be displayed), which is followed by route portion virtual objects 1562*d*-1562*e* being concurrently displayed at Time 4 (e.g., after route portion virtual object 1562*c* has ceased to be displayed), and which is followed by route portion virtual object 1562*e* being displayed at Time 5 (e.g., after route portion virtual object 1562*d* has ceased to be displayed). Thus, the differences between Sequence 2 and Sequence 1 in Table 1 indicate that computer system 700 can display an animation to indicate the direction of travel, where computer system 700 displays a single route portion virtual object at a time (e.g., Sequence 1) or can display an animation to indicate the direction of travel, where computer system 700 displays multiple route portion virtual objects at a time (e.g., Sequence 2) to indicate the direction of travel. Moreover, Sequence 3 is provided to show that computer system 700 can display more than two objects at a time (e.g., route portion virtual objects 1562*a*, 1562*b*, and 1562*c* are concurrently displayed at Time 1 for Sequence 3) to indicate the direction of travel. Sequence 4 is provided to show that computer system 700 can display a different number of objects at different times (e.g., route portion virtual objects 1562*b*, 1562*c*, 1562*d*, and 1562*e* are concurrently displayed at Time 2, which is followed by route portion virtual objects 1562*d* and 1562*e* being concurrently displayed at Time 3 for Sequence 4) to indicate the direction of travel. Sequence 5 is provided to show that computer system 700 can display an animation to indicate the direction of travel, where all and/or most of the route portion virtual objects for route portion 1562 are displayed concurrently (e.g., at Time 1 for Sequence 5) and can cease to display multiple route portion virtual objects (e.g., route portion virtual objects 1562*b* and 1562*c* being concurrently displayed at Time 2 but not being displayed at Time 3 for Sequence 5). Thus, as denoted by Table 1 above, computer system 700 can display different animations of route portion virtual objects 1562*a*-1562*e* being displayed and ceasing to be displayed in multiple sequences, and it should be understood that the examples provided in Table 1 are merely exemplary and computer system 700 could display an animation of travel for a route portion in other manners. Moreover, while route portion virtual objects 1562*a*-1562*e* are illustrated as arrows, route portion virtual objects 1562*a*-1562*e* can be represented by one or more other shapes (e.g., that are filled in, partially filled in, and/or not filled), such as circles, squares, triangles, and/or octagons, and/or symbols. In some embodiments, the visual appearance of route portion virtual objects 1562*a*-

1562*e* are changed based on the location of the physical environment to which each route portion virtual object is environment-locked.

At FIG. 15D, each sequence can be repeated and/or be followed by another sequence (e.g., in Table 1 or another sequence) for a period of time when displaying an animation of travel for a route portion. In some embodiments, computer system 700 continues to repeat the sequence and/or continues to display an animation of travel for route portion 1562 while the viewpoint of the user is stationary. In some embodiments, computer system 700 displays the animation of travel for route portion 1562 as user 720 moves in the physical environment. In some embodiments, in response to detecting movement of the viewpoint of user 720 (e.g., due to movement of the user and/or computer system) in the direction of travel for more than a threshold distance (e.g., 1-5 meters), computer system 700 ceases to display the animation of the travel for route portion 1562. In some embodiments, computer system 700 displays the animation of the travel for route portion 1562 at a speed that is based on detected movement of the viewpoint of the user and/or computer system 700. Thus, in some embodiments, computer system 700 displays the animation of travel for route portion 1562 faster when the viewpoint of the user is detected to be moving at a faster speed than when the viewpoint of the user is detected to be moving at a slower speed in order to help user 720 see and/or interpret the direction of travel for route portion 1562 while moving the viewpoint of the user is moving at faster speeds.

In some embodiments, in response to detecting that the viewpoint of user 720 has moved closer to the stop sign in the physical environment of FIG. 15D, computer system 700 ceases to display the subset of the sequence of the animation that includes route portion virtual objects 1562*a*-1562*b* because route portion virtual objects 1562*a*-1562*e* are environment-locked virtual objects. Thus, when the viewpoint of user 720 moves away from a respective location in the physical environment that a respective route portion virtual object is locked to, such that the respective location can no longer be seen in the viewpoint of the user, computer system 700 no longer displays the respective route portion virtual object (e.g., as a part of the animation of the direction of travel). In some embodiments, in response to detecting that the viewpoint of user 720 has moved closer to the stop sign in the physical environment of FIG. 15D, computer system 700 continues to animate the route portion virtual objects that are environment-locked to locations of the physical environment that are within the viewpoint of user 720 while ceasing to display and/or animate the route portion virtual objects that are environment-locked to locations of the physical environment that are not in the viewpoint of user 720 (and/or visible to the user).

At FIG. 15D, computer system 700 also emphasizes edge 1560 (e.g., grey portion in FIG. 15D) of display 704 to indicate that the direction of travel along route portion 1562 includes a left turn. In embodiments where display 704 has active tinting, computer system 700 causes display 704 to actively tint edge 1560 to indicate that the direction of travel along route portion 1562 includes a left turn. In some embodiments, a plurality of light-emitting diodes surround display 704 (e.g., and/or a peripheral region of a head mounted display such as a phone in a head mounted holder, an edge of a display of a stand-alone HMD or a frame of smart glasses), and computer system 700 causes one or more of the plurality of LEDs on the left side of display 704 to be activated to indicate that the direction of travel along route portion 1562 includes a left turn. In some embodiments, computer system 700 displays one or more other directional virtual objects, such as turn right, turn left, straight ahead, and/or U-turn sign and/or indicator. In some embodiments, the one or more directional virtual objects are environment-locked to one or more locations of the physical environment (e.g., similar to route portion virtual objects 1562a-1562e). In some embodiments, as a part of displaying the one or more other directional virtual objects, computer system 700 does not cease to display a portion of the direction virtual object while the viewpoint of the user is stationary. In some embodiments, the one or more directional virtual objects are displayed above route portion 1562. In some embodiments, the one or more direction virtual objects are displayed closer to route portion virtual object 1562e (e.g., end of route portion 1562) than to route portion virtual object 1562a (e.g., beginning of route portion 1562) or vice-versa.

Figure 15E:
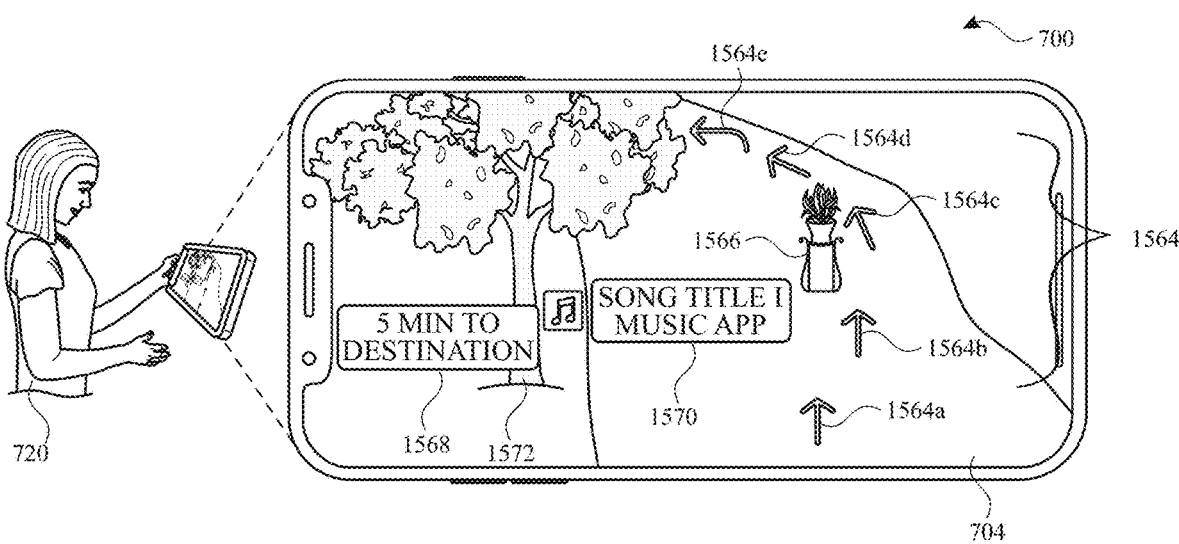

At FIG. 15E, computer system 700 has traveled some distance along the route to the destination. Thus, at FIG. 15E, the viewpoint of the user is at a different location in the physical environment than the viewpoint of the user was at in FIG. 15D, and the area of the physical environment that was visible to user 720 at FIG. 15D is no longer visible to the user in FIG. 15E. Thus, at FIG. 15E, computer system 700 does not display route portion virtual objects 1562a-1562e because they were locked to the area of the physical environment that was visible in FIG. 15D, which is not visible in the viewpoint of user 720 at FIG. 15E. Instead, at FIG. 15E, computer system 700 displays route portion 1564, which includes route portion virtual objects 1564a-1564c. Route portion virtual objects 1564a-1564e are displayed to indicate the direction of route portion 1564, which indicates a different direction along the route to the destination than the direction of route portion 1562. To indicate the direction of route portion 1564, computer system 700 displays an animation of route portion virtual objects 1564a-1564e being displayed in a sequence (e.g., using one or more techniques as described above in relation to the animation of route portion virtual objects 1562a-1562e). The animation of route portion virtual objects 1564a-1564e indicates the direction by displaying virtual objects that are closer to the viewpoint of the user (e.g., 1564a-1564b) before displaying virtual objects that are further away from the viewpoint of the user (e.g., 1564c-1564d). In some embodiments, computer system 700 uses a different number of route portion virtual objects to indicate the direction of travel for route portion 1562 of FIG. 15D than computer system 700 uses to indicate the direction of travel for route portion 1564.

As illustrated in FIG. 15E, route portion virtual objects 1564a-1564c are not displayed in a straight line. In particular, route portion virtual object 1564c is displayed to the left of plant 1566, which is a physical object in the physical environment. Thus, at FIG. 15E, computer system 700 made a determination to display route portion virtual object 1564c over a location in the physical environment that is not obstructed by plant 1566. In other words, in some embodiments, computer system 700 avoids displaying route portion virtual objects over locations in the physical environment that would obstruct some types of physical objects (e.g., cars, trees, plants, and/or trucks). In some embodiments, computer system 700 shifts the respective location at which a respective route portion virtual object is environment-locked when an object (e.g., car, a bike, and/or a truck) is moved into the respective location.

As illustrated in FIG. 15E, computer system 700 also displays navigation goal virtual object 1568 ("5 MIN TO DESTINATION") in front of tree 1572, which indicates an updated ETA. Moreover, computer system 700 displays music change virtual object 1570 that indicates the next audio media ("SONG TITLE 1") in the queue for playback, via one or more speakers in communication with computer system 700. In addition, music change virtual object 1570 indicates that the next audio media in the queue for playback was sourced from a particular application ("MUSIC APP") on computer system 700. In some embodiments, navigation goal virtual object 1568 and music change virtual object 1570 are environment-locked to respective locations and/or objects in the physical environment. In some embodiments, navigation goal virtual object 1568 is locked to tree 1572. In some embodiments, at FIG. 15E, computer system 700 is currently outputting audio media that is different from the next audio media ("SONG TITLE 1") in the queue for playback. In some embodiments, upon the viewpoint of the user reaching (e.g., and/or determined to be within a predetermined distance of) the location in the physical environment over which music change virtual object 1570 is overlaid, computer system 700 initiates playback of the next audio media ("SONG TITLE 1"). Thus, in some embodiments, computer system 700 chooses to display music change virtual object 1570 at the location at which music change virtual object 1570 is environment-locked in the physical environment based on movement of the viewpoint of the user and an expected end time of current media output (e.g., media that is output by one or more speakers before the next audio media ("SONG TITLE 1") in the queue is output). In embodiments where the viewpoint of the user was moving faster than it is moving at FIG. 15E, computer system 700 displays music change virtual object 1570 at (and environment-locks music change virtual object 1570 to) a location that is further away from user 720 in the physical environment (e.g., a location between route portion virtual objects 1564d and 1564c) (e.g., than the location music change virtual object 1570 in FIG. 15E). In embodiments where the viewpoint of the user was moving slower than it is moving at FIG. 15E, computer system 700 displays music change virtual object 1570 at (and environment-locks music change virtual object 1570 to) a location in the physical environment that is closer to user 720 (e.g., a location before route portion virtual object 1564a) (e.g., than the location music change virtual object 1570 in FIG. 15E). In some embodiments, the location and/or object at which music change virtual object 1570 is locked is changed based on changes in the speed of movement of the computer system).

Figures 15F, 15G:
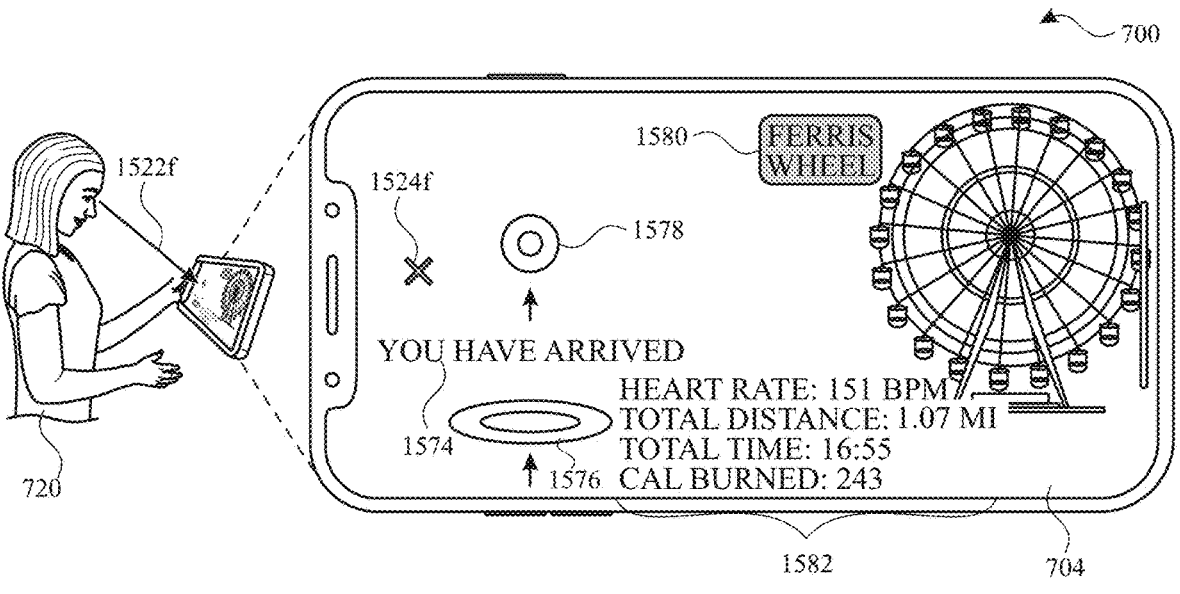

At FIG. 15F, a determination is made that computer system 700 and/or the viewpoint of the user has reached the destination (e.g., "FERRIS WHEEL"). As illustrated in FIG. 15F, in response to determining that the computer system 700 and/or the viewpoint of the user has reached the destination, computer system 700 displays arrival message virtual object 1574 ("YOU HAVE ARRIVED"), arrival point virtual object 1576 (e.g., which indicates the endpoint of the route to the destination), additional information virtual object 1578, destination information virtual object 1580 (e.g., which provides information concerning the destination, "FERRIS WHEEL"), and workout information virtual object 1582, which are environment-locked virtual objects. Physical activity information virtual object 1582 provides physical activity metrics that were detected while user 720 was traveling through the destination (e.g., in FIGS. 15B-15F), such as a detected heart rate, total distance traveled, total time traveled, and calories burned. At FIG. 15F, computer system 700 detects the gaze from the user changing from gaze direction 1522f (e.g., and being at gaze location 1524f on display 704) of FIG. 15F to gaze direction 1522g of FIG. 15G. Notably, at FIG. 15G, computer system 700 displays two directional arrows that indicate that a user should gaze at additional information virtual object 1578. In some embodiments, the two directional arrows are animated (e.g., blink and/or move). At FIG. 15G, computer system 700 detects the gaze of the user (e.g., in gaze direction 1522*g* and/or at gaze location 1524*g*) that is directed to additional information virtual object 1578 for a predetermined time (e.g., detects that user 720 has dwelled on additional information virtual object 1578).

Figure 15H:
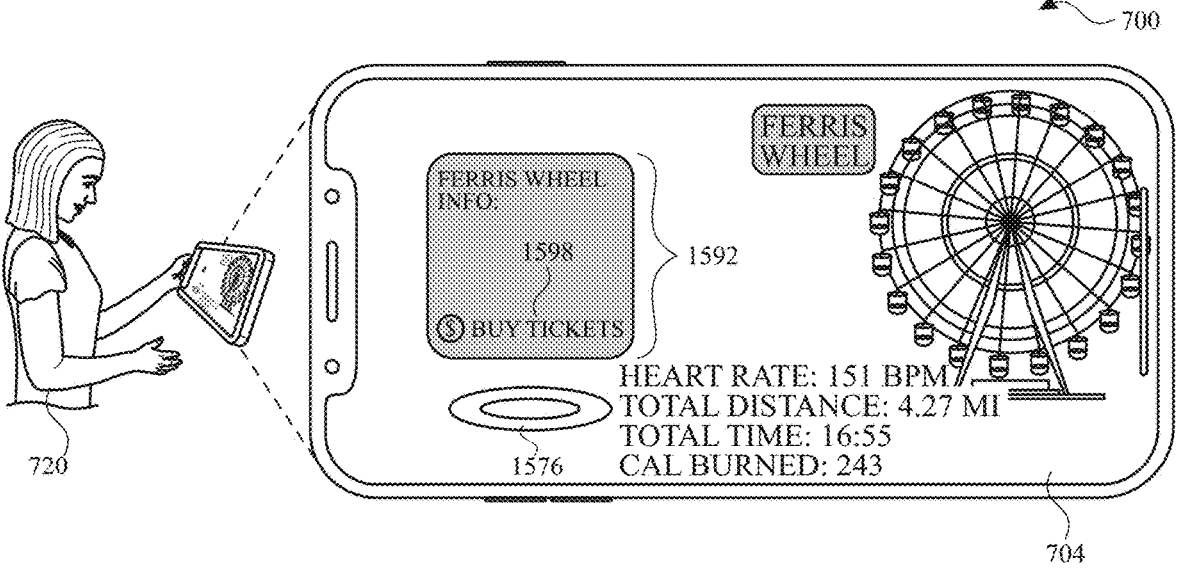

As illustrated in FIG. 15H, in response to detecting the gaze of the user has been directed to additional information virtual object 1578 for a predetermined time, computer system 700 displays information card virtual object 1592 above arrival point virtual object 1576 and ceases to display additional information virtual object 1578 and arrival message virtual object 1574. Information card virtual object 1592 contains additional information (e.g., "Ferris Wheel Info") concerning the destination and secure transaction virtual object 1598. The additional information can include one or more of historical facts, information for one or more upcoming events held at the destination, one or more applications to download for use at the destination, one or more social media tags for the destination, and/or one or more QR codes for the destination. In some embodiments, the additional information is scrollable. In some embodiments, in response to detecting selection (e.g., via a gaze-based input, an air input, and/or an input of a physical input mechanism) of secure transaction virtual object 1598, computer system 700 initiates a process to perform a secure operation and/or transaction (e.g., purchase tickets for the Ferris Wheel) that corresponds to the destination. In some embodiments, virtual objects for performing other secure operations and/or transactions are included on display 704 at FIG. 15H, such as authorizing the auto-filling of a password, confirming the downloading of an item (e.g., application, music, other files), sharing a list of contact and/or other personal information (e.g., providing identification), unlocking/locking an item or building, renting or borrowing an item (e.g., a bike, a card, and/or a scooter), purchasing a product (e.g., an electronic post card and/or another souvenir) that is associated with the destination, and/or signing up for an event (e.g., a parade and/or a festival) that will be held at the destination.

Additional descriptions regarding FIGS. 15A-15H are provided below in reference to method 1600 described with respect to FIGS. 15A-15H.

FIG. 16 is a flow diagram of an exemplary method 1600 for providing navigation guidance, in accordance with some embodiments. In some embodiments, method 1600 is performed at a computer system (e.g., computer system 101 in FIG. 1 and/or computer system 700) including a display generation component (e.g., display generation component 120 in FIGS. 1, 3, and 4) (e.g., a heads-up display, a display, a touchscreen, a projector, etc.). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 1600 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1600 are, optionally, combined and/or the order of some operations is, optionally, changed.

The computer system (e.g., 700) displays (e.g., 1602), via the display generation component, an augmented reality user interface that includes a first virtual object (e.g., 1562*a*-1562*c* and 1564*a*-1564*c*) (e.g., an environment-locked virtual object) that indicates (e.g., corresponds to) a first portion (e.g., 1562*a*-1562*e* for 1562 and/or 1564*a*-1564*e* for 1564) (e.g., a first direction of travel (e.g., turn right, turn left, and/or go straight, and/or make a U-turn) (e.g., north, south, cast, west, and/or any combination thereof) of a route (e.g., a navigation path) (e.g., a line, a set of circles in a line, and/or an arrow) (e.g., a portion of a route) to a destination (e.g., indicated by 1530*a*) (e.g., a physical destination and/or a destination in a physical environment) in the physical environment, where the first virtual object is overlaid on (e.g., over) a first location of the physical environment that is within a first area of a physical environment (e.g., as described above in relation to FIG. 15D-15E), where one or more areas (e.g., portions) (e.g., that includes the first area) of the physical environment are visible concurrently with the first virtual object.

After displaying the first virtual object (e.g., 1562*a*-1562*e* and 1564*a*-1564*c*), the computer system ceases to, via the display generation component, display the first virtual object (e.g., 1562*a*-1562*c* and 1564*a*-1564*c*) and displays (e.g., 1604), via the display generation component, a second virtual object (e.g., 1562*a*-1562*e* and 1564*a*-1564*c*) (e.g., an environment-locked virtual object) that indicates (e.g., corresponds to) the first portion (e.g., 1562*a*-1562*e* for 1562 and/or 1564*a*-1564*e* for 1564) of the route, where a second location of the physical environment at which the second virtual object (e.g., 1562*a*-1562*e* and 1564*a*-1564*c*) is overlaid on the physical environment relative to the first location of the physical environment at (e.g., over and/or overlaid on) which the first virtual object (e.g., 1562*a*-1562*e* and 1564*a*-1564*c*) was overlaid on the physical environment indicates a direction (e.g., left, right, straight, forwards, backwards, and/or U-turn) of travel along the route to the destination in the physical environment (e.g., as described above in relation to FIG. 15D). In some embodiments, the second virtual object is overlaid on the area of the physical environments. In some embodiments, the location at which the first virtual object is displayed is different from the location at which the second virtual object is displayed. In some embodiments, the first virtual object does not include the second virtual object. In some embodiments, the augmented reality user interface, the route, the first virtual object and/or the second virtual object are associated with (e.g., corresponds to) a maps application. In some embodiments, while continuing to display the first area of the augmented reality user interface, the computer system displays, via the display generation component, an animation (e.g., in the area of the one or more portions the route) that includes: at a first time during the animation, displaying, via the display generation component, the first virtual object and a third virtual object that indicates the first portion of the route without displaying, via the display generation component, the second virtual object; and at a second time during the animation (e.g., after the first time during the animation), displaying (and/or causing displaying), via the display generation component, the second virtual object and the third virtual object without display of the first virtual object. In some embodiments, the computer system displays, via the display generation component, an animation (e.g., in the area of the one or more portions the route) that includes: at a first time during the animation, displaying, via the display generation component, the first virtual object and a fourth virtual object that indicates the first portion of the route without displaying the second virtual object and/or a fifth virtual object that indicates the first portion of the route; and at a second time during the animation (e.g., after the first time during the animation), displaying (and/or causing display of), via the display generation component, the second virtual object and the fifth virtual object without display of the first virtual object and/or the fourth virtual object. After displaying the first virtual object, ceasing to, via the display generation component, display the first virtual object and displaying a second virtual object that indicates the first portion of the route, where a second location at which the second virtual object is overlaid on the physical environment relative to the first location at which the first virtual object was overlaid on the physical environment indicates a direction of travel along the route to the destination in the physical environment provides improved visual feedback concerning the direction of travel for the first portion of the route, which provides improved visual feedback.

In some embodiments, while displaying the second virtual object (e.g., 1562a-1562c and/or 1564a-1564c) (e.g., an environment-locked virtual object) overlaid on the second location of the physical environment, the computer system detects first movement of a viewpoint of a user (e.g., 704) (e.g., a first viewpoint of the first user) (and/or detecting movement of the computer system) (e.g., as described in relation to FIGS. 15D-15E). In some embodiments, the second location (e.g., at which the second virtual object is displayed) is within the first area of the physical environment. In some embodiments, in response to detecting the first movement of the viewpoint of the user, the computer system shifts a location of the second virtual object in the augmented reality user interface to continue to display, via the display generation component, the second virtual object overlaid on the second location of the physical environment (e.g., as described in relation to FIGS. 15D-15E). In some embodiments, the first virtual object is environment-locked to the location at which the first virtual object is overlaid on the physical environment and the second virtual object is environment-locked to the location at which the second virtual object is overlaid on the physical environment. In some embodiments, in accordance with a determination that the computer system and/or the viewpoint of the user has moved to area where the first area is not visible, the computer system ceases to display the second virtual object (or the first virtual object). Shifting a location of the second virtual object in the augmented reality user interface to continue to display, via the display generation component, the second virtual object overlaid on the second location of the physical environment in response to detecting first movement of the viewpoint of the user provides improved feedback to the user that display of the second virtual object is located to a location in the physical environment and/or one or more locations in the physical environment do not correspond to the route and/or the direction of travel along the route, which provides improved visual feedback.

In some embodiments, the computer system (e.g., 700) is not moving above a movement threshold (e.g., movement of less than 0.5 miles-per-hour, 1 MPH, or 2 MPH) (in some embodiments, determined to be not moving above the movement threshold) while the first virtual object (e.g., 1562a-1562e and/or 1564a-1564e) is displayed and while the second virtual object (e.g., 1562a-1562e and/or 1564a-1564e) is displayed (e.g., as described in relation to FIGS.

15D-15E and Table 1). In some embodiments, while the computer system continues to not be moving above the movement threshold and after displaying the second virtual object, the first virtual object and the second virtual object are sequentially displayed, again. In some embodiments, the first virtual object and the second virtual object are displayed during a first period of time while the computer system is at a third location in the physical environment. In some embodiments, determined to be not moving above the movement threshold. In some embodiments, after displaying, via the display generation component, the computer system ceases to display the first virtual object and displays the second virtual object that indicates the first portion of the route, during a second period of time while the computer system is at the third location in the physical environment, the computer system: displays, via the display generation component, the first virtual object to be overlaid on the first location of the physical environment (e.g., without displaying the second virtual object) and ceases to display the second virtual object: and after displaying the first virtual object overlaid on the first location and ceasing to display the second virtual, the computer system ceases to display, via the display generation component, the first virtual object and displays, via the display generation component, the second virtual object to be overlaid on the second location of the physical environment (e.g., the location at which the second virtual object is displayed). In some embodiments, the second location of the physical environment at which the second virtual object is overlaid on the physical environment relative to the first location of the physical environment at which the first virtual object was overlaid on the physical environment indicates the direction of travel along the route to the destination in the physical environment. Displaying the first virtual object and the second virtual object while the computer system is not moving above a threshold provides the user with visual feedback concerning the direction of travel along the route when the computer system has not moved and/or moved very little, which provides improved visual feedback.

In some embodiments, while displaying the first virtual object (e.g., 1562a-1562e and/or 1564a-1564c) (and/or, in some embodiments, while displaying the second virtual object), the computer system (e.g., 700 and/or viewpoint) is moving (and/or, in some embodiments, is determined to be moving) at a first speed (e.g., as described in relation to FIGS. 15D-15E). In some embodiments, the first location of the physical environment at which the first virtual object is overlaid on the physical environment and the second location of the physical environment at which the second virtual object is overlaid on the physical environment are separated by a first distance. In some embodiments, the second virtual object is displayed a first amount of time after first virtual object is displayed (and/or, in some embodiments, after the first virtual object ceases to be displayed). In some embodiments, the first distance is greater than a distance that would be traversed by the computer system while moving at the first speed for the first amount of time (e.g., as described in relation to FIGS. 15D-15E).

In some embodiments, while displaying the first virtual object (e.g., 1562a-1562e and/or 1564a-1564c) that is overlaid on the first location of the physical environment and/or displaying the second virtual (e.g., 1562a-1562e and/or 1564a-1564c) object that is overlaid on the second location of the physical environment, detecting second movement of a viewpoint of a user (e.g., a second viewpoint of the first user) (and/or detecting movement of the computer system from a third location in the physical environment to a fourth location in the physical environment) (e.g., as described above in relation to FIG. 15E). In some embodiments, in response to detecting the second movement of the viewpoint of the user, the computer system ceases to display, via the display generation component, one or more virtual objects (e.g., 1562a-1562e and/or 1564a-1564c) that indicate the first portion of the route (e.g., as described above in relation to FIG. 15E) (and/or one or more objects that indicate any portion of the route). In some embodiments, in response to detecting the second movement of the viewpoint of the user and/or the movement of the computer system from the third location to the fourth location, the first area of the physical environment is visible and a third area of the physical environment that includes the fourth location is visible (e.g., within a viewpoint of the user) without displaying the first virtual object and/or the second virtual object while the first area of the physical environment is not (and/or caused to be) visible (and/or the second area of the physical environment is visible). In some embodiments, the in response to the second movement of the viewpoint of the user and/or detecting movement of the computer system from the third location to the fourth location, the second area is visible but no virtual objects that indicates the first portion of the route are displayed. Ceasing to display one or more virtual objects that indicates the first portion of the route in response to detecting the second movement of the viewpoint of the user provides feedback to the user that the first portion of the route has been completed and is being completed, which provides improved visual feedback.

In some embodiments, after displaying the first virtual object (e.g., 1562a-1562c) that is overlaid on the first location of the physical environment and/or displaying the second virtual object (e.g., 1562a-1562c) that is overlaid on the second location of the physical environment, the computer system detects third movement of the viewpoint of the user (and/or detecting movement of computer system from a fifth location in the physical environment to a sixth location in the physical environment). In some embodiments, in response to detecting the third movement of the viewpoint of the user (e.g., to a sixth location) (and/or detecting movement of computer system from a fifth location in the physical environment to a sixth location in the physical environment) (and, in some embodiments, in accordance with a determination that the sixth location is later in the route than the s portion of the route and/or in accordance with a determination that the sixth location is within a predetermined threshold distance from the second portion of the route (and/or locations in the physical environment that correspond to the second portion of the route): the computer system displays, via the display generation component, a first respective virtual object (e.g., 1564a-1564c) that indicates a second portion (e.g., 1564) of the route. In some embodiments, the second portion of the route is different from (e.g., indicates a different direction of travel along that route than the first portion) the first portion (e.g., 1562) of the route. In some embodiments, after displaying the first respective virtual object that indicates the second portion of the route, the computer system ceases to display, via the display generation component, the first respective virtual object (e.g., 1564a-1564c) that indicates the second portion of the route and displaying, via the display generation component, a second respective virtual object (e.g., 1564a-1564e) that indicates the second portion of the route. In some embodiments, a location at which the second respective virtual object is overlaid on the physical environment relative to a location at which the first respective virtual object was overlaid on the physical information indicates a second direction of travel along the route to the destination (e.g., as indicated by 1530a) in the physical environment. In some embodiments, the second direction of travel is different from the first direction of travel. In some embodiments, in response to detecting movement of the viewpoint of the user and/or movement of the computer system from the fifth location to the sixth location and in accordance with a determination that the sixth location is not later in the route than the fourth portion of the route and/or in accordance with a determination that the sixth location is not within the predetermined threshold distance from the second portion of the route, the computer system forgoes displaying the first virtual object that indicates the second portion of the route and/or the second virtual object that indicates the second portion of the route. Displaying, via the display generation component, various respective virtual object that indicates a second portion of the route in response to detecting third movement of the viewpoint of the user provides visual feedback of concerning the second direction of travel for the route (e.g., for the second portion of the route), which provides improved visual feedback.

In some embodiments, the computer system is in communication with one or more microphones, the method further includes: before displaying the augmented reality user interface that includes the first virtual object that indicates the first portion of the route to the destination in the physical environment, the computer system detects, via the one or more microphones, a voice command (e.g., 1550a) that includes a request to initiate a navigation guidance process.

In some embodiments, the computer system is in communication with one or more microphones, the method further includes: in response to detecting the voice command, initiating the navigation guidance process. In some embodiments, the navigation process includes displaying, via the display generation component, the augmented reality user interface (e.g., as described in relation to FIGS. 15A-15B) (e.g., in response to a request to travel from a starting location in the physical environment to a destination location). Initiating the navigation guidance process in response to detecting the voice command provides additional control over the computer system such that the navigation process can be initiated based on a voice command, which provides additional control options without cluttering the user interface.

In some embodiments, before displaying the augmented reality user interface that includes the first virtual object that indicates the first portion of the route to the destination in the physical environment, the computer system detects a first request (e.g., 1550a) to initiate navigation guidance (e.g., directions) to the destination (e.g., as described above in relation to FIG. 15A). In some embodiments, in response to detecting the first request to navigation guidance to the destination (e.g., before, while, and/or after displaying a respective portion of a respective route), the computer system displays, via the display generation component, a set of one or more virtual objects (e.g., 1530) (e.g., a map of the route, the name of the destination, the estimated time to the destination, and/or the estimated distance to the destination) that indicate a preview of the route (e.g., 1530d) (and, in some embodiments, the entire route). In some embodiments, the preview of the route (e.g., 1530d) includes the first portion of the route and one or more other portions of the route. Displaying, via the display generation component, a virtual object that indicates a preview of the route in response to detecting the first request to navigation guidance to the destination provides visual feedback concerning the route to the destination, which provides improved visual feedback.

In some embodiments, before displaying the augmented reality user interface that includes the first virtual object that indicates the first portion of the route to the destination in the physical environment, the computer system detects a second request (e.g., 1550a and/or 1550b) to initiate navigation guidance to the destination. In some embodiments, in response to detecting the second request to initiate navigation guidance to the destination (e.g., before, while, and/or after displaying a respective portion of a respective route), the computer system displays, via the display generation component, an option (e.g., a virtual object) to initiate navigation guidance (e.g., as described above in relation to FIGS. 15A-15C). In some embodiments, while displaying the option to initiate navigation guidance, the computer system detects selection (e.g., selection via one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, voice inputs (e.g., voice commands) and/or any combination thereof) (and, in some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand)) of the option to initiate navigation guidance (e.g., as described above in relation to FIGS. 15A-15C). In some embodiments, in response to detecting selection of the option to initiate navigation guidance, the computer system displays, via the display generation component, one or more virtual objects (e.g., 1562a-1562e) that indicate one or more portions of the route (e.g., as described above in relation to FIGS. 15A-15D). Displaying, via the display generation component, an option to initiate navigation guidance in response to detecting the second request to initiate navigation guidance to the destination provides an additional control option to initiate navigation guidance to the destination, which provides additional control options without cluttering the user interface.

In some embodiments, the computer system is in communication with a first set of gaze tracking sensors. In some embodiments, the method includes: detecting selection of the option to initiate navigation guidance includes the computer system detecting, via the first set of gaze tracking sensors, a gaze (e.g., 1522b and 1524b) of a user of the computer system at a first respective location on the augmented reality user interface for longer than a first predetermined period of time (e.g., 0.1-5 seconds). Detecting, via the first set of gaze tracking sensors, a gaze of a first user of the computer system at a first respective location on the augmented reality user interface for longer than a first predetermined period of time as a part of detecting selection of the option to initiate navigation guidance provides an additional control option to initiate navigation guidance to the destination using gaze, which provides additional control options without cluttering the user interface.

In some embodiments, before displaying the augmented reality user interface that includes the first virtual object that indicates the first portion of the route to the destination in the physical environment, the computer system detects a third request (e.g., 1522b) to initiate navigation guidance to the destination. In some embodiments, the third request is detected in response to detecting one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand)). In some embodiments, the method includes: in response to detecting the third request to initiate navigation guidance to the destination (e.g., before, while, and/or after displaying a respective portion of a respective route), the computer system displays, via the display generation component, information (e.g., 1510a-1510b) (e.g., one or more virtual objects) that provides an overview (e.g., an introductory overview) of the route (e.g., time to destination, distance, and/or status information (e.g., information concerning speed traps, accidents, weather, information concerning other destinations along the route, and/or traffic (e.g., current, future, previous traffic conditions))). Displaying, via the display generation component, information provides an overview of the route response to detecting the third request to initiate navigation guidance to the destination provides feedback concerning the route, which provides improved visual feedback In some embodiments, the computer system has a first edge (e.g., 1560) (and, in some embodiments, the first edge includes a plurality of light-emitting diodes) (e.g., and, in some embodiments, the first edge is a first user interface region and/or a surface). In some embodiments, the direction of travel along the first portion route to the destination in the physical environment is indicated by transitioning the first edge from a first visual state to a second visual state (e.g., as described above in relation to FIG. 15D) (e.g., in the second visual state the edge is brighter than the edge in the first visual state, in the second visual state the edge is a different color than the edge in the first visual state) (and/or activating the plurality of light-emitting diodes) (e.g., in a pattern). In some embodiments, in accordance with a determination that the direction of travel along the first portion route is a first respective direction, the light-emitting diodes are activated and/or deactivated in a first pattern: and in accordance with a determination that the direction of travel along the first portion route is a second respective direction that is different from the first respective direction, the light-emitting diodes are activated and/or deactivated in a second pattern that is different from the first pattern.

In some embodiments, after displaying the second virtual object, the computer system detects an indication that a user of the computer system has arrived at the destination (in some embodiments, completed the route) (e.g., as described in relation to FIGS. 15E-15F); and in some embodiments, the computer system receives the indication that a user has completed the route because a determination is made that a detected location (and/or a current location) of the computer is within a threshold distance and/or at the location of the destination. In some embodiments, the method includes: in response to detecting the indication that the user has arrived at the destination, the computer system displays, via the display generation component, information (e.g., 1582) (e.g., one or more virtual objects) that indicates one or more physical activity metrics (e.g., an amount of time taken to complete the route, average (and/or maximum and/or minimum) speed (and/or acceleration), amount of calories burned during the physical activity (e.g., running, swimming, walking, swimming, and/or yoga)) (in some embodiments, the physical activity is tracked via one or more activity sensors in communication with the computer system) corresponding to the route. Displaying, via the display generation component, information that indicates physical activity performed while the third user completed the route provides feedback to the user concerning the physical activity performed while the route was being detected (e.g., at a relevant time), which provides improved visual feedback at the end of the navigation.

In some embodiments, after displaying the second virtual object (e.g., 1562a-1562e and 1564a-1564c), the computer system detects an indication that a user of the computer system has arrived at the destination (e.g., as described above in relation to FIGS. 15F-15H). In some embodiments, after (or in response to) detecting the indication that the user has arrived at the destination, the computer system displays, via the display generation component, first information (e.g., 1580 and/or 1592) (e.g., historical and/or relevant facts concerning the destination and/or event/products that correspond to the destination) concerning the destination (e.g., as described above in relation to FIGS. 15F-15H). In some embodiments, the first information is overlaid on the physical environment, and, optionally locked to a location and/or object in the physical environment (e.g., an environment-locked virtual object) and/or selected based on what portions of the physical environment are visible from the viewpoint of the user. Displaying, via the display generation component, first information concerning the destination after detecting the indication that the fourth user arrived at the destination provides feedback about information concerning the destination (e.g., at a time that can be relevant to the user), which provides improved visual feedback.

In some embodiments, the first information (e.g., 1580 and/or 1592) concerning the destination is displayed in response to detecting the gaze (e.g., 1522g) of the user at a third location (e.g., 1524g) on the augmented reality user interface (and, in some embodiments, for longer than a respective period of time). In some embodiments, the computer system is in communication with a third set of gaze tracking sensors. In some embodiments, before displaying, via the display generation component, first information concerning the destination and after detecting the indication that the user has completion of the route, the computer system detects, via the third set of gaze tracking sensors, a gaze of a user at a third location on the augmented reality user interface.

In some embodiments, a virtual object for displaying information (e.g., 1578) concerning the destination is displayed at the third location in the augmented reality user interface. In some embodiments, the method includes: while displaying the virtual object for information (e.g., 1578) concerning the destination is displayed at the third location in the augmented reality user interface, the computer system detects selection (e.g., 1522g and 1524g) of the virtual object for displaying information concerning the destination. In some embodiments, detecting of the virtual object for displaying information includes detecting one or more gaze-based inputs, air gestures (e.g., a hand input (e.g., as described in relation to method 1200), physical inputs (e.g., a tap input, a swipe input, a rotation input, a dragging input, and/or a flicking input) on the computer system and/or on one or more external devices and/or peripheral devices, and/or any combination thereof) (and, in some embodiments, the air gestures are detected by a camera that is in communication with the computer system and/or one or more body worn sensors (e.g., sensors on a watch (e.g., a heart rate sensor and/or a gyroscope)) monitoring the movement of a body part (e.g., hand)). In some embodiments, the method includes: in response to detecting the virtual object for displaying information concerning the destination, the computer system displays, via the display generation component, a virtual object (e.g., 1592) that includes information (e.g., historical information, factual information, information concerning one or more events and/or secure transactions that can be performed and/or that are related to the destination) concerning the destination. In some embodiments, in response to detecting the virtual object for displaying information concerning the destination, the computer system ceases to display the virtual object for displaying information concerning the destination. In some embodiments, the computer system displays the virtual object that includes information concerning the destination at the third location in the augmented reality user interface and/or at a fourth location in the augmented reality user interface that is near (e.g., less than 0.1-0.5 meters above, below, to the right, and/or to the left) the third location.

In some embodiments, after displaying the second virtual object, the computer system detects an indication that a fifth user has completed of the route (e.g., as described above in relation to FIG. 15H). In some embodiments, after (or in response to) detecting the indication that the user has completion of the route, the computer system displays, via the display generation component, first information (e.g., 1598) that prompts a user to perform a secure transaction (e.g., pay for tickets and/or to enter/participate in event corresponding to destination) with an entity that is associated with (e.g., entity holding an event being held at the destination and/or a product (e.g., a book) that is related to the destination and/or a particular historical and/or cultural fact about the destination, and/or an application download that concerns the destination) (e.g., unlocking and/or locking a car or bike rental, unlocking or locking a door, providing identification, and/or borrowing and/or checking in/out a book (e.g., from a book store and/or library) that is associated with the entry and/or destination). Displaying, via the display generation component, first information that prompts a user to perform a secure transaction after displaying, via the display generation component, first information that prompts a user to perform a secure transaction provides feedback that a secure transaction can be perform and provides an addition control option for the user to perform the secure operation, which provides improved visual feedback and provides additional control options without cluttering the user interface.

In some embodiments, after (and/or while) displaying the first virtual object (e.g., 1562a-1562c and/or 1564a-1564c), the computer system displays a virtual object (e.g., 1568) (e.g., an environment-locked virtual object) that indicates a goal for completing the route (e.g., a distance marker (e.g., distance markers indicating a distance associated with the route (e.g., a distance traveled since the start of the route and/or a distance remaining to complete the route)), a finish line, an estimated remaining time of travel to the destination, and/or a destination virtual object that indicates arrival at the destination when a point is reached) and that is overlaid on a location in a third area, different from the first area, of the physical environment (e.g., as described above in relation to FIG. 15E). In some embodiments, while displaying the virtual object that indicates the goal for completing the route (and while displaying the first virtual object and/or the second virtual object) overlaid on the location in the third area of the physical environment, the computer system detects fourth movement of a viewpoint of a user (and/or detecting movement of the computer system in the physical environment) (e.g., as described above in relation to FIG. 15E); and in response to detecting the fourth movement of the viewpoint of the user, the computer system shifts, via the display generation component, a location of the virtual object that indicates the milestone in the augmented reality user interface to continue to display the virtual object that indicates the milestone overlaid on the location in the third area of the physical environment (e.g., as described above in relation to FIG. 15E). In some embodiments, the virtual object that indicates the goal for completing the route is locked to a location of the physical environment. Displaying a virtual object that indicates the goal for completing the route and that is overlaid on a location in a third area of the physical environment and continuing display the virtual object overlaid on the location in the third area of the physical environment in response to detecting fourth movement of the viewpoint of the user provides visual feedback that the virtual object is relevant to the location in the third area of the physical environment (e.g., the goal will be completed when the location in the third area is reached), which provides improved visual feedback.

In some embodiments, the computer system is in communication with one or more audio output devices. In some embodiments, the method includes: while the computer system is outputting, via the one or more audio output devices, of first audio media (e.g., a song and/or a chapter of an audiobook) (e.g., as described above in relation to FIG. 15E): displaying, via the display generation component, an audio transition virtual object (e.g., 1570) (e.g., an environment-locked virtual object) that is overlaid on a first location (e.g., of the physical environment) that is in a fourth area, different from the first area, of the physical environment. In some embodiments, the audio transition virtual object indicates a point along the route at which the computer system will transition (e.g., is predicted to transition) from outputting audio output of the first audio media to outputting second audio media, different from the first audio media (e.g., as described above in relation to FIG. 15E). In some embodiments, while displaying the audio transition virtual object, the computer system detects fifth movement of a viewpoint of a user (and/or detecting movement of the computer system in the physical environment) (e.g., as described above in relation to FIG. 15E). In some embodiments, in response to detecting the fifth movement of the viewpoint of the user, the computer system shifts, via the display generation component, a location of the audio transition virtual object in the augmented reality user interface to continue displaying the audio transition virtual object overlaid on the first location in the fourth area of the physical environment (e.g., as described above in relation to FIG. 15E). In some embodiments, after (and/or while) displaying the first virtual object, the computer system displays a virtual object that indicates audio media that will be (and/or currently being) output by the one or more speakers and that is overlaid on a location in a fourth area, different from the first area, of the physical environment. In some embodiments, while displaying the virtual object that indicates the sound that will be output by the one or more speakers (and/or that indicates a song change) (e.g., when the computer system is detected to within a predetermined distance (e.g., 0-5 meters) of the virtual object) overlaid on the location in the fourth area, the computer system detects movement of a viewpoint of a user and/or the computer system. In some embodiments, in response to detecting movement of a viewpoint of a user and/or the computer system, the computer system continues to display the virtual object that indicates the sound that will be output by the one or more speakers overlaid on the location in the fourth area of the physical environment. Shifting a location of the audio transition virtual object in the augmented reality user interface to continue displaying the audio transition virtual object overlaid on the first location in the fourth area of the physical environment in response to detecting the fifth movement of the viewpoint of the user provides visual feedback that the virtual object is relevant to the location in the fourth area of the physical environment (e.g., the sound will be played when the first location in the fourth area is reached), which provides improved visual feedback.

In some embodiments, displaying, via the display generation component, the audio transition virtual object (e.g., 1570) that is overlaid on the first location in the fourth area of the physical environment includes: the computer system selecting the location in the fourth area based on the fifth movement of the viewpoint of the user and an expected end time of the first audio media (e.g., the current audio media) (e.g., end of a track for a current song) (e.g., so that the computer system and/or the viewpoint of the user reaches the location of the virtual object that indicates the second that will be output by the one or more speakers within a predetermined period of time (e.g., 0-5 seconds) after the one or more speakers are transition from outputting a previous sound to outputting the new sound) (e.g., as described above in relation to FIG. 15E).

In some embodiments, in accordance with a determination that a respective location in the first area is included in the first portion of the route in the physical environment: in accordance with a determination that a physical object (e.g., 1566) (e.g., a plant, a tree, a car, and/or a median) (e.g., a stationary object and/or a non-station object) is located at the respective location in the first area, the second location (at (e.g., over and/or overlaid on) which the second virtual object is overlaid on the physical) is a location (e.g., a location that is near but not on and/or over the physical object) that is different from the respective location in the first area (e.g., as described above in relation to FIG. 15E). In some embodiments, in accordance with a determination that a respective location in the first area is included in the first portion of the route in the physical environment: in accordance with a determination that the physical object is not located at the respective location in the first area, the second location is the respective location (e.g., as described above in relation to FIG. 15E). In some embodiments, one or more virtual objects that are displayed to indicate the direction of travel are not overlaid on one or more objects within the field-of-view of the one or more cameras. In some embodiments, a virtual object may be displayed in a different location based on whether there is a concurrent object in the physical environment that corresponds to the respective location.

In some embodiments, while displaying the first virtual object, the computer system displays, via the display generation component, a third virtual object (e.g., 1562a-1562c and/or 1564a-1564c) (e.g., an environment-locked virtual object) that indicates the first portion of the route. In some embodiments, the third virtual object overlaid on a seventh location within the first area of the physical environment. In some embodiments, the third virtual object is different from (e.g., separate from and/or distinct from). In some embodiments, after ceasing to display the first virtual object (e.g., 1562a-1562e and/or 1564a-1564c), the computer system displays, via the display generation component, the third virtual object with concurrently the second virtual object (e.g., 1562a-1562e and/or 1564a-1564e). After ceasing to display the first virtual object concurrently with the third virtual object, displaying, via the display generation component, the third virtual object with concurrently the second virtual object provides improved visual feedback concerning the direction of travel for the first portion of the route, which provides improved visual feedback.

In some embodiments, a direction of travel from the first location on which the first virtual object (e.g., 1562a-1562e and/or 1564a-1564e) is overlaid to the seventh location on which the third virtual object (e.g., 1562a-1562e and/or 1564a-1564e) is overlaid indicates a first direction of travel along the first portion of the route (e.g., the direction of travel along the route). Displaying, via the display generation component, a third virtual object that indicates the first portion of the route while displaying the first virtual object, where a direction of travel from the first location on which the first virtual object is overlaid to the seventh location on which the third virtual object is overlaid indicates a first direction of travel along the first portion of the route, provides improved visual feedback concerning the direction of travel for the first portion of the route, which provides improved visual feedback.

In some embodiments, a direction of travel from the seventh location on which the third virtual object (e.g., 1562a-1562e and/or 1564a-1564e) is overlaid to the second location on which the second virtual object (e.g., 1562a-1562e and/or 1564a-1564e) is overlaid indicates a second direction of travel along the first portion of the route (e.g., the direction of travel along the route) (e.g., same direction as the first direction of travel along the first portion of the route discussed above). Displaying, via the display generation component, the third virtual object with the second virtual object, where a direction of travel from the seventh location on which the third virtual object is overlaid to the second location on which the second virtual object is overlaid indicates a second direction of travel along the first portion of the route, provides improved visual feedback concerning the direction of travel for the first portion of the route, which provides improved visual feedback.

In some embodiments, after (and/or while) displaying the first virtual object, the computer system displays, via the display generation component, a virtual object (e.g., as described above in relation to FIGS. 15D-15E) (e.g., an environment-locked virtual object) that indicates a direction for an upcoming navigation event (e.g., an arrow that indicates a navigation event, such as turn left, turn right, sharp left, sharp right, and/or make a U-turn) and that is overlaid on a location (e.g., of the physical environment) in a fifth area, different from the first area, of the physical environment (e.g., as described above in relation to FIGS. 15D-15E). In some embodiments, while displaying the virtual object that indicates the direction for the upcoming navigation event overlaid on the location in the fifth area of the physical environment, the computer system detects sixth movement of a viewpoint of a user (and/or movement of the computer system in the physical environment) (e.g., as described above in relation to FIGS. 15D-15E); and in response to detecting the sixth movement of the viewpoint of the user, the computer system shifts a location of the virtual object that indicates the direction for the upcoming navigation event in the augmented reality user interface to continue to display the virtual object that indicates the direction for the upcoming navigation event overlaid on the location in the fifth area of the physical environment (e.g., as described above in relation to FIGS. 15D-15E). In some embodiments, the virtual object that indicates the direction for the upcoming navigation event is locked to a location of the physical environment. Continuing display the virtual object that indicates the direction for the upcoming navigation event overlaid on the first location in the fifth area of the physical environment in response to detecting movement of the computer system provides visual feedback that the virtual object is relevant to the location in the fifth area of the physical environment (e.g., the navigation event relevant (e.g., will be completed and/or will need to start being completed) completed when the location in the first area is reached), which provides improved visual feedback.

In some embodiments, aspects/operations of methods 800, 1000, 1200, 1800, 2000, 2200, 2400, 2600, 2800, 3000, and 3200 may be interchanged, substituted, and/or added with the steps of method 1600. For example, method 1600 can be used to provide navigation guidance at a computer system that can be navigated using method 1200. For brevity, these details are not repeated here.

FIGS. 17A-17F illustrate example techniques for displaying virtual objects associated with an external device, in accordance with some embodiments. FIG. 18 is a flow diagram of methods for displaying virtual objects associated with an external device, in accordance with some embodiments. The user interfaces in FIGS. 17A-17F are used to illustrate the method in FIG. 18.

Figure 17A:
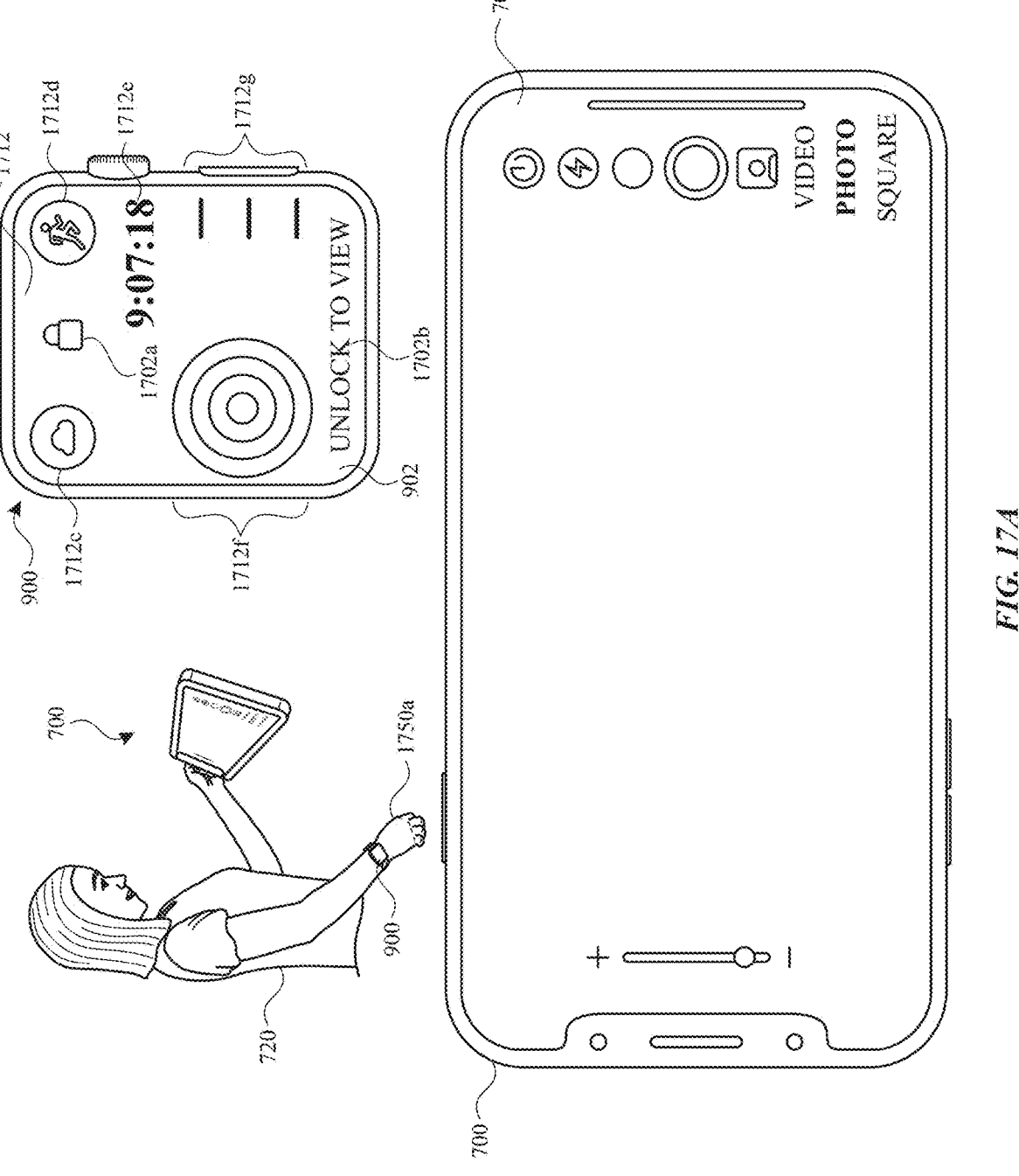
FIGS. 17A-17F illustrate example techniques for displaying virtual objects associated with an external device, in accordance with some embodiments.

FIG. 17A illustrates user 720 holding computer system 700 and wearing external device 900. Computer system 700 and external device 900 are positioned in a physical environment. As illustrated in FIG. 17A, computer system 700 includes display 704, and external device 900 includes display 902. As illustrated in FIG. 17A, external device 900 is not visible on display 704, and user 720 is not looking at external device 900. At FIG. 17A, a representation of the physical environment (e.g., via a camera application) is visible on display 704. While computer system 700 is a phone in FIG. 17A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 17A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the following description below will describe FIGS. 17A-17F with respect to computer system 700 having a transparent display and displaying one or more virtual objects overlaid on the physical environment that "passes through" the transparent display of computer system 700. In some embodiments, computer system 700 and external device 900 include one or more features as described above in relation to FIGS. 9A-9G (e.g., including displaying how computer system 700 can present an AR environment via display 704 using one or more different techniques).

As illustrated in FIG. 17A, external device 900 is displaying (e.g., via display 902) watch user interface 1712 that includes weather application user interface object 1712c, fitness application user interface object 1712d, time indication 1712e, dynamic information area 1712f, and dynamic information area 1712g. At FIG. 17A, external device 900 is in a locked state (e.g., as indicated by lock indications 1702a and 1702b ("Unlock to View") being displayed on user interface 1712). While external device 900 is in a locked state, computer system 700 prevents access to certain information and/or applications until a user is successfully authenticated and/or while computer system 700 is unlocked. At FIG. 17A, computer system 700 detects movement input 1750a that corresponds to movement of external device 900, where user 720 is raising external device 900 from the position of external device 900 in FIG. 17A to the position of external device 900 in FIG. 17B.

Figure 17B:
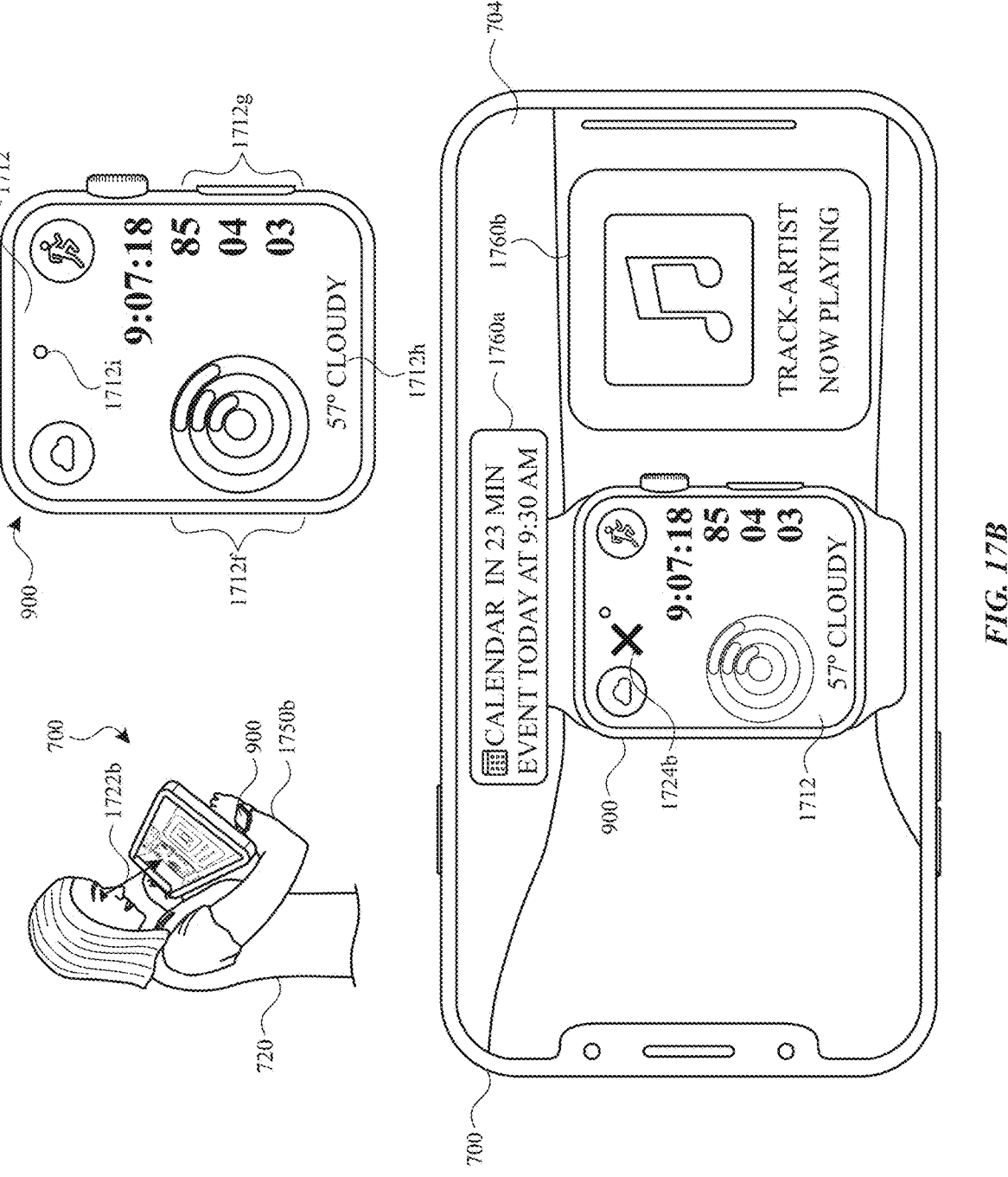

At FIG. 17B, after external device 900 is moved (and/or while external device 900 is being moved), a determination is made that the attention of the user is directed to external device 900 (and/or to the representation of external device 900 that is visible on display 704). At FIG. 17B, the determination is made that the attention of the user is directed to external device 900 because computer system 700 has detected that the gaze of user 720 is in gaze direction 1722b and at gaze location 1724b on display 704, which corresponds to external device 900. It should be understood that gaze location 1724b is not necessarily displayed by computer system 700 or on display 704 and is being shown to aid the discussion herein. In some embodiments, the determination is made that the attention of the user is directed to external device 900 because external device 900 is within the field-of-view of one or more cameras of computer system 700. In some embodiments, the determination is made that the attention of the user is directed to external device 900 because external device 900 is visible (e.g., being passed-through) on display 704 (e.g., irrespective of and/or in addition detecting that the gaze of user 720 in gaze direction 1722b and at gaze location 1724b on display 704 is directed to external device 900). In some embodiments, the determination is made that the attention of the user is directed to external device 900 because external device 900 is within the viewpoint of the user. In some embodiments, the determination is made that the attention of the user is directed to external device 900 after computer system 700 has been moved, without external device 900 being moved, and/or after computer system 700 and external device 900 have been moved.

At FIG. 17B, because the determination was made that the attention of the user is directed to external device 900 while external device 900 was in the locked state, external device 900 is transitioned from the locked state to the unlocked state. In some embodiments, because the determination was made that the attention of the user is directed to external device 900 while external device 900 was in the locked state, computer system 700 sends an instruction to the external device 900 that causes external device 900 to be transitioned to the unlocked state. In some embodiments, computer system 700 sends the instruction to one or more other computer systems, such as a server, and the one or more other computer systems sends the instruction (or another instruction) to external device 900 that causes external device 900 to be transitioned to the unlocked state. In some embodiments, external device 900 is not transitioned from the locked state to the unlocked state because a determination is made that external device 900 is not associated with or logged into the same account (e.g., a user account) as computer system 700 (e.g., irrespective of whether the determination was made that the attention of the user is directed to external device 900 while external device 900 was in the locked state). In some embodiments, after a determination is made that the attention of the user is directed to external device 900 while external device 900 was in the locked state, external device 900 is not transitioned from the locked state to the unlocked state.

As illustrated in FIG. 17B, external device 900 displays an unlocked user interface and updates dynamic information area 1712f and dynamic information area 1712g (e.g., while external device 900 is in the unlocked state) to display additional information (e.g., protected and/or secure information) that was not displayed while external device 900 was in the locked state. Moreover, as illustrated in FIG. 17B, external device 900 ceases to display lock indications 1702a and 1702b of FIG. 17A because external device 900 is not in the locked state. Thus, detecting that the attention of the user is directed to external device 900 while external device 900 is in a locked state provides successful authentication for a secure operation to be performed (e.g., device 900 to be unlocked, as shown in FIGS. 17A-17B). As illustrated in FIG. 17B, computer system 700 displays calendar application virtual object 1760a and music application virtual object 1760b around (and/or near or adjacent to) the representation of external device 900 that is visible on display 704. Calendar application virtual object 1760a and music application virtual object 1760b provide status information for a respective application that is associated with external device 900 (and/or computer system 700). For example, calendar application virtual object 1760a provides status information (e.g., concerning an upcoming calendar event) concerning a calendar application that is currently running on external device 900, and music application virtual object 1760b provides status information (e.g., concerning music ("Track-Artist") that is currently playing on external device 900). In some embodiments, one or more other virtual objects that provide status information are displayed around the representation of external device 900 that is visible on display 704, such as one or more virtual objects that provide information concerning notifications (e.g., from a notifications application), and/or one or more fitness activities and/or workouts (e.g., from a fitness application). In some embodiments, computer system 700 displays one or more virtual objects that correspond to an application that is actively running (e.g., running in the foreground and/or background) on computer system 700. In some embodiments, computer system 700 displays one or more virtual objects that correspond to an application that is a recently used application and/or an application that was running (e.g., running in the foreground and/or background) on computer system 700. In some embodiments, computer system 700 ceases to display one or more virtual objects around external device 900 when a determination is made that the gaze of the user is no longer directed to and/or is not directed to external device 900 (and, in some embodiments, external device 900 continues to be in the unlocked state). In some embodiments, computer system 700 continues to display one or more virtual objects around external device 900 when a determination is made that the gaze of the user is no longer directed to and/or is not directed to the representation of external device 900 that is displayed on display 704. In some embodiments, after a determination is made that the attention of the user is directed to external device 900 while external device 900 was in the locked state, computer system 700 does not display one or more virtual objects around external device 900. In some embodiments, one or more of the virtual objects (e.g., calendar application virtual object 1760*a* and music application virtual object 1760*b*) are locked to the representation of external device 900 on display 704, such that the one or more virtual objects follow the representation of the external device 900 as external device 900 is moved (e.g., right, left, up, down, backward, forward, and/or any combination thereof). In some embodiments, computer system 700 maintains a relative distance (e.g., 0.1-5 meters) between the one or more virtual objects and the representation of external device 900. In some embodiments, computer system 700 maintains the relative distance between the one or more virtual objects and the representation of external device 900 while and/or after computer system 700 and/or external device 900 is being moved.

Figure 17C:
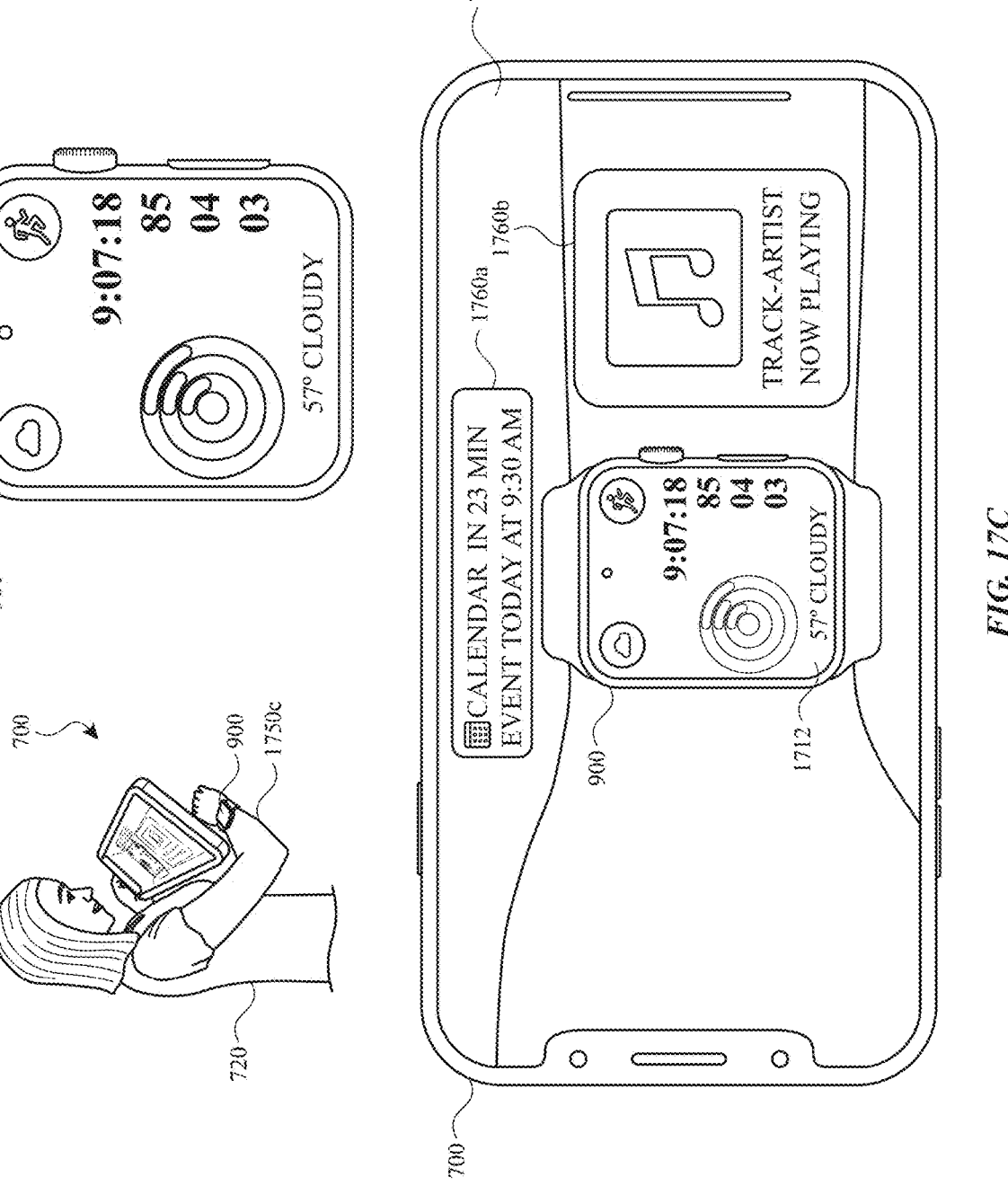
Figure 17D:
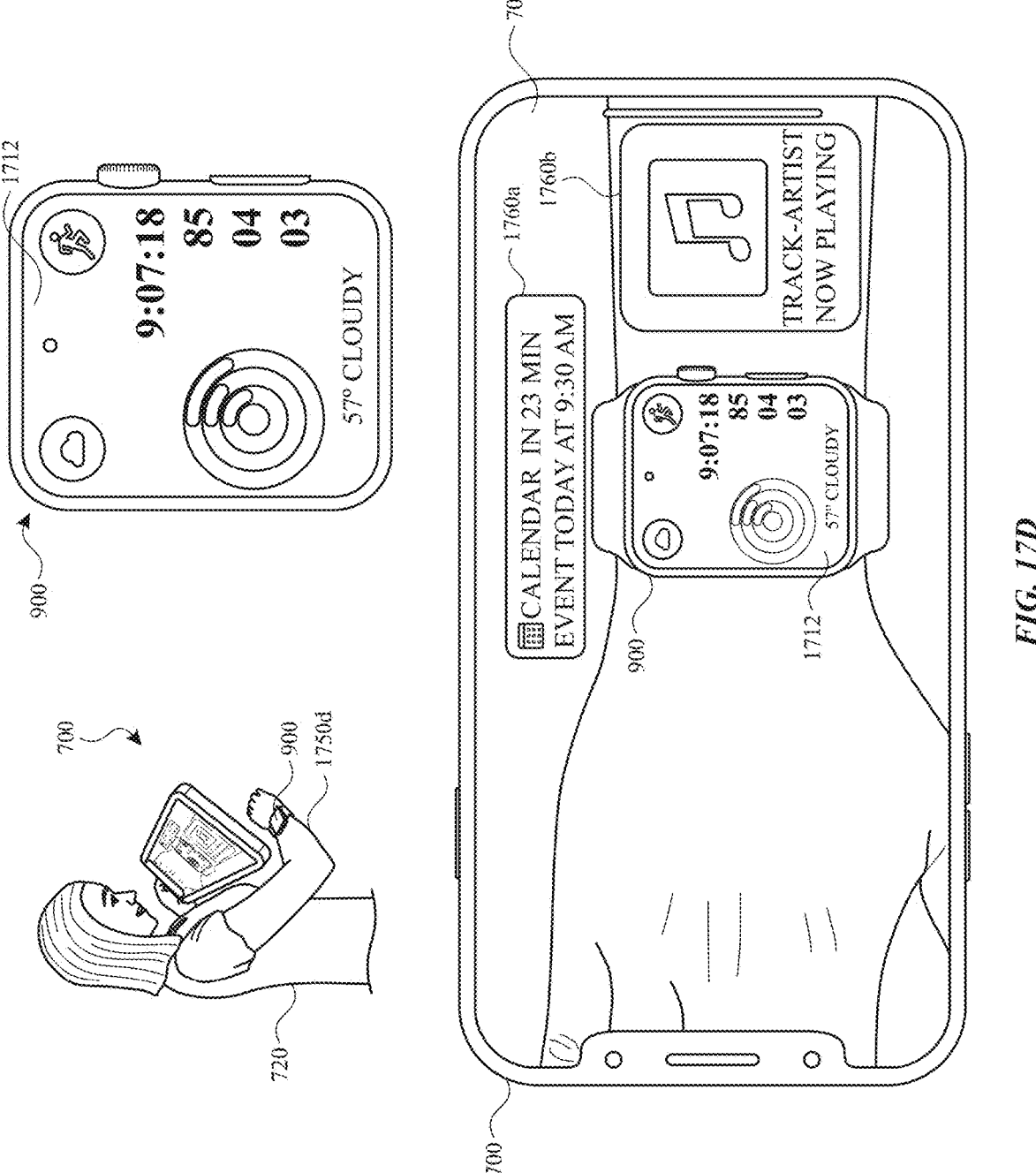

FIGS. 17B-17D illustrate an exemplary scenario of user 720 moving external device 900 away from computer system 700. In the exemplary scenario provided in FIGS. 17B-17D, computer system 700 changes the sizes of the virtual objects that surrounds external device 900 at a slower rate than the representation of external device 900 is shown to change through the viewpoint of the user and/or on display 704 (e.g., using one or more techniques as described above in relation to "lazy follow" and "lazy follow behavior") and/or at a slower rate than external device 900 is physically moved away from computer system 700. At FIG. 17B, computer system 700 detects movement input 1750*b* that corresponds to movement of external device 900, where user 720 is moving external device 900 away from computer system 700. As illustrated in FIG. 17C, in response to detecting movement input 1750*b*, computer system 700 continues to display calendar application virtual object 1760*a* and music application virtual object 1760*b* at the same size although external device 900 has moved away from computer system 700, such that the representation of external device 900 has become smaller on display 704. At FIG. 17C, computer system 700 detects movement input 1750*c* that corresponds to movement of external device 900, where user 720 is moving external device 900 further away from computer system 700. As illustrated in FIG. 17D, in response to detecting movement input 1750*c*, computer system 700 changes the size of calendar application virtual object 1760*a* and music application virtual object 1760*b* because a predetermined period of time (e.g., 0.2-5 seconds) has passed since external device 900 was first moved (e.g., movement input 1750*b*) and/or external device 900 has moved a certain predetermined threshold distance (e.g., 1-100 millimeters) away from computer system 700. At FIG. 17D, computer system 700 detects movement input 1750*d* that corresponds to movement of external device 900, where user 720 is moving external device 900 in a direction that is outside of the viewpoint of the user (e.g., as indicated by display 704).

Figure 17E:
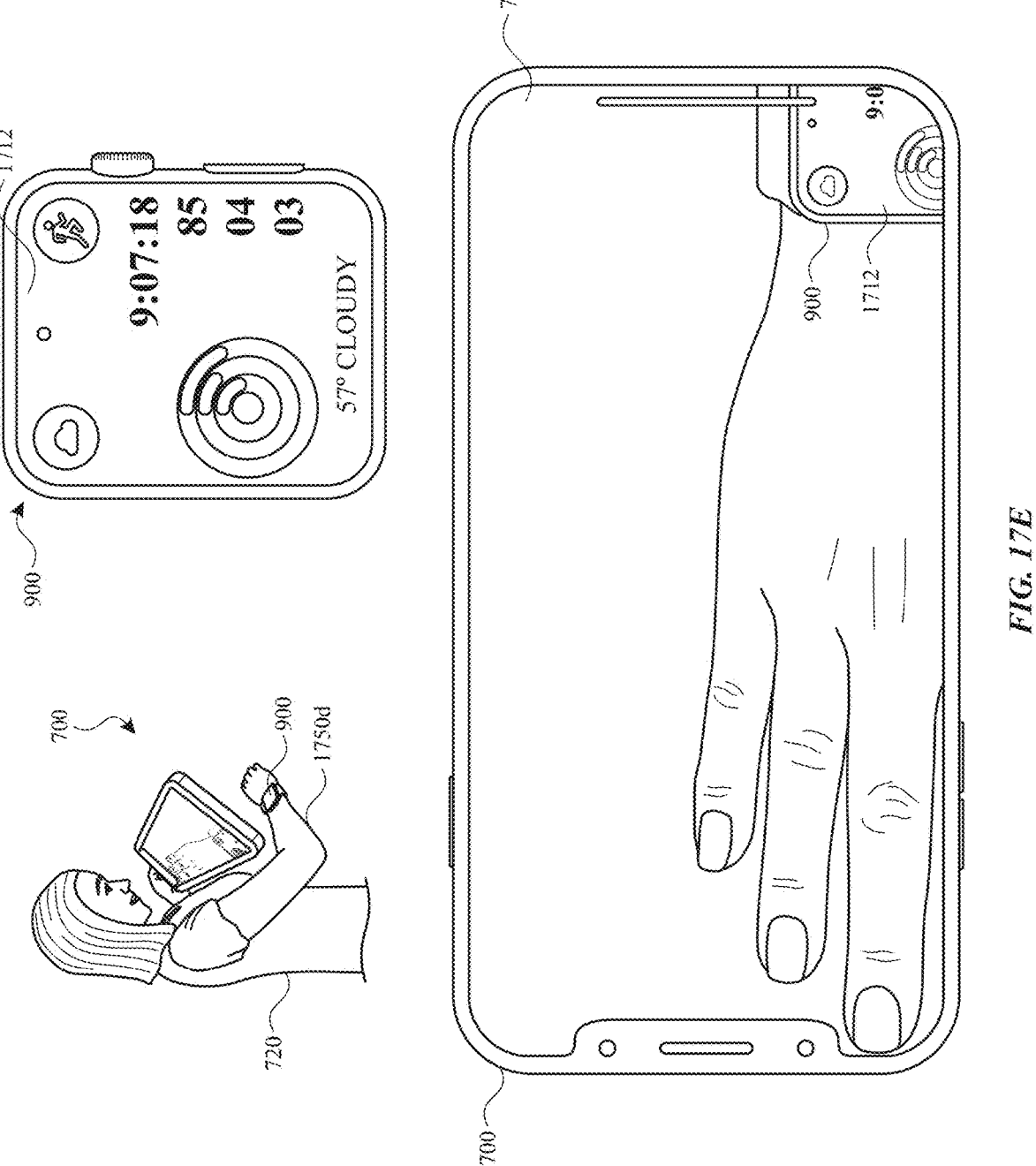

At FIG. 17E, in response to detecting movement input 1750*d*, a determination is made that a set of criteria is met. In some embodiments, the set of criteria is met because a portion of a body part (e.g., hand and/or arm) of user 720 is no longer in the viewpoint of the user and/or is no longer visible on display 704. In some embodiments, the set of criteria is met because a portion of the representation of external device 900 is no longer in the viewpoint of the user and/or is no longer visible on display 704. As illustrated in FIG. 17E, because the determination is made that the set of criteria is met, computer system 700 ceases to display the virtual objects (e.g., calendar application virtual object 1760*a* and music application virtual object 1760*b*) around the representation of external device 900. Thus, as illustrated in FIG. 17E, computer system 700 ceases to display the virtual objects when the external device and/or a body part of the user is not visible within the viewpoint of the user. In some embodiments, external device 900 continues to be unlocked although computer system 700 has ceased to display the virtual objects (e.g., as shown in FIG. 17E). In some embodiments, external device 900 is transitioned from the unlocked state to the locked state because the determination is made that the set of criteria is met.

Figure 17F:
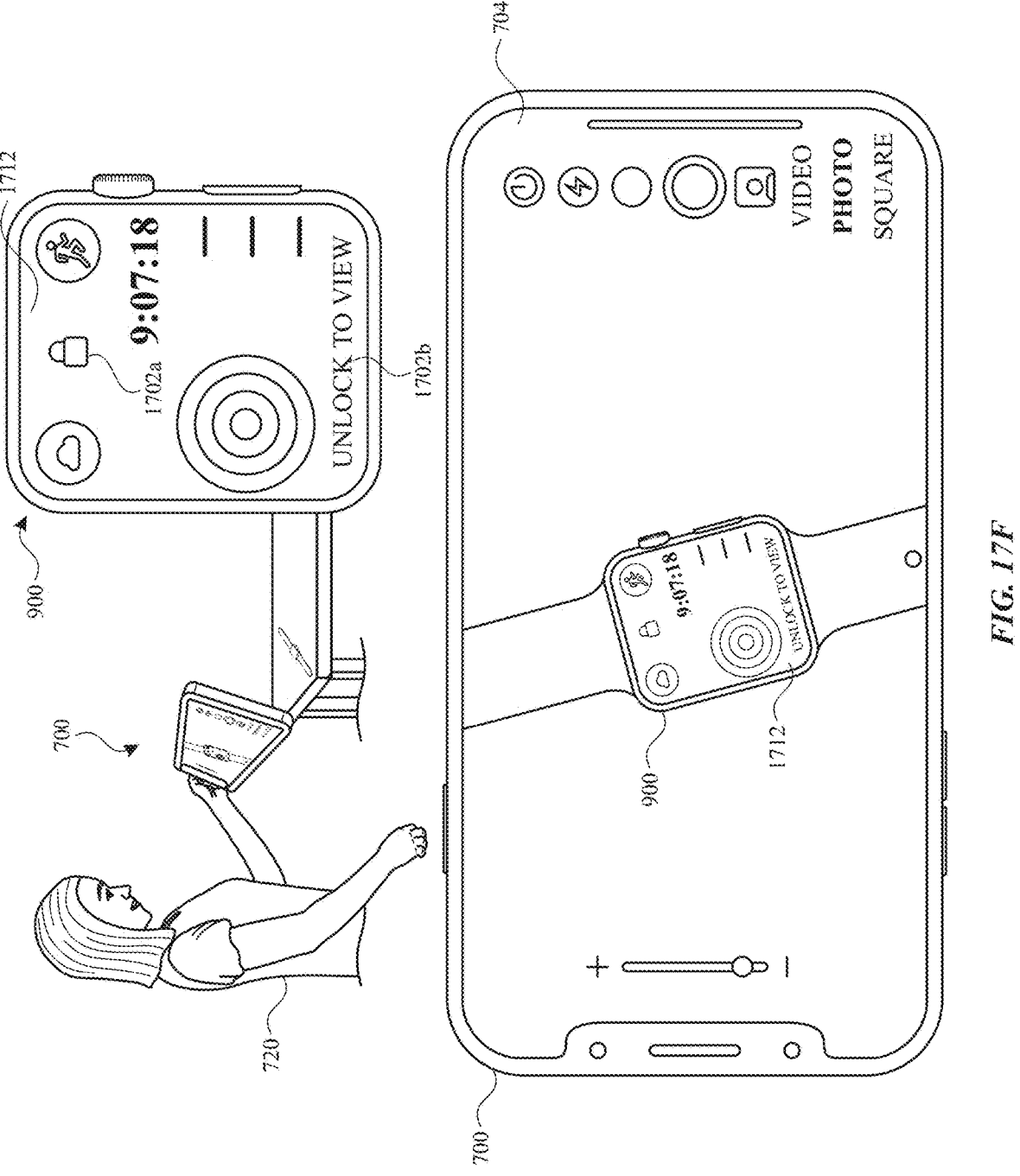

FIG. 17F illustrates an exemplary scenario where external device 900 is in a locked state while external device 900 is visible on display 704 and not within the viewpoint of the user. At FIG. 17F, because a determination is made that external device 900 is not being worn, external device 900 continues to be in the locked state (e.g., the locked state as described above in relation to FIG. 17A and as indicated by lock indications 1702*a* and 1702*b*). Thus, in some embodiments, computer system 700 does not cause external device 900 to be unlocked (and/or external device 900 is unlocked) when a determination is made that the user is not wearing external device 900 (e.g., irrespective of whether a determination is made that the attention of the user is directed to external device 900).

Additional descriptions regarding FIGS. 17A-17F are provided below in reference to method 1800 described with respect to FIGS. 17A-17F.

FIG. 18 is a flow diagram of an exemplary method 1800 for displaying virtual objects associated with an external device, in accordance with some embodiments. In some embodiments, method 1800 is performed at a computer system (e.g., 700) (e.g., a smartphone, a desktop computer, a laptop, a tablet, a smartwatch a heads-up display unit, a head-mounted display unit, an optical head-mounted display unit, and/or a wearable device) that is in communication with a display generation component (e.g., 704) (e.g., a display controller, a touch-sensitive display system, a display (e.g., integrated and/or connected), a 3D display, a transparent display, a projector, a heads-up display, and/or a head-mounted display). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 1800 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 1800 are, optionally, combined and/or the order of some operations is, optionally, changed.

The computer system (e.g., 700) detects (1802) a change in relative position between an indication (e.g., position of viewpoint indicated by 704 and/or gaze 1274*b*) of (e.g., data concerning) attention of the user (e.g., 720, a field-of-view of the computer system or detected attention of the user) in a three-dimensional environment (e.g., a physical environment, a virtual-reality environment, and/or an augmented reality environment) (e.g., the field-of-view of one or more cameras of the computer system and/or one or more cameras that are in communication with the computer system and/or the field-of-view of the display generation component (e.g., one or more display areas (e.g., lens) of the display generation component)) and a location of an external device (e.g., 900) (e.g., a smart watch, a smart phone, a laptop computer) in the three-dimensional environment (e.g., a physical environment, a virtual-reality environment, and/or an augmented reality environment) (e.g., as discussed above in relation to FIGS. 17A-17B).

In response to (1804) detecting the change in relative position between the indication (e.g., position of viewpoint indicated by 704 and/or gaze 1274*b*) of attention of the user (e.g., 720) in the three-dimensional environment and the location of the external device in the three-dimensional environment (e.g., as described above in relation to FIGS. 17A-17B): in accordance with a determination that a set of criteria has been satisfied, where the set of criteria includes a criterion that is satisfied when a determination is made that the indication (e.g., position of viewpoint indicated by 704 and/or gaze 1274*b*) of attention of the user was directed to the location of the external device in the three-dimensional environment while the external device was in a locked state (e.g., as described above in relation to 900 in FIG. 17A), the computer system causes (1806) the external device (e.g., 900) to transition from the locked state to an unlocked state (e.g., as described above in relation to FIGS. 17A-17B), and in accordance with a determination that the set of criteria has not been satisfied, forgoes causing (1808) the external device (e.g., 900) to transition from the locked state to the unlocked state (e.g., as described above in relation to FIGS. 17A-17B, that causes the external device to perform an unlocking operation and/or that unlocks the external device). In some embodiments, in accordance with a determination that the external device is in the field-of-view of the computer system while the field-of-view of the computer system is at the second position in the three-dimensional environment and in accordance with a determination that the external device is not in a locked state, the computer system does not transmit the instruction that causes the external device to transition from the locked state to an unlocked state and/or the external device is maintained in the unlocked state. In some embodiments, while the external device is in a locked state, a first user interface is displayed (e.g., a locked user interface) with an indication that the external device is locked (e.g., a locked icon and/or a password/passcode input user interface) (e.g., at the computer system and/or at the external device). In some embodiments, transitioning the external device from the locked state to the unlocked state includes displaying a second user interface that includes an indication that the external device is unlocking and/or is unlocked (e.g., an unlocked icon and/or not a password/passcode input user interface) (e.g., at the computer system and/or at the external device). Determining whether or not to cause the external device to transition from the locked state to an unlocked state based on whether or not prescribed conditions are met causes the computer system to automatically unlock the external device. Causing the external device to transition from the locked state to an unlocked state in accordance with a determination that a set of criteria has been satisfied provides improved security by allowing the computer system to only unlock the computer system when at least a determination is made that the indication of attention of the user was directed to the location of the external device in the three-dimensional environment while the external device was in a locked state.

In some embodiments, detecting change in relative position between the indication (e.g., 1274*b*) of attention of the user (e.g., 720) in the three-dimensional environment and the location of the external device (e.g., 900) in the three-dimensional environment includes detecting a change in the position of a gaze (e.g., 1724*b*) of a user from a first location (e.g., in the three-dimensional environment) to a second location (e.g., in the three-dimensional environment) (e.g., as described above in relation to FIGS. 17A-17B). Causing the external device to transition from the locked state to an unlocked state in accordance with a determination that a set of criteria has been satisfied and in response to detecting the change in the position of the gaze of the user from the first location to the second location provides improves security by allowing the computer system to only unlock the computer system at least when a determination is made that the gaze of the user was directed to the location of the external device in the three-dimensional environment while the external device was in a locked state.

In some embodiments, detecting the change in relative position between the indication (e.g., viewpoint indicated by 704) of attention of the user in the three-dimensional environment and the location of the external device (e.g., 900) in the three-dimensional environment includes detecting a change in the first viewpoint of the user (e.g., 720) (and/or movement of the computer system and/or the first viewpoint of the user) (e.g., from one location (e.g., in the three-dimensional environment) to another location (e.g., in the three-dimensional environment)) (e.g., as described above in relation to FIGS. 17A-17B). Causing the external device to transition from the locked state to an unlocked state in accordance with a determination that a set of criteria has been satisfied and in response to detecting a change in the first viewpoint of the user provides improves security by allowing the computer system to only unlock the computer system at least when a determination is made that the viewpoint of the user was directed to the location of the external device in the three-dimensional environment while the external device was in a locked state.

In some embodiments, the determination that the indication of attention of the user was directed to the location of the external device (e.g., 900) is made based on (or when) determining that the external device (e.g., 900) is at a location that is visible from a second viewpoint (e.g., as indicated by 704) of the user (and/or is determined to be visible to the user (e.g., through a display screen and/or the display generation component)). Determining whether or not to cause the external device to transition from the locked state to an unlocked state based on whether or not prescribed conditions are met causes the computer system to automatically unlock the external device based on determining that the external device is at a location that is visible from the second viewpoint of the user. Causing the external device to transition from the locked state to an unlocked state in accordance with a determination that a set of criteria has been satisfied provides improved security by allowing the computer system to only unlock the computer system based on determining that the location of the external device is at a location that is visible from the second viewpoint of the user.

In some embodiments, the external device (e.g., 900) is a wearable device (e.g., a smart watch and/or a device that is different from the computer system) (e.g., as described above in relation to FIG. 17A). In some embodiments, the set of criteria includes a criterion that is satisfied when a determination is made that the external device (e.g., 900) is being worn (e.g., by the user) (e.g., as described above in relation to FIG. 17F). In some embodiments, the determination is made that the external device is being worn based on data detected by one or more sensors of the external device. In some embodiments, the determination is made that the external device is being worn based on image data that is captured by one or more cameras that are in communication with the computer system. Determining whether or not to cause the external device to transition from the locked state to an unlocked state based on whether or not prescribed conditions are met causes the computer system to automatically unlock the external device when a determination is made that the external device is being worn. In some embodiments, causing the external device to transition from the locked state to an unlocked state in accordance with a determination that a set of criteria has been satisfied provides improved security by allowing the computer system to only unlock the computer system when a determination is made that the external device is being worn. In some embodiments, the external device (e.g., 900) is a watch (e.g., a smart watch).

In some embodiments, the set of criteria includes a criterion that is satisfied when a determination is made that the external device (e.g., 900) is associated with (e.g., logged into) an account (e.g., a user account) with which the computer system (e.g., 700) is also associated (e.g., an account that the computer system and the external device is logged into and/or that data associated with use of the computer system and the external device is stored as belonging to the account) (e.g., as described above in relation to FIG. 17B). Determining whether or not to cause the external device to transition from the locked state to an unlocked state based on whether or not prescribed conditions are met causes the computer system to automatically unlock the external device when a determination is made that the external device is associated with an account with which the computer system is also associated. In some embodiments, causing the external device to transition from the locked state to an unlocked state in accordance with a determination that a set of criteria has been satisfied provides improved security by allowing the computer system to only unlock the computer system when a determination is made that the external device is associated with an account with which the computer system is also associated.

In some embodiments, before detecting the change in relative position between the indication (e.g., 704 and/or 1724b) of attention of the user (e.g., 720) in the three-dimensional environment and the location of the external device (e.g., 900) in the three-dimensional environment, the external device (e.g., 900) displays a first user interface that represents a lock screen user interface (e.g., while the external device is in a locked state) (e.g., as described above in relation to FIG. 17A). The computer system (e.g., 700), in response to detecting the change in relative position between the indication of attention of the user in the three-dimensional environment and the location of the external device in the three-dimensional environment and in accordance with a determination that the indication of attention of the user was directed to the location of the external device in the three-dimensional environment while the external device was in the locked state, causes the external device to display a second user interface that represents an unlock screen user interface (e.g., as described above in relation to FIG. 17B) and ceases to display the first user interface (e.g., as described above in relation to FIG. 17B), wherein the second user interface is different from the first user interface (and causing the external device to be transitioned from a locked state to an unlocked state). In some embodiments, before detecting the change in relative position between the indication of attention of the user in the three-dimensional environment and the location of the external device in the three-dimensional environment, the computer system is displaying a lock screen user interface. In some embodiments, in response to detecting the change in relative position between the indication of attention of the user in the three-dimensional environment and the location of the external device in the three-dimensional environment and in accordance with a determination that the indication of attention of the user was directed to the location of the external device in the three-dimensional environment while the external device was in the locked state, the computer system displays a user interface (e.g., a unlock screen user interface) that is different from the lock screen user interface. In some embodiments, the lock screen user interface that is displayed by the external device is different from the lock screen user interface that is displayed by the computer system. In some embodiments, the unlock screen user interface that is displayed via the external device by the external device is different from the unlock screen user interface (or a user interface) that is displayed via the computer system. Causing the external device to display a second user interface that represents an unlock screen user interface provides feedback about the state of the computer system.

In some embodiments, in response to detecting the change in relative position between the indication (e.g., 704 and/or 1724b) of attention of the user (e.g., 720) in the three-dimensional environment and the location of the external device (e.g., 900) in the three-dimensional environment, and in accordance with a determination that the indication of attention of the user was directed to the location of the external device in the three-dimensional environment while the external device was in the locked state, the computer system displays, via the display generation component, virtual content (e.g., 1760a and/or 1760b) (e.g., one or more virtual objects) outside of a perimeter (e.g., at least one edge) of the external device (e.g., 900) (and near the perimeter of the external device) (e.g., outside of the perimeter of the housing of the external device) (e.g., at a location based on a detected location of the external device) (e.g., virtual content that is associated with one or more user interface elements and/or user interfaces being displayed by the external device). Displaying virtual content outside of a perimeter of the external device when prescribed conditions are met allows the computer system to automatically display virtual content that is relevant to the external device and provides feedback about the state of the computer system and/or the state of the external device.

In some embodiments, while displaying the virtual content (e.g., 1760a and/or 1760b) outside of the perimeter of the external device (e.g., 900), the computer system detects a first amount of change in the position of the external device (e.g., 900) relative to a third viewpoint (e.g., as indicated by 704) of the user (e.g., detecting movement of the external device in a first direction (e.g., and by a first amount)). In some embodiments, in response to detecting the first amount of change in the position of the external device relative to the third viewpoint of the user (e.g., in response to detecting movement of the external device in the first direction), the computer system moves display of the virtual content (e.g., 1760a and/or 1760b) based on the first amount of change (e.g., and/or by a second amount that is based on the first amount), such that less than a threshold amount of distance (e.g., within 0.1-2 m) (e.g., a distance that is less than the width of the external device and/or the virtual content) is maintained between the virtual content and the external device as the display of the virtual content is being moved (e.g., as described above in relation to FIGS. 17B-17D). In some embodiments, the second amount is the same as the first amount. In some embodiments, moving display of the virtual content based on the first amount includes maintaining the distance between the external device and the virtual content (and/or is substantially maintained (e.g., within 1-5 mm)). In some embodiments, the virtual content is locked to the remote device, such that the relative distance between the virtual content and the remote device is maintained and/or substantially maintained. Moving display of the virtual content based on the first amount enables the virtual content to automatically move with the external device without displaying additional controls.

In some embodiments, the virtual content (e.g., 1760a) includes one or more virtual objects that represent one or more notifications (e.g., notifications regarding incoming communications and/or notifications regarding events on the computer system) (e.g., as described above in relation to FIG. 17B). In some embodiments, the virtual content includes a first virtual object that represents a first incoming notification and a second virtual object that represents a second incoming notification, wherein the first incoming notification is different from the second virtual object. Displaying virtual content that includes one or more virtual objects that represent one or more notifications provides feedback concerning the state of the computer system (e.g., notifications being received and that can be displayed at the computer system) and/or the state of the external device.

In some embodiments, the virtual content (e.g., 1760a and/or 1760b) includes a virtual object that represents an application that is running (e.g., actively running (e.g., running in the background and/or running in the foreground)) on the external device (e.g., 900) (e.g., as described above in relation to FIG. 17B). Displaying virtual content that includes a virtual object that represents an application that is running on the external device provides feedback concerning the state of the computer system (e.g., applications running on the external device) and/or the state of the external device.

In some embodiments, the virtual content (e.g., 1760a and/or 1760b) includes a virtual object that represents a recently used application (e.g., an application that was recently opened (e.g., on the external device) and is currently closed, an application that was recently running in the foreground and is currently running in the background (e.g., on the external device), and/or an application that a user interacted with recently (e.g., the last application or the last of a number of applications that the user interacted with) (e.g., as described above in relation to FIG. 17B). Displaying virtual content that includes a virtual object that represents a recently used application provides feedback concerning the state of the computer system and/or the state of the external device.

In some embodiments, the virtual content (e.g., 1760a and/or 1760b) includes a virtual object that represents a fitness application (e.g., a workout application) (e.g., as described above in relation to FIG. 17B). Displaying virtual content that includes a virtual object that represents a fitness application provides feedback concerning the state of the computer system and/or the state of the external device.

In some embodiments, the virtual content (1760b) includes a virtual object that represents a music application (e.g., an application for organizing music, an application for controlling the playback of music (e.g., an application with a pause, play, and/or stop virtual objects), and/or an application for transferring music and/or audio) (e.g., as described above in relation to FIG. 17B). In some embodiments, the virtual content includes a virtual object that represents a podcast application, an audiobook application, a video application, and/or another type of media application. Displaying virtual content that includes a virtual object that represents a music application provides feedback concerning the state of the computer system and/or the state of the external device.

In some embodiments, while displaying virtual content (e.g., 1760a and/or 1760b) outside of the perimeter of the external device (and while the external device (e.g., the entirety of the external device and a portion of the external device), the computer system detects a change in the position of the external device relative to a fourth viewpoint (e.g., as indicated by 704) of the user (e.g., 720) (e.g., movement of the external device and/or the viewpoint of the user from a first location to a second location). In some embodiments, in response to detecting the change in the position of the external device relative to the fourth viewpoint of the user and in accordance with a determination that at least a portion of the external device is outside of (e.g., is not visible from) (e.g., does not overlay a location in and/or that is visible from) the fourth viewpoint of the user (e.g., while the external device is at the changed position relative to the external device), the computer system ceases to display the virtual content (e.g., as described above in relation to FIG. 17D-17E) (e.g., where at least the portion of the external device that is outside of a fourth viewpoint of the user while the external device is at the second location was within the fourth viewpoint of the user while the external device was at a first location). In some embodiments, while the virtual content is not displayed, the computer system detects movement of the external device and/or the fourth viewpoint of the user from the second location to the third location and, in response to detecting movement of the external device from the second location to the third location and/or detecting the change in the position of the external device relative to the fourth viewpoint of the user and in accordance with a determination that at least a portion of the external device is within of the fourth viewpoint of the user (e.g., while the external device is at the third location), the computer system re-displays the virtual content (e.g., and/or at least some of the virtual content that was displayed before the virtual content cease to be displayed). In some embodiments, the computer system re-displays the virtual content when at least a portion of remote device is visible within the viewpoint of the user again. Ceasing to display the virtual content in response to detecting the change in the position of the external device relative to the fourth viewpoint of the user and in accordance with a determination that at least a portion of the external device is outside of the fourth viewpoint of the user provides improved security by allowing the computer system to remove displayed virtual content in situations where the external device may be in a less secure state (e.g., outside of the third viewpoint).

In some embodiments, while displaying the virtual content (e.g., 1760a and/or 1760b) outside of the perimeter of the external device, the computer system detects a change in the position of the external device relative to a fifth viewpoint (e.g., 704) of the user (e.g., 720) (e.g., movement of the external device and/or the computer system (e.g., from a third location (e.g., in the three-dimensional environment) to a fourth location (e.g., in the three-dimensional environment))). In some embodiments, in response to detecting the change in the position of the external device relative to the fifth viewpoint of the user (e.g., detecting movement of the external device and/or the computer system from the third location to the fourth location) and in accordance with a determination that at least a portion of a body part (e.g., a hand and/or a wrist) (e.g., portion of the user's body that the device is worn on) of the user (e.g., the body part of the user that the external device is positioned on and/or that is wearing the external device) is outside of (e.g., is not visible from) (e.g., does not overlay a location in and/or that is visible from) the fifth viewpoint of the user (e.g., the viewpoint of the user) (e.g., while the external device is at the changed position relative to the fifth viewpoint of the user), the computer system ceases to display the virtual content (e.g., as described above in relation to FIG. 17D-17E). In some embodiments, while the virtual content is not displayed, the computer system detects change in the position of the external device relative to the fifth viewpoint of the user (e.g., detects) movement of the external device from the fourth location to a fifth location) and, in response to detecting the change in the position of the external device relative to the fifth viewpoint of the user (e.g., detecting movement of the external device and/or the computer system from the fourth location to the fifth location and in accordance with a determination that at least the portion of the body part of the user is within the fifth viewpoint of the user while the external device is at the fifth location, the computer system re-displays the virtual content (e.g., and/or at least some of the virtual content)). Ceasing to display the virtual content in response to detecting the change in relative position between the external device and the fifth viewpoint of the user and in accordance with a determination that at least a portion of a body part of the user is outside of the fifth viewpoint of the user while the external device is at the fourth location provides improved security by allowing the computer system to remove displayed virtual content in situations where the external device may be in a less secure state (e.g., body part of user is outside of the fourth viewpoint of the user).

In some embodiments, the virtual content (e.g., 1760a and/or 1760b) is a first size, and the method further includes: while the virtual content is the first size. In some embodiments, a change in the relative distance between the external device (e.g., 900) relative to a sixth viewpoint (e.g., as indicated by 704) of the user (e.g., 720) (e.g., detecting movement of the external device from a location that is within a first distance from a sixth viewpoint of the user to a location that is within a second distance from the sixth viewpoint of the user) from a first distance to a second distance that is different from the first distance, and in response to detecting the change in the relative distance between the external device relative to the sixth viewpoint of the user from the first distance to the second distance, changing the virtual content from being the first size to being a second size that is different from the first size (e.g., as described above in relation to FIGS. 17B-17D).

In some embodiments, the change in the relative distance between the external device relative to the sixth viewpoint of the user occurs at a first rate (e.g., speed, acceleration, velocity, and/or magnitude) (e.g., as described above in relation to FIGS. 17B-17D). In some embodiments, changing the virtual content from being the first size to being the second size occurs at a second rate (e.g., speed, acceleration, velocity, and/or magnitude) that is slower than the first rate (e.g., to avoid jitter) (e.g., as described above in relation to FIGS. 17B-17D). Changing the virtual content from being the first size to being a second size, where the virtual content changes size at a second rate that is slower than the first rate allows the computer system to automatically reduce jitter of the virtual content that is displayed in the viewpoint of the user.

In some embodiments, causing the external device to transition from the locked state to the unlocked includes sending an instruction (e.g., to the external device and/or to a server in communication with the external device) that causes the external device to transition from the locked state to the unlocked state (e.g., as described above in relation to FIGS. 17A-17B).

In some embodiments, aspects/operations of methods 800, 1000, 1200, 1600, 2000, 2200, 2400, 2600, 2800, 3000, and 3200 may be interchanged, substituted, and/or added with the steps of method 1800. For example, method 1800 can be used to unlock an external device to display content associated with an external device using method 1000. For brevity, these details are not repeated here.

FIGS. 19A-19E illustrate example techniques for navigating a user interface, in accordance with some embodiments. FIGS. 20A-20B are a flow diagram of methods for navigating a user interface, in accordance with some embodiments. The user interfaces in FIGS. 19A-19E are used to illustrate the method in FIGS. 20A-20B.

Figure 19A:
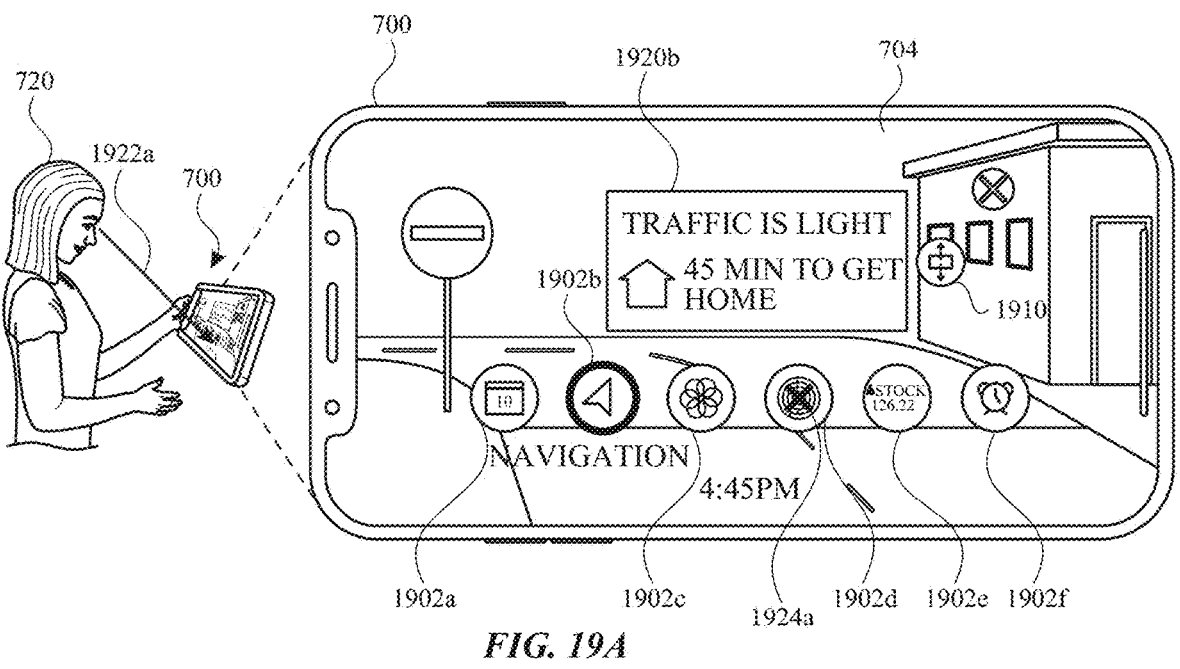
FIGS. 19A-19E illustrate example techniques for navigating a user interface, in accordance with some embodiments.

FIG. 19A illustrates user 720 holding computer system 700 that is positioned in a physical environment. At FIG. 19A, a representation of the physical environment is visible on display 704 (e.g., the viewpoint of user 720). While computer system 700 is a phone in FIG. 19A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 19A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For case of discussion, the following description below will describe the computer system of FIGS. 19A-19E displaying an AR user interface, where one or more virtual objects are overlaid on the representation of the physical environment that "passes through" the transparent display of computer system 700. In some embodiments, computer system 700 includes one or more features as described above in relation to FIGS. 9A-9G (e.g., including how computer system 700 can present an AR environment via display 704 using one or more different techniques). In some embodiments, one or more features and/or techniques described below in relation to FIGS. 19A-19E can be combined with one or more features and/or techniques described above in relation to FIGS. 11A1-11E3. In some embodiments, the one or more features and/or techniques described below in relation to FIGS. 19A-19E apply when computer system 700 is operating in a "Gaze-Only" mode, which is described in further detail above in relation to FIGS. 11A1-11E3.

At FIG. 19A, computer system 700 is displaying an AR user interface that is overlaid on the physical environment. As illustrated in FIG. 19A, the AR user interface includes calendar application virtual object 1902a, navigation application virtual object 1902b, meditation application virtual object 1902c, fitness application virtual object 1902d, stocks application virtual object 1902e, and timer application virtual object 1902f. Each of application virtual objects 1902a-1920f can be used to launch an application corresponding to the virtual object via the gaze of user 720 (e.g., the attention of user 720), as further described below. As illustrated in FIG. 19A, the AR user interface includes preview virtual object 1920b and application launch virtual object 1910. As illustrated in FIG. 19A, application launch virtual object 1910 and application virtual objects 1902a-1920f are displayed outside of the area of preview virtual object 1920b. At FIG. 19A, preview virtual object 1920b includes virtual content (e.g., "Traffic is Light—45 MIN TO GET HOME") that corresponds to a navigation application. At FIG. 19A, preview virtual object 1920b includes virtual content that corresponds to a navigation application because navigation application virtual object 1902b is in focus. Computer system 700 shows that navigation application virtual object 1902b is in focus by bolding the perimeter of navigation application virtual object 1902b in comparison to the perimeters of the other virtual objects (e.g., virtual objects 1902a and 1902c-1902f). In addition, computer system 700 shows an indication and/or label concerning navigation application virtual object 1902b (e.g., "NAV"), where a respective label is not shown for any of the other application virtual objects (e.g., application virtual objects 1902a and 1902c-1902f). At FIG. 19A, computer system 700 detects that the attention and/or gaze of user 720 is in gaze direction 1922a and at location 1924a.

Figure 19B:
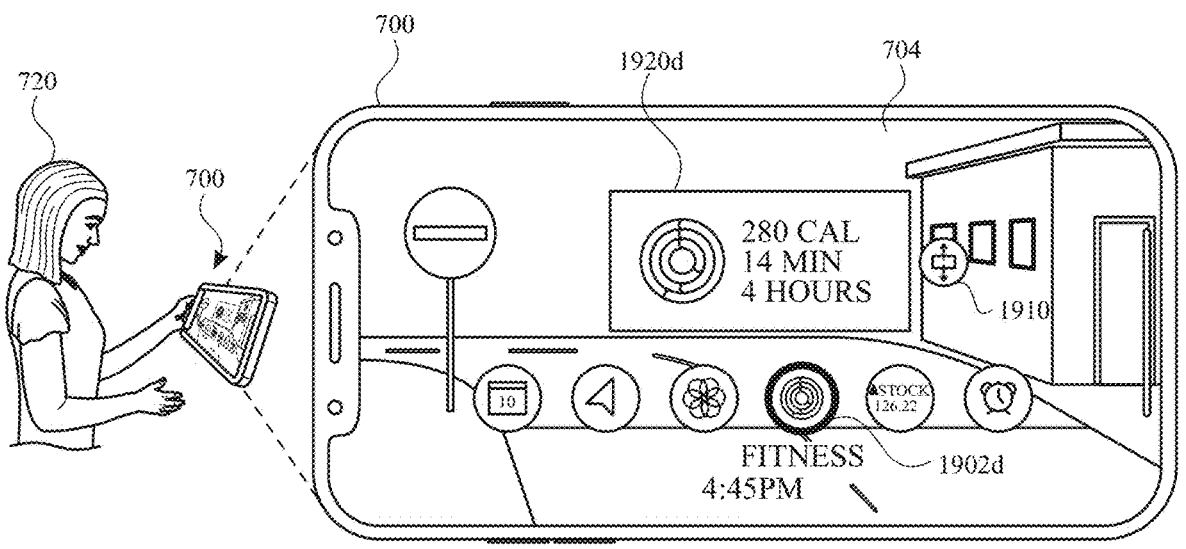

As illustrated in FIG. 19B, in response to detecting that the attention of user 720 is directed to fitness application virtual object 1902d (and/or that gaze of user 720 in gaze direction 1922a and/or that the location of the gaze of the user is at a location that corresponds to the location of fitness application virtual object 1902d), computer system 700 displays fitness application virtual object 1902d as being selected (e.g., bolds 1902d) and ceases to display navigation application virtual object 1902b as being selected (e.g., removes bold from 1902b). As illustrated in FIG. 19B, in response to detecting that the attention of user 720 is directed to fitness application virtual object 1902d, computer system 700 also ceases to display the indication concerning navigation application virtual object 1902b and displays an indication and/or label concerning fitness application virtual object 1902d (e.g., "FITNESS"). Because fitness application virtual object 1902d is now in focus, computer system 700 replaces the display of preview virtual object 1920b with the display of preview virtual object 1920d. Preview virtual object 1902d includes virtual content that corresponds to a fitness application to which fitness application virtual object 1902d corresponds and is different from the virtual content in preview virtual object 1920b of FIG. 19A. As illustrated in FIGS. 19A-19B, computer system 700 updates or replaces a preview of virtual content in response to detecting a change in the attention of a user (e.g., from one respective application icon to another respective application icon). As illustrated in FIG. 19B, computer system 700 continues to display other virtual objects that were displayed in FIG. 19A, such as application virtual objects 1902a-1902f of FIG. 19A and application launch virtual object 1910, while updating the preview of virtual content. In some embodiments, in response to detecting that the attention of user 720 moving across multiple application virtual objects, computer system 700 switches display of virtual content in the preview virtual object as the attention of user 720 moves across the application virtual objects. In some embodiments, computer system 700 switches display of virtual content in the preview of virtual content based on the speed of the movement of the attention of user 720 (e.g., switches faster as the movement of the attention of the user increases across the application virtual objects). In some embodiments, in response to detecting that the attention of the user is directed to another virtual object (e.g., such as calendar application virtual object 1902a, meditation application virtual object 1902c, stocks application virtual object 1902e, and/or timer application virtual object 1902f), computer system 700 replaces virtual content in the preview virtual object with content (e.g., a calendar application, a mediation application, stocks application, and/or a timer application) from the application that corresponds to the other virtual object. In some embodiments, in response to detecting that the attention of user 720 is directed to navigation application virtual object 1902b, computer system 700 re-displays preview virtual object 1920b and ceases to preview virtual object 1920d. In some embodiments, in response to detecting that the attention of the user is not directed to fitness application virtual object 1902d, computer system 700 continues to display preview virtual object 1920b. In some embodiments, in response to detecting that the attention of the user is directed to a close virtual object (e.g., a close button), computer system 700 ceases to displays the application virtual objects and/or application launch virtual object 1910.

Figure 19C:
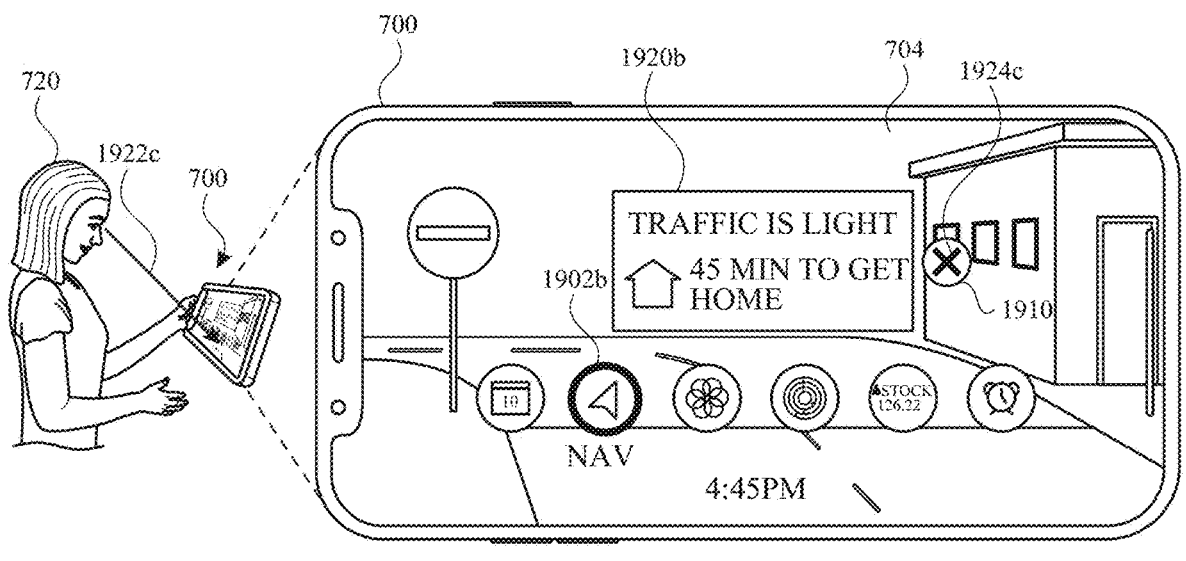
Figure 19D:
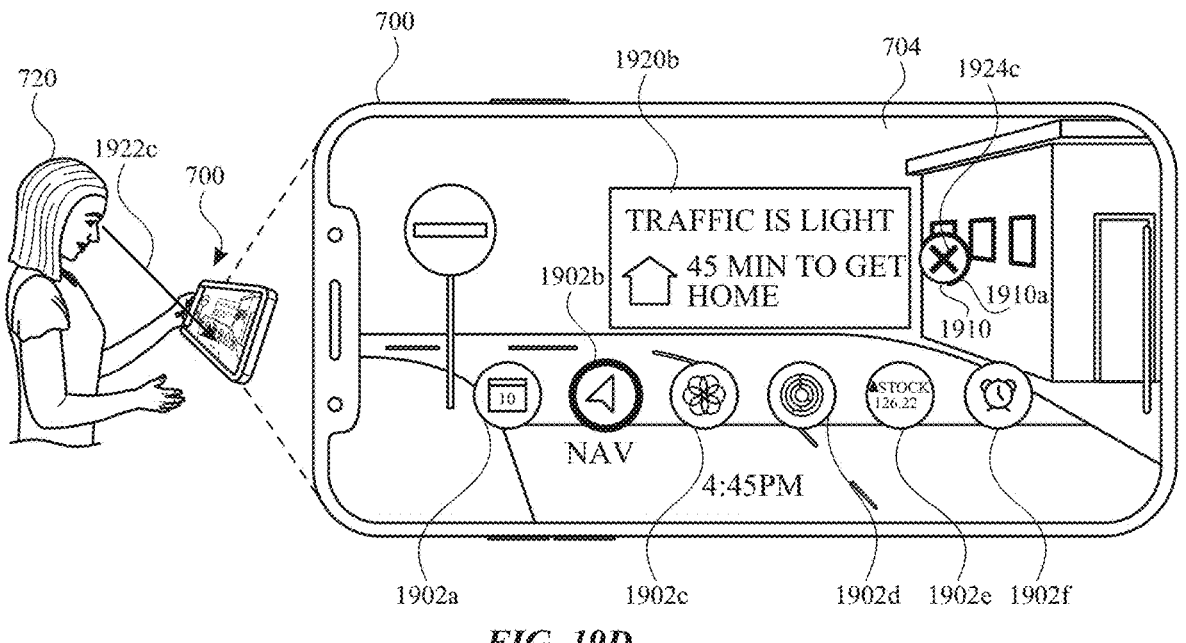

FIG. 19C illustrates an alternative embodiment to FIGS. 19A-19B, where the attention of user 720 is not detected as being directed to an application virtual object. As illustrated in FIG. 19C, computer system 700 is displaying preview virtual object 1902b and navigation application virtual object 1902b as being in focus, using one or more techniques as described above in relation to FIG. 19A. As illustrated in FIG. 19C, computer system 700 detects gaze of user 720 in gaze direction 1922c and at gaze location 1924c, which corresponds to application launch virtual object 1910. As illustrated in FIG. 19D, in response to detecting that the attention of user 720 is directed to application launch virtual object 1910 (e.g., based on the gaze of user 720 being in gaze direction 1922c and at gaze location 1924c), computer system 700 displays dwell-time indication 1910a around application launch virtual object 1910. While computer system 700 detects that the attention and/or gaze of user 720 is directed to application launch virtual object 1910, computer system 700 increases the length of dwell-time indication 1910a around the perimeter of application launch virtual object 1910 to indicate how much time (e.g., remaining time and/or total time) the attention of user 720 has to be directed to application launch virtual object 1910 for computer system 700 to perform an operation. In some embodiments, in response to detecting that the attention of user 720 is no longer directed to application launch virtual object 1910, computer system 700 ceases to display at least a portion of dwell-time indication 1910a around the perimeter of application launch virtual object 1910. In some embodiments, in response to detecting that the attention of user 720 is not directed to application launch virtual object 1910, computer system 700 gradually decreases the size of the dwell-time indication 1910a around the perimeter of application launch virtual object 1910. In some embodiments, after ceasing to display dwell-time indication 1910a, computer system 700 restarts increasing the size of dwell-time indication 1910a around the perimeter of application launch virtual object 1910 in response to detecting that the attention of user 720 has been redirected to application launch virtual object 1910. In some embodiments, computer system 700 indicates how much time the attention of user 720 has to be directed to application launch virtual object 1910 for computer system 700 to perform an operation in another way, such as filling up, brightening, darkening, and/or increasing and/or decreasing the size of application launch virtual object 1910. At FIG. 19D, computer system 700 detects that the attention of user 720 has been directed to application launch virtual object 1910 for a predetermined period of time (e.g., a dwell time (e.g., 0.2-5 seconds)).

Figure 19E:
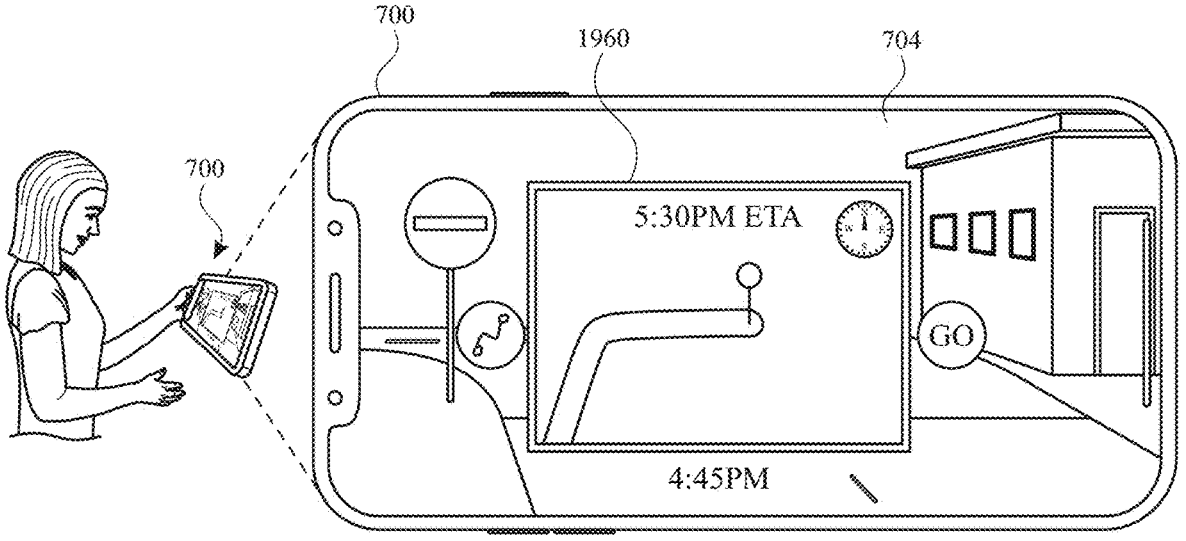

As illustrated in FIG. 19E, in response to detecting that the attention of user 720 has been directed to application launch virtual object 1910 for the predetermined period of time, computer system 700 launches the navigation application and displays navigation user interface 1960, which is a user interface of the navigation application. At FIG. 19E, computer system 700 launches the navigation application because navigation application virtual object 1902b was in focus (e.g., in FIG. 19D) while the attention of user 720 was directed to application launch virtual object 1910 and/or while virtual content from the navigation application was displayed in the preview virtual object (e.g., 1902b in FIG. 19D). Thus, computer system 700 launches a respective application based on the application virtual object being in focus and based on the attention of the user being directed to the application launch virtual object for more than a predetermined period of time. As illustrated in FIG. 19E, in response to detecting that the attention of user 720 has been directed to application launch virtual object 1910 for the predetermined period of time, computer system 700 ceases to display one or more virtual objects that were displayed in FIG. 19D, including application launch virtual object 1910 and application virtual objects 1902a-1902f of FIG. 19D. In some embodiments, the predetermined period of time that the attention of the user is required to be directed to the application launch virtual object to launch an application is longer than the time that the period of time that the attention of the user is required to be directed to a respective application virtual object in order to switch the display of virtual content in the preview virtual object (e.g., the processed described above in relation FIGS. 19A-19B). In some embodiments, the time required to switch between displays of virtual content in the preview virtual object for multiple applications (e.g., more than 3) is shorter than the predetermined period of time that the attention of the user is required to be directed to the application launch virtual object to launch an application. In some embodiments, computer system 700 outputs first audio in response to detecting that the attention of user 720 has been directed to application launch virtual object 1910 for a predetermined period of time and/or before and/or after launching an application. In some embodiments, computer system 700 outputs second audio in response to detecting that the attention of the user is directed to an application virtual object. In some embodiments, the first audio is different from the second audio. In some embodiments, the first audio is outputted for a longer and/or shorter time period than the first audio. In some embodiments, the second audio is outputted each time the attention of the user is detected as being directed to a different application virtual object. In some embodiments, the first audio is output while the attention of user 720 is directed to the application launch virtual object. In some embodiments, the first audio is outputted after a determination has been made that the attention of user 720 has been directed to the application launch virtual object for at the predetermined period of time. In some embodiments, in response to detecting that the attention of user 720 is directed to an exit virtual object (e.g., close button), computer system 700 ceases to display navigation user interface 1960 and re-displays the user interface of FIG. 19A with application virtual objects 1902a-1902f. In some embodiments, computer system 700 does not launch an application until the dwell-time indication has reached a maximum or minimum size, such as dwell-time being displayed around the entire perimeter and/or a predetermined portion of the perimeter of the application launch virtual object. In some embodiments, computer system 700 launches an application and/or switches the display of virtual content within a preview virtual object using air gestures and gaze, using one or more techniques as described above in relation to FIGS. 11A1-11E3.

Additional descriptions regarding FIGS. 19A-19E are provided below in reference to method 2000 described with respect to FIGS. 19A-19E.

FIGS. 20A-20B are a flow diagram of an exemplary method 2000 for navigating a user interface, in accordance with some embodiments. In some embodiments, method 2000 is performed at a computer system (e.g., 700) (e.g., a smartphone, a desktop computer, a laptop, a tablet, a smart watch, a heads-up display unit, a head-mounted display unit, an optical head-mounted display unit, and/or a wearable device) that is in communication with one or more gaze-tracking sensors (e.g., an optical and/or IR camera configured to track a direction of attention of a user of the computer system) and a display generation component (e.g., 704) (e.g., a display controller; a touch-sensitive display system; a display (e.g., integrated and/or connected), a 3D display, a transparent display, a projector, a heads-up display, and/or a head-mounted display). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, the computer system includes one or more gaze-tracking sensors (e.g., an optical and/or IR camera configured to track a direction of attention of a user of the computer system). In some embodiments, the computer system is in communication with and/or includes one or more sensors (e.g., a gyroscope and/or accelerometer) for detecting gravity and/or the direction of gravity. In some embodiments, method 2000 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 2000 are, optionally, combined and/or the order of some operations is, optionally, changed.

The computer system concurrently displays (2002), via the display generation component (e.g., an augmented reality user interface that includes): a representation (2004) (e.g., 1920*b*) of first preview content from a first application (e.g., text, images, video, and/or symbols) (e.g., the representation of the preview content is different from the first virtual object and the second virtual object); a plurality of virtual objects (2006) (e.g., 1902*a*-1902*f*) that represent corresponding applications, including a virtual object (e.g., 1902*a*-1902*f*) that represents a second application (e.g., that is different from the first application); and an application launch virtual object (2008) (e.g., 1910). In some embodiments, the representation of preview content is displayed above/below the first virtual object and the second virtual object. In some embodiments, the plurality of virtual objects includes a virtual object that represents the first application. In some embodiments, the plurality of virtual objects includes a virtual object that represents a third application.

The computer system, while concurrently displaying, via the display generation component, the plurality of virtual objects (e.g., 1902*a*-1902*f*), the representation (e.g., 1920*b*) of the first preview content, and the application launch virtual object (e.g., 1910), detects (2010), via the one or more gaze-tracking sensors, that the attention (e.g., 1922*a*, 1922*c*, 1924*a* and/or 1924*c*) of the user is directed to a respective location (e.g., in a user interface and/or a location relative to the display generation component) (e.g., detecting that the attention of the user has moved from being directed to a second location on the user interface to being directed to the first location and/or detecting that the attention of the user has changed to being in a first predetermined direction from being in a second predetermined direction, where the first location is in the first predetermined direction of the attention and not in the second predetermined direction of the attention).

In response to (2012) detecting that the attention (e.g., 1922*a*, 1922*c*, 1924*a* and/or 1924*c*) of the user is directed to the respective location (e.g., in the user interface) and in accordance with a determination that a set of application launch criteria has been satisfied (e.g., met), wherein the set of application launch criteria includes a criterion that is satisfied when the attention (e.g., 1922*a*, 1922*c*, 1924*a* and/or 1924*c*) of the user is directed to the application launch virtual object (e.g., 1910) for at least a threshold amount of time (e.g., 0.2-5 seconds) (and/or a location that corresponds to a location of the application launch virtual object) (e.g., the set of application launch criteria includes a criterion that is satisfied when the attention of the user is directed to the respective location for a threshold amount of time and the respective location corresponds to a location of the application launch virtual object) (e.g., a threshold period of time), the computer system displays (2014) an application user interface (e.g., 1960) that corresponds to the first preview content (e.g., the currently displayed preview content), where the application user interface is different from the first preview content (e.g., and/or the representation of the first preview content). In some embodiments, in accordance with a determination that the set of application launch criteria has been satisfied, the computer system ceases to display the representation of the first preview content and/or ceases to display the application launch virtual object. In some embodiments, in accordance with a determination that the set of application launch criteria has been satisfied, the computer system continues to display the plurality of virtual objects that represent corresponding applications. In some embodiments, an application that corresponds to preview content is larger than and/or have more controls for interacting with content for a particular application than the representation of preview content. Thus, in some embodiments, one or more controls that are displayed while the application that corresponds to the preview content is displayed are not displayed while the representation of preview content is displayed and/or while the application that corresponds to preview content is not displayed.

In response to (2012) detecting that the attention (e.g., 1922*a*, 1922*c*, 1924*a* and/or 1924*c*) of the user is directed to the respective location (e.g., in the user interface) and in accordance with a determination that the respective location corresponds to a location of the virtual object (e.g., 1902*a*-1902*f*) that represents a second application (and, in some embodiments, irrespective of whether the attention of the user has been directed to the respective location for longer than a second threshold amount (e.g., 0.2-5 seconds) of time that is different from the threshold amount of time), the computer system ceases (2016) to display the representation (e.g., 1920*b*) of the first preview content and displaying, via the display generation component, a representation (e.g., 1920*d*) of second preview content from the second application (e.g., preview content) (e.g., a preview of the second application, a portion of a user interface of the second application and/or one or more user interface elements that are displayed on the user interface of the second application) (without displaying the application user interface that corresponds to the first preview content and/or an application user interface that corresponds to the second preview content). In some embodiments, the second preview content is different from the first preview content. In some embodiments, while concurrently displaying, via the display generation component, the plurality of virtual objects, the representation of second preview content, and the application launch virtual object, detecting, via the one or more gaze-tracking sensors, that the attention of the user is directed to the respective location, the computer system detects that the attention of the user is directed to the respective location (and/or another location in the user interface) and, in response to detecting that the attention of the user is directed to the respective location, the computer system displays an application user interface that corresponds to the second preview content (and, in some embodiments, without displaying an application user interface that corresponds to the first preview content). In some embodiments, the application user interface that corresponds to the second preview content is different from the application user interface that corresponds to the first preview content and/or is different from the second preview content (and/or the representation of the second preview content). In some embodiments, in accordance with a determination that the respective location corresponds to a location of the virtual object that represents a second application, the computer system continues to display the application launch virtual object and/or continues to display the plurality of virtual objects that represent corresponding applications. In some embodiments, the application launch virtual object and/or the plurality of virtual objects are displayed concurrently with the second preview content. In some embodiments, in response to detecting that the attention of the user is directed to the respective location and in accordance with a determination that the set of application launch criteria has not been satisfied and/or that the respective location does not correspond to the location of the virtual object that represents the second application (and/or a virtual object that represents a different application), the computer system continues to concurrently display the plurality of virtual objects, the representation of the first preview content, and the application launch virtual object and/or does not display the representation of second preview content from the second application or the application user interface that represents the first preview content. In some embodiments, in accordance with a determination that the respective location corresponds to a location of the virtual object that represents a second application, the virtual object that representations the second application is emphasized (e.g., bolded, enlarged, changes color, and/or displayed as being active) and a virtual object that represents the first application is de-emphasized (e.g., not bolded, not enlarged, changes color, and/or displayed as being inactive). Displaying an application user interface that corresponds to the first preview content or displaying a representation of second preview content from the second application based on one or more aspects related to the attention of the user enables the computer system to perform a particular set of operations without displaying additional controls.

In some embodiments, the plurality of virtual objects (e.g., 1902a-1902f) that represent corresponding applications includes a virtual object (e.g., 1902a-1902f) that represents a third application that is different from the first application and the second application. In some embodiments, the virtual object that represents the third application is different from the virtual object that represents the second application. In some embodiments, in response to detecting that the attention (e.g., 1922a, 1922c, 1924a and/or 1924c) of the user is directed to the respective location (e.g., while displaying the virtual object that represents the second application and/or the virtual object that represents the first application) (e.g., while displaying the representation of the first preview content) and in accordance with a determination that the respective location corresponds to a location of the virtual object that represents the third application (and, in some embodiments, irrespective of whether the attention of the user has been directed to the respective location for longer than (e.g., more than) a second threshold amount (e.g., 0.2-5 seconds) of time that is different from the threshold amount of time), the computer system ceases to display the representation (e.g., 1920b) of the first preview content and displays, via the display generation component, a representation (e.g., 1920b, 1920d, and/or as described above in relation to FIGS. 19A-19B) of third preview content from the third application (e.g., preview content) (e.g., a preview of the third application, a portion of a user interface of the third application and/or one or more user interface elements that are displayed on the user interface of the third application) (without displaying the application user interface that corresponds to the first preview content, an application user interface that corresponds to the second preview content, and/or an application user interface that corresponds to the third preview content). In some embodiments, the third preview content is different from the representation of the first preview content and the representation of the second preview content, and/or the representation of the third preview content is different from the representation of the first preview content and/or the representation of the second preview content. In some embodiments, while concurrently displaying, via the display generation component, the plurality of virtual objects, the representation of third preview content, and the application launch virtual object, detecting, via the one or more gaze-tracking sensors, that the attention of the user is directed to the respective location, the computer system detects that the attention of the user is directed to the respective location (and/or another location in the user interface) and, in response to detecting that the attention of the user is directed to the respective location, the computer system displays an application user interface that corresponds to the third preview content (and, in some embodiments, without displaying an application user interface that corresponds to the first preview content and/or an application user interface that corresponds to the second preview content). In some embodiments, the application user interface that corresponds to the third preview content is different from the application user interface that corresponds to the first preview content, the application user interface that corresponds to the second preview content, and/or is different from the third preview content (and/or the representation of the third preview content). In some embodiments, in accordance with a determination that the respective location corresponds to a location of the virtual object that represents third application, the computer system continues to display the application launch virtual object and/or continues to display the plurality of virtual objects that represent corresponding applications. Displaying, via the display generation component, a representation of third preview content from the third application in response to detecting that the attention of the user is directed to the respective location and in accordance with a determination that the respective location corresponds to a location of the virtual object that represents the third application enables the computer system to display different preview content and cease to display preview content that was previously displayed based on the attention of the user being directed to a particular location without displaying additional controls.

In some embodiments, the plurality of virtual objects (e.g., 1902a-1902f) that represent corresponding applications includes a virtual object (e.g., 1902a-1902f) that represents a fourth application that is different from the first application and the second application. In some embodiments, the virtual object that represents the fourth application is different from the virtual object that represents the second application. In some embodiments, while displaying, via the display generation component, the representation (e.g., 1920d and/or as described above in relation to FIGS. 19A-19B) of second preview content from the second application, the computer system detects, via the one or more gaze-tracking sensors, that the attention (e.g., 1922a, 1922c, 1924a and/or 1924c) of the user is directed to a second respective location (e.g., in the user interface and/or a location relative to the display generation component). In some embodiments, the second respective location is different from the first respective location. In some embodiments, in response to detecting that the attention of the user is directed to the second respective location and in accordance with a determination that the second respective location corresponds to a location of the virtual object that represents the fourth application, the computer system ceases to display the representation (e.g., 1920d and/or as described above in relation to FIGS. 19A-19B) of second preview content and displaying, via the display generation component, a representation (e.g., as described above in relation to FIGS. 19A-19B) of fourth preview content from the fourth application. In some embodiments, the representation of the fourth preview content from the fourth application is different from the representation of the second preview content (and the fourth preview content is different from the second preview content). In some embodiments, response to detecting that the attention of the user is directed to the second respective location and in accordance with a determination that the second respective location corresponds to the location of the virtual object that represents the first application, the computer system displays the representation of the first preview content from the first application. Displaying, via the display generation component, a representation of fourth preview content from the fourth application in response to detecting that the attention of the user is directed to the second respective location and in accordance with a determination that the second respective location corresponds to a location of the virtual object that represents a fourth application enables the computer system to display different preview content and cease to display preview content that was previously displayed based on the attention of the user being directed to a particular location without displaying additional controls.

In some embodiments, the plurality of virtual objects (e.g., 1902a-1902f) that represent corresponding applications includes a first virtual object (e.g., 1902a-1902f) that represents the first application. In some embodiments, in response to detecting that the attention (e.g., 1922a, 1922c, 1924a and/or 1924c) of the user is directed to the second respective location and in accordance with a determination that the second respective location corresponds to the location of the first virtual object that represents the first application, the computer system ceases to display the representation (e.g., 1920d and/or as described above in relation to FIGS. 19A-19B) of second preview content and displaying (e.g., re-displaying), via the display generation component, the representation (e.g., 1920b and/or as described above in relation to FIGS. 19A-19B) of first preview content from the first application (e.g., concurrently with the plurality of virtual objects and/or the application launch virtual object). Ceasing to display the representation of second preview content and displaying, via the display generation component, the representation of first preview content in response to detecting that the attention of the user is directed to the second respective location and in accordance with a determination that the second respective location corresponds to a location of the virtual object that represents the fourth application enables the computer system to re-display preview content that was previously displayed without displaying additional controls.

In some embodiments, ceasing to display the representation (e.g., 920b and/or as described above in relation to FIGS. 19A-19B) of the first preview content, displaying the representation (e.g., 920d and/or as described above in relation to FIGS. 19A-19B) of the second preview content, ceasing to display the representation of the second preview content, and displaying the representation of the fourth preview content (e.g., in sequence based on detection of the attention being directed to the respective location and the attention being directed to the second respective location) occur within a period of time that is shorter than the threshold amount of time. In some embodiments, multiple representations of different preview content are displayed over a time period (e.g., within an amount of time) that is less than and/or shorter than the threshold amount of time (e.g., the amount of time at which attention is detected as being directed to the application launch virtual object). Having to cease to display the representation of the first preview content, display the representation of the second preview content, ceasing to display the representation of the second preview content with a period of time that is shorter than the threshold amount of time enables the computer system to perform the operation of displaying different camera previews in a reduced amount of time as compared to launching an application user interface without displaying additional controls and reduces the amount of time and/or the number of inputs (e.g., time of inputs) needed to switch between different camera previews versus launching an application user interface.

In some embodiments, while concurrently displaying, via the display generation component, the plurality of virtual objects (e.g., 1902a-1902f) and the application launch virtual object (e.g., 1910) (e.g., after detecting that the attention of the user is directed to the respective location), the computer system detects, via the one or more gaze-tracking sensors, that the attention (e.g., 1922a, 1922c, 1924a and/or 1924c) of the user is directed to the (e.g., a third respective location (e.g., in the user interface and/or a location relative to the display generation component) that corresponds to a location of the) application launch virtual object. In some embodiments, in response to detecting that the attention of the user is directed to the application launch virtual object and in accordance with a determination that the set of application launch criteria has been satisfied: in accordance with a determination that the representation (e.g., 920b and/or as described above in relation to FIGS. 19A-19B) of the first preview content was displayed while the attention of the user was detected as being directed to the application launch virtual object (and/or that the representation of the first preview content is currently displayed and/or is currently concurrently displayed with the plurality of virtual objects and the application launch virtual object), the computer system displays the application user interface (e.g., 1960) that corresponds to the first preview content (e.g., without displaying an application user interface that corresponds to the second preview content); and in accordance with a determination that the representation of the second preview content was displayed while the attention of the user was detected as being directed to the application launch virtual object (and/or that the representation of the second preview content is currently displayed and/or is currently concurrently displayed with the plurality of virtual objects and the application launch virtual object), the computer system displays an application user interface that corresponds to the second preview content (e.g., without displaying an application user interface that corresponds to the first preview content), wherein the application user interface that corresponds to the second preview content is different from (e.g., contains different content than and/or includes a different number of controls (e.g., one or more controls for interacting with the second application that are not included while the application that corresponds to the preview content is displayed)) the application user interface that corresponds to the first preview content. Displaying the application user interface that corresponds to the first preview content (in accordance with a determination that the representation of the first preview content was displayed while the attention of the user was detected as being directed to the application launch virtual object) or displaying an application user interface that corresponds to the second preview content (in accordance with a determination that the representation of the second preview content was displayed while the attention of the user was detected as being directed to the application launch virtual object) enables the computer system to display different preview content without displaying additional controls.

In some embodiments, in response to detecting that the attention (e.g., 1922a, 1922c, 1924a and/or 1924c) of the user is directed to the respective location and in accordance with a determination that the respective location corresponds to (e.g., is) a location of the application launch virtual object (e.g., 1910), the computer system displays a virtual object (e.g., 1910*a*) that indicates progress towards meeting the criterion that is satisfied when the attention of the user is directed to the application launch virtual object (e.g., 1910) for at least the threshold amount of time, wherein the virtual object that indicates progress is updated over a first period of time while the attention of the user is detected as being directed to the respective location. In some embodiments, displaying the virtual object that indicates progress includes displaying an animation of the virtual object changing. In some embodiments, in response to detecting that the attention of the user is directed to the respective location and in accordance with a determination that the respective location does not correspond to the location of the application launch virtual object (and/or corresponds to a location of one or more of the plurality of virtual objects that represent corresponding applications), the computer system does not display the virtual object that indicates progress. In some embodiments, updating the virtual object that indicates progress includes displaying an animation of the virtual object being emphasized (e.g., enlarging, changing color, getting bigger, and/or appearing) over a period of time (e.g., gradually over a period of time). Displaying the virtual object that indicates progress towards meeting the criterion that is satisfied when the attention of the user is directed to the application launch virtual object for at least the threshold amount of time allows the computer system to inform the user about how the attention of the user is impacting and/or will impact the computer system, which provides feedback about a state of the computer system.

In some embodiments, while displaying the virtual object that indicates progress, the computer system detects that the attention of the user is directed to a fourth respective location that is different from the respective location (e.g., first respective location) (e.g., and/or is not directed to the application launch virtual object). In some embodiments, in response to detecting that the attention of the user is directed to the fourth respective location (e.g., in response to detecting that the user is looking away from the respective location and/or the location of the application launch virtual object), the computer system ceases to display at least a portion of the virtual object that indicates progress (e.g., 1910*a*) (e.g., shrinking the virtual object, ceasing to display a color of the virtual object, reducing the size of the virtual object). In some embodiments, ceasing to display at least a portion of the virtual object that indicates progress the portion of the virtual object includes displaying an animation of the virtual object being de-emphasized (e.g., shrinking, changing color, getting smaller, and/or disappearing) over a period of time (e.g., gradually over a period of time). Ceasing to display at least a portion of the virtual object that indicates progress in response to detecting that the attention of the user is directed to the fourth respective location allows the computer system to inform the user about how the attention of the user is impacting and/or will impact the computer system, which provides feedback about a state of the computer system.

In some embodiments, updating the virtual object (e.g., 1910*a*) that indicates progress over the first period of time includes changing (e.g., increasing) the size (e.g., area and/or length) of the virtual object that indicates progress and/or filling in the virtual object that indicates progress (e.g., with color (e.g., red, blue, white, and/or green)) over the first period of time. Changing the size of the virtual object that indicates progress and/or filling the virtual object that indicates progress in response to detecting that the attention of the user is directed to the fourth respective location allows the computer system to inform the user about how the attention of the user is impacting and/or will impact the computer system, which provides feedback about a state of the computer system.

In some embodiments, (e.g., in accordance with a determination that the respective location corresponds to a location of the virtual object that represents a second application) the representation (e.g., 920*d* and/or as described above in relation to FIGS. 19A-19B) of the second preview content is displayed at a location in which (e.g., same location) the representation (e.g., 920*b* and/or as described above in relation to FIGS. 19A-19B) of the first preview content was displayed (e.g., the second preview content replaces the first preview content). In some embodiments, representation of a respective preview content is displayed at the same location as a representation of another preview content. Displaying the representation of the second preview content is displayed at a location in which the representation of the first preview content was displayed provides improved security/privacy by allowing a user to quickly locate the second preview content because the content is displayed at a particular location and also provides feedback about the state of the computer system (e.g., the computer system is configured to launch an application user interface that corresponds to the second preview content in response to detecting attention of the user directed to the application launch virtual object).

In some embodiments, in response to detecting that the attention of the user is directed to the respective location and in accordance with a determination that the respective location corresponds to the location of the virtual object that represents the second application, the computer system continues to display the plurality of virtual objects (e.g., 1902*a*-1902*f*). In some embodiments, the plurality of virtual objects is displayed irrespective of what preview content is currently displayed. Continuing to display the plurality of virtual objects in response to detecting that the attention of the user is directed to the respective location and in accordance with a determination that the respective location corresponds to the location of the virtual object that represents the second application reduces the number of inputs needed to display other preview content (e.g., than the preview content that is currently displayed) that is represented by the plurality of virtual objects.

In some embodiments, in response to detecting that the attention (e.g., 1922*a*, 1922*c*, 1924*a* and/or 1924*c*) of the user is directed to the respective location and in accordance with a determination that the respective location corresponds to the location of the virtual object that represents the second application, the computer system continues to display the application launch virtual object (e.g., 1910). In some embodiments, the application launch virtual object is displayed while the first preview is displayed and is displayed while the second preview is displayed. Continuing to display the application launch virtual object in response to detecting that the attention of the user is directed to the respective location and in accordance with a determination that the respective location corresponds to the location of the virtual object that represents the second application reduces the number of inputs needed to cause an application user interface to be launched.

In some embodiments, in response to detecting the attention of the user is directed to the respective location and in accordance with a determination that the respective location does not correspond to the application launch virtual object (e.g., 1910) or one or more of the plurality of virtual objects (e.g., 1902*a*-1902*f*), the computer system continues to display the representation (e.g., 920*b* and/or as described above in relation to FIGS. 19A-19B) of the first preview content. In some embodiments, while displaying, via the display generation component, the representation of second preview content from the second application, the computer system detects, via the one or more gaze-tracking sensors, that the attention of the user is directed to a fifth respective location (e.g., in the user interface and/or relative to the display generation component). In some embodiments, in response to detecting that the attention of the user is directed to the fifth respective location and in accordance with a determination that the fifth respective location does not correspond to one or more of the plurality of virtual objects (e.g., and while the set of application launch criteria has not been satisfied), the computer system continues to display the representation of the second preview content. Continuing to display the representation of the first preview content in response to detecting the attention of the user is directed to the respective location and in accordance with a determination that the respective location does not correspond to the application launch virtual object or one or more of the plurality of virtual objects enables the computer system to continue displaying preview content when the attention of the user has changed and is no longer directed to the first preview content in some situations, which reduces the number of inputs needed to continue displaying preview content.

In some embodiments, in response to detecting that the attention of the user is directed to the respective location and in accordance with a determination that the set of application launch criteria has been satisfied, the computer system displays a virtual object for closing an application concurrently with the application user interface (e.g., 1960) that corresponds to the first preview content (e.g., as described above in relation to FIG. 19E). In some embodiments, while displaying the virtual object for closing the application, the computer system detects, via the one or more gaze-tracking sensors, that the attention of the user is directed to a location that corresponds to a location of the virtual object for closing the application (e.g., as described above in relation to FIG. 19E). In some embodiments, in response to detecting that the attention of the user is directed to the location that corresponds to the location of virtual object for closing the application, the computer system ceases to display the application user interface (e.g., 1960) that corresponds to the first preview content (and re-displaying a representation of preview content (e.g., the representation of the first preview content) and/or the application launch icon) (e.g., as described above in relation to FIG. 19E). Ceasing to display the application user interface that corresponds to the first preview content in response to detecting that the attention of the user is directed to the location that corresponds to the location of virtual object for closing the application reduces the number of inputs needed to cease displaying the application user interface.

In some embodiments, while concurrently displaying, via the display generation component, the plurality of virtual objects, the representation (e.g., 920*b* and/or as described above in relation to FIGS. 19A-19B) of preview content from the first application, and the application launch affordance (and while operating in a the first mode and/or according to a first input scheme (e.g., being configured to operate in the first mode and/or a first input scheme)), the computer system detects a request to transition from operating according to a first input scheme (e.g., in a first input mode) (e.g., a mode where the computer system is configured to use an input scheme to perform one or more operations in response to detecting a first gaze pattern and a second gaze pattern (e.g., without detecting a respective hand input) (e.g., the second input scheme as described above in relation to FIGS. 11A1-11E3)) to operating according to a second input scheme (e.g., a second input scheme) (e.g., a mode where the computer is configured to use an input scheme to perform one or more operations in response to detecting a respective hand input with an external device while the computer system detects a first gaze pattern (e.g., the first input scheme as described above in relation to FIGS. 11A1-11E3)) that is different from the first input scheme. In some embodiments, the request to transition between the first mode and the second mode is detected using one or more techniques as described above in relation to transitioning between the first input scheme and the second input scheme as described above in relation to FIGS. 11A1-11E3)). In some embodiments, in response to detecting the request to transition from operating according to the first input scheme to operating according to the second input scheme, the computer system ceases to display the application launch virtual object. In some embodiments, in response to detecting the request to transition from operating in a first mode (and/or according to first input scheme) to operating in a second mode (and/or according to a second input scheme) that is different from the first mode (e.g., first input scheme), the computer system is configured to operate in the second mode and is no longer configured to operate in the first mode and the application launch virtual object is not displayed while the computer system is operating in the second mode. In some embodiments, while the application launch virtual object is not displayed and the computer system is operating in the second mode, the computer system detects a request to transition from operating in the second mode to operating in the first mode and, in response to detecting the request to transition to operate in the first mode, the computer system displays (and/or re-displays) the application launch virtual object. Ceasing to display the application launch virtual object in response to detecting the request to transition from operating according to the first scheme to operating according to the second scheme enables the computer system to change between modes and remove virtual objects that are unnecessary when the computer system is operating according to a different scheme without displaying additional controls and provides feedback about a state of the computer system (e.g., that the computer system is operating in the second mode).

In some embodiments, the plurality of virtual objects that represent corresponding applications includes a second virtual object that represents the first application. In some embodiments, while operating according to the second input scheme, the computer system detects that the attention of the user is directed to the second virtual object that represents the first application (e.g., as described above in relation to FIGS. 11A1-11E3 and FIGS. 19A-19E). In some embodiments, in response to detecting that the attention of the user is directed to the second virtual object that represents the first application for a respective threshold period of time (e.g., 0.2-5 seconds) and detecting a hand input (e.g., an air gesture, such as pinch gesture, a pinch-and-rotate gesture, and/or a pinch and twist gesture) at an external device (e.g., a criterion that is satisfied when the attention of the user is directed to one of the plurality of virtual objects while the hand input is detected at the external device) (e.g., a watch) (e.g., as described above in relation to FIGS. 11A1-11E3 and FIGS. 19A-19E), the computer system displays an application user interface of the first application (e.g., as described above in relation to FIGS. 11A1-11E3 and FIGS. 19A-19E). Displaying an application user interface of the first application in response to detecting that the attention of the user is directed to the second virtual object that represents the first application for the respective threshold period of time enables the computer system to display an application user interface when the attention of the user is directed to one of the plurality of virtual objects that represent corresponding applications while a hand input is detected at an external device without displaying additional controls.

In some embodiments, the computer system is in communication with a first set of audio output devices (e.g., one or more speakers). In some embodiments, in response to detecting that the attention (e.g., 1922a, 1922c, 1924a and/or 1924c) of the user is directed to the respective location: in accordance with a determination that the set of application launch criteria has been satisfied, the computer system outputs, via the first set of audio output devices, a first audio output (e.g., as described above in relation to FIGS. 19A-19B and 19E); and in accordance with a determination that the respective location corresponds to the location of the virtual object that represents the second application (and/or another virtual object that represents another application), the computer system outputs, via the first set of audio output devices, a second audio output that is different from (e.g., has a different sound than, has a different number of audible pulses than, is longer and/or shorter than) the first audio output (e.g., as described above in relation to FIGS. 19A-19B and 19E). In some embodiments, in accordance with a determination that the set of application launch criteria has been satisfied, the computer system causes an external device (e.g., smart watch) to output first feedback (e.g., haptic feedback, audio feedback, and/or visual feedback). In some embodiments, in accordance with a determination that the respective location corresponds to the location of the virtual object that represents the second application, the computer system causes the external device to output (e.g., provide and/or issue) second feedback that is different from the first feedback. Outputting different audio when the application is being and/or has been launched as compared to when different preview content is displayed allows the computer system to provide different feedback for different operations that the computer system performing, which provides feedback about a state of the computer system.

In some embodiments, the computer system displays a virtual object for controlling display of the plurality of virtual objects concurrently with the plurality of virtual objects (e.g., as described above in relation to FIGS. 19A-19B). In some embodiments, while displaying the virtual object for controlling display of the plurality of virtual objects concurrently with the plurality of virtual objects, the computer system detects that the attention of the user is directed to a location that corresponds to a location of the virtual object for controlling display of the plurality of virtual objects (e.g., a close user interface icon, an exit icon, and/or the like) (e.g., as described above in relation to FIGS. 19A-19B). In some embodiments, in response to detecting that the attention of the user is directed to the location that corresponds to the location of the virtual object for controlling display of the plurality of virtual objects, the computer system ceases to display the plurality of virtual objects (e.g., while continuing to display the plurality of virtual objects) (e.g., as described above in relation to FIGS. 19A-19B). Ceasing to display the plurality of virtual objects in response to detecting that the attention of the user is directed to the location that corresponds to the location of the virtual object for controlling display of the plurality of virtual objects enables the computer system to cease displaying the plurality of virtual user interface object without displaying additional controls.

In some embodiments, the plurality of virtual objects is displayed outside of (and does not overlap with and/or is not overlaid over) the representation (e.g., 920b and/or as described above in relation to FIGS. 19A-19B) of the first preview content (and the representation of the second preview content). Displaying the plurality of virtual objects outside of the representation of the first preview content allows for the virtual objects and the preview content to not be obstructed by each other, which improves the computer system's ability to disambiguate inputs directed to the first preview content from inputs directed to the virtual objects and to provide feedback about the state of the computer system (e.g., state of the preview content being displayed by the computer system and/or state of one or more operations being performed using the virtual objects).

In some embodiments, the computer system is in communication with a second set of audio output devices (e.g., one or more speakers). In some embodiments, in response to detecting that the attention (e.g., 1922a, 1922c, 1924a and/or 1924c) of the user is directed to the respective location (e.g., as described above in relation to FIGS. 19A-19B and 19E) and in accordance with a determination that the respective location corresponds to a location of one of the plurality of virtual objects (e.g., the virtual object that represents the first application, the virtual object that represents the second application, and/or the virtual object that represents the third application), the computer system outputs, via the second set of audio output devices, a third audio output (e.g., as the attention of the user is directed to one of the plurality of virtual objects) (e.g., as described above in relation to FIGS. 19A-19B and 19E). In some embodiments, in response to detecting that the attention of the user is directed to the respective location and in accordance with a determination that the respective location corresponds to a location of one of the plurality of virtual objects (e.g., the virtual object that represents the first application, the virtual object that represents the second application, and/or the virtual object that represents the third application), the computer system causes (e.g., provide and/or issue) an external device (e.g., a smart watch) to output third feedback (e.g., haptic feedback, audio feedback, and/or visual feedback). Outputting, via the second set of audio output devices, a third audio output in accordance with a determination that the respective location corresponds to a location of one of the plurality of virtual objects provides feedback about an operation that the computer system can perform in response to detecting that the attention of the user is directed to the respective location, which provides feedback about a state of the computer system.

In some embodiments, in accordance with a determination that the respective location corresponds to the location of one of the plurality of virtual objects and that the attention (e.g., 1922a, 1922c, 1924a and/or 1924c) of the user has been detected at the respective location for more than a third threshold amount of time, the third audio output is output for a first amount of time (e.g., 0.5-5 seconds) (e.g., as described above in relation to FIGS. 19A-19B and 19E). In some embodiments, in accordance with a determination that the respective location corresponds to the location of one of the plurality of virtual objects and the attention of the user has been detected at the respective location for less than the third threshold amount of time, the third audio output is output for a second amount of time (e.g., 0.1-3 seconds) that is less than the first amount of time (e.g., as described above in relation to FIGS. 19A-19B and 19E). In some embodiments, in accordance with a determination that the attention of the user has been detected at the respective location for more than a third threshold amount of time, the computer system causes an external device (e.g., a smart watch) to output (e.g., provide and/or issue) third feedback (e.g., haptic feedback, audio feedback, and/or visual feedback) that is output for a second amount of time. In some embodiments, in accordance with a determination that the attention of the user has been detected at the respective location for less than the third threshold amount of time, causes the external device to output third feedback for a fourth amount of time that is less than the third amount of time. Providing audio output based whether or not the attention of the user has been detected at the respective location for more than the third threshold amount of time enables the computer system to inform the user of a particular operation that the computer system will/can perform in response to detecting the attention of the user, which provides feedback about a state of the computer system.

In some embodiments, aspects/operations of methods 800, 1000, 1200, 1400, 1600, 1800, 2200, 2400, 2600, 2800, 3000, and 3200 may be interchanged, substituted, and/or added with the steps of method 2000. For example, method 2000 can be used to navigate a user interface after the computer system is transitioned to operate in a particular mode using method 1200. For brevity, these details are not repeated here.

FIGS. 21A-21F illustrate example techniques for displaying virtual objects for performing a physical activity, in accordance with some embodiments. FIGS. 22A-22B are a flow diagram of methods for displaying virtual objects for performing a physical activity, in accordance with some embodiments. The user interfaces in FIGS. 21A-21F are used to illustrate the method in FIGS. 22A-22B.

Figure 21A:
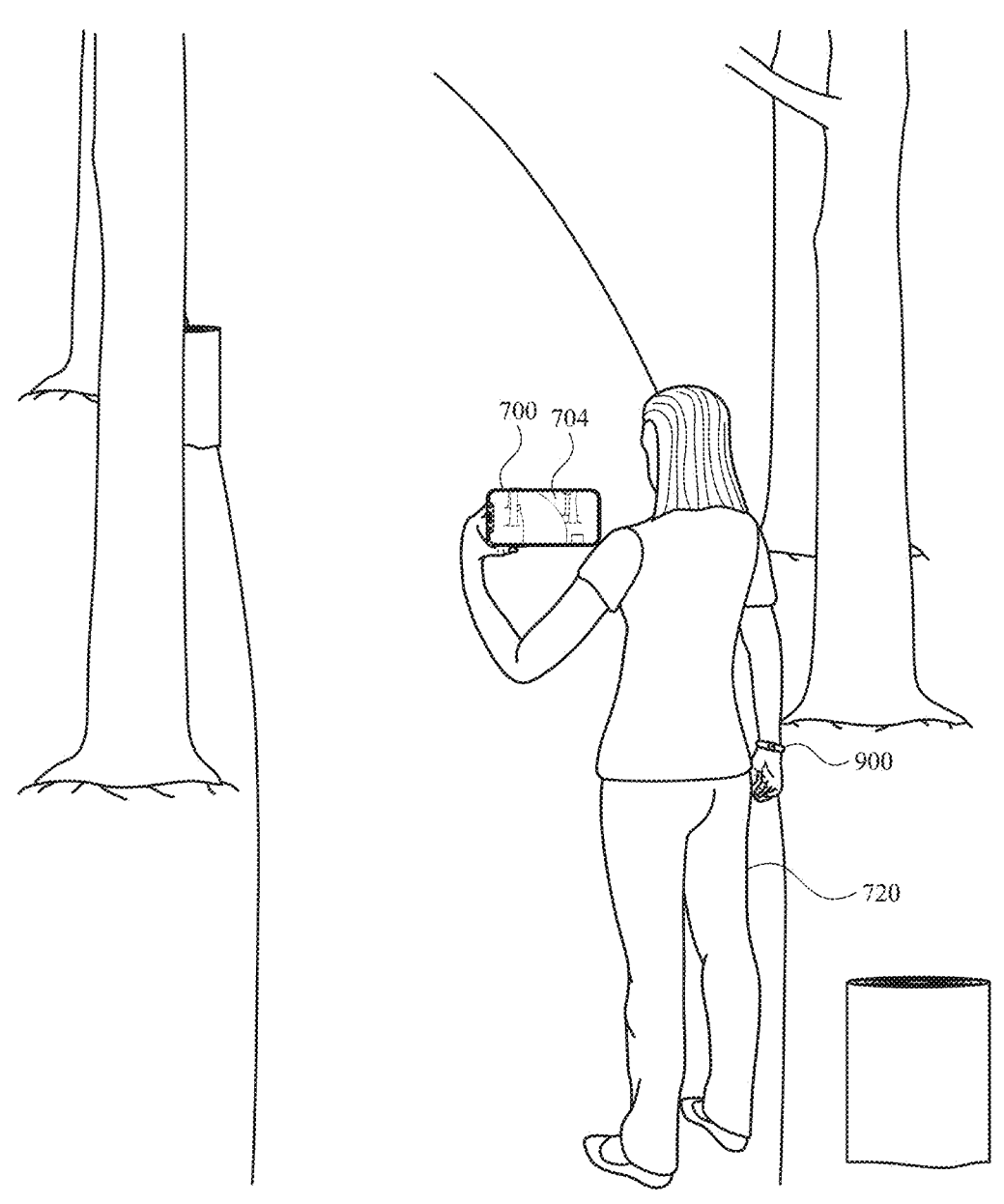
FIGS. 21A-21F illustrate example techniques for displaying virtual objects for performing a physical activity, in accordance with some embodiments.

FIG. 21A illustrates user 720 holding computer system 700 and wearing external device 900. Computer system 700 and external device 900 are positioned in a physical environment. The physical environment in FIG. 21 includes a walking path through a wooded area. At FIG. 21A, a representation of the physical environment is visible on display 704. While computer system 700 is a phone in FIG. 21A, computer system 700 can be one or more other devices, such as a tablet and/or a head-mounted device. In some embodiments, computer system 700 includes one or more components of computer system 101, and/or display 704 includes components of display generation component 120. In some embodiments, computer system 700, via display 704, displays a representation of the physical environment via one or more cameras in communication with computer system 700 (e.g., using "pass-through video" as described above). In some embodiments, display 704 displays a representation of a virtual environment (e.g., instead of the physical environment at FIG. 21A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the following description below will describe computer system 700 of FIGS. 21A-21F as displaying an AR user interface. In FIGS. 21A-21F, computer system 700 can overlay one or more virtual objects on the representation of the physical environment that "passes through" the transparent display (e.g., display 704) of computer system 700. In some embodiments, computer system 700 and external device 900 include one or more features as described above in relation to FIGS. 9A-9G (e.g., including displaying how computer system 700 can present an AR environment via display 704 using one or more different techniques). At FIG. 21A, computer system 700 (and/or external device 900) detects a request to initiate a physical activity (e.g., a physical activity tracking function), such as a workout (e.g., yoga, running, jogging, swimming, rowing, hiking, walking, biking, strength training, jumping, an acrobic workout, and/or an anaerobic workout). In some embodiments, detecting the request to initiate the physical activity includes a determination that computer system 700 is within (e.g., has entered) a geofenced area that corresponds to a workout and/or at a location in the physical environment that corresponds to a workout. Thus, in some embodiments, the request to initiate the physical activity is not detected by computer system 700 when a determination is made that computer system 700 is not within the geofenced area and/or the location in the physical environment that corresponds to the workout. In some embodiments, the geofenced area and/or the location in the physical environment corresponds to a workout that was previously completed by another user (e.g., a user other than user 720). In some embodiments, user 720 is associated with the other user by computer system 700 (e.g., the other user is categorized as a friend of user 720). In some embodiments, a computer system associated with the other user detects one or more inputs that cause the request to initiate the physical activity to be detected by computer system 700 (e.g., detected when computer system 700 enters the geofenced area).

Figure 21B:
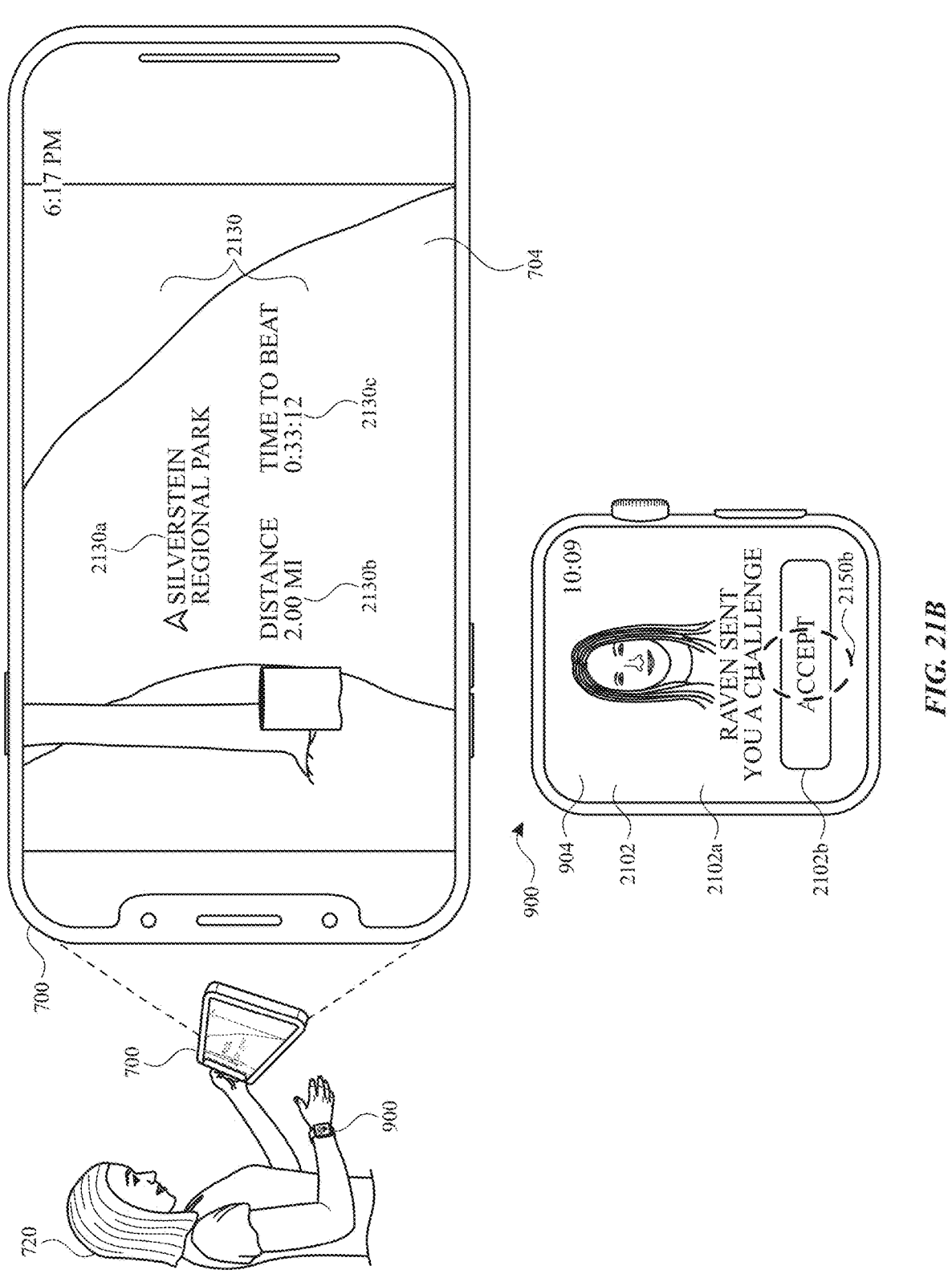

As illustrated in FIG. 21B, in response to detecting the request to initiate the physical activity, external device 900 displays (e.g., via display 904) workout challenge user interface 2102 that includes workout challenge notification 2102a ("Raven Sent You a Challenge") and accept user interface object 2102b. Challenge notification 2102a indicates that another user has sent user 720 a workout challenge. Here, the workout challenge is a workout that Raven (e.g., the other user) previously completed. As illustrated in FIG. 21B, in response to detecting the request to initiate the physical activity, computer system 700 displays (e.g., via display 704) workout challenge metrics 2130, which includes the location of the workout (e.g., location 2130a, "Silverstein Regional Park"), the distance of the workout (e.g., distance 2130b, "2.00 MI"), and the time to beat (e.g., time 2130c, "33:12"). In some embodiments, the time to beat is the time that it took Raven (e.g., the user who sent the workout challenge) to complete the same workout (e.g., run the 2.00-mile distance along a path at Silverstein Regional Park). Thus, in some embodiments, computer system 700 displays one or more workout metrics for one or more other users before the physical activity for user 720 is initiated. In some embodiments, in response to detecting the request to initiate the physical activity, computer system 700 displays a notification that is similar to workout challenge notification 2102*a* and/or a virtual object that is similar to accept user interface object 2102*b*. Thus, in some embodiments, one or more similar actions are performed in response to detecting an input (e.g., air gesture/input, physical input, and/or voice input) that is directed to the virtual object that is similar to accept user interface object 2102*b* that are performed in response to detecting tap input 2150*b* as described below. At FIG. 21B, external device 900 detects tap input 2150*b* on accept user interface object 2102*b*. In some embodiments, in response to detecting that tap input 2150*b* on accept user interface object 2102*b*, external device 900 initiates the physical activity and/or causes computer system 700 to initiate the physical activity.

Figure 21C:
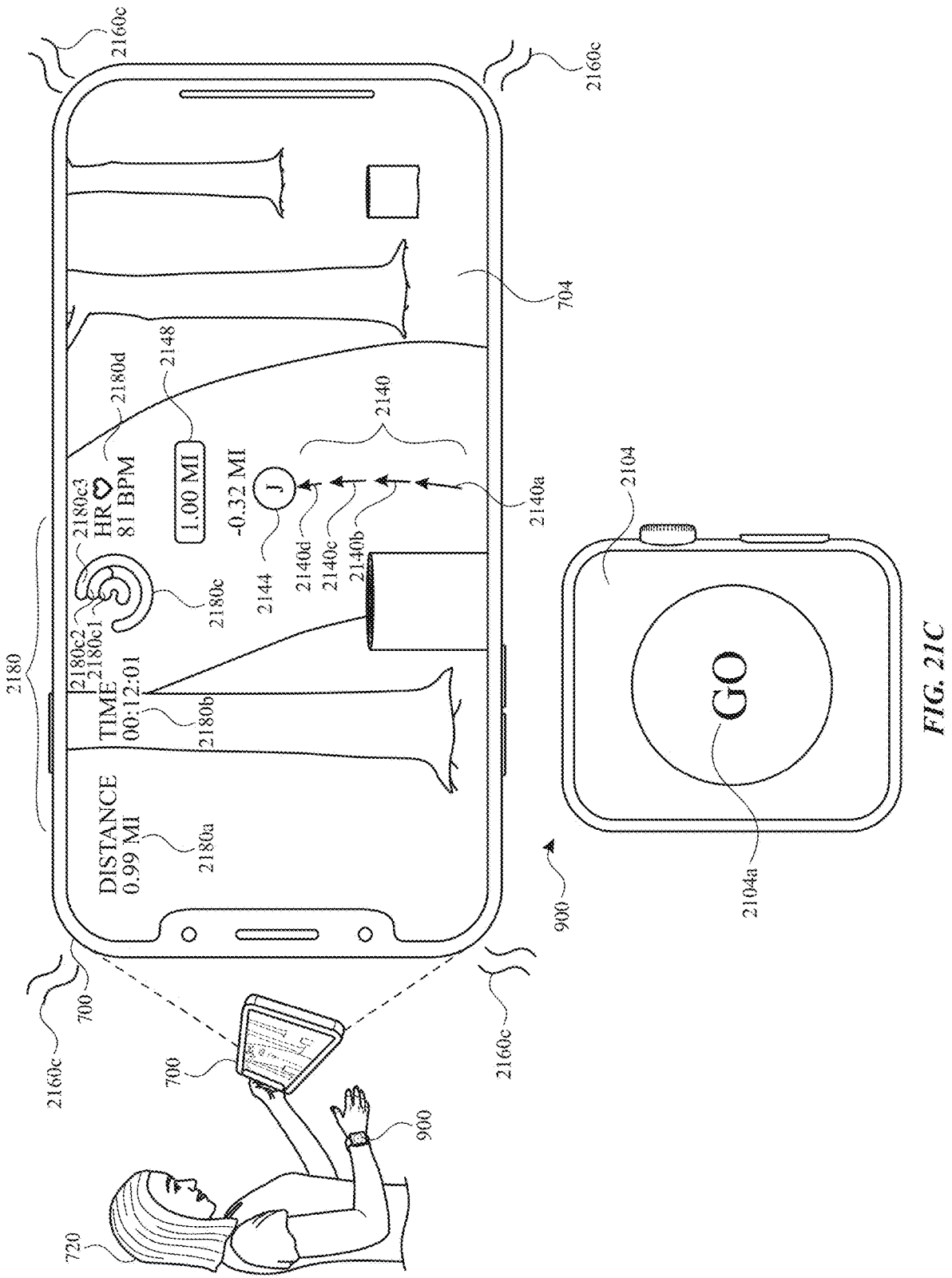

As illustrated in FIG. 21C, as a part of initiating the physical activity, external device 900 displays go notification 2104*a*, which indicates that the physical activity has been initiated. In some embodiments, external device 900 displays a countdown before displaying go notification 2104*a* (e.g., external device 900 displays "3," which is followed by "2," which is followed by "1," which is followed by go notification 2104*a*). In some embodiments, the countdown is displayed at the location of go notification 2104*a*.

As illustrated in FIG. 21C, as a part of initiating the physical activity, computer system 700 displays a user interface that includes viewpoint-locked virtual objects and environment-locked virtual objects. At FIG. 21C, the viewpoint-locked virtual objects include dashboard virtual objects 2180, which are displayed in an upper section of display 704 of computer system 700 (e.g., "dashboard region"). Dashboard virtual objects 2180 include distance virtual object 2180*a*, time virtual object 2180*b*, activity virtual object 2180*c*, and heart rate virtual object 2180*d*, which are all viewpoint-locked virtual objects. As illustrated in FIG. 21A, distance virtual object 2180*a* indicates that user 720 has traveled 0.99 miles ("0.99 MI") while completing the physical activity (e.g., running). Time virtual object 2180*b* indicates that user 720 has been completing the physical activity for twelve minutes and one second ("00: 12:01"). Activity virtual object 2180*c* indicates whether the user has completed various activity goals (e.g., daily, weekly, and/or monthly goals). At FIG. 21C, activity virtual object 2180*c* includes stand activity ring 2180*c1*, exercise activity ring 2180*c2*, and move activity ring 2180*c3*. Stand activity ring 2180*c1* indicates the number of times that the one or more computer systems (e.g., computer system 700 and/or external device 900) have detected that user 720 has stood (e.g., within a certain timeframe, such as every hour) relative to a standing activity goal (e.g., the user has stood at least once in an hour out of a goal of twelve hours). Exercise activity ring 2180*c2* indicates a number of calories that the one or more computer systems (e.g., computer system 700 and/or external device 900) have detected that user 720 has burned (and/or the amount of time a user has exercised) relative to a total amount of calories burned goal. Move activity ring 2180*c3* indicates an amount of movement (e.g., a number of steps and/or a number of calories) that the one or more computer systems have detected that user 720 has done relative to a total amount of movement goal. Heart rate virtual object 2180*d* indicates the current heart rate (e.g., average heart rate and/or heart rate reading at a particular point in time) of user 720.

At FIG. 21C, the environment-locked virtual objects include route portion virtual object 2140, other user avatar virtual object 2144, and milestone virtual object 2148. Route portion virtual object 2140 indicates the path that user 720 should take to complete the physical activity. At FIG. 21C, the path that user 720 should take is based on (or is the same as) the path that Raven (e.g., the other user) took while completing the physical activity. Path virtual object 2140 includes route portions 2140*a*-2140*d* (e.g., which are displayed using one or more techniques as described above in relation to route portions 1562*a*-1562*e* and 1564*a*-1564*e* in FIGS. 15A-15H and Table 1). At FIG. 21C, milestone virtual object 2148 is a mile marker. Milestone virtual object 2148 indicates a particular location where user 720 would have performed the physical activity (e.g., ran) for a particular distance (e.g., "1.00 MI at FIG. 21C) and is displayed using one or more techniques as described above in relation to navigation goal virtual object 1568. In some embodiments, audio is output based on a determination that user 720 has passed and/or made it to the location of the milestone. In some embodiments, the environment-locked virtual objects are displayed, as shown in FIG. 21C. In some embodiments, the environment-locked virtual objects are similar to those described above with reference to FIG. 15E.

Avatar virtual object 2144 indicates the location of where Raven (e.g., the other user) was while performing the physical activity relative to the location of user 720 (e.g., the viewpoint of the user as indicated by display 704) at a particular instance in time (e.g., 12:01). In other words, avatar virtual object 2144 indicates the pace set by Raven. At FIG. 21C, avatar virtual object 2144 includes an indication of the distance between the location of where Raven (e.g., the other user) was while completing the physical activity relative to the location of user 720 ("−0.32 MI" in FIG. 21C). At FIG. 21C, computer system 700 is outputting audio that corresponds to avatar virtual object 2144 (e.g., as indicated by audio output indication 2160*c*). In some embodiments, the audio that corresponds to avatar virtual object 2144 is spatial audio. In some embodiments, the audio that corresponds to avatar virtual object 2144 is output in a way where footsteps can be heard in the direction of avatar virtual object 2144 and relative to the viewpoint of user 720 (e.g., as indicated by display 704). For example, in some embodiments, as the viewpoint of user 720 gets closer to avatar virtual object 2144, the audio that corresponds to avatar virtual object is increased, and as the viewpoint of user 720 gets further away from avatar virtual object 2144, the audio that corresponds to avatar virtual object is decreased. In some embodiments, computer system 700 displays avatar virtual object 2144 as a non-environment-locked and moves (e.g., animates) the avatar based on how Raven moved while completing the physical activity. In some embodiments, computer system 700 displays avatar virtual object 2144 based on a determination that is made that the location of Raven (e.g., the other user) at the particular instance in time is within the viewpoint of the user. In some embodiments, computer system 700 does not display avatar virtual object 2144 based on a determination that is made that the location of Raven (e.g., the other user) at the particular instance in time is not within the viewpoint of the user. In some embodiments, the user interface that includes viewpoint-locked virtual objects and the environment-locked virtual objects are displayed while external device 900 is displaying a countdown. In some embodiments, the user interface that includes the viewpoint-locked virtual objects and the environment-locked virtual objects are displayed after (or while) external device 900 displays go notification 2104*a*.

Figure 21D:
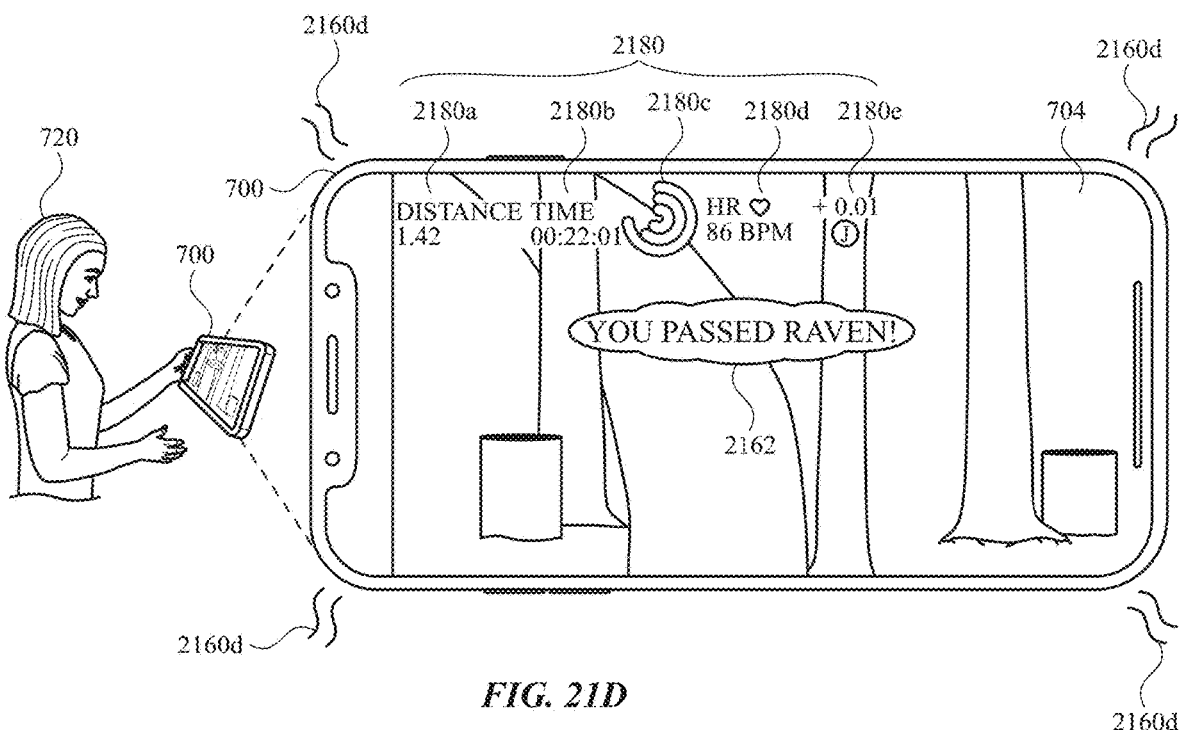

At FIG. 21D, an amount of time has passed since the time at which the user interface of FIG. 21C was displayed. As illustrated in FIG. 21D, dashboard virtual objects 2180 (e.g., 2180*a*-2180*d*) are updated to reflect the changes that have occurred since the user interface of FIG. 21C was displayed. At FIG. 21D, a determination is made that user 720 has passed the location at which Raven was at a particular time while completing the activity (e.g., as indicated by 2180*b*). As illustrated in FIG. 21D, because the determination was made that user 720 passed the location at which Raven was located at a particular time while performing the activity, computer system 700 displays notification 2162 ("You Passed Jane"). At FIG. 21D, because the determination was made that user 720 passed the location at which Raven was located at a particular time while completing the activity, computer system 700 outputs audio that indicates that user 720 has passed Raven (e.g., as indicated by audio indication 2160*d*). In some embodiments, while (and/or for some time while) user 720 is ahead of Raven, computer system 700 outputs spatial audio (e.g., footsteps) that indicates how far user 720 is ahead of user 720 (e.g., using similar techniques as described above in relation to outputting the audio in FIG. 21C).

As illustrated in FIG. 21D, because the determination was made that user 720 passed the location at which Raven was located at a particular time while performing the activity, computer system 700 ceases to display avatar virtual object 2144 and displays avatar virtual object 2180*e* in the dashboard region. Notably, at FIG. 21D, avatar virtual object 2180*e* indicates that user 720 is 0.01 miles ahead of where Raven (e.g., the other user) was located at the particular instance in time (e.g., as indicated by time virtual object 2180*b*) while completing the physical activity. In FIG. 21D, avatar virtual object 2180*e* is a viewpoint-locked virtual object. Thus, computer system 700 changes the representation of the pace of Raven from a non-viewpoint-locked virtual object to a viewpoint-locked virtual object (e.g., because the determination was made that user 720 passed the location at which Raven was located at a particular time while performing the activity). In some embodiments, computer system 700 transitions the representation of the pace of Raven from a viewpoint-locked virtual object (e.g., avatar virtual object 2180*c*) to a non-viewpoint-locked virtual object based on a determination that the location of user 720 (or the viewpoint of user 720) is behind (has fallen behind) the location at which Raven was located at a particular time while completing the activity. In some embodiments, because the determination was made that user 720 passed the location at which Raven was located at a particular time while performing the activity, computer system 700 displays an animation that transitions the display of avatar virtual object 2144 of FIG. 21C to the display of avatar virtual object 2180*e* of FIG. 21D. In some embodiments, displaying the animation includes moving the avatar virtual object 2144 of FIG. 21C from being outside of the dashboard region (e.g., as shown in FIG. 21C) to the dashboard region (e.g., as shown in FIG. 21D). In some embodiments, avatar virtual object 2144 of FIG. 21C floats up to be displayed in the dashboard region to display avatar virtual object 2180*e* of FIG. 21D. In some embodiments, the dashboard region is at a different location (e.g., bottom, right, and/or left) on display 704 than the upper section of display 704. In some embodiments, computer system 700 displays an animation of that transitions display of avatar virtual object 2180*e* of FIG. 21D to the display of avatar virtual object 2144 of FIG. 21C (e.g., where avatar virtual object 2180*e* of FIG. 21D floats down to display avatar virtual object 2144 of FIG. 21C) based on a determination that is made that user 720 has fallen behind Raven (e.g., location of user 720 is now behind the location at which Raven was located at a particular instance in time while completing the physical activity). In some embodiments, computer system 700 outputs audio that indicates that user 720 has fallen behind Raven. Thus, in some embodiments, computer system 700 displays avatar virtual object 2144 of FIG. 21C while the pace of user 720 is ahead of the pace of Raven (e.g., the other user) and displays avatar virtual object 2180*e* of FIG. 21D while the pace of user 720 is behind the pace of Raven.

Figure 21E:
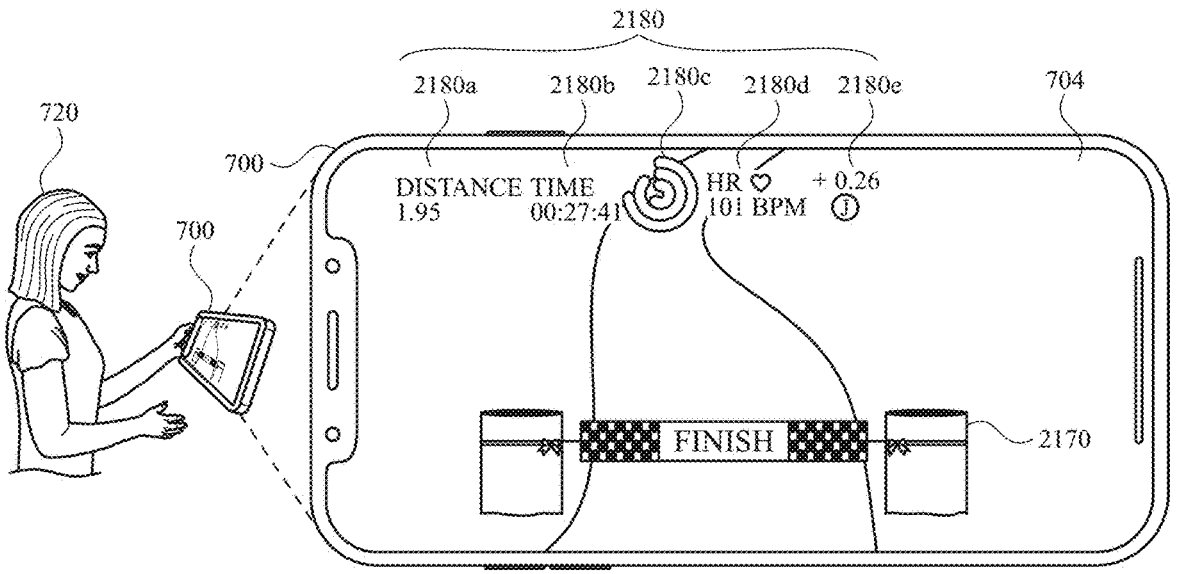
Figure 21F:
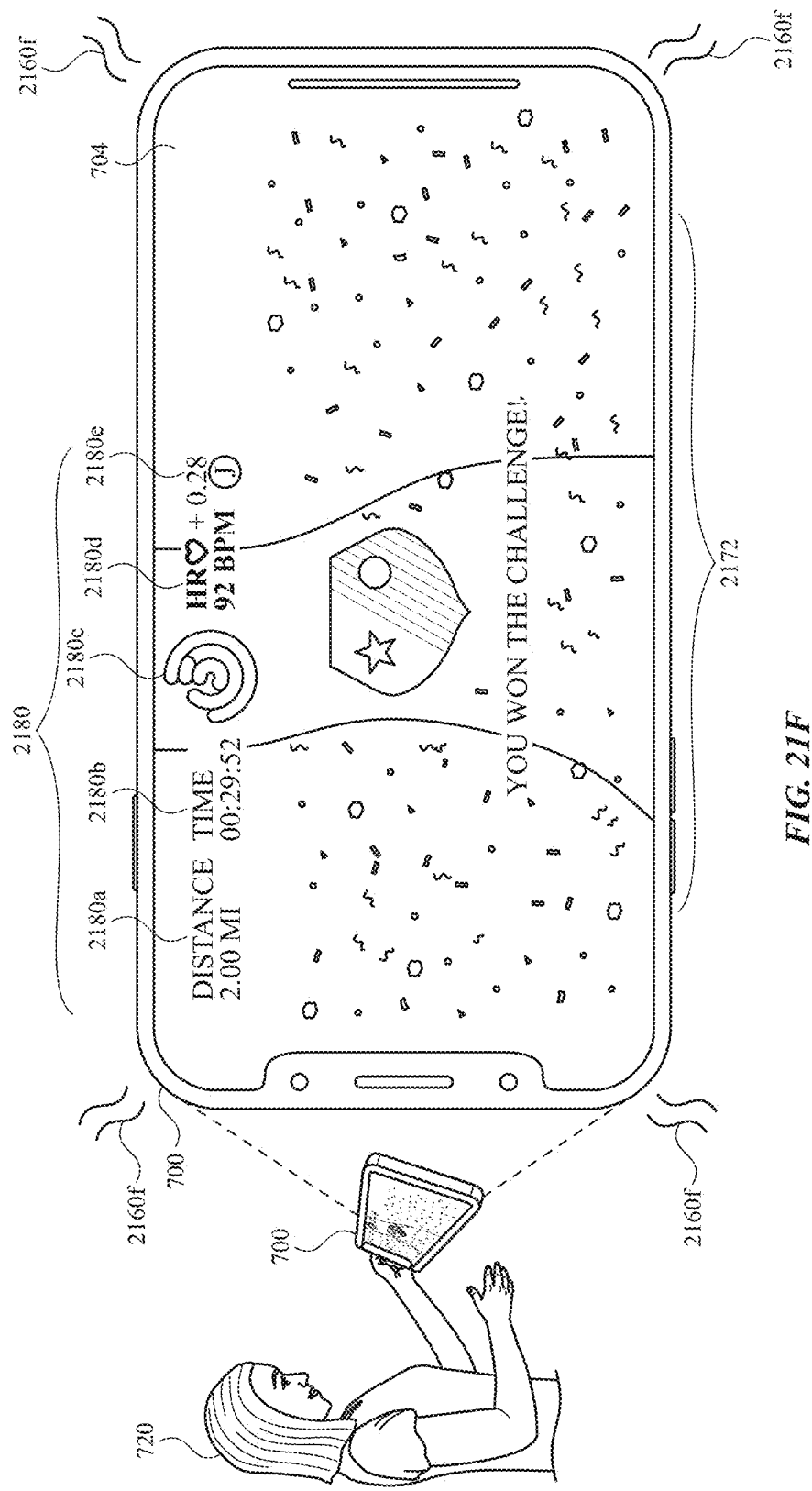

At FIG. 21E, an amount of time has passed since the time at which the user interface of FIG. 21D was displayed. As illustrated in FIG. 21E, dashboard virtual objects 2180 (e.g., 2180*a*-2180*d*) are updated to reflect the changes that have occurred since user interface of FIG. 21D was displayed. As illustrated in FIG. 21E, computer system 700 displays milestone 2170, which is a finish line because a determination was made that the location that marks the end of the physical activity is within the viewpoint of user 720. At FIG. 21F, computer system 700 displays celebration notification 2172 (e.g., "You Won the Challenge") and outputs audio (e.g., as indicated by audio output indication 2160*f*) because a determination was made that user 720 won the challenge (e.g., user 720 finished the race at a faster pace than Raven). Computer system 700 displays celebration notification 2172 as being overlaid over a portion of the physical environment. In some embodiments, celebration notification 2172 and/or one or more parts of celebration notification 2172 (e.g., the confetti) cease to be displayed after a predetermined period of time (e.g., 1-5 seconds). In some embodiments, celebrate notification 2172 is animated (e.g., confetti falling down). In some embodiments, computer system 700 outputs audio that indicates that user 720 won the challenge at FIG. 21E. In some embodiments, computer system 700 does not display celebration notification 2172 based on a determination that is made that user 720 did not win the challenge. In some embodiments, computer system 700 displays a notification that is different from celebration notification 2172, where the different notification indicates that user 720 did not win the challenge. In some embodiments, computer system 700 outputs audio that indicates that user 720 did not win the challenge based on the determination that is made that user 720 did not win the challenge.

Additional descriptions regarding FIGS. 21A-21F are provided below in reference to method 2200 described with respect to FIGS. 21A-21F.

FIGS. 22A-22B are a flow diagram of an exemplary method 2200 for displaying virtual objects for performing a physical activity, in accordance with some embodiments. In some embodiments, method 2200 is performed at a computer system (e.g., 700) that is in communication with and a display generation component (e.g., a display controller, a touch-sensitive display system, a display (e.g., integrated and/or connected), a 3D display, a transparent display, a projector, a heads-up display, and/or a head-mounted display) (e.g., that is configured to display visual content over a display area (e.g., area of display screen and/or lens). In some embodiments, the computer system includes one or more gaze-tracking sensors (e.g., an optical and/or IR camera configured to track a direction of attention of a user of the computer system). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 2200 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 2200 are, optionally, combined and/or the order of some operations is, optionally, changed.

While the computer system (e.g., 700) is being used (e.g., being worn and/or in a state where one or more inputs into and/or movement of the computer system is (and/or can be) detected) in a physical environment (and while an external device (e.g., watch, phone, and/or tablet) (a device that is different from the computer system) is being used), the computer system (e.g., 700) detects (2202) a request (e.g., 2150*b*) to initiate an activity (e.g., a workout (e.g., yoga, running, jogging, swimming, rowing, hiking, walking, biking, strength training, jumping, an aerobic workout, and/or an anaerobic workout) and/or a physical activity) in the physical environment (e.g., as described above in relation to FIGS. 21A-21C). In some embodiments, the request is detected based on one or more inputs received at an external device.

The computer system (e.g., 700), after detecting the request to initiate the activity in the physical environment, displays (2204), via the display generation component, a first user interface (e.g., as described above in 21B-21C) (e.g., a virtual reality user interface, an extended reality user interface, and/or a mixed reality user interface). As a part of displaying the first user interface, the computer system displays, via the display generation component, a set of one or more viewpoint-locked virtual objects (e.g., 2180*a*-2180*d*) in a three-dimensional environment that have a respective (e.g., fixed) orientation relative to the physical environment (e.g., a set of virtual objects that are body locked (e.g., head locked) and/or locked to a user's body, a set of virtual objects that are displayed in a fixed orientation to one or more hardware elements (e.g., the display generation component and/or one or more cameras of the computer system) of the computer system, and/or a set of virtual objects that are displayed irrespective of where the computer system is moved in the physical environment), the set of one or more viewpoint-locked virtual objects (e.g., 2180*a*-2180*d*) representing one or more activity metrics (e.g., heart rate, distance traveled, time remaining in workout, and/or current duration of workout), where the set of one or more viewpoint-locked virtual objects is displayed with (e.g., at) a first viewpoint position relative to a viewpoint of the user and a first environment position relative to the three-dimensional environment (and/or in a first area (e.g., and/or at a first location) of the computer system (e.g., of a display, a screen, and/or lens of the computer system) and/or the display area) (e.g., and/or a virtual environment) (e.g., a set of virtual objects that are moved to a different location on the physical environment when the computer system is moved in the physical environment) (e.g., the first set of virtual objects is displayed as a part of an extended reality user interface), and the computer system displays, via the display generation component, a set of one or more environment-locked virtual objects (e.g., 2140, 2140*a*-2140*d*, 2144, 2148, 2160, and/or 2170) (e.g., a set of virtual objects that are world locked (e.g., locked to the physical environment and/or the virtual environment) and/or a set of virtual objects that are displayed and/or cease to be displayed based on where the computer system is moved in the physical environment) (e.g., a set of virtual objects that are not moved to a different location in the physical environment when the computer system is moved on the physical environment) in the three-dimensional environment representing one or more activity progress indicators (e.g., one or more directions, one or more paths for a user to follow, one or more milestones (e.g., mile marker, finish line, and/or indication of a pace set by another user), wherein the set of one or more environment-locked virtual objects is displayed with (e.g., at) a second viewpoint position relative to the viewpoint of the user and a second environment position relative to the three-dimensional environment (e.g., the second set of virtual objects is displayed as a part of an extended reality user interface).

In some embodiments, the first set of virtual objects and the second set of virtual objects are overlaid on a representation (e.g., a virtual representation and/or the physical environment passed through a display, screen, and/or lens of the computer system of the physical environment. In some embodiments, the first set of virtual objects are displayed closer to the edge of the computer system than the second set of virtual objects.

The computer system (e.g., 700), while displaying, via the display generation component, the first user interface (e.g., that includes the set of one or more viewpoint-locked virtual objects and the set of one or more environment-locked virtual objects), detects (2206) a change in the viewpoint of the user relative to the three-dimensional environment (e.g., from a first location in the physical environment) (e.g., a first location that corresponds to the physical location of the computer system) to a second location in the physical environment (e.g., a second location that corresponds to the physical location of the computer system) (e.g., detecting a change in the viewpoint of the user relative to the three-dimensional environment).

The computer system (e.g., 700), in response to detecting the change in the viewpoint of the user relative to the three-dimensional environment, updates (2208) the user interface (e.g., in response to detecting the change in the viewpoint of the user relative to the three-dimensional environment), including: displaying, via the display generation component, the set of one or more viewpoint-locked virtual objects (e.g., 2180*a*-2180*d*) with the first viewpoint position relative to the viewpoint of the user and a third environment position relative to the three-dimensional environment (e.g., and not with the first environment position); and displaying, via the display generation component, the set of one or more environment-locked virtual objects (e.g., 2140, 2140*a*-2140*d*, 2144, 2148, 2160, and/or 2170) with a third viewpoint position relative to the viewpoint of the user (and not the second viewpoint position) and the second environment position relative to the three-dimensional environment, wherein the third viewpoint position is different from the second viewpoint position (e.g., as described above in relation to FIGS. 21C-21E). In some embodiments, the third environment position is different from the first environment position (e.g., as described above in relation to FIGS. 21C-21E).

In some embodiments, displaying the set of one or more viewpoint-locked virtual objects with the first viewpoint position relative to the viewpoint of the user and a third environment position relative to the three-dimensional environment and displaying the set of one or more environment-locked virtual objects with a third viewpoint position relative to the viewpoint of the user and the second environment position relative to the three-dimensional environment in response to detecting the change in the viewpoint of the user relative to the three-dimensional environment enables the computer system to adjust the display of virtual objects representing one or more activity metrics differently than the display of virtual objects representing one or more activity progress indicators without displaying additional controls, allows the computer system to display virtual objects based on their relevance to the viewpoint of the user and/or the three-dimensional environment without displaying additional controls, and reduces the number of inputs needs for a user to adjust the display of one or more of the virtual objects.

In some embodiments, the set of one or more viewpoint-locked virtual objects (e.g., 2180a-2180d) includes a first viewpoint-locked virtual object (e.g., 2180c) that is a graphical representation (e.g., a circular representation (e.g., a ring) (e.g., where a full circle represents completion of the activity goal and a partial circle represents the percentage of the activity goal that has been completed and/or the percentage of the activity goal that is left to complete)) (e.g., a bar graph and/or a line graph) concerning (e.g., indicative of the status and/or progress of completing an activity goal) completion of a physical activity goal (e.g., an activity goal that does not correspond to (e.g., is not created and/or generated due to) the activity in the physical environment and/or a global activity goal where data (e.g., movement data) from multiple workouts and/or activities is used to determine whether or not a user has completed the goal). In some embodiments, displaying the set of one or more viewpoint-locked virtual objects that includes a first viewpoint-locked virtual object that is a graphical representation completion of an activity goal provides feedback about the state of the computer system (e.g., the state of the computer system's data collection regarding the completion of the activity goal).

In some embodiments, the set of one or more viewpoint-locked virtual objects includes a second viewpoint-locked virtual object that represents a heart rate (e.g., a current heart rate of the user of the computer system) (e.g., a heart rate measured the activity (e.g., average heart rate, lowest heart rate, highest heart rate, median heart rate, etc.). In some embodiments, the heart rate is detected by one or more heart rate sensors that are in communication with the computer system and/or an external device (e.g., wearable device, such as a smart watch and/or smart ring) that has one or more heart rate sensors. In some embodiments, displaying the set of one or more viewpoint-locked virtual objects that includes a second viewpoint-locked virtual object that represents a heart rate provides feedback about the state of the computer system (e.g., the state of the computer system's data collection regarding the heart rate of the user and/or the state of one or more heart rate sensors that are in communication with the computer system).

In some embodiments, the set of one or more viewpoint-locked virtual objects (e.g., 2180a-2180d) includes a third viewpoint-locked virtual object (e.g., 2180a) that represents a distance (e.g., a distance that a user has traveled while performing the activity (and/or a portion of the activity) and/or a distance that the user has to travel to complete the activity (and/or a portion of the activity)) (e.g., a total distance that the user has traveled over a period of time (e.g., time to complete the activity and/or a predefined amount of time (e.g., a day, a week, and/or a month)). In some embodiments, displaying the set of one or more viewpoint-locked virtual objects that includes a third viewpoint-locked virtual object that represents a distance provides feedback about the state of the computer system (e.g., the state of the computer system's data collection regarding distance related to movement of the computer system in the three-dimensional environment).

In some embodiments, the set of one or more viewpoint-locked virtual objects (e.g., 2180a-2180d) includes a fourth viewpoint-locked virtual object (e.g., 2180b) that represents a time (e.g., an estimated time for completing the activity, a current time, and/or a portion of the activity and/or an estimated or actual time that the user has been performing an activity and/or a portion of the activity). In some embodiments, the first viewpoint-locked virtual object, the second viewpoint-locked virtual object, the third viewpoint-locked virtual object, and/or fourth viewpoint-locked virtual object are concurrently displayed. In some embodiments, at least one of the set of one or more viewpoint-locked virtual objects are updated over a period of time (e.g., as the user completes and/or performs the activity)). In some embodiments, displaying the set of one or more viewpoint-locked virtual objects that includes a fourth viewpoint-locked virtual object that represents a time provides feedback about the state of the computer system (e.g., the state of the computer system's data collection regarding time related the computer system in the three-dimensional environment).

In some embodiments, the set of one or more environment-locked virtual objects includes a first environment-locked virtual object (e.g., 2140) that is at least a portion of a first path (e.g., visual guidance of a direction of travel (e.g., for performing the activity) (e.g., a path that a user can follow to perform and/or complete the activity) (e.g., path is determined based on run that was done by user that sent invitation to start the current workout). In some embodiments, the path was determined based on a path that was taken by another user (e.g., a user that sent an invitation to initiate and/or start the current activity (e.g., current workout). In some embodiments, the invitation to initiate includes a representation of at least a portion of the path and/or an identifier that corresponds to the path. In some embodiments, displaying the set of one or more environment-locked virtual objects includes a first environment-locked virtual object that is at least a portion of a first path provides the user with feedback concerning a path for performing the activity, which includes feedback about a state of the computer system (e.g., the intended path of travel for the computer system and/or a path that is detected by the computer system) (e.g., and how the state of the computer system relates to a portion of the three-dimensional environment).

In some embodiments, the set of one or more environment-locked virtual objects includes a second environment-locked virtual object (e.g., 2148 and/or 2170) that represents a milestone (e.g., an indicator of a significant change or stage in the current activity) that corresponds to performing the activity (e.g., completing a mile while running, reaching and/or completing a particular portion of the activity) (e.g., reach a quarter-way, half-way, and/or eight-tenths way point) (e.g., destination, time, and/or number of repetitions and/or sets) for completing the activity). In some embodiments, displaying the set of one or more environment-locked virtual objects includes a second environment-locked virtual object that represents a milestone that corresponds to performing the activity provides the user with feedback concerning a state of the computer system (e.g., a milestone that is detected by the computer system) (e.g., and how the state of the computer system relates to a portion of the three-dimensional environment).

In some embodiments, the milestone (e.g., 2148) indicates a distance along a second path (e.g., the milestone is a mile marker) (e.g., a path for performing the physical activity) (e.g., from a starting location on the path to the location represented by the milestone). In some embodiments, the milestone is overlaid on top of a surface of the path. In some embodiments, the milestone is adjacent to, above, and/or below the path. In some embodiments, the milestone is environment-locked to a location in the physical environment that represents the distance along the second path. In some embodiments, displaying the set of one or more environment-locked virtual objects includes a second environment-locked virtual object that represents a milestone that corresponds to performing the activity and indicates a distance along a second path provides the user with feedback concerning a state of the computer system (e.g., a milestone that is detected by the computer system) (e.g., and how the state of the computer system relates to a portion of the three-dimensional environment).

In some embodiments, the milestone (e.g., 2170 and/or 2172) indicates an area that needs to be reached in order for the activity to be completed (e.g., a finish line and/or a graphical representation of a target). In some embodiments, the area for completing the physical activity is overlaid on a portion of the path. In some embodiments, in accordance with a determination that the computer system has reached the area that needs to be reach in order for the activity to be completed, the computer system terminates the activity and/or displays one or more metrics that correspond to the activity (e.g., total miles run, average heart rate during performance of the activity, fastest pace while performing the activity, and/or total calories burned during performance of the activity). In some embodiments, displaying the set of one or more environment-locked virtual objects includes a second environment-locked virtual object that represents a milestone that corresponds to performing the activity and indicates an area that needs to be reached in order for the activity to be completed (e.g., a milestone that is detected by the computer system) (e.g., and how the state of the computer system relates to a portion of the three-dimensional environment).

In some embodiments, the second environment-locked virtual object (e.g., 2148) that represents the milestone is locked to a first respective location in the three-dimensional environment. In some embodiments, while displaying the second environment-locked virtual object that represents the milestone, the computer system detects a change in position of a first respective viewpoint of the user to a first current location (e.g., as described above in relation to FIGS. 21C-21D). In some embodiments, in response to detecting the change in the position of the first respective viewpoint of the user to the first current location (e.g., as described above in relation to FIGS. 21C-21D) and in accordance a determination that the first current location corresponds to (e.g., is within a certain distance of and/or is further along a path than the first respective location) the first respective location, the computer system displays, via the display generation component, a set of virtual objects (e.g., 2162 and/or 2172) that indicate that the milestone has been reached (e.g., as described above in relation to FIGS. 21C-21D) (e.g., completed and/or satisfied) (e.g., a set of celebration virtual objects and/or one or more animations of celebration) (in some embodiments, the animation includes words that indicate that the milestone has been completed) (e.g., "Way to go", "Milestone Completed," and/or "Good job") and/or one or more animated virtual objects (e.g., balloons rising, confetti falling, and/or lights flashing). In some embodiments, the set of virtual objects that indicate that the milestone has been reached are environment-locked virtual objects. In some embodiments, the set of virtual objects that indicate that the milestone has been reached cease to be displayed after a predetermined period of time (e.g., 1-5 seconds) and, in some embodiments, irrespective of whether or not the viewpoint of the user changes. In some embodiments, displaying, via the display generation component, a set of virtual objects that indicate that the milestone has been completed (e.g., when prescribed conditions are met) causes the computer system to automatically perform the operation of displaying the set of virtual objects that indicate the milestone has been completed when a determination the viewpoint of the user is within a predetermined distance of the milestone and provides the user with feedback about the state of the computer system.

In some embodiments, the computer system is in communication with a first set of audio output devices. In some embodiments, the second environment-locked virtual object that represents the milestone (e.g., 2148 and/or 2170) is locked to a second respective location in the three-dimensional environment. In some embodiments, while displaying the second environment-locked virtual object that represents the milestone, the computer system detects a change in position of a second respective viewpoint of the user to a second current location (e.g., as described above in relation to FIGS. 21C-21E). In some embodiments, in response to detecting the change in the position of the second respective viewpoint of the user to the second current location (e.g., as described above in relation to FIGS. 21C-21E): in accordance a determination that the second current location corresponds to (e.g., is within a certain distance of and/or is further along a path than the second respective location) the second respective location, the computer system outputs, via the first set of audio output devices, a first audible output (e.g., 2160d and/or 2160f). In some embodiments, the computer system outputs the first audible output as the viewpoint of the user crosses the location that corresponds to the second environment-locked virtual object. In some embodiments, the computer system outputs, via the first set of audio output devices, a first audible output (e.g., when prescribed conditions are met) causes the computer system to automatically provide the first audible output when a determination the viewpoint of the user is within a predetermined distance of the milestone and provides the user with feedback about the state of the computer system.

In some embodiments, the user is a first user. In some embodiments, while displaying, via the display generation component, the first user interface, the computer system displays a virtual object (e.g., 2144 and/or 2180d) that indicates a pace that was set for the activity by a second user who is different from the first user (e.g., a user of a second computer system that is different from the computer system). In some embodiments, the pace was set by the user who is different from the user of the computer system while the user who is different from the user of the computer system was performing the activity (e.g., via the second computer system). In some embodiments, the virtual object that indicates the pace is an environment-locked virtual object. In some embodiments, the virtual object that indicates the pace is a viewpoint-locked virtual object. In some embodiments, while the computer system displays, via the display generation component, display of the first user interface, displaying a virtual object that indicates a pace that was set by the user (e.g., when the user previously completed the activity). In some embodiments, displaying a virtual object that indicates a pace that was set for the activity by a second user who is different from the first user provides feedback about the state of the computer system relative to a state of the second user's computer system (e.g., with respect to a particular timeframe).

In some embodiments, the virtual object (e.g., 2144) that indicates pace is an avatar (e.g., an avatar that represents the user who is different from the user of the computer system) performing (e.g., running, walking, jogging, lifting, moving, throwing, and/or swinging) the activity (e.g., an animated avatar). In some embodiments, the virtual object that indicates pace is displayed at a location that is different from a location that corresponds to the location of the user (e.g., in the viewpoint of the user (e.g., running in front of the user) (e.g., a location of the viewpoint of the user). In some embodiments, the avatar is performing a portion of the activity that has not been performed by the user (e.g., is running along a portion of the path that the user has not reached). In some embodiments, the avatar is displayed concurrently with the virtual object that indicates pace. In some embodiments, the avatar is not displayed in a predetermined area of the first user interface, rather the location at which the avatar is displayed is locked to a location in the physical environment and/or three-dimensional environment. In some embodiments, the avatar is environment-locked to a set of locations in the three-dimension and/or physical environment (e.g., where the avatar is locked to a particular location in the three-dimensional environment based on a particular time at which the avatar is being displayed) (e.g., locked along locations of a path in the three-dimensional environment that was taken when the activity was previously completed). In some embodiments, displaying a virtual object that indicates a pace that is an avatar performing the activity provides feedback about the state of the computer system relative to a state of the second user's computer system (e.g., with respect to a particular timeframe) (e.g., pace of second user's computer system is ahead of the pace of the computer system).

In some embodiments, the virtual object (e.g., 2180d) that indicates pace is displayed in a predetermined area (e.g., along one edge of the interface) on the first user interface (e.g., displayed as being a part of the set of one or more viewpoint-locked virtual objects (e.g., that are also displayed in the predetermined area)) (e.g., as described above in relation to FIG. 21D). In some embodiments, the virtual object that indicates pace is viewpoint locked. In some embodiments, displaying a virtual object that indicates a pace that is an avatar performing the activity provides feedback about the state of the computer system relative to a state of the second user's computer system (e.g., with respect to a particular timeframe) (e.g., pace of second user's computer system is behind the pace of the computer system).

In some embodiments, the virtual object (e.g., 2144 and 2180e) that indicates pace is displayed in a first region of the first user interface. In some embodiments, while displaying the virtual object that indicates pace in the first region of the user interface (e.g., while the virtual object that indicates pace is an avatar performing the activity) (e.g., a region of the first user interface that includes a path for completing the activity and/or a region of the user interface that includes the set of environment-locked virtual objects but does not include the set of viewpoint-locked virtual objects, and/or a middle portion of the first user interface) (e.g., as described above in relation to FIG. 21C), the computer system detects a second change in the viewpoint of the user relative to the three-dimensional environment (e.g., as described above in relation to FIGS. 21C-21D). In some embodiments, in response to detecting the second change in the viewpoint of the user relative to the three-dimensional environment and in accordance with a determination that a third location (e.g., an actual location or virtual location) that corresponds to (e.g., that corresponds to a location of) the viewpoint of the user is within a predetermined distance of (e.g., within a predetermined distance before and/or after) a location that corresponds to the virtual object that indicates pace (e.g., a location that corresponds to a current location of the avatar), the computer system moves the virtual object (e.g., 2144 and/or 2180c) that indicates pace from the first region of the first user interface to a second region of the first user interface (e.g., a region of the first user interface that does not include a path for completing the activity and/or a region of the user interface that does not include the set of environment-locked virtual objects but does include the set of viewpoint-locked virtual objects, and/or a top and/or bottom portion of the first user interface) that is different from the first region of the first user interface (e.g., as described above in relation to FIG. 21D). In some embodiments, while the virtual object is displayed in the second region, the virtual object is not an avatar performing the activity. In some embodiments, in response to detecting the second change in the viewpoint of the user relative to the three-dimensional environment and in accordance with a determination that the third location that corresponds to the viewpoint of the user is not within a predetermined distance of the location that corresponds to the virtual object that indicates pace, the computer system does not move the virtual object the virtual object that indicates pace from the first region of the first user interface to the second region of the first user interface. In some embodiments, moving the virtual object that indicates pace from the first region of the first user interface to a second region of the first user interface that is different from the first region of the first user interface (e.g., when prescribes conditions are met) causes the computer system to automatically change the location of the virtual object based on whether or not the pace of a second user's computer system is ahead or behind the pace of the computer system and provides feedback about the state of the computer system relative to a state of the second user's computer system (e.g., with respect to a particular timeframe) (e.g., pace of second user's computer system is behind the pace of the computer system).

In some embodiments, the virtual object (e.g., 2144) that indicates pace is an avatar (e.g., 2144) (e.g., performing the activity) that is environment-locked to a set of locations in the three-dimensional environment (e.g., where the avatar is locked to a particular location in the three-dimensional environment based on a particular time at which the avatar is being displayed) (e.g., locked along locations of a path in the three-dimensional environment that was taken when the activity was previously completed). In some embodiments, while displaying the virtual object that indicates pace and while the virtual object that indicates pace is the avatar that is environment-locked to the set of locations in the three-dimensional environment, the computer system detects a third change in the viewpoint of the user relative to the three-dimensional environment (e.g., as described above in relation to FIGS. 21C-21D). In some embodiments, the avatar could have one or more appearances. In some embodiments, the avatar has an appearance that includes a set of initiates, a human-like representation, a picture of a person (e.g., who is associated with the avatar), an abstract glow and/or color, and/or an abstract shape. In some embodiments, in response to detecting the third change in the viewpoint of the user relative to the three-dimensional environment and in accordance with a determination that a fourth location (e.g., an actual location or virtual location) that corresponds to (e.g., that corresponds to a location of) the viewpoint of the user is within a predetermined distance of (e.g., within a predetermined distance before and/or after) a location that corresponds to the avatar (e.g., a location that corresponds to a current location of the avatar and/or the virtual object that indicates pace), the computer system transitions the virtual object (e.g., 2144 and/or 2180*e*) that indicates pace from being environment-locked (e.g., 2144) to the set of locations in the three-dimensional environment to being a viewpoint-locked (e.g., 2180*e*) to a location that is within a second predetermined area (e.g., a dashboard area of the first user interface, an area at the top of the user interface, and/or an area that includes the set of one or more viewpoint-locked virtual object) of the first user interface (e.g., as described above in relation to FIGS. 21C-21D) (e.g., avatar in front of you floats to the top of display to indicate that avatar is in the rear-view mirror) (e.g., the avatar (e.g., a face) has a different visually appearance than the virtual object (e.g., does not include a face)). In some embodiments, as a part of transitioning the virtual object from being the avatar that is environment-locked to the set of locations in the three-dimensional environment to being a virtual object that is viewpoint-locked to a location that is within a second predetermined area (e.g., an area at the top of the user interface and/or an area that includes the set of one or more viewpoint-locked virtual object) of the first user interface, the computer system ceases to display the avatar and displays the virtual object that is viewpoint-locked to the location that is within the second predetermined area of the first user interface. In some embodiments, as a part of transitioning the virtual object from being the avatar that is environment-locked to the set of locations in the three-dimensional environment to being the virtual object that is viewpoint-locked to the location that is within a second predetermined area (e.g., an area at the top of the user interface and/or an area that includes the set of one or more viewpoint-locked virtual object) of the first user interface, the computer system displays an animation that transforms the avatar into the virtual object that is viewpoint-locked to the location that is within a second predetermined area. In some embodiments, displaying the animation that transforms the avatar includes displaying the avatar rising and the appearance of the avatar changing gradually. In some embodiments, transitioning the virtual object that indicates pace from being environment-locked to the set of locations in the three-dimensional environment to being a viewpoint-locked to a location that is within a second predetermined area causes the computer system to automatically change the location of the virtual object and how the virtual object is displayed based on whether or not the pace of a second user's computer system is ahead or behind the pace of the computer system and provides feedback about the state of the computer system relative to a state of the second user's computer system (e.g., with respect to a particular timeframe) (e.g., pace of second user's computer system is behind the pace of the computer system).

In some embodiments, the computer system (e.g., 700) is in communication with a second set of audio output devices. In some embodiments, while displaying the virtual object (e.g., 2144 and/or 2180*e*) that indicates pace, the computer system outputs, via the second set of audio output devices, one or more audible outputs (e.g., 2160*c*) that indicate one or more locations of the virtual object that indicates pace relative to one or more locations (e.g., a current location and/or real-time locations) of the viewpoint of the user (e.g., as indicated by 704). In some embodiments, the audible outputs are audio that a user perceives as originating from one or more fixed locations and/or directions in the physical environment, even as the viewpoint and/or position of the user changes) (e.g., the audio data includes various channels where the user perceives the output of each channel as emanating from a respective spatial position (e.g., that surrounds the position of the user), where the spatial position that each channel emanates from is locked to the position of the computer system which causes the computer system to audibly emphasize a respective channel based on the movement of the user's head within the real world environment) (e.g., audio signals that have been adjusted using directional audio filters) (e.g., the spatial audio is outputted via audio output devices that are integrated into the computer system) (e.g., the spatial audio is outputted via audio output devices that are in communication with the computer system). In some embodiments, the output of the spatial audio depends on (e.g., based on) the positioning of the computer system relative to the physical environment. In some embodiments, the spatial audio is simulated to come from a particular location and/or position in space and not multiple locations in space. In some embodiments, outputting, via the second set of audio output devices, one or more audible outputs that indicate one or more locations of the virtual object that indicates pace relative to one or more locations of the viewpoint of the user (e.g., when prescribes conditions are met) provides feedback about the state of the computer system relative to a state of the second user's computer system (e.g., with respect to a particular timeframe) (e.g., pace of second user's computer system is behind the pace of the computer system).

In some embodiments, the computer system (e.g., 700) is in communication with an external device (e.g., a wearable device (e.g., a smart watch), and wherein detecting the request (e.g., 2150*b*) to initiate the activity in the physical environment includes receiving an indication from the external device (e.g., 900) that the activity should be initiated. In some embodiments, the indication is generated based on the external device detecting one or more inputs (e.g., tap inputs, air gestures) (e.g., detected via one or more heart rate and/or optical sensors and/or gyroscopes of the external device), swipe inputs, rotational inputs, scrolling inputs, and/or inputs on one or more physical input mechanisms (e.g., touch-sensitive display, crown, button, and/or slider) of the external device).

In some embodiments, the activity is a competition between the user of the computer system (e.g., 700) and a third user (e.g., "RAVEN," as described above in relation to FIGS. 21A-12F) that is different from the user of the computer system. In some embodiments, before detecting the request to initiate the activity the physical environment (and/or before detecting a request to start completion of the activity), the computer system displays a set of virtual objects (e.g., 2130*b* and/or 2130*c*) representing one or more activity metrics for the third user (e.g., who completed and/or who is completing the activity) (e.g., activity metrics for the third user that was captured from the user of the computer system completing the activity). In some embodiments, displaying a set of virtual objects representing one or more activity metrics for the third user provides the user with feedback about the state of the computer system of the third user while the third user completed the activity.

In some embodiments, after detecting the request to initiate the activity the physical environment, the computer system displays a virtual object (e.g., a countdown time and/or counter and/or an animation of time elapsing) (and, in some embodiments, the virtual object is environment-locked) that indicates time remaining before the activity is initiated (e.g., and/or the time remaining before the computer system will track one or more activity metrics for the activity) (e.g., as described above in FIGS. 21A-21B). In some embodiments, in response to detecting the request to initiate the activity in the physical environment, the computer system initiates the activity. In some embodiments, displaying a virtual object that indicates time remaining before the activity is initiated provides feedback about the state of the computer system (e.g., that the computer system will initiate one or more tracking functions related to and/or display of the activity).

In some embodiments, while displaying, via the display generation component, the first user interface, the computer system detects a fourth change in the viewpoint of the user relative to the three-dimensional environment (e.g., as described in FIGS. 21C-21D). In some embodiments, in response to detecting the fourth change in the viewpoint of the user relative to the three-dimensional environment: in accordance with a determination that a current respective activity state (e.g., distance, location, heart rate, sets, repetitions, and/or speed) (e.g., activity metric) of the user of the computer system has passed a respective activity state of a fourth user completing the activity (e.g., an activity metric of the fourth user completing the activity at a time of completing the activity that corresponds to the time of the current activity state) (e.g., user of the computer system at a first location at a first time (e.g., 10 minutes and 5 seconds) while completing the activity vs fourth user being at a second location at the first time (or at a time (e.g., 10 minutes and 5 seconds while the fourth user was completing the activity) that corresponds to the first time) while the fourth user completed the activity) (e.g., that a speed and/or acceleration of the user of the computer system has passed the speed and/or acceleration of the fourth user), where the fourth user is different from the user of the computer system, the computer system displays, via the display generation component, a second set of virtual objects (e.g., 2162) that indicate that the user of the computer system has passed the fourth user (e.g., a set of celebration virtual objects and/or one or more animations of celebration) (in some embodiments, the animation includes words that indicate that the milestone has been completed (e.g., "Way to go", "Milestone Completed," and/or "Good job") and/or one or more animated virtual objects (e.g., balloons rising, confetti falling, and/or lights flashing)). In some embodiments, in accordance with a determination that a current activity metric of the user has not passed an activity metric of a fourth user completing the activity, the computer system does not display (or forgoes display of) the second set of virtual objects that indicate that the user has passed the fourth user. In some embodiments, displaying, via the display generation component, a second set of virtual objects that indicate that the user of the computer system has passed the fourth user when prescribed conditions are met to automatically provide feedback about the state of the computer system and provides feedback about the state of the computer system relative to a state of the fourth user's computer system (e.g., with respect to a particular timeframe) (e.g., pace of fourth user's computer system has moved behind the pace of the computer system).

In some embodiments, before detecting the request to initiate the activity, receiving an alert that a competition to complete the activity has been requested by a fifth user who is different from the user of the computer system (e.g., as described above in relation to FIG. 21A), and in response to receiving the alert: in accordance with a determination that a set of locations (e.g., within a geofenced area) in the three-dimensional environment is visible in the viewpoint of the user, the computer system displays, via the display generation component, an indication that the alert has been received (e.g., as described above in relation to FIG. 21A); and in accordance with a determination that the set of locations in the three-dimensional environment is not visible in the viewpoint of the user, the computer system forgoes displaying, via the display generation component, the indication that the alert has been received (e.g., as described above in relation to FIG. 21A). In some embodiments, the indication that the alert has been received is geofenced within the three-dimensional environment. (e.g., with a virtual perimeter for a real-world geographic area). In some embodiments, the activity in the physical environment is a geofenced activity. In some embodiments, the indication that the alert has been received and/or the alert includes a representation of an area in the three-dimensional environment that is geofenced.

In some embodiments, aspects/operations of methods 800, 1000, 1200, 1400, 1600, 1800, 2000, 2400, 2600, 2800, 3000, and 3200 may be interchanged, substituted, and/or added with the steps of method 2200. For example, method 2200 can be used to provide guidance associated with a physical activity while the computer system displays virtual content associated with the external device using method 1000. For brevity, these details are not repeated here.

FIGS. 23A-23F illustrate example techniques for displaying virtual objects for controlling one or more external devices, in accordance with some embodiments. FIG. 24 is a flow diagram of methods for displaying virtual objects for controlling one or more external devices, in accordance with some embodiments. The user interfaces in FIGS. 23A-23F are used to illustrate the method in FIG. 24.

Figure 23A:
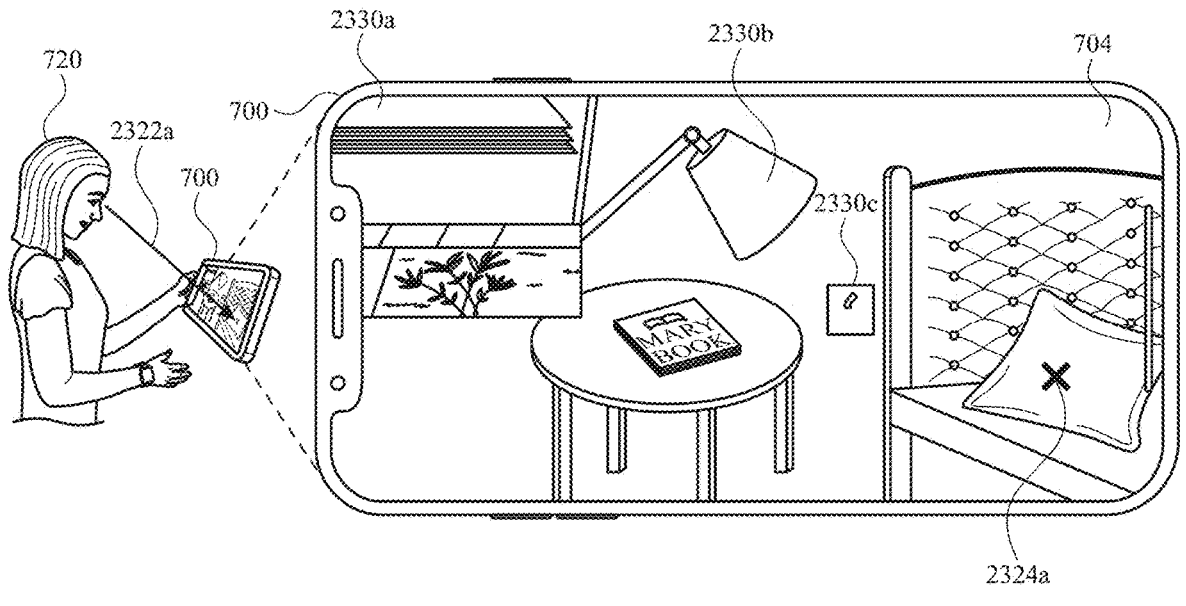
FIGS. 23A-23F illustrate example techniques for displaying virtual objects for controlling one or more external devices, in accordance with some embodiments.

FIG. 23A illustrates user 720 holding computer system 700 and wearing external device 900. Computer system 700 is positioned in a physical environment. The physical environment in FIG. 23A is a bedroom that includes blinds 2330a that are raised, lamp 2330b that is off, and light switch 2330b. Blinds 2330a are controlled via a smart blinds controller (and/or are a set of smart blinds), lamp 2330b includes a smart light bulb (and/or is a smart lamp), and light switch 2330c is a smart light switch. At FIG. 23A, a representation of the physical environment is visible on display 704. While computer system 700 is a phone in FIG. 23A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 23A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the following description below will describe computer system 700 of FIGS. 23A-23F as displaying an AR user interface. In FIGS. 23A-23F, computer system 700 can overlay one or more virtual objects on the representation of the physical environment that "passes through" the transparent display (e.g., display 704) of computer system 700. In some embodiments, computer system 700 includes one or more features as described above in relation to FIGS. 9A-9G (e.g., including displaying how computer system 700 can present an AR environment via display 704 using one or more different techniques).

At FIG. 23A, computer system 700 detects a change in the viewpoint of the user (e.g., a change in the location and/or position of the computer system, a change in the viewpoint of the user as show by display 704, and/or a change gaze of the user, where the gaze of the user is in gaze direction 2322*a* and at gaze location 2324*a* at FIG. 23A). At FIG. 23A, in response to detecting the change in the viewpoint of the user, a determination is made that a respective set of criteria are met. At FIG. 23A, the respective set of criteria are met because the area of the physical environment (e.g., the bedroom) in the viewpoint of the user (e.g., as indicated by the physical environment in display 704) includes a set of external accessory devices, such as the smart devices that control blinds 2330*a*, lamp 2330*b*, and light switch 2330*c*.

Figure 23B:
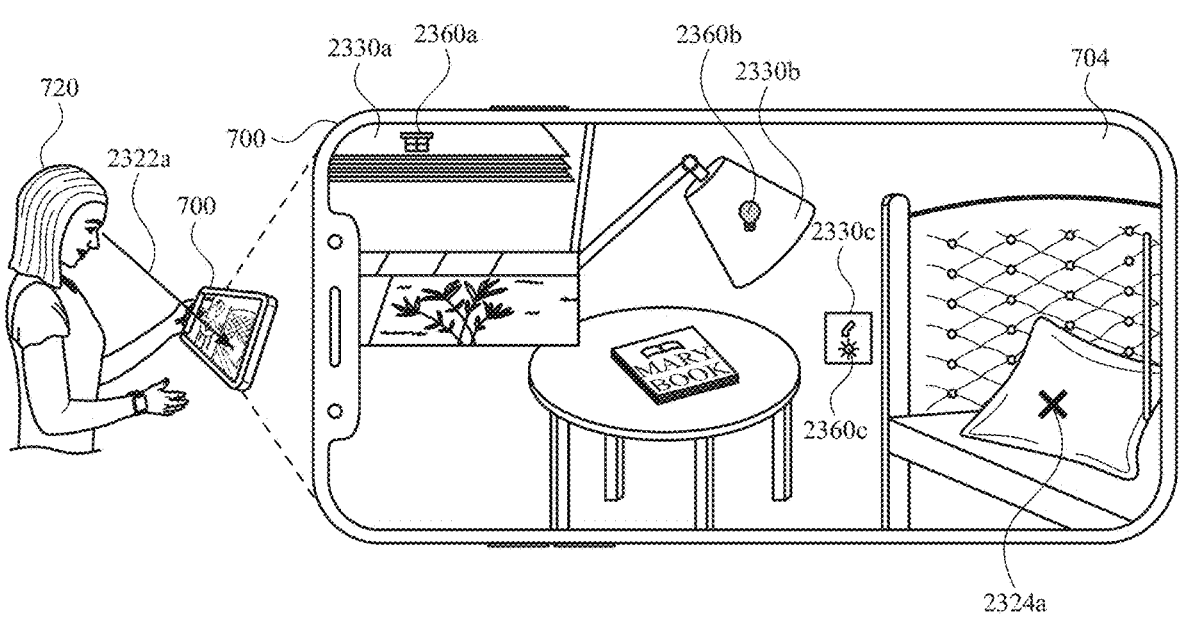

As illustrated in FIG. 23B, because the respective set of criteria is met, computer system 700 displays a set of smart control virtual objects that correspond to the set of external accessory devices. The set of smart control virtual objects include blinds virtual object 2360*a*, light bulb virtual object 2360*b*, and/or light switch virtual object 2360*c*. Blinds virtual object 2360*a* corresponds to (e.g., controls via one or more inputs the state of) blinds 2330*a*, light bulb virtual object 2360*b* corresponds to lamp 2330*b*, and light switch virtual object 2360*c* corresponds to light switch 2330*c*. The smart control virtual objects in FIG. 23B indicate a state of the corresponding device. For example, blinds virtual object 2360*a* is illustrated as being white because blinds 2330*a* are raised and/or opened. Alternatively, if blinds 2330*a* were lowered and/or closed, blinds virtual object 2360*a* would be illustrated as being grey (e.g., to indicate that blinds 2330*a* are lowered and/or closed). Moreover, light bulb virtual object 2360*b* and light switch virtual object 2360*c* are grey to indicate that lamp 2330*b* and light switch 2330*c*, respectively, are off. Alternatively, in some embodiments, blinds virtual object 2360*a*, light bulb virtual object 2360*b*, and light switch virtual object 2360*c* would be represented by a combination of grey-and-white (and/or a pattern as shown and described below in relation to light bulb virtual object 2360*b* of FIG. 23D) based on the positioning of the blinds (e.g., 60% opened, 30% closed, etc.) and the intensity/color of the light (e.g., 20% bright, 80% bright, 30% red, 40% blue, etc.). In addition to the state of the device, the smart control virtual objects indicate the device type of the corresponding device, where blinds virtual object 2360*a*, light bulb virtual object 2360*b*, and light switch virtual object

2360*c* control different types of external accessory devices. In some embodiments, when the set of accessory devices include two external accessory devices that have the same particular device type, smart control virtual objects are displayed for each of the two external accessory devices and the smart control virtual objects include the same one or more characteristics (e.g., the same shape, graphical representation, and/or base image) representative of the particular device type.

At FIG. 23B, computer system 700 displays the set of smart control virtual objects on a respective device of the set of devices. In some embodiments, computer system 700 displays a respective smart control virtual object near and/or adjacent to the respective device. In some embodiments, a respective smart control virtual is displayed on another portion of display 704 that is not on or near the respective virtual object. In some embodiments, computer system 700 does not display a respective virtual object that corresponds to external accessory device that cannot be controlled (and/or an unsupported device). Thus, in some embodiments, the respective set of criteria are met because the area of the physical environment in the viewpoint of the user includes a set of external accessory devices that can be controlled (and/or a set of supported external accessory devices). In embodiments where the respective set of criteria are not met, computer system 700 does not display the set of smart control virtual objects. In some embodiments, computer system 700 ceases to display the set of smart control virtual objects after a determination is made that the set of smart control virtual objects that correspond to the set of external accessory devices are no longer within the viewpoint of the user (e.g., the user interface of FIG. 23A is re-displayed). In some embodiments, computer system 700 ceases to display one or more of the set of smart control virtual objects based on a determination that the gaze of the user has changed (e.g., the gaze of the user is not currently with a predetermined distance (e.g., 0.01-1 meter) of one or more of the set of smart control virtual objects). In some embodiments, computer system 700 ceases to display the set of smart control virtual objects based on a determination that the set of smart control virtual objects are no longer within the viewpoint of the user. In some embodiments, computer system 700 displays a different set of smart control objects based a determination that another area of the physical environment (e.g., a room other than the bedroom and/or another portion of the bedroom that is not visible on display 704 of FIG. 23B) in the viewpoint of the user includes a set of external accessory devices that is different from the set of external accessory devices (e.g., blinds 2330*a*, lamp 2330*b*, and light switch 2330*c*) that are visible on display 704 of FIG. 23B. At FIG. 23B, computer system 700 detects a change in the gaze of the user (e.g., movement of the gaze of the user from gaze location 2324*b* of FIG. 23B to gaze location 2324*c* of FIG. 23C).

Figure 23C:
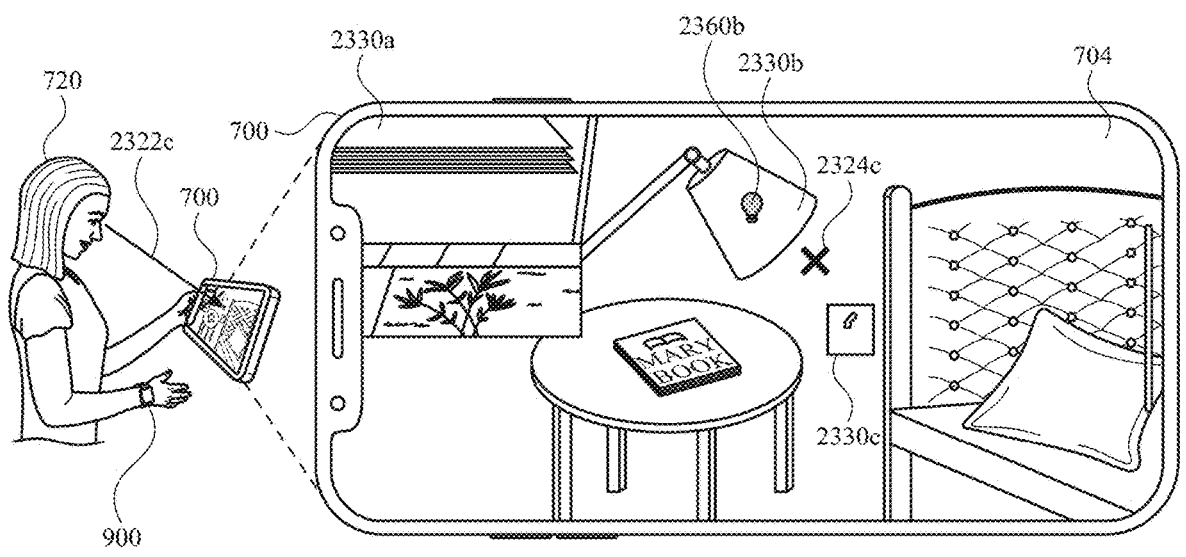

At FIG. 23C, computer system 700 makes a determination that the current gaze of the user (e.g., as indicated by gaze direction 2322*c* and gaze location 2324*c*) is within a predetermined distance of light bulb virtual object 2360*b*. As shown by FIG. 23B-23C, the gaze of the user has moved to be closer to the light bulb virtual object 2360*b* when looking at FIGS. 23B-23C. As illustrated in FIG. 23B, computer system 700 continues to display light bulb virtual object 2360*b* near lamp 2330*b*. However, as illustrated in FIG. 23C, computer system 700 ceases to display blinds virtual object 2360*a* and light switch virtual object 2360*c* of FIG. 23B. At FIG. 23C, computer system 700 ceases to display blinds virtual object 2360*a* and light switch virtual object 2360c of FIG. 23B because a determination was made that predetermined period of time has passed since the set of virtual objects were first displayed (e.g., at FIG. 23B), a determination was made that the gaze of the user is not within the predetermined distance of blinds virtual object 2360a, and a determination was made that the gaze of the user is not within the predetermined distance of light switch virtual object 2360c. Thus, in some embodiments, computer system 700 only displays smart device virtual objects that are within a predetermined distance from the gaze of the user after displaying one or more virtual objects for external accessory device that can be controlled (e.g., when an area that includes the one or more virtual objects are within the viewpoint of the user). In some embodiments, the computer system displays the first set of smart device virtual objects to indicate to the user the objects that are available to be controlled when the smart device virtual objects are initially in the viewpoint of the user. In some embodiments, the computer system only displays smart device virtual objects (e.g., a subset of the first set of virtual objects) that are within a predetermined distance from the gaze of the user (e.g., after displaying more virtual objects for external accessory device that can be controlled) to reduce the amount of smart device virtual objects that are displayed in order to display the smart control objects that the user is likely to be interested in based on the user's gaze. In some embodiments, computer system 700 detects a change in the gaze of the user. In some embodiments, in response to detecting the change in the gaze of the user, computer system 700 ceases to display light bulb virtual object 2360b (and/or de-emphasize light bulb virtual object 2630b, such as re-displaying light bulb virtual object 2360b of FIG. 23B) and re-displays light switch virtual object 2360c (and/or emphasize light switch virtual object 2630c) (e.g., because a determination is made that the changed gaze of the user is within the predetermined distance of the location at which light switch virtual object 2360c was displayed in FIG. 23B and is no longer within the predetermined distance of the location at which light bulb virtual object 2360b is displayed). In some embodiments, an input on external device 900 (e.g., having one or more features as described in previous figures) is detected while computer system 700 is displaying one or more of the smart device virtual objects. In some embodiments, the input on external device 900 is an input on a user interface object (e.g., an "X", a close, and/or a dismiss user interface object) that is displayed via external device 900. In some embodiments, in response to the input on external device 900 being detected, computer system 700 ceases to display the one or more smart device virtual objects (e.g., irrespective of the gaze of the user and/or the viewpoint of the user). At FIG. 23C, computer system 700 detects a change in the gaze of the user (e.g., movement of the gaze of the user from gaze location 2324c of FIG. 23C to gaze location 2324d of FIG. 23D).

Figure 23D:
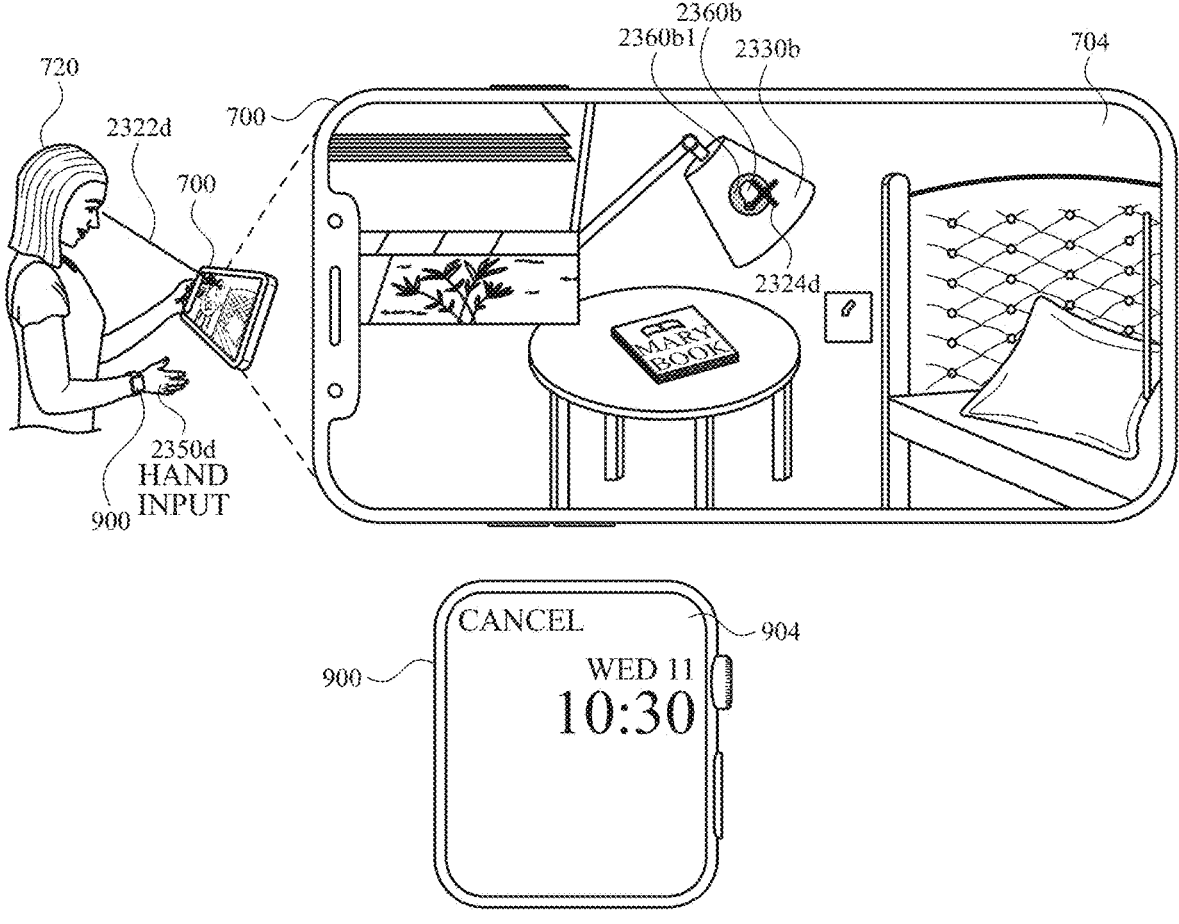

At FIG. 23D, computer system 700 makes a determination that the current gaze of the user (e.g., as indicated by gaze direction 2322d and gaze location 2324d) is directed to light bulb virtual object 2360b. As illustrated in FIG. 23D, because the determination was made that the current gaze of the user is directed to light bulb virtual object 2630b, computer system 700 displays focus indicator 2360b1, which indicates that light bulb virtual object 2630b is in focus. In addition, light bulb virtual object 2630b is emphasized (e.g., change from gray to white when looking at FIGS. 23C-23D) to indicate that light bulb virtual object 2630b is in focus. In some embodiments, computer system 700 causes an operation to be performed that changes the state of a respective smart device based on detecting an additional input while a respective smart device virtual object that corresponds to the respective smart device is displayed concurrently with a focus indicator that corresponds to the respective smart virtual object. In some embodiments, the determination that the current gaze of the user is directed to a respective smart device virtual object is made when the current gaze of the user is determined to be within a second predetermined distance (e.g., a predetermined distance that is closer than the predetermined distance described above in relation to FIG. 23C) of the respective smart device virtual object.

At FIG. 23D, an additional input is detected while the current gaze of the user is directed to light bulb virtual object 2630b. At FIG. 23D, the additional input is an input that is detected by external device 900 and computer system 700 detects the additional input by receiving an indication from external device 900. In some embodiments, the input detected by external device 900 is an air gesture/input. In some embodiments, the input detected by external device 900 is an input is a physical input that is detected on one or more hardware components and/or physical input mechanisms (e.g., the display of external device 900, a rotatable input mechanism on external device 900, and/or one or more buttons on external device 900). In some embodiments, the additional input is voice input (e.g., where a user says a command, such as "activate," "turn-on," or the like). In some embodiments, a command that would change the state of an external accessory device without the gaze of the user being detected as being directed to a respective smart device virtual object that corresponds to the external accessory device is shorter (e.g., includes less words and/or does not include one or more trigger phrases that cause an action to be performed, such as "hey" or "listen") than a command that would change the state of the external accessory device while the gaze of the user is not detected as being directed to the smart device virtual object. In some embodiments, the voice input is detected by computer system 700 or external device 900. In some embodiments, the additional input is the dwell of the gaze that is directed to a respective smart device virtual object that is in focus (e.g., looking at a smart device virtual object for longer than a threshold period of time (e.g., 2-5 seconds)). Thus, in some embodiments, computer system 700 displays a focus indicator corresponding to a respective smart device virtual object based on the gaze of the user being directed to the respective smart device virtual object for a first threshold period of time and causes an operation to be performed that is associated with the smart device virtual object (e.g., causes the smart device virtual object to change states) based on the gaze of the user being directed to the respective smart device virtual object for a threshold period of time (e.g., a dwell threshold) that is longer than the first threshold period of time.

Figure 23E:
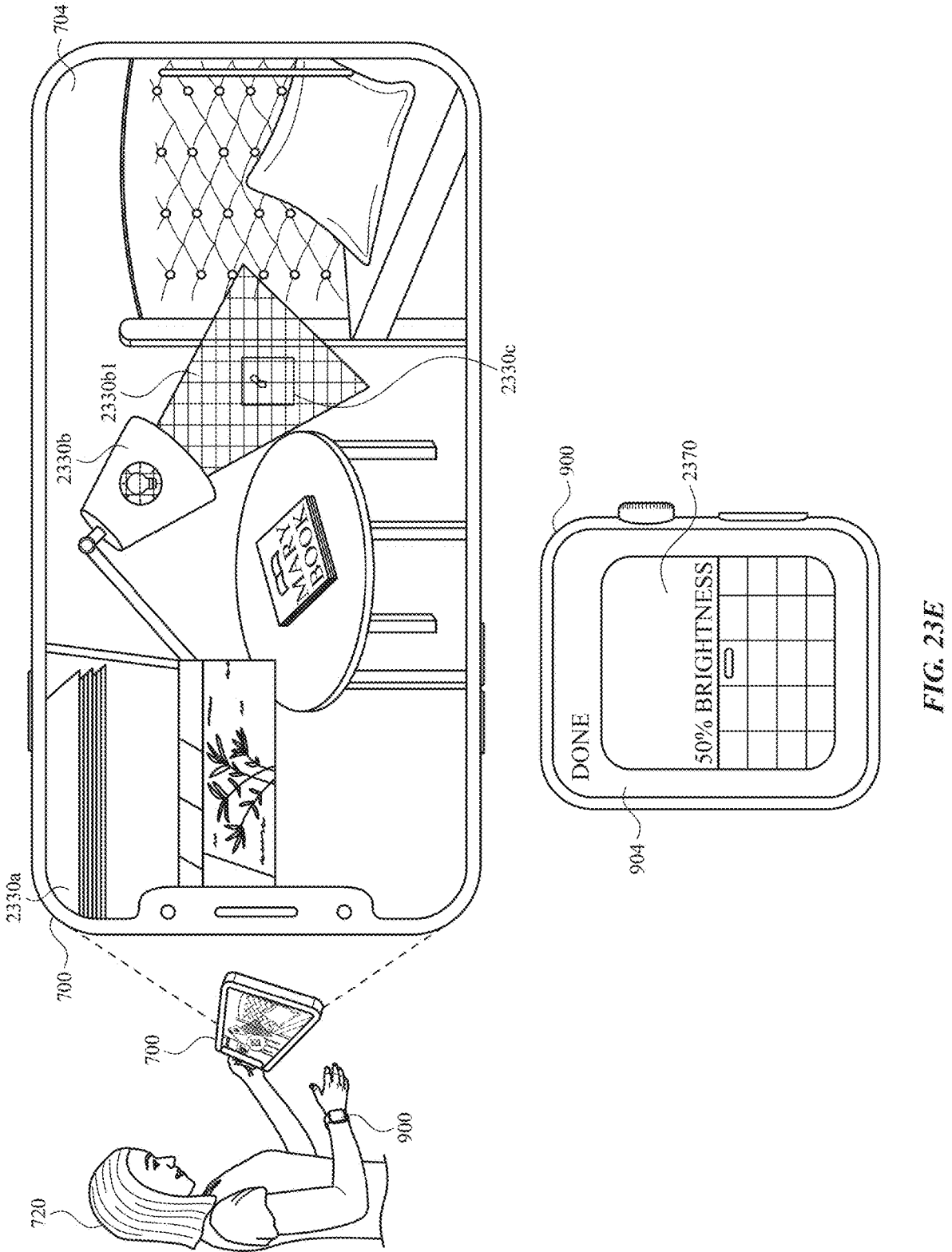

As illustrated in FIG. 23E, in response the additional input being detected while the current gaze of the user is directed to light bulb virtual object 2630b, computer system 700 causes an operation to be performed that causes lamp 2330b to turn on (e.g., change state), which is indicated by light 2330b1. As illustrated in FIG. 23E, light bulb virtual object 2630b is updated to indicate that lamp 2330b changed states (e.g., and/or that instructions were sent to lamp 2330b to change states) and/or is updated to indicate the changed state of lamp 2330b (e.g., as illustrated by the pattern (e.g., representative of a characteristic, such as color, fill, and/or insensitive level) included in light bulb virtual object 2630b matches the pattern (e.g., representative of a characteristic, such as color, hue, saturation, and/or intensity level) of light

2330*b*1 that is being output (e.g., and/or configured/set to be output by) by lamp 2330*b*. Additionally, as illustrated in FIG. 23E, focus indicator 2330*b* is removed because an action was performed with respect to light bulb virtual object 2330*b*. Notably, other external accessory devices (e.g., blinds 2330*a* and light switch 2330*c*) in the physical environment do not change states at FIG. 23E because the additional input was not detected while the current gaze of the user was directed to any of the respective accessory devices). In some embodiments, if the additional input was detected while the current gaze of the user was directed to an external accessory device that is different from lamp 2330*b*, computer system 700 would cause an operation to be performed that causes the external accessory device that is different from lamp 2330*b* to change states (e.g., without causing lamp 2330*b* to change states).

At FIG. 23E, external device 900 is displaying brightness control 2370 (e.g., via display 904). Here, external device 900 displays brightness control 2370 in response the additional input being detected while the current gaze of the user is directed to light bulb virtual object 2630*b* (in contrast, brightness control 2370 is not displayed in FIG. 23D). In some embodiments, brightness control 2370 is displayed in response to determining (e.g., as described above in relation to FIG. 23D) that the current gaze of the user is directed to light bulb virtual object 2360*b*. In some embodiments, in response to detecting an input on brightness control 2370, the state of lamp 2030*b* is changed, such that the brightness of lamp 2030*b* is adjusted (e.g., increased and/or described) in accordance with the input (e.g., the movement, the intensity, and/or the direction of the input) on brightness control 2370. Thus, in some embodiments, external device 900 can be used to change the state of respective external accessory device based on a determination that was made with respect to the current gaze of the user and/or additional inputs that are detected while the current gaze of the user was directed to a respective smart device virtual object.

Figure 23F:
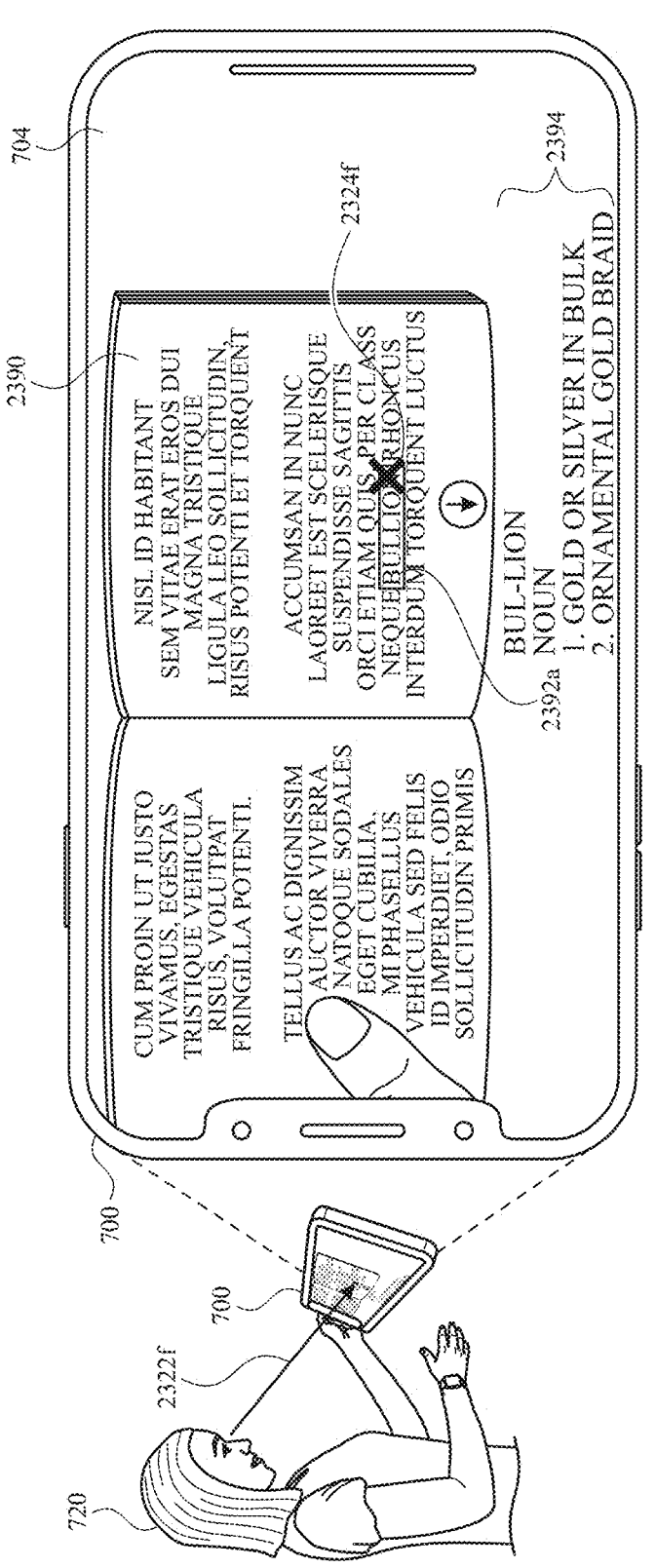

FIG. 23F illustrates an exemplary scenario where the gaze of user 720 is directed to a word in a physical book (e.g., book 2390) that is visible in the viewpoint of the user (e.g., as indicated by display 704 of FIG. 23F). At FIG. 23F, computer system 700 has detected that the gaze of the user (e.g., indicated by gaze direction 2322*f* and gaze location 2324*f*) is directed to word 2392*a* ("bullion") that is displayed with focus indicator 2392*a*1 (e.g., using one or more techniques as described above in relation to displaying focus indicator 2360*b*1). As illustrated in FIG. 23F, in response to detecting that the gaze of the user has been directed to word 2392*a* for a predetermined period of time (e.g., using one or more techniques as disclosed above in relation to turning on lamp 2030*b*), computer system 700 displays word details 2394 outside of the representation book 2390 that is visible on display 704. At FIG. 23F, word details 2394 include various definitions for word 2392*a*. In some embodiments, word details 2394 include other information, such as one or more sentences using word 2392, synonyms to word 2392, antonyms of word 2392, and/or media (e.g., photo and/or video media) that represents or relate to word 2392.

Additional descriptions regarding FIGS. 23A-23F are provided below in reference to method 2400 described with respect to FIGS. 23A-23F.

FIG. 24 is a flow diagram of an exemplary method 2400 for displaying virtual objects for controlling one or more external devices, in accordance with some embodiments. In some embodiments, method 2400 is performed at a computer system (e.g., 700) that is in communication with one or more gaze-tracking sensors (e.g., an optical and/or IR camera configured to track a direction of attention of a user of the computer system) and a display generation component (e.g., 704) (e.g., a display controller, a touch-sensitive display system, a display (e.g., integrated and/or connected), a 3D display, a transparent display, a projector, a heads-up display, and/or a head-mounted display). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 2400 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 2400 are, optionally, combined and/or the order of some operations is, optionally, changed.

The computer system (e.g., 700) detects a change in a viewpoint of a user of the computer system (e.g., 700) from a first viewpoint to a second viewpoint (e.g., while the computer system is being used (e.g., worn) in a physical environment) (e.g., as described above in relation to FIGS. 23A-23D).

In response to detecting the change in the viewpoint of the user (e.g., 720) of the computer system (e.g., 700) from the first viewpoint to the second viewpoint and in accordance with a determination that a set of respective criteria has been satisfied, where the set of respective criteria includes a criterion that is met when a first area (e.g., as shown by computer system 700 in FIG. 23A-23D) (e.g., that corresponds to a room in the physical environment) of the physical environment that includes one or more external accessory devices (e.g., 2330*a*-2330*c*) (e.g., one or more devices that can be controlled by the computer system (and/or where the state of the device can be modified by another device) and/or one or more physical external accessory devices) (e.g., a smart home accessory device (e.g., a smart (e.g., intelligent) light bulbs, thermostat, door lock, door opener (e.g., garage door opener), speaker, television, electric outlet, power strip, camera, appliance (e.g., a refrigerator, stove))) is visible from the second viewpoint, the computer system displays (2404), via the display generation component, a first virtual object (e.g., 2360*a*-2360*c*) that corresponds to a first external accessory device of the one or more external accessory devices, wherein the first external accessory device is in a first state (e.g., as described above in relation to FIGS. 23A-23D). In some embodiments, the first virtual object is displayed on (e.g., overlaid on) and/or near the first external accessory device (e.g., a device in the physical environment). In some embodiments, at least one of the one or more external accessory devices are associated with, assigned to, and/or mapped to a first group of devices. In some embodiments, the first group of devices is associated with or mapped to a top-level location (or destination) (e.g., a location of a first type) (e.g., a home location, business, an office (e.g., a location that is a top-level location (e.g., a location that defines one or more locations (e.g., sub-locations) and/or one or more regions (or zones) that are within an area and/or perimeter that is defined by the location of the top-level location, a location that is at the top level of a hierarchy of locations, a location that is linked (e.g., programmatically) to one or more locations (e.g., sub-locations) and/or one or more regions (or zones)))). In some embodiments, the top-level location is the first area. In some embodiments, the one or more external accessory devices are in communication with the computer system.

While displaying, via the display generation component, the first virtual object, the computer system detects (2406) an input (e.g., 2350*d*) (e.g., a voice input detected via one or more microphones in communication with the computer system, one or more physical inputs detected via one or more hardware input mechanisms (e.g., a hardware button, a hardware slider, and/or a hardware rotatable wheel) that are in communication with the computer system, and/or one or more gazes of a user detected via the one or more gaze-tracking sensors and/or a dwell input (e.g., a second portion of attention input that is detected as being directed to the first virtual object for longer than a predetermined period of time and/or an additional attention input that is detected as being directed to the first virtual object for longer than a predetermined period of time)) (e.g., an additional detected input that does not include detecting the initial attention of the user directed to the first virtual object). In some embodiments, the set of triggering conditions includes a condition that is satisfied when the triggering event is detected while the attention input is being detected. In some embodiments, the detected attention is detected while the additional detected input is detected.

In response to detecting the input (e.g., 2350*d*) and in accordance with a determination that attention of the user (e.g., indicated by 2322*d* and 2324*d*) was directed to the first virtual object (e.g., 2360*b*) when the input was detected, the computer system causes (2408) (e.g., sending an instruction that causes) the first external accessory device (e.g., 2330*b*) to be changed from the first state (e.g., a first operational state) (e.g., on, off, and/or a state having a first brightness, openness, temperature, and/or volume level) to a second state (e.g., a second operational state) (e.g., on, off, and/or a state having a first brightness, openness, temperature, and/or volume level) that is different from the first state (e.g., as described above in relation to FIGS. 23D-23E).

In some embodiments, in response to detecting movement of the computer system from the first location to the second location in the physical environment and in accordance with a determination that the set of respective criteria are not satisfied (e.g., because the second location is not within the first area, because the first area does not include the first external accessory device, because the first area includes the first external accessory device but the external accessory device is not an external accessory device that can be controlled by the computer system), the computer system forgoes displaying, via the display generation component, the first virtual object that corresponds to the first external accessory device of the one or more external accessory devices (and/or a virtual object that corresponds to an external accessory device of the one or more external accessory devices).

In some embodiments, in response to detecting the input and in accordance with a determination that the attention of the user was not directed to the first virtual object when the input was detected, the computer system forgoes causing (e.g., does not send an instruction that causes) the first external accessory device to be changed from the first state (e.g., a first operational state) (e.g., on, off, and/or a state having a first brightness, openness, temperature, and/or volume level) to a second state (e.g., a second operational state) (e.g., on, off, and/or a state having a first brightness, openness, temperature, and/or volume level) that is different from the first state. Displaying, via the display generation component, a first virtual object that corresponds to a first external accessory device of the one or more external accessory devices when prescribed conditions are met allows the computer system to automatically display virtual object for external accessory devices that can be controlled by the system and provides feedback about the state of the computer system and the external accessory device. Causing the first external accessory device to be changed from the first state to the second state in response to detecting the input and in accordance with a determination that attention of the user was directed to the first virtual object when the input was detected reduces the number of inputs needed to cause the state of an external accessory device to be changed and enables the computer system to change the state of the external accessory device without displaying additional controls.

In some embodiments, in response to detecting the change in the viewpoint of the user of the computer system (e.g., 700) from the first viewpoint to the second viewpoint and in accordance with a determination that the set of respective criteria has been satisfied, the computer system displays, via the display generation component, a second virtual object (e.g., 2360*a*-2360*c*) that corresponds to a second external accessory device (e.g., 2330*a*-2330*c*) of the one or more external accessory devices concurrently with the first virtual object (e.g., 2360*b*) that corresponds to the first external accessory device (e.g., 2330*b*) (e.g., as described above in relation to FIGS. 23A-23B). In some embodiments, the second external accessory device is different from the first external accessory device. In some embodiments, the second virtual object is displayed closer to the second external accessory device than the first virtual object. In some embodiments, the first virtual object is displayed closer to the first external accessory device that the second virtual object. In some embodiments, the second virtual object is displayed on (e.g., overlaid on) and/or near the second external accessory device (e.g., a device in the physical environment). Displaying, via the display generation component, a second virtual object that corresponds to a second external accessory device that is different from the first external accessory device when prescribed conditions are met allows the computer system to automatically display virtual object for external accessory devices that can be controlled by the system and provides feedback about the state of the computer system and the external accessory device.

In some embodiments, while displaying, via the display generation component, the first virtual object, the computer system detects a change in the viewpoint of the user of the computer system from the second viewpoint to a third viewpoint (e.g., as described above in relation to FIGS. 23A-23B). In some embodiments, in response to detecting the change in the viewpoint of the user (e.g., 720) of the computer system from the second viewpoint to the third viewpoint and in accordance with a determination that a second set of respective criteria has been satisfied, where the second set of respective criteria includes a criterion that is satisfied when a second area (e.g., that corresponds to at least a portion of a room in the physical environment) that includes second one or more external accessory devices (e.g., 2330*a*-2330*c*) is visible from the third viewpoint, the computer system displays, via the display generation component, a third virtual object that corresponds to a third external accessory device of the one or more external accessory devices (e.g., as described above in relation to FIGS. 23A-23B). In some embodiments, the third external accessory device is different from the first external accessory device. In some embodiments, the second one or more external accessory devices were not visible from the second viewpoint. In some embodiments, in accordance with a determination that the first external accessory device is visible in the second area, the computer system continues to the display the first virtual object in response to detecting the change in the viewpoint of the user of the computer system from the second viewpoint to the third viewpoint and in accordance with a determination that the second set of respective criteria is met. In some embodiments, in accordance with a determination that the first external accessory device is not visible in the second area, the computer system ceases to display the first virtual object in response to detecting the change in the viewpoint of the user of the computer system from the second viewpoint to the third viewpoint and in accordance with a determination that the second set of respective criteria is met. Displaying, via the display generation component, a third virtual object that corresponds to a third external accessory device of the one or more external accessory devices in response to detecting the change in the viewpoint of the user of the computer system from the second viewpoint to the third viewpoint and in accordance with a determination that a second set of respective criteria has been satisfied causes the computer system to automatically display virtual objects that are visible while the viewpoint of the user is changed and provides feedback about the state of the computer system and the external accessory device.

In some embodiments, the computer system (e.g., 700) is in communication with one or more microphones (and, in some embodiments, the one or more microphones are physically coupled to the computer system and/or the one or more microphones that are physically coupled to an external device and/or are not physically coupled to the computer system). In some embodiments, detecting the input includes detecting, via the one or more microphones, a first audible command (e.g., turn on) (e.g., a voice command) (e.g., as described above in relation to FIG. 23D). Causing the first external accessory device to be changed from the first state to the second state in response to detecting a first audible command and in accordance with a determination that attention of the user was directed to the first virtual object when the input was detected reduces the number of inputs needed to cause the state of an external accessory device to be changed and enables the computer system to change the state of the external accessory device without displaying additional controls.

In some embodiments, the computer system is in communication with a physical input mechanism (e.g., as described above in relation to FIG. 23D) (and, in some embodiments, the physical input mechanism is physically coupled to the computer system and/or the physical input mechanism is physically coupled to an external device and/or not physically coupled to the computer system). In some embodiments, detecting the input includes detecting activation of the physical input mechanism (e.g., as described above in relation to FIG. 23D). Causing the first external accessory device to be changed from the first state to the second state in response to detecting activation of a physical input mechanism and in accordance with a determination that attention of the user was directed to the first virtual object when the input was detected reduces the number of inputs needed to cause the state of an external accessory device to be changed and enables the computer system to change the state of the external accessory device without displaying additional controls.

In some embodiments, detecting the input includes detecting that the attention of the user has been directed to a first location (e.g., one or more locations that corresponds to the first virtual object) for more than a first threshold amount of time (e.g., 1-60 seconds) (e.g., as described above in relation to FIG. 23D). Causing the first external accessory device to be changed from the first state to the second state in response to detecting that the attention of the user has been directed to a first location for more than a first threshold amount of time and in accordance with a determination that attention of the user was directed to the first virtual object when the input was detected reduces the number of inputs needed to cause the state of an external accessory device to be changed and enables the computer system to change the state of the external accessory device without displaying additional controls.

In some embodiments, in response to detecting the change in the viewpoint of the user (e.g., 720) of the computer system (e.g., 700) from the first viewpoint to the second viewpoint and in accordance with a determination that the set of respective criteria has been satisfied, the computer system displays, via the display generation component, a fourth virtual object (e.g., 2360*a*-2360*c*) corresponds to a fourth external accessory device (e.g., 2330*a*-2330*c*) of the one or more external accessory devices. In some embodiments, the fourth external accessory device is different from the first external accessory device. In some embodiments, the fourth external accessory device is in a third state (e.g., as described above in relation to FIGS. 23A-23D). In some embodiments, the fourth virtual object is displayed on (e.g., overlaid on) and/or near the fourth external accessory device (e.g. a computer system in the physical environment). In some embodiments, the third state is different from the first state and/or the second state. In some embodiments, the first external accessory device is a different type of external accessory device than the fourth external accessory device. Displaying, via the display generation component, a fourth virtual object that corresponds to a fourth external accessory device that is different from the first external accessory device and that is a third state when prescribed conditions are met allows the computer system to automatically display virtual object for external accessory devices that can be controlled by the system and provides feedback about the state of the computer system and the external accessory device.

In some embodiments, in response to detecting the input (e.g., while displaying the second virtual object and/or while display first virtual object and the second virtual object) and in accordance with a determination that the attention of the user was directed to the fourth virtual object (e.g., 2360*a*-2360*c*) when the input was detected, the computer system causes the fourth external accessory device (e.g., 2330*a*-2330*c*) to be changed from the third state to a fourth state that is different from the third state (e.g., as described above in relation to FIGS. 23A-23D). In some embodiments, in response to detecting the input and in accordance with a determination that the attention of the user was directed to the fourth virtual object when the input was detected, the computer system does not cause the first external accessory device to change states (e.g., from the first state to the second state and/or vice-versa). In some embodiments, in response to detecting the input and in accordance with a determination that the attention of the user has transitioned from being directed to a location that corresponds to the location of the first virtual object to being directed to a location that corresponds to a location of the fourth virtual object, the computer system changes the visual appearance of the first virtual object (e.g., to indicate that the first virtual object is no longer in focus) and changes the visual appearance of the fourth virtual object (e.g., to indicate that the fourth virtual object is in focus). In some embodiments, as a part of changing the visual appearance of the first virtual object (e.g., to indicate that the first virtual object is no longer in focus), the computer system ceases to display the first virtual object. In some embodiments, as a part of changing the visual appearance of the fourth virtual object (e.g., to indicate that the fourth virtual object is in focus), the computer system re-displays the fourth virtual object. Causing the fourth external accessory device to be changed from the third state to a fourth state in response to detecting the input and in accordance with a determination that the attention of the user was directed to the fourth virtual object when the input was detected reduces the number of inputs needed to cause the state of an external accessory device to be changed and enables the computer system to change the state of the external accessory device without displaying additional controls.

In some embodiments, in response to detecting the input (e.g., 2350*d*) and in accordance with a determination that the attention (e.g., indicated by 2322*d* and/or 2334*d*) of the user was directed to the fourth virtual object when the input was detected (e.g., and while the first external accessory device is in the first state), the computer system forgoes causing the first external accessory device (e.g., 2330*b*) to change to a new state (e.g., as described above in relation to FIG. 23D) (e.g., to change from the first state to the second state and/or from the second state to the first state) (and/or, in some embodiments, maintaining the first external accessory device in the first state). Causing the fourth external accessory device to be changed from the third state to a fourth state without causing the first external accessory device to change to a new state in response to detecting the input and in accordance with a determination that the attention of the user was directed to the fourth virtual object when the input was detected reduces the number of inputs needed to cause the state of an external accessory device to be changed and enables the computer system to change the state of the external accessory device without changing the state of another accessory device and displaying additional controls.

In some embodiments, displaying, via the display generation component, the fourth virtual object (e.g., 2360*a*-2360*c*) corresponds to the fourth external accessory device (e.g., 2330*a*-2330*c*) of the one or more external accessory devices includes: in accordance with a determination that the first external accessory device (e.g., 2360*a*-2360*c*) is a same type of external accessory device as the fourth external accessory device (e.g., 2360*a*-2360*c*), the first virtual object includes a first graphical representation and the fourth virtual object includes the first graphical representation (e.g., as described above in relation to FIGS. 23A-23D), and in accordance with a determination that the first external accessory device (e.g., 2360*a*-2360*c*) is a different type of accessory device than the fourth external accessory device (e.g., 2360*a*-2360*c*), the first virtual object includes the first graphical representation and the fourth virtual object does not include the first graphical representation (e.g., as described above in relation to FIGS. 23A-23D) (e.g., or the first virtual object does not include the first graphical representation and the fourth virtual object includes the first graphical representation). Displaying the first virtual object and the fourth virtual object with the same or different representations causes the computer system to automatically display virtual objects with a different graphical representation when they represent different types of external accessory devices and with the same graphical representation when they represent the same types of external accessory devices and provides feedback about the state of the computer system and the external accessory device.

In some embodiments, the one or more one or more external accessory devices includes a fifth external accessory device that is different from the first external accessory device. In some embodiments, in response to detecting the change in the viewpoint of the user of the computer system from the first viewpoint to the second viewpoint and in accordance with a determination that the respective set of criteria has been satisfied (e.g., as described above in relation to FIG. 23B): in accordance with a determination that the fifth external accessory device is (e.g., a type of accessory device that is) configured (e.g., available) to be controlled via the computer system (and/or the computer system is configured to control the fifth external accessory device), the computer system displays, via the display generation component, a fifth virtual object that corresponds to the fifth external accessory device (e.g., as described above in relation to FIG. 23B), and in accordance with a determination that the fifth external accessory device is not configured to be controlled via the computer system, the computer system forgoes displaying the fifth virtual object that corresponds to the fifth external accessory device (e.g., as described above in relation to FIG. 23B). Choosing whether to display the fifth virtual object based on whether the fifth external accessory device (e.g., represented by the fifth virtual object) is configured to be controlled by the computer system causes the computer system to automatically display virtual objects for external accessory devices that can be controlled by the computer system and to not display virtual objects for external accessory devices that cannot be controlled by the computer system and provides feedback about the state of the computer system (e.g., the external accessory devices that can be controlled and/or not controlled by the computer system) and the external accessory device.

In some embodiments, while displaying, via the display generation component, the first virtual object (e.g., and before detecting the input), the computer system detects a change in the attention of the user (e.g., indicated by 2322*d* and/or 2334*d*). In some embodiments, in response to detecting the change in the attention of the user (e.g., indicated by 2322*d* and/or 2334*d*): in accordance with a determination that the attention of the user is directed to the first virtual object (e.g., irrespective of whether the first input has been detected), displaying a first indication (e.g., 2360*b*1) that the first virtual object is in focus (e.g., currently selected and/or in focus) (e.g., concurrently with the first virtual object) and in accordance with a determination that the attention of the user is not directed to the first virtual object, the computer system forgoes displaying the first indication that the first virtual object is in focus (e.g., as described above in relation to FIGS. 23C-23D). In some embodiments, in response to detecting the change in the viewpoint of the user of the computer system from the first viewpoint to the second viewpoint and in accordance with a determination that a set of respective criteria has been satisfied, the computer system does not display an indication that the first virtual object is in focus. Displaying an indication that the first virtual object is in focus in accordance with a determination that the attention of the user is directed to the first virtual object provides feedback about a state of the computer system (e.g., the computer system is configured to perform an operation that corresponds to the first virtual object the input is received).

In some embodiments, displaying the indication (e.g., 2360*b*1) that the first virtual object is selected includes emphasizing the first virtual object (e.g., changing the color of the first virtual object, such that the color of the first virtual object is different from the color of an object that is not currently selected, highlighting one or more portions (e.g., outline and area) of the first virtual object, changing (e.g., adding, removing, and/or replacing) a graphical representation that is associated with (e.g., included in, a part of, and/or that is) the first virtual object and/or distinguishing the first virtual object from a non-selected first virtual object). Emphasizing the first virtual object in accordance with a determination that the attention of the user is directed to the first virtual object provides feedback about a state of the computer system (e.g., the computer system is configured to perform an operation that corresponds to the first virtual object the input is received).

In some embodiments, before displaying the indication that the first virtual object is in focus, a sixth virtual object that corresponds to the sixth external accessory device and an indication that the sixth virtual object is in focus are displayed (e.g., as described above in relation to FIGS. 23D-23E). In some embodiments, in response to detecting the change in the attention of the user: in accordance with a determination that the attention of the user is directed to the first virtual object (e.g., irrespective of whether the first input has been detected), the computer system ceases to display the indication that the sixth virtual object is in focus (e.g., as described above in relation to FIGS. 23D-23E) (e.g., while continuing to display the sixth virtual object that corresponds to the sixth external accessory device). In some embodiments, ceasing to display the indication that the sixth virtual object is selected includes deemphasizing the sixth virtual object. In some embodiments, in accordance with a determination that the attention of the user is directed to the first virtual object, the computer system changes the first virtual object to have a visual appearance (e.g., color, shape, and/or size) that the previously emphasized and/or selected sixth virtual object had. Ceasing to display the indication that the sixth virtual object is in focus in accordance with a determination that the attention of the user is directed to the first virtual object provides feedback about a state of the computer system (e.g., the computer system is no longer configured to perform an operation that corresponds to the sixth virtual object, changing the state of the sixth external accessory device) the input is received).

In some embodiments, while displaying, via the display generation component, the first virtual object (e.g., 2360*b*) and while the first accessory device (e.g., 2330*b*) is in the first state, the computer system detects a second audible command (e.g., as described above in relation to FIG. 23D). In some embodiments, in response to detecting the second audible command: in accordance with a determination that the second audible command includes a first phrase (e.g., a wake command (e.g., "Hey, voice assistant", the name of the voice assistance) and/or a command that is used to notify the computer system that an operation should be performed in response to the second audible command) and a second phrase (e.g., the command portion ("turn on light", "lock door", "set timer", or "schedule meeting") and/or the portion that denotes the operation to be performed), the computer system causes the first external accessory device to be changed from the first state to the second state (e.g., irrespective of the location (and/or virtual object) at which the attention of the user was detected when the second audible command was detected) (e.g., as described above in relation to FIG. 23D). In some embodiments, in accordance with a determination that the attention of the user was directed to the first virtual object when the second audible command was detected and the second audible command includes the second phrase but does not include the first phrase, the computer system causes the first external accessory device to be changed from the first state to the second state (e.g., as described above in relation to FIG. 23D). In some embodiments, in accordance with a determination that the attention of the user was not directed to the first virtual object when the second audible command was detected and the second audible command includes the second phrase but does not include the first phrase, the computer system forgoes causing the first external accessory device to be changed from the first state to the second state (e.g., as described above in relation to FIG. 23D). Forgoing causing the first external accessory device to be changed from the first state to the second state in accordance with a determination that the attention of the user was not directed to the first virtual object when the second audible command was detected and the second audible command includes the second phrase but does not include the first phrase and causing the first external accessory device to be changed from the first state to the second state in accordance with a determination that the attention of the user was directed to the first virtual object when the second audible command was detected and the second audible command includes the second phrase but does not include the first phrase provides improved security by allowing the computer system to perform an operation when another stimulus (e.g., attention of the user is directed to a particular object) is detected with the second audible command and forgo performing the operation when the other stimulus is not detected.

In some embodiments, while displaying, via the display generation component, the first virtual object, the computer system detects that the computer system (e.g., 700) has been within the first area of the physical environment for more than a second threshold amount of time (e.g., 1-60 seconds). In some embodiments, in response to detecting that the computer system has been within a first predetermined distance of (e.g., and/or in) the first area of the physical environment for more than the second threshold amount of time, the computer system ceases to display the first virtual object (e.g., as described above in relation to FIGS. 23B-23C) (and/or one or more virtual objects that correspond to the one or more external accessory devices and/or one or more virtual objects that were displayed in response to detecting the change in the viewpoint of the user of the computer system from the first viewpoint to the second viewpoint and in accordance with a determination that a set of respective criteria has been satisfied). Ceasing to display the first virtual object in response to detecting that the computer system has been within a first predetermined distance of the first area of the physical environment for more than the second threshold amount of time reduces the number of inputs needed to cease to display one or more virtual objects for controlling external accessory devices in situations where the user may not want the one or more virtual objects for controlling external accessory devices to be displayed and causes the computer system to automatically cease to display the one or more virtual objects for controlling external accessory devices in these situations.

In some embodiments, in response to detecting the change in the viewpoint of the user of the computer system from the first viewpoint to the second viewpoint and in accordance with a determination that the set of respective criteria has been satisfied, the computer system displays, via the display generation component, a seventh virtual object (e.g., 2360*a* and/or 2360c) that corresponds to a seventh external accessory device of the one or more accessory devices concurrently with the first virtual object (e.g., 2360b). In some embodiments, the first virtual object is displayed at a second location and the seventh virtual object is displayed at a third location that is different from the second location (e.g., as described above in relation to FIGS. 23B-23C). In some embodiments, the computer system is within a second predetermined distance of the first area, the computer system ceases to display the first virtual object and the seventh virtual object (e.g., as described above in relation to FIGS. 23B-23C). In some embodiments, after ceasing to display the first virtual object and the seventh virtual object (e.g., 2360a and/or 2360c), the computer system detects that the attention of the user is directed to a fifth location (e.g., a location in the physical environment and/or a location in the viewpoint) (e.g., as described above in relation to FIGS. 23B-23C). In some embodiments, in response to detecting that the attention of the user is direction to the fifth location: in accordance with a determination that the fifth location corresponds to (e.g., is and/or is mapped to) the second location (and not the third location) (and while the computer system is within a first predetermined distance of the first area), the computer system re-displays, via the display generation component, the first virtual object (e.g., 2360b) (e.g., without re-displaying the seventh virtual object) (e.g., as described above in relation to FIGS. 23B-23C). In some embodiments, in accordance with a determination that the fifth location corresponds to (e.g., is and/or is mapped to) the third location (and not the second location) (and while the computer system is within the first predetermined distance of the first area), the computer system re-displays, via the display generation component, the seventh virtual object (e.g., 2360a and/or 2360c) (e.g., as described above in relation to FIGS. 23B-23C) (e.g., without re-displaying the first virtual object). In some embodiments, in accordance with a determination that the location does not correspond a location at which the seventh virtual object was previously displayed or a location at which the first virtual object was previously displayed (e.g., and/or a location at which any virtual object was displayed), the computer system does not display the first virtual object and/or the seventh virtual object. Re-displaying, via the display generation component, the first virtual object in accordance with a determination that the fifth location corresponds to the second location and in response to detecting that the attention of the user is direction to the fifth location causes the computer system to automatically display a virtual object that may be relevant to the user and provides feedback about a state of the computer system and the external accessory device.

In some embodiments, while displaying, via the display generation component, the first virtual object (e.g., 2360b) and in accordance with a determination that the attention of the user is directed to the first virtual object before the input is detected (e.g., before detecting the input) (e.g., user is gazing at the first virtual object but has not dwelled on the first virtual object long enough), the computer system displays, via the display generation component, a second indication (e.g., 2360b1) that the first virtual object (e.g., 2360b) is in focus (e.g., without displaying an indication that a virtual object that is direct from the first virtual object is in focus (and/or is selected)). In some embodiments, the indication that a respective virtual object is in focus is displayed around (e.g., a ring) the respective virtual object. In some embodiments, the indication that a respective virtual object is selected is displayed and/or changes (e.g., changes emphases (e.g., grows, changes colors, and/or pulses)) as long as the attention of the user is directed to the respective virtual object. Displaying a second indication that the first virtual object is in focus in accordance with a determination that the attention of the user is directed to the first virtual object before the input is detected provides feedback about a state of the computer system (e.g., the computer system is configured to perform an operation that corresponds to the first virtual object the input is received).

In some embodiments, while displaying, via the display generation component, the indication (e.g., 2360b1) that the first virtual object is in focus, detecting a first change in the attention of the user (e.g., as described above in relation to FIGS. 23D-23E) and in response to detecting the change in the attention of the user and in accordance with a determination that the first changed attention of the user is not directed to the first virtual object, the computer system ceases to display the indication (e.g., 2360b1) that the first virtual object is in focus (e.g., as described above in relation to FIGS. 23D-23E). In some embodiments, in accordance with a determination that the change attention of the user is directed to the first virtual object, the computer system continues to display the indication the indication that the first virtual object is in focus. Ceasing to display the indication that the first virtual object is in focus in response to detecting the change in the attention of the user and in accordance with a determination that the first changed attention of the user is not directed to the first virtual object provides feedback about a state of the computer system (e.g., the computer system is not configured to perform an operation that corresponds to the first virtual object when the input is received).

In some embodiments, the indication that the first virtual object (e.g., 2360b) is in focus is displayed while the input (e.g., 2350d) is detected. In some embodiments, in response to detecting the input and in accordance with a determination that attention of the user was directed to the first virtual object when the input was detected, the computer system ceases to display the indication (e.g., 2360b1) that the first virtual object is in focus (e.g., as described above in relation to FIG. 23E). In some embodiments, as a part of causing the first external accessory device to be changed from the first state to the second state, the computer ceases to display the indication that the first virtual object is in focus. In some embodiments, in response to detecting the input and in accordance with a determination that attention of the user was directed to the first virtual object when the input was detected, the computer system maintains display of the first virtual object and ceases to display the indication that the first virtual object is in focus. Ceasing to display the indication that the first virtual object is in response to detecting the input and in accordance with a determination that attention of the user was directed to the first virtual object when the input was detected provides feedback about a state of the computer system (e.g., the computer system has performed and/or is performing an operation that corresponds to the first virtual object).

In some embodiments, before detecting the input (e.g., 2350d) and while the first external accessory device (e.g., 2330b) is in the first state, the first virtual object (e.g., 2360b) is displayed with a first visual appearance (e.g., that indicates the first external accessory device is in the first state) (e.g., as described above in relation to FIG. 23D)). In some embodiments, after causing the first external accessory device to be changed from the first state to the second state and while the first external accessory device is in the second state, the first virtual object (e.g., 2360b) is displayed with a second visual appearance (e.g., as described above in relation to FIG. 23E) (e.g., an appearance that indicates the first external accessory device is in the second state) that is different from the first visual appearance. Displaying the virtual object with a visual appearance that is based on the state of the external accessory device provide feedback about the state of the external accessory device.

In some embodiments, the input (e.g., 2350*d*) includes a set of inputs. In some embodiments, in response to detecting the input and in accordance with a determination that attention of the user was directed to the first virtual object when the input was detected, the computer system changes display of the first virtual object in response to detecting the set of inputs (e.g., as described above in relation to FIG. 23E). Changing display of the first virtual object in response to detecting the set of inputs in response to detecting the input and in accordance with a determination that attention of the user was directed to the first virtual object when the input was detected provides feedback about a state of the computer system (e.g., the computer system has performed and/or is performing an operation that corresponds to the first virtual object).

In some embodiments, the input includes an input characteristic (e.g., direction of movement, distance of movement, pressure/intensity of movement, and/or duration of movement). In some embodiments, detecting the input includes receiving an indication of a magnitude of the input characteristic (e.g., tap input, a swipe input, a drag input, a mouse click, and/or a rotational input) was detected by a first external device (e.g., a smart watch, a table, or a phone) (e.g., on a user interface that is displayed by the external accessory device) (e.g., as described above in relation to FIGS. 23D-23E). In some embodiments, in accordance with a determination the magnitude of the input characteristic is a first magnitude, a first amount of difference (e.g., amount of difference in a property (e.g., brightness, volume, or power level) of the external device) is between the first state to the second state (e.g., as described above in relation to FIGS. 23D-23E). In some embodiments, in accordance with a determination the magnitude of the input characteristic is a second magnitude that is different from (e.g., higher than and/or greater than) the first magnitude, a second amount of difference (e.g., amount of difference in a property (e.g., brightness, volume, and/or power level) of the external device) is between the first state and the second state (e.g., as described above in relation to FIGS. 23D-23E), wherein the second amount of difference is different from (e.g., higher than and/or greater than) the first amount of difference.

In some embodiments, while displaying, via the display generation component, the first virtual object (e.g., 2360*b*), the computer system detects the change in the viewpoint of the user of the computer system (e.g., 700) from the second viewpoint to a fourth viewpoint (e.g., that is different from the second viewpoint) (e.g., as described above in relation to FIGS. 23A-23E). In some embodiments, in response to detecting the change in the viewpoint of the user of the computer system from the second viewpoint to the third viewpoint and in accordance with a determination that the first external accessory device is not visible from the fourth viewpoint (e.g., a determination that the first area of the physical environment that includes the one or more external accessory devices is not visible from the third viewpoint), the computer system ceases to display the first virtual object (e.g., as described above in relation to FIGS. 23A-23E) (and/or one or more virtual objects that are associated with the one or more accessory devices (e.g., the one or more accessory devices that are visible from the second viewpoint)). In some embodiments, in response to detecting the change in the viewpoint of the user of the computer system from the second viewpoint to fourth third viewpoint and in accordance with a determination that a second area of the physical environment that includes a second one or more external accessory devices is visible from the third viewpoint, the computer system displays one or more virtual objects that correspond to the second or more external accessory devices (e.g., without displaying the first virtual object). Ceasing to display the first virtual object in response to detecting the change in the viewpoint of the user of the computer system from the second viewpoint to the fourth viewpoint and in accordance with a determination that the first external accessory device is not visible from the third viewpoint reduces the number of inputs needed to cease to display one or more virtual objects for controlling external accessory devices in situations where the user may not want the one or more virtual objects for controlling external accessory devices to be displayed, causes the computer system to automatically cease to display the one or more virtual objects for controlling external accessory devices in these situations, and provides feedback about a state of the computer system (e.g., that the computer system is not currently configured to change the state of some external accessory devices when the input is detected).

In some embodiments, the computer system is in communication with a second external device (e.g., a smart watch, a tablet, or a phone). In some embodiments, the computer system receives an indication that an input (e.g., a selection of a virtual object of a first type (e.g., a cancel virtual object displayed on a display of the second external device)) was received at the second external device (e.g., by an input (e.g., a tap input, a swipe input, a rotational input, and/or a mouse click)) performed at the external device) (e.g., as described above in relation to FIGS. 23A-23F). In some embodiments, in response to receiving the indication that the user interface object has been selected, the computer system ceases to display the first virtual object (e.g., as described above in relation to FIGS. 23A-23E) (and/or one or more virtual objects that are associated with the one or more accessory devices (e.g., the one or more accessory devices that are visible from the second viewpoint) (and, in some embodiments, all virtual objects and/or one or more virtual objects that are associated with accessory devices that are currently being displayed are ceased to be displayed). Ceasing to display the first virtual object in response to receiving the indication that the user interface object has been selected reduces the number of inputs needed to cease displaying one or more virtual objects.

In some embodiments, aspects/operations of methods 800, 1000, 1200, 1400, 1600, 1800, 2000, 2200, 2600, 2800, 3000, and 3200 may be interchanged, substituted, and/or added with the steps of method 2400. For example, method 2400 can be used to control one or more external devices while the computer system is navigated using method 1200. For brevity, these details are not repeated here.

FIGS. 25A-25E illustrate example techniques for providing guidance for a physical activity, in accordance with some embodiments. FIG. 26 is a flow diagram of methods for providing guidance for a physical activity, in accordance with some embodiments. The user interfaces in FIGS. 25A-25E are used to illustrate the process in FIG. 26.

Figure 25A:
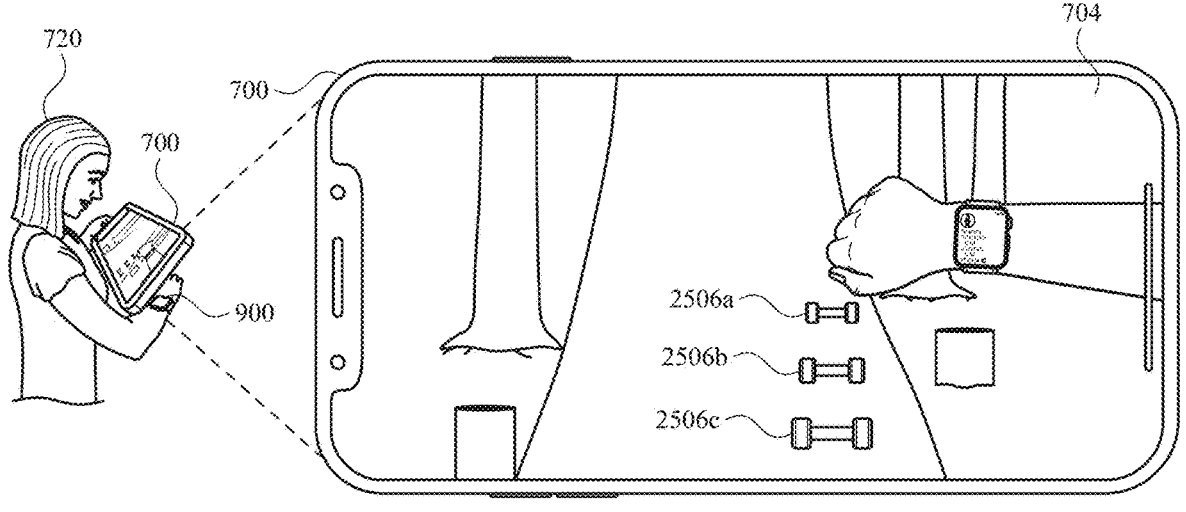
FIGS. 25A-25E illustrate example techniques for providing guidance for a physical activity, in accordance with some embodiments.

FIG. 25A illustrates user 720 holding computer system 700 and wearing external device 900. Computer system 700 and external device 900 are positioned in a physical environment. As illustrated in FIG. 25A, the physical environment is a portion of the physical environment described above in relation to FIG. 21A and includes physical objects 2506a-2506c. Physical objects 2506a-2506c are dumbbells that have different weights from each other. At FIG. 25A, a representation of the physical environment is visible on display 704 and includes a representation of external device 900 that is in the viewpoint of the user in FIG. 25A. While computer system 700 is a phone in FIG. 25A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 25A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the following description below will describe computer system 700 of FIGS. 25A-25E as displaying an AR user interface. In FIGS. 25A-25E, computer system 700 can overlay one or more virtual objects on the representation of the physical environment that "passes through" the transparent display (e.g., display 704) of computer system 700. In some embodiments, computer system 700 and external device 900 include one or more features as described above in relation to FIGS. 9A-9G (e.g., including how computer system 700 can present an AR environment via display 704 using one or more different techniques). At FIG. 25A, computer system 700 (and/or external device 900) detects a request to initiate guidance to perform a physical activity in the physical environment. In some embodiments, a request to initiate guidance to perform a physical activity in the physical environment is a request to initiate guidance to perform one or more workouts (e.g., yoga, running, jogging, swimming, rowing, hiking, walking, biking, strength training, jumping, an aerobic workout, and/or an anaerobic workouts) in the physical environment. In some embodiments, as a part of detecting the request to initiate guidance to perform the physical activity, computer system 700 detects one or more inputs (e.g., voice inputs, physical inputs, air gestures/inputs, and/or gaze inputs). In some embodiments, the one or more inputs are directed to one or more virtual objects that correspond to a fitness and/or workout application. In some embodiments, as a part of detecting the request to initiate guidance to perform the physical activity, computer system 700 receives an indication that one or more inputs (e.g., voice inputs and/or physical inputs) were performed at external device 900. In some embodiments, the one or more inputs that were performed at external device 900 were directed to one or more user interface objects that correspond to a fitness and/or workout application.

Figure 25B:
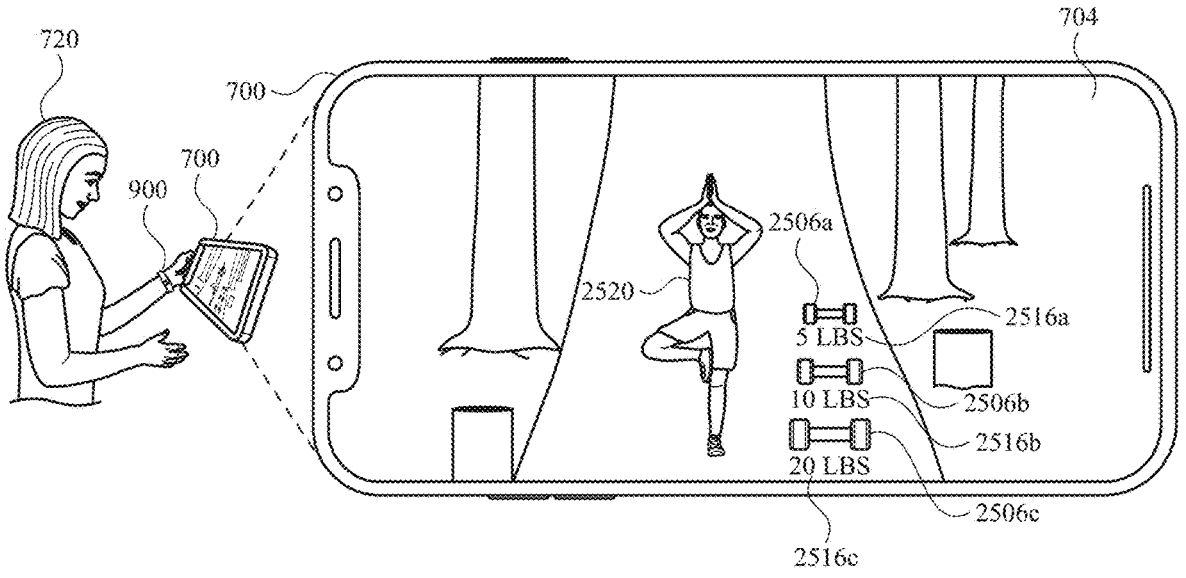
Figure 25C:
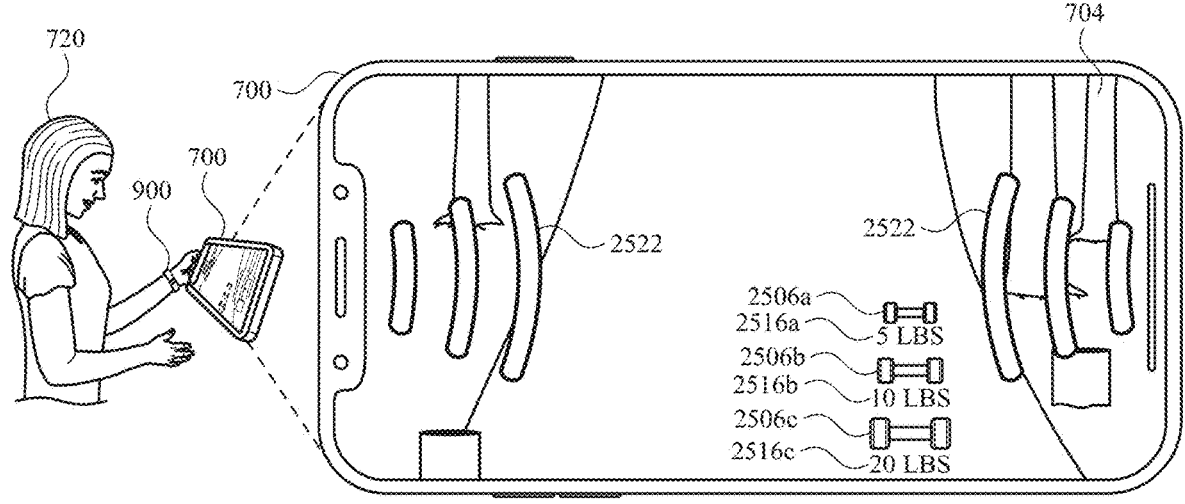

As illustrated in FIGS. 25B-25C, in response to detecting the request to initiate guidance to perform a physical activity in the physical environment, computer system 700 displays guidance to perform the physical activity. The guidance includes at least a visual portion (e.g., visual portion virtual object 2520 of FIG. 25B) and an audio portion (e.g., as indicated by audio portion virtual objects 2522 of FIG. 25C). In some embodiments, computer system 700 presents the visual portion and, after presenting the visual portion, computer system 700 outputs the audio portion (e.g., in response to detecting the request to initiate guidance to perform a physical activity in the physical environment and without intervening user input). In some embodiments, computer system 700 presents a first subset of the visual portion and, after presenting the first subset of the visual portion, computer system 700 outputs a first subset of the audio portion (while, in some embodiments, not presenting a subset of the visual portion). In some embodiments, after presenting the first subset of the audio portion and without intervening user input, computer system 700 presents a second subset of the visual portion (e.g., that is different or the same as the first subset of the visual portion) and, after presenting the second subset of the visual portion, outputs a second subset of the audio portion (while, in some embodiments, not presenting a subset of the visual portion) (and without intervening user input). In some embodiments, computer system 700 presents (and/or outputs) a subset of the visual portion and a subset of the audio portion at the same time. In some embodiments, computer system 700 (automatically and without intervening user input) presents one or more video and audio portions that correspond to a first portion of the guidance (and/or a first virtual object), using one or more of the techniques described above. In some embodiments, after presenting the one or more video and audio portions that correspond to the first portion of the guidance, computer system 700 presents one or more video and audio portions that correspond to the second portion of the guidance (and/or a first virtual object). In some embodiments, the first portion of the guidance is different from the second portion of the guidance.

As illustrated in FIG. 25B, the visual portion is a representation of the physical activity, such as visual portion virtual object 2520 that shows a person performing a yoga pose. As illustrated in FIG. 25B, visual portion virtual object 2520 is overlaid on the physical environment. At FIG. 25B, visual portion virtual object 2520 is animated, where the person shown in FIG. 25B is completing various portions of a yoga pose. In some embodiments, visual portion virtual object 2520 is an avatar and/or a three-dimensional animation. In some embodiments, visual portion virtual object 2520 is a static image and/or a series of static images. In some embodiments, visual portion virtual object 2520 is a video. In some embodiments, visual portion virtual object 2520 is an environment-locked virtual object, where visual portion virtual object 2520 is locked to one or more locations in the physical environment. In some embodiments, visual portion virtual object 2520 is displayed at a scale relative to user 720. Thus, in some embodiments, the size of visual portion virtual object 2520 (e.g., and/or one or more poses of the physical activity) is based on a distance between one or more locations (e.g., one or more environment-locked locations) and the current location of computer system 700.

At FIG. 25C, computer system 700 outputs the audio portion after outputting the visual portion described in FIG. 25B. While (and/or before and/or after) outputting the audio portion, computer system 700 displays audio portion virtual objects 2522. As illustrated in FIG. 25C, audio portion virtual objects 2522 are displayed on opposite sides of computer system 700. Audio portion virtual objects provide a visual indication that audio is being (and/or was being and/or will be) output by computer system 700.

As illustrated in FIGS. 25B-25C, in response to detecting the request to initiate guidance to perform a physical activity in the physical environment, computer system 700 displays guidance virtual objects 2516a-2516c. A guidance object provides guidance to the user concerning objects and/or portions of the environment that can be used while performing the physical activity and/or workout. As illustrated in FIG. 25B-25C, guidance virtual object 2516a is displayed adjacent to (e.g., or near) physical object 2506a indicates that physical object 2506a is a five-pound dumbbell, guidance virtual object 2516b is displayed adjacent to (e.g., or near) physical object 2506b and indicates that physical object 2506b is a ten-pound dumbbell, and guidance virtual object 2516c is displayed adjacent to (e.g., or near) physical object 2506c and indicates that physical object 2506c is a twenty-pound dumbbell. Thus, computer system 700 has the ability to detect physical objects in the virtual environment, determine characteristics of the physical objects, and provide guidance based on the physical object. Notably, computer system 700 does not provide a guidance virtual object for other objects in the physical environment (e.g., a tree trunk and/or the ground) because a determination has been made that these other objects are not likely to be useful to perform the physical activity for which guidance is being provided in FIGS. 25B-25C. In some embodiments, computer system 700 displays guidance virtual object(s) for different physical objects in the physical environment based on a determination that guidance is being provided for a different activity. For example, in some embodiments, computer system 700 displays one or more guidance virtual objects concerning the slope of the ground when a determination is made that guidance is being provided for golfing. In some embodiments, computer system 700 displays one or more guidance virtual objects concerning the height of a tree in the physical environment when a determination is made that guidance is being provided for climbing. In some embodiments, the one or more guidance virtual objects are based on metrics for different portions of the physical world (e.g., slope of the green, distance to pin, and/or height of tree). While guidance virtual objects 2516a-2516c are illustrated as being displayed near physical objects 2506a-2506c, guidance virtual objects 2516a-2516c could also be, alternately, displayed on physical objects 2506a-2506c. In some embodiments, guidance virtual objects 2516a-2516c are locked to a location that corresponds to the location of physical objects 2506a-2506c, such that guidance virtual objects 2516a-2516c continue to be displayed near physical objects 2506a-2506c after physical objects 2506a-2506c are moved (and/or the viewpoint of the user is moved). In some embodiments, guidance virtual objects 2516a-2156c are environment-locked or viewpoint-locked. In some embodiments, computer system 700 displays one or more guidance virtual objects that are environment-locked while concurrently displaying one or more guidance virtual objects that are viewpoint-locked. In some embodiments, the guidance virtual objects that are viewpoint-locked are displayed in a dashboard that is displayed on display 704 (e.g., a dashboard as described above in relation to virtual objects 2180a-2180c in FIGS. 21C-21D).

Figure 25D:
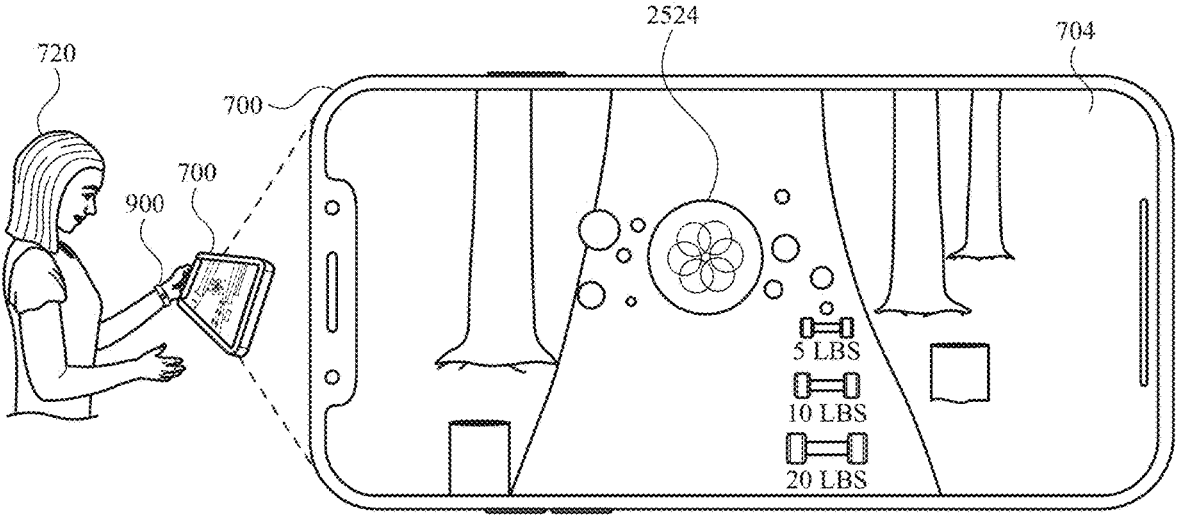

FIG. 25D illustrates an additional or alternative portion of guidance (e.g., described above in relation to FIGS. 25B-25C) that computer system 700 can provide. As illustrated in FIG. 25D, while (and/or before and/or after) providing guidance that includes the video portion and the audio portion (e.g., as described above in relation to FIGS. 25B-25C), computer system 700 can display focus virtual object 2524. Focus virtual object 2524 indicates a recommended level of focus for completing a portion of the physical activity. The recommend level of focus can be provided to indicate to the user that a portion of the physical activity that includes meditation should be performed. In some embodiments, focus virtual object 2524 animates (e.g., changes size, scatters, comes together, and/or changes shape) to indicate to the user that the recommended level of focus is changing. For example, computer system 700 can increase the size of focus virtual object 2524 based on a determination that a greater level of focus is required and computer system 700 can decrease the size of focus virtual object 2524 based a determination that a lesser level of focus is required (or, in some embodiments, vice-versa). In some embodiments, focus virtual object 2524 is displayed while the visual portion and/or the audio portion of the guidance is being presented. In some embodiments, focus virtual object 2524 is displayed without the visual portion and/or the audio portion of the guidance being presented. In some embodiments, audio is outputted while focus virtual object 2524 is being displayed, where the audio includes a description concerning the recommended level of focus that a user should maintain during a particular period of time. At FIG. 25D, computer system 700 detects the end of a session for performing the physical activity. In some embodiments, computer system 700 detects the end of the session for performing the physical activity after detecting that the user has performed and/or attempted to perform the physical activity. In some embodiments, computer system 700 detects the end of the session for performing the physical activity when a predetermined period of time for performing the physical activity has elapsed.

Figure 25E:
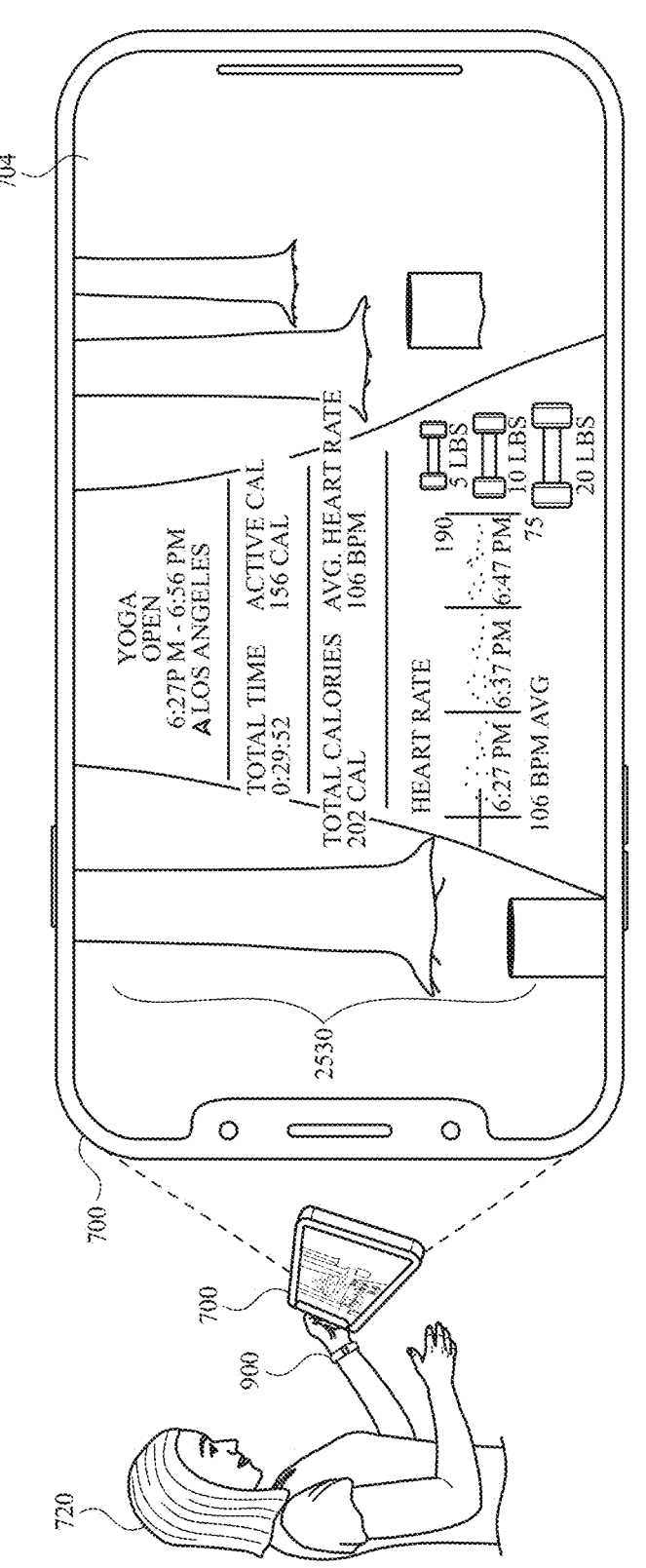

As illustrated in FIG. 25E, in response to detecting the end of the session for performing the physical activity, computer system 700 displays summary 2530, which includes metrics performed during the physical activity. As illustrated in FIG. 25E, the summary includes information, such as one or more indications of the type of physical activity performed (e.g., "YOGA"), a category of the activity and/or session (e.g., "OPEN"), the location where the physical activity was performed (e.g., "LOS ANGELES"), the total time spent performing the physical activity ("0:29:52"), the number of activity calories burned while performing the physical activity ("156 CAL"), the total calories burned while performing the physical activity ("202 CAL"), the average heart rate detected while performing the physical activity ("106 BPM"), and/or one or more heart rate readings that were detected while performing the physical activity (e.g., graph in summary 2530). In some embodiments, summary 2530 includes more or less information than the information illustrated in FIG. 25E. In some embodiments, summary 2530 includes different information than the information illustrated in FIG. 25E (e.g., such as distance information). In some embodiments, the information that is included in summary 2530 changes based on the type of physical activity that was performed (and/or for which guidance was provided). In some embodiments, one or more portions of summary 2530 are viewpoint-locked.

Additional descriptions regarding FIGS. 25A-25E are provided below in reference to method 2600 described with respect to FIGS. 25A-25E.

FIG. 26 is a flow diagram of an exemplary method 2600 for providing guidance for a physical activity, in accordance with some embodiments. In some embodiments, method 2600 is performed at a computer system (e.g., 700) that is in communication a display generation component (e.g., a display controller, a touch-sensitive display system, a display (e.g., integrated and/or connected), a 3D display, a transparent display, a projector, a heads-up display, and/or a head-mounted display) (and, in some embodiments, one or more output devices). In some embodiments, the computer system is in communication with one or more gaze-tracking sensors (e.g., an optical and/or IR camera configured to track a direction of attention of a user of the computer system). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, method 2600 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 2600 are, optionally, combined and/or the order of some operations is, optionally, changed.

While the computer system (e.g., 700) is being used (e.g., being worn and/or in a state where one or more inputs into and/or movement of the computer system is detected) in a physical environment, detecting (2602) a request to initiate guidance to perform a physical activity (e.g., one or more workouts) (e.g., yoga, running, jogging, swimming, rowing, hiking, walking, biking, strength training, jumping, an aerobic workout, and/or an anaerobic workouts) in the physical environment (e.g., as described above in relation to FIG. 25A). In some embodiments, the request is detected based on one or more inputs received at an external device.

At the computer system (e.g., 700), in response to detecting the request to initiate the guidance to perform the physical activity in the physical environment, providing (2604) guidance to perform the physical activity that includes (e.g., as described above in relation to FIGS. 25B-25D): displaying, via display of the display generation component, a virtual object (e.g., 2520) (e.g., a visual indication) that represents the physical activity, wherein the virtual object that represents the physical activity is overlaid on a representation of the physical environment (e.g., the virtual object is displayed as a part of an extended reality user interface) (e.g., as described above in relation to FIG. 25B), and in conjunction with (e.g., after or while) displaying, via display of the display generation component, the virtual object (e.g., 2520) that represents the physical activity overlaid on the representation of the physical environment, providing audio guidance (e.g., as indicated by 2522 and discussed in relation to FIG. 25C) corresponding to performance of the physical activity. In some embodiments, the audio guidance is provided to a user of the computer system while the user is performing the physical activity and/or while guidance to perform the physical activity is being provided. In some embodiments, the computer system is in communication with one or more physical activity sensors (e.g., an accelerometer, heart rate sensor, camera) that are configured to detect the user's physical activity level. In some embodiments, the physical activity sensors are integrated into an external electronic device (e.g., a smart watch) in communication with the computer system.

Displaying the virtual object that represents the physical activity and providing audio guidance corresponding to performance of the physical activity in response to detecting the request to initiate the guidance to perform the physical activity in the physical environment enables the computer system to display the virtual object and provide audio guidance without displaying additional controls.

In some embodiments, providing audio guidance corresponding to performance of the physical activity in conjunction with displaying, via display of the display generation component, the virtual object (e.g., 2520) that represents the physical activity overlaid on the representation of the physical environment includes (e.g., performing the steps below (e.g., without any intervening user input) in a sequence (e.g., in a sequence without any intervening steps of displaying one or more other virtual objects and/or providing one or more other audio guidance)) (e.g., as described above in relation to FIGS. 25B-25C): displaying a first respective virtual object that represents the physical activity (before displaying the second respective virtual object) (e.g., as described above in relation to FIGS. 25B-25C), after displaying the first respective virtual object that represents the physical activity (and before displaying the second respective virtual object), providing first respective audio guidance corresponding to performance of the physical activity (e.g., as described above in relation to FIGS. 25B-25C), after providing first respective audio guidance that corresponds to the audio guidance corresponding to performance of the physical activity, displaying a second respective virtual object that represents the physical activity, wherein the second respective virtual object is different from the first respective virtual object (e.g., as described above in relation to FIGS. 25B-25C), and after displaying the second respective virtual object that represents the physical activity, providing second respective audio guidance corresponding to performance of the physical activity, wherein the second respective audio guidance is different from the respective audio guidance (e.g., as described above in relation to FIGS. 25B-25C). Displaying the first respective virtual object that represents the physical activity and, after displaying the first respective virtual object, providing first respective audio guidance enables the computer system to display the virtual object and provide audio guidance in a particular order without displaying additional controls.

In some embodiments, providing audio guidance corresponding to performance of the physical activity in conjunction with displaying, via display of the display generation component, the virtual object that represents the physical activity overlaid on the representation of the physical environment includes providing at least a portion of the audio guidance corresponding to performance of the physical activity while displaying the virtual object that represents the physical activity (e.g., as described above in relation to FIGS. 25B-25C). Providing at least a portion of the audio guidance corresponding to performance of the physical activity while displaying the virtual object that represents the physical activity enables the computer system to display the virtual object and provide audio guidance in a particular order without displaying additional controls.

In some embodiments, the virtual object (e.g., 2520) that represents the physical activity includes (and/or is) a video of a first portion of the physical activity. Displaying the virtual object that represents the physical activity that includes the video of the first portion of the physical activity in response to detecting the request to initiate the guidance to perform the physical activity in the physical environment enables the computer system to display the virtual object that includes the video without displaying additional controls.

In some embodiments, the virtual object (e.g., 2520) that represents the physical activity includes (and/or is) a three-dimensional animation of a second portion (e.g., a portion that is the same or different than the first portion) of the physical activity. Displaying the virtual object that represents the physical activity that includes the three-dimensional animation of a second portion of the physical activity in response to detecting the request to initiate the guidance to perform the physical activity in the physical environment enables the computer system to display the virtual object that is the three-dimensional animation without displaying additional controls.

In some embodiments, the virtual object (e.g., 2520) that represents the physical activity includes one or more poses (e.g., yoga poses) (e.g., a position of one or more body parts of the user) for a user of the computer system to execute to perform the physical activity (e.g., as described above in relation to FIGS. 25B-25C), and wherein the one or more poses are environment-locked to one or more locations in the physical environment (e.g., as described above in relation to FIGS. 25B-25C). In some embodiments, the one or more poses are overlaid on a portion of the physical environment. Displaying the virtual object that represents the physical activity that includes one or more poses for a user of the computer system to execute to perform the physical activity in response to detecting the request to initiate the guidance to perform the physical activity in the physical environment enables the computer system to provide the one or more poses without displaying additional controls.

In some embodiments, a size of the one or more poses is based on a distance between at least one of the one or more locations and a current location of the computer system (e.g., 700) (e.g., pose is shown at scale of user) (e.g., as described above in relation to FIGS. 25B-25C). Displaying the one or more poses at the scale of the user provides feedback concerning the state of the computer system (e.g., the computer system's detected size of the user of the computer system in the three-dimensional environment).

In some embodiments, the physical environment includes a physical object (e.g., 2506a-2506c) (e.g., a golf club and/or a set of weights), the method further including: after (and/or in response to) detecting the request to initiate the guidance to perform the physical activity in the physical environment (e.g., and while providing guidance to perform the physical activity), displaying, via the display generation component, a virtual object (e.g., 2516a-2516c) that provides guidance concerning the physical object (e.g., 2506a-2506c) (e.g., guidance concerning the physical object's use in the physical activity) at a location that corresponds to the physical object (e.g., a location that is on and/or near a portion of the physical object and/or a location that is adjacent to a portion of the physical object). In some embodiments, the virtual object that provides guidance concerning the physical object is an indication to use the physical object (e.g., "use this golf club to hit the ball") and/or an indication that identifies the physical object (e.g., nine iron, three wood, five pounds, and/or twenty pounds).

In some embodiments, the virtual object is an environment-locked virtual object that is locked to the physical object. Displaying a virtual object that provides guidance concerning the physical object at a location that corresponds to the physical object provides feedback about a state of the computer system (e.g., the computer system's detection of objects relative to the three-dimensional environment).

In some embodiments, in accordance with a determination that a first metric (e.g., slope of the green, distance to the pin, and/or orientation of remaining bowling pins) related to the physical environment has a first state (e.g., has a first value, orientation, position, and/or characteristic), the guidance concerning the physical object (e.g., 2506a-2506c) is a first set of guidance (and/or the guidance concerning the physical object is displayed next to a first physical object (and/or the physical is a first physical object)) (e.g., as described above in relation to FIG. 25B), and in accordance with a determination that the first metric related to the physical environment has a second state (e.g., has a second value, orientation, position, and/or characteristic) that is different from the first state, the guidance concerning the physical object is a second set of guidance that is different from the first set of guidance (e.g., as described above in relation to FIG. 25B) (and/or the guidance concerning the physical object is displayed next to a second physical object that is different than the first physical object (and/or the physical is a second physical object)). Providing different guidance for a physical object based on the state of the first metric causes the computer system to automatically provide guidance based on the state of a metric.

In some embodiments, after (and/or in response to) detecting the request to initiate the guidance to perform the physical activity in the physical environment (e.g., and while providing guidance to perform the physical activity), displaying, via the display generation component, a virtual object concerning a second metric (e.g., slope of the green, distance to the pin, and/or orientation of remaining bowling pins) related to the physical environment (e.g., as described above in relation to FIG. 25B). In some embodiments, the virtual object concerning the second metric is displayed at a location that is associated with a physical object in the physical environment. Displaying, via the display generation component, a virtual object concerning a second metric related to the physical world causes the computer system to provide feedback about the state of objects in the physical environment and the state of the computer system (e.g., the state of the computer system's detection of the physical objects).

In some embodiments, the virtual object concerning the second metric is an environment-locked virtual object (e.g., 2516a-2516c) (e.g., locked to a portion of the physical world that the second metric concerns (e.g., a location that corresponds to a respective distance from a pin)) (e.g., as described above in relation to FIG. 25B).

In some embodiments, the virtual object concerning the second metric is a viewpoint-locked virtual object (e.g., 2516a-2516c) (e.g., as described above in relation to FIG. 25B). In some embodiments, the virtual object is displayed in a predetermined region (e.g., dashboard) of an AR user interface. In some embodiments, the virtual object is displayed next to and/or aligned with a set of viewpoint-locked virtual objects that are displayed in the predetermined region of the AR user interface.

In some embodiments, while providing audio guidance corresponding to performance of the physical activity, displaying a plurality of virtual objects (e.g., 2522) (e.g., one or more lines representing audio output) that indicate that audio guidance is being provided. In some embodiments, the plurality of virtual objects is overlaid on the physical environment. In some embodiments, a first virtual object of the plurality of virtual objects is displayed at on, near, and/or adjacent to a first side of the AR user interface and the second virtual object of the plurality of virtual objects is displayed at on, near, and/or adjacent to a second side of the AR user interface that is different from the first side of the AR user interface. In some embodiments, the plurality of virtual objects is not displayed while the virtual object that represents the physical activity is displayed. In some embodiments, the plurality of virtual objects is not displayed over and/or do not obscure the display of the virtual object that represents the physical activity (e.g., in embodiments where the virtual object that represents the physical activity is displayed concurrently with the plurality of virtual objects). Displaying the plurality of virtual object that indicate that audio guidance is being provided provides feedback about the state of the computer system (e.g., that the computer system is currently providing audio guidance).

In some embodiments, after providing guidance to perform the physical activity, detecting an end to a session for performing the physical activity (e.g., as described above in relation to FIG. 23D). In some embodiments, the computer system initiates the session for performing the physical activity in response to detecting the request to initiate the guidance to perform the physical activity. In response to detecting the end to the session for performing the physical activity, displaying, via the display generation component, a set of virtual objects (e.g., 25E) representing a set of metrics (e.g., heart rate, speed, steps, repetitions, and time to complete physical activity) captured during the session for performing the physical activity, wherein the set of virtual objects representing the set of metrics are a set of viewpoint-locked virtual objects. Displaying a set of virtual objects representing a set of metrics captured during the session in response to detecting the end to the session for performing the physical activity for performing the physical activity provide virtual objects for use to focus on during meditation causes the computer system to automatically display the set of virtual objects representing the set of metrics when the end of the session is detected.

In some embodiments, in response to detecting the request to initiate the guidance to perform the physical activity in the physical environment: in accordance with a determination that the physical activity has a first recommended focus level (e.g., as described above in relation to FIG. 25D), displaying, via the display generation component, a virtual object (e.g., 2524) that corresponds to (e.g., indicates, encourages, represents, and/or used to) the first recommended focus level (e.g., mental focus) for completion of the physical activity (e.g., without displaying the virtual object that corresponds to the second recommended focus level) (e.g., as described above in relation to FIG. 25D), and in accordance with a determination that the physical activity has a second recommended focus level that is different from the first recommended focus level (e.g., as described above in relation to FIG. 25D), displaying, via the display generation component, a virtual object (e.g., 2524) that corresponds to (e.g., indicates, encourages, represents, and/or used to) the second recommended focus level (e.g., mental focus) for completion of the physical activity (e.g., without displaying the virtual object that corresponds to the first recommended focus level), wherein display of the virtual object that corresponds to the first recommended focus level is different from display of the virtual object that corresponds to the second recommended focus level (e.g., as described above in relation to FIG. 25D). In some embodiments, display of the virtual object that corresponds to the first recommended focus level is different from display of the virtual object that corresponds to the second recommended focus level when the virtual object that corresponds to the first recommended focus level is displayed for a longer time frame and/or with a different animation (e.g., pulsating, spreading, and/or fading animation). In some embodiments, display of the virtual object that corresponds to the first recommended focus level is different from display of the virtual object that corresponds to the second recommended because the visual characteristics (e.g., size, shape, color, and/or appearance) of the virtual object that corresponds to the first recommended focus level is different from the visual characteristics (e.g., size, shape, color, and/or appearance) of the virtual object that corresponds to the second recommended focus level. Displaying a particular virtual object corresponds to a particular recommended focus level for completion of the physical activity in response to detecting the request to initiate the guidance to perform the physical activity in the physical environment when prescribed conditions are met allows the computer system to automatically display the virtual object that encourages when suggested focus level for completion of the physical activity when a request to initiate the guidance to perform the activity in the physical environment is detected.

In some embodiments, aspects/operations of methods 800, 1000, 1200, 1400, 1600, 1800, 2000, 2200, 2400, 2800, 3000, and 3200 may be interchanged, substituted, and/or added with the steps of method 2600. For example, method 2600 can be used to display a virtual object associated for a physical activity after the computer system has provided navigation guidance using method 1600. For brevity, these details are not repeated here.

Figure 27A:
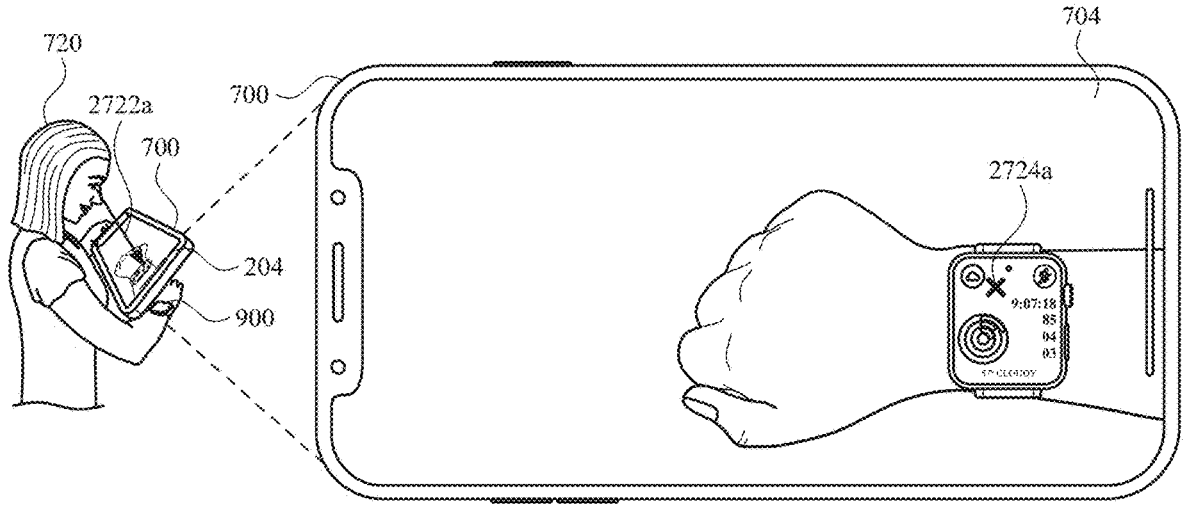
FIGS. 27A-27D illustrate example techniques for displaying virtual objects to perform one or more operations associated with an external device, in accordance with some embodiments.

FIGS. 27A-27D illustrate example techniques for displaying virtual objects to perform one or more operations associated with an external device, in accordance with some embodiments. FIG. 28 is a flow diagram of methods for displaying virtual objects to perform one or more operations associated with an external device, in accordance with some embodiments. The user interfaces in FIGS. 27A-27D are used to illustrate the method in FIG. 28. FIG. 27A illustrates user 720 holding computer system 700 and wearing external device 900. Computer system 700 and external device 900 are positioned in a physical environment. At FIG. 27A, a representation of the physical environment is visible on display 704, which includes a representation of external device 900 that is in the viewpoint of the user in FIG. 27A. While computer system 700 is a phone in FIG. 27A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 27A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the description below will describe the computer system 700 of FIGS. 27A-27D displaying an AR user interface, where one or more virtual objects are overlaid on the representation of the physical environment that "passes through" the transparent display of computer system 700. In some embodiments, computer system 700 and external device 900 include one or more features as described above in relation to FIGS. 9A-9G (e.g., including displaying how computer system 700 can present an AR environment via display 704 using one or more different techniques). At FIG. 27A, computer system 700 detects that the gaze of user 720 is directed to the representation of external device 900 that is visible on display 704 (e.g., as indicated by gaze direction 2722a and at gaze location 2724a (e.g., which is optionally not displayed as described above in relation to gaze location 1724b in FIG. 17B).

Figure 27B:
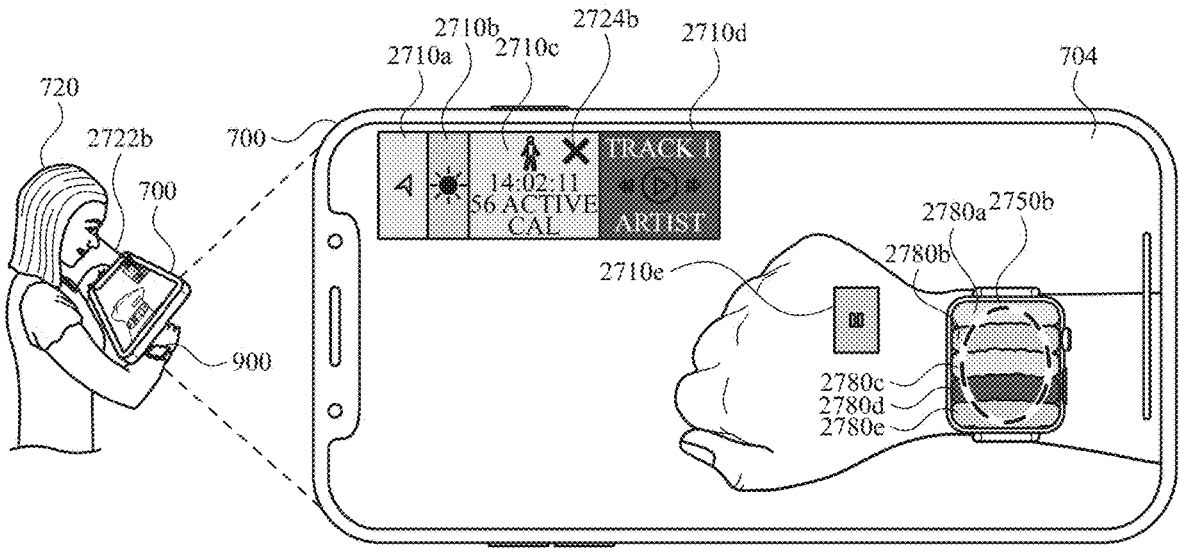

As illustrated in FIG. 27B, in response to detecting that the gaze of user 720 is directed to the representation of external device 900, computer system 700 displays a set of virtual objects around the representation of external device 900. As illustrated in the FIG. 27B, the set of virtual objects include navigation virtual object 2710a, brightness control virtual object 2710b, fitness application virtual object 2710c, music application virtual object 2710d, and pause control virtual object 2170e. Music application virtual object 2710d and pause control virtual object 2710e correspond to a music application while navigation virtual object 2710a, brightness control virtual object 2710b, and fitness application virtual object 2710c correspond to other applications and/or operations. In some embodiments, each of virtual objects 2710a-2710c correspond to an application and/or an operation configured to run on external device 900. In some embodiments, the application and/or the operation is running (e.g., in the background and/or in the foreground) on external device 900 (e.g., while the respective virtual object that corresponds to the application and/or the operation is displayed). In some embodiments, the application and/or the operation was recently running and/or used recently on external device 900. In some embodiments, the application and/or operation is a favorite and/or most used application. In some embodiments, if computer system 700 did not detect that the gaze of the user was directed to the representation of external device 900 at FIG. 27A, computer system 700 would not display the set of virtual objects illustrated in FIG. 27B. In some embodiments, while displaying the set of virtual objects around the representation of external device 900, computer system 700 detects that the gaze of the user is no longer directed to the representation of the external device. In some of these embodiments, in response to detecting that the gaze of the user is no longer directed to the representation of the external device, computer system 700 ceases to display the set of virtual objects (e.g., around the representation of external device 900). In some of these embodiments, in response to detecting that the gaze of the user is no longer directed to the representation of the external device, computer system 700 continues to display the set of virtual objects (e.g., around the representation of external device 900) (e.g., for a predetermined period, such as 1-5 minutes). In some embodiments, the set of virtual objects are locked to the representation of the external device 900, such that the virtual objects follow the movement of external device 900 (e.g., using one or more techniques as described above in relation to the movement of the virtual objects 1760a and/or 1760b in FIGS. 17B-17D). In some embodiments, the shape (e.g., circle and/or triangle) of one or more of the virtual objects differs from the shape (e.g., a rectangle) of virtual objects 2710a-2710e illustrated in FIG. 27A. In some embodiments, computer system 700 displays a different set of virtual objects in response to detecting that the gaze of user 720 is directed to the representation of external device 900 while external device 900 is displaying a user interface that is different from the user interface displayed by external device 900 in FIG. 27A.

As illustrated in FIG. 27B, in response to detecting that the gaze of user 720 is directed to the representation of external device 900, external device 900 displays a user interface that includes color representations 2780a-2780c. As illustrated in FIG. 27B, each of color representations 2780a-2780e are displayed in a separate region on the user interface displayed by external device 900. At FIG. 27B, each of color representations 2780a-2780c correspond to one of the set of virtual objects 2710a-2710e. For example, color representation 2780a matches the color of virtual object 2710a, color representation 2780b matches the color of virtual object 2710b, color representation 2780c matches the color of virtual object 2710c, color representation 2780d matches the color of virtual object 2710d, and color representation 2780e matches the color of virtual object 2710c. In some embodiments, color representations 2780a-2780e indicate that one or more inputs detected at external device 900 can cause an operation to be performed that corresponds to one or more of virtual objects 2780a-2780e (e.g., as discussed further below in relation to FIGS. 27B-27D). In some embodiments, external device 900 indicates to the user that the one or more virtual objects can be controlled via one or more inputs on external device 900. In some embodiments, color representations 2780a-2780e can include one or more characteristics other than color (e.g., tint, shape, size, patterns, and/or boldness) that matches a respective characteristic of a respective corresponding virtual object (e.g., in addition to or in lieu of the colors matching). At FIG. 27B, tap gesture 2750b is performed on external device 900 (e.g., on a touch-sensitive surface the physical external device itself, not on the representation of the device) while the gaze of user 720 is detected as being directed to fitness application virtual object 2710c (e.g., as indicated by gaze direction 2722b and gaze location 2724b).

Figure 27C:
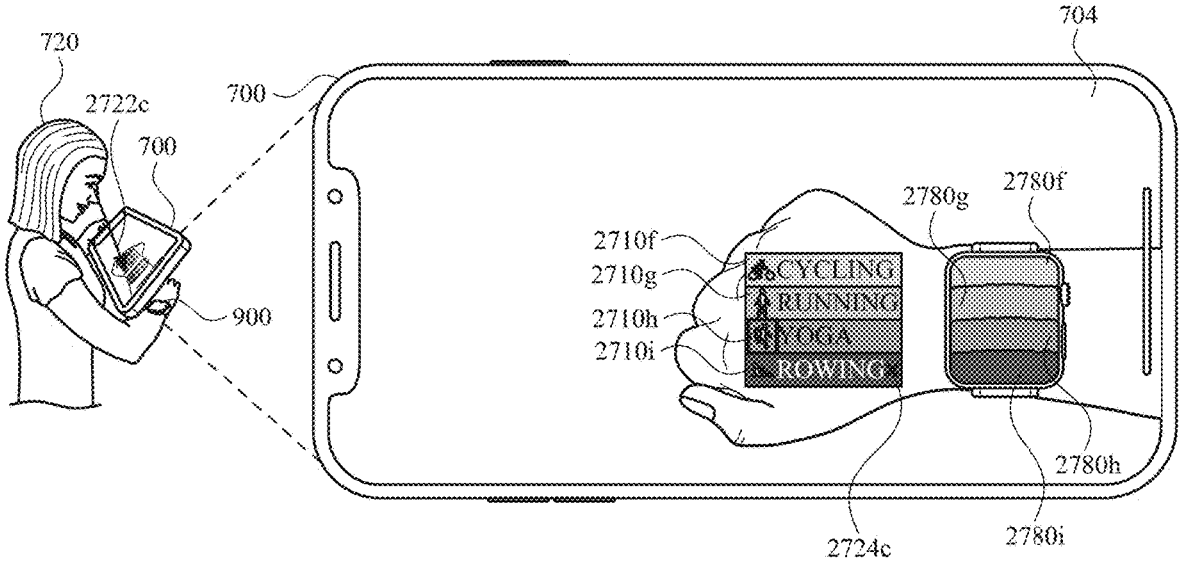

At FIG. 27C, in response to detecting that the gaze of user 720 is directed to fitness application virtual object 2710c while computer system 700 receives an indication that external device 900 detected tap gesture 2750b, computer system 700 performs an operation associated with fitness application virtual object 2710c. As a part of performing the operation associated with fitness application virtual object 2710c, computer system 700 displays a set of fitness application controls adjacent to (e.g., and/or near) the representation of external device 900 on display 704. The set of fitness applications controls include cycling control virtual object 2710f, running control virtual object 2710g, yoga control virtual object 2710*h*, and rowing virtual object 2710*i*. As a part of performing the operation associated with fitness application virtual object 2710*c*, computer system 700 sends a set of instructions to external device 900, which cause external device 900 to be updated. As illustrated in FIG. 27C, external device 900 is updated to include color representations 2780*f*-2780*i* and ceases to display color representations 2780*a*-2780*c*. Color representations 2780*f*-2780*i* are displayed by external device 900 because each of the respective color representations corresponds to one respective fitness application control in the set of fitness application controls.

Looking back at FIG. 27B, if computer system 700 receives an indication that external device 900 detected tap gesture 2750*b* or another gesture while computer system 700 detects that the gaze of user 720 is directed to a virtual object that is different from fitness application virtual object 2710*c*, computer system 700 performs a different operation than the operation associated with fitness application virtual object 2710*c*. In some embodiments, if computer system 700 receives an indication that external device 900 detected a gesture while computer system 700 detects that the gaze of user 720 is directed to navigation virtual object 2710*a*, computer system 700 performs an operation associated with navigation virtual object 2710*a*, such as displaying one or more navigation virtual objects controls that correspond to a navigation application (e.g., without displaying the set of fitness application controls described in relation to FIG. 27C). In some embodiments, if computer system 700 receives an indication that electronic device detected a gesture while computer system 700 detects that the gaze of user 720 is directed to brightness virtual object 2710*a*, computer system 700 performs an operation associated with brightness virtual object 2710*a*. In some embodiments, as a part of performing the operation associated with brightness virtual object 2710*a*, computer system 700 causes the brightness of external device 900 to be adjusted. In some embodiments, the brightness of external device 900 is adjusted based on the magnitude (e.g., speed and/or force) of the gesture performed at the external device. For example, in some embodiments, the brightness of the external device 900 is increased (or decreased) by an amount that is directly (e.g., indirectly) proportional to the magnitude of the gesture (e.g., a swipe gesture and/or drag gesture) performed at the external device. In some embodiments, the brightness of the external device is adjusted based on the direction of the gesture performed at the external device. For example, in some embodiments, a gesture in one direction increases the brightness of the external device, and a gesture in the opposite direction decreases the brightness of the external device. In some embodiments, if computer system 700 receives an indication that external device 900 detected a gesture while computer system 700 detects that the gaze of user 720 is directed to music application virtual object 2710*d*, computer system 700 performs an operation associated with music application virtual object 2710*d*, such as displaying music application virtual objects controls that correspond to a music application (e.g., without displaying the set of fitness application controls described in relation to FIG. 27C). In some embodiments, if computer system 700 receives an indication that external device 900 detected a gesture while the computer system 700 detects that the gaze of user 720 is detected as being directed to pause control virtual object 2710*c*, computer system 700 performs an operation associated with pause control virtual object 2710*e*, such as causing external device 900 to pause music that is playing on external device 900 (and/or computer system 700). In some embodiments, the operation that is caused to be performed and/or the operation that is controlled by detecting an input on external device 900 changes based on the current gaze of the user. In some embodiments, computer system 700 receives an indication that external device 900 detected a gesture while computer system 700 detects that the gaze of user 720 is not directed to one of the virtual objects in the set of virtual objects, computer system 700 does not perform an operation and/or does not perform an operation associated with one of the set of virtual objects. In some embodiments, computer system 700 receives an indication that external device 900 detected a gesture while the computer system 700 detects that gaze of user 720 is directed to a virtual object that does not correspond to an operation and/or application that is available to be controlled via an input on external device 900, computer system 700 does not perform an operation and/or does not perform an operation associated with one of the set of virtual objects. In some embodiments, computer system 700 receives an indication that external device 900 detected a gesture while computer system 700 detects that the gaze of user 720 is detected as being directed to the representation of external device 900, external device 900 performs a respective operation is performed at external device 900. In some embodiments, the respective operation is an operation that is performed at the external device when a set of virtual objects are not displayed and the gesture is detected at the external device (e.g., the operation that is performed at external device 900 when computer system 700 is in an off state and/or a default operation). Turning back to FIG. 27C, computer system 700 detects that the gaze of user 720 is detected as being directed to rowing virtual object 2710*i* (e.g., as indicated by gaze direction 2722*c* and gaze location 2724*c*) while a gesture is not detected on external device 900.

Figure 27D:
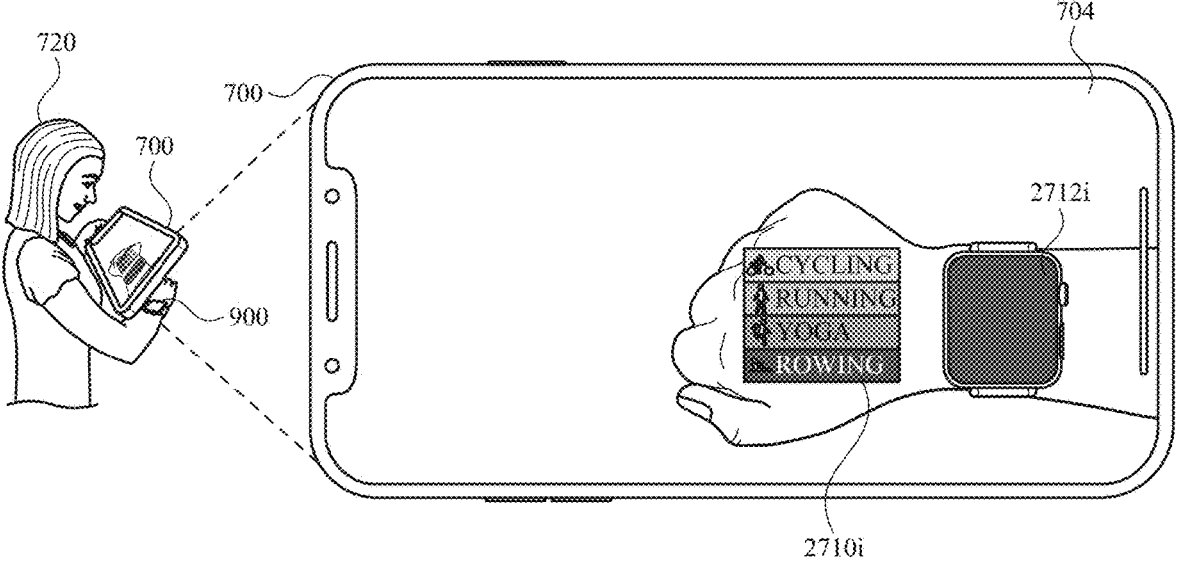

As illustrated in FIG. 27D, in response to detecting that the gaze of user 720 is detected as being directed to rowing virtual object 2710*i* while electronic device 900 has not detected a gesture, computer system 700 causes external device 900 to expand the display of color representation 2780*i* and ceases to display color representations 2780*f*-2780*h*. Here, computer system 700 causes external device 900 to expand the display of color representation 2780*i* to indicate that a gesture detected at external device 900 would perform the operation associated with the corresponding virtual object (e.g., rowing virtual object 2710*i*) (e.g., while a gaze of the user is directed to the corresponding virtual object). In some embodiments, at FIG. 27D, computer system 700 does not perform an operation associated with rowing virtual object 2710*i* because a gesture has not been detected at external device 900. Thus, in some embodiments, the set of color representations that are displayed by external device 900 are updated as the gaze of the user moves between different representations of virtual objects (e.g., from one solid color to another solid color). In some embodiments, causing external device 900 to update a set of color representations (e.g., to display another set of color representations) is not an operation that is associated with a virtual object that is displayed by computer system 700.

Additional descriptions regarding FIGS. 27A-27D are provided below in reference to method 2800 described with respect to FIGS. 27A-27D.

FIG. 28 is a flow diagram of an exemplary method 2800 for displaying virtual objects to perform one or more operations associated with an external device, in accordance with some embodiments. In some embodiments, method 2800 is performed at a computer system (e.g., 700) that is in communication with one or more gaze-tracking sensors (e.g., an optical and/or IR camera configured to track a direction of attention of a user of the computer system), a display generation component (e.g., a display controller; a touch-sensitive display system; a display (e.g., integrated and/or connected), a 3D display, a transparent display, a projector, a heads-up display, and/or a head-mounted display), and an external device (e.g., 900) (e.g., a watch, a tablet, and/or a smartphone). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, the computer system includes one or more gaze-tracking sensors (e.g., an optical and/or IR camera configured to track a direction of attention of a user of the computer system). In some embodiments, the computer system is in communication with and/or includes one or more sensors (e.g., a gyroscope and/or accelerometer) for detecting gravity and/or the direction of gravity. In some embodiments, method 2800 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 2800 are, optionally, combined and/or the order of some operations is, optionally, changed.

While displaying, via the display generation component, an extended reality user interface (e.g., as described above in relation to FIG. 27A), the computer system detects (2802) (e.g., while the computer system is a first state (e.g., a suspended state; a display inactive state; and/or a low power state), via the one or more gaze-tracking sensors, that attention of a user (e.g., of the computer system) is directed to the external device (e.g., 900).

In response to detecting that the attention of the user is directed to the external device (e.g., as indicated by 2722*b* and/or 2724*b*) (e.g., and in accordance with a determination that the external device is displaying a respective user interface), the computer system displays (2804), via the display generation component, a first virtual object (e.g., 2710*a*-2710*i*) (e.g., that was not previously displayed) (e.g., that corresponds to the respective user interface).

While displaying, via the display generation component, the first virtual object (e.g., 2710*a*-2710*i*), the computer system receives (2806) information indicative of an input (e.g., 2750*b*) at (e.g., performed at) the external device (e.g., information from the external device indicative of a touch input on a touch-sensitive surface or touch-sensitive display of the external device, a button press of a button of the external device, a rotation of a rotatable input mechanism of the external device, a press on a rotatable input mechanism of the external device, and/or information about inputs of at the external device detected by one or more sensors that are in communication with the computer system and/or in communication with the external device).

In response to (2808) receiving the information indicative of the input (e.g., 2750*b*) at the external device and in accordance with a determination that attention of the user is directed to the first virtual object (e.g., 2710*a*-2710*i*), (e.g., when the input was detected), the computer system performs (2810) an operation associated with the first virtual object based on the input at the external device (e.g., moving and/or selecting the first virtual object) (e.g., as described above in relation to FIGS. 27A-27D). In some embodiments, as a part of performing the operation associated with the first virtual object based on the input at the external device, the computer system causes the external device to perform an operation associated with the first virtual object. In some embodiments, as a part of performing the operation associated with the first virtual object based on the input at the external device, the computer system performs an operation associated with the first virtual object without causing the external device to perform an operation.

In response to (2808) receiving the information indicative of the input (e.g., 2750*b*) at the external device and in accordance with a determination that attention the user is not directed to the first virtual object (e.g., 2710*a*-2710*i*) (e.g., when the input was detected), the computer system forgoes performing (2812) the operation associated with the first virtual object based on the input at the external device (e.g., as described above in relation to FIGS. 27A-27D). In some embodiments, while displaying, via the display generation component, the first virtual object, the computer system detects that the attention of a user (e.g., of the computer system) is directed to the external device and, in response to detecting that the attention of the user is not directed to the external device, the computer system continues to display the first virtual object. In some embodiments, while displaying, via the display generation component, the first virtual object, the computer system detects that the attention of a user (e.g., of the computer system) is directed to the external device and, in response to detecting that the attention of the user is not directed to the external device, the computer system ceases to display the first virtual object. Choosing whether or not to perform an operation associated with the first virtual object based on the input at the external device when prescribed conditions are met causes the computer system to automatically perform the operation associated with the first virtual object when a determination is made that attention of the user is directed to the first virtual object. Performing an operation associated with the first virtual object based on the input at the external device in response to receiving the information indicative of the input at the external device and in accordance with a determination that attention of the user is directed to the first virtual object allows the computer system to perform an operation associated with the first virtual object by detecting input at the external device without displaying additional controls.

In some embodiments, before detecting that attention the user is directed to the external device, a representation (e.g., virtual object that corresponds to the external device and/or the actual and/or physical appearance of external device through the viewpoint of the user) of the external device (e.g., 900) is in (e.g., is visible in and/or within) a viewpoint (e.g., as indicated by 704) of the user while the first virtual object (e.g., 2710*a*-2710*i*) is not displayed, and wherein the external device is in the physical environment (e.g., as described above in relation to FIGS. 27A-27B). In some embodiments, the first virtual object is not displayed until a determination is made that the attention of the user is directed to the external device and/or a determination is made that the external device is visible within a viewpoint of the user while the first virtual object is not displayed. Displaying a first virtual object in response to detecting that the attention of the user is directed to the external device that was not displayed when a representation of the external device was visible within the viewpoint of the user causes the computer system to automatically display the first virtual object based on the attention of the user, irrespective of whether the external device was visible within the viewpoint of the user.

In some embodiments, the external device (e.g., 900) is configured to operate in a first state (e.g., while the computer system is a first state (e.g., a suspended state; a display inactive state; and/or a reduced power state)) before detecting that the attention of the user is directed to the external device. In some embodiments, performing the operation associated with the first virtual object (e.g., 2710*a*-2710*i*) based on the input (e.g., 2750*b*) at the external device includes causing the external device to be configured to operate in a second state (e.g., an active state, a display active state, and/or a non-reduced power state) that is different from the first state (e.g., as described above in relation to FIGS. 27B-27C). In some embodiments, the external device performs a second operation associated with the first virtual object while the external device is operating in the second state, and the external device perform a first operation (e.g., that is different from the second operation) associated with the first virtual object while the external device is operating in the second state. In some embodiments, the accessory device causes the operation corresponding to the first virtual object to be perform. In some embodiments, the computer system causes the operation corresponding to the first virtual object to be performed. In some embodiments, in accordance with a determination that the external device is operating in the first state (and/or not operating in the second state) and/or in accordance with a determination that a first input is not received at the external device (e.g., and/or not received at the external device while the external device is operating in the second state), an operation corresponding to the first virtual object is not performed. In some embodiments, in accordance with a determination that the input is received at the external accessory device while the external accessory device is operating in the first state, an operation corresponding to the first virtual object is not performed. Causing the external device to be configured to operate in a second state in response to receiving the information indicative of the input at the external device and in accordance with a determination that attention of the user is directed to the first virtual object allows the computer system allows the computer system to cause the state of the external device to change without displaying additional controls.

In some embodiments, in response to detecting that the attention (e.g., indicated by 2722*b* and/or 2724*b*) of the user is directed to the external device, the first virtual object is displayed near (e.g., adjacent to and/or within a distance (e.g., 0.1-1000 centimeters) from a representation of the external device (e.g., as described above in relation to FIGS. 27A-27B) (e.g., that is visible within the viewpoint of the user). In some embodiments, the location at which the first virtual object is displayed is based on a determined location of the external device. In some embodiments, the first virtual object is environment-locked to the external device. In some embodiments, a virtual object (e.g., no virtual object) is positioned between the first virtual object and the external device. In some embodiments, the first virtual object (and one or more other virtual objects that are displayed in response to detecting that the attention of the user is directed to the external device) is displayed outside of the border (e.g., outline and/or surface) of the external device and/or outside of the bottom, top, left, side, rear side, and/or front side of the external device). In some embodiments, the first virtual object is displayed adjacent to and/or an edge of the external device that is in the physical environment. In some embodiments, the first virtual object is displayed concurrently with a second virtual object, where the second virtual object was displayed in response to detecting the attention of the user being directed to the external device. In some embodiments, the first virtual object is displayed at a first size and the second virtual object is displayed at a second size that is different from the first size. In some embodiments, the first virtual object is displayed adjacent to and/or outside of a first edge of the external device and the second virtual object is displayed adjacent to and/or outside of a second edge of the external device that is different from the first edge. In some embodiments, the first virtual object and the second virtual object are displayed outside of the screen and/or not on the screen of the external device. Displaying the first virtual object near the representation of the external device provides feedback about the state of the computer system (e.g., where the computer system and the external device can be used to perform an operation associated with the first virtual object).

In some embodiments, in response to receiving the information indicative of the input at the external device (e.g., while displaying the first virtual object and the second virtual object) and in accordance with a determination that attention of the user (e.g., as indicated by 2722*c* and/or 2724*c*) is directed to a second virtual object (e.g., 2710*a*-2710*i*) that is different from the first virtual object (and, in some embodiments, that is concurrently displayed with the first virtual object), performing an operation associated with the second virtual object, different from the operation associated with the first virtual object, based on the input at the external device (e.g., as described above in relation to FIGS. 27B-27D) (e.g., without performing the operation associated with the first virtual object based on the input at the external device) (e.g., while maintaining the state of the first virtual object). In some embodiments, in response to detecting that the attention of the user is directed to the external device, the computer system displays, via the display generation component, a second virtual object concurrently with the first virtual object (e.g., where second virtual object is different from the first virtual object). In some embodiments, as a part of performing the operation associated with the second virtual object based on the input at the external device, the computer system causes the state of the second virtual object to change (e.g., from a first operational state to a second operational state). In some embodiments, in accordance with a determination that the external device is operating in the first state (and/or not operating in the second state) and/or in accordance with a determination that a first input is not received at the external device (and/or not received at the external device while the external device is operating in the second state), an operation corresponding to the first virtual object is not performed. In some embodiments, in accordance with a determination that the input is received at the external accessory device while the external device is operating in the first state, an operation corresponding to the first virtual object is not performed. In some embodiments, in accordance with a determination that the external device is operating in the second state and/or in accordance with a determination that the first input is received at the external device (and/or received at the external device while the external device is operating in the second state), the operation corresponding to the first virtual object is performed. Performing an operation associated with the second virtual object based on the input at the external device in response to receiving the information indicative of the input at the external device and in accordance with a determination that attention of the user is directed to a second virtual object that is different from the first virtual object allows the computer system to perform a different operation (e.g., operation associated with another virtual object) without displaying additional controls.

In some embodiments, in response to receiving the information indicative of the input at the external device and in accordance with a determination that attention of the user is directed to the first virtual object, forgoing performing the operation associated with the second virtual object based on the input at the external device (e.g., as described above in relation to FIGS. 27A-27D). Automatically forgoing performing the operation associated with the second virtual object based on the input at the external device when prescribe conditions are met allows the computer system to automatically not perform the operations when relevant conditions are not detected.

In some embodiments, in response to receiving the information indicative of the input at the external device (e.g., 900) and in accordance with a determination that attention of the user is directed to the first virtual object (e.g., **2710*a*-271010 (e.g., as described above in relation to FIG. 27B): in accordance with a determination that the input at the external device has a first input magnitude (e.g., first speed, first time that input is detected, and/or first amount of acceleration), the operation associated with the first virtual object has a first operational magnitude (e.g., volume adjusted by a second amount) (e.g., a first number of songs are skipped) (e.g., as described above in relation to FIG. 27B); and in accordance with a determination that the input at the external device has a second input magnitude (e.g., second speed, second time that input is detected, and/or second amount of acceleration) that is different from (e.g., greater than or less than) the first magnitude, the operation associated with the first virtual object has a second operational magnitude (e.g., volume adjusted by a fourth amount that is different from the second amount) (e.g., a second number of songs are skipped, where the second number of songs are different from the first number of songs) that is different from the first operational magnitude (e.g., as described above in relation to FIG. 27B**). In some embodiments, the magnitude of the operation increases as the magnitude of the input increases. In some embodiments, the magnitude of the operation decreases as the magnitude of the input decreases. Performing an operation that has an operation magnitude based on the input magnitude of the input at the external device allows the computer system to perform the operation in a manner that is consistent with the input at the external device without displaying additional controls.

In some embodiments, in response to receiving the information indicative of the input at the external device (e.g., 900) and in accordance with a determination that attention of the user is directed to the first virtual object (e.g., **2710*a*-2710*i*): in accordance with a determination that the input at the external device has a first direction (e.g., left, right, up, down, and/or any combination thereof), the operation associated with the first virtual object has a first operational direction (e.g., as described above in relation to FIG. 27B) (e.g., left, right, up, down, and/or any combination thereof); and in accordance with a determination that the input at the external device has a second direction (e.g., left, right, up, down, and/or any combination thereof) that is different from the first direction, the operation associated with the first virtual object has (e.g., is performed in) a second operational direction that is different from the second direction (e.g., as described above in relation to FIG. 27B**) (e.g., left, right, up, down, and/or any combination thereof). In some embodiments, the second direction is the same as the second operational direction. In some embodiments, the second direction is in the opposite direction of the second operational direction. In some embodiments, the first direction is the same as the first operational direction. In some embodiments, the first direction is in the opposite direction of the second operational direction. Performing an operation that has a direction based on the input at the external device allows the computer system to perform the operation in a manner that is consistent with the input at the external device without displaying additional controls.

In some embodiments, in response to detecting that the attention of the user is directed to the external device (e.g., 900), causing the external device (e.g., 900) to display a first indication (e.g., **2780*a*-2780*i*) (e.g., a user interface object, text, and/or colors) that corresponds to the first virtual object (e.g., 2710*a*-2710*i***) (and, in some embodiments, an indication that corresponds to a virtual object that is different from the first virtual object). In some embodiments, the indication that corresponds to the virtual object that is different from the first virtual object is different from (e.g., is a different color than) the first indication that corresponds to the first virtual object. In some embodiments, the indication corresponds to a virtual object by the color of the indication (e.g., the color of the indication matching the color of a virtual object). Causing the external device to display a first indication that corresponds to the first virtual object in response to detecting that the attention of the user is directed to the external device provides feedback about the state of the external device (e.g., that the operation was performed based on the input at the external device and the attention of the user being directed to the first virtual object).

In some embodiments, in response to detecting that the attention of the user is directed to the external device, the computer system displays, via the display generation component, a third virtual object that is different from the first virtual object (e.g., **2710*a*-2710*i*), wherein the third virtual object (e.g., 2710*a*-2710*i*) is displayed concurrently with the first virtual object, and wherein the first virtual object has (e.g., displayed with) a first visual characteristic (e.g., a color, a border style, a pattern, a size, and/or a type (e.g., color and/or shadow) of highlighting) (and not displayed with the third visual characteristic) and the third virtual object has (e.g., displayed with) a third visual characteristic (e.g., a color, a border style, a pattern, a size, and/or a type (e.g., color and/or shadow) of highlighting) that is different from the first visual characteristic (e.g., as described above in relation to FIG. 27B**) (and not displayed with the first visual characteristic). In some embodiments, the computer system causes the external device to display a second indication that corresponds to the first virtual object and a third indication that corresponds to the third virtual object, wherein the second indication has (e.g., displayed with and/or includes) the first visual characteristic and the third indication has (e.g., displayed with and/or includes) the third visual characteristic. In some embodiments, the second indication does not have the third visual characteristic (e.g., because the second indication does not correspond to the third virtual object) and/or the third indication does not have the first visual characteristic (e.g., because the third indication does not correspond to the first virtual object). Displaying the first virtual object with a different visual characteristic from the visual characteristic at which the third virtual object is displayed provide feedback concerning the state of the computer system (e.g., that the displayed virtual objects perform different operations).

In some embodiments, performing the operation associated with the first virtual object based on the input at the external device includes: in accordance with a determination that the input at the external device includes a selection input (e.g., 2750b) (e.g., a tap input (e.g., on a surface of the external device), a mouse click, pressing of one or more hardware button, and/or a non-movement input (e.g., on the surface of the external device and/or one or more hardware buttons)) (and in accordance with a determination that attention of the user is directed to the first virtual object (e.g., in response to receiving the information indicative of the input at the external device)), selecting (e.g., activating) the first virtual object (e.g., 2710a-2710i). In some embodiments, in response to the first virtual object being selected, the computer system causes one or more media operations to be performed (e.g., pausing, stopping, fast-forwarding, reversing, and/or skipping playback of media) and/or a user interface and/or application (e.g., navigation application, meditation application, health application, and/or media application) associated with the first virtual object to be launched. In some embodiments, as a part of performing an operation associated with the first virtual object based on the input at the external device, the computer system performs the operation that would have and/or is performed when input is detected at a virtual object that corresponds to the first virtual object (e.g., that has one or more visual characteristic of the virtual object and/or an appearance that looks like the first virtual object) that is displayed on the external device. Selecting the first virtual object in accordance with a determination that the input at the external device includes a selection input enables the computer system to select the first virtual object without displaying additional controls.

In some embodiments, performing the operation associated with the first virtual object based on the input at the external device includes: in accordance with a determination that the input at the external device includes a movement input (e.g., a dragging, a rotational input, and/or a sliding input from one location to another location of the external device (e.g., the surface of the external device and/or one or more hardware components/buttons (e.g., a rotational input mechanism) of the external device) (and in accordance with a determination that attention of the user is directed to the first virtual object (e.g., in response to receiving the information indicative of the input at the external device)), adjusting a setting associated with the first virtual object (e.g., as described above in relation to FIG. 27B) (e.g., increasing/decreasing a volume level (e.g., that is associated with the first virtual object (e.g., volume level of a music application)) of external device, and/or adjusting the position at which the first virtual object is displayed). Adjusting a setting associated with the first virtual object in accordance with a determination that the input at the external device includes a movement input enables the computer system to adjust a setting associated with the first virtual object without displaying additional controls.

In some embodiments, performing an operation associated with the first virtual object (e.g., 2710a-2710i) based on the input at the external device (e.g., 900) includes: in accordance with a determination that the input at the external device was directed to a first location of the external device (e.g., a first location on a surface of the external device (e.g., a touch-sensitive display)), performing a first operation associated with the first virtual object (e.g., as described above in relation to FIG. 27B); and in accordance with a determination that the input at the external device was directed to a second location of the external device (e.g., a second location on a surface of the external device), performing a second operation associated with the first virtual object (e.g., as described above in relation to FIG. 27B), wherein the first operation associated with the first virtual object is different from the second operation associated with the first virtual object. In some embodiments, in accordance with a determination that the first virtual object is a first type of virtual object (e.g., a virtual object that is associated with multiple operations), the computer system performs different operations, where the operation performed is based on a particular location to which the input at the external device was directed. In some embodiments, in accordance with a determination that the first virtual object is not the first type of virtual object (and/or a virtual object that is associated with a single operation), the computer system performs the same operation, where the operation is performed irrespective of the particular location to which the input at the external device was directed. Performing a different operation based on the location at which the input was detected at the external device enables the computer system to perform different operations without displaying additional controls.

In some embodiments, in response to detecting that the attention of the user is directed to the external device, the computer system displays, via the display generation component, a fourth virtual object (e.g., 2710a-2710i) that is different from the first virtual object and that is displayed concurrently with the first virtual object.

In some embodiments, in accordance with a determination that the first virtual object (e.g., 2710a-2710i) is a virtual object (e.g., 2710a-2710i) that corresponds to (e.g., represents and/or visually indicates) a first operation, the operation associated with the first virtual object that is performed based on the input at the external device includes the first operation (e.g., and does not include the second operation) (e.g., as described above in relation to FIGS. 27B-27D). In some embodiments, in accordance with a determination that the first virtual object (e.g., 2710a-2710i) is a virtual object (e.g., 2710a-2710i) that corresponds to (e.g., represents and/or visually indicates) a second operation that is different from the first operation, the operation associated with the first virtual object that is performed based on the input at the external device includes the second operation (e.g., and does not include the first operation) (e.g., as described above in relation to FIGS. 27B-27D). Performing different operations based on the object at which attention of the user is directed enables the computer system to perform different operations without displaying additional controls.

In some embodiments, in accordance with a determination that attention of the user is directed to the first virtual object, the computer system causes the external device to display a respective user interface (e.g., as described above in relation to FIGS. 27B-27D). In some embodiments, while the external device is displaying the respective user interface and in accordance with a determination that attention of the user is directed to a virtual object (e.g., 2710a-2710i) that is different from the first virtual object (e.g., a virtual object that is displayed outside of a representation of the external device), the computer system causes the external device (e.g., 900) to update one or more visual characteristics (e.g., color, size, patterns, and/or highlighting (e.g., that is shown in a particular section and/or portion of the user interface)) of the respective user interface (e.g., as described above in relation to FIGS. 27B-27D) (e.g., updating the respective user interface includes displaying the respective user interface with a visual appearance that is different from the visual appearance that the respective user interface had before information indicative of the second input was received). In some embodiments, in response to receiving information indicative of a second input at the external device (e.g., that is different from the input at the external device) and in accordance with a determination that attention of the user is directed to the first virtual object (e.g., a virtual object that is displayed outside of a representation of the external device), the computer system continues to cause the external device to display the respective user interface (e.g., without a change in one or more visual characteristics to the respective user interface) and/or the external device continues to display the respective user interface (e.g., without a change in one or more visual characteristics to the respective user interface). Causing the external device to update one or more visual characteristics of the respective user interface in accordance with a determination that attention of the user is directed to a virtual object that is different from the first virtual object provides feedback about a state of the computer system (e.g., that the computer system is configured to perform a different operation).

In some embodiments, in response to receiving the information indicative of the input at the external device and in accordance with a determination that attention of the user is directed to the external device (e.g., 900) (and not directed to a virtual object (e.g., a virtual object displayed by the computer system)), the computer system forgoes performing the operation associated with the first virtual object (e.g., 2710a-2710i) based on the input at the external device, wherein a respective operation is performed at the external device based on the input at the external device (e.g., as described above in relation to FIGS. 27B-27D) (e.g., in accordance with a determination that attention of the user is directed to the external device and in response to receiving the information indicative of the input at the external device) (e.g., and the computer system does not perform the operation associated with the first virtual object based on the input at the external device). In some embodiments, the respective operation is not an operation that corresponds to the first virtual object (e.g., an operation that corresponds to a tap on a user interface object that the external device is displayed (e.g., where the user interface object does not correspond to the first virtual object).

In some embodiments, in response to receiving the information indicative of the input at the external device and in accordance with a determination that attention of the user is directed to a fifth virtual object (e.g., as described above in relation to FIGS. 27B-27D), the computer system: in accordance with a determination that the fifth virtual object is a first type of virtual object (e.g., a virtual object that can be controlled and/or cause one or more operations to be performed (e.g., by the computer system and/or the external device) in response to detection of an input at the external device, a virtual object that is not displayed before the attention of a user is directed to the external device and/or before the first virtual object is displayed, a virtual object that is displayed in response to detecting that the attention of the user is directed to the external device, a virtual object corresponds to an operation that can be performed at the external device (e.g., while the current user interface of the external device is displayed) and/or an operation that is associated with a user interface and/or a user interface object that is displayed (e.g., is currently being displayed) via the external device, and/or a virtual object that is displayed outside of the display, surface, and/or one or more hardware components (e.g., rotational input mechanism) of the external device) (e.g., as described above in relation to FIGS. 27B-27D), performs an operation associated with the fifth virtual object based on the input at the external device (e.g., as described above in relation to FIGS. 27B-27D); and in accordance with a determination that the fifth virtual object is a second type of virtual object that is different from the first type of virtual object (e.g., as described above in relation to FIGS. 27B-27D) (e.g., a virtual object that cannot be controlled and/or cannot cause one or more operations to be performed (e.g., by the computer system and/or the external device) in response to detection of an input at the external device), a virtual object that is displayed before the attention of a user is directed to the external device and/or before the first virtual object is displayed, a virtual object that is not displayed in response to detecting that the attention of the user is directed to the external device, a virtual object that does not correspond to an operation that can be performed at the external device (e.g., while the current user interface of the external device is displayed) and/or an operation that is associated with a user interface and/or a user interface object that is displayed (e.g., is currently being displayed) via the external device, and/or a virtual object that is not displayed outside of the display, surface, and/or one or more hardware components (e.g., rotational input mechanism) of the external device)), forgoes performing an operation associated with the fifth virtual object based on the input at the external device (e.g., as described above in relation to FIGS. 27B-27D). In some embodiments, the fifth virtual object and the first virtual object are both the first type of virtual object. Choosing whether or not to perform an operation associated with the fifth virtual object based on the input at the external device causes the computer system to automatically perform the operation associated with the fifth virtual object in situations where the virtual object is of a certain type.

In some embodiments, performing the operation associated with the first virtual object based on the input at the external device includes causing the external device (e.g., 900) to perform an operation (e.g., as described above in relation to FIGS. 27B-27D) (e.g., at the external device and/or of the external device). In some embodiments, the first virtual object corresponds to an operation that is performed by and/or at the external device.

In some embodiments, in response to receiving the information indicative of the input at the external device and in accordance with a determination that attention of the user is directed to the first virtual object (e.g., and after performing the operation associated with the first virtual object), the computer system displays, via the display generation component, one or more virtual objects (e.g., 2780a-2780i and/or (e.g., as described above in relation to FIGS. 27B-27D) that are associated with (e.g., caused to be displayed because of and/or by) the operation associated with the first virtual object (e.g., as described above in relation to FIGS. 27B-27D) (e.g., one or more virtual objects that correspond to one or more operations and/or user interface objects for navigating a user interface of the external device (e.g., a user interface that is caused to be displayed in response to the first virtual object being selected)). In some embodiments, the operation performed by the first virtual object is an operation that causes the external device to display a user interface and/or launch an application that corresponds and/or is associated with the first virtual object. In some embodiments, in response to selection of the first virtual object, the computer system causes the external device to update the display of a virtual object (e.g., that corresponds to the first virtual object) that is displayed on the external device (e.g., updating a pause button to a play button) (e.g., while the external device continues to display the user interface that was displayed before the first virtual object is selected). In some embodiments, as a part of performing the operation associated with the first virtual object based on the input at the external device, the computer system selects the first virtual object. Displaying one or more virtual objects that are associated with the operation associated with the first virtual object in response to receiving the information indicative of the input at the external device and in accordance with a determination that attention of the user is directed to the first virtual object enables the computer system to display one or more virtual objects that are associated with the operation associated with the first virtual object without displaying additional controls.

In some embodiments, while displaying the one or more virtual objects (e.g., 2710a-2710i) that are associated with the operation associated with the first virtual object, the computer system receives information indicative of a third input at the external device (e.g., as described above in relation to FIG. 27B). In some embodiments, in response to receiving information indicative of the third input at the external device and in accordance with a determination that attention of the user is directed to a first respective virtual object of the one or more virtual objects that are associated with the operation associated with the first virtual object, the computer system causes an appearance of a user interface of the external device to be updated (e.g., as described above in relation to FIG. 27B) (e.g., cease to be displayed and/or updated (e.g., update display of user interface) to have with one or more visual characteristics (e.g., changing the color, size, highlighting, and/or pattern of one or more user interface objects and/or one or more portions of the user interface to change (e.g., change to have a visual characteristic that the respective virtual object has)). In some embodiments, in response to receiving information indicative of the third input at the external device and in accordance with a determination that attention of the user is not directed to a first respective virtual object of the one or more virtual objects that are associated with the operation associated with the first virtual object (and/or any virtual objects that the computer system is displaying), forgoing causing an appearance of a user interface of the external device to be updated. In some embodiments, in response to receiving information indicative of the third input at the external device and in accordance with a determination that attention of the user is directed to a first respective virtual object of the one or more virtual objects that are associated with the operation associated with the first virtual object, the computer system causes the appearance of the user interface of the external device to be updated differently than the user interface is updated in response to receiving information indicative of the third input at the external device and in accordance with a determination that attention of the user is directed to a first respective virtual object of the one or more virtual objects that are associated with the associated with the first virtual object. In some embodiments, the computer system causes an appearance of a user interface of the external device to be updated by sending one or more instructions that causes the external device to update the appearance of the user interface. Causing an appearance of a user interface of the external device to be updated in response to receiving information indicative of the third input at the external device and in accordance with a determination that attention of the user is directed to a first respective virtual object of the one or more virtual objects that are associated with the operation associated with the first virtual object provides feedback about the state of the computer system (e.g., that the computer system is configured to perform one or more different operations) and/or the external device (e.g., that the currently displayed virtual objects correspond to the updated display by the external device).

In some embodiments, while displaying the one or more virtual objects that are associated with the operation associated with the first virtual object, the computer system receives information indicative of a fourth input at the external device (e.g., as described above in relation to FIGS. 27B-27D). In some embodiments, in response to receiving information indicative of the fourth input at the external device and in accordance with a determination that attention of the user is directed to a second respective virtual object of the one or more virtual objects that are associated with the operation associated with the first virtual object, the computer system performs an operation associated with the second respective virtual object based on the fourth input at the external device (e.g., without performing the operation associated with the first virtual object based on the input at the external device). In some embodiments, the operation associated with the second respective virtual object is different from the operation associated with the first virtual object based on the input at the external device (e.g., as described above in relation to FIGS. 27B-27D). Performing an operation associated with the second respective virtual object based on the fourth input at the external device in response to receiving information indicative of the fourth input at the external device and in accordance with a determination that attention of the user is directed to a second respective virtual object of the one or more virtual objects that are associated with the operation associated with the first virtual object enables the computer system to perform an operation associated with the second respective virtual object based on the fourth input at the external device without displaying additional controls.

In some embodiments, in response to receiving the information indicative of the input at the external device and in accordance with a determination that attention of the user is directed to the first virtual object (e.g., 2710a-2710i), the computer system ceases to display the first virtual object (e.g., as described above in relation to FIGS. 27B-27D). In some embodiments, in response to receiving the information indicative of the input at the external device and in accordance with a determination that attention of the user is directed to the first virtual object, the computer system causes the external device to display a user interface that includes one or more user interface objects that were not previously displayed (e.g., before receiving the information indicative of the input at the external device), and/or the computer system displays one or more virtual objects that correspond to the one or more other user interface objects that were not previously displayed. Ceasing to display the first virtual object response to receiving the information indicative of the input at the external device and in accordance with a determination that attention of the user is directed to the first virtual object provides feedback about the state of the computer system (e.g., that the computer system is not currently configured to perform the operations associated with the first virtual object in response to detecting an input at the external device).

In some embodiments, in response to detecting that the attention of the user is directed to the external device: in accordance with a determination that the external device is displaying a first user interface while the attention of the user is directed to the external device, the first user interface object is a first respective user interface object (and a user interface object that corresponds to the second respective user interface object is not displayed) (e.g., as described above in relation to FIGS. 27B-27D); and in accordance with a determination that the external device is displaying a second user interface while the attention of the user is directed to the external device, the first user interface object is a second respective user interface object that is different from the first respective user interface object (e.g., as described above in relation to FIGS. 27B-27D) (and a user interface object that corresponds to the first respective user interface object is not displayed). In some embodiments, in accordance with a determination that the external device is displaying a first user interface while the attention of the user is directed to the external device, a first number of user interface objects is displayed. In some embodiments, in accordance with a determination that the external device is displaying a second user interface while the attention of the user is directed to the external device, a second number of user interface objects are displayed, where the second number of user interface objects is different from the first number of user interface objects.

In some embodiments, aspects/operations of methods 800, 1000, 1200, 1400, 1600, 1800, 2000, 2200, 2400, 2600, 3000, and 3200 may be interchanged, substituted, and/or added with the steps of method 2800. For example, method 2800 can be used to display a virtual object associated with an external device while the computer system is providing navigation guidance using method 1600. For brevity, these details are not repeated here.

FIGS. 29A-29B illustrate example techniques for displaying controlling the orientation of virtual objects, in accordance with some embodiments. FIG. 30 is a flow diagram of methods for displaying controlling the orientation of virtual objects, in accordance with some embodiments. The user interfaces in FIGS. 29A-29B are used to illustrate the process in FIG. 30.

FIG. 29A illustrates user 720 holding computer system 700. Computer system 700 is positioned in a physical environment (e.g., as described above in relation to FIG. 19A). At FIG. 29A, a representation of the physical environment is visible on display 704. While computer system 700 is a phone in FIG. 29A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 29A) (e.g., without using pass-through video). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For ease of discussion, the following description below will describe the computer system of FIGS. 29A-29B displaying an AR user interface, where one or more virtual objects are overlaid on the representation of the physical environment that "passes through" the transparent display of computer system 700. In some embodiments, computer system 700 includes one or more features as described above in relation to FIGS. 9A-9G (e.g., including how computer system 700 can present an augmented reality environment via display 704 using one or more different techniques).

As illustrated in FIG. 29A, the augmented user interface includes virtual objects 2902a-2902f along with preview virtual object 2920b and launch virtual object 2910. It should be understood that virtual objects 2902a-2902f, preview virtual object 2920b, and launch virtual object 2910 can be interacted with (e.g., via the gaze of user 720) and computer system 700 can be caused to perform one or more operations associated with virtual objects 2902a-2902f, preview virtual object 2920b, and launch virtual object 2910, using one or more techniques discussed above in relation to FIGS. 19A-19E. In some embodiments, a user can interact with one or more of these virtual objects to cause computer system 700 to perform one or more operations using gaze and/or gaze and air gestures as described above in relation to FIGS. 11A1-11E3. At FIG. 29A, user 720 begins to rotate computer system 700 in a counterclockwise direction while also shifting computer system 700 to the user's right.

As illustrated in FIG. 29B, in response to being rotated in the counterclockwise direction and being shifted to the user's right, computer system 700 displays virtual objects 2902a-2902f, preview virtual object 2920b, and launch virtual object 2910, such that the orientation of these virtual objects is maintained (e.g., in FIGS. 29A-29B) relative to gravity. That is, virtual objects 2902a-2902f, preview virtual object 2920b, and launch virtual object 2910 of FIGS. 29A-29B are positioned in the same orientation, relative to the direction of gravity, although computer system 700 has been rotated. To provided further explanation, preview virtual object 2920b can be used as an example. Looking back at FIG. 29A, top-border portion 2920b1 and bottom-border portion 2920b2 of preview virtual object 2920b are parallel to the ground (e.g., road) in the physical environment that is visible through display 704. At FIG. 29A, top-border portion 2920b1 and bottom-boarder portion 2920b2 of preview virtual object 2920b are also parallel to top side 2900a and bottom side 2900b of computer system 700, and right-boarder portion 2920b3 and left-border portion 2920b4 are also parallel to left side 2900c and right side 2900d of computer system 700. Turning back to FIG. 29B, after computer system 700 is rotated in the counterclockwise direction, computer system 700 displays preview virtual object 2920b, such that top-border portion 2920b1 and bottom-border portion 2920b2 of preview virtual object 2920b continue to be parallel to the ground (e.g., road) in the physical environment. However, at FIG. 29B, that top-border portion 2920b1 and bottom-border portion 2920b2 of preview virtual object 2920b are no longer parallel to top side 2900a and bottom side 2900b of computer system 700 (e.g., because top side 2900a and bottom side 2900b of computer system 700 are no longer perpendicular to gravity in FIG. 29B). Moreover, at FIG. 29B, right-border portion 2920b3 and left-border portion 2920b4 are no longer parallel to left side 2900c and right side 2900d of computer system 700, and computer system 700 continues to display right-border portion 2920*b*3 and left-border portion 2920*b*4 as being oriented perpendicular to gravity in the physical environment (e.g., although left side 2900*c* and right side 2900*d* are no longer parallel to gravity at FIG. 29B). In embodiments where computer system 700 is displaying one or more environment-locked virtual objects (and/or non-viewpoint-locked virtual objects) before computer system 700 has been rotated, computer system 700 does not change the orientation of the environment-locked virtual objects relative to gravity in the physical environment after computer system 700 has been rotated; in some embodiments, computer system 700 does. In some embodiments, in response to being rotated in the counterclockwise direction (or clockwise direction), computer system 700 displays a respective virtual object that is not oriented relative to gravity after computer system 700 has been rotated, although the respective virtual object was oriented relative to gravity before computer system 700 was rotated.

As illustrated in FIGS. 29A-29B, while computer system 700 maintains the orientation of these virtual objects (e.g., virtual objects 2902*a*-2902*f*, preview virtual object 2920*b*, and launch virtual object 2910) relative to gravity, these virtual objects are also moved horizontally and vertically based on the movement of computer system 700. At FIG. 29B, computer system 700 moves these virtual objects to the left, relative to display 704, because user 720 moved computer system 700 to the right while rotating computer system 700 in the counterclockwise direction (e.g., as illustrated in FIGS. 29A-29B). In some embodiments, computer system 700 moves the virtual objects horizontally based on the amount of horizontal movement of computer system 700. In some embodiments, computer system 700 moves the virtual objects vertically based on the amount of vertical movement of computer system 700. In some embodiments, when computer system 700 is moved in the z-direction (forward and/or backward relative to the user and/or in/out of display 704), computer system 700 continues to display these virtual objects at a fixed distance relative to the user and/or the background of the physical environment. In some embodiments, maintaining the virtual objects at the fixed distance includes maintaining the size of these virtual objects. In some embodiments where computer system 700 is rotated further in the counterclockwise direction, computer system 700 continues to maintain the orientation of virtual objects 2902*a*-2902*f*, preview virtual object 2920*b*, and launch virtual object 2910 relative to gravity. In some embodiments, in response to being rotated in the clockwise direction, computer system 700 displays virtual objects 2902*a*-2902*f*, preview virtual object 2920*b*, and launch virtual object 2910, such that the orientation of the one or more virtual objects are maintained. In some embodiments, computer system 700 delays the movement of virtual objects 2902*a*-2902*f*, preview virtual object 2920*b*, and launch virtual object 2910 relative to the movement of computer system 700, using one or more techniques described above in relation to "lazy follow" and/or "lazy follow" behavior. Thus, in some embodiments, the movement of one or more of virtual objects 2902*a*-2902*f*, preview virtual object 2920*b*, and launch virtual object 2910 occurs at a slower speed (and/or with a delay) than the speed of the movement of computer system 700. In some embodiments, the movement of virtual objects 2902*a*-2902*f*, preview virtual object 2920*b*, and launch virtual object 2910 occurs at a slower speed than the speed of the movement of computer system 700 during an initial time while the computer system 700 is moving, and the movement of these virtual objects increases to a faster speed during at a later time while computer system 700 is moving (and/or has stopped moving). In some embodiments, these virtual objects appear to catch up with the movement of computer system 700 (e.g., with simulated force) at some point while computer system 700 and/or these virtual objects are moving.

As illustrated in FIG. 29B, in response to being rotated in the counterclockwise direction, computer system 700 reduces the size of virtual object 2902*a* and virtual object 2902*f* and maintains the size of virtual objects 2902*b*-2902*c*. At FIG. 29B, computer system 700 reduces the size of virtual object 2902*a* because virtual object 2902*a* and/or the centroid of virtual object 2902*a* is within a predetermined distance (e.g., 1-100 cm) from the right edge of display 704 (and/or from the edge of the augmented user interface). Moreover, if the size of virtual object 2902*a* was not reduced at FIG. 29B, computer system 700 would not display one or more portions of virtual object 2902*a* (and/or would obstruct the display of the adjacent virtual object (e.g., virtual object 2902*b*). Thus, instead of not displaying a portion of virtual object 2902*a* at FIG. 29B, computer system 700 reduces the size of virtual object 2902*a*, such that the entirety of virtual object 2902*a* can be displayed at the position of virtual object 2902*a* in FIG. 29B. Computer system reduces the size of virtual object 2902*f* for similar reasons because it is within a predetermined distance from the bottom edge of display 704. Thus, computer system 700 can change the size and/or distort multiple virtual objects that are near an edge or different edges of the display, such that the one or more virtual objects continue to be displayed in their entirety on display 704. In some embodiments, the size of virtual objects 2902*b*-2902*e* are maintained because these virtual objects are not within the predetermined distance from the edge of display 704. In some embodiments, computer system 700 changes the position of one or more of the virtual objects that are closer to an edge of the display. For example, in some embodiments, computer system 700 moves virtual object 2902*f* at FIG. 29B upward so that computer system 700 can display virtual object 2902*f* further from the bottom edge of display 704 in FIG. 29B. In some embodiments, when computer system 700 moves virtual object 2902*f* upward, the centroid of virtual object 2902*f* is no longer aligned with the centroids of virtual objects 2902*a*-2902*e*. In some embodiments, where virtual object 2902*a* is moved upward, computer system 700 displays virtual object 2902*f* at the size at which virtual object 2902*f* was displayed in FIG. 29A. In some embodiments, because virtual object 2902*f* has been moved further away from the bottom edge of display 704, the entirety of virtual object 2902*f* is visible on display 704 while virtual object 2902*f* is displayed at the size at which virtual object 2902*f* was displayed in FIG. 29A.

Additional descriptions regarding FIGS. 29A-29B are provided below in reference to method 3000 described with respect to FIGS. 29A-29B.

FIG. 30 is a flow diagram of an exemplary method 3000 for controlling the orientation of virtual objects, in accordance with some embodiments. In some embodiments, method 3000 is performed at a computer system (e.g., 700) that is in communication with a display generation component (e.g., 704) (e.g., a display controller: a touch-sensitive display system; a display (e.g., integrated and/or connected), a 3D display, a transparent display, a projector, a heads-up display, and/or a head-mounted display) (e.g., that is configured to display visual content over a display area (e.g., area of display screen and/or lens). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, the computer system includes one or more gaze-tracking sensors (e.g., an optical and/or IR camera configured to track a direction of attention of a user of the computer system). In some embodiments, the computer system is in communication with and/or includes one or more sensors (e.g., a gyroscope and/or accelerometer) for detecting gravity and/or the direction of gravity. In some embodiments, method 3000 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 3000 are, optionally, combined and/or the order of some operations is, optionally, changed.

While a viewpoint (e.g., as indicated by 704) of a user (e.g., 720) (e.g., and/or the computer system) is in (e.g., positioned in) a first orientation (e.g., an orientation where the viewpoint of the user is positioned at a first angle relative to a plane (e.g., the ground and/or the center of earth) (e.g., a plane in a physical environment and/or a three-dimensional environment)) relative to gravity (e.g., as described above in relation to FIG. 29A), the computer system displays (3002), via the display generation component, virtual content (e.g., 2902a-2902f, 2910, and/or 2920b) (e.g., one or more virtual objects) in a three-dimensional environmental, wherein the virtual content (e.g., 2902a-2902f, 2910, and/or 2920b) is viewpoint-locked to a respective location relative to the viewpoint of the user and the virtual content is oriented relative to gravity (e.g., gravity in a physical environment) (e.g., vertically orientation (e.g., parallel to gravity) and/or horizontally oriented (e.g., perpendicular to gravity)) (e.g., orientated at an angle relative to gravity). In some embodiments, the virtual content is selectable and/or includes one or more selectable virtual objects, where selection of the virtual object causes the computer system to perform an operation (e.g., launch an application, cease to display content, and/or display content that was not previously displayed before the virtual object was selected), In some embodiments, the virtual content is not a part of the background of the three-dimensional content.

While displaying the virtual content that is viewpoint-locked and oriented relative to gravity (e.g., relative to a gravitational pull of the earth), the computer system detects (3004) a change in the viewpoint of the user (e.g., a change in the orientation and/or positioning of the viewpoint of the user).

In response to (3006) detecting the change in the viewpoint (e.g., as indicated by 704) of the user, the computer system maintains display of the virtual content in the three-dimensional environment at the respective location relative to the viewpoint of the user and adjusting an orientation of the virtual content relative to the viewpoint of the user, including: in accordance with a determination that the viewpoint (e.g., as indicated by 704) of the user has changed from being in the first orientation relative to gravity to being in a second orientation relative to gravity (e.g., an orientation where the viewpoint of the user and/or computer system is positioned at a second angle (e.g., that is different from the first angle) relative to the plane (e.g., the ground and/or the center of earth) (e.g., a plane in a physical environment and/or a three-dimensional environment)) that is different from the first orientation, modifying (3008), via the display generation component, display of the virtual content (e.g., 2902a-2902f, 2910, and/or 2920b) in the three-dimensional environment in a first manner (e.g., moving the virtual content laterally and/or vertically and/or rotating the virtual content) such that the virtual content continues to be oriented relative to gravity while the viewpoint of the user is in the second orientation (e.g., without a portion of the virtual content ceasing to be displayed) (e.g., as described above in relation to FIG. 29B); and in accordance with a determination that the viewpoint of the user has changed from being in the first orientation relative to gravity to being in a third orientation relative to gravity (e.g., an orientation where the viewpoint of the user and/or computer system is positioned at a second angle (e.g., that is different from the first angle) relative to the plane (e.g., the ground and/or the center of earth) (e.g., a plane in a physical environment and/or a three-dimensional environment)) that is different from the first orientation and the second orientation, modifying (3010), via the display generation component, display of the virtual content (e.g., 2902a-2902f, 2910, and/or 2920b) in the three-dimensional environment in a second manner (e.g., moving the virtual content laterally and/or vertically and/or rotating the virtual content) such that the virtual content continues to be oriented relative to gravity while the viewpoint of the user is in the third orientation (e.g., without a portion of the virtual content ceasing to be displayed) (e.g., as described above in relation to FIG. 29B), wherein the second manner is different from the first manner (e.g., as described above in relation to FIG. 29B). In some embodiments, the respective location is a distance away from the viewpoint of the user. In some embodiments, the respective location is at an angle of tilt relative to a plane that is parallel to the face of the user and/or the viewpoint of the user. Modifying, via the display generation component, display of the virtual content in the three-dimensional environment such that the virtual content continues to be oriented relative to gravity in response to detecting the change in the viewpoint of the user enables the computer system to continue to display the virtual content such that the virtual content continues to be oriented relative to gravity without displaying additional controls and/or without providing an additional number of inputs to display the content differently.

In some embodiments, before detecting the change in the viewpoint (e.g., as indicated by 704) of the user (e.g., 720), the computer system displays, via the display generation component, second virtual content (e.g., as described above in relation to FIGS. 29A-29B) concurrently with the virtual content (e.g., 2902a-2902f, 2910, and/or 2920b) that is viewpoint-locked and oriented relative to gravity, wherein the second virtual content is not viewpoint-locked (e.g., at a second respective location relative to the viewpoint of the user). In some embodiments, the second respective location is different from the respective location. In some embodiments, the second virtual content is not oriented relative to gravity. In some embodiments, the second virtual content is different from the virtual content that is viewpoint-locked and oriented relative to gravity. In some embodiments, in response to detecting the change in the viewpoint of the user, ceasing to display the second virtual content. In some embodiments, in response to detecting the change in the viewpoint of the user, modifying, via the display generation component, display of the second virtual content in the three-dimensional environment, such that the virtual content is displayed at a different location (e.g., at a location that is different from the second respective location relative to the viewpoint of the user) relative to the viewpoint of the user than a location (e.g., at a second respective location relative to the viewpoint of the user) at which the second virtual content was displayed before the change in the viewpoint of the user was detected. Displaying second virtual content that is not viewpoint-locked concurrently with the virtual content that is viewpoint-locked and oriented relative to gravity enables the computer system to display and modify content differently without display additional controls and/or without providing an additional number of inputs to display the content differently.

In some embodiments, before detecting the change in the viewpoint (e.g., as indicated by 704) of the user and while the viewpoint of the user is in the first orientation relative to gravity, displaying, via the display generation component, third virtual content (e.g., as described above in relation to FIGS. 29A-29B) concurrently with the virtual content (e.g., 2902a-2902f, 2910, and/or 2920b) that is viewpoint-locked and oriented relative to orientation of the viewpoint of the user.

In some embodiments, in response to detecting the change in the viewpoint of the user, the computer system maintains display of the third virtual content in the three-dimensional environment at the third respective location relative to the viewpoint of the user and maintaining the orientation of the virtual content such that the orientation of the virtual content remains oriented relative to the orientation of the viewpoint of the user (e.g., as described above in relation to FIG. 29B). In some embodiments, in accordance with a determination that the viewpoint of the user has changed from being in the first orientation relative to gravity to being in the second orientation relative to gravity, the computer system modifies, via the display generation component, display of the virtual content in the three-dimensional environment in a third manner (e.g., moving the virtual content laterally and/or vertically and/or rotating the virtual content) such that the virtual content is oriented in the second orientation while the viewpoint of the user is in the second orientation. In some embodiments, in accordance with a determination that the viewpoint of the user has changed from being in the first orientation relative to gravity to being in the third orientation relative to gravity, the computer system modifies, via the display generation component, display of the third virtual content in the three-dimensional environment in a fourth manner (e.g., moving the virtual content laterally and/or vertically and/or rotating the virtual content) such that the virtual content is oriented in the third orientation while the viewpoint of the user is in the third orientation, wherein the fourth manner is different from the third manner. Modifying, via the display generation component, display of the virtual content in the three-dimensional environment in a third manner such that the virtual content is oriented in an orientation of the viewpoint along with modifying, via the display generation component, display of the virtual content in the three-dimensional environment such that the virtual content continues to be oriented relative to gravity in response to detecting the change in the viewpoint of the user enables the computer system to display and modify content differently without display additional controls and/or without providing an additional number of inputs to display the content differently.

In some embodiments, the viewpoint (e.g., as indicated by 704) of the user changing from being in the first orientation relative to gravity to being in the second orientation relative to gravity includes the viewpoint of the user rotating (e.g., clockwise and/or counterclockwise) by a first amount relative to gravity (e.g., as described above in relation to FIGS.

29A-29B). In some embodiments, modifying display of the virtual content (e.g., 2902a-2902f, 2910, and/or 2920b) in the three-dimensional environment in the first manner such that the virtual content continues to be oriented relative to gravity while the viewpoint of the user is in the second orientation includes rotating display of the virtual content by the first amount relative to the three-dimensional environment while display of the virtual content (e.g., a portion (e.g., a centroid) of the virtual content) in the three-dimensional environment continues to be viewpoint-locked at the respective location relative to the viewpoint of the user (e.g., as described above in relation to FIG. 29B). In some embodiments, as a part of rotating display of the virtual content by the first amount relative to the three-dimensional environment while display of the virtual content in the three-dimensional environment, the computer system rotates display of the virtual content in a direction that is the same and/or different (e.g., the opposite of) the way in which the viewpoint of the user was rotated. In some embodiments, as a part of modifying display of the virtual content in the three-dimensional environment in the first manner such that the virtual content continues to be oriented relative to gravity while the viewpoint of the user is in the second orientation, the computer system rotates display of the virtual content by a first amount and/or in a first direction relative to the three-dimensional environment while display of the virtual content in the three-dimensional environment continues to be viewpoint-locked at the respective location relative to the viewpoint of the user. In some embodiments, as a part of modifying display of the virtual content in the three-dimensional environment in the second manner such that the virtual content continues to be oriented relative to gravity while the viewpoint of the user is in the third orientation, the computer system rotates display of the virtual content vertically in a second relative to the three-dimensional environment while display of the virtual content in the three-dimensional environment continues to be viewpoint-locked at the respective location relative to the viewpoint of the user. Rotating display of the virtual content by the first amount relative to the three-dimensional environment while display of the virtual content in the three-dimensional environment continues to be viewpoint-locked at the respective location relative to the viewpoint of the user enables the computer system to continue to display the virtual content such that the virtual content continues to be oriented relative to gravity without displaying additional controls and/or without providing an additional number of inputs to display the content differently.

In some embodiments, the viewpoint (e.g., as indicated by 704) of the user changing from being in the first orientation relative to gravity to being in the second orientation relative to gravity includes the viewpoint of the user moving vertically (e.g., shifting up and/or down) relative to gravity (e.g., as described above in relation to FIGS. 29A-29B). In some embodiments, modifying display of the virtual content (e.g., 2902a-2902f, 2910, and/or 2920b) in the three-dimensional environment in the first manner such that the virtual content continues to be oriented relative to gravity while the viewpoint of the user is in the second orientation includes shifting display of at least a first portion of the virtual content vertically (e.g., shifting up and/or down) relative to the three-dimensional environment while display of at least a second portion (e.g., that is different from the first portion of the virtual content) of the virtual content in the three-dimensional environment continues to be viewpoint-locked at the respective location relative to the viewpoint of the user (e.g., as described above in relation to FIG. 29B). In some embodiments, the virtual content continues to be viewpoint-locked at the respective location because a portion (e.g., a centroid) of the virtual content is viewpoint-locked to the respective location. In some embodiments, as a part of modifying display of the virtual content in the three-dimensional environment in the first manner such that the virtual content continues to be oriented relative to gravity while the viewpoint of the user is in the second orientation, the computer system shifts display of the virtual content vertically (e.g., shifting up and/or down) in a first direction relative to the three-dimensional environment while display of the virtual content in the three-dimensional environment continues to be viewpoint-locked at the respective location relative to the viewpoint of the user. In some embodiments, as a part of modifying display of the virtual content in the three-dimensional environment in the second manner such that the virtual content continues to be oriented relative to gravity while the viewpoint of the user is in the third orientation, the computer system shifts display of the virtual content vertically (e.g., shifting up and/or down) in a second direction (e.g., a second direction that is different from the first direction) relative to the three-dimensional environment while display of the virtual content in the three-dimensional environment continues to be viewpoint-locked at the respective location relative to the viewpoint of the user. Shifting display of at least a first portion of the virtual content vertically relative to the three-dimensional environment while display of at least a second portion of the virtual content in the three-dimensional environment continues to be viewpoint-locked at the respective location relative to the viewpoint of the user enables the computer system to continue to display the virtual content such that the virtual content continues to be oriented relative to gravity without displaying additional controls and/or without providing an additional number of inputs to display the content differently.

In some embodiments, the viewpoint (e.g., as indicated by 704) of the user changing from being in the first orientation relative to gravity to being in the second orientation relative to gravity includes the viewpoint of the user moving laterally (e.g., shifting right and/or left) relative to gravity (e.g., as described above in relation to FIGS. 29A-29B). In some embodiments, modifying display of the virtual content (e.g., 2902a-2902f, 2910, and/or 2920b) in the three-dimensional environment in the first manner such that the virtual content continues to be oriented relative to gravity while the viewpoint of the user is in the second orientation includes shifting (e.g., shifting right and/or left) display of at least a third portion of the virtual content laterally relative to the three-dimensional environment while display of at least a fourth portion (e.g., that is different from the third portion) of the virtual content in the three-dimensional environment continues to be viewpoint-locked at the respective location relative to the viewpoint of the user (e.g., as described above in relation to FIG. 29B). In some embodiments, as a part of modifying display of the virtual content in the three-dimensional environment in the first manner such that the virtual content continues to be oriented relative to gravity while the viewpoint of the user is in the second orientation, the computer system shifts display of the virtual content laterally (e.g., shifting right and/or left) in a first direction relative to the three-dimensional environment while display of the virtual content in the three-dimensional environment continues to be viewpoint-locked at the respective location relative to the viewpoint of the user. In some embodiments, as a part of modifying display of the virtual content in the three-dimensional environment in the second manner such that the virtual content continues to be oriented relative to gravity while the viewpoint of the user is in the third orientation, the computer system shifts display of the virtual content vertically (e.g., shifting right and/or left) in a second direction (e.g., a second direction that is different from the first direction) relative to the three-dimensional environment while display of the virtual content in the three-dimensional environment continues to be viewpoint-locked at the respective location relative to the viewpoint of the user. Shifting display of at least a third portion of the virtual content laterally relative to the three-dimensional environment while display of at least a fourth portion of the virtual content in the three-dimensional environment continues to be viewpoint-locked at the respective location relative to the viewpoint of the user enables the computer system to continue to display the virtual content such that the virtual content continues to be oriented relative to gravity without displaying additional controls and/or without providing an additional number of inputs to display the content differently.

In some embodiments, while the viewpoint (e.g., as indicated by 704) of the user is in the first orientation, the virtual content (e.g., that is viewpoint-locked and oriented relative to gravity) is displayed at a fixed distance from the viewpoint (e.g., as indicated by 704) of the user (and/or the virtual content is displayed between a set of fixed distances and/or depths relative to the viewpoint of the user) in the three-dimensional environment (e.g., as described above in relation to FIGS. 29A-29B). In some embodiments, the viewpoint of the user changing from being in the first orientation relative to gravity to being in the second orientation relative to gravity includes the viewpoint of the user moving forward or moving backward (e.g., shifting forward and/or backward) (e.g., relative to gravity) (e.g., and/or relative to the three-dimensional environment) (e.g., as described above in relation to FIGS. 29A-29B). In some embodiments, modifying display of the virtual content (e.g., 2902a-2902f, 2910, and/or 2920b) in the three-dimensional environment in the first manner such that the virtual content continues to be oriented relative to gravity while the viewpoint of the user is in the second orientation includes maintaining display of the virtual content at the fixed distance (or substantially (e.g., less than 0.01-10 meters away from) at the fixed distance) from the viewpoint of the user (e.g., as described above in relation to FIG. 29B).

In some embodiments, adjusting (e.g., moving and/or updating) the orientation of the virtual content (e.g., 2902a-2902f, 2910, and/or 2920b) relative to the viewpoint (e.g., as indicated by 704) of the user in response to detecting the change in the viewpoint of the user occurs at a first speed (e.g., as described above in relation to FIG. 29B). In some embodiments, while adjusting the orientation of the virtual content relative to the viewpoint of the user occurs at the first speed in response to detecting the change in the viewpoint of the user, a representation of the three-dimensional environment that is in (and that is visible) the viewpoint of the user is adjusted (e.g., moved and/or updated), based on the detected change in the viewpoint of the user, at a second speed (e.g., speed of the movement of the viewpoint of the user and/or speed of the viewpoint of the user changing) that is slower than the first speed (e.g., as described above in relation to FIG. 29B). In some embodiments, movement of the virtual content delayed as compared to movement of the representation of the three-dimensional environment that is visible in the viewpoint of the user. Adjusting the orientation of the virtual content relative to the viewpoint of the user in response to detecting the change in the viewpoint of the user occurs at a different speed than the representation of the three-dimensional environment that is in the viewpoint of the user is adjusted enables the computer system to reduce jitter between the virtual content and the representation of the three-dimensional environment without displaying additional controls.

In some embodiments, while adjusting the orientation of the virtual content (e.g., 2902a-2902f, 2910, and/or 2920b) relative to the viewpoint (e.g., as indicated by 704) of the user at the first speed, the computer system determines whether a set of adjustment criteria has been satisfied (e.g., as described above in relation to FIG. 29B). In some embodiments, the set of adjustment criteria includes a criterion that is satisfied when the orientation of the virtual content has been adjusted at the first speed for a particular period of time, a criterion that is satisfied when a determination is made that the viewpoint of the user has stopped changing and/or moving (e.g., at the second speed), and/or a criterion that is satisfied when a determination is made that movement of viewpoint of the user has been reduced (e.g., the viewpoint of the user has slowed down). In some embodiments, in accordance with a determination that the set of adjustment criteria has been satisfied, the computer system adjusts the orientation of the virtual content relative to the viewpoint of the user at a third speed that is different from the first speed (e.g., as described above in relation to FIG. 29B). In some embodiments, the third speed is greater than the first speed and the second speed. In some embodiments, the third speed is greater than a current speed of movement of the viewpoint of the user. In some embodiments, in accordance with a determination that the set of adjustment criteria has not been met, the computer system continues to adjust the orientation of the virtual content relative to the viewpoint of the user at the first speed. In some embodiments, as a part of adjusting the orientation of the virtual content relative to the viewpoint of the user at a third speed that is different from the first speed in accordance with a determination that the set of adjustment criteria has been satisfied, the computer system displays an animation of the virtual content moving as if the virtual content were on a spring and/or an animation of the virtual content catching up to the representation of the three-dimensional environment in the viewpoint of the user (e.g., with a simulated amount of force (e.g., as if the virtual content were pushed at some point while the virtual content is being moved)).

In some embodiments, adjusting the orientation of the virtual content (e.g., 2902a-2902f, 2910, and/or 2920b) relative to the viewpoint (e.g., as indicated by 704) of the user includes: in accordance with a determination that a first portion (e.g., one or more virtual objects in the virtual content) of the virtual content (e.g., 2902a and/or 2902f) is within a first predetermined distance (e.g., 0.1-100 centimeters) of (e.g., before or after) a first edge (e.g., a boundary, an outside edge, and/or a frame) of the viewpoint of the user, changing a visual appearance of the first portion of the virtual content (and/or distorting the visual appearance of the first portion of the virtual content) such that the first portion of the virtual content remains visible (e.g., as described above in relation to FIG. 29B) (e.g., fully and/or mostly visible) (e.g., without changing a visual appearance of a second portion of the virtual content that is different from the first portion of the virtual content and/or without changing a visual appearance of a first portion of the virtual content that is not within the predetermined distance from the first edge of the viewpoint of the user). Changing a visual appearance of the first portion of the virtual content such that the first portion of the virtual content remains visible when prescribed conditions are met causes the computer system to automatically change the visual appearance of the first portion such that the first portion of the virtual content remains visible.

In some embodiments, changing the visual appearance of the first portion (e.g., one or more virtual objects in the virtual content) of the virtual content (e.g., 2902a-2902f, 2910, and/or 2920b) includes changing a size of the first portion of the virtual content (e.g., 2902a and/or 2902f) (e.g., as described above in relation to FIG. 29B) (e.g., without changing the size of the second portion of the virtual content that is different from the first portion of the virtual content and/or without changing the size of the first portion of the virtual content that is not within the predetermined distance from the first edge of the viewpoint of the user). Changing a size of the first portion of the virtual content when prescribed conditions are met causes the computer system to automatically change the visual appearance of the first portion such that the first portion of the virtual content remains visible.

In some embodiments, the first portion of the virtual content (e.g., 2902a-2902f, 2910, and/or 2920b) includes a first subset e.g., one or more virtual objects in the virtual content) of virtual content and a second subset e.g., one or more virtual objects in the virtual content) of virtual content that is different from (e.g., includes one or more different virtual objects) the first subset of virtual content (e.g., as described above in relation to FIGS. 29A-29B). In some embodiments, the first subset and the second subset are distant, separate, and/or does not encompass each other. In some embodiments, the first subset and the second subset are adjacent to each other. In some embodiments, no other portions of the virtual content are between the first subset and the second subset. In some embodiments, before changing the visual appearance of the first portion of the virtual content, the first subset of virtual content is displayed at a first location relative to a location of the second subset of virtual content (e.g., as described above in relation to FIGS. 29A-29B). In some embodiments, changing the visual appearance of the first portion (e.g., one or more virtual objects in the virtual content) of the virtual content includes displaying the first subset of virtual content at a second location relative to the location of the second subset of virtual content, wherein the first location relative to the location of the second subset of virtual content is different from the second location relative to the location of the second subset of virtual content (e.g., as described above in relation to FIG. 29B) (and/or moving the first subset of virtual content from the first location relative to the location of the second subset of virtual content to the second location relative to the location of the second subset of virtual content). In some embodiments, before changing the visual appearance of the first portion of the virtual content, the first subset of virtual content and the second subset of virtual content is displayed in a first orientation relative to each other and, as a part of changing the visual appearance of the first portion of the virtual content, the first subset of virtual content and the second subset of virtual content is displayed in a second orientation relative to each other, where the second orientation is different from the first orientation. Displaying the first subset of virtual content at a second location relative to the location of the second subset of virtual content when prescribed conditions are met causes the computer system to automatically change the visual appearance of the first portion such that the first portion of the virtual content remains visible.

In some embodiments, adjusting an orientation of the virtual content (e.g., 2902a-2902f, 2910, and/or 2920b)

relative to the viewpoint (e.g., as indicated by 704) of the user includes: in accordance with a determination that a second portion (e.g., one or more virtual objects in the virtual content) of the virtual content (e.g., 2902*a* and/or 2902*f*) is within a second predetermined distance (e.g., 0.1-100 centimeters) of (e.g., before or after) a second edge (e.g., a boundary, an outside edge, and/or a frame) of the viewpoint of the user and in accordance with a determination that a third portion (e.g., one or more virtual objects in the virtual content) of the virtual content is within a third predetermined distance (e.g., 0.1-100 centimeters) of (e.g., before or after) a third edge (e.g., a boundary, an outside edge, and/or a frame) of the viewpoint of the user (e.g., as described above in relation to FIG. 29B): changing a visual appearance of the second portion of the virtual content (e.g., 2902*a* and/or 2902*f*) (and/or distorting the visual appearance of the portion of the virtual content), such that the second portion of the virtual content remains visible (e.g., partially or fully visible) (e.g., without changing a visual appearance of a second portion of the virtual content that is different from the portion of the virtual content and/or without changing a visual appearance of a portion of the virtual content that is not within the predetermined distance from the edge of the viewpoint of the user) (e.g., as described above in relation to FIG. 29B); and changing a visual appearance of the third portion of the virtual content (e.g., 2902*a* and/or 2902*f*) (and/or distorting the visual appearance of the portion of the virtual content), such that the third portion of the virtual content remains visible (e.g., while the visual appearance of the second portion of the virtual content is changed and/or is changing) (and, in some embodiments, the second portion and the third portion are concurrently displayed with their respective changed appearance) (e.g., as described above in relation to FIG. 29B). In some embodiments, the visual appearance of the second portion of the virtual content is changed differently than the visual appearance of the third portion of the virtual content. In some embodiments, in accordance with a determination that the second portion of the virtual content is not within the second predetermined distance of the second edge of the viewpoint of the user and in accordance with a determination that the third portion of the virtual content is within the third predetermined distance of the third edge of the viewpoint of the user, the computer system changes the visual appearance of the third portion without changing the visual appearance of the second portion. In some embodiments, in accordance with a determination that the second portion of the virtual content is within the second predetermined distance of the second edge of the viewpoint of the user and in accordance with a determination that the third portion of the virtual content is not within the third predetermined distance of the third edge of the viewpoint of the user, the computer system changes the visual appearance of the second portion without changing the visual appearance of the third portion. In some embodiments, in accordance with a determination that the second portion of the virtual content is not within the second predetermined distance of the second edge of the viewpoint of the user and in accordance with a determination that the third portion of the virtual content is not within the third predetermined distance of the third edge of the viewpoint of the user, the computer system does not change the visual appearance of the second portion and does not change the visual appearance of the third portion. In some embodiments, while the visual appearance of the second portion of the virtual content is changed (e.g., in accordance a determination that the second portion of the virtual content was (and/or is) within the second predetermined distance of the second edge of the viewpoint of the user) and in accordance with a determination that the second portion of the virtual content is not within the second predetermined distance of the second edge of the viewpoint of the user, the computer system changes the visual appearance of the second portion of the virtual content, such that the second portion of the virtual content has the visual appearance that it had before a change the visual appearance of the second portion occurred and/or before a determination was made that the second portion of the virtual content was within the second predetermined distance of the second edge of the viewpoint of the user. Changing a visual appearance of the second portion of the virtual content and changing visual appearance of the third portion of the virtual content when prescribed conditions are met causes the computer system to automatically change the visual appearance of the multiple portions of the content so that the multiple portions of the content can remain visible.

In some embodiments, the virtual content includes a first set of selectable virtual objects (e.g., 2902*a*-2902*f* and/or 2910). In some embodiments, while displaying the virtual content that includes the first set of virtual objects (e.g., while the viewpoint of the user is in the first orientation, the second orientation, or another orientation) (e.g., as described above in relation to FIGS. 11A1-11E3, FIGS. 19A-19E, and FIGS. 29A-29B), the computer system detects that attention of the user (e.g., as described above in relation to FIGS. 11A1-11E3, FIGS. 19A-19E, and FIGS. 29A-29B) is directed to a first respective virtual object in the first set of virtual objects (e.g., as described above in relation to FIGS. 11A1-11E3, FIGS. 19A-19E, and FIGS. 29A-29B). In some embodiments, in response to detecting that the attention of the user is directed to the first respective virtual object (e.g., using one or more techniques as described above in relation to FIGS. 11A1-11E3, FIGS. 19A-19E, and FIGS. 29A-29B and, in particular, as described above in relation to the gaze only mode FIGS. 11A1-11E3) and in accordance with a determination that a respective set of criteria is satisfied, wherein the respective set of criteria is satisfied when the attention of the user is directed to the first respective virtual object (and, in some embodiments, the respective set of criteria includes a criterion that is satisfied when the attention of the user is directed to the first respective virtual object for a predetermined period of time (e.g., irrespective of detecting an additional input at an external device and/or the computer system) and/or a criterion that is satisfied when the attention of the user is directed to the first respective virtual object while an input is being detected (e.g., at an external device and/or at the computer system), as described above in relation to FIGS. 11A1-11E3, FIGS. 19A-19E, and FIGS. 29A-29B), the computer system performs an operation that is associated with the first respective virtual object (e.g., launching an application, moving the respective virtual object, and/or emphasizing the virtual object) (e.g., as described above in relation to FIGS. 11A1-11E3, FIGS. 19A-19E, and FIGS. 29A-29B). Performing an operation that is associated with the first respective virtual object in response to detecting that the attention of the user is directed to the first respective virtual object enables the computer system to perform an operation based on the attention of the user without display additional controls.

In some embodiments, while displaying the virtual content that includes the second set of virtual objects (e.g., 2902*a*-2902*f* and/or 2910) (e.g., while the viewpoint of the user is in the first orientation, the second orientation, or another orientation), the computer system detects that attention of the user (e.g., as described above in relation to FIGS.

11A1-11E3) is directed to a second respective virtual object in the second set of virtual objects (e.g., as described above in relation to FIGS. 11A1-11E3). In some embodiments, in response to detecting that the attention of the user is directed to the second respective virtual object and in accordance with a determination that a gesture (e.g., an air gesture, a hand gesture, and/or a mouse click) (e.g., a gesture as described above in relation to FIGS. 11A1-11E3) has been performed (e.g., at an external device) while the attention of the user is directed to the second respective virtual object (e.g., using one or more techniques as described above in relation to FIGS. 11A1-11E3, FIGS. 19A-19E, and FIGS. 29A-29B and, in particular, as described above in relation to the gaze with hand input mode in FIGS. 11A1-11E3), the computer system performs an operation that is associated with the second respective virtual object (e.g., launching an application, moving the respective virtual object, and/or emphasizing the virtual object) (e.g., as described above in relation to FIGS. 11A1-11E3 and FIGS. 29A-29B). In some embodiments, in response to detecting that the attention of the user is directed to the second respective virtual object and in accordance with a determination that the hand gesture has not been performed (e.g., at an external device) while the attention of the user is directed to the second respective virtual object, the computer system does not perform the operation that is associated with the second respective virtual object. Performing an operation that is associated with the second respective virtual object in response to detecting that the attention of the user is directed to the second respective virtual object and in accordance with a determination that a gesture has been performed while the attention of the user is directed to the second respective virtual object enables the computer system to perform an operation based on the attention of the user and a gesture being performed without display additional controls.

In some embodiments, aspects/operations of methods 800, 1000, 1200, 1400, 1600, 1800, 2000, 2200, 2400, 2600, 2800, and 3200 may be interchanged, substituted, and/or added with the steps of method 3000. For example, method 3000 can be used to control the display of virtual objects that are displayed to provide navigation guidance using method 1600. For brevity, these details are not repeated here.

FIGS. 31A-31H illustrate example techniques for navigating a user interface based on the attention of a user, in accordance with some embodiments. FIG. 32 is a flow diagram of methods for navigating a user interface based on the attention of a user, in accordance with some embodiments. The user interfaces in FIGS. 31A-31H are used to illustrate the method in FIG. 32.

Figure 31A:
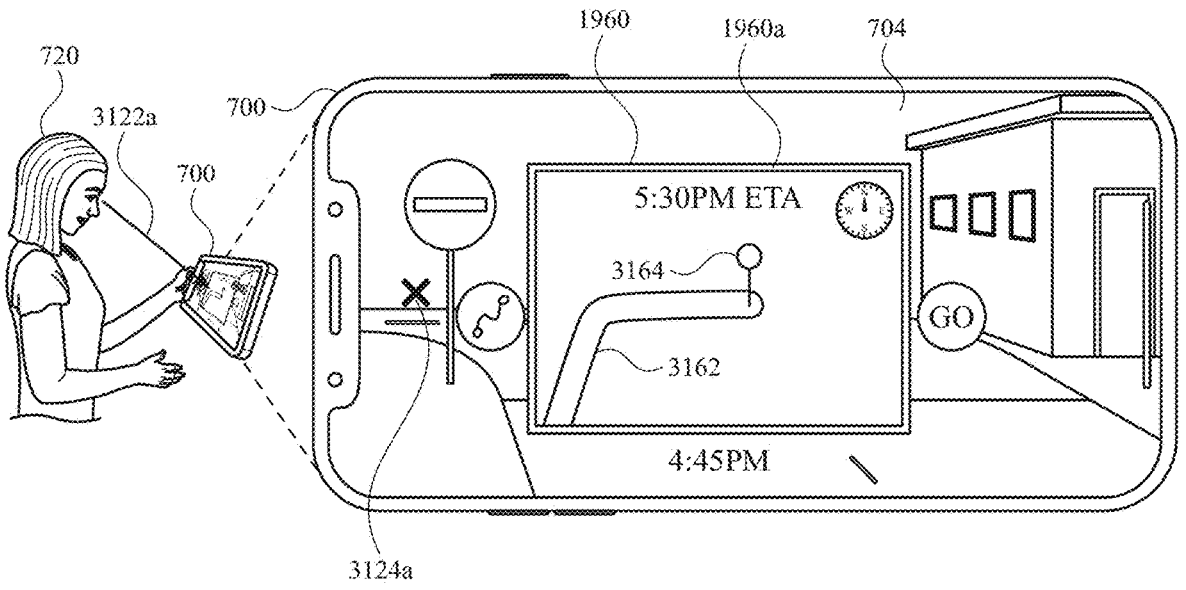
FIGS. 31A-31H illustrate example techniques for navigating a user interface based on the attention of a user, in accordance with some embodiments.

FIG. 31A illustrates user 720 holding computer system 700. Computer system 700 is positioned in a physical environment (e.g., as described above in relation to FIG. 19A). At FIG. 31A, a representation of the physical environment is visible on display 704. While computer system 700 is a phone in FIG. 31A, computer system 700 can be one or more other devices, such as a tablet and/or a head-mounted device. In some embodiments, computer system 700 includes one or more components of computer system 101, and/or display 704 includes components of display generation component 120. In some embodiments, display 704 presents a representation of the physical environment via one or more cameras in communication with computer system 700 (e.g., using "pass-through video" as described above). In some embodiments, computer system 700, via display 704, displays a representation of a virtual environment (e.g., instead of the physical environment at FIG. 31A). In some embodiments, computer system 700 displays a representation of the physical environment by displaying a representation of visual content (e.g., data) that is captured in the field-of-view of one or more cameras of computer system 700. In some embodiments, display 704 includes a transparent or semi-transparent display through which a user can view the physical environment directly, and display 704 can present virtual objects on the transparent or semi-transparent display. In some embodiments, display 704 projects (e.g., via one or more display projectors) virtual objects into and/or onto the physical environment. In some embodiments, virtual objects may be projected, for example, on a physical surface or as a holograph, so that user 720, using computer system 700, observes the virtual objects superimposed over the physical environment. In some embodiments, display 704 includes arrays of projectors (e.g., and/or multiple projectors), where a set of the projectors of display 704 can be turned on (e.g., active) (e.g., via computer system 700) while another set of the projectors are turned off (e.g., inactive) (e.g., via computer system 700). For case of discussion, the following description below will describe the computer system of FIGS. 31A-31H displaying an AR interface, where one or more virtual objects are overlaid on the representation of the physical environment that "passes through" the transparent display of computer system 700. In some embodiments, computer system 700 includes one or more features as described above in relation to FIGS. 9A-9G (e.g., including how computer system 700 can present an augmented reality environment via display 704 using one or more different techniques).

At FIG. 31A, computer system 700 is displaying navigation user interface 1960, using one or more techniques as described above in relation to FIG. 19E. As discussed above in relation to FIG. 19E, navigation user interface 1960 is an AR user interface that is overlaid on a representation of the physical environment. As illustrated in FIG. 31A, navigation user interface 1960 includes a map (e.g., virtual content), where the map includes road 3162 and pin 3164. Pin 3164 is located at a position on road 3162 at a known location. In some embodiments, the known location is a location of a business, house, monument, landmark, park, intersection, and/or public location. In some embodiments, the known location is a predefined location and/or is a determined location of interest. At FIG. 31A, computer system 700 detects that the attention (and/or gaze) of user 720 is moving in a rightward direction from gaze location 3124a in FIG. 31A to gaze location 3124b of FIG. 31B (which is also indicated by gaze direction 3122a of FIG. 31A moving into the position of gaze direction 3122b of FIG. 31B).

Figure 31B:
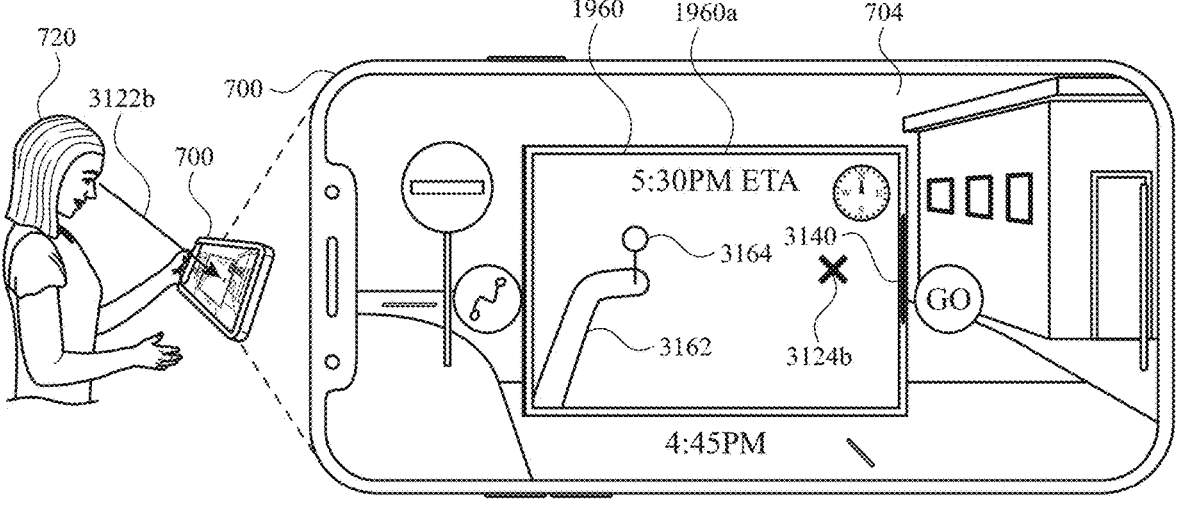

As illustrated in FIG. 31B, in response to detecting that the attention of user 720 is moving in the rightward direction and because gaze location 3124b is inside of boundary 1960a of navigation user interface 1960 (e.g., at a location within navigation user interface 1960 and not a location that is in the representation of the physical environment), computer system 700 pans (e.g., translates and/or shifts) navigation user interface 1960 in the rightward direction, such that road 3162 and pin 3164 are moved to the left and a smaller portion of road 3162 is visible in FIG. 31B than the portion of road 3162 that was visible in FIG. 31A. As illustrated in FIG. 31B, in response to detecting that the attention of user 720 is moving in the rightward direction (and, in some embodiments, that gaze location 3124b is inside of boundary 1960a of navigation user interface 1960), computer system 700 displays indication 3140 along the right side of boundary 1960a of navigation user interface 1960. By being displayed along the right side of boundary 1960a, indication 3140 indicates that computer system 700 is panning (and/or has panned) navigation user interface 1960 is the rightward direction (e.g., based on the movement of the attention of the user). At FIG. 31B, indication 3140 is a portion of boundary 1960*a* that is emphasized (e.g., highlighted and/or darkened). In some embodiments, computer system 700 indicates a respective direction in which computer system 700 is panning navigation user interface 1960 in other ways, such as with text and/or arrows indicating the respective direction and/or changing size (e.g., expanding and/or contracting) to indicate the respective direction. In some embodiments, indication 3140 is displayed outside of boundary 1960*a* and/or is not a portion of boundary 1960*a*. In some embodiments, computer system 700 pans navigation user interface 1960 at a speed that is based on the detected movement of the attention of the user (e.g., as the attention of the user is detected to be moving faster across display 704, computer system 700 pans navigation user interface 1960 at a faster speed). In some embodiments, in response to detecting that the attention of the user is moving in the rightward direction and because gaze location 3124*b* is inside of the frame of navigation user interface 1960 (and/or other virtual content), computer system 700 does not translate the navigation user interface 1960 and continues to display the navigation user interface 1960 of FIG. 31A. In some embodiments, in response to detecting that the attention of the user is moving in a direction, computer system 700 pans navigation user interface 1960, irrespective of whether the attention of user 720 is within boundary 1960*a*. In some embodiments, in response to detecting that the attention of user 720 is moving in a direction, computer system 700 pans navigation user interface 1960 only while the attention of user 720 is within the boundary 1960*a*. In some embodiments, at FIG. 31A, computer system 700 does not pan navigation user interface 1960 and/or display an indication along boundary 1960*a* because gaze location 3124*a* is not within boundary 1960*a*. At FIG. 31B, computer system 700 detects that the attention (and/or gaze) of user 720 is moving in a rightward direction from gaze location 3124*b* in FIG. 31B to gaze location 3124*c* of FIG. 31C (which is also indicated by gaze direction 3122*b* of FIG. 31B moving into the position of gaze direction 3122*c* of FIG. 31C).

Figure 31C:
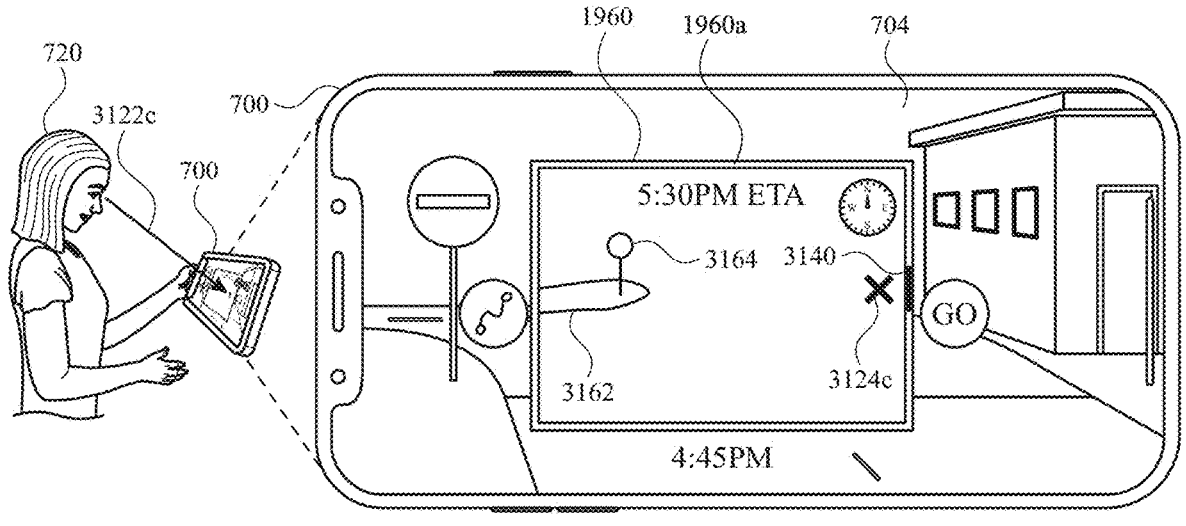

As illustrated in FIG. 31C, in response to detecting that the attention of user 720 is moving in the rightward direction and because gaze location 3124*c* is inside of boundary 1960*a* of navigation user interface 1960, computer system 700 continues to pan navigation user interface 1960 in the rightward direction, such that road 3162 and pin 3164 are moved further to the left and a smaller portion of road 3162 is visible in FIG. 31C than the portion of road 3162 that was visible in FIG. 31B. As illustrated in FIG. 31C, in response to detecting that the attention of user 720 is moving in the rightward direction (and, in some embodiments, because gaze location 3124*c* is inside of boundary 1960*a* of navigation user interface 1960), computer system 700 continues to display indication 3140 along the right side of boundary 1960*a*. However, computer system 700 decreases the size of indication 3140 (and/or decreases the diffusion and/or spread of indication 3140) because gaze location 3124*c* is closer to boundary 1960*a* than gaze location 3124*b* was at FIG. 31B. Thus, computer system 700 displays indication 3140 with an amount of diffusion and/or with a certain size based on how close the attention of the user is to boundary 1960*a*. In other words, as the attention of the user is detected at a position that is closer to boundary 1960*a* (and/or the edge of a user interface), computer system 700 decreases the amount of diffusion and/or the size of indication 1940 (or, in some alternative embodiments, vice-versa). At FIG. 31C, computer system 700 detects that the attention (and/or gaze) of user 720 is moving in an upward direction from gaze location 3124*c* in FIG. 31C to gaze location 3124*d* of FIG. 31D (which is also indicated by gaze direction 3122*c* of FIG. 31C moving into the position of gaze direction 3122*d* of FIG. 31D).

Figure 31D:
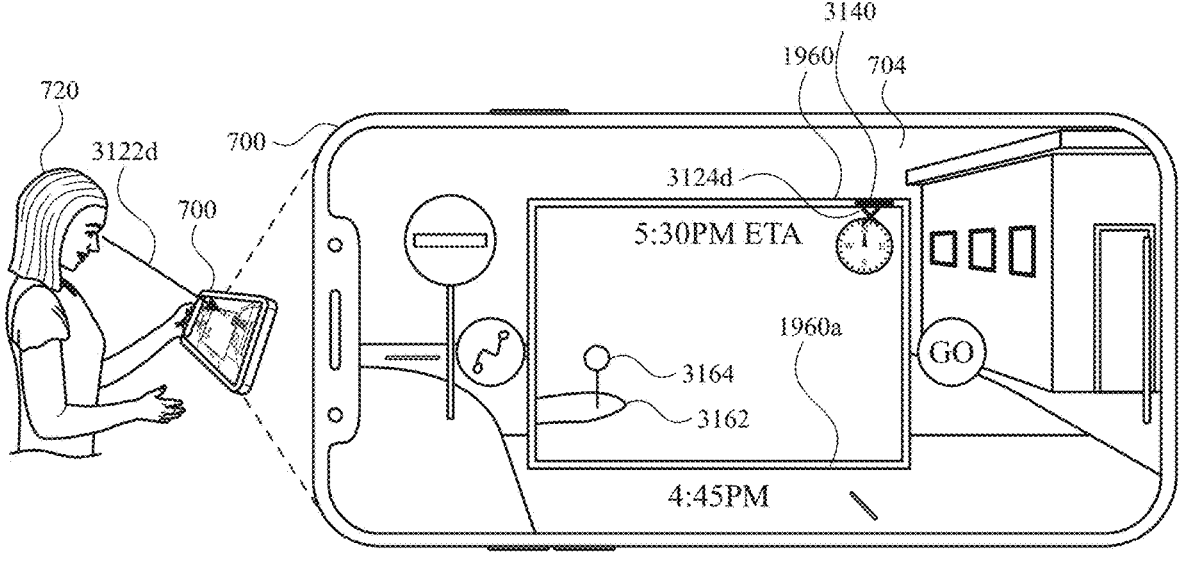
Figure 31E:
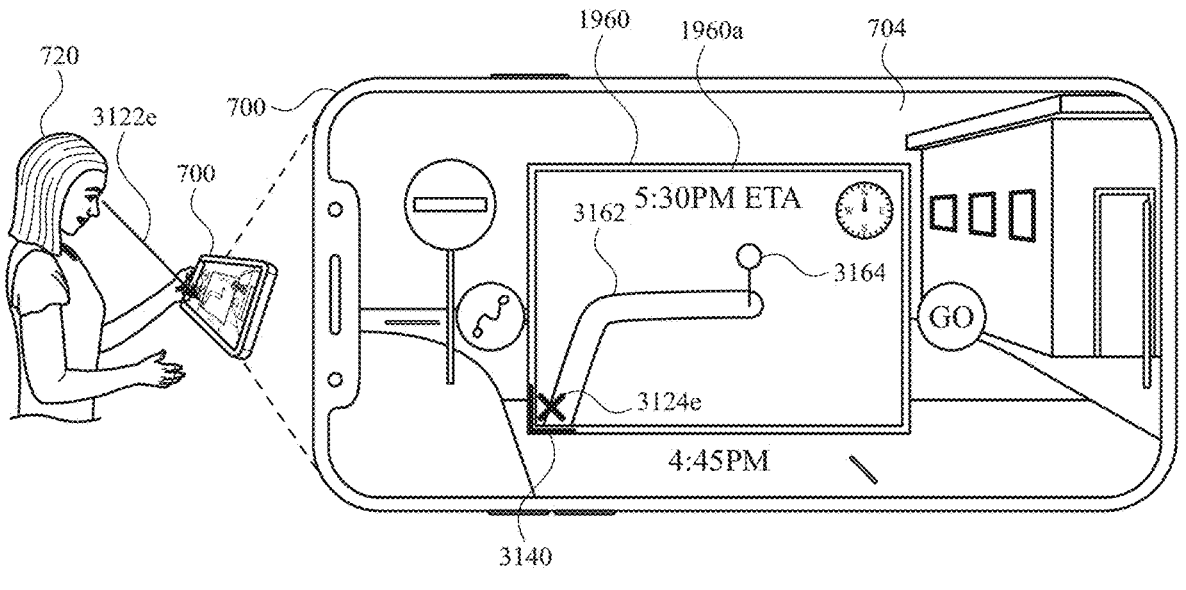

As illustrated in FIG. 31D, in response to detecting that the attention of user 720 is moving in the upward direction and because gaze location 3124*d* is inside of boundary 1960*a*, computer system 700 pans navigation user interface 1960 in the upward direction. In addition, computer system 700 moves indication 3140, such that indication 3140 is displayed along the top side of boundary 1960*a* to indicate that computer system 700 is panning (and/or has panned) navigation user interface 1960 is the upward direction. At FIG. 31D, computer system 700 detects that the attention (and/or gaze) of user 720 is moving in a downward direction and a leftward direction from gaze location 3124*d* in FIG. 31D to gaze location 3124*e* of FIG. 31E (which is also indicated by gaze direction 3122*d* of FIG. 31D moving into the position of gaze direction 3122*e* of FIG. 31E). As illustrated in FIG. 31E, in response to detecting that the attention of user 720 is moving in the downward and leftward directions, computer system 700 pans navigation user interface 1960 in the downward and leftward directions. In addition, computer system 700 displays indication 3140 in the left corner of boundary 1960*a* to indicate that computer system 700 is panning (and/or has panned) navigation user interface 1960 is the downward and leftward directions.

Figure 31F:
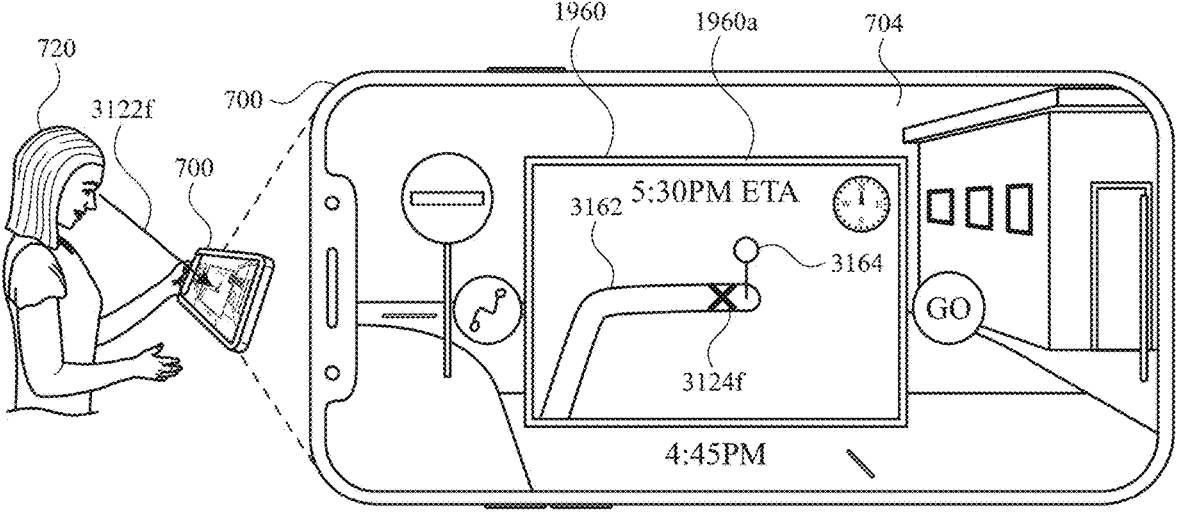
Figure 31G:
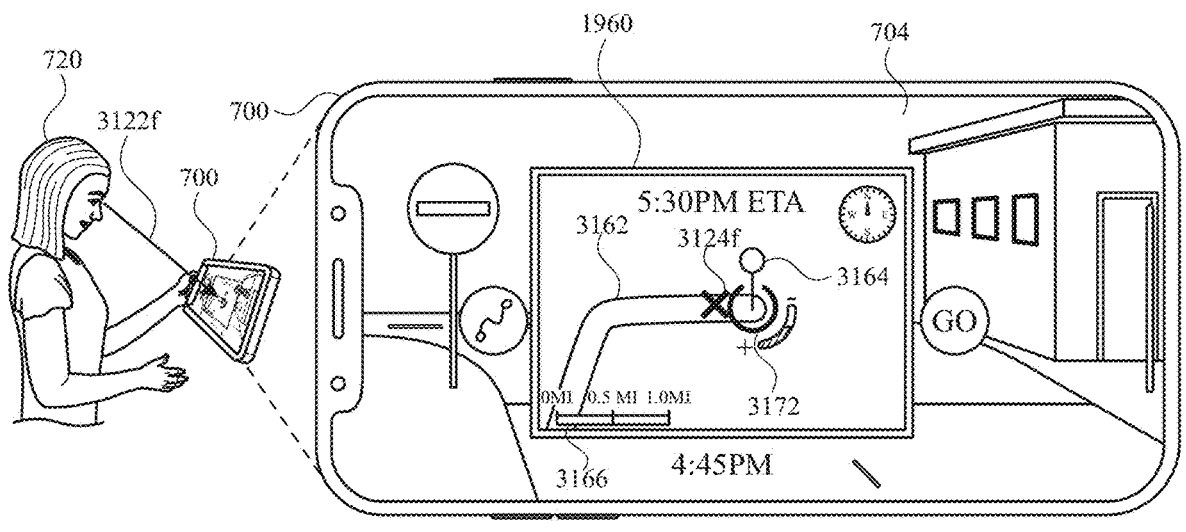

At FIG. 31F, computer system 600 detects that the attention of the user is directed to a location on navigation user interface 1960 that corresponds to gaze location 3124*f* for a predetermined period of time (e.g., 0.2-5 seconds). In addition, a determination is made that gaze location 3124*f* is near (and/or within a predetermined distance (e.g., 0.1-500 cm) from) a predefined and/or known location (as indicated by the location of pin 3164). As illustrated in FIG. 31G, in response to detecting that the attention of the user is directed to a location on navigation user interface 1960 that corresponds to gaze location 3124*f* for the predetermined period of time and because the determination is made that the location on navigation user interface 1960 is near the known location, computer system 700 displays reticle virtual object 3172 near (and/or around) the location of the known location. Notably, at FIG. 31G, reticle virtual object 3172 is not displayed around and/or closer to gaze location 3124*f* because the determination was made that the attention of user 720 is near a predefined and/or known location. In some embodiments, if computer system 700 detects that the attention of the user is directed to a respective location on navigation user interface 1960 for the predetermined time and the respective location is not near a known location, computer system 700 displays the reticle around the respective location. At FIG. 31G, computer system 700 detects that the head of user 720 is being tilted upward as the attention of user 720 continues to be directed to the location on navigation user interface 1960 that corresponds to gaze location 3124*f.*

Figure 31H:
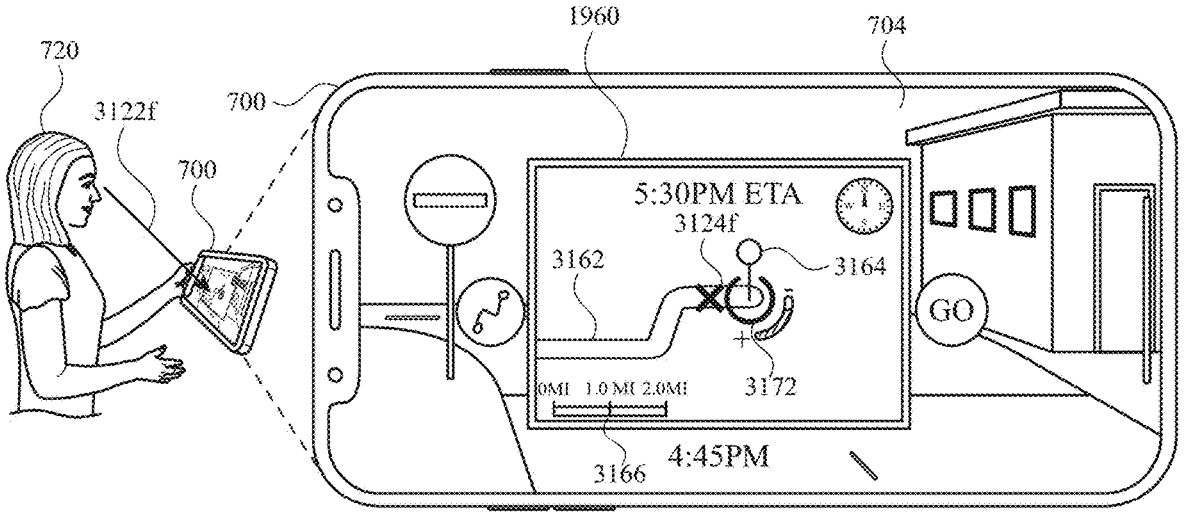

As illustrated in FIG. 31H, in response to detecting that the head of user 720 is being tilted upward (and, in some embodiments, because the attention of the user continues to be directed to the location on navigation user interface 1960 that corresponds to gaze location 3124*f* or is directed to the location of reticle virtual object 3172), computer system 700 decreases the zoom level of navigation user interface 1960 and/or zooms out from the virtual content of navigation user interface 1960. To indicate that navigation user interface 1960 has been zoomed, computer system 700 updates the filling of reticle virtual object 3172 (e.g., reticle virtual object 3172 of FIG. 31H is filled more (e.g., towards the minus sign) than reticle virtual object 3172 of FIG. 31G, where more filling indicates less zoom being applied to the virtual content of navigation user interface 1960. As illustrated in FIG. 31H, road 3162 (e.g., the width of road 3162) and pin 3164 appear to be slightly smaller to indicate that computer system 700 has zoomed out of the virtual content displayed on navigation user interface 1960. In addition, computer system 700 updates scale 3166, such that scale 3166 indicates that a broader range of distances is being shown in the navigation user interface 1960 of FIG. 31H than the range of distances that is shown in the navigation user interface 1960 of FIG. 31G. In some embodiments, in response to detecting that the head of user 720 is being tilted downward, computer system 700 increases the zoom level of navigation user interface 1960 and/or zooms into the virtual content of navigation user interface 1960. In some embodiments, computer system 700 zooms the virtual content of navigation user interface 1960 based on the speed that the head of user 720 is tilted. In some embodiments, as the head of user 720 is tilted faster backward, computer system 700 zooms out of the virtual content of navigation user interface 1960 faster (or vice-versa, in some alternative embodiments). In some embodiments, computer system 700 zooms the virtual content of navigation user interface 1960 based on the degree of tilt of the head of user 720. In some embodiments, as the head of user 720 is tilted further backward, computer system 700 zooms out of the virtual content of navigation user interface 1960 faster (or vice-versa, in some alternative embodiments). In some embodiments, as the head of user 720 is tilted further backward, computer system 700 zooms out of the virtual content more and/or less. In some embodiments, in response to detecting that the attention of the user is no longer directed to the location on navigation user interface 1960 that corresponds to gaze location 3124ƒ or is directed to the location of reticle virtual object 3172, computer system 700 ceases display of reticle virtual object 3172 and does not zoom in and/or out of the virtual content in response to detecting movement of the head of user 720. In some embodiments, in response to detecting minimal movement (e.g., more than jitter) of the attention of user 720, computer system 700 does not pan navigation user interface 1960 even if the attention of user 720 is inside of boundary 1960a.

Additional descriptions regarding FIGS. 31A-31H are provided below in reference to method 3200 described with respect to FIGS. 31A-31H.

FIG. 32 is a flow diagram of an exemplary method 3200 for navigating a user interface based on the attention of the user, in accordance with some embodiments. In some embodiments, method 3200 is performed at a computer system (e.g., 700) that is in communication with and a display generation component (e.g., 704) (e.g., a display controller; a touch-sensitive display system; a display (e.g., integrated and/or connected), a 3D display, a transparent display, a projector, a heads-up display, and/or a head-mounted display) (e.g., that is configured to display visual content over a display area (e.g., area of display screen and/or lens). In some embodiments, the computer system includes one or more gaze-tracking sensors (e.g., an optical and/or IR camera configured to track a direction of attention of a user of the computer system). In some embodiments, the computer system is optionally in communication with one or more external devices, one or more gaze tracking sensors, one or more physical input mechanisms, such as one or more routable input mechanisms, one or more cameras, one or more display projectors, one or more audio output devices, one or more touch-sensitive surfaces, one or more gaze tracking sensors, one or more physical input mechanism, one or more microphones, and/or one or more cameras. In some embodiments, the computer system includes one or more gaze-tracking sensors (e.g., an optical and/or IR camera configured to track a direction of attention of a user of the computer system). In some embodiments, the computer system is in communication with and/or includes one or more sensors (e.g., a gyroscope and/or accelerometer) for detecting gravity and/or the direction of gravity. In some embodiments, method 3200 is governed by instructions that are stored in a non-transitory (or transitory) computer-readable storage medium and that are executed by one or more processors of a computer system, such as the one or more processors 202 of computer system 101 (e.g., controller 110 in FIG. 1). Some operations in method 3200 are, optionally, combined and/or the order of some operations is, optionally, changed.

While displaying, via the display generation component, a respective virtual object (e.g., 1960) (e.g., a window and/or a virtual window) that includes virtual content (e.g., content of 1960, such as 3162 and/or 3164) (e.g., one or more portions of a map, a document, and/or an image) (e.g., one or more images and/or text) and while attention (e.g., 3122a-3122e and/or 3124a-3124e) of a user (e.g., 720) (e.g., a field-of-view of the computer system, a detected attention of the user (e.g., based on a gaze of the user that is detected via one or more gaze-tracking sensors as described in greater detail above)) is directed to the respective virtual object, the computer system navigates (3202) through (e.g., scrolling, translating, and/or shifting) the virtual content in a first navigation direction (e.g., movement and/or shift and/or a first navigation direction) and displays a navigation virtual object (e.g., 3140), wherein the navigation virtual object indicates the first navigation direction, and wherein the first navigation direction is based on (e.g., in the direction of or in the opposite direction of) a detected direction (e.g., a direction that is detected based on the current movement and/or previous movement of the attention of the user) of the attention of the user (e.g., while continuing to display the virtual object at the same position relative to the user interface and/or the three-dimensional environment). In some embodiments, the first navigation direction is different from the detected direction of the attention of the user. In some embodiments, as a part of navigating the first virtual content, the computer system ceases to display a portion of the virtual content (e.g., a portion of the virtual content that is displayed at an edge of the content and/or virtual object that is opposite of the navigation direction) and displays a portion (e.g., a portion of content that was not previously displayed) of the virtual content at the edge of the content and/or virtual object that is in the navigation direction (and/or towards the direction of content). In some embodiments, the navigation virtual object indicates the first direction by the navigation virtual object being located at a location (e.g., a location relative to the virtual content).

While navigating through the virtual content (e.g., content of 1960, such as 3162 and/or 3164) in the first navigation direction and displaying the navigation virtual object (e.g., 3140) indicating the first navigation direction, the computer system detects (3204) a change in direction of the attention (e.g., 3122a-3122e and/or 3124a-3124e) of the user (e.g., North. South, East, West, Northeast, Southeast, Northwest, Southwest, up, down, left, right, and/or any combination thereof) (e.g., while the attention of the user is directed to the respective virtual object).

In response to (3206) detecting the change in direction of the attention (e.g., 3122a-3122e and/or 3124a-3124e) of the user (e.g., while the attention of the user is directed to the respective virtual object), the computer system navigates (3208) through the virtual content (e.g., content of 1960, such as 3162 and/or 3164) in a second navigation direction (and, in some embodiments, the second navigation direction is based on the changed direction of the attention of the user) that is different from the first navigation direction. In response to (3206) detecting the change in direction of the attention (e.g., 3122a-3122e and/or 3124a-3124e) of the user (e.g., while the attention of the user is directed to the respective virtual object), the computer system shifts (3210) (e.g., updating, replacing display of with a different virtual object, and/or changing the position of) (e.g., shifting a portion of) the navigation virtual object (e.g., 3140) to indicate the second navigation direction (e.g., instead of the first navigation direction). In some embodiments, the second navigation direction is different from the changed direction of the attention of the user. In some embodiments, the navigation virtual object is displayed near a first edge of the virtual content before detecting the change in direction of the attention of the user and the virtual object is displayed near a second edge (e.g., that is different from the first edge) when the navigation virtual object is shifted and/or in response to detecting the change in direction of the attention of the user while the attention of the user is directed to the virtual content. In some embodiments, the shifted navigation virtual object indicates the second navigation direction. In some embodiments, in response to detecting the change in direction of the attention of the user while the attention of the user is directed to the respective virtual object, the computer system continues to display the respective virtual object at a position at which the respective virtual object was displayed before detecting the change in direction of the attention. In some embodiments, shifting the navigation virtual object includes ceasing to display a first virtual object that indicates the first navigation direction and displaying a second virtual object that indicates the second navigation direction. Navigating through the virtual content in a second navigation direction that is different from the first navigation direction and shifting the navigation virtual object to indi- cate the second navigation direction in response to detecting the change in direction of the attention of the user enables the computer system to navigate through the virtual content in a different direction and provide feedback concerning the state of the computer system (e.g., the state at which the computer system is navigating via the navigation virtual object) without displaying additional controls.

In some embodiments, the virtual content (e.g., content of 1960, such as 3162 and/or 3164) includes a first edge (e.g., 1906a) (e.g., a visual boundary and/or a frame that sur- rounds the virtual content (e.g., the entirety of) and/or at least a subset of the virtual content). In some embodiments, the navigation virtual object (e.g., 3140) is an emphasized (e.g., highlighted, enlarged, includes one or more visual characteristics (e.g., color, shape, and/or boldness) that are different from a non-emphasized portion of the edge, dis- played with one or more selection indicators (e.g., arrows and/or boxes surrounding the emphasized portion)) portion of the first edge. In some embodiments, while the navigation virtual object indicates the first navigation direction, the computer system emphasizes a first portion of the edge (and/or displays a first portion of the edge as being emphasized) and does not emphasize a second portion of the edge (e.g., a second portion of the edge that is different from the first portion of the edge) (in some embodiments, the first portion of the edge is highlighted, is bolded, and/or is bigger than the second portion of the edge). In some embodiments, while the navigation virtual object indicates the second navigation direction, the computer system does not empha- size the first portion of the edge (and/or displays the second portion of the edge as being emphasized) and emphasizes the second portion of the edge (in some embodiments, the second portion of the edge is highlighted, is bolded, and/or is bigger than the first portion of the edge). Navigating through the virtual content in a second navigation direction that is different from the first navigation direction and shifting the navigation virtual object that is an emphasized portion of the first edge to indicate the second navigation direction in response to detecting the change in direction of the attention of the user enables the computer system to navigate through the virtual content in a different direction and provide feedback concerning the state of the computer system (e.g., the state at which the computer system is navigating via the navigation virtual object) without dis- playing additional controls.

In some embodiments, the virtual content (e.g., content of 1960, such as 3162 and/or 3164) includes a second edge (e.g., 1906a) (e.g., a visual boundary and/or a frame that surrounds the virtual content (e.g., the entirety of) and/or at least a subset of the virtual content). In some embodiments, shifting the navigation virtual object (e.g., 3140) to indicate the second navigation direction includes: in accordance with a determination that the attention (e.g., 3122a-3122e and/or 3124a-3124e) of the user is a first distance from the second edge, updating the navigation virtual object to have a first visual appearance (e.g., a size, color, shape, bolding, and/or highlighting); and in accordance with a determination that the attention (e.g., 3122a-3122e and/or 3124a-3124e) of the user is a second distance from the second edge, wherein the second distance is shorter than the first distance, updating the navigation virtual object to have a second visual appear- ance (e.g., a size, color, shape, bolding, and/or highlighting) that is different from the first visual appearance. In some embodiments, when the navigation virtual object has the second visual appearance, the navigation virtual object is bigger (or smaller) than, bolder (or less bold) than, visually emphasized (or visually de-emphasized) as compared to the navigation virtual object having the first visual appearance. In some embodiments, while the navigation virtual object has the first visual appearance, the computer system detects that the attention of the user is a third distance from the second edge (e.g., the third distance is different from the first edge); and in response to detecting that the attention of the user is the third distance from the second edge, the computer system updates the navigation virtual object to have a third visual appearance that is different from the first visual appearance. In some embodiments, while the navigation virtual object has the first visual appearance, the computer system detects that the attention of the user is the second distance from the second edge; and in response to detecting that the attention of the user is the second distance from the second edge, the computer system updates the navigation virtual object to have the second visual appearance that is different from the first visual appearance. Updating the navigation virtual object with a visual appearance that is based on the distance that the attention of the user is from the second edge provides feedback about the state of the com- puter system (e.g., the computer system's detection of the attention of the user being at a particular distance or at a particular range of distances from the second edge) and automatically causes the computer system to update the navigation virtual object based on the distance that the attention of the user is from the second edge.

In some embodiments, the navigation virtual object (e.g., 3140) that is updated to have the first visual appearance has a first visual amount of diffusion (e.g., a size and/or an amount of spreading, scattering, and/or separating (e.g., between portions of the navigation object)), and wherein the navigation virtual object that is updated to have the second visual appearance has a second visual amount of diffusion (e.g., a size and/or an amount of spreading, scattering, and/or separating (e.g., between portions of the navigation object)) that is less than the first amount of diffusion (e.g., as described above in relation to FIGS. 31B-31C). Updating the navigation virtual object with a visual appearance that has an amount of diffusion based on the distance that the attention of the user is from the second edge provides feedback about the state of the computer system (e.g., the computer system's detection of the attention of the user being at a particular distance or at a particular range of distances from the second edge) and automatically causes the computer system to update the navigation virtual object based on the distance that the attention of the user is from the second edge.

In some embodiments, the virtual content (e.g., content of 1960, such as 3162 and/or 3164) has a third edge (e.g., 1906a) (e.g., a visual boundary and/or a frame that surrounds the virtual content (e.g., the entirety of) and/or at least a subset of the virtual content), and wherein the first navigation virtual object (e.g., 3140) is displayed near (is overlaid on, is adjacent to, is close to, and/or is on) the third edge. In some embodiments, the navigation virtual object is the closest virtual object displayed near the third edge (e.g., there are no other virtual objects between the navigation virtual object and the third edge. Displaying the navigation virtual object is displayed near the third edge provides feedback about a state of the computer system (e.g., that the attention of the user is directed to the third edge) and how the attention of the user can impact the navigation (e.g., attention of the user detected at the edge of the content).

In some embodiments, while the navigation virtual object (e.g., 3140) indicates the first navigation direction, the navigation virtual object is displayed at a first location (e.g., a first location on the edge (e.g., 1906a) of the virtual content and/or at a portion of the virtual content) (e.g., relative to the virtual content). In some embodiments, while the navigation virtual object indicates the first navigation direction, the virtual object is and/or includes a first portion of the virtual content (e.g., a first portion of an edge of the virtual content). In some embodiments, shifting the navigation virtual object to indicate the second navigation direction includes: in response to detecting the change in direction of the attention (e.g., 3122a-3122e and/or 3124a-3124c) of the user and in accordance with a determination that the attention of the user is directed to a first respective location (e.g., on a user interface and/or a first portion of the virtual content), the computer system displays, via the display generation component, the navigation virtual object at a second location (e.g., a second location on the edge of the virtual content and/or at a portion of the virtual content) (e.g., relative to the virtual content) In some embodiments, while the navigation virtual object indicates the second navigation direction, the virtual object is and/or includes a portion of the virtual content (e.g., a first portion of an edge of the virtual content) (and, in some embodiments, the second location that is different from the first location) (e.g., after and/or during shifting the navigation virtual object to indicate the second navigation direction) (e.g., as described above in relation to FIGS. 31B-31E). In some embodiments, in response to detecting the change in direction of the attention (e.g., 3122a-3122e and/or 3124a-3124e) of the user and in accordance with a determination that the attention of the user is directed to a second respective location (e.g., or a second portion of the virtual content that is different from the first portion of the virtual content) that is different from the first respective location, the computer system displays, via the display generation component, the navigation virtual object at a third location (e.g., a second location on the edge of the virtual content and/or at a portion of the virtual content) (e.g., relative to the virtual content) In some embodiments, while the navigation virtual object indicates the second navigation direction, the virtual object is and/or includes a portion of the virtual content (e.g., a second portion of an edge of the virtual content) that is different from the second location (e.g., as described above in relation to FIGS. 31B-31E) (e.g., and the first location) (e.g., after and/or during shifting the navigation virtual object to indicate the second navigation direction). In some embodiments, the second location is a location of the first portion of the virtual content and/or the first respective location. In some embodiments, the third location is a location of the second portion of the virtual content and/or the second respective location. In some embodiments, the second location is closer to the first portion of the virtual content and/or the first respective location than the third location, and/or the second location is closer to the first portion of the virtual content and/or the first respective location than the second portion of the virtual content and/or the second respective location. In some embodiments, the third location is closer to the second portion of the virtual content and/or the second respective location than the second location, and/or the third location is closer to the second portion of the virtual content and/or the second respective location than the first portion of the virtual content and/or the first respective location. Displaying, via the display generation component, the navigation virtual object at a location based on the attention of the user provides feedback about a state of the computer system (e.g., that the attention of the user is directed to a particular location) and how the attention of the user can impact the navigation (e.g., attention of the user detected at the particular location) and automatically causes the computer system to update the navigation virtual object based on the attention of the user.

In some embodiments, while the navigation virtual object (e.g., 3140) is indicating the second navigation direction and the navigation virtual object is displayed at a fourth location (e.g., a location on the edge (e.g., 1906a) of the virtual content and/or at a portion of the virtual content) (e.g., relative to the virtual content), the computer system detects a second change in direction of the (e.g., 3122a-3122e and/or 3124a-3124c) of the user. In some embodiments, in response to detecting the second change in direction of the (e.g., 3122a-3122e and/or 3124a-3124c) of the user and in accordance with a determination the attention of the user is directed to a first respective portion (e.g., a portion of an edge (e.g., 1906a) of the virtual content) of the virtual content (e.g., content of 1960, such as 3162 and/or 3164), the computer system displays, via the display generation component, the navigation virtual object at a fifth location that is different from the fourth location (e.g., as described above in relation to FIGS. 31B-31E). In some embodiments, in response to detecting the second change in direction of the (e.g., 3122a-3122c and/or 3124a-3124c) of the user and in accordance with a determination the attention of the user is directed to a second respective portion (e.g., a portion of an edge (e.g., 1906*a*) of the virtual content) of the virtual content that is different from the first respective portion of the virtual content, the computer system displays, via the display generation component, the navigation virtual object at a sixth location that is different from the fourth location and the fifth location (e.g., as described above in relation to FIGS. 31B-31E). Displaying the navigation virtual object at a new location (e.g., fifth location or sixth location) when prescribed conditions are met allows the computer system to automatically update the navigation virtual object based on where the attention of the user is directed and provides feedback about the state of the computer system (e.g., the navigation direction).

In some embodiments, in response to detecting the second change in direction of the (e.g., 3122*a*-3122*e* and/or 3124*a*-3124*e*) of the user and in accordance with a determination the attention of the user is directed to the first respective portion (e.g., a portion of an edge (e.g., 1906*a*) of the virtual content) of the virtual content (e.g., content of 1960, such as 3162 and/or 3164), the computer system navigates through the virtual content in a third navigation direction that is different from the second navigation direction (e.g., as described above in relation to FIGS. 31B-31E). In some embodiments, in response to detecting the second change in direction of the (e.g., 3122*a*-3122*c* and/or 3124*a*-3124*c*) of the user and in accordance with a determination the attention of the user is directed to the second respective portion (e.g., a portion of an edge (e.g., 1906*a*) of the virtual content) of the virtual content, the computer system navigates through the virtual content in a fourth navigation direction that is different from the third navigation direction (e.g., and the second navigation direction) (e.g., as described above in relation to FIGS. 31B-31E). Navigating through the virtual in a different navigation direction when prescribed conditions are met allows the computer system to automatically update the navigation direction through the virtual content based on where the attention of the user is directed.

In some embodiments, while the navigation virtual object (e.g., 3140) is indicating the second navigation direction and the navigation virtual object is displayed (e.g., a location on the edge of the virtual content and/or at a portion of the virtual content) (e.g., relative to the virtual content), the computer system detects that the (e.g., 3122*a*-3122*e* and/or 3124*a*-3124*e*) of the user is directed to a third respective location (e.g., a location on a user interface). In some embodiments, in response to detecting that the attention of the user is directed to the third respective location and in accordance with a determination that the third respective location is greater than a first threshold distance (e.g., 0.01-1 centimeter) from (and/or outside of (e.g., outside of an edge of the) the virtual content (e.g., content of 1960, such as 3162 and/or 3164), the computer system ceases to display the navigation virtual object (e.g., as described above in relation to FIGS. 31A-31E). In some embodiments, as a part of ceasing to display the virtual object, the computer system displays an animation of the navigation virtual object gradually fading and/or disappearing. In some embodiments, in response to detecting that the attention of the user is directed to the third respective location and in accordance with a determination that the third respective location is not greater than a first threshold distance from (and/or outside of (e.g., outside of an edge of the) the virtual content, the computer system continues to display the navigation virtual object. Ceasing to display the navigation virtual object when pre-scribed conditions are met allows the computer system to automatically cease to display the navigation virtual object in situations where the navigation virtual object is not needed and provides feedback concerning a state of the computer system (e.g., that attention of the user is not currently impacting the navigation of the virtual content).

In some embodiments, while the navigation virtual object (e.g., 3140) is indicating the second navigation direction and the navigation virtual object is displayed (e.g., a location on the edge (e.g., 1906*a*) of the virtual content and/or at a portion of the virtual content) (e.g., relative to the virtual content), the computer system detects that the (e.g., 3122*a*-3122*e* and/or 3124*a*-3124*c*) of the user is directed to a fourth respective location (e.g., a location on a user interface). In some embodiments, in response to detecting that the attention of the user is directed to the fourth respective location and in accordance with a determination that the fourth respective location is greater than a first threshold distance (e.g., 0.01-1 centimeter) from (and/or outside of (e.g., outside of an edge (e.g., 1906*a*) of the) the virtual content (e.g., content of 1960, such as 3162 and/or 3164), the computer system ceases to navigate through the virtual content (e.g., as described above in relation to FIGS. 31A-31E) (e.g., ceasing to update the display of the virtual content). In some embodiments, in response to detecting that the attention of the user is directed to the fourth respective location and in accordance with a determination that the third respective location is greater than a first threshold distance from the virtual content, the computer system continues to navigate through the virtual content. Ceasing to navigate through the virtual content when prescribed conditions are met causes the computer system to automatically cease to navigate through the virtual content in situations where the user may no longer intended to navigate through the virtual content based on the attention of the user.

In some embodiments, while displaying, via the display generation component, the respective virtual object (e.g., 1960) that includes the virtual content (e.g., content of 1960, such as 3162 and/or 3164), the computer system detects that the (e.g., 3122*f* and/or 3124*f*) of the user is directed to a third respective portion of the virtual content. In some embodiments, in response to detecting that the attention of the user is directed to the third respective portion of the virtual content and in accordance with a determination that the attention of the user has been directed to the third respective portion of the virtual content for more than a first threshold amount of time (e.g., 0.05-10 seconds), the computer system displays, via the display generation component, a first virtual object (e.g., 3172) (e.g., a reticle and/or a pin) (e.g., a virtual object that is overlaid on the virtual content) at a respective location in the third respective portion of the virtual content. In some embodiments, in response to detecting that the attention of the user is directed to the third respective portion of the virtual content and in accordance with a determination that the attention of the user has not been directed to the third respective portion of the virtual content for more than the first threshold amount of time, the computer system does not display the first virtual object. Displaying the first virtual object at the respective location in the third respective portion of the virtual content provides feedback concerning the state of the computer system (e.g., that the computer system is configured to change the zoom level of the virtual content based on detecting one or more inputs).

In some embodiments, in accordance with a determination that the attention (e.g., 3122*f* and/or 3124*f*) of the user is directed to a first location in the third respective portion of the virtual content (e.g., content of 1960, such as 3162 and/or 3164), the respective location in the third respective portion of the virtual content is a second location in the third respective portion of the virtual content. In some embodiments, the first location in the third respective portion of the virtual content is the same as or different from the second location in the third respective portion of the virtual content. In some embodiments, in accordance with a determination that the attention (e.g., 3122f and/or 3124f) of the user is directed to a third location in the third respective portion of the virtual content, the respective location in the third respective portion of the virtual content is a fourth location in the third respective portion of the virtual content. In some embodiments, the second location in the third respective portion of the virtual content is different from the fourth location in the third respective portion of the virtual content, and wherein the first location in the third respective portion of the virtual content is different from the third location in the third respective portion of the virtual content. In some embodiments, the second location in the third respective portion of the virtual content is the same as or different from the fourth location in the third respective portion of the virtual content. Choosing the respective location in the third respective portion of the virtual content at which the first virtual object is displayed based on the attention of the user causes the computer system to automatically choose to display the first virtual object at a location in the user interface that may be relevant to the user (e.g., currently visible to the user).

In some embodiments, the virtual content (e.g., content of 1960, such as 3162 and/or 3164) is displayed at a first zoom level. In some embodiments, while displaying, via the display generation component, the first virtual object (e.g., 3172), the computer system detects that the computer system has been tilted (e.g., as described above in relation to FIGS. 31G-31H). In some embodiments, in response to detecting that the computer system has been tilted (e.g., while displaying the first virtual object), the computer system displays the virtual content at a second zoom level that is different from the first zoom level (e.g., as described above in relation to FIGS. 31G-31H). In some embodiments, the computer system would not change the zoom level of the virtual content in accordance with a determination that the computer system has been tilted while the reticle is not displayed. In some embodiments, the computer system changes the zoom level of the virtual content based on the amount of tilt. In some embodiments, the computer system changes the zoom level based on the speed of tilt. In some embodiments, the change in tilt is determined relative to where head and the position of the computer system when the reticle was displayed. In some embodiments, the computer system is a head mounted device and the tilt is caused by the user tilting their head. Displaying the virtual content at a second zoom level that is different from the first zoom level in response to detecting that the computer system has been tilted enables the computer system to change the zoom level at which the virtual content is displayed without displaying additional controls.

In some embodiments, in response to detecting that the computer system has been tilted: in accordance with a determination that the computer system has been tilted in a first direction, the first virtual object (e.g., 3172) has a first visual appearance (e.g., as described above in relation to FIGS. 31G-31H); and in accordance with a determination that the computer system has been tilted in a second direction that is different from the first direction, the first virtual object has a second visual appearance that is different from the first visual appearance (e.g., as described above in relation to FIGS. 31G-31H). In some embodiments, in response to detecting that the computer system has been tilted and in accordance with a determination that the computer system has been tilted in a first direction, the second zoom level is higher than the first zoom level; and in response to detecting that the computer system has been tilted and in accordance with a determination that the computer system has been tilted in a second direction that is different from the first direction, the second zoom level is lower than the first zoom level. In some embodiments, the first virtual object is displayed with an indication of tilt (e.g., 0 degrees-180 degrees) and/or the amount of zoom (e.g., 0.1×-5×). Displaying the first virtual object with a different visual appearance based on the direction that the computer system has been tilted causes the computer system to automatically change the display of the first virtual object and provides feedback about the state of the computer (e.g., that the computer system has changed the zoom level of the virtual content in a certain manner).

In some embodiments, while displaying, via the display generation component, the first virtual object (e.g., 3172) at the respective location in the third respective portion of the virtual content (e.g., content of 1960, such as 3162 and/or 3164), the computer system detects that the attention (e.g., 3122f and/or 3124f) of the user is not directed (e.g., no longer directed) to the first location in the third respective portion of the virtual content (e.g., as described above in relation to FIGS. 31G-31H). In some embodiments, in response to detecting that the attention (e.g., 3122f and/or 3124f) of the user is not directed to the first location in the third respective portion of the virtual content and in accordance with a determination that the attention of the user has not been directed to the first location for more than a second threshold amount of time (e.g., 0.05-10 seconds), the computer system ceases to display the first virtual object at the respective location in the third respective portion of the virtual content (e.g., as described above in relation to FIGS. 31G-31H) (e.g., and/or ceasing to display the first virtual object at any location). In some embodiments, in response to detecting that the attention of the user is not directed to the first location in the third respective portion of the virtual content and in accordance with a determination that the attention of the user has not been directed to the first location for less than the second threshold amount of time (e.g., 0.05-10 seconds), the computer system continues to display the first virtual object (e.g., at the respective location in the third respective portion of the virtual content). Ceasing to display the first virtual object when prescribed conditions are met automatically causes the computer system to automatically cease displaying the first virtual object in situations where the user may not intend that the computer system be configured to change the zoom level of the virtual content in response to detecting one or more inputs and provides feedback about the state of the computer system (e.g., that the computer system is not configured to change the zoom level of the virtual content in response to detecting one or more inputs).

In some embodiments, in accordance with a determination that the attention (e.g., 3122f and/or 3124f) of the user is directed to a fifth location in the third respective portion of the virtual content (e.g., content of 1960, such as 3162 and/or 3164): in accordance with a determination that the fifth location in the third respective portion of the virtual content is within a second threshold distance (e.g., 0.1-5 meters) from a preidentified location (e.g., as indicated by 3164) (e.g., a location of interest (e.g., a predefined location of interest) (e.g., one or more landmarks (e.g., famous landmarks), streets, public buildings and/or parks, and/or businesses) (e.g., in the third respective portion of the virtual content) in the third respective portion of the virtual content, the respective location in the third respective portion of the virtual content is the preidentified location (e.g., as described above in relation to FIGS. 31G-31H); and in accordance with a determination that the fifth location in the third respective portion of the virtual content is not within the second threshold distance from the preidentified (e.g., as indicated by 3164) location, the respective location in the third respective portion of the virtual content is the fifth location (and/or a location that is not preidentified and close to the fifth location) (e.g., as described above in relation to FIGS. 31G-31H). In some embodiments, the fifth location in the third respective portion of the virtual content is different from the preidentified location. Displaying the first virtual object at a preidentified location when prescribed conditions are met causes the computer system to automatically place the first virtual object at a location that may be relevant to a user (e.g., even if the attention of the user is detected to be directly directed to the location that may be relevant to the user).

In some embodiments, the virtual content (e.g., content of 1960, such as 3162 and/or 3164) is displayed at a third zoom level. In some embodiments, while displaying, via the display generation component, the respective virtual object (e.g., 1960) that includes the virtual content displayed at the third zoom level, the computer system detects movement of a body part (e.g., a hand (e.g., an air gesture performed using a hand), an arm, and/or a leg) of the user of the computer system (e.g., as described above in relation to FIGS. 31G-31H). In some embodiments, in response to detecting movement of the body part of the user of the computer system, the computer system displays, via the display generation component, the virtual content at a fourth zoom level that is different from the third zoom level (e.g., as described above in relation to FIGS. 31G-31H). Displaying the virtual content at a fourth zoom level that is different from the third zoom level in response to detecting movement of the body part of the user of the computer system enables the computer system to change the zoom level at which the virtual content is displayed without display additional controls and without requiring additional inputs, such as hand inputs and/or air inputs/gestures.

In some embodiments, the body part includes the user's head (e.g., as described above in relation to FIGS. 31G-31H). Displaying the virtual content at a fourth zoom level that is different from the third zoom level in response to detecting movement of the head of the user of the computer system enables the computer system to change the zoom level at which the virtual content is displayed without display additional controls and without requiring additional inputs, such as hand inputs and/or air inputs/gestures.

In some embodiments, detecting movement of the body part of the user of the computer system includes detecting that the user's head has been tilted (e.g., detecting tilting of the user computer system) (e.g., as described above in relation to FIGS. 31G-31H). Displaying the virtual content at a fourth zoom level that is different from the third zoom level in response to detecting tilting of the head of the user of the computer system enables the computer system to change the zoom level at which the virtual content is displayed without display additional controls and without requiring additional inputs, such as hand inputs and/or air inputs/gestures.

In some embodiments, detecting movement of the body part of the user of the computer system includes detecting an air gesture (e.g., a pinch and twist gesture) that includes movement (e.g., a twisting movement) of the body part of the user while the body part of user is forming a first gesture (e.g., a pinch gesture)) (e.g., as described above in relation to FIGS. 11A1-11E3 and FIGS. 31G-31H). In some embodiments, in response to detecting movement of the body part of the user of the computer system: in accordance with a determination that movement of the body part of the user of the computer system has a first amount of movement, the fourth zoom level is a fifth zoom level (e.g., as described above in relation to FIGS. 31G-31H); and in accordance with a determination that movement of the body part of the user of the computer system has a second amount of movement that is different from (e.g., greater than) the first amount of movement, the fourth zoom level is a sixth zoom level that is different from (e.g., higher than) the fifth zoom level (e.g., as described above in relation to FIGS. 31G-31H). Displaying the virtual content at a zoom level based on the amount of movement of the body part allows the computer system to differentiate the zoom level at which the virtual content is displayed without display additional controls and without requiring additional inputs, such as hand inputs and/or hand inputs/gestures.

In some embodiments, in response to detecting movement of the body part of the user of the computer system: in accordance with a determination that movement of the body part of the user of the computer system has a third speed, the fourth zoom level is a seventh zoom level (e.g., as described above in relation to FIGS. 31G-31H); and in accordance with a determination that movement of the body part of the user of the computer system is has a fourth speed that is different from (e.g., higher than) the third speed, the fourth zoom level is an eighth zoom level that is different from (e.g., higher than) the seventh zoom level (e.g., as described above in relation to FIGS. 31G-31H). Displaying the virtual content at a zoom level based on the speed of movement of the body part allows the computer system to differentiate the zoom level at which the virtual content is displayed without display additional controls and without requiring additional inputs, such as hand inputs and/or air inputs/gestures.

In some embodiments, the virtual content (e.g., content of 1960, such as 3162 and/or 3164) includes a fourth edge (e.g., 1906*a*) (e.g., a visual boundary and/or a frame that surrounds the virtual content (e.g., the entirety of) and/or at least a subset of the virtual content). In some embodiments, navigating through the virtual content in the second navigation direction includes: in accordance with a determination that the attention (e.g., 3122*f* and/or 3124*f*) of the user is a first distance from the fourth edge, updating (e.g., moving and/or navigating through) display of the virtual content at a first rate (e.g., speed, velocity, and/or acceleration) based on the second navigation direction (e.g., as described above in relation to FIGS. 31B-31C); and in accordance with a determination that the attention (e.g., 3122*f* and/or 3124*f*) of the user is a second distance from the fourth edge, wherein the second distance from the fourth edge is shorter than the first distance from the fourth edge, updating display of the virtual content at a second rate (e.g., speed, velocity, and/or acceleration) based on the second navigation direction, wherein the second rate is greater than the first rate (e.g., as described above in relation to FIGS. 31B-31C). Updating display of the virtual content at a particular rate based on the distance that the attention of the user is from an edge of the virtual content allows the computer system to provide a way for the user to control the speed at which the virtual content is navigated without displaying additional controls and without requiring additional inputs, such as hand inputs and/or air gestures/inputs.

In some embodiments, the respective virtual object (e.g., 1960) that includes the virtual content (e.g., content of 1960, such as 3162 and/or 3164) is overlaid on a portion of a physical environment (e.g., as described above in relation to FIG. 31A).

In some embodiments, aspects/operations of methods 800, 1000, 1200, 1400, 1600, 1800, 2000, 2200, 2400, 2600, 2800, and 3000 may be interchanged, substituted, and/or added with the steps of method 3200. For example, method 3200 can be used to navigate a user interface at a computer system that has been awaken using method 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data (e.g., use data such as navigation data) for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system that is configured to communicate with one or more gaze-tracking sensors and a display generation component, the computer system comprising:

one or more processors; and memory storing one or more programs configured to be executed by the one or more processors, the one or more programs including instructions for:

detecting, via the one or more gaze-tracking sensors, that attention of a user is directed toward a first location;

in response to detecting that the attention of the user is directed toward the first location, displaying, via the display generation component, a first virtual object at a position that is locked relative to the head of the user of the computer system, wherein the first virtual object is displayed with a first visual appearance;

while displaying, via the display generation component, the first virtual object at the position that is locked relative to the head of the user of the computer system, detecting, via the one or more gaze-tracking sensors, that the attention of the user is directed toward a second location that is different from the first location; and in response to detecting, via the one or more gaze-tracking sensors, that the attention of the user is directed toward the second location:

in accordance with a determination that the attention of the user that is directed toward the second location is directed to the first virtual object for a first predetermined period of time, changing an appearance of the first virtual object from the first visual appearance to a second visual appearance; and in accordance with a determination that the attention of the user that is directed toward the second location is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

2. The computer system of claim 1, wherein the first user interface that includes the second virtual object and the third virtual object does not include the first virtual object.

3. The computer system of claim 1, wherein the one or more programs further include instructions for:

in response to detecting, via the one or more gaze-tracking sensors, that the attention of the user is directed toward the second location and in accordance with the determination that the attention of the user that is directed toward the second location is directed to the first virtual object for the second predetermined period of time, ceasing, via the display generation component, to display the first virtual object.

4. The computer system of claim 3, wherein before detecting, via the one or more gaze-tracking sensors, that the attention of the user is directed toward the second location, the first virtual object is displayed at a third location, and wherein displaying, via the display generation component, the first user interface includes:

displaying, via the display generation component, the second virtual object at the third location.

5. The computer system of claim 1, wherein the one or more programs further include instructions for:

while displaying, via the display generation component, the first virtual object at the position that is locked relative to the head of the user of the computer system, detecting, via the one or more gaze-tracking sensors, that the attention of the user is directed toward a third location that is different from the second location; and in response to detecting, via the one or more gaze-tracking sensors, that the attention of the user is directed toward the third location, ceasing to display, via the display generation component, the first virtual object.

6. The computer system of claim 1, wherein changing the appearance of the first virtual object from the first visual appearance to the second visual appearance includes displaying, via the display generation component, an animation that indicates progress towards completion of a wake operation while the attention of the user that is directed toward the second location is directed to the first virtual object.

7. The computer system of claim 6, wherein displaying the animation includes changing a first size of the first virtual object over a first period of time while the attention of the user that is directed toward the second location is directed to the first virtual object.

8. The computer system of claim 6, wherein displaying the animation includes changing a first amount of color that fills up the first virtual object over a second period of time while the attention of the user that is directed toward the second location is directed to the first virtual object.

9. The computer system of claim 6, wherein displaying the animation includes:

changing a second amount of color that fills up the first virtual object over a third period of time while the attention of the user that is directed toward the second location is directed to the first virtual object; and after changing the second amount of color that fills up the first virtual object over the third period of time, increasing a second size of the first virtual object over a fourth period of time while the attention of the user that is directed toward the second location is directed to the first virtual object.

10. The computer system of claim 1, wherein:

in accordance with a determination that the attention of the user that is directed toward the first location is directed to a first predetermined portion of a first user interface region, the position that is locked relative to the head of the user of the computer system is associated with the first predetermined portion of the first user interface region; and in accordance with a determination that the attention of the user that is directed toward the first location is directed to a second predetermined portion of the first user interface region that is different from the first predetermined portion of the first user interface region, the position that is locked relative to the head of the user of the computer system is associated with the second predetermined portion of the first user interface region.

11. The computer system of claim 10, wherein the first predetermined portion of the first user interface region is on a first side of the first user interface region, and wherein the second predetermined portion of the first user interface region is on a second side of the first user interface region that is different from the first side of the first user interface region.

12. The computer system of claim 10, wherein the first predetermined portion of the first user interface region is on a third side of the first user interface region, and wherein the second predetermined portion of the first user interface region is in a corner of the first user interface region.

13. The computer system of claim 10, wherein:
in accordance with the determination that the attention of the user that is directed toward the second location is directed to the first virtual object for the second predetermined period of time:
in accordance with a determination that attention of the user that is directed toward the second location is directed to the first predetermined portion of the first user interface region, the first user interface is displayed at a location in the first predetermined portion of the first user interface region; and
in accordance with a determination that attention of the user that is directed toward the second location is directed to the second predetermined portion of the first user interface region, the first user interface is displayed at a location in the second predetermined portion of the first user interface region.

14. The computer system of claim 1, wherein the one or more programs further include instructions for:
before detecting, via the one or more gaze-tracking sensors, that the attention of the user is directed toward the first location and before displaying the first virtual object at the position that is locked relative to the head of the user of the computer system, detecting, via the one or more gaze-tracking sensors, that the attention of the user is directed toward a fourth location that is different from the first location and is directed to a third predetermined portion of a second user interface region; and
in response to detecting that the attention of the user is directed toward the fourth location and is directed to the third predetermined portion of the second user interface region:
in accordance with a determination that a respective setting is enabled for performing a wake operation based on a detected attention of the user being directed to the third predetermined portion of the second user interface region, displaying, via the display generation component, the first virtual object; and
in accordance with a determination that the respective setting is disabled for performing the wake operation based on the detected attention of the user being directed to the third predetermined portion of the second user interface region, forgoing displaying, via the display generation component, the first virtual object.

15. The computer system of claim 1, wherein the second virtual object includes first status information.

16. The computer system of claim 1, wherein the second virtual object and the third virtual object are included in a first menu.

17. The computer system of claim 1, wherein the first user interface is a user interface of a last used application.

18. The computer system of claim 1, wherein the first user interface is a wake screen user interface.

19. The computer system of claim 1, wherein the first user interface is a home screen user interface.

20. The computer system of claim 1, wherein the computer system is operating in a first power mode before detecting that the attention of the user is directed toward the first location, wherein the one or more programs further include instructions for:
in response to detecting that the attention of the user is directed toward the first location, transitioning from operating in the first power mode to operating in a second power mode that is different from the first power mode; and
while operating in the second power mode and in response to detecting, via the one or more gaze-tracking sensors, that the attention of the user is directed toward the second location:
in accordance with a determination that the attention of the user that is directed toward the second location is directed to the first virtual object for the second predetermined period of time, transitioning from operating in the second power mode to operating in a third power mode that is different from the first power mode and the second power mode.

21. The computer system of claim 20, wherein the computer system is in communication with a plurality of display projectors, and wherein, while operating in the second power mode, a first subset of the plurality of display projectors for a first portion of a display area is activated while a second subset of the plurality of display projectors for a second portion of a display area is not activated.

22. The computer system of claim 20, wherein the one or more programs further include instructions for:
while operating in the third power mode, displaying, via the display generation component, a second menu.

23. The computer system of claim 20, wherein the one or more programs further include instructions for:
while operating in the second power mode, displaying, via the display generation component, a fourth virtual object, wherein selection of the fourth virtual object causes an application to be initiated on an external device and/or causes an application that is running on the external device to be initiated on the computer system; and
while operating in the third power mode, displaying, via the display generation component, the fourth virtual object.

24. The computer system of claim 20, wherein the one or more programs further include instructions for:
while operating in the second power mode, displaying, via the display generation component, a type of status information; and
while operating in the third power mode, displaying, via the display generation component, the type of status information.

25. The computer system of claim 20, wherein:
in accordance with the determination that the attention of the user that is directed toward the second location is directed to the first virtual object for the second predetermined period of time:
in accordance with a determination that a first time has not passed from a time at which the computer system previously operated in the third power mode, the first user interface is a user interface of a last used application; and
in accordance with a determination that the first time has passed from the time at which the computer system previously operated in the third power mode, the first user interface is a user interface that is different from the user interface of the last used application.

26. The computer system of claim 1, wherein the one or more programs further include instructions for:
in response to detecting, via the one or more gaze-tracking sensors, that the attention of the user is directed toward the second location and in accordance with a determination that the attention of the user that is directed toward the second location is directed to a fourth predetermined region around the first virtual object, displaying, via the display generation component, a fifth virtual object that is different from the first virtual object while continuing to display the first virtual object, wherein selection of the fifth virtual object causes display of first virtual content.

27. The computer system of claim 26, wherein the fourth predetermined region around the first virtual object does not correspond to an area occupied by the first virtual object.

28. The computer system of claim 26, wherein the one or more programs further include instructions for:

in response to detecting, via the one or more gaze-tracking sensors, that the attention of the user is directed toward the second location and in accordance with a determination that the attention of the user that is directed toward the second location is directed to the fourth predetermined region around the first virtual object, displaying a sixth virtual object, wherein the sixth virtual object is concurrently displayed with the fifth virtual object, and wherein selection of the sixth virtual object causes the computer system to display second virtual content that is different from the first virtual content.

29. The computer system of claim 26, wherein the one or more programs further include instructions for:

while displaying, via the display generation component, the fifth virtual object, detecting, via the one or more gaze-tracking sensors, that the attention of the user is directed to the fifth virtual object; and in response to detecting, via the one or more gaze-tracking sensors, that the attention of the user is directed to the fifth virtual object:

transitioning the computer system from a fourth power mode to a fifth power mode; and displaying, via the display generation component, a plurality of notifications while the computer system is in the fifth power mode, wherein the computer system is configured to consume more power while operating in the fifth power mode than while operating in the fourth power mode.

30. The computer system of claim 26, wherein the one or more programs further include instructions for:

while displaying, via the display generation component, the fifth virtual object, detecting, via the one or more gaze-tracking sensors, that the attention of the user is directed to the fifth virtual object; and in response to detecting, via the one or more gaze-tracking sensors, that the attention of the user is directed to the fifth virtual object:

transitioning the computer system from a sixth power mode to a seventh power mode; and displaying, via the display generation component, a user interface for an application that is running on an external device while the computer system is in the seventh power mode, wherein the computer system is configured to consume more power while operating in the seventh power mode than while operating in the sixth power mode.

31. The computer system of claim 26, wherein the one or more programs further include instructions for:

while displaying, via the display generation component, the fifth virtual object and the first virtual object, detecting, via the one or more gaze-tracking sensors, that the attention of the user is not directed to the fifth virtual object and/or the first virtual object; and in response to detecting, via the one or more gaze-tracking sensors, that the attention of the user is not directed to the fifth virtual object and/or the first virtual object, ceasing to display, via the display generation component, the first virtual object and the fifth virtual object.

32. The computer system of claim 1, wherein the one or more programs further include instructions for:

in response to detecting, via the one or more gaze-tracking sensors, that the attention of the user is directed toward the second location:

in accordance with a determination that the attention of the user that is directed toward the second location is directed to the first virtual object for the first predetermined period of time, displaying, via the display generation component, a first set of virtual objects; and in accordance with a determination that the attention of the user that is directed toward the second location is directed to the first virtual object for the second predetermined period of time, displaying, via the display generation component, a second set of virtual objects that includes the first set of virtual objects.

33. The computer system of claim 32, wherein the one or more programs further include instructions for:

while displaying, via the display generation component, the first set of virtual objects, detecting, via the one or more gaze-tracking sensors, that the attention of the user is directed toward a fifth location; and in response to detecting that the attention of the user is directed toward the fifth location:

in accordance with a determination that the fifth location is a sixth location, displaying, via the display generation component, a fourth user interface; and in accordance with a determination that the fifth location is a seventh location that is different from the sixth location, displaying, via the display generation component, a fifth user interface that is different from the fourth user interface.

34. A non-transitory computer-readable storage medium storing one or more programs configured to be executed by one or more processors of a computer system that is in communication with one or more gaze-tracking sensors and a display generation component, the one or more programs including instructions for:

detecting, via the one or more gaze-tracking sensors, that attention of a user is directed toward a first location;

in response to detecting that the attention of the user is directed toward the first location, displaying, via the display generation component, a first virtual object at a position that is locked relative to the head of the user of the computer system, wherein the first virtual object is displayed with a first visual appearance;

while displaying, via the display generation component, the first virtual object at the position that is locked relative to the head of the user of the computer system, detecting, via the one or more gaze-tracking sensors, that the attention of the user is directed toward a second location that is different from the first location; and in response to detecting, via the one or more gaze-tracking sensors, that the attention of the user is directed toward the second location:

in accordance with a determination that the attention of the user that is directed toward the second location is directed to the first virtual object for a first predetermined period of time, changing an appearance of the first virtual object from the first visual appearance to a second visual appearance; and

US 12,619,303 B2

281 in accordance with a determination that the attention of the user that is directed toward the second location is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

35. A method, comprising:
at a computer system that is in communication with one or more gaze-tracking sensors and a display generation component:
  detecting, via the one or more gaze-tracking sensors, that attention of a user is directed toward a first location;
  in response to detecting that the attention of the user is directed toward the first location, displaying, via the display generation component, a first virtual object at a position that is locked relative to the head of the user of the computer system, wherein the first virtual object is displayed with a first visual appearance;
  while displaying, via the display generation component, the first virtual object at the position that is locked relative to the head of the user of the computer system, detecting, via the one or more gaze-tracking sensors, that the attention of the user is directed toward a second location that is different from the first location; and
  in response to detecting, via the one or more gaze-tracking sensors, that the attention of the user is directed toward the second location:
    in accordance with a determination that the attention of the user that is directed toward the second location is directed to the first virtual object for a first predetermined period of time, changing an appearance of the first virtual object from the first visual appearance to a second visual appearance; and
    in accordance with a determination that the attention of the user that is directed toward the second location is directed to the first virtual object for a second predetermined period of time that is different from the first predetermined period of time, displaying, via the display generation component, a first user interface that includes a second virtual object and a third virtual object, wherein selection of the second virtual object causes display of a second user interface that is different from the first user interface, and wherein selection of the third virtual object causes display of a third user interface that is different from the first user interface and the second user interface.

36. The non-transitory computer-readable storage medium of claim 34, wherein the one or more programs further include instructions for:
  in response to detecting, via the one or more gaze-tracking sensors, that the attention of the user is directed toward the second location and in accordance with the determination that the attention of the user that is directed toward the second location is directed to the first virtual object for the second predetermined period of time, ceasing, via the display generation component, to display the first virtual object.

37. The non-transitory computer-readable storage medium of claim 34, wherein the one or more programs further include instructions for:
  while displaying, via the display generation component, the first virtual object at the position that is locked relative to the head of the user of the computer system, detecting, via the one or more gaze-tracking sensors, that the attention of the user is directed toward a third location that is different from the second location; and
  in response to detecting, via the one or more gaze-tracking sensors, that the attention of the user is directed toward the third location, ceasing to display, via the display generation component, the first virtual object.

38. The non-transitory computer-readable storage medium of claim 34, wherein changing the appearance of the first virtual object from the first visual appearance to the second visual appearance includes displaying, via the display generation component, an animation that indicates progress towards completion of a wake operation while the attention of the user that is directed toward the second location is directed to the first virtual object.

39. The non-transitory computer-readable storage medium of claim 34, wherein:
  in accordance with a determination that the attention of the user that is directed toward the first location is directed to a first predetermined portion of a first user interface region, the position that is locked relative to the head of the user of the computer system is associated with the first predetermined portion of the first user interface region; and
  in accordance with a determination that the attention of the user that is directed toward the first location is directed to a second predetermined portion of the first user interface region that is different from the first predetermined portion of the first user interface region, the position that is locked relative to the head of the user of the computer system is associated with the second predetermined portion of the first user interface region.

40. The non-transitory computer-readable storage medium of claim 34, wherein the one or more programs further include instructions for:
  before detecting, via the one or more gaze-tracking sensors, that the attention of the user is directed toward the first location and before displaying the first virtual object at the position that is locked relative to the head of the user of the computer system, detecting, via the one or more gaze-tracking sensors, that the attention of the user is directed toward a fourth location that is different from the first location and is directed to a third predetermined portion of a second user interface region; and
  in response to detecting that the attention of the user is directed toward the fourth location and is directed to the third predetermined portion of the second user interface region:
    in accordance with a determination that a respective setting is enabled for performing a wake operation based on a detected attention of the user being directed to the third predetermined portion of the second user interface region, displaying, via the display generation component, the first virtual object; and
    in accordance with a determination that the respective setting is disabled for performing the wake operation based on the detected attention of the user being directed to the third predetermined portion of the second user interface region, forgoing displaying, via the display generation component, the first virtual object.

41. The non-transitory computer-readable storage medium of claim 34, wherein the computer system is operating in a first power mode before detecting that the attention of the user is directed toward the first location, wherein the one or more programs further include instructions for:

in response to detecting that the attention of the user is directed toward the first location, transitioning from operating in the first power mode to operating in a second power mode that is different from the first power mode; and while operating in the second power mode and in response to detecting, via the one or more gaze-tracking sensors, that the attention of the user is directed toward the second location:

in accordance with a determination that the attention of the user that is directed toward the second location is directed to the first virtual object for the second predetermined period of time, transitioning from operating in the second power mode to operating in a third power mode that is different from the first power mode and the second power mode.

42. The non-transitory computer-readable storage medium of claim 34, wherein the one or more programs further include instructions for:

in response to detecting, via the one or more gaze-tracking sensors, that the attention of the user is directed toward the second location and in accordance with a determination that the attention of the user that is directed toward the second location is directed to a fourth predetermined region around the first virtual object, displaying, via the display generation component, a fifth virtual object that is different from the first virtual object while continuing to display the first virtual object, wherein selection of the fifth virtual object causes display of first virtual content.

43. The non-transitory computer-readable storage medium of claim 34, wherein the one or more programs further include instructions for:

in response to detecting, via the one or more gaze-tracking sensors, that the attention of the user is directed toward the second location:

in accordance with a determination that the attention of the user that is directed toward the second location is directed to the first virtual object for the first predetermined period of time, displaying, via the display generation component, a first set of virtual objects; and in accordance with a determination that the attention of the user that is directed toward the second location is directed to the first virtual object for the second predetermined period of time, displaying, via the display generation component, a second set of virtual objects that includes the first set of virtual objects.

44. The method of claim 35, further comprising:

in response to detecting, via the one or more gaze-tracking sensors, that the attention of the user is directed toward the second location and in accordance with the determination that the attention of the user that is directed toward the second location is directed to the first virtual object for the second predetermined period of time, ceasing, via the display generation component, to display the first virtual object.

45. The method of claim 35, further comprising:

while displaying, via the display generation component, the first virtual object at the position that is locked relative to the head of the user of the computer system, detecting, via the one or more gaze-tracking sensors, that the attention of the user is directed toward a third location that is different from the second location; and in response to detecting, via the one or more gaze-tracking sensors, that the attention of the user is directed toward the third location, ceasing to display, via the display generation component, the first virtual object.

46. The method of claim 35, wherein changing the appearance of the first virtual object from the first visual appearance to the second visual appearance includes displaying, via the display generation component, an animation that indicates progress towards completion of a wake operation while the attention of the user that is directed toward the second location is directed to the first virtual object.

47. The method of claim 35, wherein:

in accordance with a determination that the attention of the user that is directed toward the first location is directed to a first predetermined portion of a first user interface region, the position that is locked relative to the head of the user of the computer system is associated with the first predetermined portion of the first user interface region; and in accordance with a determination that the attention of the user that is directed toward the first location is directed to a second predetermined portion of the first user interface region that is different from the first predetermined portion of the first user interface region, the position that is locked relative to the head of the user of the computer system is associated with the second predetermined portion of the first user interface region.

48. The method of claim 35, further comprising:

before detecting, via the one or more gaze-tracking sensors, that the attention of the user is directed toward the first location and before displaying the first virtual object at the position that is locked relative to the head of the user of the computer system, detecting, via the one or more gaze-tracking sensors, that the attention of the user is directed toward a fourth location that is different from the first location and is directed to a third predetermined portion of a second user interface region; and in response to detecting that the attention of the user is directed toward the fourth location and is directed to the third predetermined portion of the second user interface region:

in accordance with a determination that a respective setting is enabled for performing a wake operation based on a detected attention of the user being directed to the third predetermined portion of the second user interface region, displaying, via the display generation component, the first virtual object; and in accordance with a determination that the respective setting is disabled for performing the wake operation based on the detected attention of the user being directed to the third predetermined portion of the second user interface region, forgoing displaying, via the display generation component, the first virtual object.

49. The method of claim 35, wherein the computer system is operating in a first power mode before detecting that the attention of the user is directed toward the first location, wherein the method further comprises:

in response to detecting that the attention of the user is directed toward the first location, transitioning from operating in the first power mode to operating in a second power mode that is different from the first power mode; and while operating in the second power mode and in response to detecting, via the one or more gaze-tracking sensors, that the attention of the user is directed toward the second location:

in accordance with a determination that the attention of the user that is directed toward the second location is directed to the first virtual object for the second predetermined period of time, transitioning from operating in the second power mode to operating in a third power mode that is different from the first power mode and the second power mode.

50. The method of claim 35, further comprising:

in response to detecting, via the one or more gaze-tracking sensors, that the attention of the user is directed toward the second location and in accordance with a determination that the attention of the user that is directed toward the second location is directed to a fourth predetermined region around the first virtual object, displaying, via the display generation component, a fifth virtual object that is different from the first virtual object while continuing to display the first virtual object, wherein selection of the fifth virtual object causes display of first virtual content.

51. The method of claim 35, further comprising:

in response to detecting, via the one or more gaze-tracking sensors, that the attention of the user is directed toward the second location:

in accordance with a determination that the attention of the user that is directed toward the second location is directed to the first virtual object for the first predetermined period of time, displaying, via the display generation component, a first set of virtual objects; and in accordance with a determination that the attention of the user that is directed toward the second location is directed to the first virtual object for the second predetermined period of time, displaying, via the display generation component, a second set of virtual objects that includes the first set of virtual objects.

\* \* \* \* \*